US010662662B2

(12) United States Patent
Baker

(10) Patent No.: US 10,662,662 B2
(45) **Date of Patent: *May 26, 2020**

(54) RETROFITTED REAL ESTATE AND RELATED TECHNOLOGY

(71) Applicant: Spacement, Inc., Portland, OR (US)

(72) Inventor: Theodore W. Baker, Portland, OR (US)

(73) Assignee: Spacement Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/018,620

(22) Filed: Jun. 26, 2018

(65) Prior Publication Data

US 2019/0003195 A1 Jan. 3, 2019

Related U.S. Application Data

(63) Continuation-in-part of application No. 15/140,785, filed on Apr. 28, 2016, now Pat. No. 10,529,038, and (Continued)

(51) Int. Cl.
*E04H 1/12* (2006.01)
*A47K 4/00* (2006.01)
(Continued)

(52) U.S. Cl.
CPC ............ *E04H 1/1266* (2013.01); *A47K 4/00* (2013.01); *E04H 3/02* (2013.01); *G06Q 10/02* (2013.01);
(Continued)

(58) Field of Classification Search
CPC ............ E04B 1/34861; E04B 1/34869; E04B 1/34315; E04H 1/02; E04H 1/06; E04H 1/005; E04H 1/1266
See application file for complete search history.

(56) References Cited

U.S. PATENT DOCUMENTS 2,638,635 A 5/1953 Priebe
2,644,203 A 7/1953 Donahue
(Continued)

OTHER PUBLICATIONS

Epes, James. "Retail space requirement puts apartments into hotel business." Puget Sound business Journal, Feb. 11, 1994, p. 1+. General One File, http://link.galegroup.corn/apps/doc/A 15198416/ITOF?u=urnuser&sid=ITOF&xid=8c7995d5.

*Primary Examiner* — Rodney Mintz

(57) ABSTRACT

A real estate unit in accordance with a particular embodiment of the present technology includes an interior space at the ground floor of a commercial building. The interior space can have a purpose-built use (e.g., retail, warehouse, school, garage, etc.) and can be reversibly retrofitted to accommodate an alternative use (e.g., lodging, residential, office, assembly, etc.). The real estate unit can include reusable components (e.g., bathroom, wall, barrier, etc.) well suited for rapid deployment, removal, and redeployment. Use of these components can allow revenue from operating the real estate unit to exceed costs associated within transitioning the interior space from the purpose-built use to the alternative use even if the real estate unit is only operated for a short period of time. Furthermore, capital embodied in the components can be readily relocatable in response to long-term and short-term (e.g., seasonal) changes in demand.

17 Claims, 136 Drawing Sheets

Related U.S. Application Data a continuation-in-part of application No. 15/263,527, filed on Sep. 13, 2016, now Pat. No. 10,011,982, and a continuation-in-part of application No. 15/390,731, filed on Dec. 27, 2016, now abandoned, and a continuation-in-part of application No. 15/456,523, filed on Mar. 11, 2017, now Pat. No. 10,043,227, and a continuation-in-part of application No. 15/675,745, filed on Aug. 13, 2017, now Pat. No. 10,036,172.

(60) Provisional application No. 62/154,209, filed on Apr. 29, 2015, provisional application No. 62/222,750, filed on Sep. 23, 2015, provisional application No. 62/273,700, filed on Dec. 31, 2015, provisional application No. 62/310,045, filed on Mar. 18, 2016, provisional application No. 62/375,903, filed on Aug. 17, 2016.

(51) Int. Cl.

| | |
|---|---|
| ***E04H 3/02*** | (2006.01) |
| ***G06Q 10/02*** | (2012.01) |
| ***G06Q 50/12*** | (2012.01) |
| ***E04B 1/343*** | (2006.01) |
| ***E04B 1/348*** | (2006.01) |

(52) U.S. Cl.

CPC .......... *G06Q 50/12* (2013.01); *E04B 1/34315* (2013.01); *E04B 1/34869* (2013.01); *E04H 1/1216* (2013.01)

(56) References Cited

U.S. PATENT DOCUMENTS

| | | | |
|---|---|---|---|
| 3,603,047 A | | 9/1971 | Tournler |
| 3,900,994 A | | 8/1975 | Van der Lely |
| 4,181,347 A | | 1/1980 | Clark |
| 4,268,925 A | | 5/1981 | Marple |
| 4,464,877 A | | 8/1984 | Gebhardt et al. |
| 4,630,664 A | | 12/1986 | Magro |
| 4,745,712 A | | 5/1988 | O'Leary |
| 4,745,719 A | | 5/1988 | Blankstein et al. |
| 5,228,984 A | | 7/1993 | Lindstrom |
| 5,265,384 A | | 11/1993 | Menke et al. |
| 5,761,857 A | | 6/1998 | Kaufman et al. |
| 5,931,642 A | | 8/1999 | Friedman et al. |
| 5,979,754 A | | 11/1999 | Martin et al. |
| 6,016,636 A | | 1/2000 | Caputo |
| 6,155,012 A | | 12/2000 | Halbitte |
| 6,179,358 B1 | | 1/2001 | Hirayama et al. |
| 6,330,771 B1 | | 12/2001 | Hester, Jr. |
| 7,373,763 B2 | | 5/2008 | Voegele, Jr. et al. |
| 7,779,585 B2 | | 8/2010 | Hester, Jr. |
| 8,474,203 B1 | | 7/2013 | Stewart et al. |
| 8,621,787 B2 | * | 1/2014 | Barry .................. E04B 1/34869 52/220.1 |
| 8,919,049 B2 | | 12/2014 | Meserini |
| 9,097,030 B1 | | 8/2015 | Manterfield |
| 9,428,927 B2 | * | 8/2016 | Vale ........................ E04H 1/005 |
| 9,909,293 B2 | * | 3/2018 | Winter ...................... E03D 7/00 |
| 10,011,982 B1 | * | 7/2018 | Baker ................. E04B 1/34869 |
| 10,036,172 B1 | * | 7/2018 | Baker ................... E04H 1/1266 |
| 10,043,227 B1 | * | 8/2018 | Baker .................... G06Q 50/16 |
| 10,529,038 B2 | * | 1/2020 | Baker .................... G06Q 50/12 |
| 2003/0140571 A1 | | 7/2003 | Muha et al. |
| 2003/0140572 A1 | | 7/2003 | Hertzog et al. |
| 2003/0226323 A1 | * | 12/2003 | Travez .................. E04F 13/081 52/220.7 |
| 2003/0233311 A1 | | 12/2003 | Bramnick et al. |
| 2004/0206011 A1 | | 10/2004 | Meeker |
| 2004/0214600 A1 | | 10/2004 | Schechet et al. |
| 2005/0188632 A1 | * | 9/2005 | Rosen ..................... E04C 2/521 52/220.2 |
| 2006/0157110 A1 | | 7/2006 | Yeh |
| 2007/0051068 A1 | | 3/2007 | Towerman et al. |
| 2008/0115416 A1 | | 5/2008 | Clark |
| 2009/0026196 A1 | | 1/2009 | Leedekerken |
| 2009/0100769 A1 | | 4/2009 | Barrett et al. |
| 2010/0229472 A1 | * | 9/2010 | Malpas ................... E04C 2/521 52/79.1 |
| 2010/0235206 A1 | | 9/2010 | Miller et al. |
| 2011/0179721 A1 | * | 7/2011 | Barry ...................... E04H 1/005 52/79.1 |
| 2011/0202396 A1 | * | 8/2011 | Viveiros ................... E04H 3/02 705/14.4 |
| 2011/0271619 A1 | * | 11/2011 | Nelson .................. E04B 2/7457 52/243.1 |
| 2013/0014451 A1 | | 1/2013 | Russell et al. |
| 2013/0335336 A1 | | 12/2013 | Esparza et al. |
| 2014/0013502 A1 | * | 1/2014 | Winter .................. E04H 1/1266 4/664 |
| 2014/0327405 A1 | | 11/2014 | Carkner |
| 2015/0300008 A1 | | 10/2015 | Gosling et al. |
| 2015/0354200 A1 | | 12/2015 | Leclerc |
| 2015/0354201 A1 | | 12/2015 | Gruetering |
| 2016/0002938 A1 | | 1/2016 | Vale et al. |
| 2016/0148237 A1 | | 5/2016 | Ifrach et al. |
| 2017/0167128 A1 | * | 6/2017 | Bouveng ............. E04B 1/34807 |
| 2018/0276774 A1 | * | 9/2018 | Comey .................. G06Q 50/16 |
| 2018/0291615 A1 | * | 10/2018 | Baker ....................... E04H 6/02 |
| 2018/0293675 A1 | * | 10/2018 | Baker .................... G06Q 10/02 |

* cited by examiner

——— = LODG. OCCUP.
-·-·-·- = NON-LODG. OCCUP.
- - - - = MOVEMENT OF MODULES

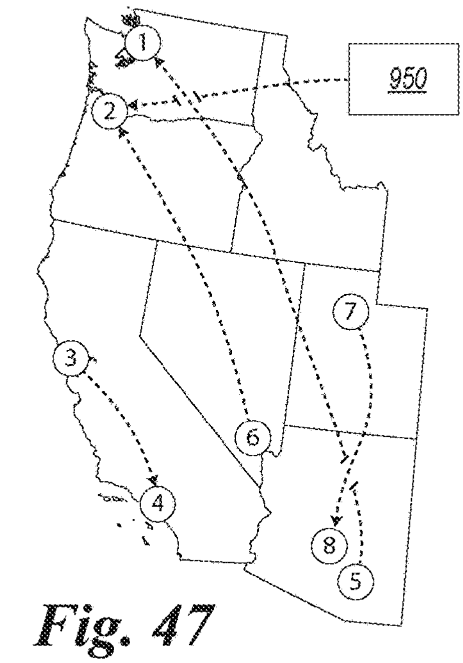

Fig. 47

| HOTEL | SEASON | | | | FAVORED MODULE ALLOC. BY FACTOR | | | IMPLEM. MODULE ALLOC. | |
|---|---|---|---|---|---|---|---|---|---|
| | SPRING | SUMMER | FALL | WINTER | SEAS. LODG. OCCUP. | GEN. LODG. OCCUP. TREND | NON-LODG. OCCUP. TREND | EXISTING MODULES | NEW MODULES |
| 1 | | | | | IN | IN | OUT | IN | - |
| 2 | | | | | IN | IN | IN | IN | IN |
| 3 | | | | | IN | OUT | OUT | OUT | - |
| 4 | | | | | IN | OUT | IN | IN | - |
| 5 | | | | | OUT | IN | OUT | OUT | - |
| 6 | | | | | OUT | OUT | IN | OUT | - |
| 7 | | | | | OUT | OUT | OUT | OUT | - |
| 8 | | | | | OUT | IN | IN | IN | - |

——— = LODG. OCCUP.
-·-·-·- = NON-LODG. OCCUP.
- - - - = MOVEMENT OF MODULES

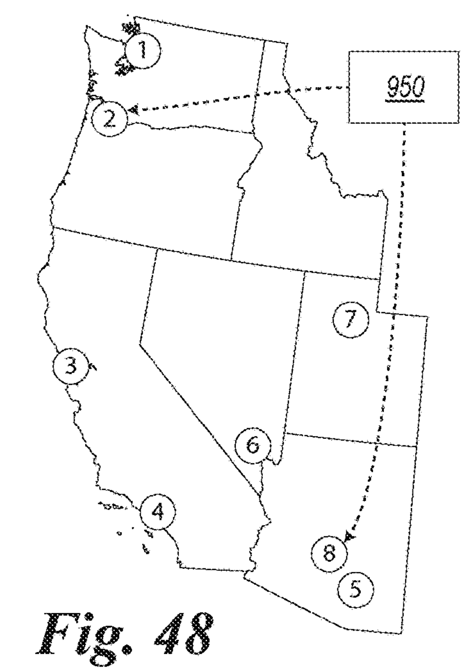

Fig. 48

| HOTEL | SEASON | | | | FAVORED MODULE ALLOC. BY FACTOR | | | IMPLEM. MODULE ALLOC. | |
|---|---|---|---|---|---|---|---|---|---|
| | SPRING | SUMMER | FALL | WINTER | SEAS. LODG. OCCUP. | GEN. LODG. OCCUP. TREND | NON-LODG. OCCUP. TREND | EXISTING MODULES | NEW MODULES |
| 1 | | | | | - | IN | OUT | - | - |
| 2 | | | | | - | IN | IN | - | IN |
| 3 | | | | | - | OUT | OUT | - | - |
| 4 | | | | | - | OUT | IN | - | - |
| 5 | | | | | - | IN | OUT | - | - |
| 6 | | | | | - | OUT | IN | - | - |
| 7 | | | | | - | OUT | OUT | - | - |
| 8 | | | | | - | IN | IN | - | IN |

——— = LODG. OCCUP.
-·-·-· = NON-LODG. OCCUP.
- - - - = MOVEMENT OF MODULES

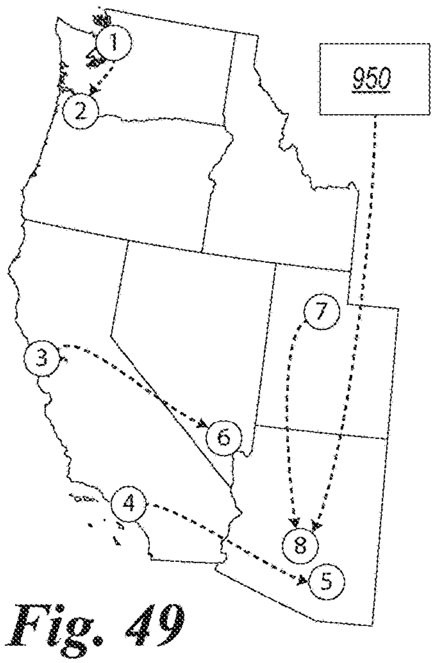

Fig. 49

| HOTEL | SEASON | | | | FAVORED MODULE ALLOC. BY FACTOR | | | IMPLEM. MODULE ALLOC. | |
|---|---|---|---|---|---|---|---|---|---|
| | SPRING | SUMMER | FALL | WINTER | SEAS. LODG. OCCUP. | GEN. LODG. OCCUP. TREND | NON-LODG. OCCUP. TREND | EXISTING MODULES | NEW MODULES |
| 1 | | | | | OUT | IN | OUT | OUT | - |
| 2 | | | | | OUT | IN | IN | IN | - |
| 3 | | | | | OUT | OUT | OUT | OUT | - |
| 4 | | | | | OUT | OUT | IN | OUT | - |
| 5 | | | | | IN | IN | OUT | IN | - |
| 6 | | | | | IN | OUT | IN | IN | - |
| 7 | | | | | IN | OUT | OUT | OUT | - |
| 8 | | | | | IN | IN | IN | IN | IN |

——— = LODG. OCCUP.
-·-·-· = NON-LODG. OCCUP.
- - - - = MOVEMENT OF MODULES

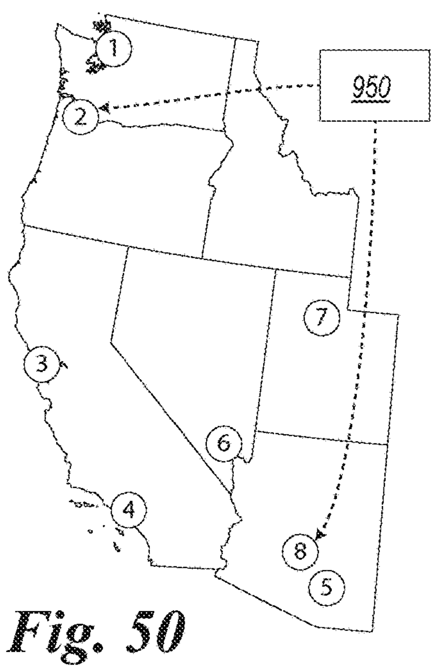

Fig. 50

| HOTEL | SEASON | | | | FAVORED MODULE ALLOC. BY FACTOR | | | IMPLEM. MODULE ALLOC. | |
|---|---|---|---|---|---|---|---|---|---|
| | SPRING | SUMMER | FALL | WINTER | SEAS. LODG. OCCUP. | GEN. LODG. OCCUP. TREND | NON-LODG. OCCUP. TREND | EXISTING MODULES | NEW MODULES |
| 1 | | | | | - | IN | OUT | - | - |
| 2 | | | | | - | IN | IN | - | IN |
| 3 | | | | | - | OUT | OUT | - | - |
| 4 | | | | | - | OUT | IN | - | - |
| 5 | | | | | - | IN | OUT | - | - |
| 6 | | | | | - | OUT | IN | - | - |
| 7 | | | | | - | OUT | OUT | - | - |
| 8 | | | | | - | IN | IN | - | IN |

RETROFITTED REAL ESTATE AND RELATED TECHNOLOGY

CROSS-REFERENCE TO RELATED APPLICATIONS INCORPORATED BY REFERENCE

This is a continuation-in-part of U.S. patent application Ser. No. 15/140,785, filed Apr. 28, 2016, entitled "Dynamic Interstitial Hotels and Related Technology," which claims the benefit of prior U.S. Provisional Patent Application No. 62/154,209, filed Apr. 29, 2015.

This is a continuation-in-part of U.S. patent application Ser. No. 15/263,527, filed Sep. 13, 2016, entitled "School Spaces Retrofitted for Alternative Uses and Related Technology," which claims the benefit of prior U.S. Patent Application No. 62/222,750, filed Sep. 23, 2015.

This is a continuation-in-part of U.S. patent application Ser. No. 15/390,731, filed Dec. 27, 2016, entitled "Garages Retrofitted for Alternative Uses and Related Technology," which claims the benefit of prior U.S. Patent Application No. 62/273,700, filed Dec. 31, 2015.

This is a continuation-in-part of U.S. patent application Ser. No. 15/456,523, filed Mar. 11, 2017, entitled "Commercial Loading, Storage, Parking, and Vehicle-Servicing Spaces Retrofitted for Alternative Uses and Related Technology," which claims the benefit of prior U.S. Patent Application No. 62/310,045, filed Mar. 18, 2016.

This is a continuation of U.S. patent application Ser. No. 15/675,745, filed Aug. 13, 2017, entitled "Commercial Storefront Spaces Retrofitted for Alternative Uses and Related Technology," which claims the benefit of prior U.S. Patent Application No. 62/375,903, filed Aug. 17, 2016.

The foregoing applications (i.e., U.S. Patent Application Nos. 62/154,209, 62/222,750, 62/273,700, 62/310,045, 62/375,903, Ser. Nos. 15/140,785, 15/263,527, 15/390,731, 15/456,523, and 15/675,745) are incorporated herein by reference in their entireties. To the extent the foregoing applications or any other material incorporated herein by reference conflicts with the present disclosure, the present disclosure controls.

TECHNICAL FIELD

This disclosure is related to real estate technology.

BACKGROUND

Building conventional real estate is capital intensive and slow. Accordingly, short-term changes in demand for real estate do not conventionally lead to rapid changes in real estate capacity. For example, markets with high demand for real estate often suffer from insufficient real estate capacity for years before new conventional real estate projects are approved and completed. Peer-to-peer real estate networks mitigate this problem to some degree, but have other significant disadvantages, such as high transaction costs, inconsistent quality, and regulatory issues. Independent of these problems, valuable real estate in major urban areas is often unutilized or under utilized. These and other aspects of conventional real estate represent inefficiencies with the potential to be at least partially addressed by innovation.

BRIEF DESCRIPTION OF THE DRAWINGS

Many aspects of the present technology can be better understood with reference to the following drawings. The relative dimensions in the drawings may be to scale with respect to some embodiments of the present technology. With respect to other embodiments, the drawings may not be to scale. The drawings may also be enlarged arbitrarily. For clarity of illustration, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

FIG. 47 is an operational diagram showing spring intake and migration of capital within the network of hotels shown in FIGS. 44 and 45.

FIG. 48 is a operational diagram showing summer intake of capital within the network of hotels shown in FIGS. 44 and 45.

FIG. 49 is a operational diagram showing fall intake and migration of capital within the network of hotels shown in FIGS. 44 and 45.

FIG. 50 is a operational diagram showing winter intake of capital within the network of hotels shown in FIGS. 44 and 45.

FIG. 141 is a cross-sectional end profile view of the exterior wall component of the exterior enclosure of the real estate unit shown in FIG. 129 taken along the line 141-141 in FIG. 138.

FIG. 142 is an enlarged view of a portion of FIG. 141.

FIG. 143 is an enlarged view of a third portion of FIG. 129.

FIGS. 144 and 145 are, respectively, a cross-sectional exterior side profile view and a cross-sectional interior side profile view of a portion of the real estate unit shown in FIG. 129 corresponding to the third portion of FIG. 129 shown in FIG. 143.

FIG. 146 is an enlarged view of a portion of FIG. 145.

FIG. 147 is side profile view of an interior wall component of a compartmentalizing assembly of the real estate unit shown in FIG. 129.

FIG. 148 is a cross-sectional top plan view of the interior wall component of the compartmentalizing assembly of the real estate unit shown in FIG. 129 taken along the line 148-148 in FIG. 147.

FIG. 149 is a cross-sectional end profile view of the interior wall component of the compartmentalizing assembly of the real estate unit shown in FIG. 129 taken along the line 149-149 in FIG. 147.

FIG. 150 is an enlarged view of a portion of FIG. 149.

FIG. 151 is a cross-sectional top plan view of a real estate unit in accordance with another embodiment of the present technology including the interior space within the commercial building shown in FIG. 126 taken along the line 151-151 in FIG. 126 with the interior space in the second state.

FIG. 152 is an enlarged view of a portion of FIG. 151.

FIG. 153 is a cross-sectional exterior side profile view of a portion of the real estate unit shown in FIG. 151 corresponding to the portion of FIG. 151 shown in FIG. 152.

Figure 129:
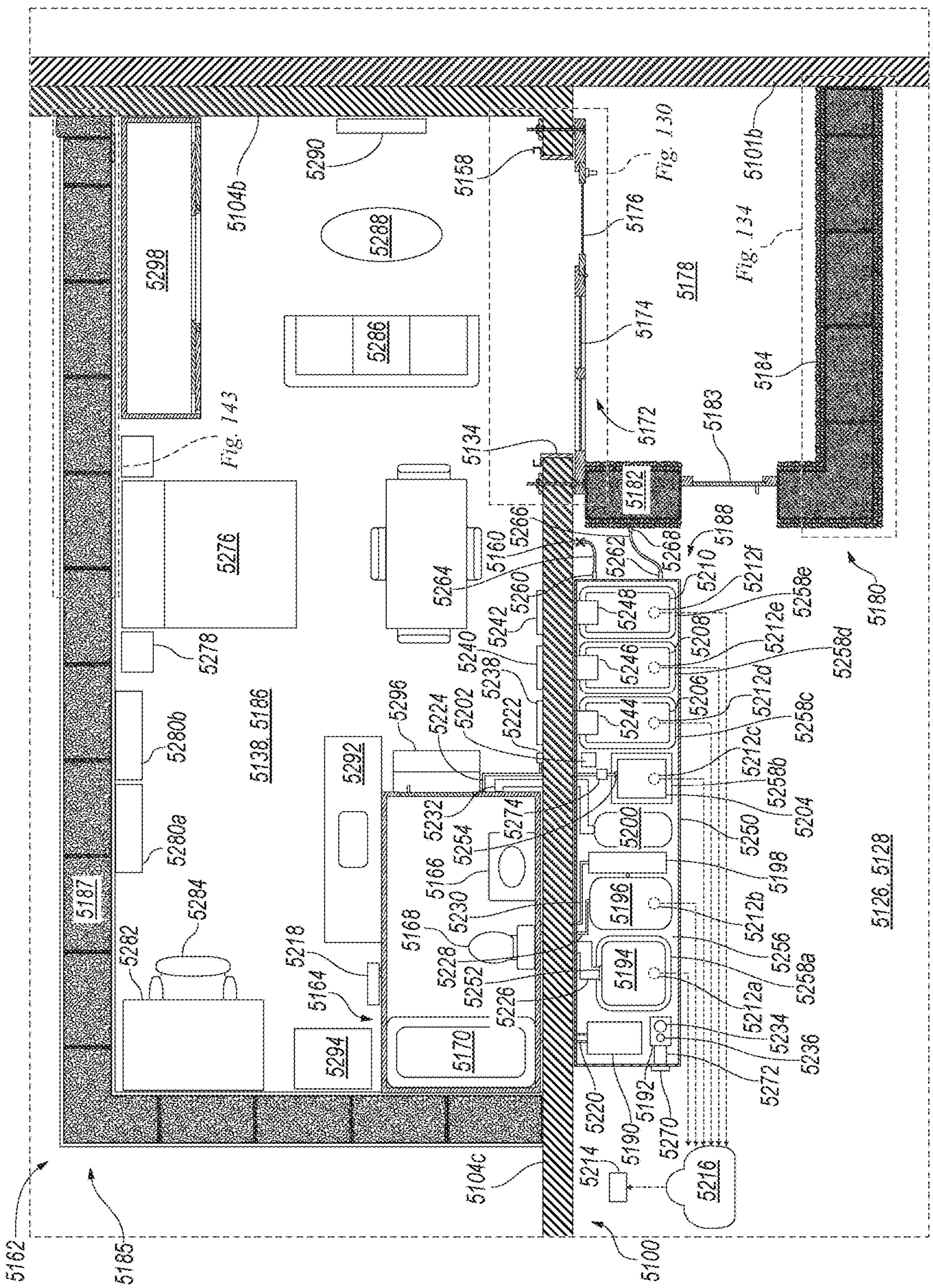
FIG. 129 is a cross-sectional top plan view of a portion of the commercial building shown in FIG. 126 corresponding to the portion of FIG. 127 shown in FIG. 128 and showing a real estate unit in accordance with an embodiment of the present technology including the interior space within the commercial building in a second state.

FIGS. 154, 155, 156 and 157 are, respectively, a first side profile view, an opposite second side profile view, a first end profile view, and an opposite second end profile view of a bathroom of the real estate unit shown in FIG. 129.

Figure 154:
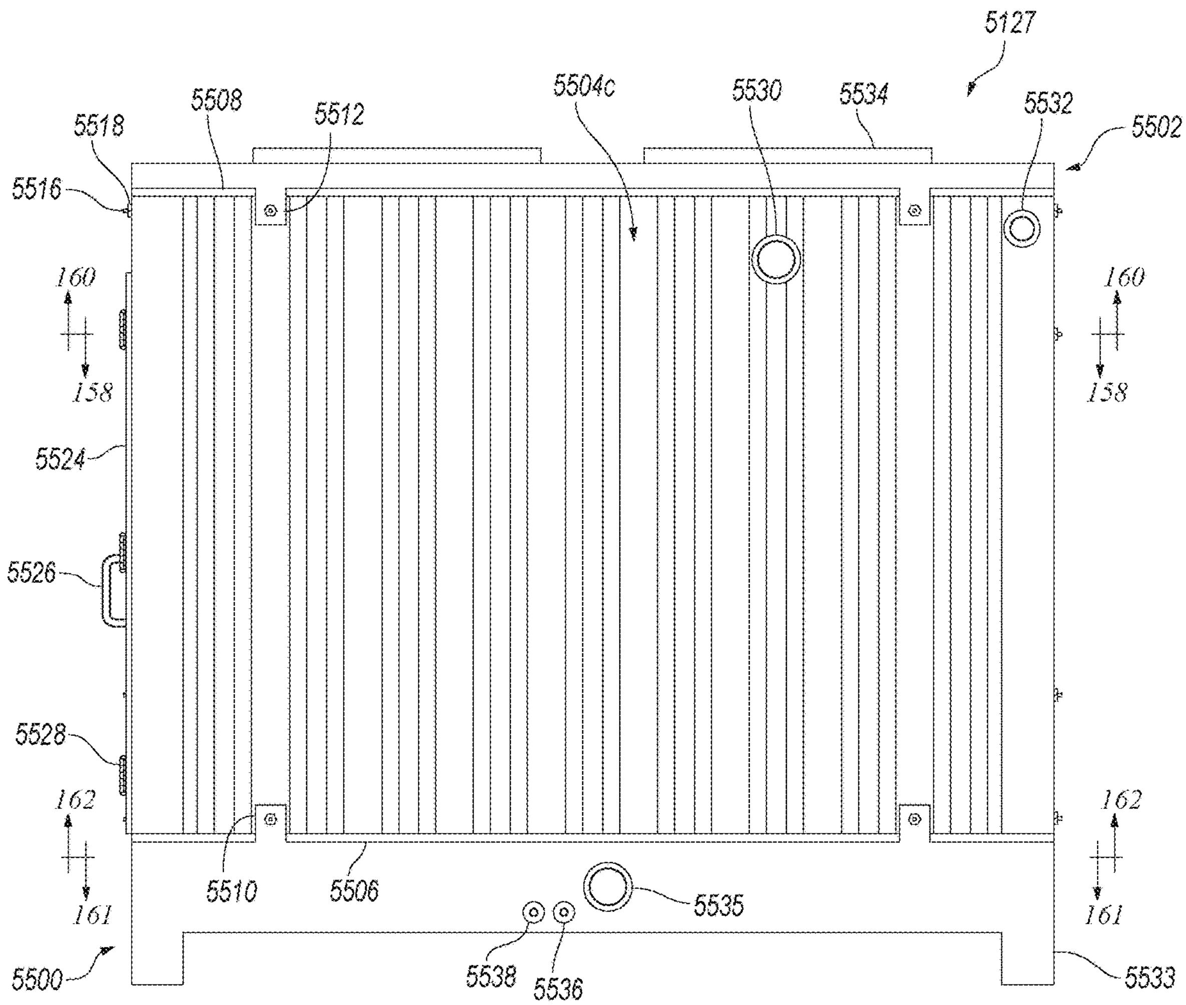
Figure 155:
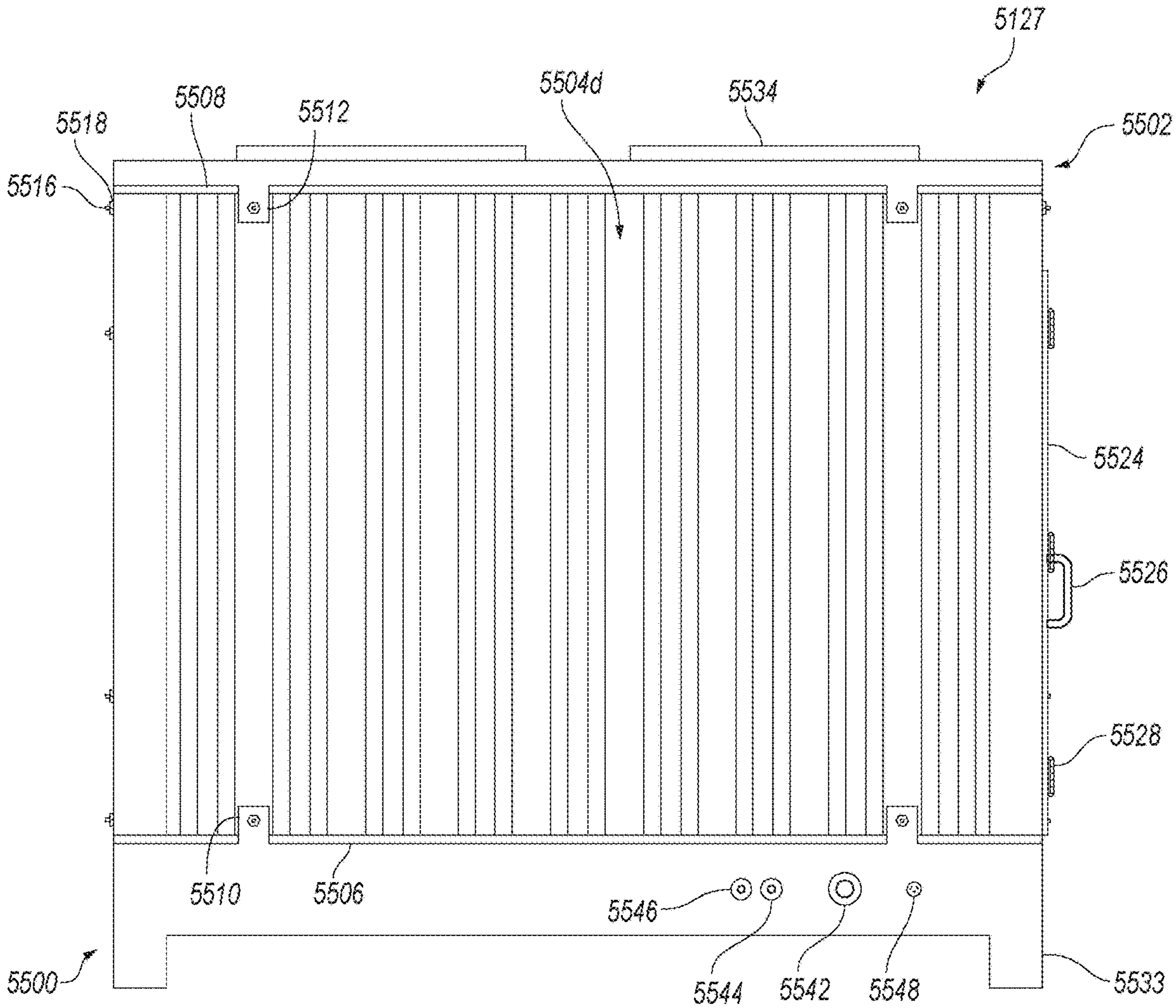
Figure 156:
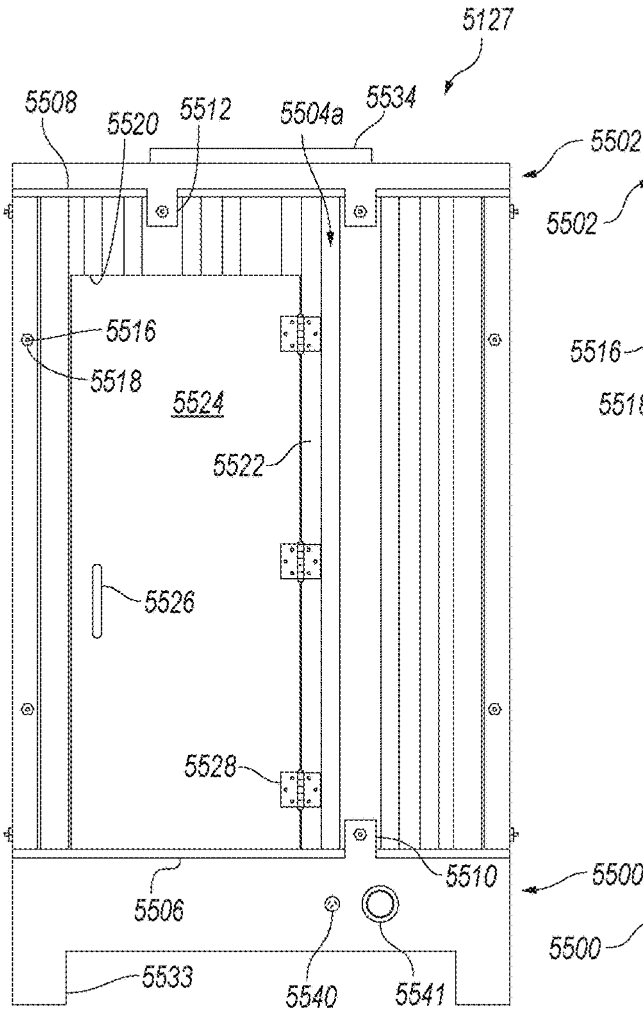
Figure 157:
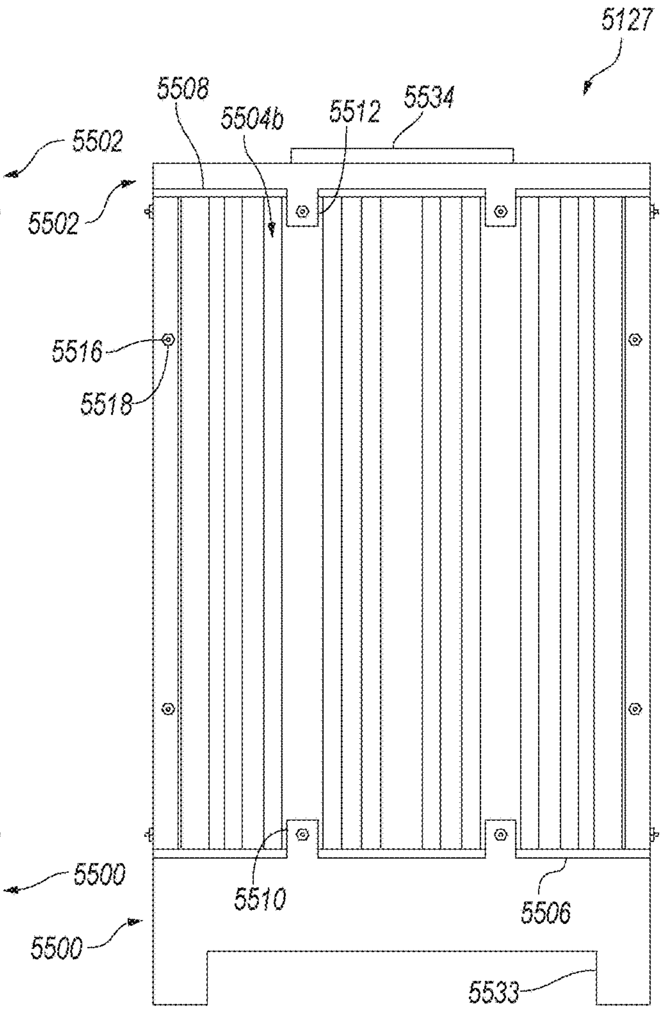
Figure 158:
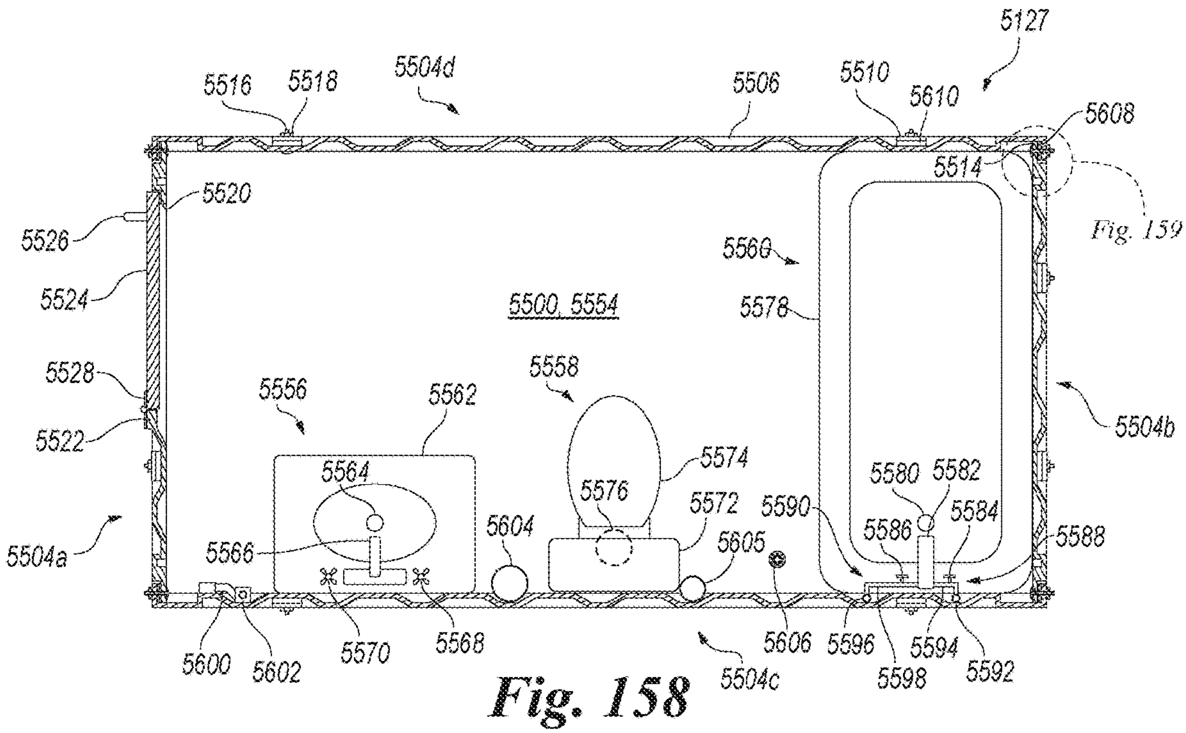

FIG. 158 is a cross-sectional top plan view of the bathroom of the real estate unit shown in FIG. 129 taken along the line 158-158 in FIG. 154.

Figure 159:
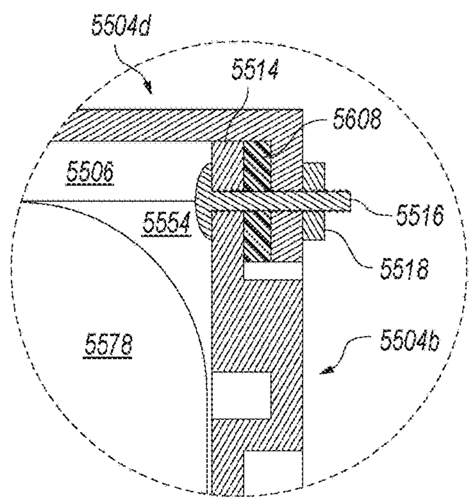

FIG. 159 is an enlarged view of a portion of FIG. 158.

Figure 160:
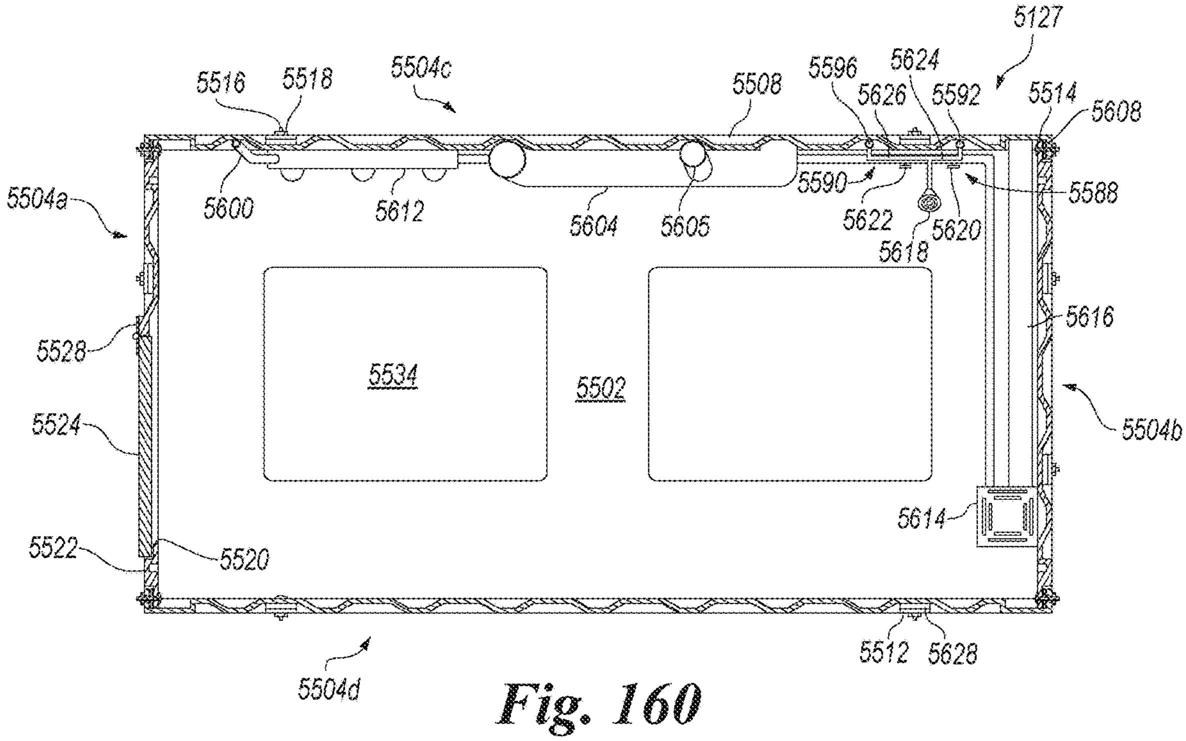

FIG. 160 is a cross-sectional bottom plan view of the bathroom of the real estate unit shown in FIG. 129 taken along the line 160-160 in FIG. 154.

Figure 161:
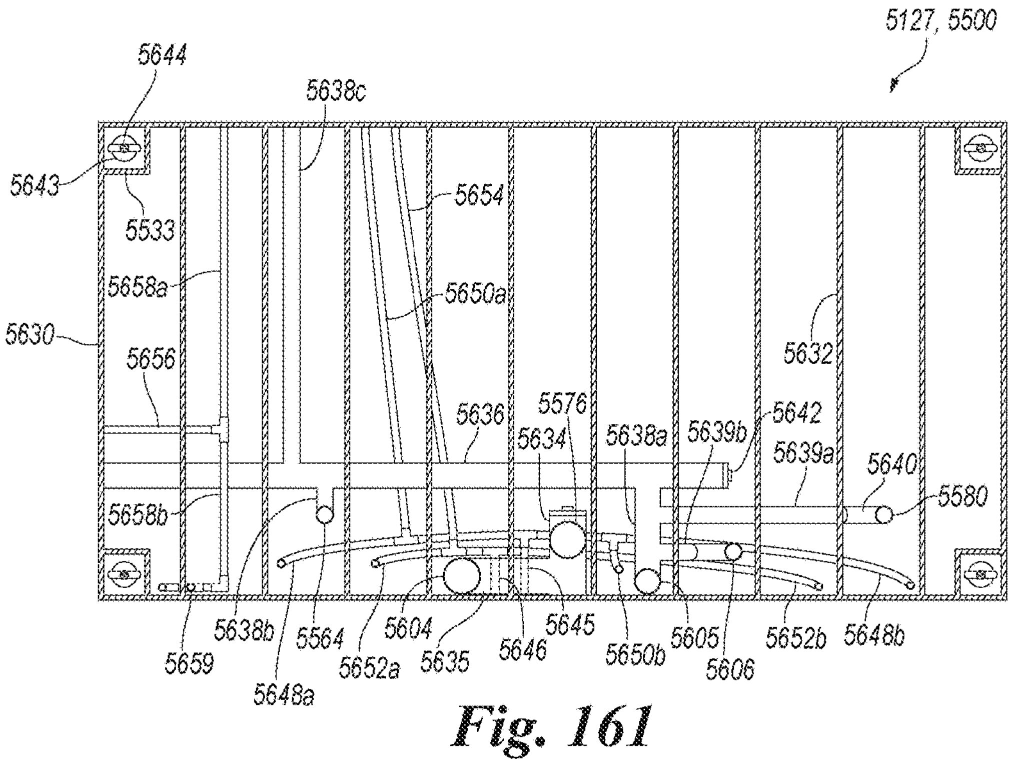

FIG. 161 is a cross-sectional top plan view of the bathroom of the real estate unit shown in FIG. 129 taken along the line 161-161 in FIG. 154.

Figure 162:
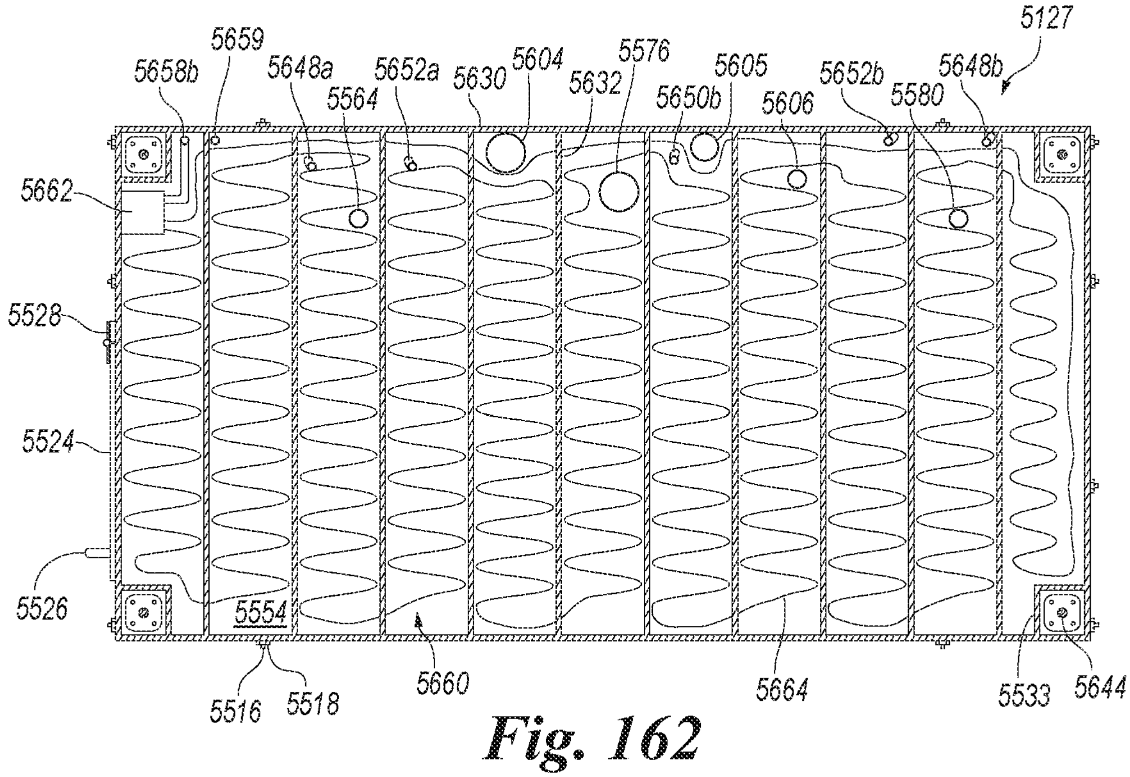

FIG. 162 is a cross-sectional bottom plan view of the bathroom of the real estate unit shown in FIG. 129 taken along the line 162-162 in FIG. 154.

Figure 126:
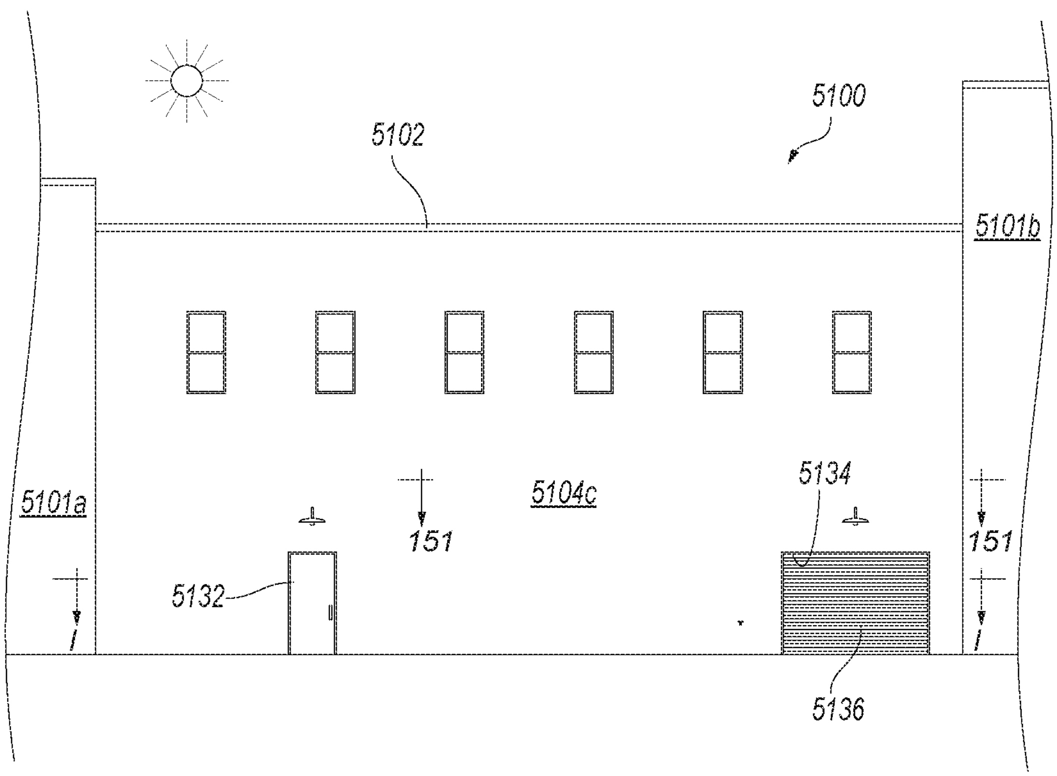
FIG. 126 is a back profile view of a commercial building.

FIGS. 163-167 are, respectively, cross-sectional top plan views of real estate units in accordance with additional embodiments of the present technology including the interior space within the commercial building shown in FIG. 126 taken along the line I-I in FIG. 126 with the interior space in the second state.

Figure 168:
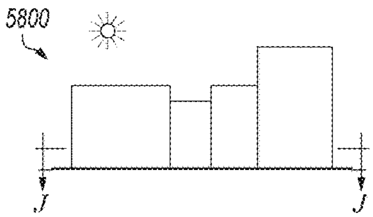

FIG. 168 is a front profile view of a block of an urban area.

Figure 169:
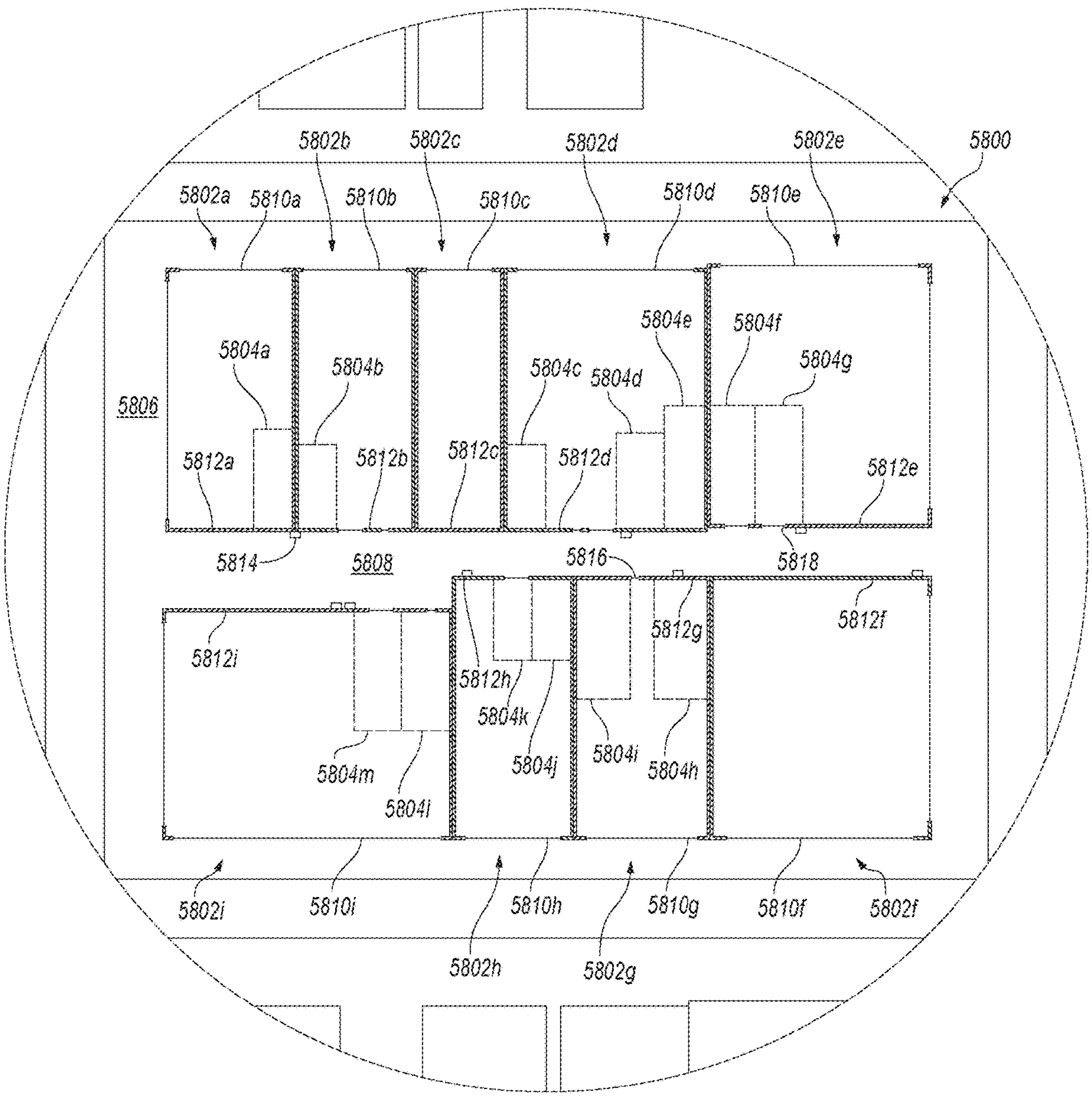

FIG. 169 is a cross-sectional top plan view of commercial buildings at the block shown in FIG. 168 taken along the line J-J in FIG. 168 with interior spaces within the commercial buildings in a first state.

Figure 170:
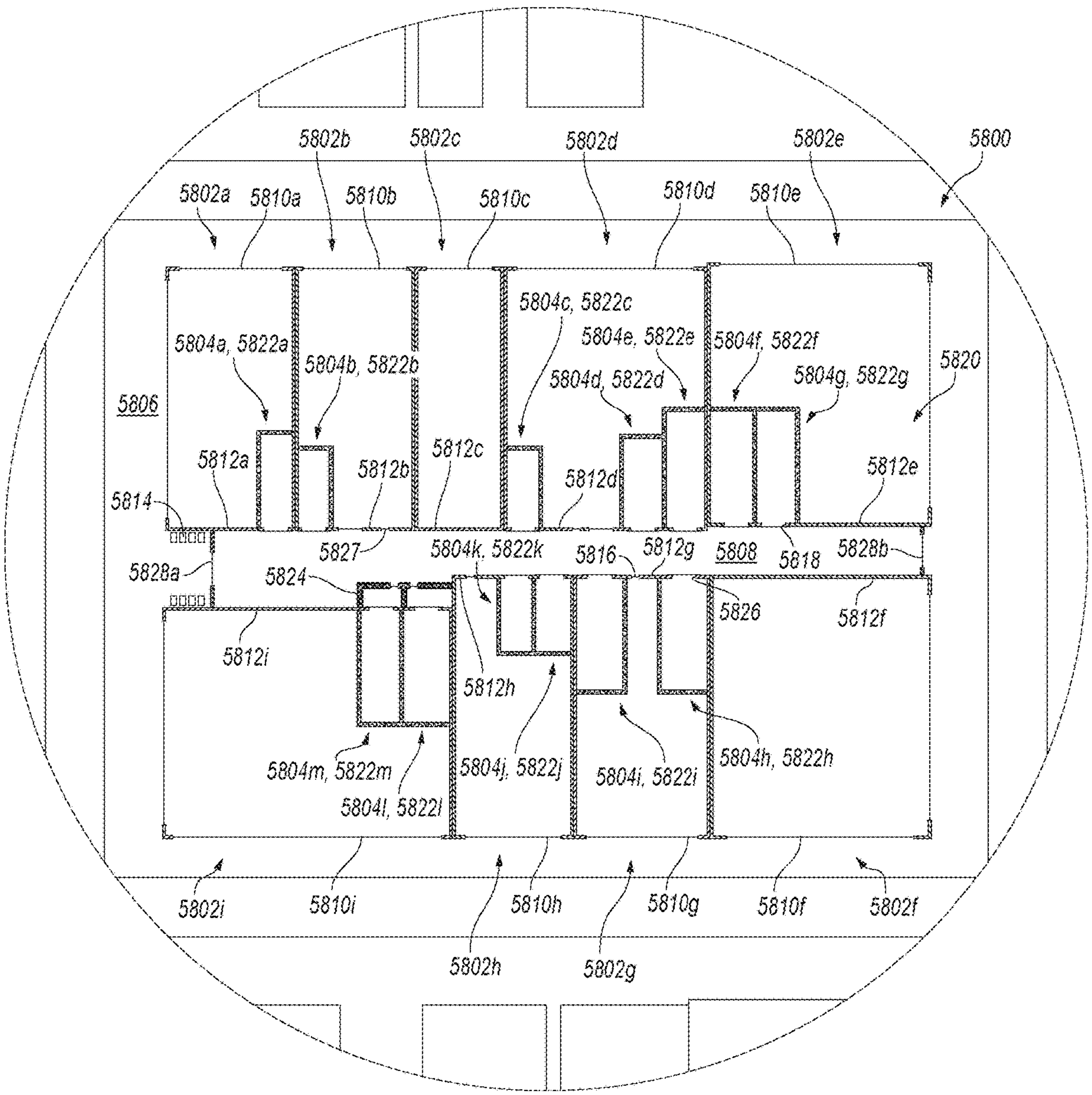

FIG. 170 is a cross-sectional top plan view of the commercial buildings shown in FIG. 168 taken along the line J-J in FIG. 168 and showing a real estate complex including real estate units in accordance with an embodiment of the present technology respectively including the interior spaces within the commercial buildings in the second state.

Figure 171:
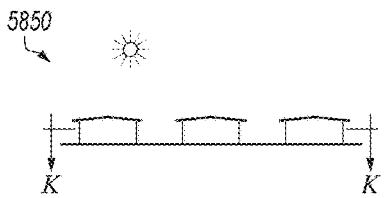

FIG. 171 is a front profile view of a mini-storage complex.

Figure 172:
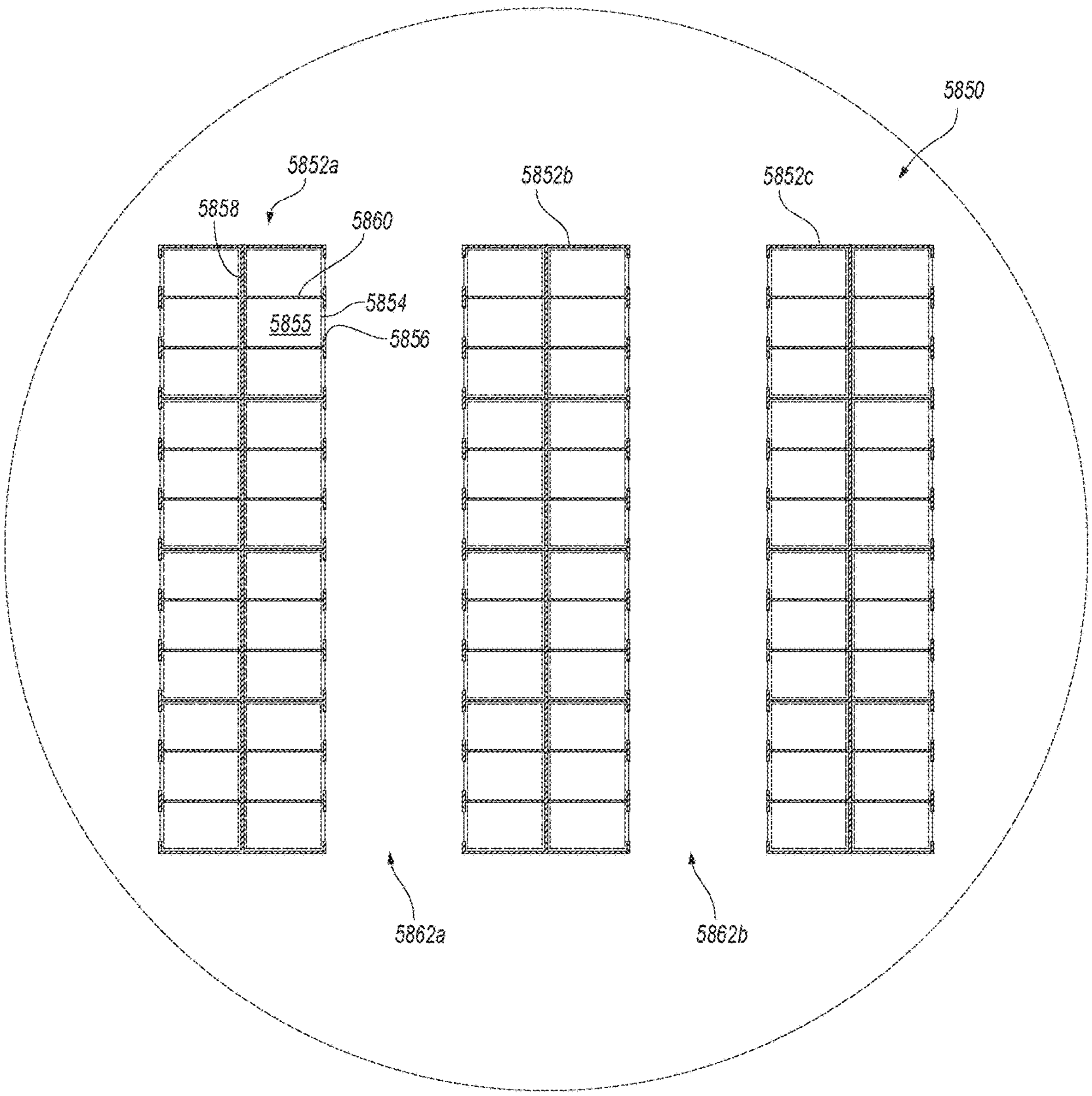

FIG. 172 is a cross-sectional top plan view of mini-storage buildings within the mini-storage complex shown in FIG. 171 taken along the line K-K in FIG. 171 with interior spaces within the mini-storage buildings in a first state.

Figure 173:
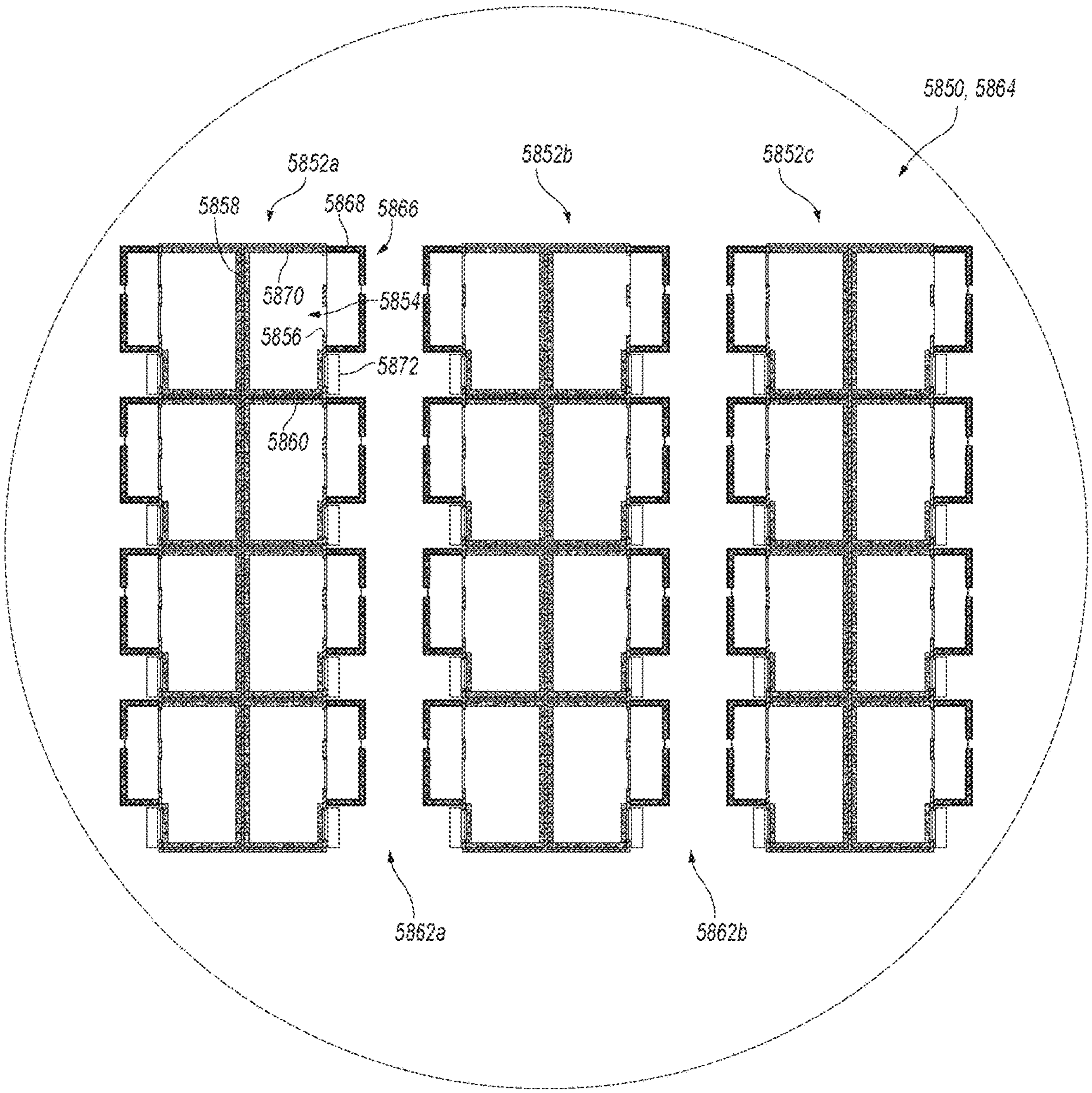

FIG. 173 is a cross-sectional top plan view of the mini-storage buildings shown in FIG. 172 taken along the line K-K in FIG. 171 and showing a real estate complex including real estate units in accordance with an embodiment of the present technology respectively including the interior spaces within the mini-storage buildings in the second state.

Figure 174:
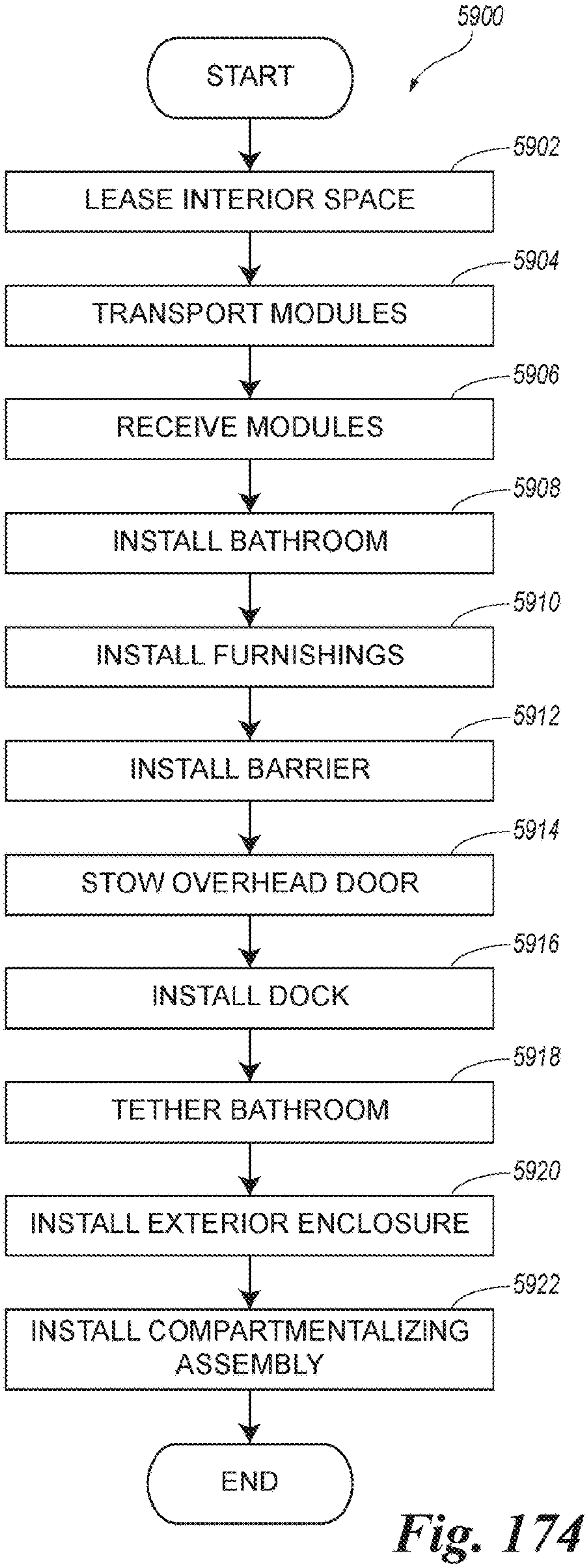

FIG. 174 is a block diagram illustrating a method for making a real estate unit in accordance with an embodiment of the present technology.

Figure 175:
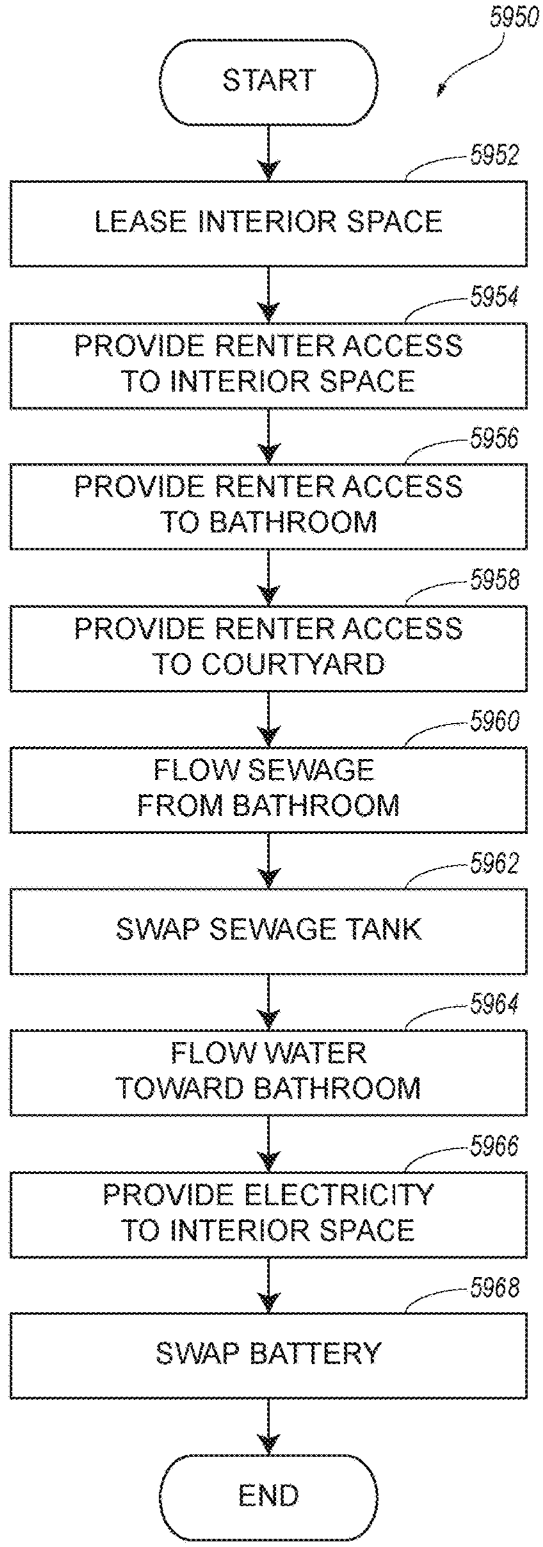

FIG. 175 is a block diagram illustrating a method for operating a real estate unit in accordance with an embodiment of the present technology.

Figure 176:
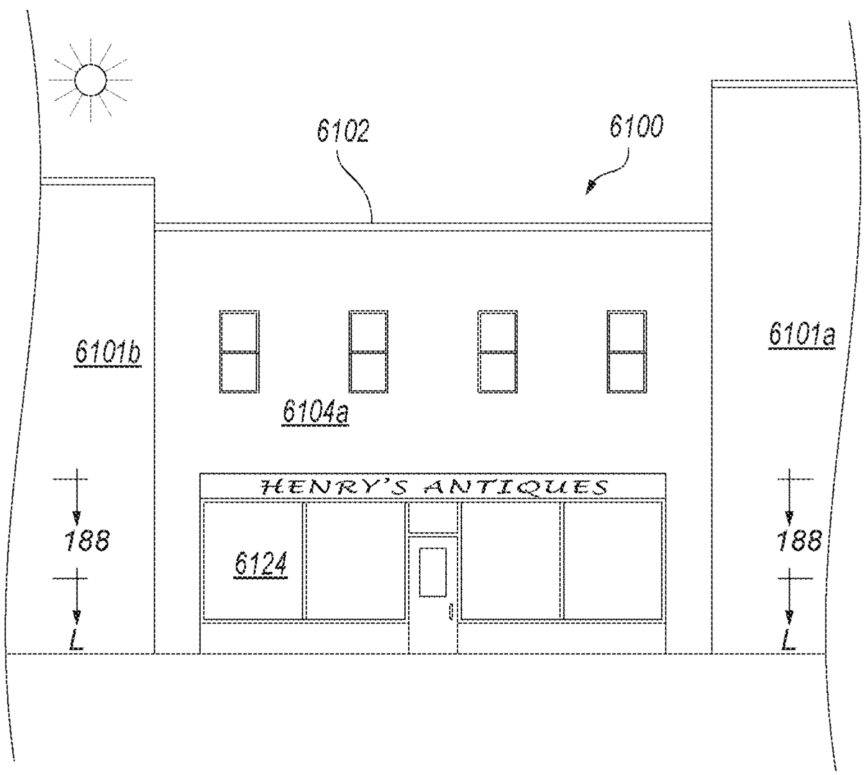

FIG. 176 is a front profile view of a commercial building.

Figure 177:
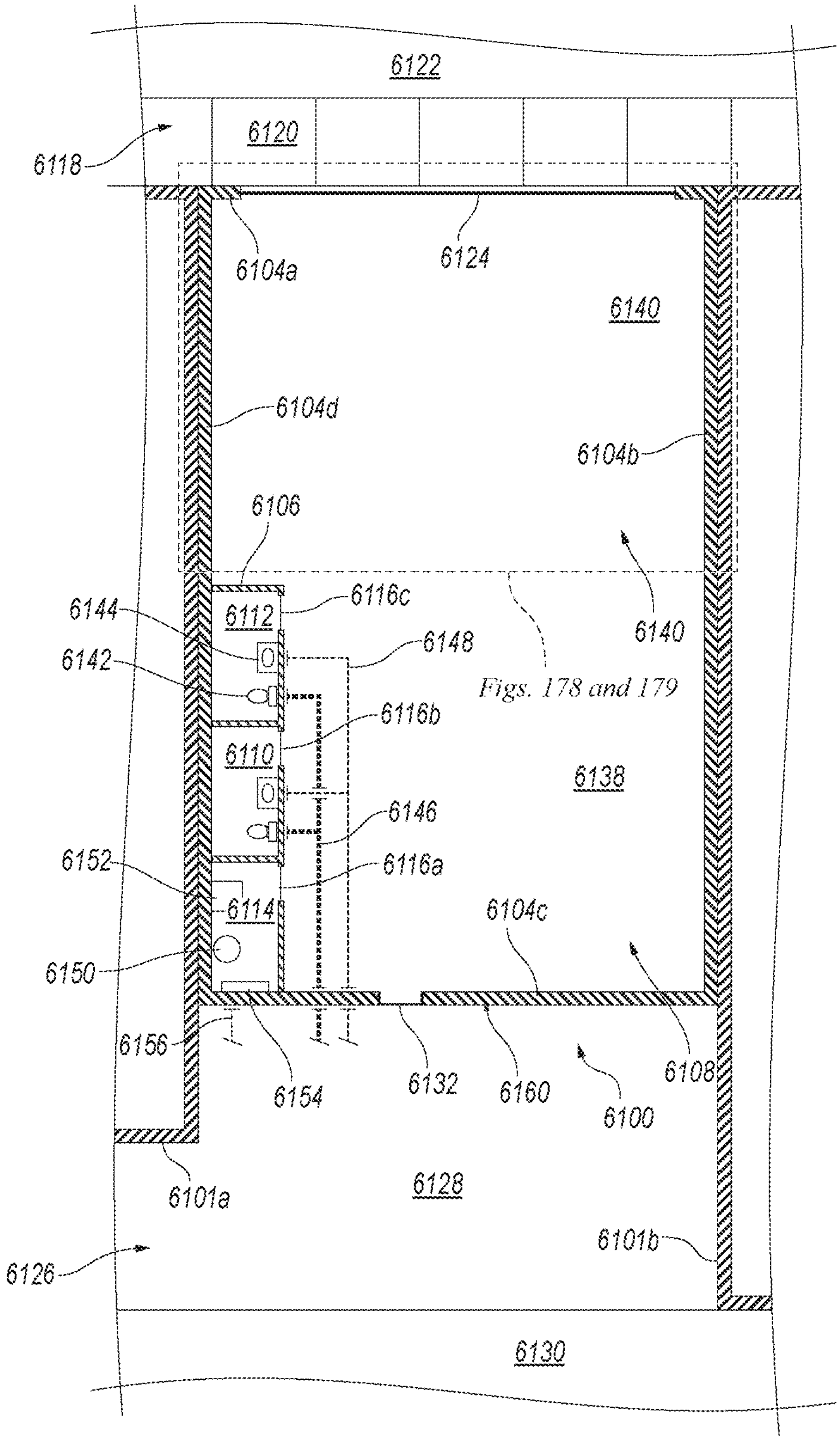

FIG. 177 is a cross-sectional top plan view of the commercial building shown in FIG. 176 taken along the line L-L in FIG. 176 with an interior space within the commercial building in a first state.

Figure 178:
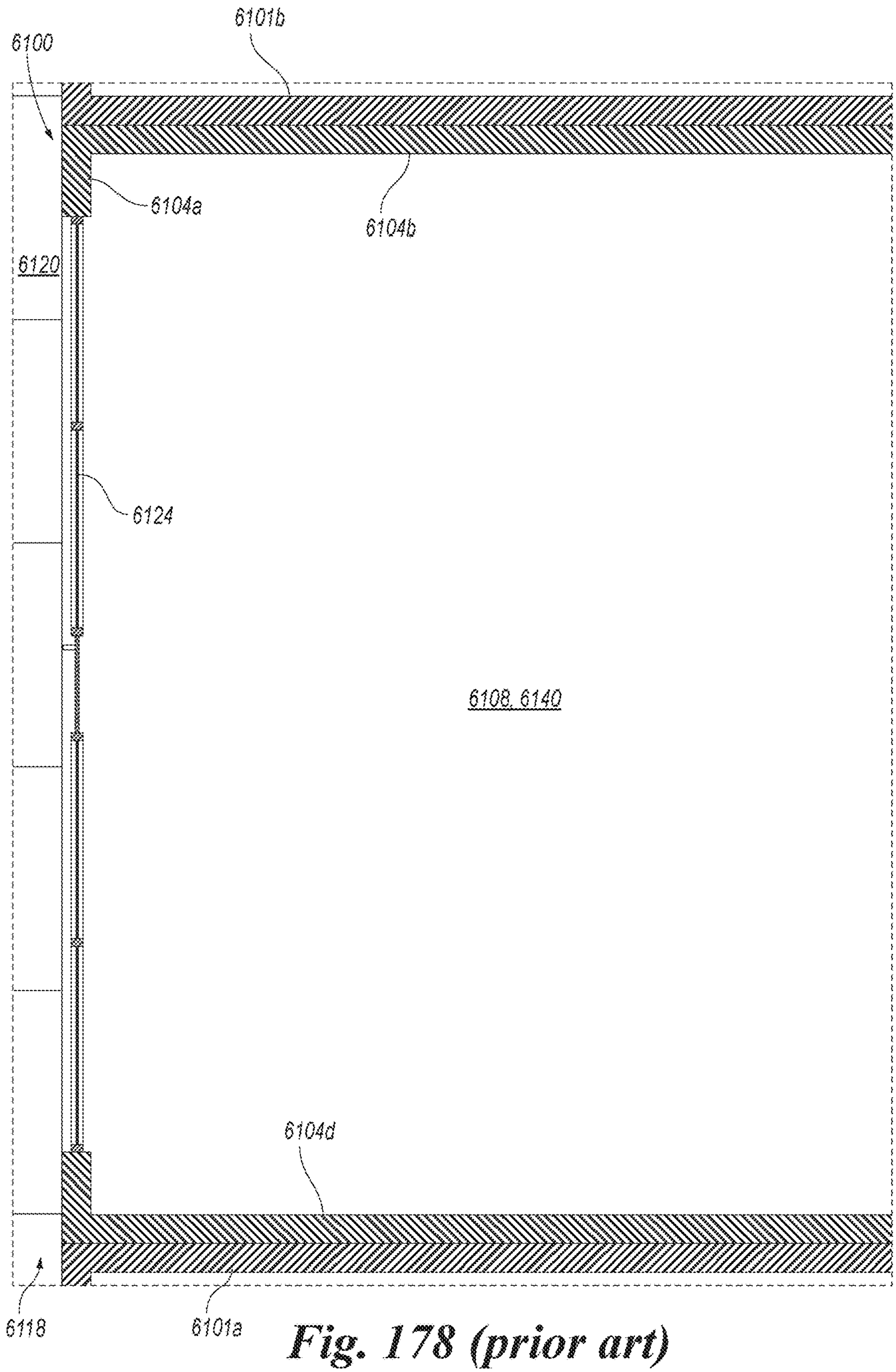

FIG. 178 is an enlarged view of a portion of FIG. 177.

Figure 179:
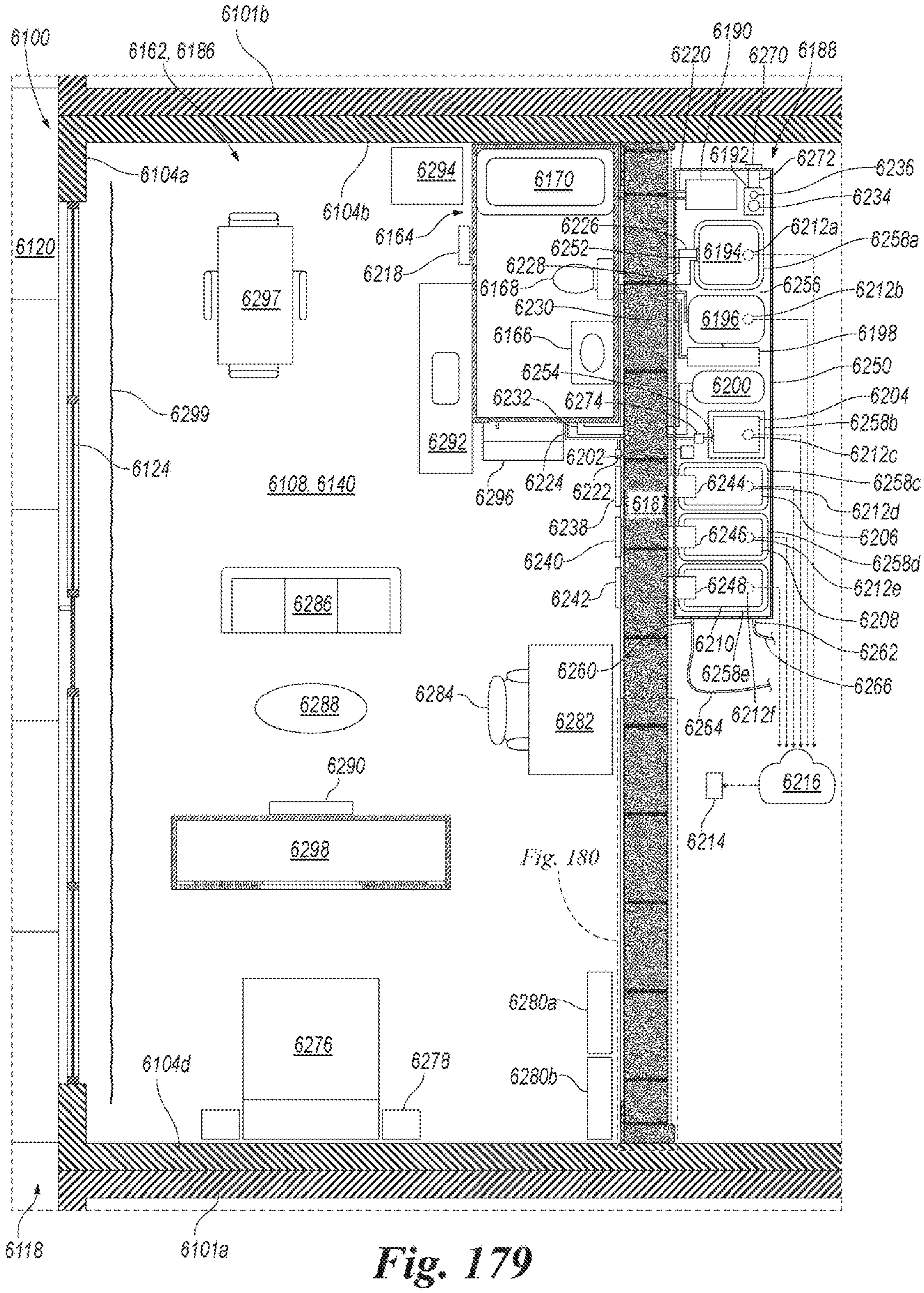

FIG. 179 is a cross-sectional top plan view of a portion of the commercial building shown in FIG. 176 corresponding to the portion of FIG. 177 shown in FIG. 178 and showing a real estate unit in accordance with an embodiment of the present technology including the interior space within the commercial building in a second state.

Figure 180:
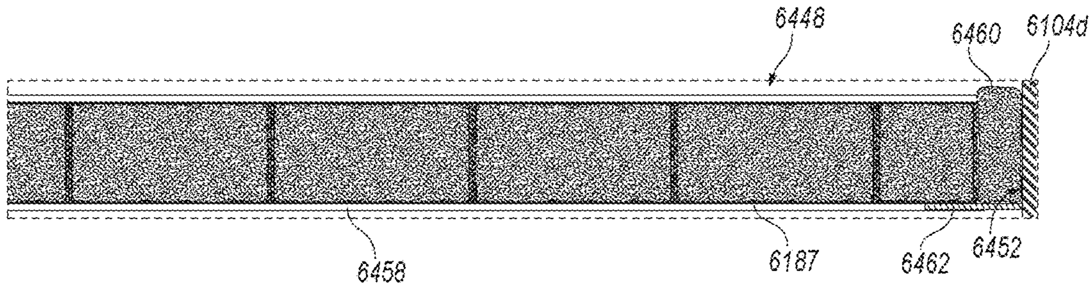

FIG. 180 is an enlarged view of a portion of FIG. 179.

Figure 181:
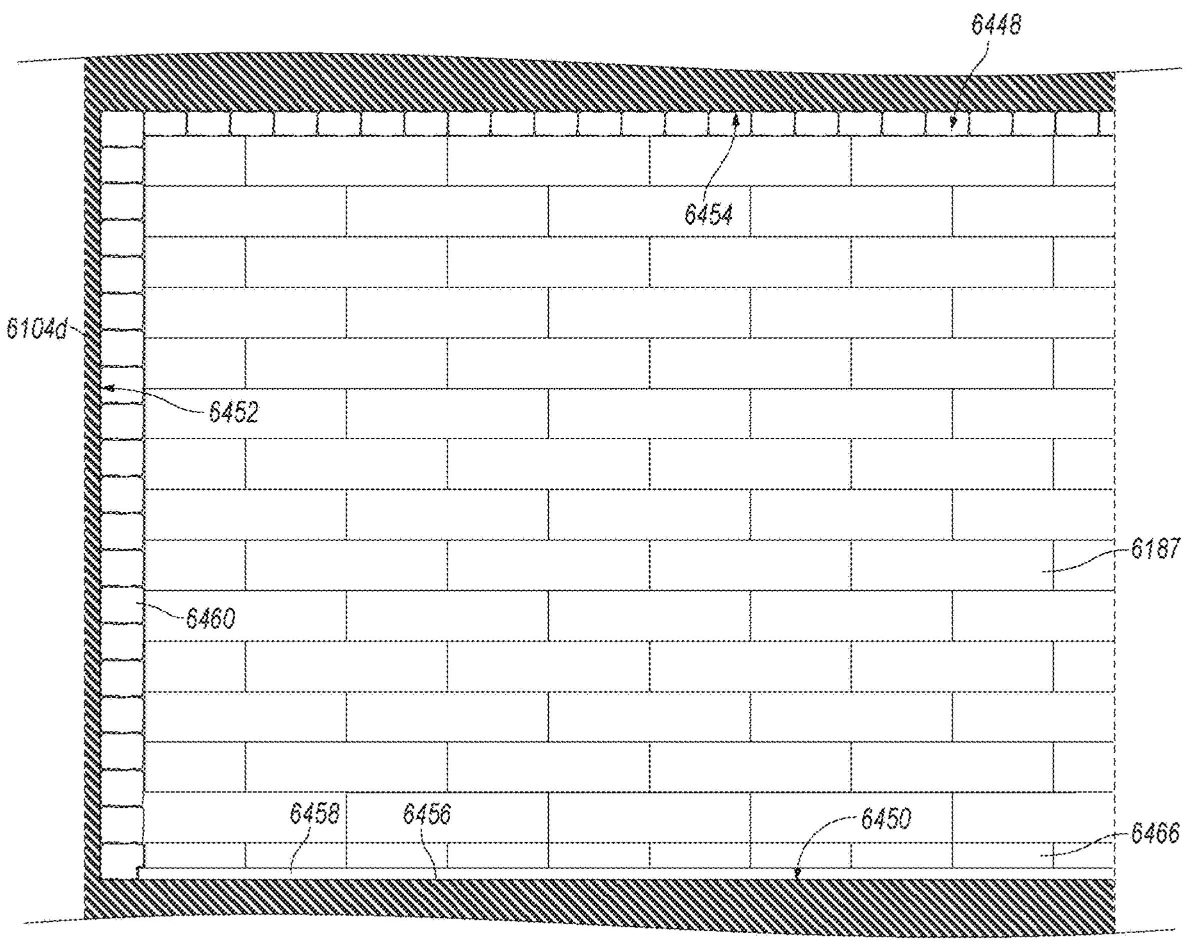
Figure 182:
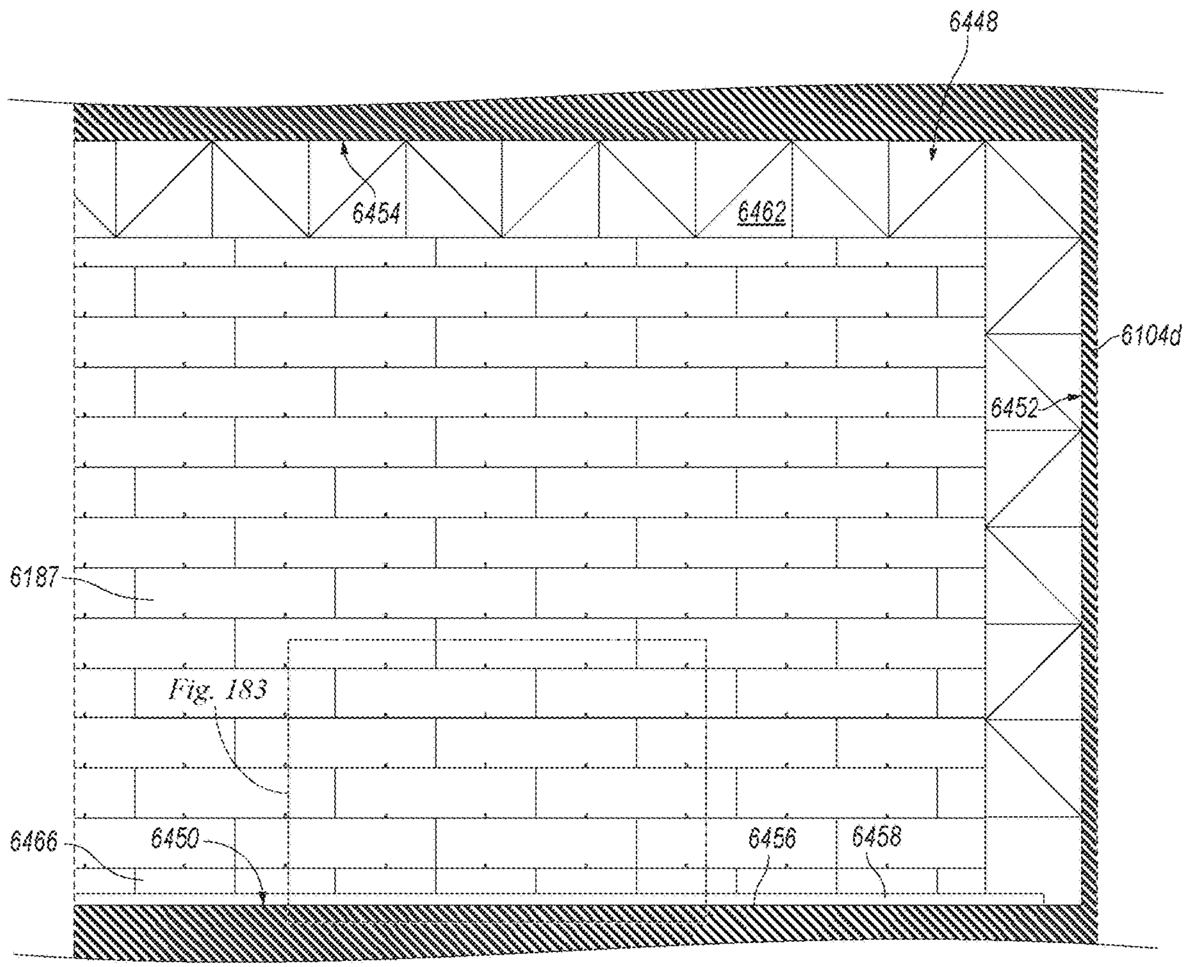

FIGS. 181 and 182 are, respectively, a cross-sectional exterior side profile view and a cross-sectional interior side profile view of a portion of the real estate unit shown in FIG. 179 corresponding to the portion of FIG. 179 shown in FIG. 180.

Figure 183:
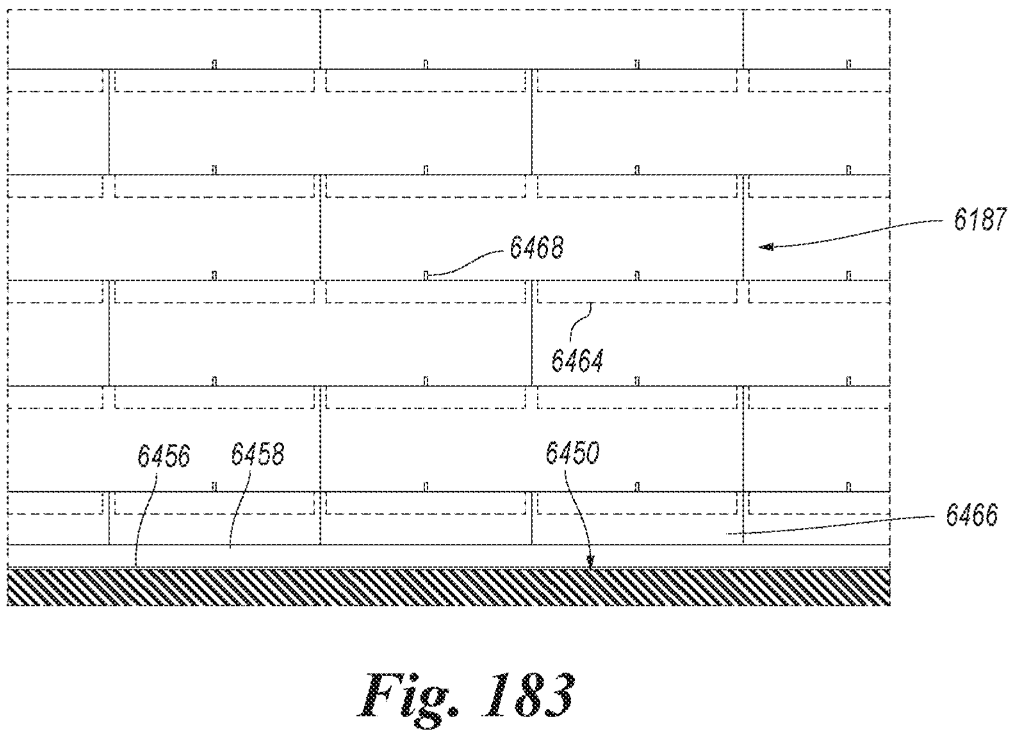

FIG. 183 is an enlarged view of a portion of FIG. 182.

Figure 184:
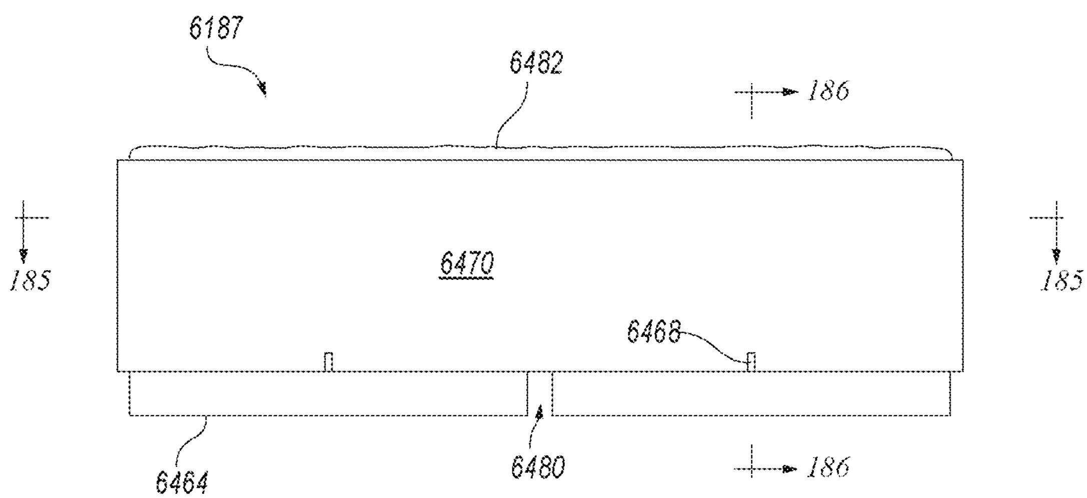

FIG. 184 is side profile view of a wall component of the real estate unit shown in FIG. 179.

Figure 185:
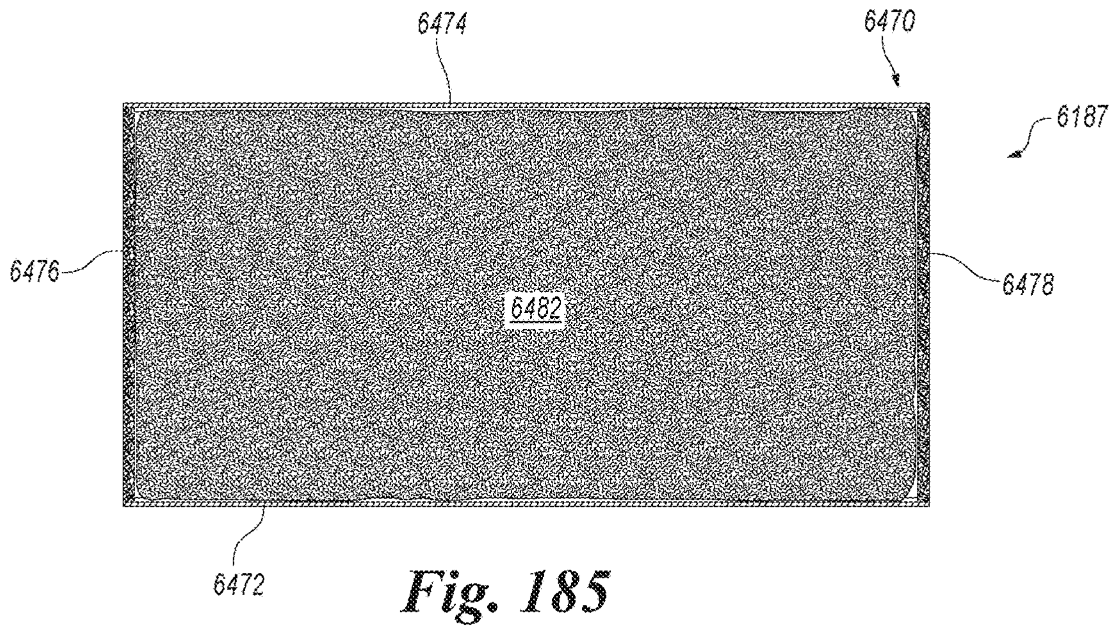

FIG. 185 is a cross-sectional top plan view of the wall component of the real estate unit shown in FIG. 179 taken along the line 185-185 in FIG. 184.

Figure 186:
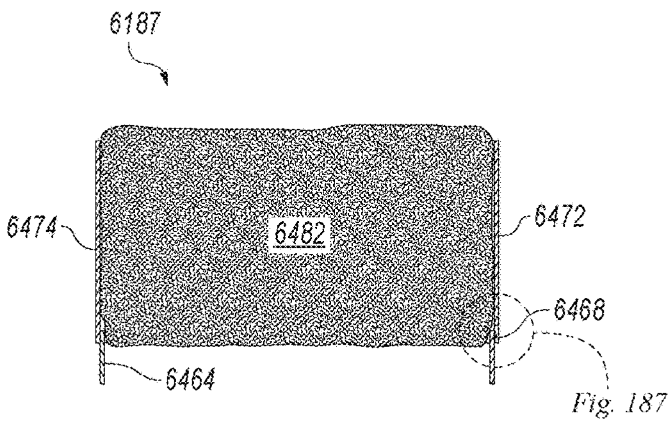

FIG. 186 is a cross-sectional end profile view of the wall component of the real estate unit shown in FIG. 179 taken along the line 186-186 in FIG. 184.

Figure 187:
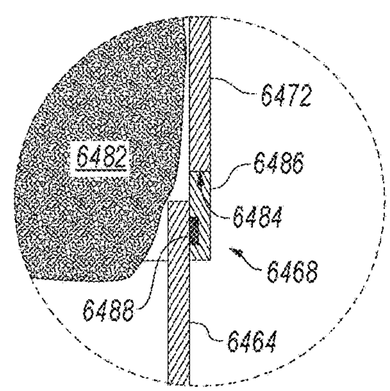

FIG. 187 is an enlarged view of a portion of FIG. 186.

Figure 188:
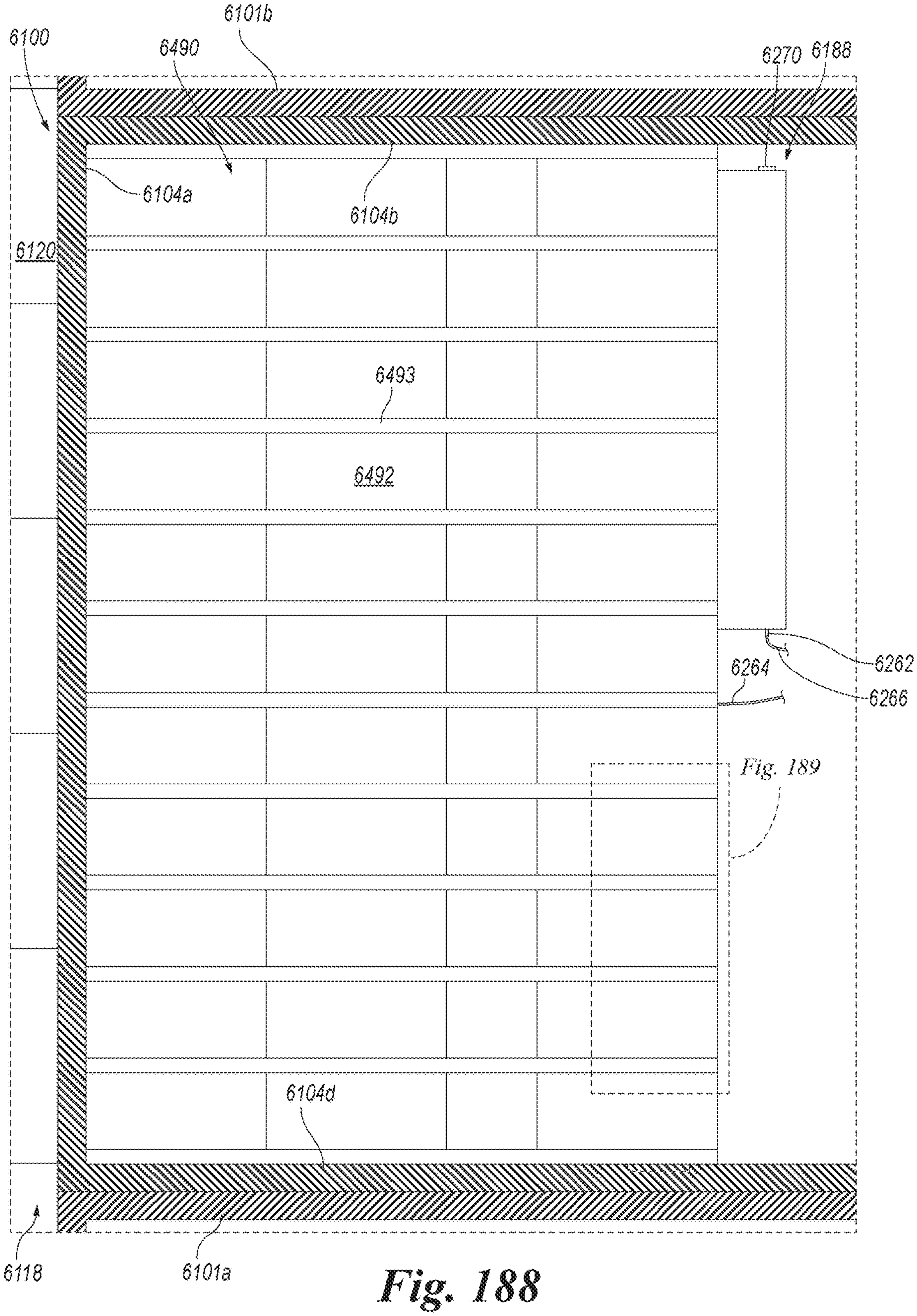

FIG. 188 is a cross-sectional top plan view of a real estate unit in accordance with another embodiment of the present technology including the interior space within the commercial building shown in FIG. 176 taken along the line 188-188 in FIG. 176 with the interior space in the second state.

Figure 189:
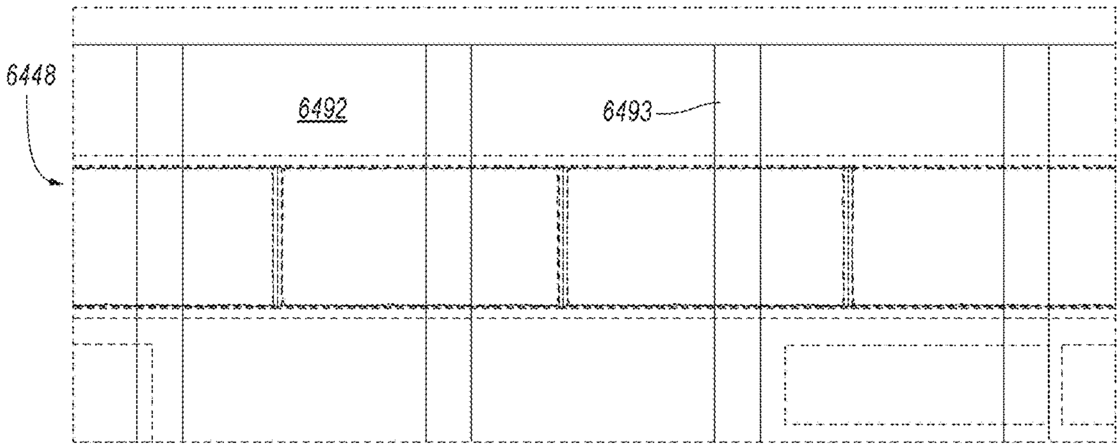

FIG. 189 is an enlarged view of a portion of FIG. 188.

Figure 190:
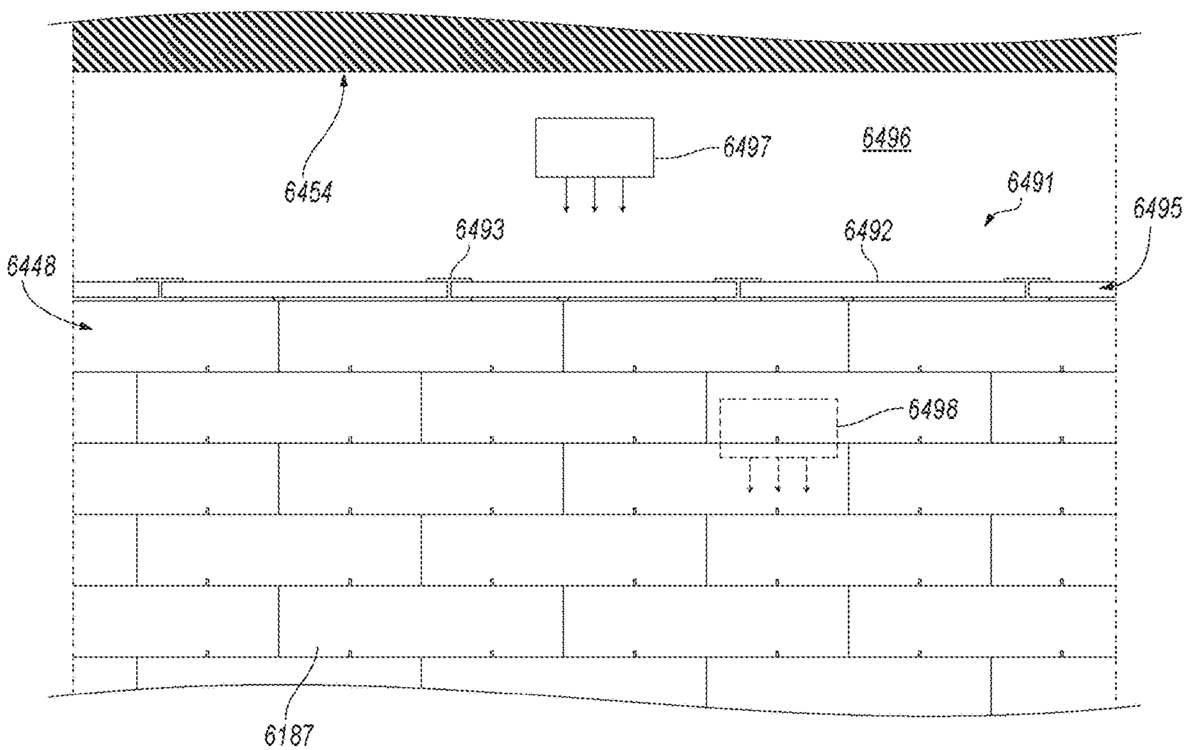

FIG. 190 is a cross-sectional exterior side profile view of a portion of the real estate unit shown in FIG. 188 corresponding to the portion of FIG. 188 shown in FIG. 189.

FIGS. 191, 192, 193 and 194 are, respectively, a first side profile view, an opposite second side profile view, a first end profile view, and an opposite second end profile view of a bathroom of the real estate unit shown in FIG. 179.

Figure 191:
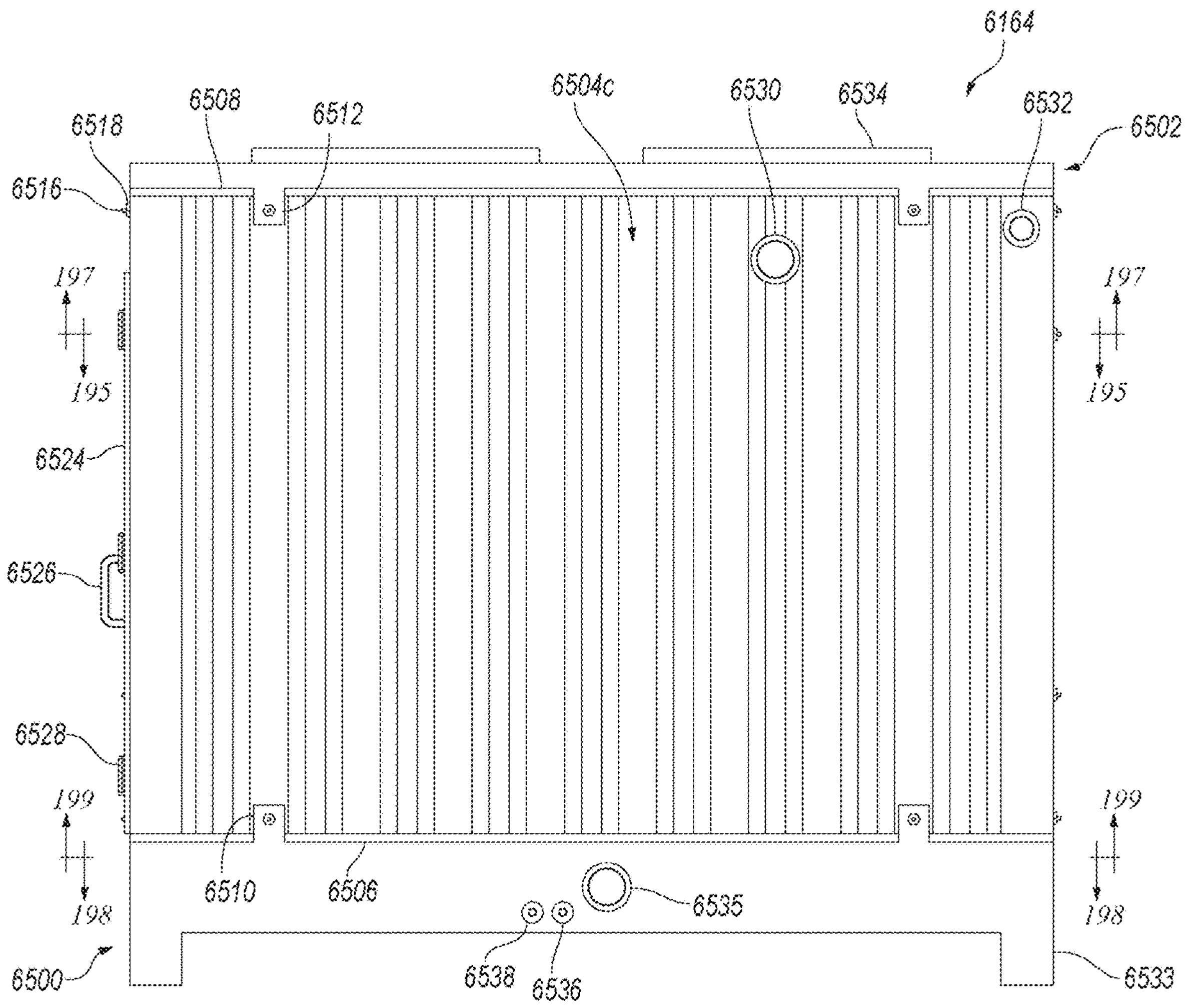
Figure 192:
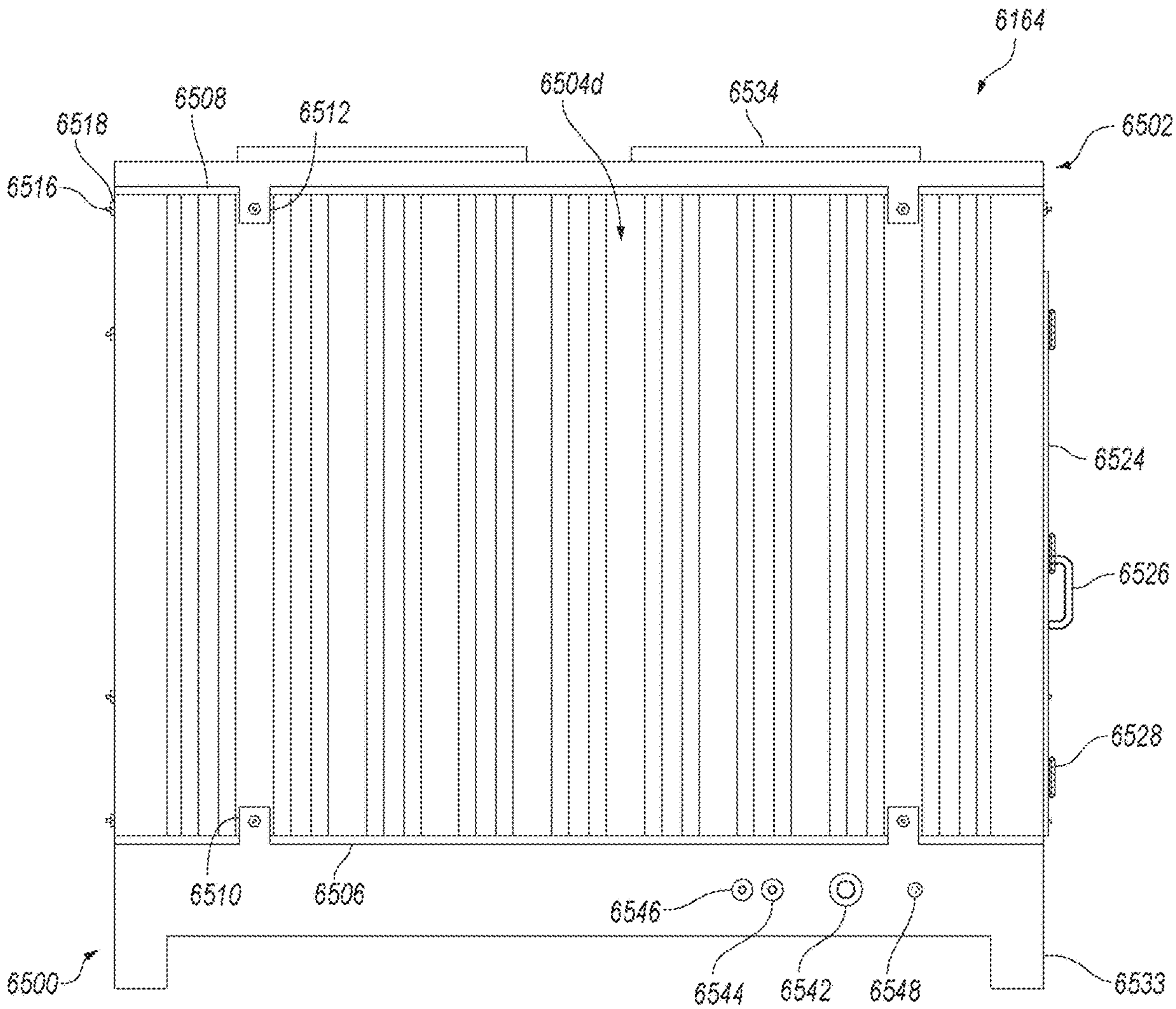
Figure 193:
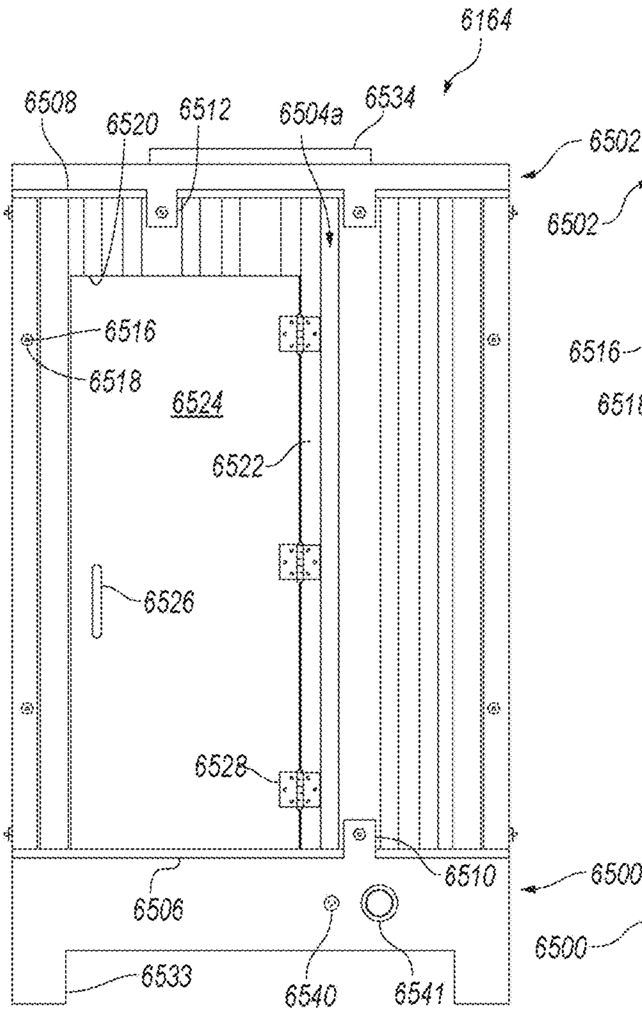
Figure 194:
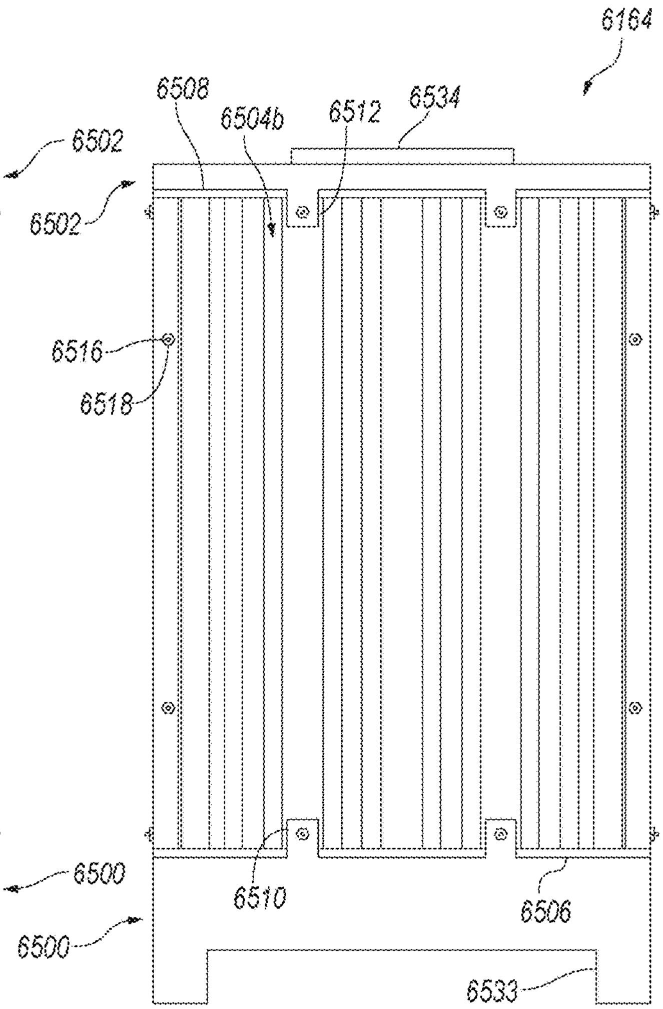
Figure 195:
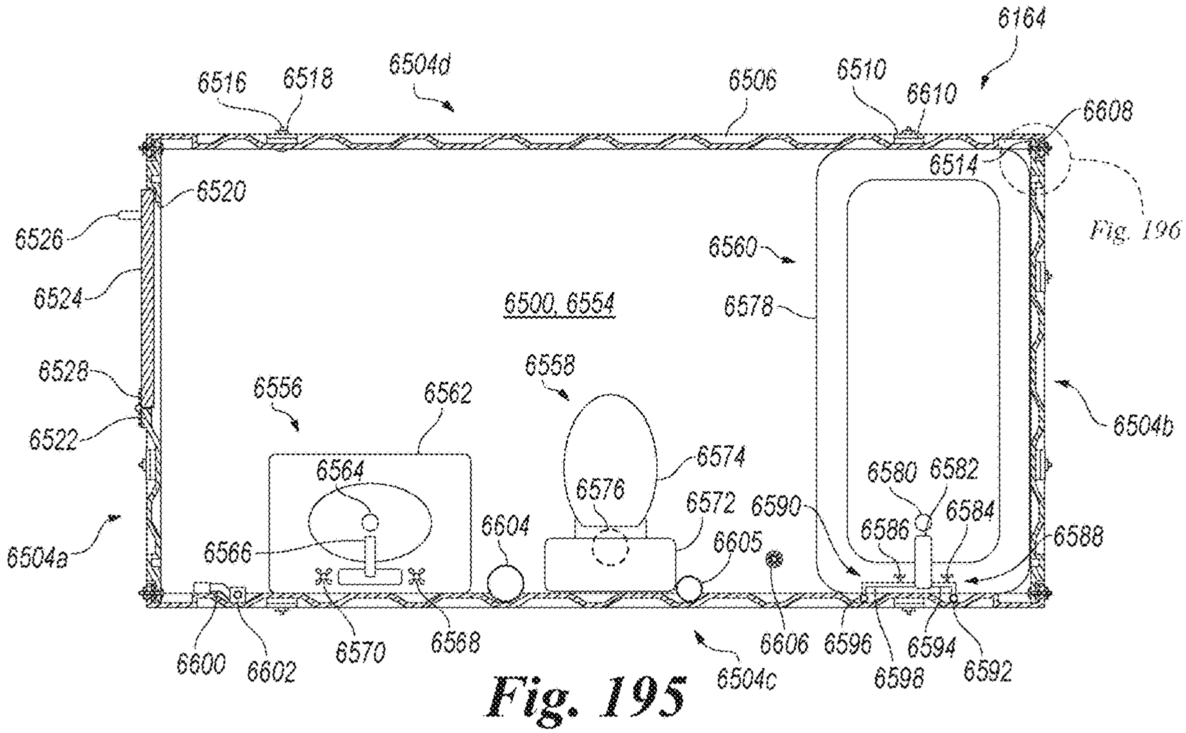

FIG. 195 is a cross-sectional top plan view of the bathroom of the real estate unit shown in FIG. 179 taken along the line 195-195 in FIG. 191.

Figure 196:
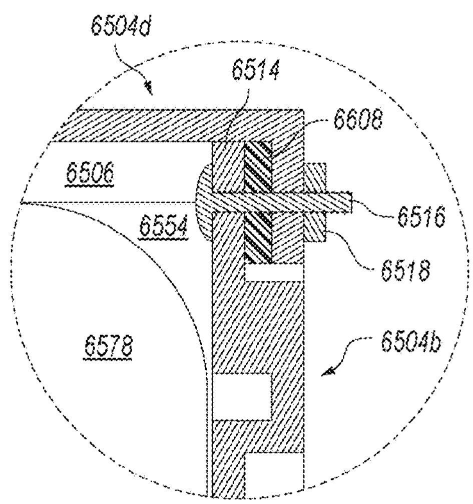

FIG. 196 is an enlarged view of a portion of FIG. 195.

Figure 197:
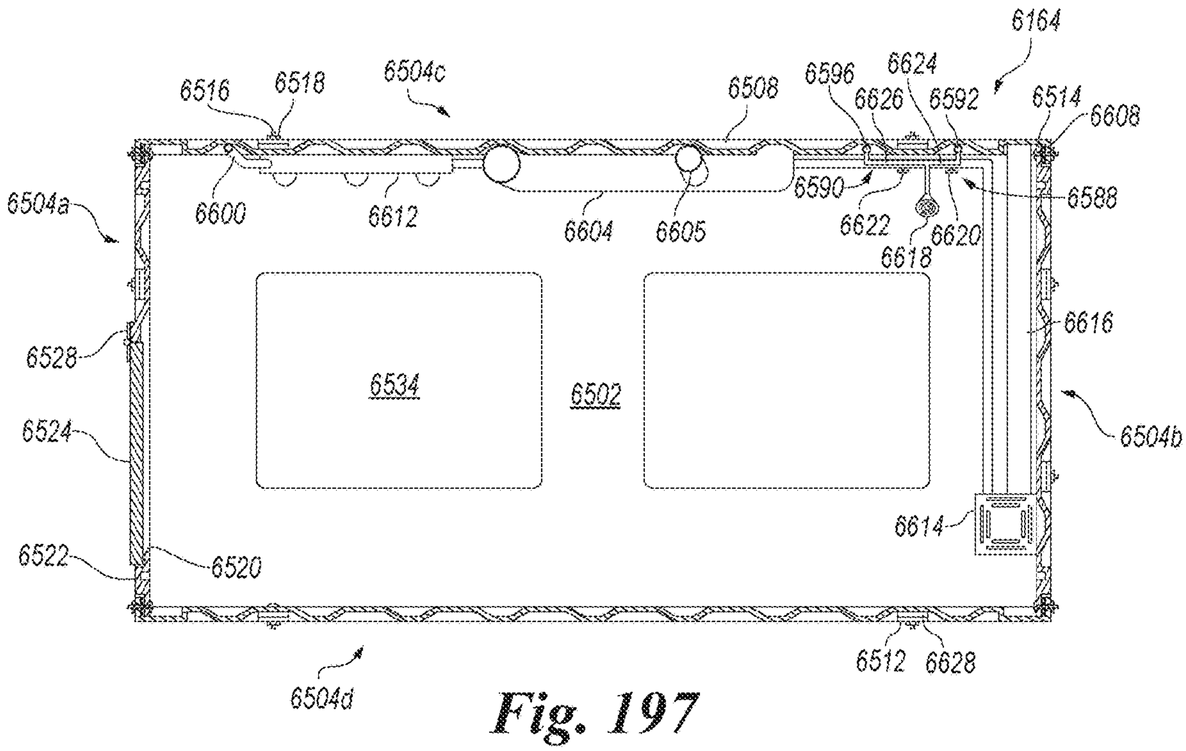

FIG. 197 is a cross-sectional bottom plan view of the bathroom of the real estate unit shown in FIG. 179 taken along the line 197-197 in FIG. 191.

Figure 198:
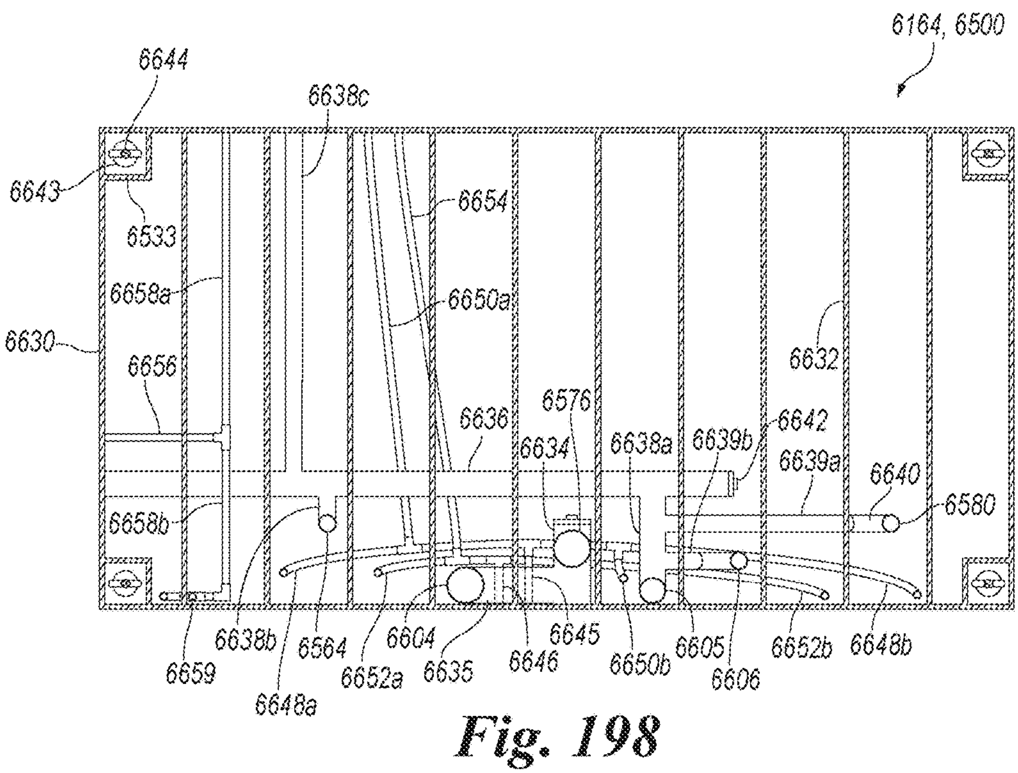

FIG. 198 is a cross-sectional top plan view of the bathroom of the real estate unit shown in FIG. 179 taken along the line 198-198 in FIG. 191.

Figure 199:
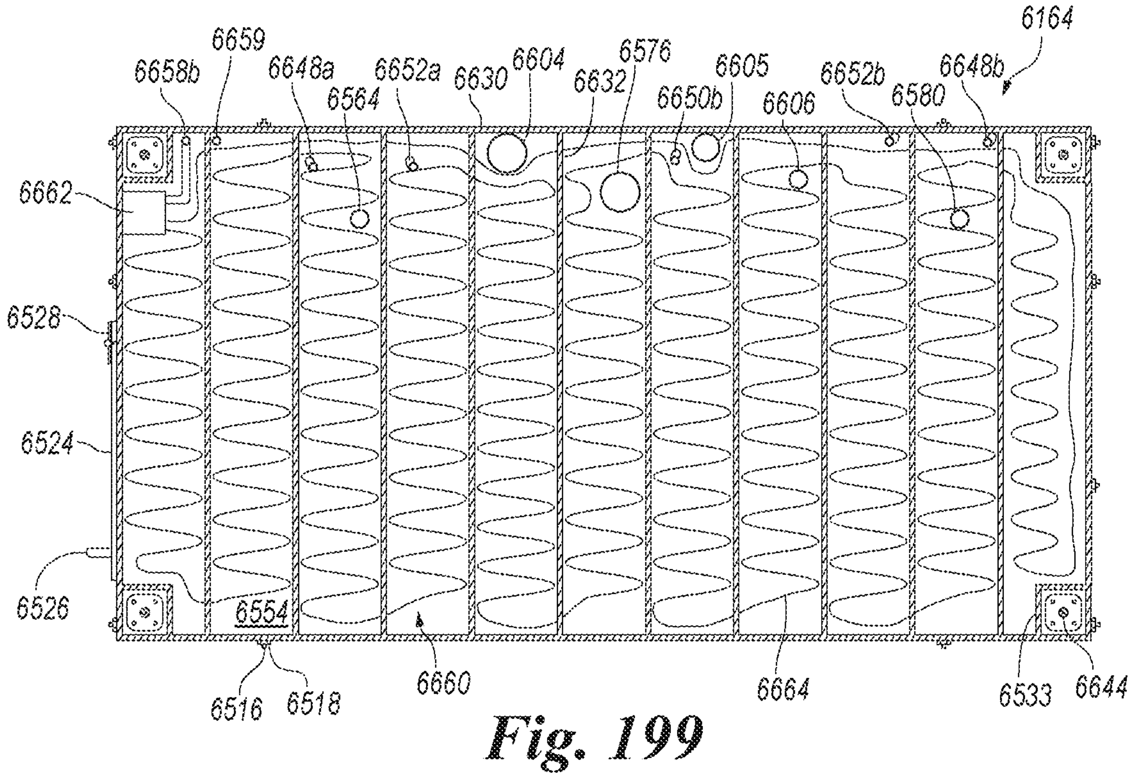

FIG. 199 is a cross-sectional bottom plan view of the bathroom of the real estate unit shown in FIG. 179 taken along the line 199-199 in FIG. 191.

Figure 200:
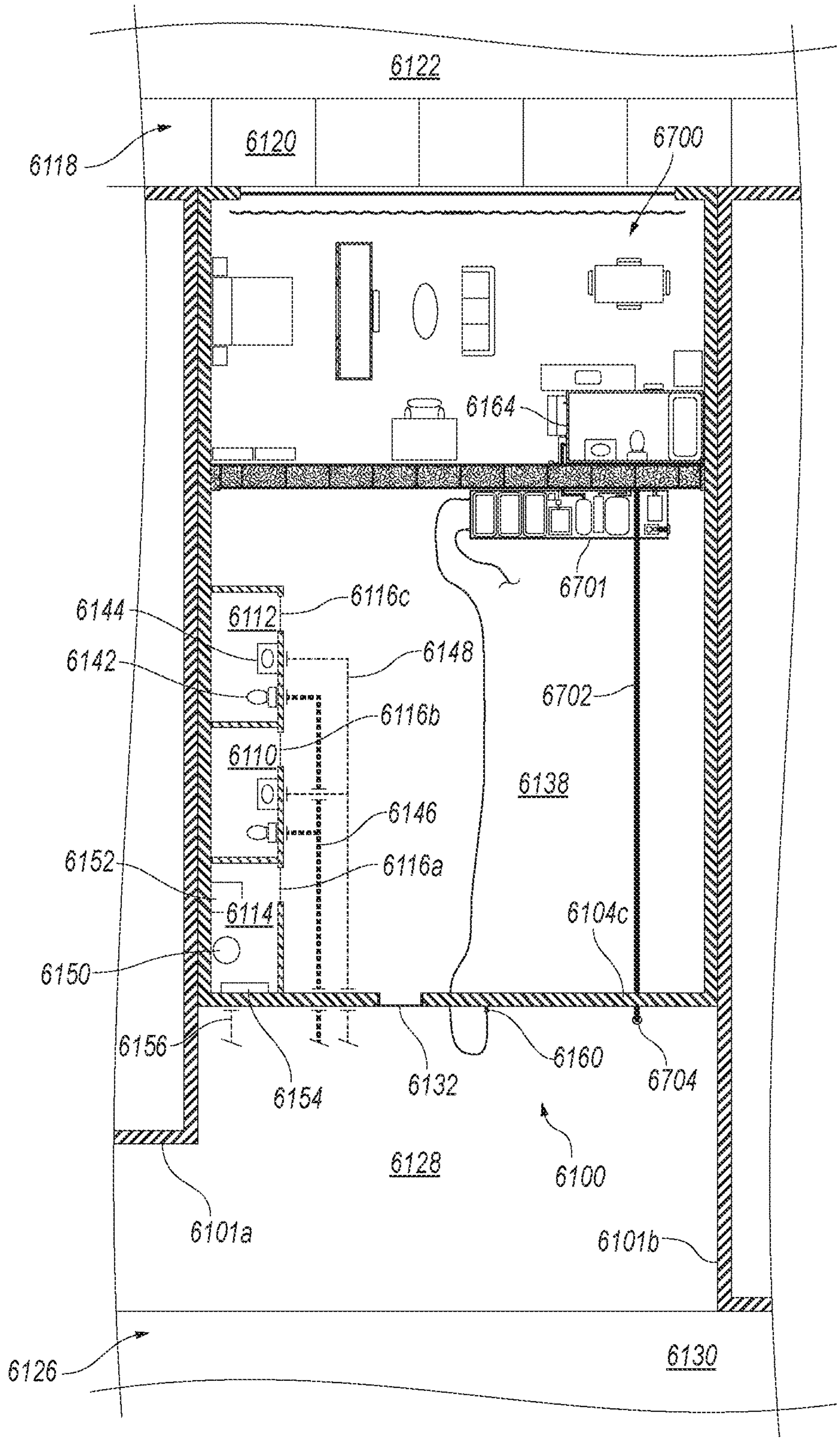
Figure 201:
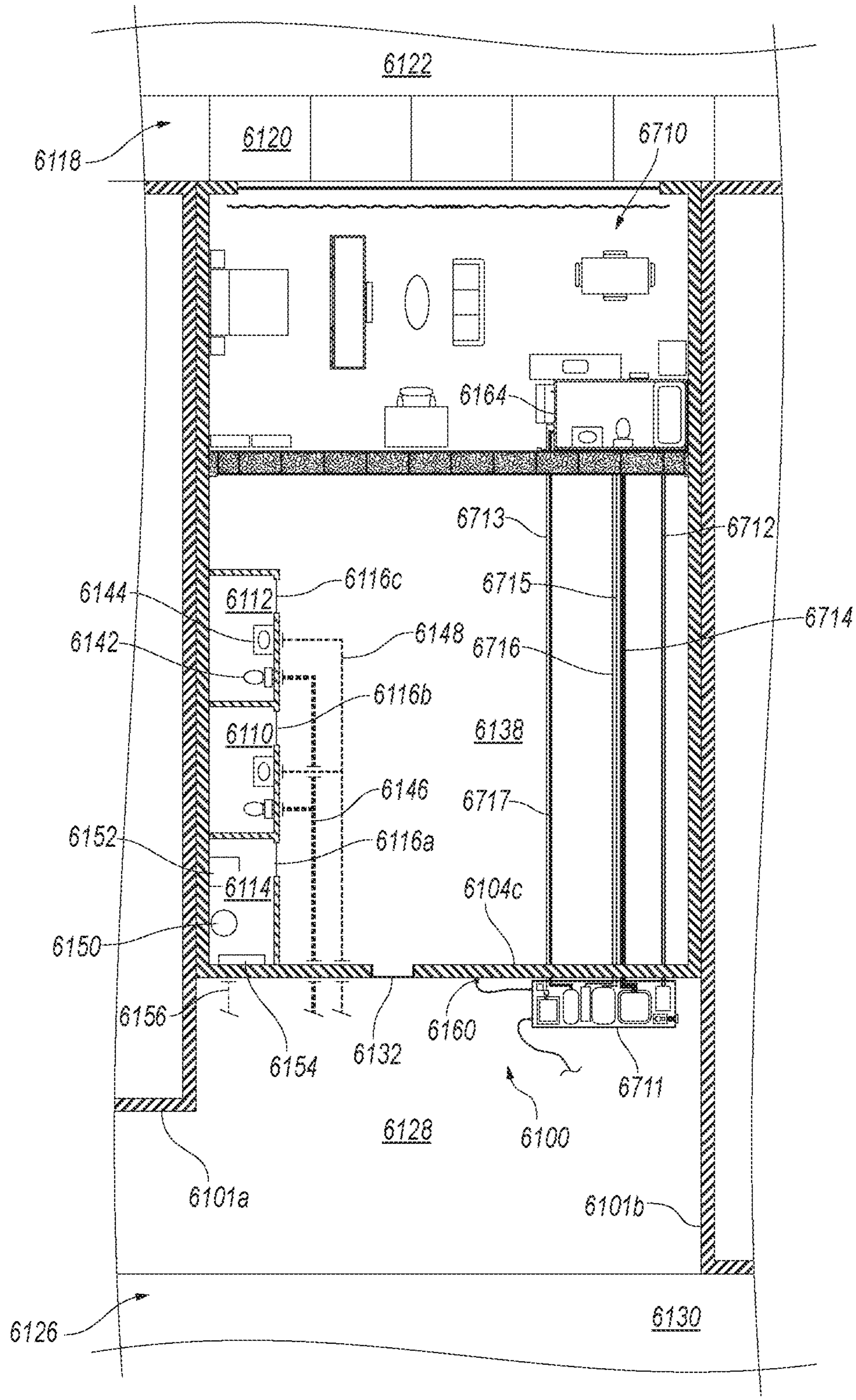
Figure 202:
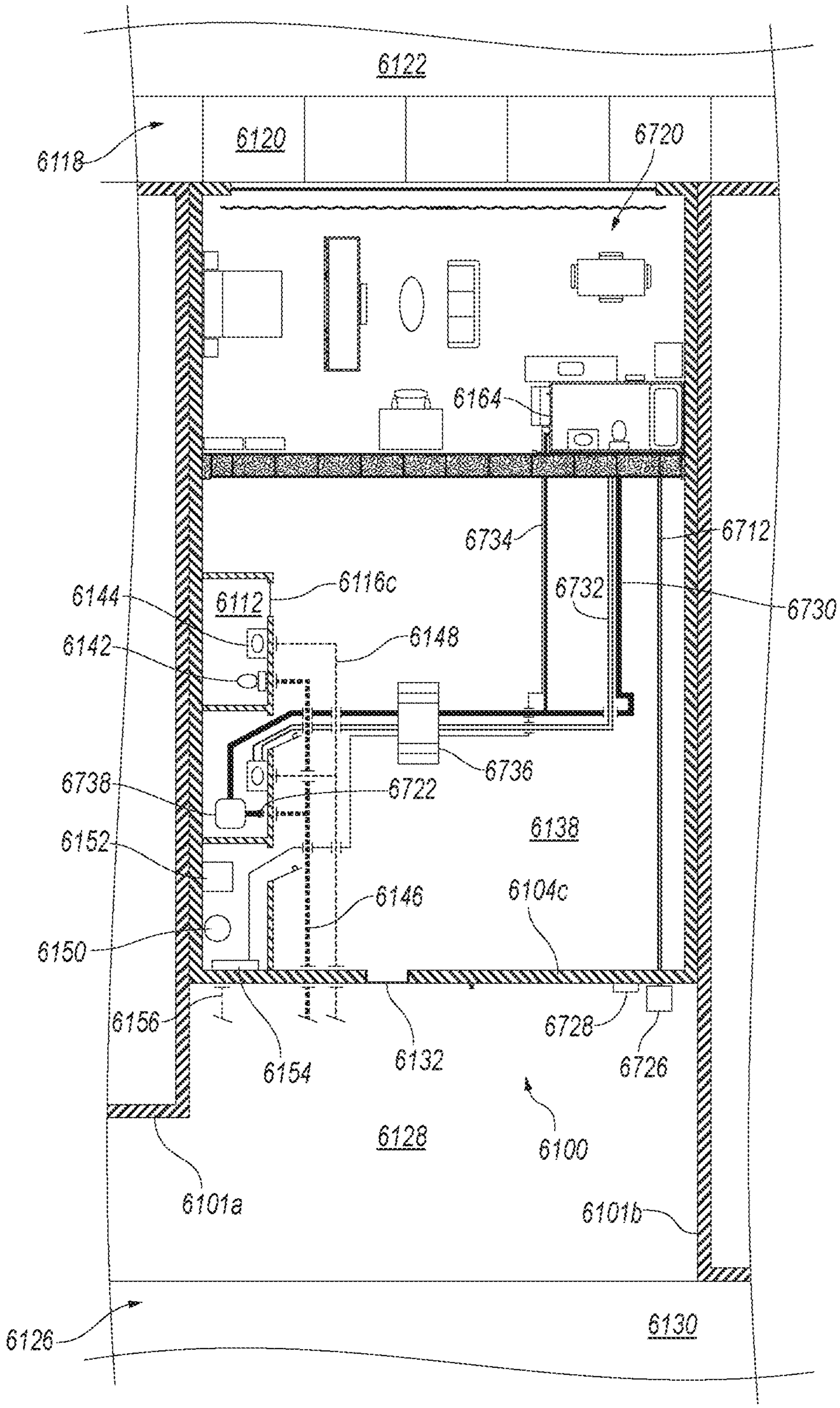

FIGS. 200-202 are, respectively, cross-sectional top plan views of the commercial building shown in FIG. 176 taken along the line L-L in FIG. 176 and showing real estate units in accordance with additional embodiment of the present technology including the interior space within the commercial building in the second state.

Figure 203:
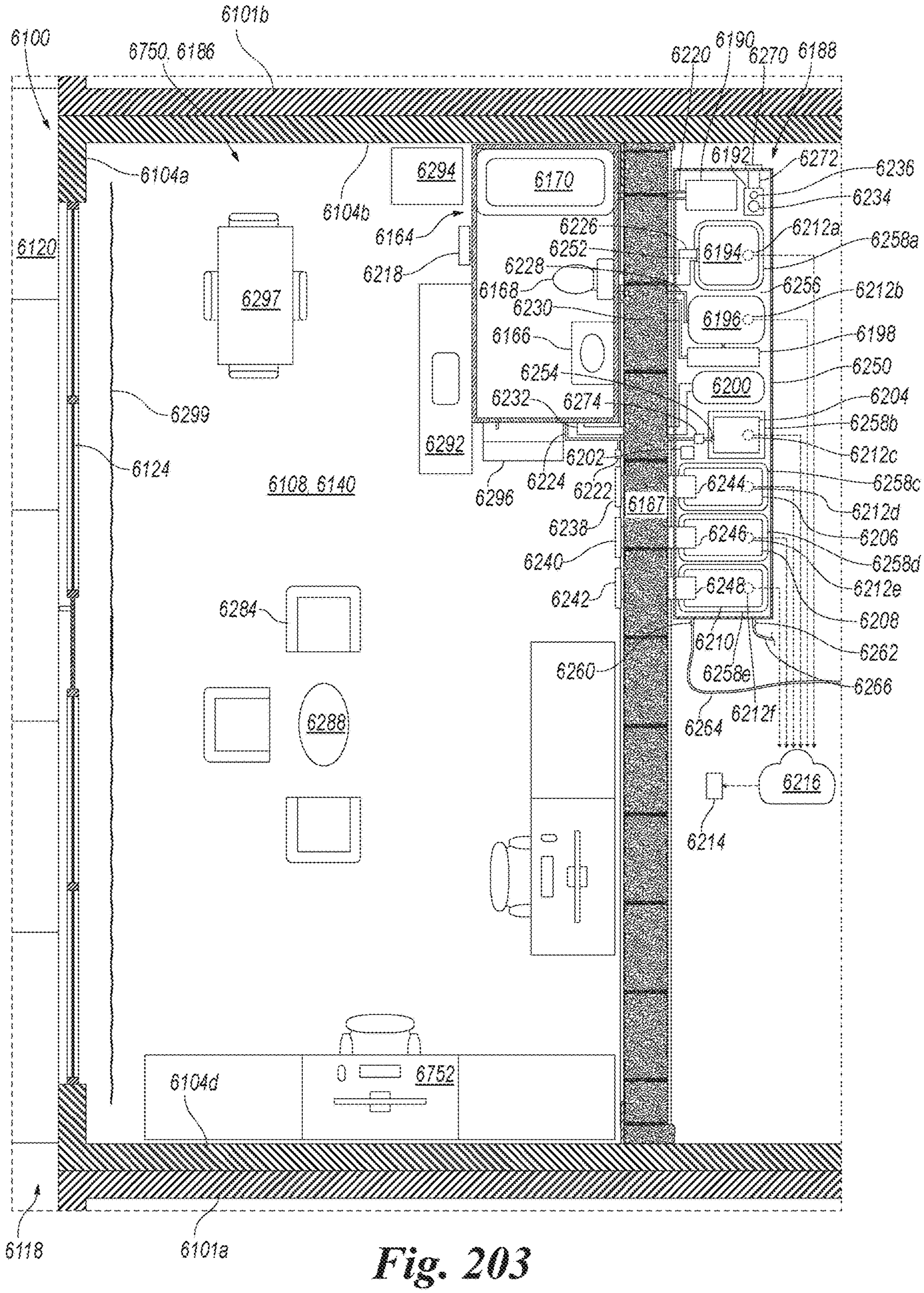
Figure 204:
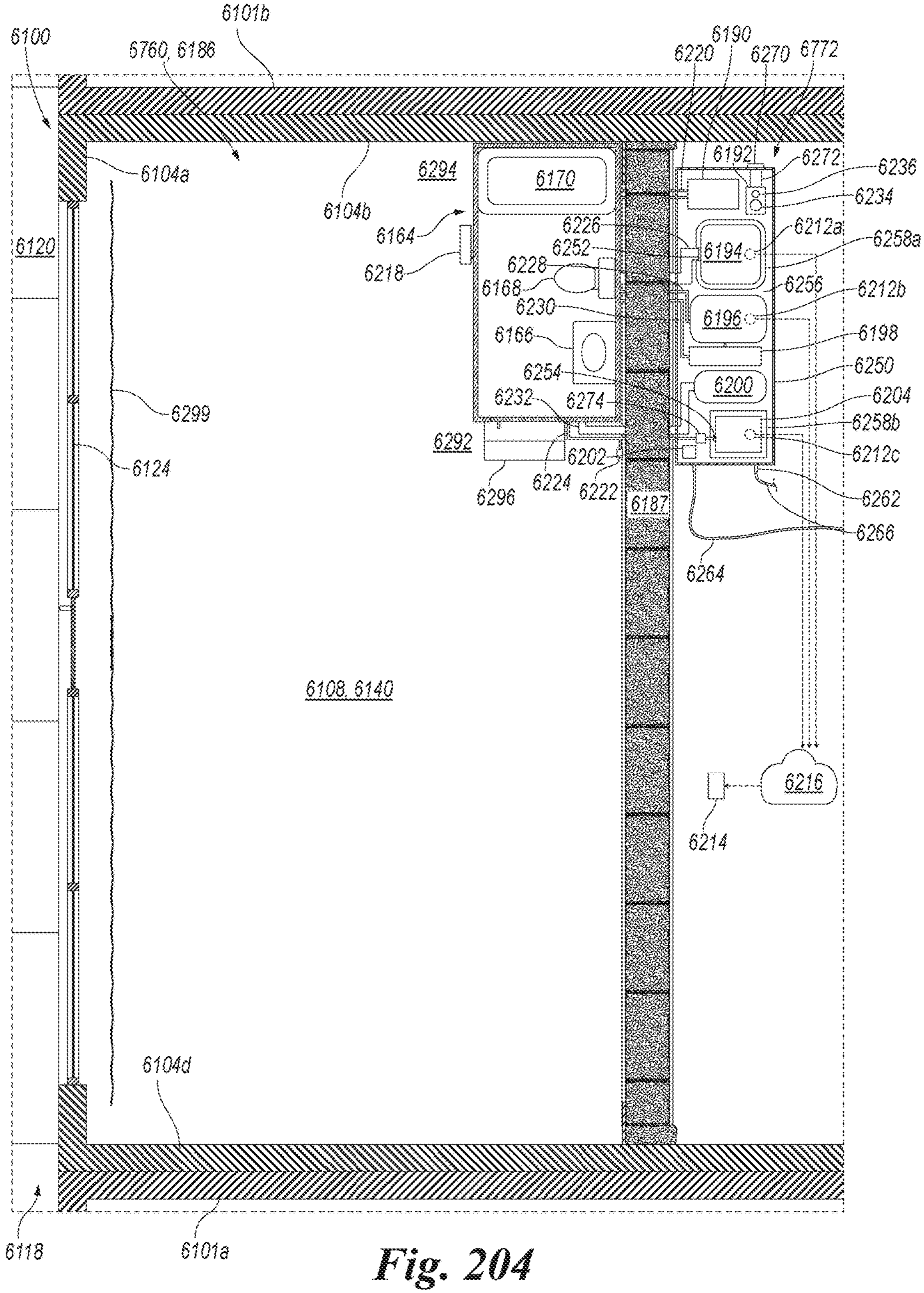
Figure 205:
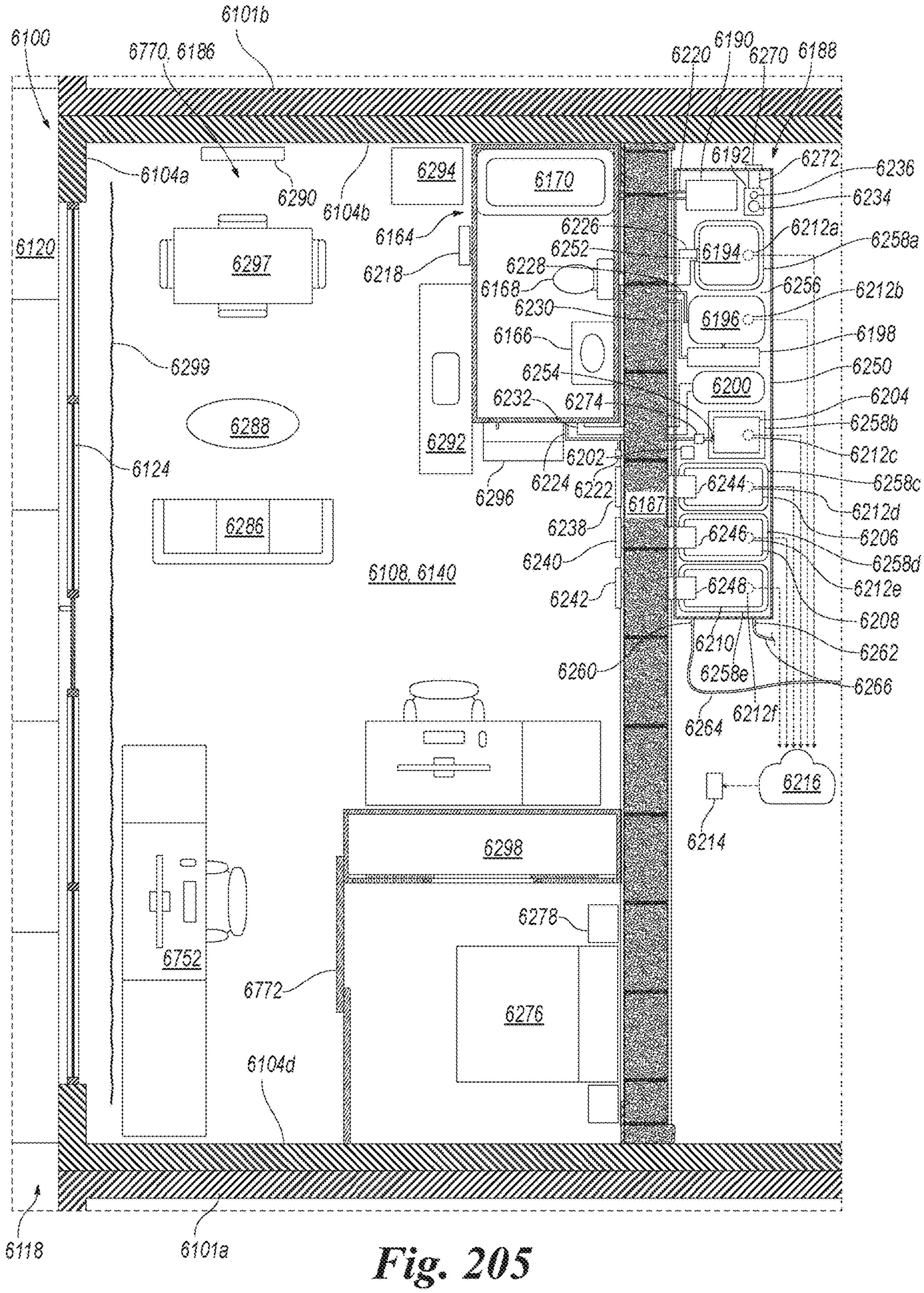

FIGS. 203-205 are, respectively, cross-sectional top plan views of real estate units in accordance with additional embodiments of the present technology including the interior space within the commercial building shown in FIG. 176 taken along the line L-L in FIG. 176 with the interior space in the second state.

Figure 206:
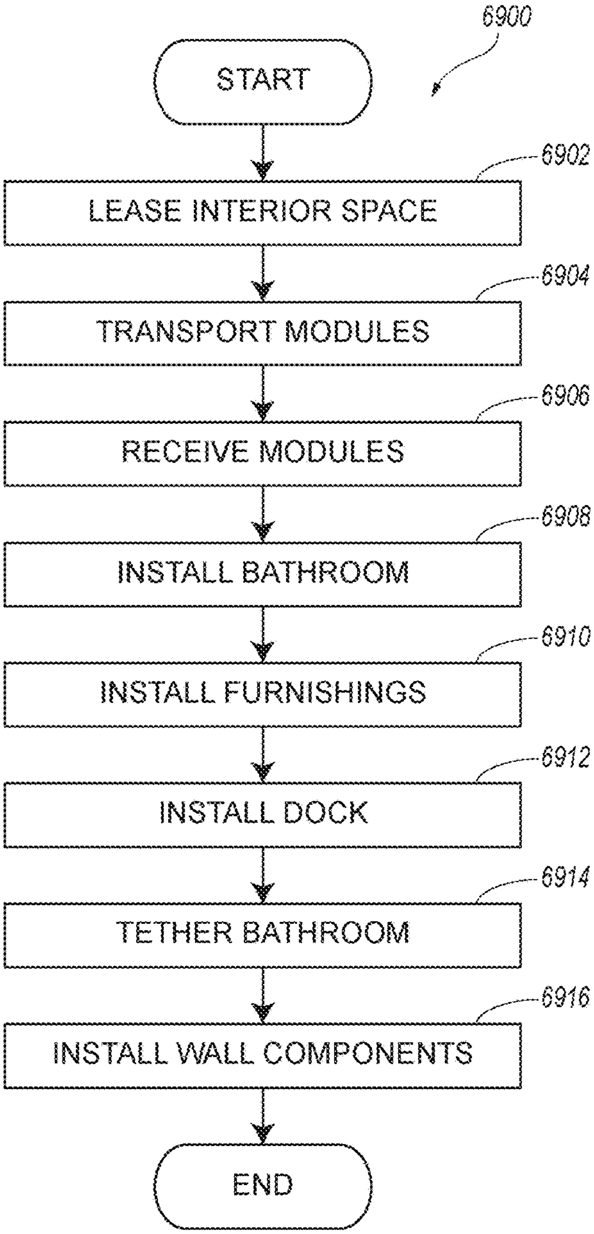

FIG. 206 is a block diagram illustrating a method for making a real estate unit in accordance with an embodiment of the present technology.

Figure 207:
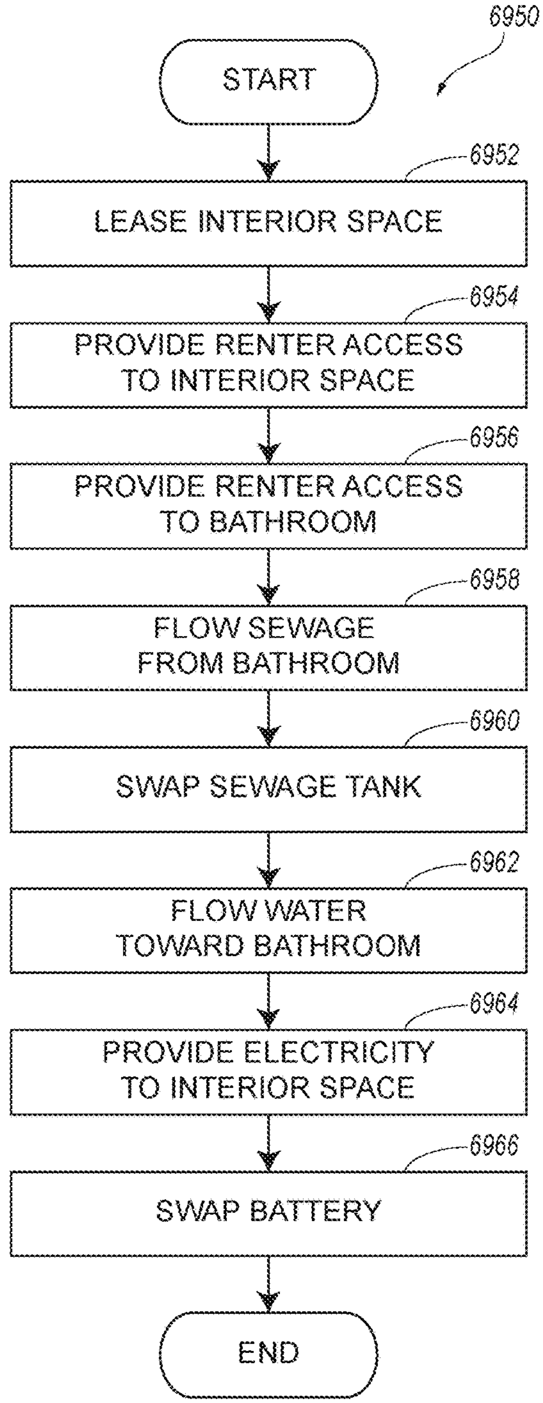

FIG. 207 is a block diagram illustrating a method for operating a real estate unit in accordance with an embodiment of the present technology.

DETAILED DESCRIPTION

Figure 1:
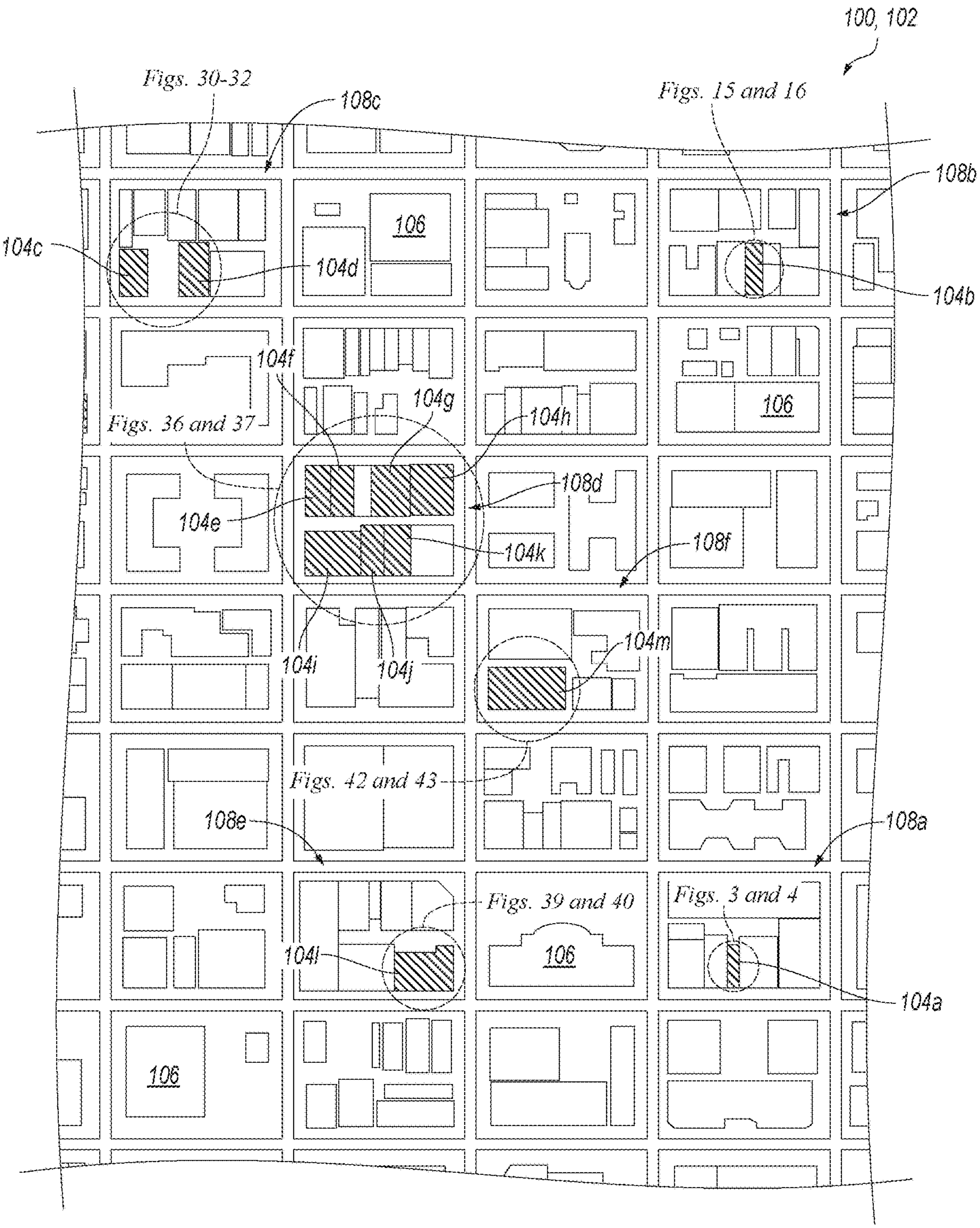
FIG. 1 is a top plan view of an urban area and a hotel in accordance with an embodiment of the present technology at the urban area.

Specific details of several embodiments of the present technology are disclosed herein with reference to FIGS. 1-207. It should be noted, in general, that other embodiments in addition to those disclosed herein are within the scope of the present technology. For example, embodiments of the present technology can have different configurations, components, and/or operations than those disclosed herein. Moreover, a person of ordinary skill in the art will understand that embodiments of the present technology can have configurations, components, and/or operations in addition to those disclosed herein and that these and other embodiments can be without configurations, components, and/or operations disclosed herein without deviating from the present technology.

Disclosed herein are examples of dynamic interstitial hotels and related technology. Hotels in accordance with embodiments of the present technology can at least partially address one or more of the problems described above and/or other problems associated with conventional technologies whether or not such problems are stated herein. Hotels in accordance with at least some embodiments of the present technology are dynamic. For example, dynamic hotels can include inventories of lodging units that change over time. In addition or alternatively, hotels in accordance with at least some embodiments of the present technology are interstitial. For example, interstitial hotels can include lodging units (e.g., individual lodging units and/or clusters of lodging units) retrofitted (e.g., at least substantially reversibly retrofitted) at urban interstices.

In association with being interstitial, hotels in accordance with at least some embodiments of the present technology are highly decentralized relative to conventional hotels. Examples of suitable urban interstices include buildings, portions of buildings, land, and other pieces of real estate dispersed among miscellaneous other pieces of real estate in an urban area. Intervening spaces between urban interstices retrofitted for lodging use in accordance with embodiments of the present technology can be public spaces (e.g., public streets, alleys, and sidewalks) and/or privately owned spaces (e.g., unaffiliated private buildings and land). Some of these intervening spaces can serve functions similar to the functions served by common areas (e.g., common corridors, lounges, restaurants, etc.) in conventional hotels. Furthermore, hotels in accordance at least some embodiments of the present technology include lodging units formed at urban interstices that are temporarily or perpetually underutilized. A vacant commercial space, for example, may be a temporarily underutilized urban interstice. An excess portion of an occupied commercial space, for example, may be a perpetually underutilized urban interstice. In addition or alternatively, these and other hotels in accordance embodiments of the present technology can include lodging units formed at urban interstices that are fully utilized before (e.g., immediately before) being retrofitted for use as lodging units.

A hotel in accordance with a particular embodiment of the present technology includes lodging units having reusable bathrooms removably disposed within respective commercial buildings. The bathrooms and/or other suitable components of the lodging units can be configured for low-cost deployment, removal, and redeployment. Use of these components can allow revenue from operating a given one of the lodging units to exceed costs associated with transitioning space within the corresponding commercial building from its purpose-built use (e.g., retail use, office use, restaurant use, industrial use, warehouse use, garage use, etc.) to lodging use even if the given lodging unit is only operated for a short period of time (e.g., less than one year). Thus, an operator of the hotel may lease spaces within commercial buildings short-term (e.g., monthly) from owners of the commercial buildings and retrofit the spaces for provision of lodging to third parties with little or no risk of incurring significant economic loss. Even if the owners terminate the leases or if demand for the newly created lodging units is lower than expected, most of the capital associated with retrofitting the spaces can be recoverable. Furthermore, capital embodied in the components can be readily relocatable in response to long-term and short-term (e.g., seasonal) changes in demand for lodging.

Among various types of real estate, commercial buildings are particularly well suited to be retrofitted to accommodate lodging uses. For example, commercial buildings tend to be unfurnished or sparsely finished in their purpose-built uses, which can facilitate retrofitting. As another example, commercial buildings often have large openings and/or storefronts at ground level. These openings and storefronts can be well suited for use as sources of natural light and/or as points of direct exterior access. As another example, commercial buildings are often vacant for long periods of time between commercial tenancies. Commercial buildings compatible with embodiments of the present technology can have other desirable attributes in addition to or instead of the forgoing attributes. Furthermore, embodiments of the present technology can be implemented in other types of real estate, such as residential garages.

FIG. 1 is a top plan view of an urban area 100 and a hotel 102 in accordance with an embodiment of the present technology at the urban area 100. The urban area 100 can include buildings 104 (individually identified as buildings 104*a*-104*m*) at which lodging units (not shown in FIG. 1) and other portions of the hotel 102 are respectively located. The buildings 104 can be clustered (e.g., in neighboring pairs or groups) or separate (e.g., surrounded by the miscellaneous other buildings 106). The buildings 104 can have the same or different respective owners. The buildings 104 can be dispersed among the miscellaneous other buildings 106 within the urban area 100. In at least some embodiments, the urban area 100 is mostly or entirely non-residential. For example, the urban area 100 can be a central commercial district, a mostly or entirely retail and/or office district, or a mostly or entirely industrial and/or warehouse district of a greater urban area. Furthermore, the buildings 104 can have a municipal zoning that prohibits residential use and limits lodging use by floor-space allocation. For example, the buildings 104 can have a municipal zoning that limits lodging use to not more than a maximum floor-space allocation area (e.g., a maximum within a range from 1,000 to 8,000 square feet) and/or limits lodging use to not more than maximum floor-space allocation percentage (e.g., a maximum within a range from 10% to 50%). In other embodiments, the urban area 100 can have other suitable predominant use types and/or zoning restrictions.

Figure 2:
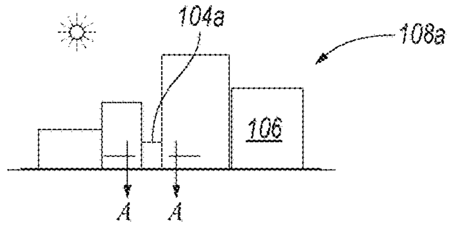
FIG. 2 is a front profile view of a first block of the urban area shown in FIG. 1.
Figure 3:
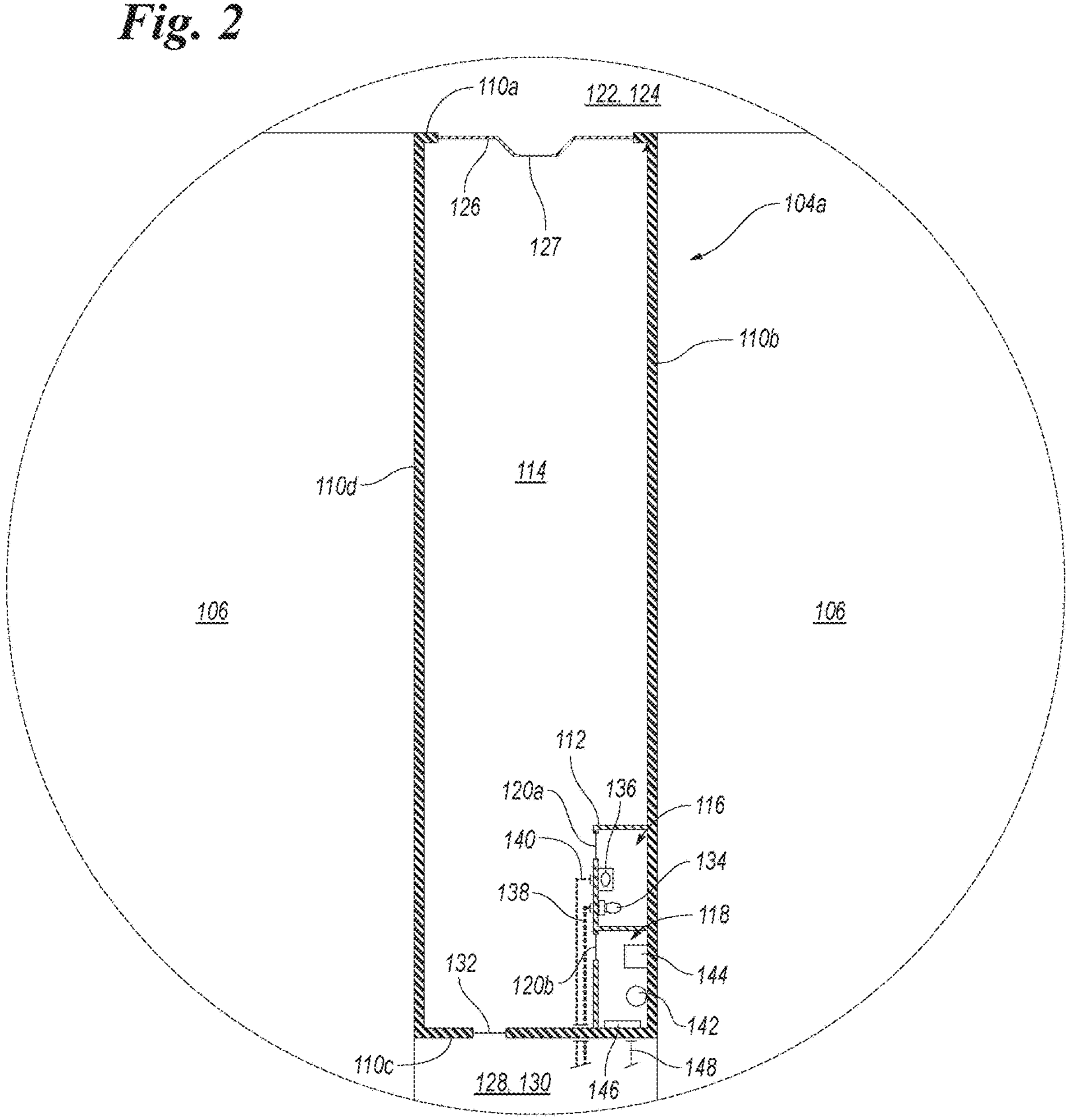
FIG. 3 is a cross-sectional top plan view of a building at the first block of the urban area shown in FIG. 1 taken along the line A-A in FIG. 2 with an interior region within the building in a first state.

The urban area 100 can include blocks 108 (individually identified as blocks 108*a*-108*f*) at which the buildings 104 are disposed. FIG. 2 is a front profile view of the block 108*a*. FIG. 3 is a cross-sectional top plan view of the building 104*a* at the block 108*a* taken along the line A-A in FIG. 2. The building 104*a* can include permanent exterior walls 110 (individually identified as exterior walls 110*a*-110*d*), and permanent interior walls 112. Within the exterior walls 110, the building 104*a* can include an interior region 114. The building 104*a* can further include a building bathroom 116 and a utility room 118. Opening into the building bathroom 116 and the utility room 118, respectively, the building 104*a* can include interior doors 120 (individually identified as interior doors 120*a*, 120*b*). The exterior wall 110*a* can be between the interior region 114 and a first outdoor area 122 that includes a sidewalk 124. At the exterior wall 110*a*, the building 104*a* can include a storefront 126. The storefront 126 can be heavily fenestrated (e.g., greater than 50% fenestrated by area), and can include a front door 127. The exterior wall 110*c* can be between the interior region 114 and a second outdoor area 128 that includes a yard 130. At the exterior wall 110*c*, the building 104*a* can include a back door 132. In at least some cases, the yard 130 is paved and/or otherwise configured to facilitate automobile parking. Although the exterior wall 110*c* in the illustrated embodiment is a back wall, in other embodiments a counterpart of the exterior wall 110*c* can be a side wall.

As shown in FIG. 3, the building bathroom 116 can include a toilet 134 and a sink 136. The building 104*a* can include a plumbing drain trunk line 138 and a water supply trunk line 140 operably associated with the building bathroom 116. The plumbing drain trunk line 138 can follow a drainage route from the building bathroom 116 toward a sewage destination (e.g., a municipal sewer, not shown). Similarly, the water supply trunk line 140 can follow a supply route from a water source (e.g., a municipal water source, not shown) toward the building bathroom 116. The plumbing drain trunk line 138 can be below-ground, such as positioned below a ground surface outside the building 104*a* along the drainage route. In addition or alternatively, the plumbing drain trunk line 138 can be below-floor, such as positioned below a finished floor surface of the building 104*a* along the drainage route. Similarly, the water supply trunk line 140 can be below-ground, such as positioned below a ground surface outside the building 104*a* along the supply route. In addition or alternatively, the water supply trunk line 140 can be below-floor, such as positioned below a finished floor surface of the building 104*a* along the supply route.

The plumbing drain trunk line 138 and/or the water supply trunk line 140 can be buried or otherwise permanently installed within a basement, a crawlspace, a chase, a foundation, a volume of dirt, or another suitable environment directly below the building bathroom 116 and/or directly below an area around the building bathroom 116. Furthermore, the plumbing drain trunk line 138 can be sloped to convey liquid waste (e.g., sewage) from the building bathroom 116 toward the sewage destination at least partially by gravity. The water supply trunk line 140 can be configured to convey potable water from the water source to the building bathroom 116 under pressure. In at least some cases, the building 104*a* includes a building water heater 142 operably associated with the water supply trunk line 140. In these cases, the water supply trunk line 140 can bifurcate into branches (not shown) that supply cold and hot water, respectively, to the building bathroom 116, such as at the sink 136. The building water heater 142 can be operably associated with a branch of the water supply trunk line 140 that supplies hot water to the building bathroom 116. As shown in FIG. 3, the building water heater 142 can be disposed within the utility room 118. The building 104*a* can include a furnace 144 and an electrical panel 146 also disposed within the utility room 118. The building 104*a* can further include a main electrical supply line 148 through which the electrical panel 146 is operably connected to an electrical source (e.g., a municipal power source, not shown). Electrical lines and fixtures downstream from the electrical panel 146 are omitted for clarity of illustration.

Figure 4:
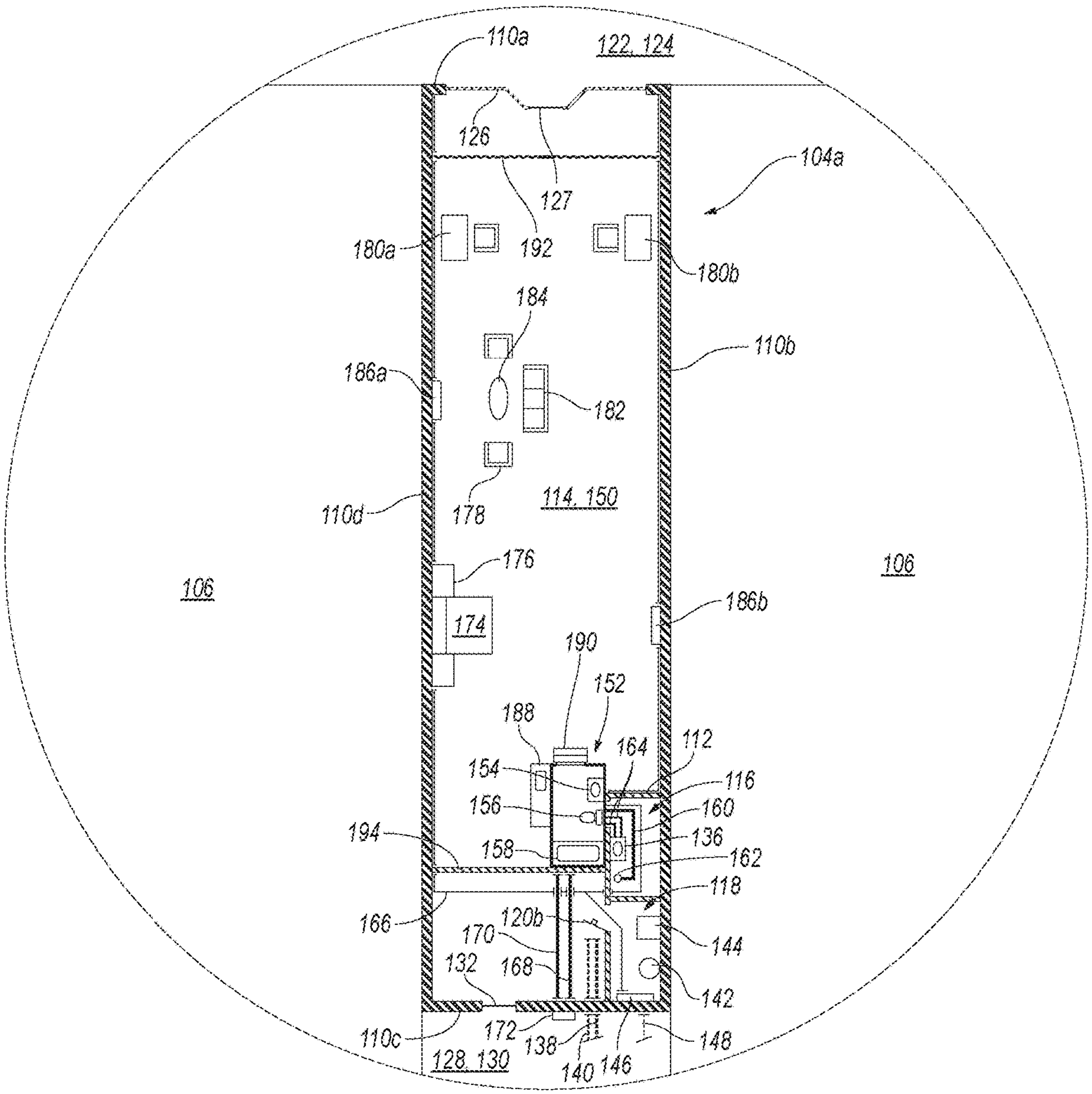
FIG. 4 is a cross-sectional top plan view of the building at the first block of the urban area shown in FIG. 1 taken along the line A-A in FIG. 2 and showing a lodging unit of the hotel shown in FIG. 1, the lodging unit including the interior region within the building in a second state.

In FIG. 3 the interior region 114 is shown in a first state, which can be an original, pre-retrofit, or similar state. In at least some embodiments, the interior region 114 is purpose-built for a use selected from a group consisting of retail use, office use, restaurant use, industrial use, warehouse use, storage use, garage use, and combinations thereof. FIG. 4 is a cross-sectional top plan view of the building 104*a* taken along the line A-A in FIG. 2 and showing a lodging unit 150 of the hotel 102. The lodging unit 150 can include the interior region 114 in a second state, which can be a non-original, post-retrofit, or similar state. The interior region 114 and the lodging unit 150 can be at a ground floor of the building 104*a*. In the second state, the interior region 114 can be retrofitted (e.g., at least substantially reversibly retrofitted) for lodging use. The lodging unit 150 can include a variety of retrofits (e.g., at least substantially reversible retrofits) to the building 104*a* that change at least a portion of the building 104*a* from being well suited its purpose-built use to being well suited for lodging use. In at least some cases, reversal of all or a portion of these retrofits returns the portion of the building 104*a* from being well suited for lodging use to again being well suited for its purpose-built use.

Examples of reversible retrofits include removing, installing, and relocating furniture and fixtures with little or no associated demolition of the exterior and interior walls 110, 112 or other permanent fabric of the building 104*a*. The interior region 114 and other suitable portions of the building 104*a* can be at least substantially reversibly retrofitted to accommodate the lodging unit 150. For example, a total cost of reversible retrofits to the building 104*a* (e.g., a present value of at least substantially reversibly installed reusable components of the lodging unit 150) for a given transformation of the interior region 114 from being well suited for a purpose-built use to being well suited for lodging use can be greater (e.g., at least 50% greater or at least 100% greater) than a total cost of permanent retrofits to the building 104*a* (e.g. modifications to the permanent fabric of the building 104*a*) for the given transformation. Capital associated with the lodging use can be readily re-deployable after the lodging use becomes inactive. In some cases, the lodging use and the lodging unit 150 are active for less than one year (e.g., six months or less) between successive transformations. In other cases, the lodging use and the lodging unit 150 can have longer durations or even be permanent.

As shown in FIG. 4, the lodging unit 150 can include a bathroom 152 disposed (e.g., removably disposed) within the building 104*a*. The bathroom 152 can include a sink 154, a toilet 156, and a bath/shower 158. In at least some embodiments, the bathroom 152 is reusable and removably disposed within the building 104*a*. For example, unlike a conventional bathroom that can only be installed by heavy construction and removed by heavy demolition, the bathroom 152 can be configured to be installed with little or no need for heavy construction and removed with little or no need for heavy demolition. Furthermore, the bathroom 152 can be configured to be conveniently transported and reused after its removal. In the illustrated embodiment, the bathroom 152 is an assembly of reusable bathroom modules configured for rapid deployment into and removal from the building 104*a* in an at least partially disassembled state. For example, the bathroom 152 can be made up mostly or entirely of reusable modular components. In other embodiments, a counterpart of the bathroom 152 can be portable and configured for rapid deployment into and removal from the building 104*a* without significant disassembly. This deployment and removal can occur by forklift, by dolly, by operation of wheels integrated into the counterpart of the bathroom 152, or in another manner. In still other embodiments, a counterpart of the bathroom 152 can have other forms.

The lodging unit 150 can further include retrofitted support systems (e.g., retrofitted plumbing). The retrofitted support systems can include an above-floor plumbing drain line 160 through which the bathroom 152 is operably connected to the plumbing drain trunk line 138. The above-floor plumbing drain line 160 can be disposed (e.g., removably disposed) between the bathroom 152 and the building bathroom 116. The interior door 120*a* can be removed and the bathroom 152 can be adjacent to the building bathroom 116 and positioned such that the above-floor plumbing drain line 160 extends through a doorway from which the interior door 120*a* was removed. The toilet 134 can also be removed exposing a toilet hookup 162 of the building bathroom 116. The above-floor plumbing drain line 160 can be operably connected to the plumbing drain trunk line 138 via the toilet hookup 162. The retrofitted support systems can further include water supply lines 164 (e.g., hot and cold) through which the bathroom 152 is operably connected to the water supply trunk line 140. For example, the water supply lines 164 can be disposed (e.g., removably disposed) between the bathroom 152 and sink hookups within the building bathroom 116.

The retrofitted support systems can still further include a retrofitted electrical system. For example, the lodging unit 150 can include an electrical line 166 through which the bathroom 152 and outlets (not shown) within the bathroom 152 are operably connected to the electrical panel 146. The electrical line 166 can be disposed (e.g., removably disposed) between the bathroom 152 and the electrical panel 146. The interior door 120*b* can be propped open (as shown) or removed to allow passage of the electrical line 166 between the bathroom 152 and the electrical panel 146. The lodging unit 150 can further include a plumbing ventilation line 168 and an exhaust line 170 through which the bathroom 152 is operably connected to an exterior of the building 104*a*. For example, the lodging unit 150 can include an exhaust filter 172 (e.g., containing activated carbon) disposed (e.g., removably disposed) on an exterior surface of the exterior wall 110*c*, and the plumbing ventilation line 168 and the exhaust line 170 can extend between the bathroom 152 and the exhaust filter 172. The above-floor plumbing drain line 160, the water supply lines 164, the electrical line 166, the plumbing ventilation line 168, and the exhaust line 170 can be temporary and configured for reuse or disposal after the lodging unit 150 is decommissioned. Alternatively, these lines can be permanent.

The lodging unit 150 can be furnished or otherwise outfitted with suitable furnishings, fixtures, accessories, etc. to accommodate lodging use. In the illustrated embodiment, the lodging unit 150 includes a bed 174, side tables 176, upholstered chairs 178, workstations 180 (individually identified as workstations 180*a*, 180*b*), a sofa 182, a coffee table 184, monitors 186 (individually identified as monitors 186*a*, 186*b*), a kitchenette 188, and a set of step stairs 190. The monitor 186*a* can be horizontally slidable on a track (not shown) from a location well suited for viewing from the sofa 182 to a location well suited for viewing from the workstation 180*a*. Similarly, the monitor 186*b* can be horizontally slidable on a track (not shown) from a location well suited for viewing from the bed 174 to a location well suited for viewing from the workstation 180*b*. The kitchenette 188 and the set of step stairs 190 can be operably associated with the bathroom 152. The lodging unit 150 can further include a curtain 192 and a partition 194. The curtain 192 can be located inside the storefront 126 and can be closed for privacy. The partition 194 can separate a main portion of the lodging unit 150 from a service area including the utility room 118. In other embodiments, the lodging unit 150 can include other suitable furnishings, fixtures, accessories, etc.

FIGS. 5, 6, 7 and 8 are, respectively, a first side profile view, an opposite second side profile view, a first end profile view, and an opposite second end profile view of the bathroom 152. With reference to FIGS. 5-8 together, the bathroom 152 can include a rectangular floor module 300, a rectangular ceiling module 302 vertically spaced apart from the floor module 300, and a plurality of wall modules 304 (individually identified as wall modules 304*a*-304*d*) removably connected to the floor and ceiling modules 300, 302 at respective perimeter portions of the floor and ceiling modules 300, 302. The bathroom 152 can further include a lower gasket 306 disposed between the perimeter portion of the floor module 300 and the wall modules 304, and an upper gasket 308 disposed between the perimeter portion of the ceiling module 302 and the wall modules 304. The floor module 300 can include upwardly extending tabs 310 through which the floor module 300 is secured to the wall modules 304. Similarly, the ceiling module 302 can include downwardly extending tabs 312 through which the ceiling module 302 is secured to the wall modules 304. The wall modules 304*c*, 304*d* can include vertical flanges 314 at which the wall modules 304*c*, 304*d* are secured to the wall modules 304*a*, 304*b*. The bathroom 152 can include bolts 316 and associated nuts 318 at the upwardly extending tabs 310, the downwardly extending tabs 312, and the vertical flanges 314.

At the wall module 304*a* (FIG. 7), the bathroom 152 can include a doorway opening 320, a frame 322 extending around the doorway opening 320, and a door 324 disposed within the doorway opening 320 and hingedly connected to the frame 322. The bathroom 152 can further include a handle 326 and hinges 328 operably associated with the door 324. At the wall module 304*b* (FIG. 8), the bathroom 152 can include a plumbing ventilation hookup 330 and an exhaust hookup 332. The plumbing ventilation hookup 330 and the exhaust hookup 332 can be configured for convenient connection to and disconnection from the plumbing ventilation line 168 and the exhaust line 170, respectively, such as via quick release couplings (not shown). The wall modules 304*c*, 304*d* can extend between the wall modules 304*a*, 304*b* at opposite sides of the bathroom 152. The bathroom 152 can be configured to be elevated above a floor surface of the interior region 114. For this purpose and/or another suitable purpose, the floor module 300 can include feet 333. In at least some embodiments, a gap between the feet 333 is large enough to allow the bathroom 152, when fully assembled, to be conveniently moved by forklift. At the ceiling module 302, the bathroom 152 can include skylights 334 that allow ambient light to enter an interior of the bathroom 152.

At a side of the floor module 300 below the wall module 304*c*, the bathroom 152 can include a main plumbing drain hookup 335, a main cold water supply hookup 336, and a main hot water supply hookup 338. At an end of the floor module 300 below the wall module 304*b*, the bathroom 152 can include a main electrical hookup 340. The main plumbing drain hookup 335, the main cold water supply hookup 336, the main hot water supply hookup 338, and the main electrical hookup 340 can be configured for convenient connection to and disconnection from the above-floor plumbing drain line 192, a cold one of the water supply lines 196, a hot one of the water supply lines 196, and the electrical line 198, respectively, such as via quick release couplings (not shown). At a side of the floor module 300 below the wall module 304*d*, the bathroom 152 can include an auxiliary plumbing drain hookup 342, an auxiliary cold water supply hookup 344, an auxiliary hot water supply hookup 346, and an auxiliary electrical hookup 348. The auxiliary plumbing drain hookup 342, the auxiliary cold water supply hookup 344, the auxiliary hot water supply hookup 346, and the auxiliary electrical hookup 348 can be configured for convenient connection to and disconnection from corresponding lines (not shown) of the kitchenette 188, such as via quick release couplings (not shown).

Figure 5:
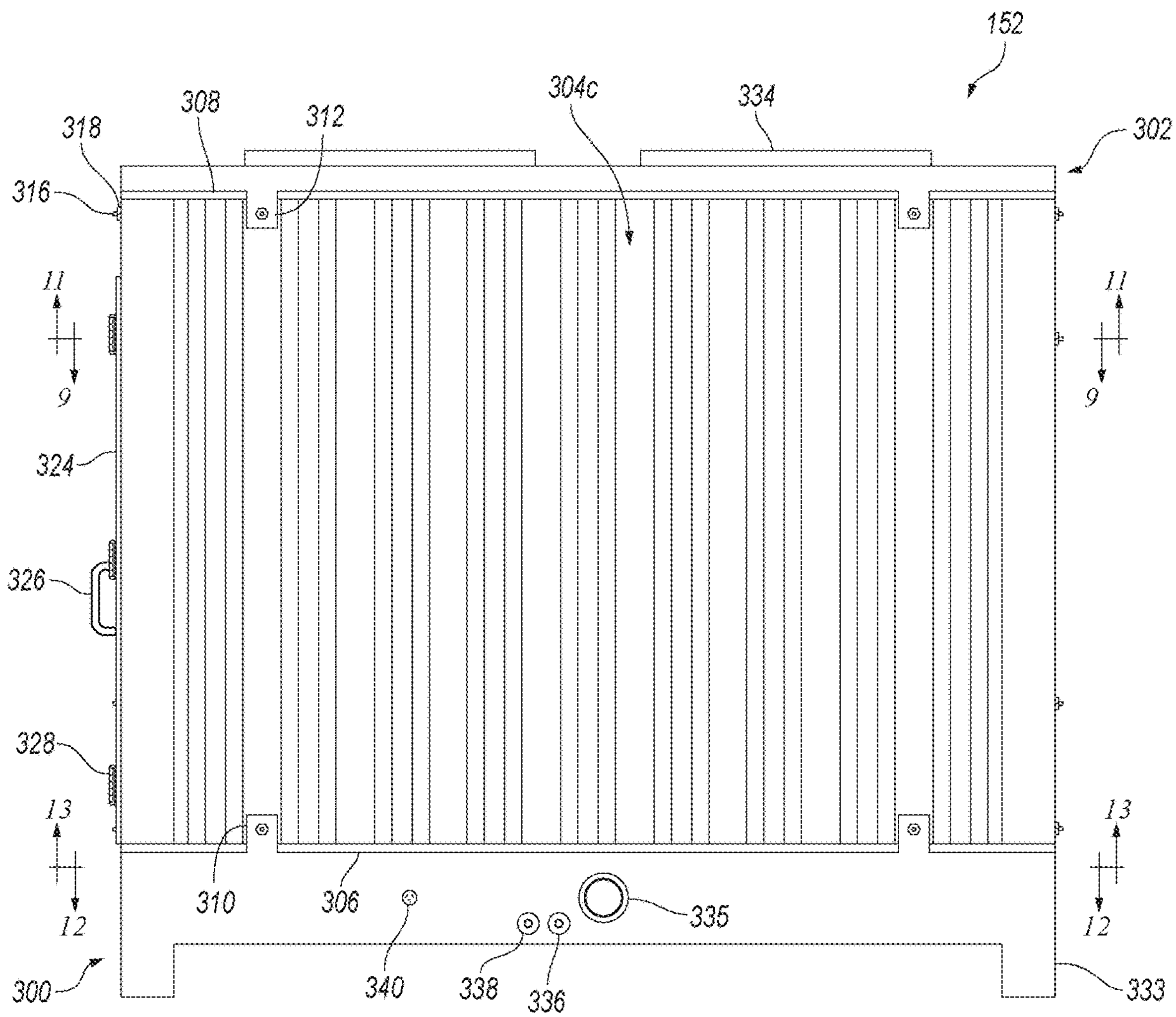
FIGS. 5, 6, 7 and 8 are, respectively, a first side profile view, an opposite second side profile view, a first end profile view, and an opposite second end profile view of a bathroom of the lodging unit shown in FIG. 4.
Figure 6:
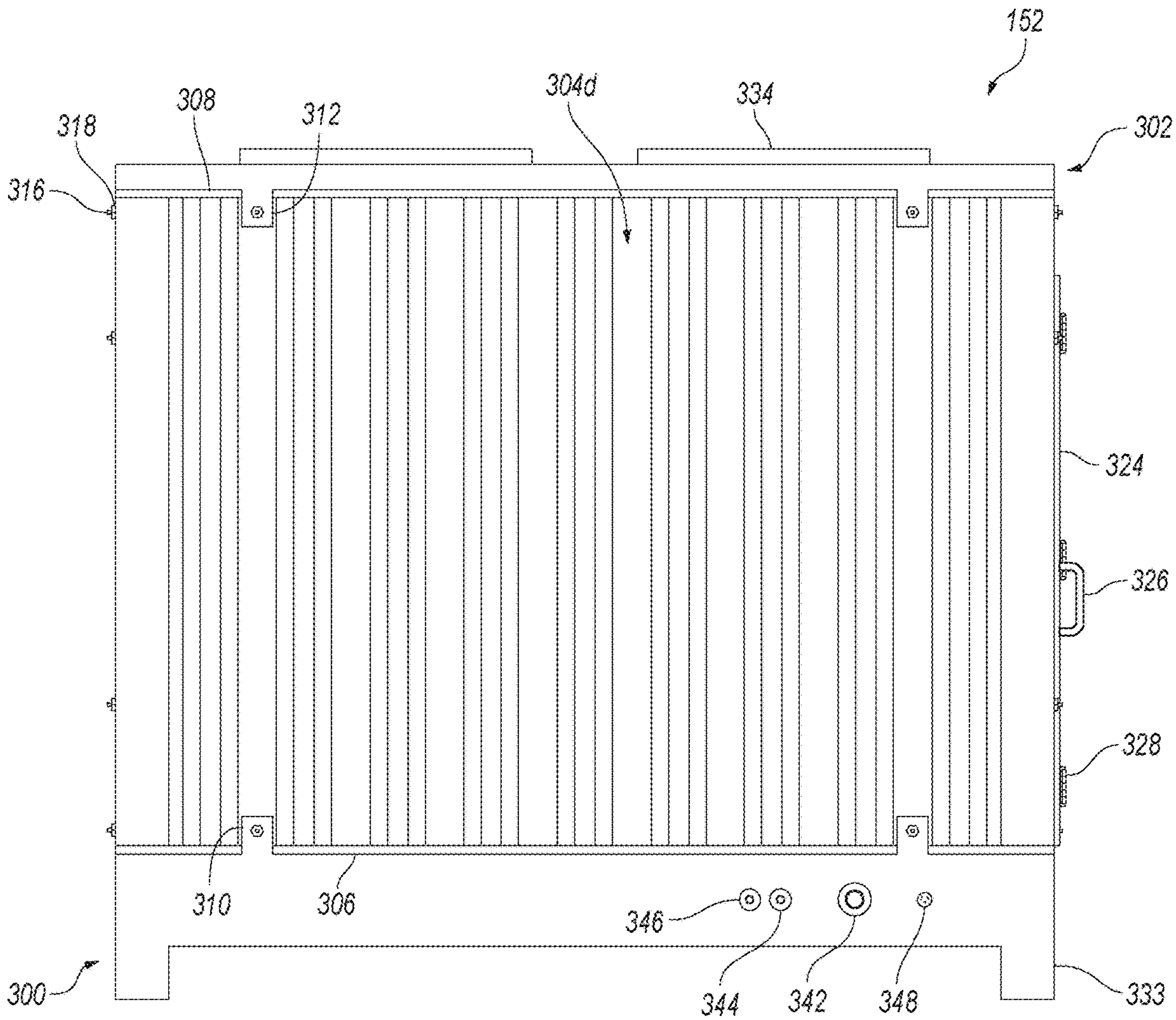
Figure 7:
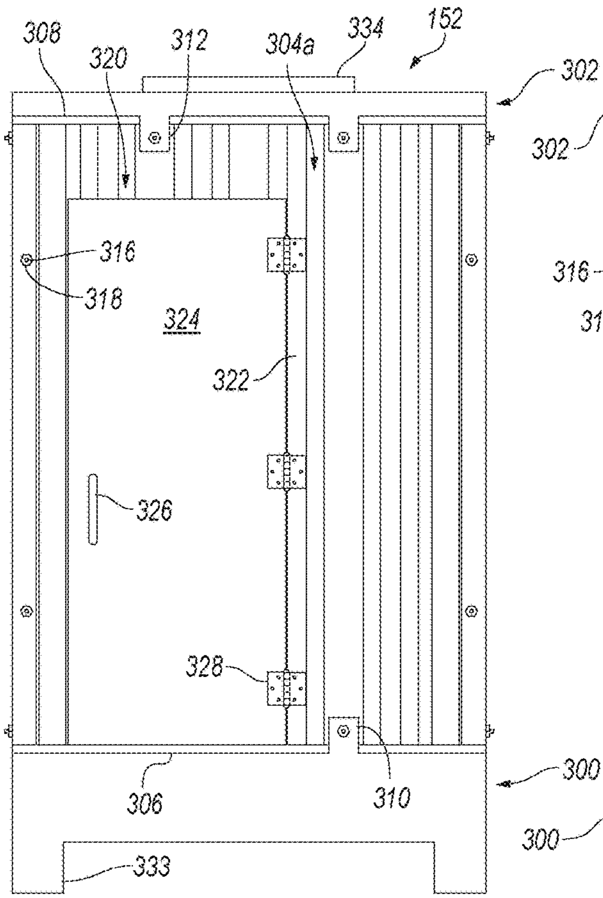
Figure 9:
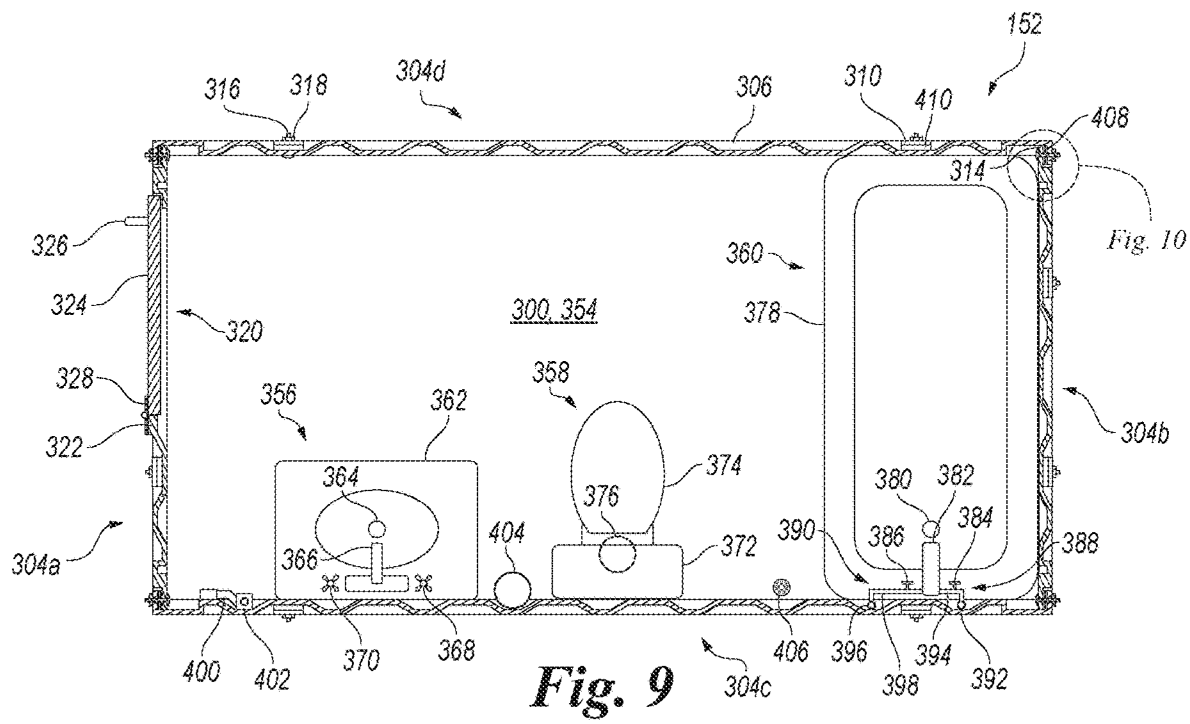
FIG. 9 is a cross-sectional top plan view of the bathroom of the lodging unit shown in FIG. 4 taken along the line 9-9 in FIG. 5.

FIG. 9 is a cross-sectional top plan view of the bathroom 152 taken along the line 9-9 in FIG. 5. As shown in FIG. 9, the floor module 300 can include a deck 354, and the bathroom 152 can include a sink 356, a toilet 358, and a bathtub/shower 360 disposed (e.g., removably disposed) on the deck 354. The sink 356 can include a basin 362, a sink drain 364, a sink faucet 366, a sink cold hot knob 368, and a sink cold water knob 370 operably connected to one another. The toilet 358 can include a tank 372, a bowl 374, and a toilet drain 376 operably connected to one another. The bathtub/shower 360 can include a tub 378, a tub drain 380, a tub faucet 382, a tub cold water knob 384, a tub hot water knob 386, a cold water conduit 388, and a hot water conduit 390 operably connected to one another. The cold water conduit 388 can include a riser 392 and a first branch 394 extending between the riser 392 and the tub faucet 382. The tub cold water knob 384 can be disposed along the first branch 394 and operable to control a flow of cold water from the cold water conduit 388 to the tub faucet 382. Similarly, the hot water conduit 390 can include a riser 396 and a first branch 398 extending between the riser 396 and the tub faucet 382. The tub hot water knob 386 can be disposed along the first branch 398 and operable to control a flow of hot water from the hot water conduit 390 to the tub faucet 382.

Figure 10:
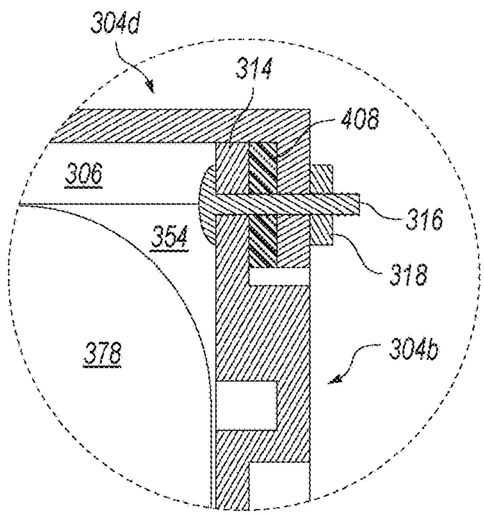
FIG. 10 is an enlarged view of a portion of FIG. 9.

The bathroom 152 can further include an electrical conduit 400, a junction box 402 operably connected to the electrical conduit 400, a plumbing ventilation conduit 404 disposed between the sink 356 and the toilet 358, and a floor drain 406 disposed between the toilet 358 and the bathtub/shower 360. FIG. 10 is an enlarged view of a portion of FIG. 9. With reference to FIGS. 9 and 10 together, the bathroom 152 can include vertical gaskets 408 disposed between the respective vertical flanges 314 and corresponding portions of the wall modules 304*a*, 304*b*. Similarly, the bathroom 152 can include lower tab gaskets 410 disposed between the respective upwardly extending tabs 310 and corresponding portions of the wall modules 304.

Figure 8:
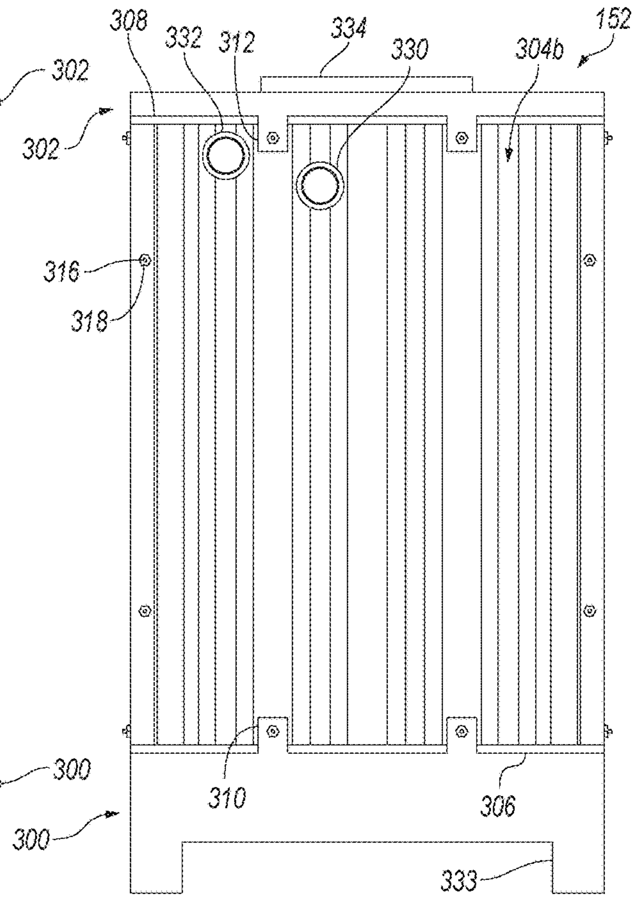
Figure 11:
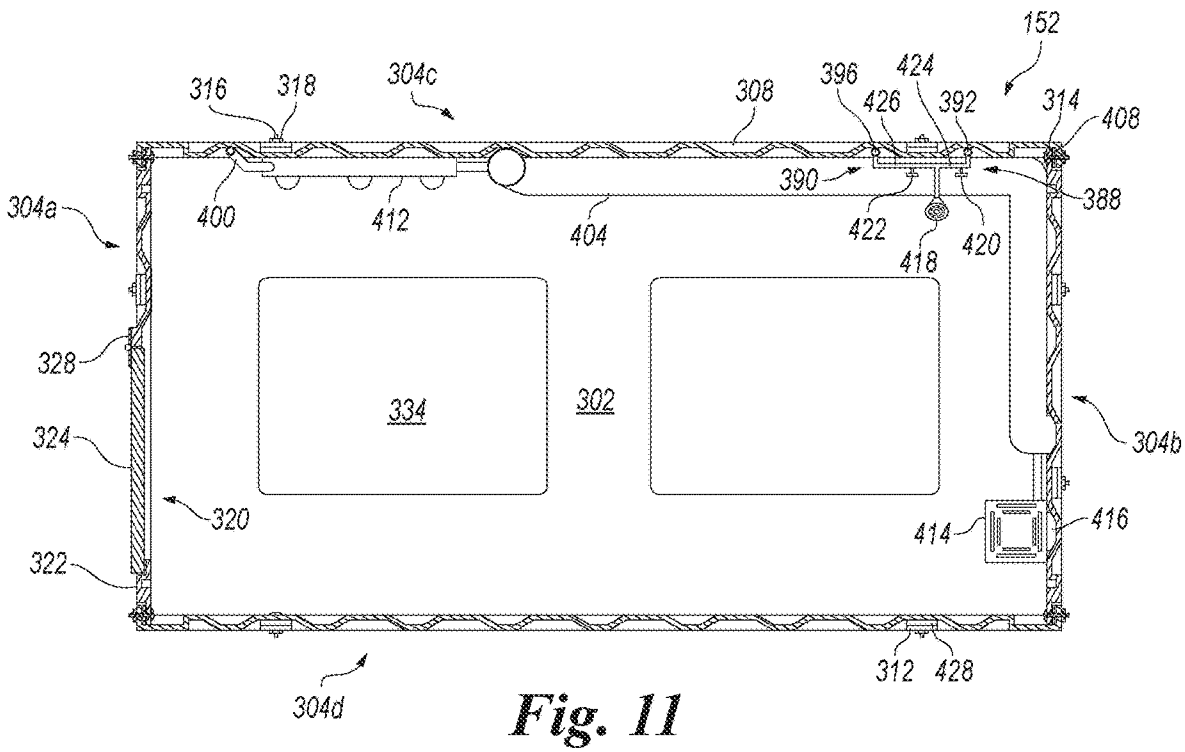
FIG. 11 is a cross-sectional bottom plan view of the bathroom of the lodging unit shown in FIG. 4 taken along the line 11-11 in FIG. 5.

FIG. 11 is a cross-sectional bottom plan view of the bathroom 152 taken along the line 11-11 in FIG. 5. As shown in FIG. 11, the bathroom 152 can include a light fixture 412 attached to the wall module 304*c* above the sink 356. The bathroom 152 can further include an exhaust intake fan 414 attached to the ceiling module 302. The electrical conduit 400 can extend from the junction box 402 (FIG. 9) to the light fixture 412, and from the light fixture 412 to the exhaust intake fan 414. The plumbing ventilation conduit 404 can extend along an inner corner between the ceiling module 302 and the wall modules 304*b*, 304*c* to the plumbing ventilation hookup 330 (FIG. 8). The bathroom 152 can include an exhaust conduit 416 extending between the exhaust intake fan 414 and the exhaust hookup 332 (FIG. 8). Above one end of the tub 378 (FIG. 9), the bathtub/shower 360 (FIG. 9) can include a showerhead 418, a shower cold water knob 420 operably connected to the cold water conduit 388, and a shower hot water knob 422 operably connected to the hot water conduit 390. The cold water conduit 388 can include a second branch 424 extending between the riser 392 and the showerhead 418. The shower cold water knob 420 can be disposed along the second branch 424 and operable to control a flow of cold water from the cold water conduit 388 to the showerhead 418. Similarly, the hot water conduit 390 can include a second branch 426 extending between the riser 396 and the showerhead 418. The shower hot water knob 422 can be disposed along the second branch 426 and operable to control a flow of hot water from the hot water conduit 390 to the showerhead 418. The bathroom 152 can include upper tab gaskets 428 disposed between the respective downwardly extending tabs 312 and corresponding portions of the wall modules 304.

Figure 12:
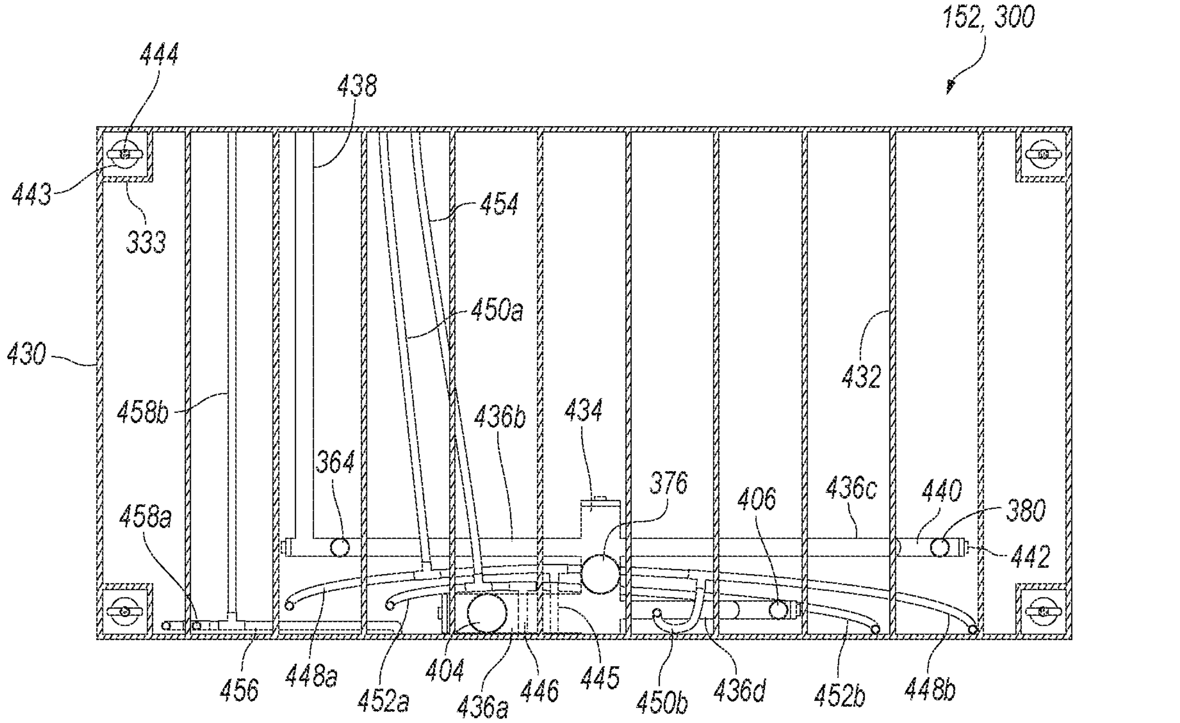
FIG. 12 is a cross-sectional top plan view of the bathroom of the lodging unit shown in FIG. 4 taken along the line 12-12 in FIG. 5.

FIG. 12 is a cross-sectional top plan view of the bathroom 152 taken along the line 12-12 in FIG. 5. With reference to FIGS. 5, 6, 9 and 10 together, the floor module 300 can include a skirt 430 and a series of parallel spaced-apart joists 432 within the skirt 430. The bathroom 152 can include a main plumbing drain conduit 434 operably connected to the main plumbing drain hookup 335 and the toilet drain 376. The main plumbing drain conduit 434 can include branches 436 (individually identified as branches 436*a*-436*d*) operably connected to the plumbing ventilation conduit 404, the sink drain 364, the tub drain 380, and the floor drain 406, respectively. The main plumbing drain conduit 434 can further include a sub-branch 438 operably connected to the auxiliary plumbing drain hookup 342 via the branch 436*b*. The branches 436*c*, 436*d* can include respective traps 440. Furthermore, the main plumbing drain conduit 434 and the branches 436 can include respective caps 442. The bathroom 152 can include wheels 443 (e.g., swivel casters) integrated into the floor module 300. In the illustrated embodiment, the wheels 443 are embedded within the feet 333 and accessible via inwardly facing openings (not shown) of the feet 333. The individual wheels 443 can be movable between a retracted state and an extended state. For example, the bathroom 152 can include posts 444 having threads (not shown) that engage corresponding threads (not shown) of the wheels 443 such that the wheels 443 can be rotatably moved between the retracted and extended states. Moving the wheels 443 from the retracted state to the extended state can lift the bathroom 152 off a corresponding floor surface, thereby allowing the bathroom 152 to be conveniently moved along the floor surface.

The bathroom 152 can further include a main cold water conduit 445 and a main hot water conduit 446 operably connected to the main cold water supply hookup 336 and the main hot water supply hookup 338, respectively. The main cold water conduit 445 can include branches 448 (individually identified as branches 448*a*, 448*b*) operably connected to the sink 356 and the bathtub/shower 360 (via the riser 392), respectively. The main cold water conduit 445 can further include a sub-branch 450*a* operably connected to the auxiliary cold water supply hookup 344 via the branch 448*a*. The main cold water conduit 445 can still further include a sub-branch 450*b* operably connected to the toilet 358 via the branch 448*b*. The main hot water conduit 446 can include branches 452 (individually identified as branches 452*a*, 452*b*) operably connected to the sink 356 and the bathtub/shower 360 (via the riser 396), respectively. The main hot water conduit 446 can further include a sub-branch 454 operably connected to the auxiliary hot water supply hookup 346 via the branch 452*a*. The bathroom 152 can still further include a main electrical conduit 456 operably connected to the main electrical hookup 340. The main electrical conduit 456 can include branches 458 (individually identified as branches 458*a*, 458*b*) operably connected to the electrical conduit 400 and the auxiliary electrical hookup 348, respectively.

Figure 13:
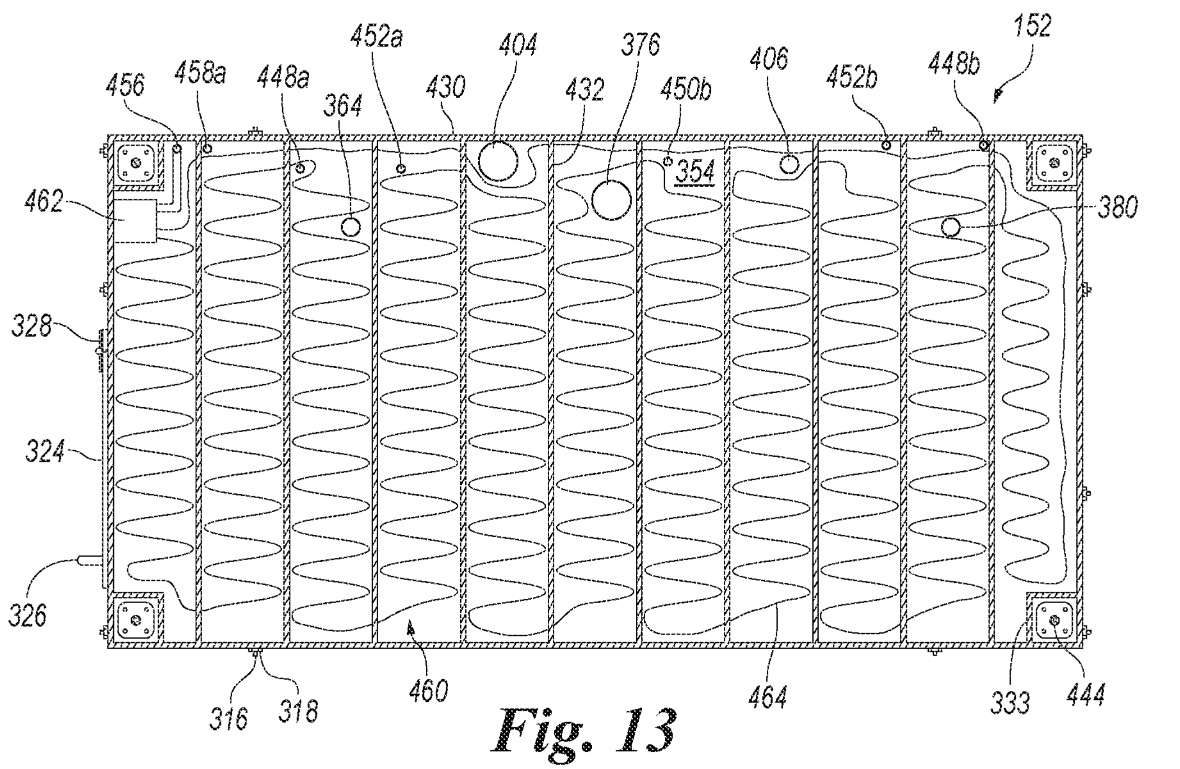
FIG. 13 is a cross-sectional bottom plan view of the bathroom of the lodging unit shown in FIG. 4 taken along the line 13-13 in FIG. 5.

FIG. 13 is a cross-sectional bottom plan view of the bathroom 152 taken along the line 13-13 in FIG. 5. As shown in FIG. 13, the bathroom 152 can include a floor heating system 460 operably associated with the deck 354. The floor heating system 460 can include a control box 462 operably connected to the main electrical conduit 456, and a heating cable 464 operably connected to the control box 462. The heating cable 464 can have a serpentine configuration and be directly connected to an underside of the deck 354 between the joists 432. With reference to FIGS. 5-13 together, the floor drain 406, the main plumbing drain conduit 434 (e.g., including its branches 436 and sub-branch 438), the main cold water conduit 445 (e.g., including its branches 448 and sub-branch 450), the main hot water conduit 446 (e.g., including its branches 452 and sub-branch 454), the main electrical conduit 456 (e.g., including its branches 458), the floor heating system 460, and/or other suitable components of the bathroom 152 can be pre-installed components of the floor module 300. Similarly, the supply plumbing for the bathtub/shower 360 (e.g., including the tub faucet 382, the cold water conduit 388, the hot water conduit 390, and the showerhead 418), the light fixture 412, and/or other suitable components of the bathroom 152 can be pre-installed components of the wall module 304*c*. These and/or other aspects of the bathroom 152 can facilitate rapid deployment, removal, and redeployment of the bathroom 152.

Figure 14:
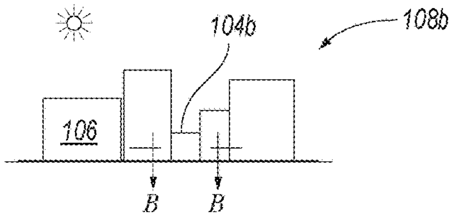
FIG. 14 is a front profile view of a second block of the urban area shown in FIG. 1.
Figure 15:
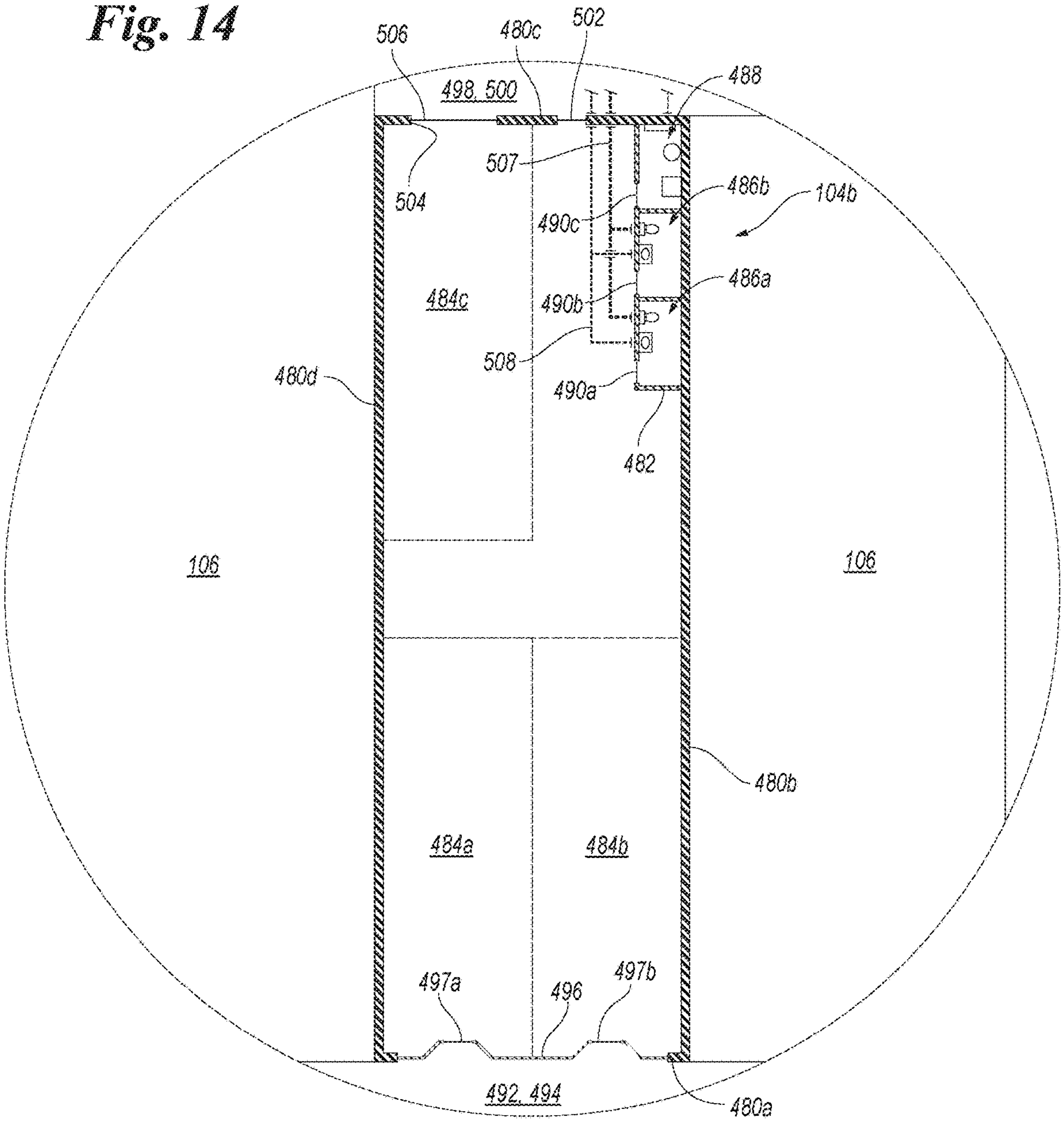
FIG. 15 is a cross-sectional top plan view of a building at the second block of the urban area shown in FIG. 1 taken along the line B-B in FIG. 14 with interior regions within the building in the first state.

FIG. 14 is a front profile view of the block 108*b*. FIG. 15 is a cross-sectional top plan view of the building 104*b* at the block 108*b* taken along the line B-B in FIG. 14. The building 104*b* can include permanent exterior walls 480 (individually identified as exterior walls 480*a*-480*d*), and permanent interior walls 482. Within the exterior walls 480, the building 104*b* can include interior regions 484 (individually identified as interior regions 484*a*-484*c*). In FIG. 15, the interior regions 484 are shown in the first state. In at least some embodiments, the interior regions 484*a*-484*c* are purpose-built for respective uses independently selected from a group consisting of retail use, office use, restaurant use, industrial use, warehouse use, storage use, garage use, and combinations thereof. The building 104*b* can further include building bathrooms 486 (individually identified as building bathrooms 486*a*, 486*b*) and a utility room 488. Opening into the building bathroom 486*a*, the building bathroom 486*b*, and the utility room 488, respectively, the building 104*b* can include interior doors 490 (individually identified as interior doors 490*a*-490*c*). The exterior wall 480*a* can be between the interior regions 484*a*, 484*b* and a first outdoor area 492 that includes a sidewalk 494. At the exterior wall 480*a*, the building 104*b* can include a storefront 496. The storefront 496 can be heavily fenestrated (e.g., greater than 50% fenestrated by area), and can include front doors 497 (individually identified as front doors 497*a*, 497*b*).

The exterior wall 480*c* can be between the interior region 484*c* and a second outdoor area 498 that includes a yard 500. At the exterior wall 480*c*, the building 104*b* can include a back door 502 and an opening 504 between the interior region 484*c* and the second outdoor area 498. In at least some cases, the yard 500 is paved and/or otherwise configured to facilitate automobile parking. Although the exterior wall 480*c* in the illustrated embodiment is a back wall, in other embodiments a counterpart of the exterior wall 480*c* can be a side wall. With reference again to FIG. 15, the opening 504 can be sized to permit loading of large items into the building 104*b* and/or passage of an automobile between the interior region 484*c* and the second outdoor area 498. For example, the opening 504 can have a width within a range from 2 to 7 meters (e.g., from 4 to 6 meters). The building 104*b* can further include an overhead door 506 (e.g., a door that moves upward to open and stows overhead in a rolled or unrolled state) movably disposed at the opening 504. The building 104*b* can also include a plumbing drain trunk line 507 and a water supply trunk line 508 operably associated with the building bathrooms 486. The plumbing drain trunk line 507 and the water supply trunk line 508 can have features the same as or similar to features of the plumbing drain trunk line 138 and the water supply trunk line 140 of the building 104*a* described above.

Figure 16:
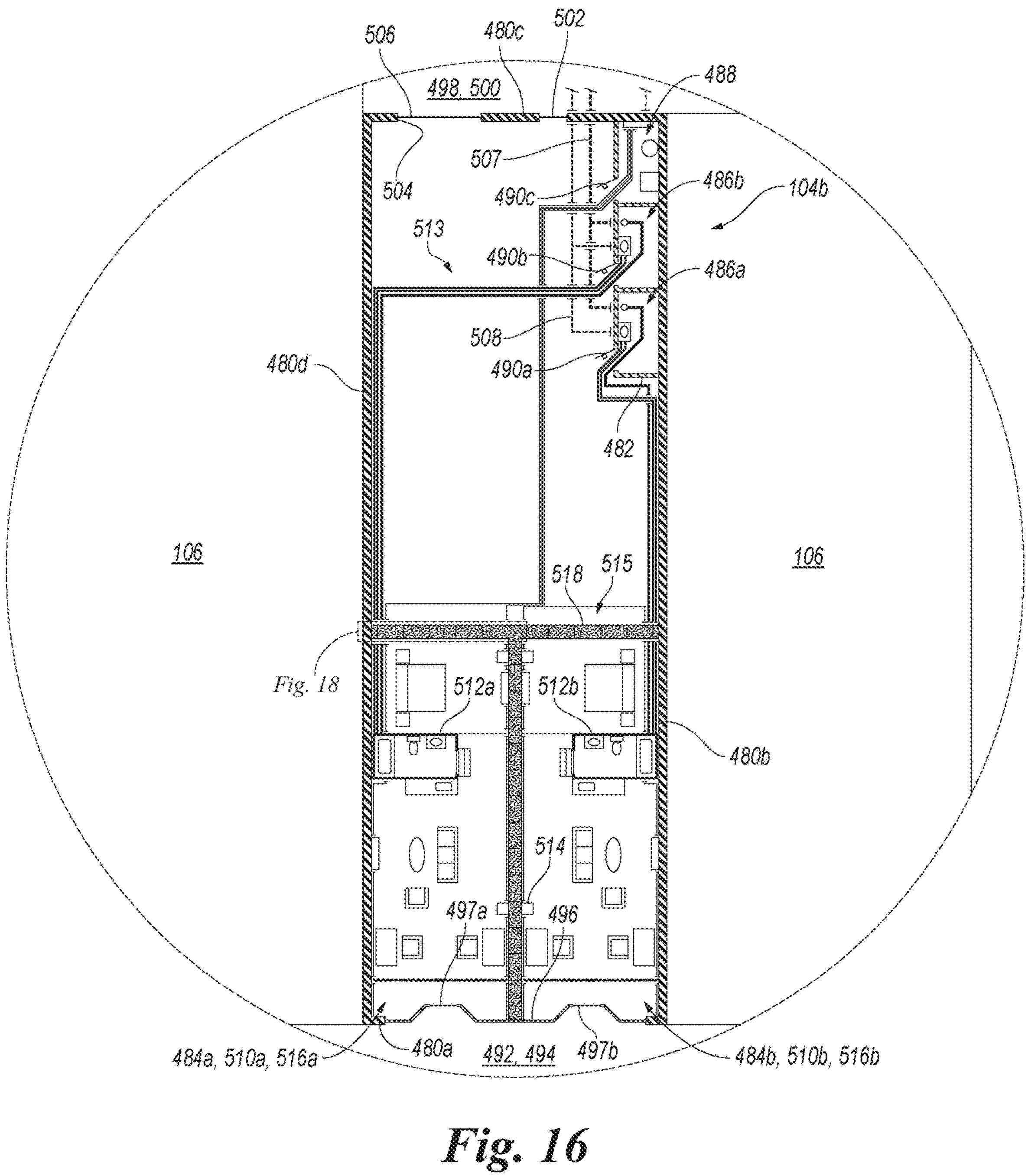
FIG. 16 is a cross-sectional top plan view of the building at the second block of the urban area shown in FIG. 1 taken along the line B-B in FIG. 14 and showing a cluster of lodging units of the hotel shown in FIG. 1, the cluster of lodging units including the interior regions within the building in the second state.

FIG. 16 is a cross-sectional top plan view of the building 104*b* taken along the line B-B in FIG. 14 and showing a cluster of lodging units 510 (individually identified as lodging units 510*a*, 510*b*) of the hotel 102. The lodging units 510*a*, 510*b* can include the interior regions 484*a*, 484*b*, respectively, in the second state. The interior regions 484 and the lodging units 510 can have features the same as or similar to the features of the interior region 114 and the lodging unit 150 described above. As shown in FIG. 16, the lodging units 510*a*, 510*b* can respectively include bathrooms 512 (individually identified as bathrooms 512*a*, 512*b*) disposed (e.g., removably disposed) within the building 104*b*. The bathrooms 512 can have features the same as or similar to the features of the bathroom 152 described above. The cluster of lodging units 510 can further include retrofitted support systems 513 having features the same as or similar to the features of the retrofitted support systems described above for the lodging unit 150. The retrofitted support systems 513 can include retrofitted ventilation lines, retrofitted exhaust lines, and a retrofitted exhaust filter, which are not shown for clarity of illustration. Among other furnishings, the lodging units 510 can include climate-control units 514 (e.g., supplemental heaters) operably connected to the retrofitted support systems 513.

The cluster of lodging units 510 can further include a compartmentalizing assembly 515. The interior regions 484*a*, 484*b* can be respectively located within compartments 516 (individually identified as compartments 516*a*, 516*b*) at least partially defined by the compartmentalizing assembly 515. The compartmentalizing assembly 515 can include wall components 518 disposed at perimeter portions of the compartments 516. The wall components 518 and/or other suitable components of the compartmentalizing assembly 515 can be reusable and removably disposed within the building 104*b*. For example, the compartmentalizing assembly 515 can be made up mostly or entirely of reusable modular components. In at least some embodiments, the wall components 518 are stacked and/or interlocking within the compartmentalizing assembly 515.

Figure 17:
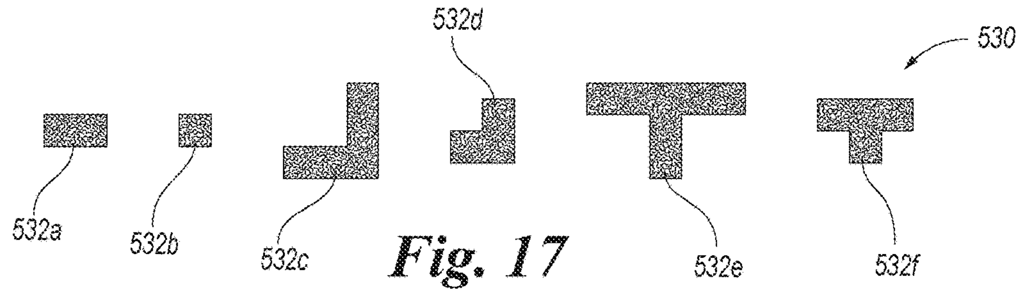
FIG. 17 is top plan view of a set of wall components in accordance with an embodiment of the present technology.

FIG. 17 is top plan view of a set of wall components 530 in accordance with an embodiment of the present technology. The set 530 can include wall components of different types 532 (individually identified as types 532*a*-532*f*). Some or all of the wall component types 532 shown in FIG. 17 can be used together to make compartmentalizing assemblies in accordance with embodiments of the present technology, such as the compartmentalizing assembly 515 shown in FIG. 16. With reference to FIGS. 16 and 17 together, the wall components 518 can be of the type 532*a* in staggered rows of the compartmentalizing assembly 515. At portions of the compartmentalizing assembly 515 closest to the storefront 496 and the exterior walls 480*b*, 480*d*, the wall components 518 can be of the type 532*b* at every other row of the compartmentalizing assembly 515 between wall components 518 of the type 532*a*. In at least some embodiments, the wall components 518 of the type 532*a* have rectangular footprints with aspect ratios of 2:1. In these and other embodiments, the wall components 518 of the type 532*b* can have square footprints. Thus, when seams between the wall components 518 of the type 532*a* are evenly staggered row-to-row, the wall components 518 of the type 532*b* can cap the short rows, thereby giving the compartmentalizing assembly 515 vertical end portions at or near the storefront 496 and the exterior walls 480*b*, 480*d*. Similarly, the wall components 518 can be of the types 532*c*, 532*d* in alternatingly stacked rows at a T-shaped intersection of the compartmentalizing assembly 515. In other embodiments, counterpart compartmentalizing assemblies can include wall components of the types 532*e*, 532*f* in alternatingly stacked rows to form L-shaped intersections. Similarly, counterpart compartmentalizing assemblies can include full-size and reduced-size cross-shaped wall components in alternatingly stacked rows to form cross-shaped intersections.

Figure 18:
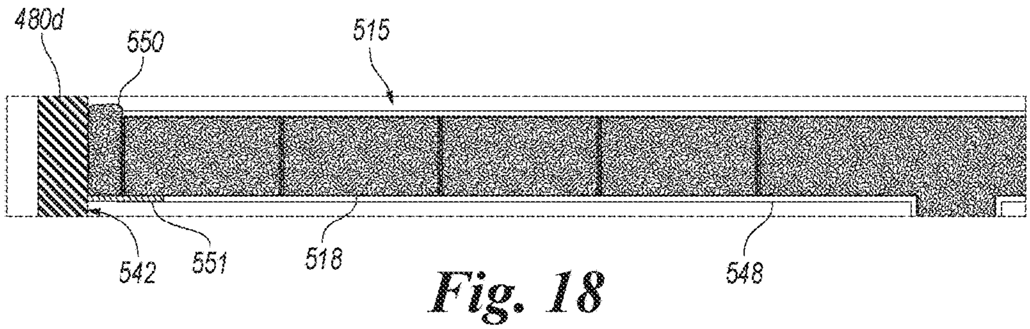
FIG. 18 is an enlarged view of a portion of FIG. 16.
Figure 19:
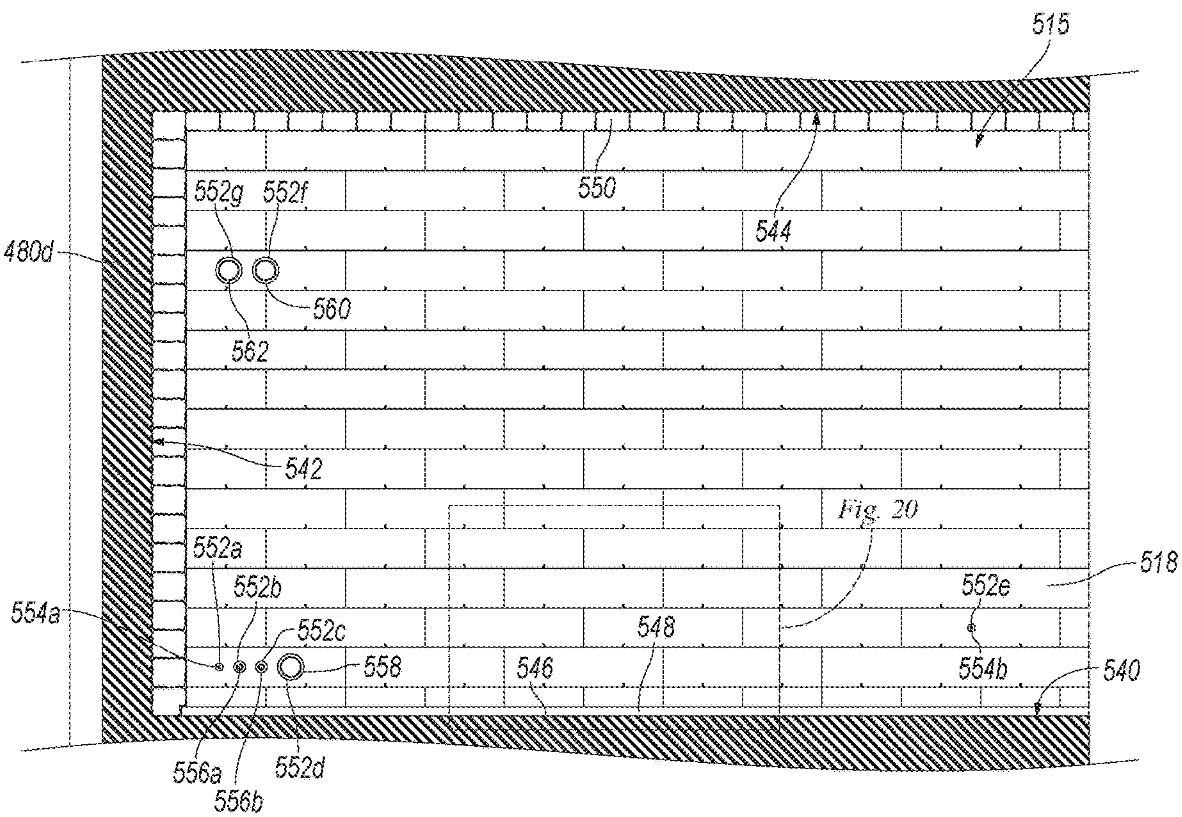
FIG. 19 is a cross-sectional exterior side profile view of a portion of the cluster of lodging units shown in FIG. 16 corresponding to the portion of FIG. 16 shown in FIG. 18.

FIG. 18 is an enlarged view of a portion of FIG. 16. FIG. 19 is a cross-sectional exterior side profile view of a portion of the cluster of lodging units 510 corresponding to the portion of FIG. 16 shown in FIG. 18. With reference to FIGS. 16, 18 and 19 together, the building 104*b* can have a finished floor surface 540 over which the wall components 518 are removably disposed, a finished wall surface 542 beside which the wall components 518 are removably disposed, and a finished ceiling surface 544 below which the wall components 518 are removably disposed. The compartmentalizing assembly 515 can include a liner 546 disposed (e.g., removably or permanently disposed) on the finished floor surface 540 below the wall components 518. For example, the liner 546 can be adhesively connected to the finished floor surface 540. The liner 546 can be useful, for example, to protect the finished floor surface 540 from other components of the compartmentalizing assembly 515, to facilitate layout the compartmentalizing assembly 515, to reduce or eliminate the possibility of shifting of the compartmentalizing assembly 515, and/or for other purposes.

Suitable materials for the liner 546 include spray-and-peel coatings, strips of peel-and-stick house wrap, and strips of peel-and-stick roof underlayment, among other examples. The liner 546 can be disposable or reusable.

In at least some embodiments, the compartmentalizing assembly 515 includes additional components that facilitate compatibility between the wall components 518 and the building 104*b* when the wall components 518 have standard dimensions and the building 104*b* has irregular dimensions. For example, the compartmentalizing assembly 515 can include a mass of self-leveling material 548 (e.g., a disposable mass of hardened self-leveling grout) under the wall components 518 and over the liner 546. The mass of self-leveling material 548 can be molded and, in at least some cases, is integrally formed along most or all of an overall footprint of the compartmentalizing assembly 515. During formation of the mass of self-leveling material 548, the constituent self-leveling material can be of sufficiently low viscosity to level itself by gravity. Thus, the mass of self-leveling material 548 can automatically conform to slopes, dips, and other irregularities in the finished floor surface 540. When at least partially cured, the mass of self-leveling material 548 can provide the compartmentalizing assembly 515 with a reliably level surface that facilitates vertical stacking of the wall components 518.

As shown in FIGS. 18 and 19, the compartmentalizing assembly 515 can include compressible batting 550 disposed (e.g., stuffed) into a vertical gap between the wall components 518 and the finished wall surface 542 and disposed (e.g., stuffed) into a horizontal gap between the wall components 518 and the finished ceiling surface 544. In at least some embodiments, the batting 550 is reusable. Furthermore, the batting 550 can be non-combustible. For example, the batting 550 can be reusable bundles of lined or unlined mineral wool insulation. At its interior side, the compartmentalizing assembly 515 can include molding panels 551 that hide the batting 550. The molding panels 551 can be attached to the wall components 518 magnetically, adhesively, mechanically, or in another suitable manner. In some embodiments, the overall compartmentalizing assembly 515 is self-supporting, free-standing, and has a fire rating of at least two hours. In other embodiments, the overall compartmentalizing assembly 515 can have only some or none of these attributes. As shown in FIG. 19, some of the wall components 518 can be configured to allow passage of retrofitted utility lines. For example, the compartmentalizing assembly 515 can include ports 552 (individually identified as ports 552*a*-552*g*). The retrofitted support systems 513 can include electrical lines 554 (individually identified as electrical lines 554*a*, 554*b*) extending through the ports 552*a*, 552*e*, respectively; water supply lines 556 (individually identified as water supply lines 556*a*, 556*b*) extending through the ports 552*b*, 552*c*, respectively; a plumbing drain line 558 extending through the port 552*d*; a plumbing ventilation line 560 extending through the port 552*f*; and an exhaust vent line 562 extending through the port 552*g*.

Figure 20:
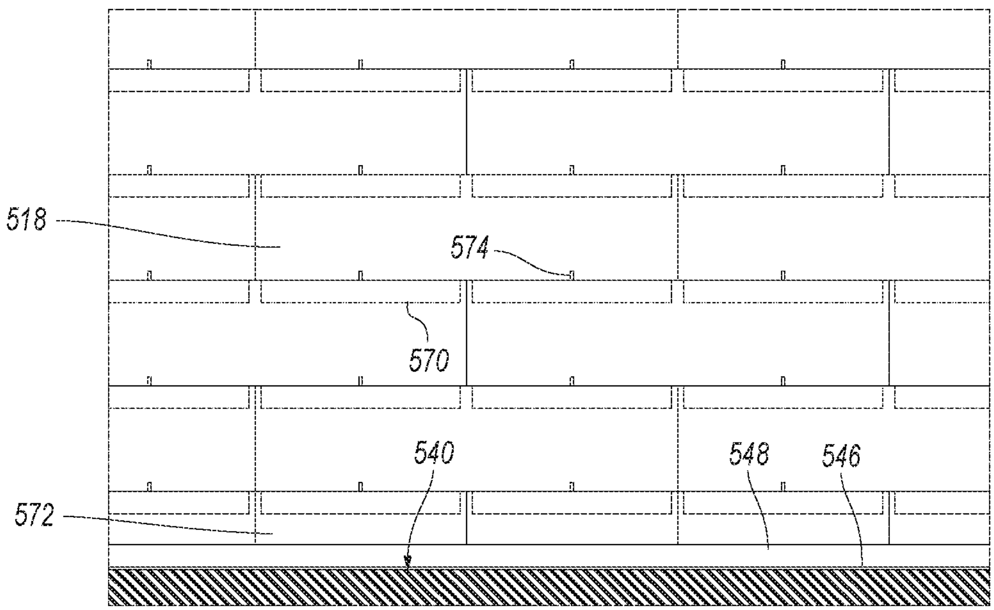
FIG. 20 is an enlarged view of a portion of FIG. 19.

FIG. 20 is an enlarged view of a portion of FIG. 19. As shown in FIG. 20, the wall components 518 can be stacked within the compartmentalizing assembly 515. Furthermore, the wall components 518 can be interlocking within the compartmentalizing assembly 515. For example, the individual wall components 518 can include downwardly extending flanges 570 that are received within successively lower wall components 518. At the mass of self-leveling material 548, the compartmentalizing assembly 515 can include base blocks 572 configured to receive the flanges 570 of the wall components 518 within a lowest row of wall components 518 within the compartmentalizing assembly 515. When fully assembled, the compartmentalizing assembly 515 can be strong enough to support fixtures and accessories (e.g., electrical conduits, monitors, shelving, moldings, artwork, furniture supports, etc.). In at least some embodiments, exposed portions of the wall components 518 are at least partially made of ferrous metal such that suitable fixtures and accessories can be connected to the compartmentalizing assembly 515 magnetically. In addition or alternatively, the wall components 518 can include coupling components 574 that allow suitable fixtures and accessories to be connected to the compartmentalizing assembly 515 mechanically and/or by gravity.

Figure 21:
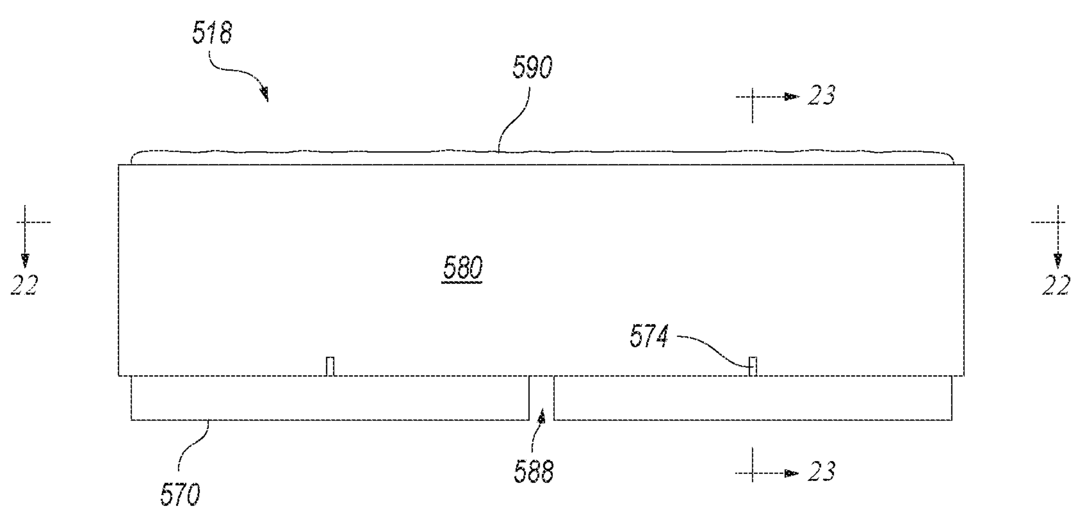
FIG. 21 is side profile view of a wall component of a compartmentalizing assembly of the hotel shown in FIG. 1.
Figure 22:
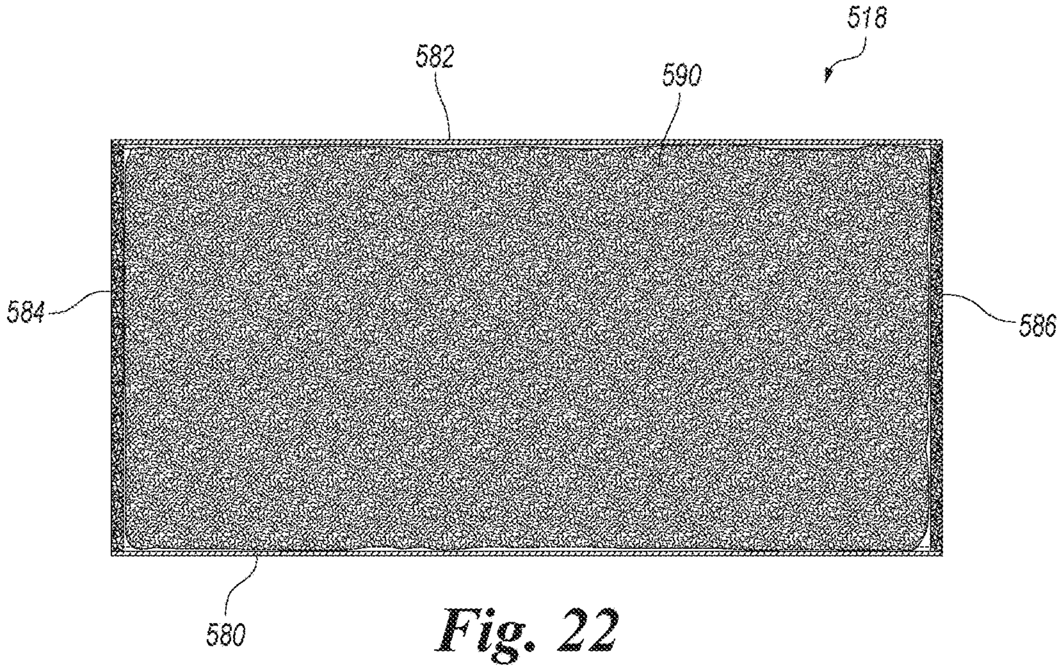
FIG. 22 is a cross-sectional top plan view of the wall component of the compartmentalizing assembly of the hotel shown in FIG. 1 taken along the line 22-22 in FIG. 21.
Figure 23:
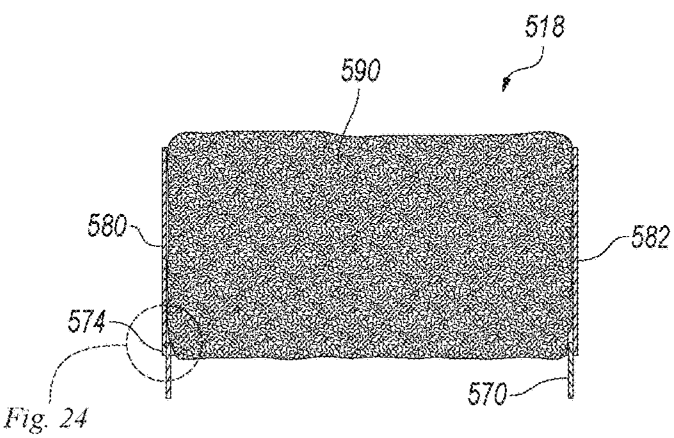
FIG. 23 is a cross-sectional end profile view of the wall component of the compartmentalizing assembly of the hotel shown in FIG. 1 taken along the line 23-23 in FIG. 21.

FIG. 21 is side profile view of a given one of the wall components 518 of the type 532*a* (FIG. 17) separate from other portions of the compartmentalizing assembly 515. FIG. 22 is a cross-sectional top plan view of the given wall component 518 taken along the line 22-22 in FIG. 21. FIG. 23 is a cross-sectional end plan view of the given wall component 518 taken along the line 23-23 in FIG. 21. In at least some embodiments, other (e.g., most or all) of the wall components 518 of the type 532*a* within the compartmentalizing assembly 515 at least substantially match the given wall component 518 illustrated in FIGS. 21-23. With reference to FIGS. 21-23 together, the given wall component 518 can include a first side panel 580 and an opposite second side panel 582 parallel to and spaced apart from the first side panel 580. Similarly, the given wall component 518 can include a first end panel 584 and an opposite second end panel 586 parallel to and spaced apart from the first end panel 584. The first and second side panels 580, 582 and the first and second end panels 584, 586 can define an interior region of the given wall component 518 shaped, for example, as a rectangular solid. The given wall component 518 can include two of the flanges 570 at the first side panel 580 and another two of the flanges 570 at the second side panel 582. As shown in FIG. 23, the flanges 570 can be parallel to and inset relative to the corresponding first and second side panels 580, 582. Between the flanges 570 at the first side panel 580 and between the flanges 570 at the second side panel 582, the given wall component 518 can include respective slots 588.

When the given wall component 518 is assembled with other wall components 518 of the type 532*a* within the compartmentalizing assembly 515, one of the flanges 570 at the first side panel 580 and an opposing one of the flanges 570 at the second side panel 582 can be received within the interior region of a first neighboring lower wall component 518. Similarly, the other of the flanges 570 at the first side panel 580 and the other of the flanges 570 at the second side panel 582 can be received within the interior region of a second neighboring lower wall component 518 adjacent to the first neighboring lower wall component 518. The second end panel 586 of the first neighboring lower wall component 518 and the first end panel 584 of the second neighboring lower wall component 518 can be directly adjacent to one another and received within the slots 588 of the given wall component 518. This interaction between the wall components 518 can facilitate convenient assembly of the compartmentalizing assembly 515 with neighboring rows of the wall components 518 evenly staggered.

In at least some embodiments, the given wall component 518 is rigid and the first and second side panels 580, 582 and the first and second end panels 584, 586 provide the given wall component 518 with most or all of its rigidity. In the illustrated embodiment, the first and second side panels 580, 582 are thinner than the first and second end panels 584, 586 and made of a different material. For example, the first and second side panels 580, 582 can be metal (e.g., iron) and the first and second end panels 584, 586 can be cementitious (e.g., fiber-reinforced cement). The metal composition of the first and second side panels 580, 582 can be useful, for example, for aesthetics, to facilitate magnetic coupling of fixtures and accessories to the compartmentalizing assembly 515, and/or for another reason. The cementitious composition of the first and second end panels 584, 586 can be useful, for example, to increase the fire rating of the compartmentalizing assembly 515, to reduce noise transmission through the compartmentalizing assembly 515, and/or for another reason. In other embodiments, the first and second side panels 580, 582 and the first and second end panels 584, 586 can have other suitable forms and/or compositions.

The given wall component 518 can further include compressible batting 590 disposed within its interior region. Similar to the batting 550 described above, the batting 590 can be reusable and/or non-combustible. For example, the batting 590 can be reusable bundles of lined or unlined mineral wool insulation. In at least some embodiments, the batting 590 is removable. Furthermore, the first and second side panels 580, 582 and the first and second end panels 584, 586 can be collapsible. For example, at corners where the first and second side panels 580, 582 and the first and second end panels 584, 586 meet, the given wall component 518 can include hinges (not shown), such as flexure bearings or piano hinges that allow each corner to fold in a direction that causes the first and second side panels 580, 582 and the first and second end panels 584, 586 to flatten. This feature along with the compressibility of the batting 590 can facilitate efficient storage and transport of the given wall component 518 between deployments. When the first and second side panels 580, 582 and the first and second end panels 584, 586 are collapsible, the given wall component 518 can include a rectangular inset (not shown) that rests on upper edges of the flanges 570. The inset can be removably disposed within the interior of the given wall component 518 to cause the given wall component 518 to maintain its rectangular form during use. When the first and second side panels 580, 582 and the first and second end panels 584, 586 are to be collapsed, the inset can be removed.

Figure 24:
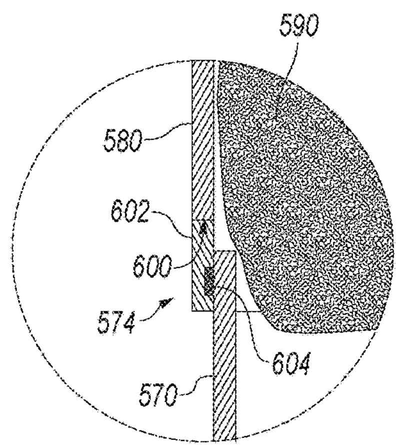
FIG. 24 is an enlarged view of a portion of FIG. 23.

FIG. 24 is an enlarged view of a portion of FIG. 23. As shown in FIG. 24, a lowermost portion of the first side panel 580 can overlap an uppermost portion of one the flanges 570. FIG. 24 further illustrates a given one of the coupling components 574 at the lowermost portion of the first side panel 580. In at least some embodiments, other (e.g., most or all) of the coupling components 574 of wall components 518 within the compartmentalizing assembly 515 at least substantially match the coupling component 574 illustrated in FIG. 24. The coupling component 574 can include a notch 600 and a plug 602 removably disposed within the notch 600. The plug 602 can include a magnet 604 that releasably connects the plug 602 to the uppermost portion of the adjacent flange 570. The plug 602 can be disposed within the notch 600 when the coupling component 574 is not in use. Removing the plug 602 from the notch 600 can expose an opening into the interior of the given wall component 518. A hook or other suitable mechanical fastener (not shown) can be inserted into this opening. In this way, relatively heavy fixtures and accessories can be connected to the compartmentalizing assembly 515 through a reliable mechanical connection in addition to or instead of a magnetic connection.

Figure 25:
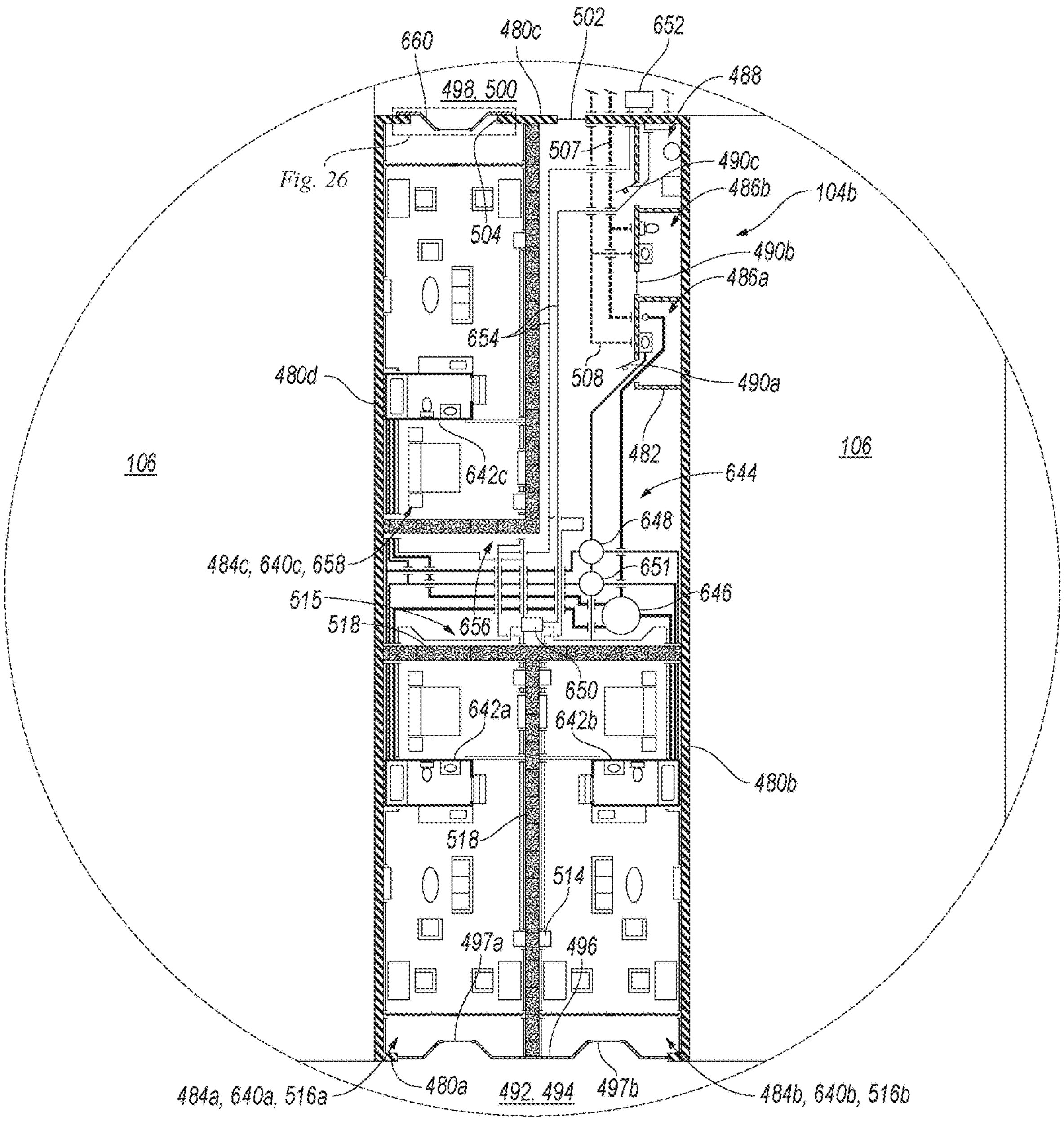
FIG. 25 is a cross-sectional top plan view of the building at the second block of the urban area shown in FIG. 1 taken along the line B-B in FIG. 14 and showing a cluster of lodging units of a hotel in accordance with another embodiment of the present technology, the cluster of lodging units including the interior regions within the building in the second state.

FIG. 25 is a cross-sectional top plan view of the building 104*b* taken along the line B-B in FIG. 14 and showing a cluster of lodging units 640 (individually identified as lodging units 640*a*-640*c*) of a hotel in accordance with another embodiment of the present technology. The lodging units 640*a*-640*c* can include the interior regions 484*a*-484*c* (FIG. 15), respectively, in the second state. The lodging units 640 can have features the same as or similar to the features of the lodging units 150, 510 described above. As shown in FIG. 25, the lodging units 640*a*-640*c* can respectively include bathrooms 642 (individually identified as bathrooms 642*a*-642*c*) disposed (e.g., removably disposed) within the building 104*b*. The bathrooms 642 can have features the same as or similar to the features of the bathroom 152, 512 described above. The cluster of lodging units 640 can further include retrofitted support systems 644 having features the same as or similar to the features of the retrofitted support systems 513 of the lodging units 510 and the retrofitted support systems described above for the lodging units 150.

As shown in FIG. 25, the retrofitted support systems 644 can include an above-floor sewage detention tank 646, an above-floor water reservoir 648, and a battery 650 through which the lodging units 640 are operably connected to sewage, water, and electrical systems of the building 104*b*, respectively. The retrofitted support systems 644 can further include a water heater 651 operably connected to the above-floor water reservoir 648. In at least some cases, the above-floor sewage detention tank 646, the above-floor water reservoir 648, the battery 650, and the water heater 651 are reusable and removably disposed within the building 104*b*. The retrofitted support systems 644 can further include a compressor 652 and above-floor refrigerant lines 654 through which climate-control units 514 of the lodging units 640 are operably connected to the compressor 652. The above-floor refrigerant lines 654 can be reusable and removably disposed within the building 104*b*. The compressor 652 can be reusable and removably disposed outside the building 104*b*. The retrofitted support systems 644 can still further include retrofitted ventilation lines, retrofitted exhaust lines, and a retrofitted exhaust filter, which are not shown for clarity of illustration.

The cluster of lodging units 640 can further include an additional compartmentalizing assembly 656. The interior region 484*c* can be located within an additional compartment 658 at least partially defined by the additional compartmentalizing assembly 656. The additional compartmentalizing assembly 656 can have features the same as or similar to the features of the compartmentalizing assembly 515 of the cluster of lodging units 510 described above. As shown in FIG. 25, the additional compartment 658 is near the opening 504. The lodging unit 640*c* can include a barrier 660 disposed between the interior region 484*c* and the second outdoor area 498. For example, a primary egress path from the interior region 484*c* to the second outdoor area 498 can extend through the opening 504 and through the barrier 660. Furthermore, the barrier 660 can be stationarily disposed between the interior region 484*c* and the second outdoor area 498. For example, unlike the overhead door 506, which is configured to move on a regular basis during normal operation of the interior region 484*c* in the first state, the barrier 660 can be configured to remain at least substantially stationary during normal operation of the lodging unit 640*c*.

Figure 26:
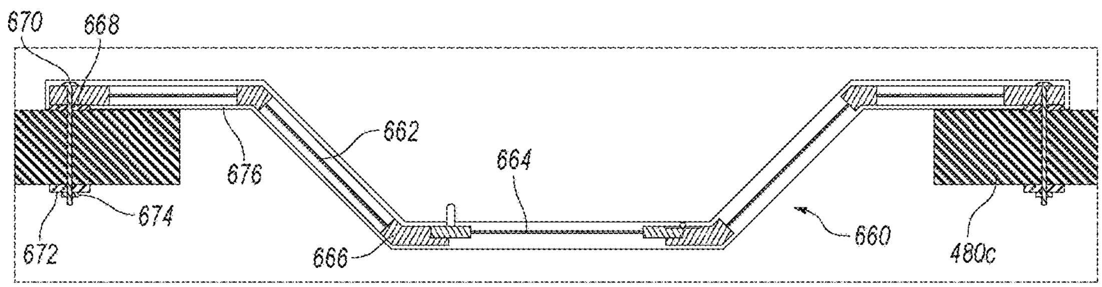
FIG. 26 is an enlarged view of a portion of FIG. 25.
Figure 27:
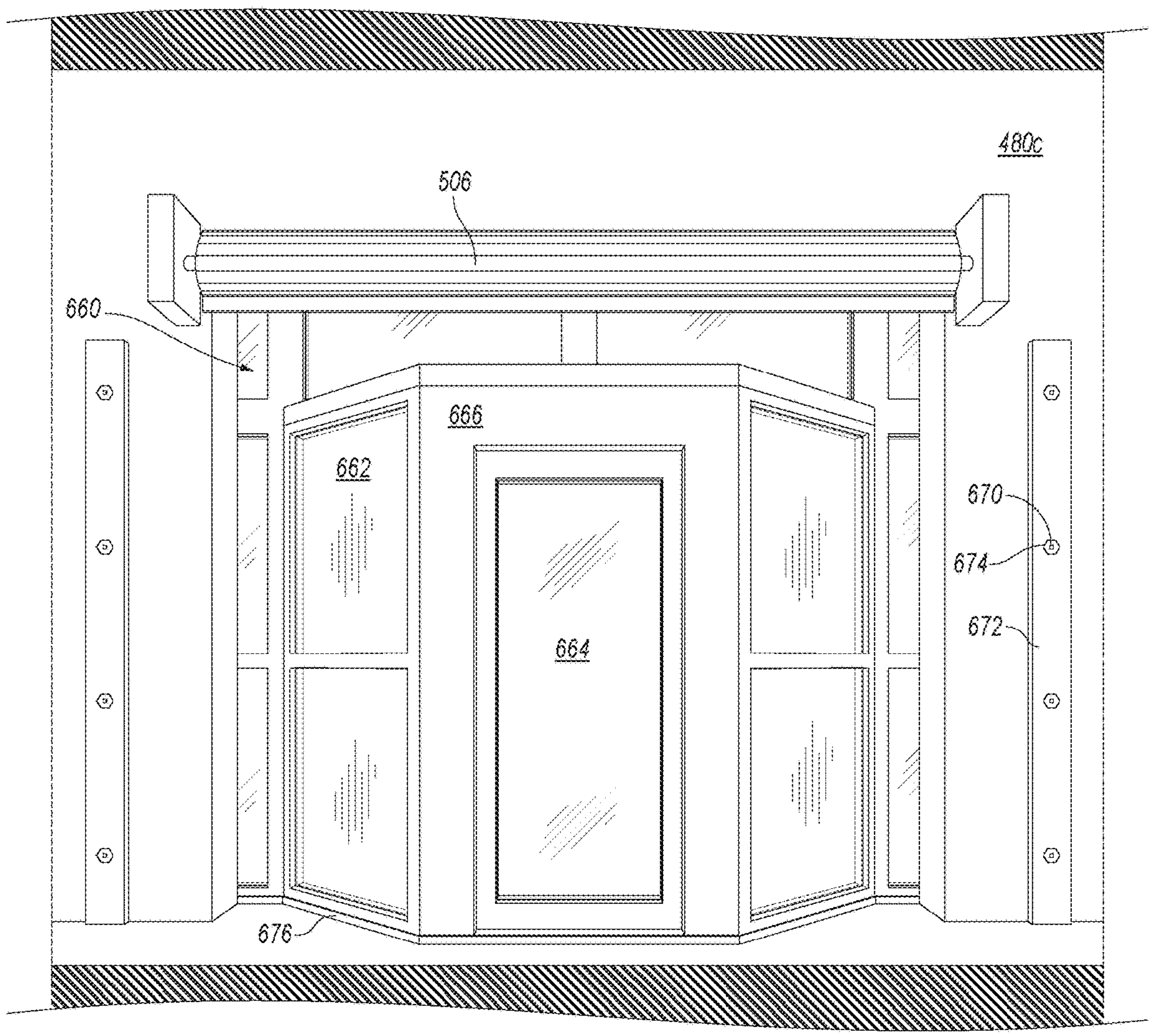
FIG. 27 is a cross-sectional exterior side profile view of a portion of the cluster of lodging units shown in FIG. 25 corresponding to the portion of FIG. 25 shown in FIG. 26.

FIG. 26 is an enlarged view of a portion of FIG. 25. FIG. 27 is a cross-sectional exterior side profile view of a portion of the cluster of lodging units 640 corresponding to the portion of FIG. 25 shown in FIG. 26. With reference to FIGS. 25-27 together, the barrier 660 can be fenestrated and can include windows 662 that allow natural light to enter the interior region 484*c* from the second outdoor area 498. The barrier 660 can further include a door 664. The barrier 660 can be reusable and removably disposed between the interior region 484*c* and the second outdoor area 498. For example, the barrier 660 can be configured to be installed with little or no need for heavy construction and removed with little or no need for heavy demolition. Furthermore, the barrier 660 can be configured to be conveniently transported and reused after its removal. In the illustrated embodiment, the barrier 660 is rigid, portable, and configured for rapid deployment into and removal from operable association with the interior region 484*c* without significant disassembly. This deployment and removal can occur by forklift, by dolly, by operation of wheels (not shown) integrated into the barrier 660, or in another manner. In other embodiments, a counterpart of the barrier 660 can be an assembly of reusable barrier modules configured for rapid deployment into and removal from between the interior region 484*c* and the second outdoor area 498 in an at least partially disassembled state. For example, a counterpart of the barrier 660 can be made up mostly or entirely of reusable modular components.

With reference again to FIGS. 25-27, the barrier 660 can be removably fastened to the exterior wall 480*c*. For example, the barrier 660 can be removably bolted to the exterior wall 480*c*. Alternatively, a counterpart of the barrier 660 can be removably screwed to the exterior wall 480*c*, removably clamped to the exterior wall 480*c*, and/or removably fastened to the exterior wall 480*c* in another manner in addition to or instead of being removably bolted to the exterior wall 480*c*. As yet another alternative, a counterpart of the barrier 660 can be permanently installed at the exterior wall 480*c*. As shown in FIG. 27, the barrier 660 can include a frame 666 and a gasket 668 disposed between the frame 666 and the exterior wall 480*c*. The gasket 668 can be compressible such that it conforms to irregularities in the exterior wall 480*c* and thereby enhances a weather resistance of a connection between the barrier 660 and the exterior wall 480*c*. The barrier 660 can further include bolts 670 that extend through the frame 666, through the gasket 668, and through the exterior wall 480*c*. At an inside surface of the exterior wall 480*c*, the barrier 660 can include furring strips 672 through which the bolts 670 also extend, and nuts 674 operably connected to the bolts 670 and bearing on the furring strips 672. The barrier 660 can further include a mass of self-leveling material 676 having features the same as or similar to features of the mass of self-leveling material 548 described above. The self-leveling material 676 can be integrally formed along most or all of an overall footprint of the barrier 660.

In the illustrated embodiment, the barrier 660 is an overlay that covers the opening 504 at an exterior side of the exterior wall 480*c*. In other embodiments, the barrier 660 can have another form and/or position relative to the opening 504. For example, rather than being disposed at the exterior side of the exterior wall 480*c*, a counterpart of the barrier 660 can be disposed at an interior side of the exterior wall 480*c*. As another example, rather than overlying the opening 504, the barrier 660 can be inset within the opening 504. As shown in FIG. 27, in the illustrated embodiment, the overhead door 506 is stowed within the interior region 484*c* in an open state. For example, a door track (not shown) associated with the overhead door 506 can remain in place after the interior region 484*c* is retrofitted for lodging use. A motor (not shown) operably associated with the overhead door 506 can be temporarily disabled so that the overhead door 506 remains out-of-service during operation of the lodging unit 510*c*. Leaving the overhead door 506, the door track, and the motor in place after the interior region 484*c* is retrofitted for an alternative use can be useful, for example, to reduce an investment necessary to return the interior region 484*c* its purpose-built use, as needed. In other embodiments, the overhead door 506, the door track, and/or the motor can be removed when the interior region 484*c* is retrofitted for lodging use. In still other embodiments, a counterpart of the overhead door 506 can be retrofitted with windows and/or a doorway. In these embodiments, the counterpart of the overhead door 506 can take the place of the barrier 660.

Figure 28:
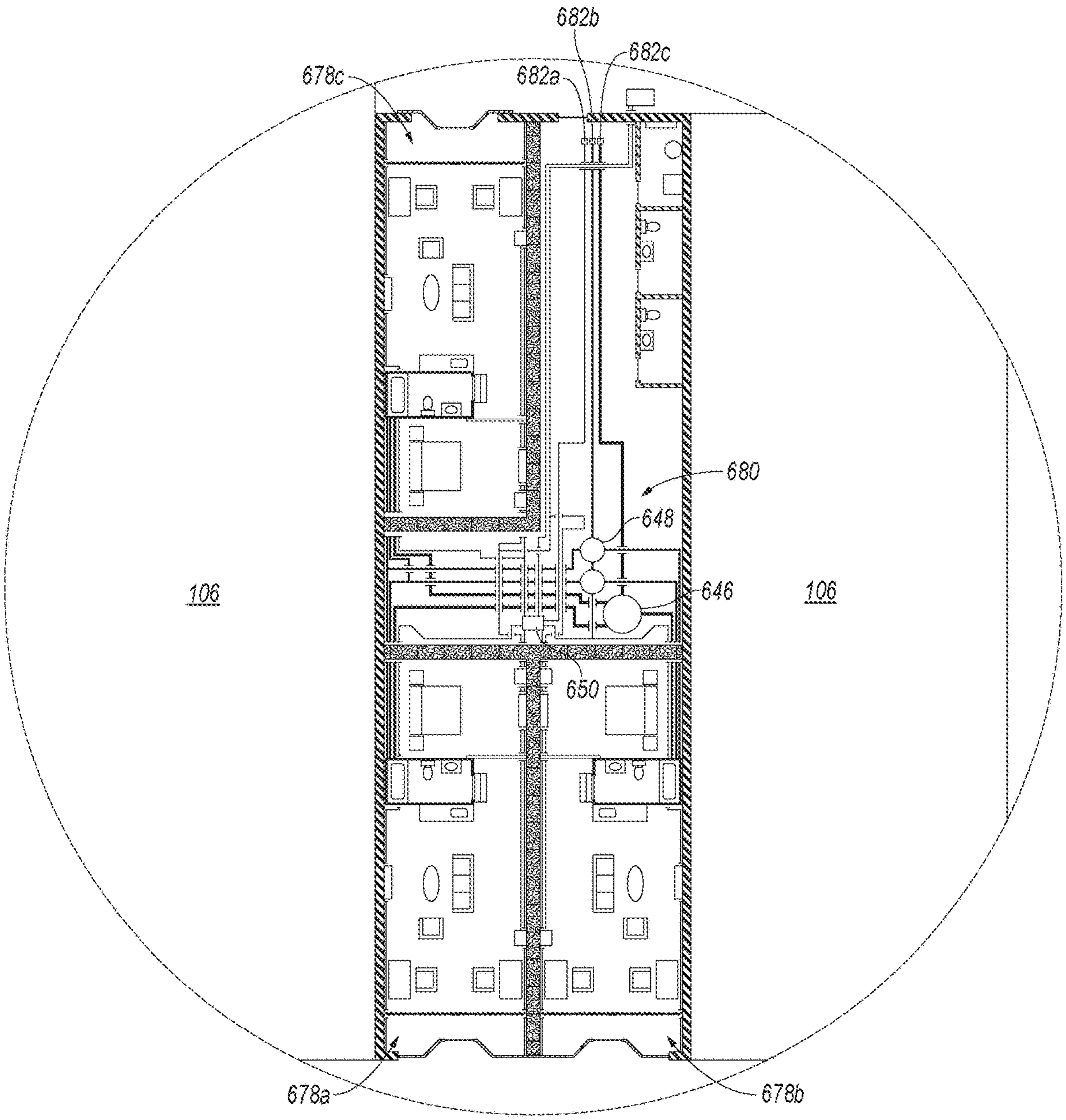
FIG. 28 is a cross-sectional top plan view of the building at the second block of the urban area shown in FIG. 1 taken along the line B-B in FIG. 14 and showing a cluster of lodging units of a hotel in accordance with another embodiment of the present technology, the cluster of lodging units including the interior regions within the building in the second state.

In the embodiment illustrated in FIG. 25, the cluster of lodging units 640 is tethered to the building bathroom 486*a* and the utility room 488. The cluster of lodging units 640, therefore, can be on-grid (i.e., dependent on service connections to local utilities serving the building 104*b*). In other embodiments, a counterpart of the cluster of lodging unit 640 can be configured to operate at least substantially off-grid (i.e., independent of service connections to local utilities serving the building 104*b*). One example of such a cluster of lodging units is shown in FIG. 28. In particular, FIG. 28 is a cross-sectional top plan view of the building 104*b* taken along the line B-B in FIG. 14 and showing a cluster of lodging units 678 (individually identified as lodging units 678*a*-678*c*) of a hotel in accordance with another embodiment of the present technology. The lodging units 678*a*-678*c* can include the interior regions 484*a*-484*c* (FIG. 15), respectively, in the second state. The lodging units 678 can have features the same as or similar to the features of the lodging units 150, 510, 640 described above. For example, the cluster of lodging units 678 can include retrofitted support systems 680 similar to the retrofitted support systems 644 described above in the context of the cluster of lodging units 640.

As shown in FIG. 28, the retrofitted support systems 680 can include hookups 682 (individually identified as hookups 682*a*-682*c*) through which the battery 650, the above-floor water reservoir 648, and the above-floor sewage detention tank 646 of the retrofitted support systems 680 can be respectively serviced. For example, the battery 650 of the cluster of lodging units 678 can be configured for occasional recharging from a mobile recharging station (not shown) via the hookup 682*a*. As another example, the above-floor water reservoir 648 of the cluster of lodging units 678 can be configured for occasional replenishment from a mobile tanker (e.g., a water supply truck) via the hookup 682*b*. As yet another example, the above-floor sewage detention tank 646 of the cluster of lodging units 678 can be configured for occasional evacuation into a mobile tanker (e.g., a septic system pump truck) via the hookup 682*c*. Having all or a portion of the retrofitted support systems 680 be off-grid can be useful, for example, to avoid costs and complications associated with utility hookups, to reduce the environmental impact of the lodging units 678, to facilitate efficient management of the lodging units 678, to reduce costs associated with maintaining the lodging units 678 during periods of nonuse or low use, and/or for other reasons.

Figure 29:
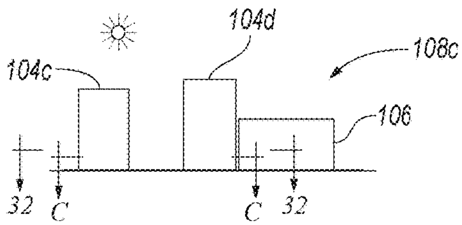
FIG. 29 is a front profile view of a third block of the urban area shown in FIG. 1.
Figure 30:
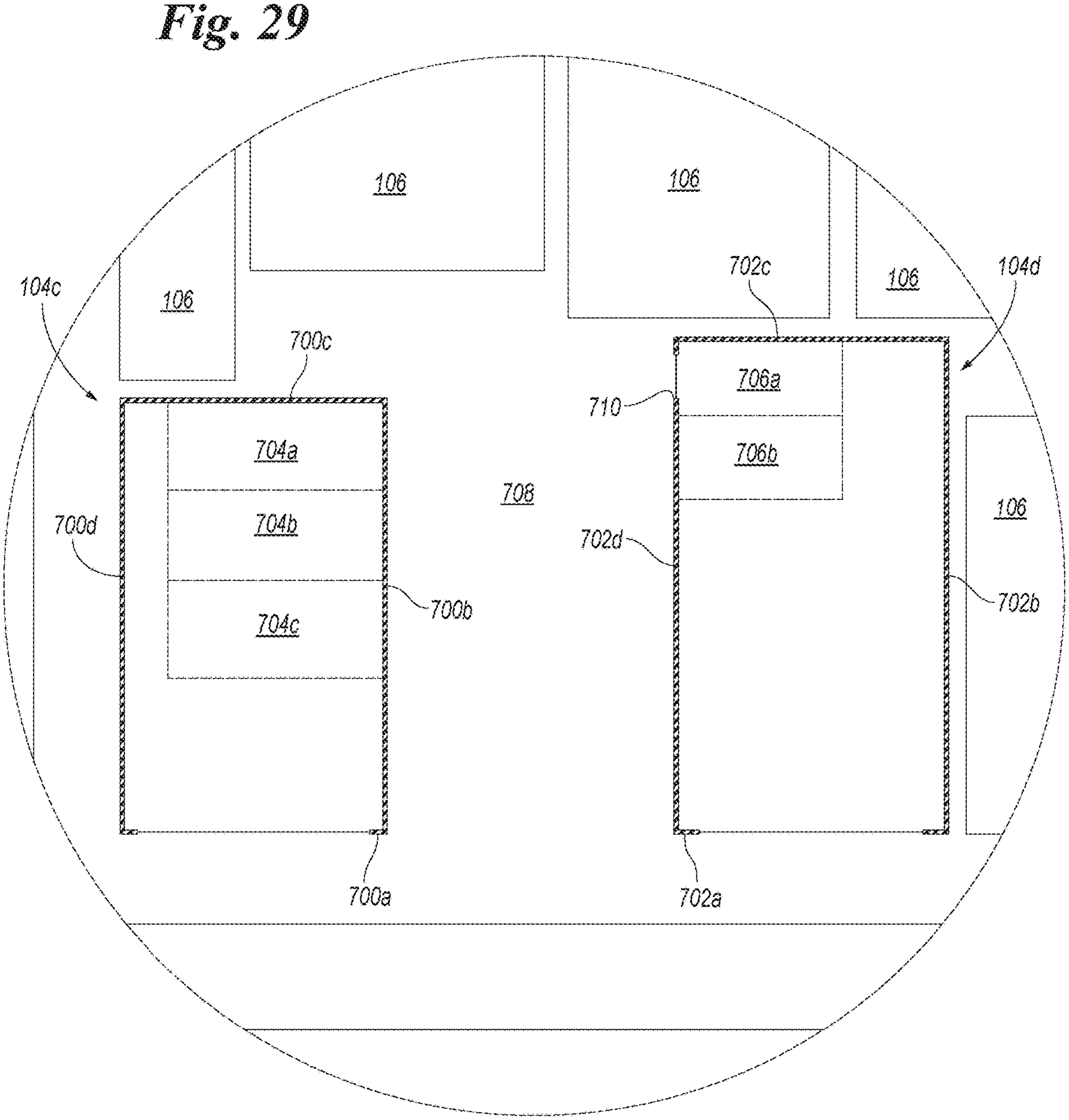
FIG. 30 is a cross-sectional top plan view of buildings at the third block of the urban area shown in FIG. 1 taken along the line C-C in FIG. 29 with interior regions within the buildings in the first state.

FIG. 29 is a front profile view of the block 108*c*. FIG. 30 is a cross-sectional top plan view of the buildings 104*c*, 104*d* at the block 108*c* taken along the line C-C in FIG. 29. The building 104*c* can include permanent exterior walls 700 (individually identified as exterior walls 700*a*-700*d*). Similarly, the building 104*d* can include permanent exterior walls 702 (individually identified as exterior walls 702*a*-702*d*). Within the exterior walls 700, the building 104*c* can include interior regions 704 (individually identified as interior regions 704*a*-704*c*). Similarly, within the exterior walls 702, the building 104*d* can include interior regions 706 (individually identified as interior regions 706*a*, 706*b*). In FIG. 30, the interior regions 704, 706 are shown in the first state. In at least some embodiments, the interior regions 704, 706 are purpose-built for respective uses independently selected from the group consisting of retail use, office use, restaurant use, industrial use, warehouse use, storage use, garage use, and combinations thereof. The exterior wall 700*b* can be between the interior regions 704 and an intra-block paved area 708. Similarly, the exterior wall 702*d* can be between the interior regions 706 and the intra-block paved area 708. At the exterior wall 702*d*, the building 104*d* can include an opening 710 between the interior region 706*a* and the intra-block paved area 708. The opening 710 can have features similar to or the same as features of the opening 504 described above.

Figure 31:
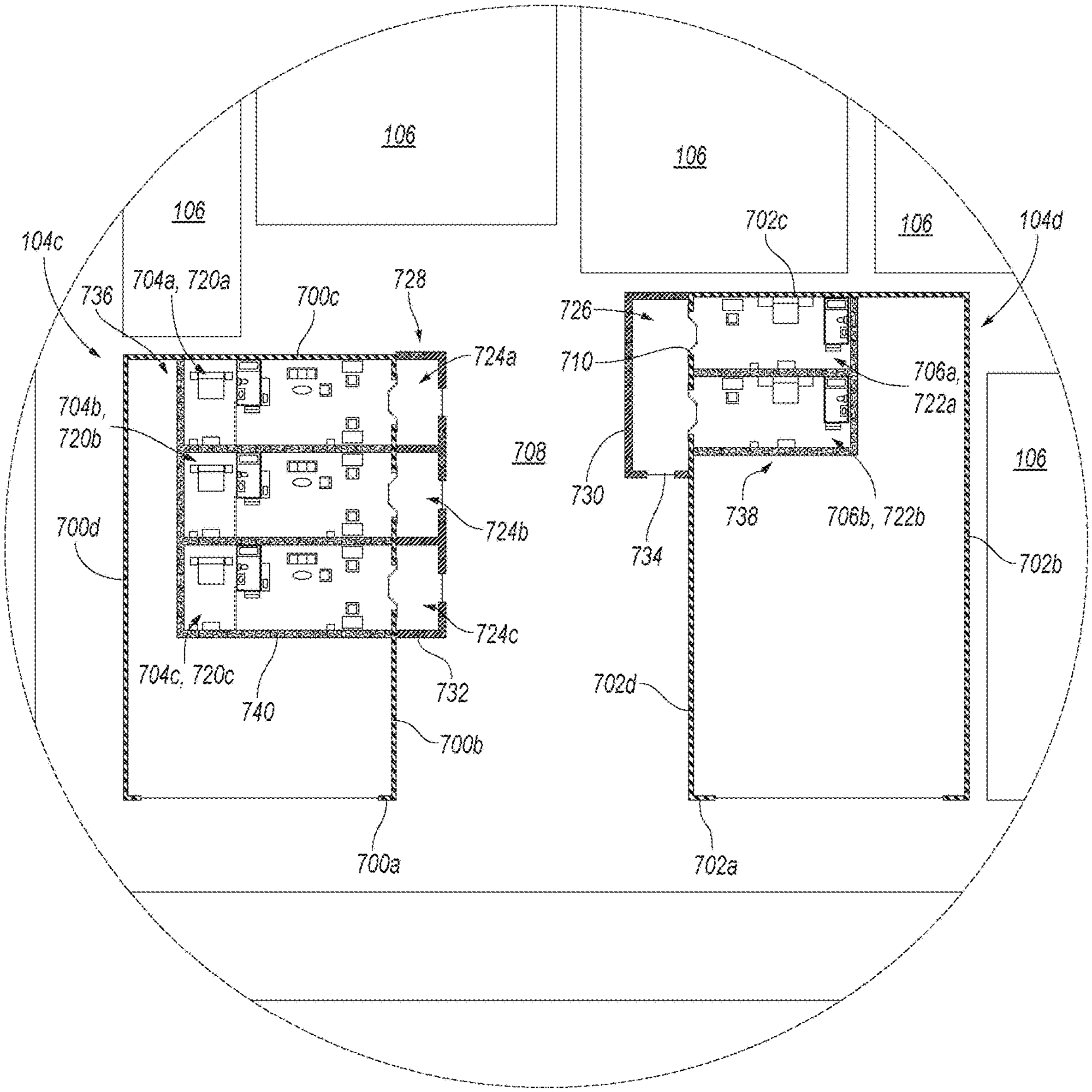
FIGS. 31 and 32 are cross-sectional top plan views of the buildings at the third block of the urban area shown in FIG. 1 taken, respectively, along the lines C-C and 32-32 in FIG. 29 and showing a cluster of lodging units of the hotel shown in FIG. 1, the cluster of lodging units including the interior regions within the buildings in the second state.

FIG. 31 is a cross-sectional top plan view of the buildings 104*c*, 104*d* taken along the line C-C in FIG. 29 and showing a cluster of lodging units 720 (individually identified as lodging units 720*a*-720*c*) and another cluster of lodging units 722 (individually identified as lodging units 722*a*, 722*b*) of the hotel 102. The lodging units 720*a*-720*c* can include the interior regions 704*a*-704*c*, respectively, in the second state. The lodging units 722*a*, 722*b* can include the interior regions 706*a*, 706*b*, respectively, in the second state. The interior regions 704, 706 and the lodging units 720, 722 can have features the same as or similar to the features of the interior regions 114, 484 and the lodging units 150, 510, 640, 678 described above. As shown in FIG. 31, the cluster of lodging units 720 can include retrofitted courtyards 724 (individually identified as courtyards 724*a*-724*c*) at a portion of the intra-block paved area 708 closest to the building 104*c*. Similarly, the cluster of lodging units 722 can include a retrofitted courtyard 726 at a portion of the intra-block paved area 708 closest to the building 104*d*.

The cluster of lodging units 720 can include an exterior enclosure 728 at least partially defining the courtyards 724. Similarly, the cluster of lodging units 722 can include an exterior enclosure 730 at least partially defining the courtyard 726. In the illustrated embodiment, the courtyards 724, 726 are open air. In other embodiments, all or a portion of counterparts of the courtyards 724, 726 can have a roof (e.g., to define a solarium). As shown in FIG. 31, the exterior enclosures 728, 730 can include exterior wall components 732 and gates 734 disposed at perimeter portions of the courtyards 724, 726. The exterior enclosures 728, 730 can have features similar to or the same as features of the compartmentalizing assembly 515 described above. For example, the exterior wall components 732 can be the same as or similar to the wall components 518 described above. In at least some cases, the exterior wall components 732 are planters that support vegetation (not shown). For example, the exterior wall components 732 can internally support root systems (not shown) of the vegetation. Thus, the exterior enclosures 728, 730 can include living walls.

Figure 32:
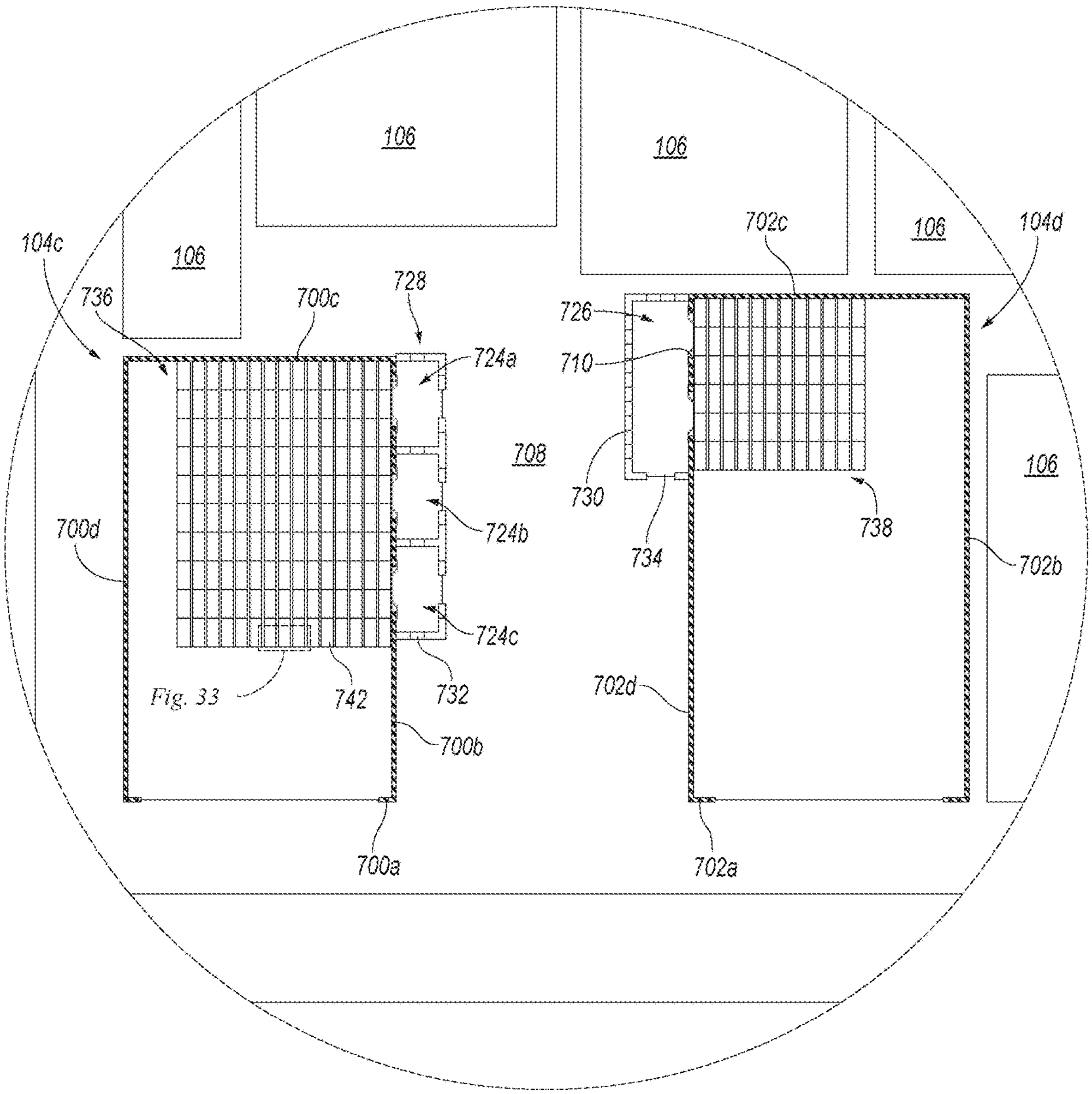
Figure 33:
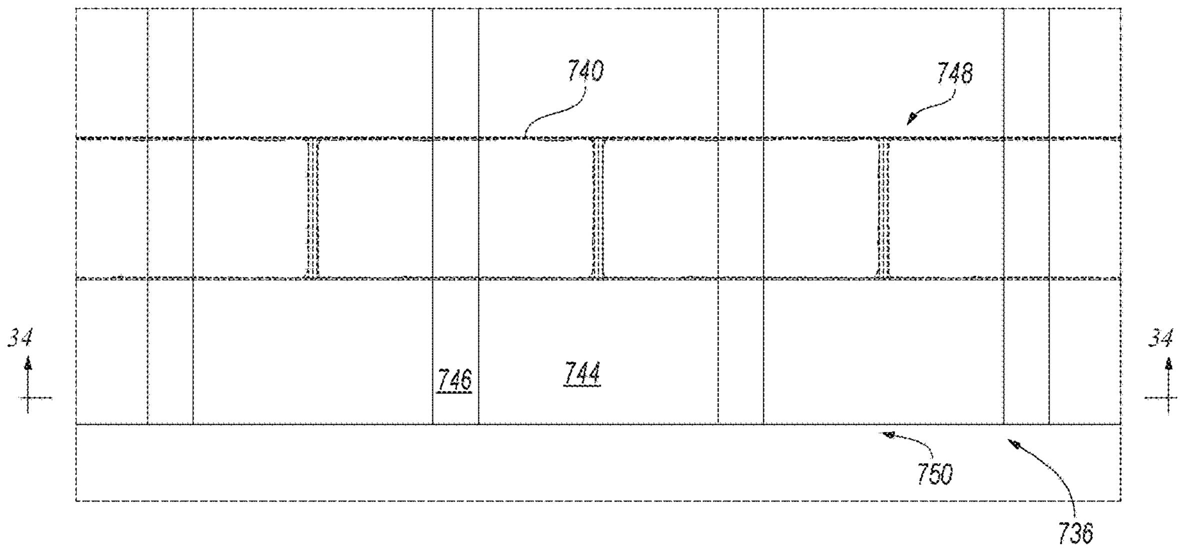
FIG. 33 is an enlarged view of a portion of FIG. 32.
Figure 34:
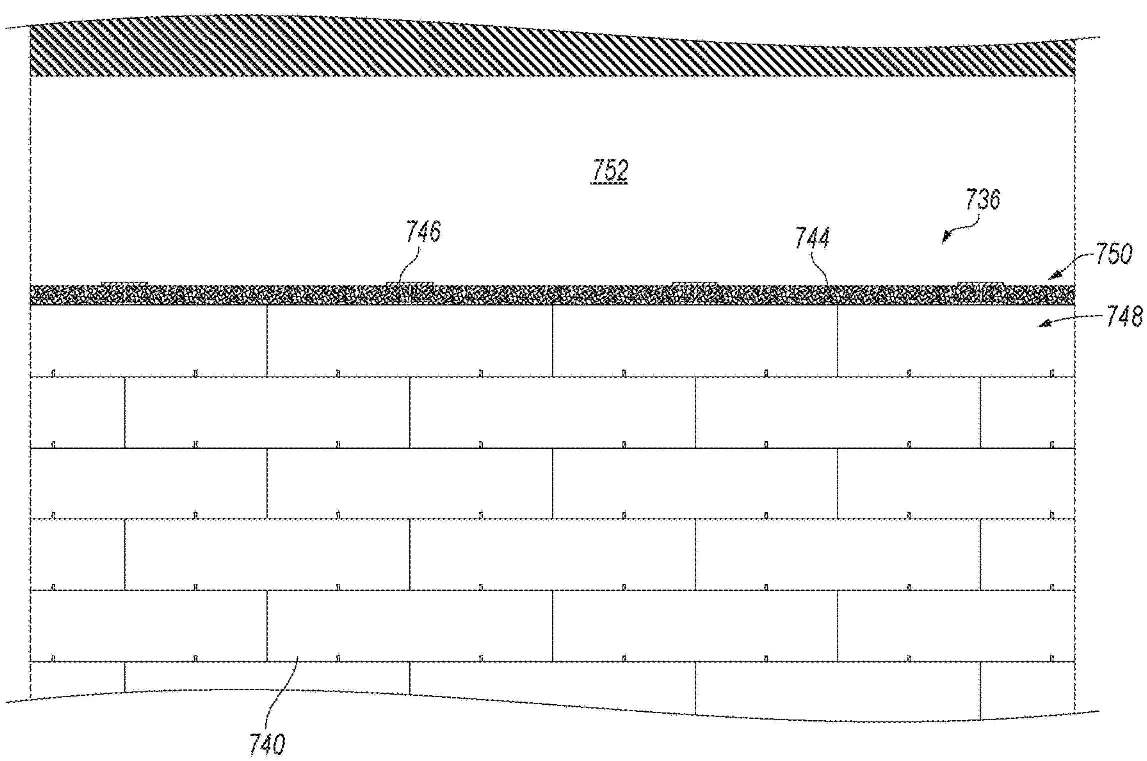
FIG. 34 is a cross-sectional exterior side profile view of a portion of the cluster of lodging units shown in FIG. 32 corresponding to the portion of FIG. 32 shown in FIG. 33.

FIG. 32 is a cross-sectional top plan view of the buildings 104*c*, 104*d* taken along the line 32-32 in FIG. 29. FIG. 33 is an enlarged view of a portion of FIG. 32. FIG. 34 is a cross-sectional exterior side profile view of a portion of the cluster of lodging units 720 corresponding to the portion of FIG. 32 shown in FIG. 33. With reference to FIGS. 29-34 together, the cluster of lodging units 720 can include a compartmentalizing assembly 736, and the cluster of lodging units 722 can include a compartmentalizing assembly 738. The compartmentalizing assemblies 736, 738 can have features the same as or similar to features of the compartmentalizing assemblies 515, 656 described above. The compartmentalizing assemblies 736, 738 can include reusable interior wall components 740 and reusable interior ceiling components 742 removably disposed within the buildings 104*c*, 104*d*. For example, the compartmentalizing assemblies 736, 738 can include rigid ceiling panels 744 and elongate ceiling beams 746 interspersed between the ceiling panels 744.

The ceiling beams 746 can support the ceiling panels 744, and the interior wall components 740 can support the ceiling beams 746. The interior wall components 740 can be assembled into walls, columns, or other suitable structures that extend between the ceiling beams 746 and finished floor surfaces of the buildings 104*c*, 104*d*. For example, the compartmentalizing assembly 736 can include a wall 748 parallel to and spaced apart from the exterior wall 700*c*, and a series of columns (not shown) abutting an interior surface of the exterior wall 700*c*. The ceiling beams 746 can extend between the wall 748 and the columns. When a distance between the wall 748 and the columns does not correspond to a multiple of the length of the ceiling panels 744, and in other cases, the ceiling panels 744 and the ceiling beams 746 can be cantilevered over the wall 748. As shown in FIG. 34, the individual ceiling beams 746 can have an I-shape transverse cross-section including two channels at opposite sides of a central web. The individual ceiling panels 744 can have side edge portions snugly received within corresponding channels of adjacent ceiling beams 746. Together, the ceiling panels 744 and the ceiling beams 746 can form ceilings 750 of the clusters of lodging units 720, 722. The ceilings 750 can be below airspaces 752 within the buildings 104*c*, 104*d*.

Figure 35:
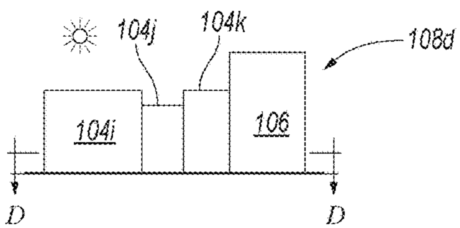
FIG. 35 is a front profile view of a fourth block of the urban area shown in FIG. 1.
Figure 36:
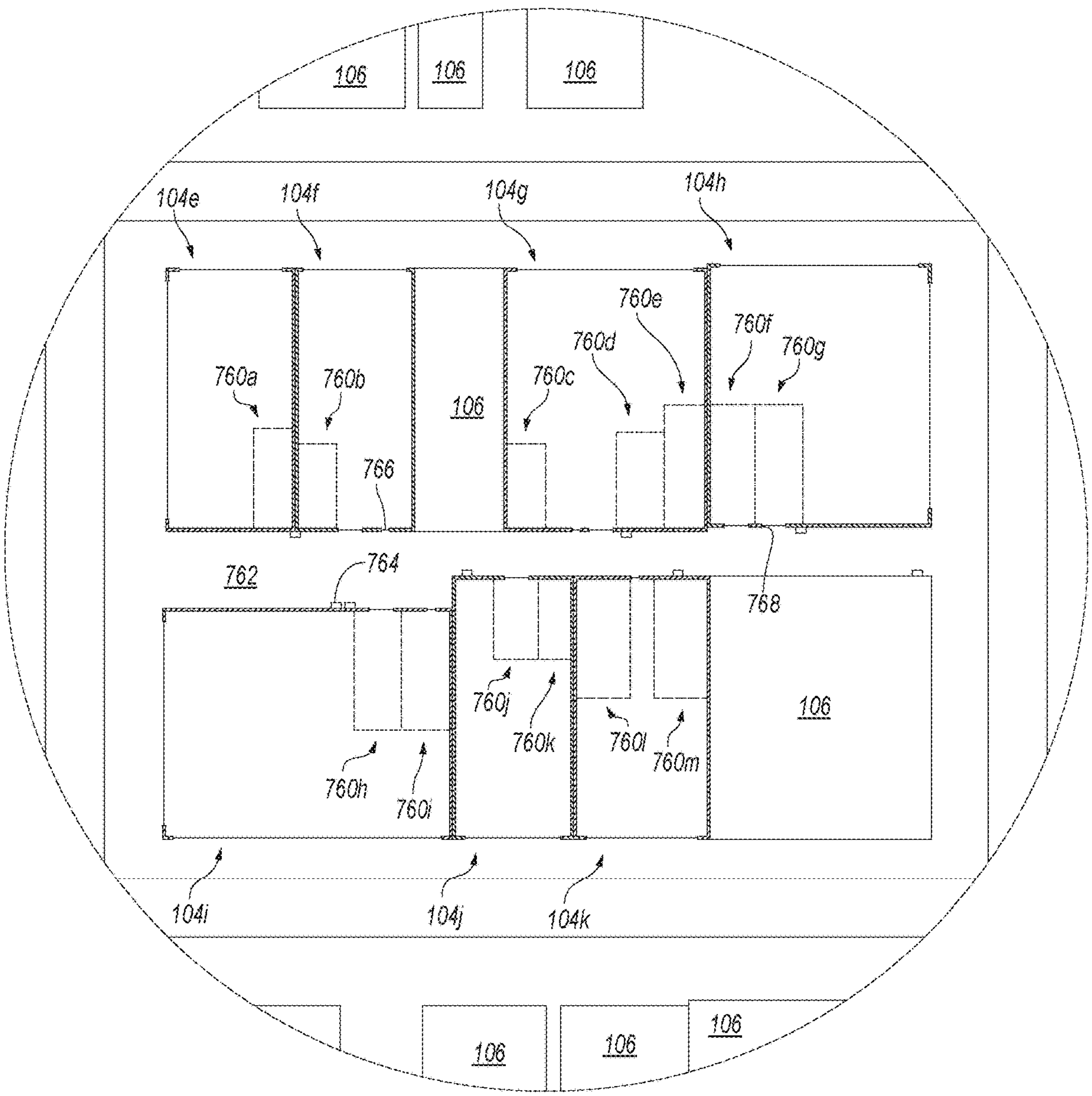
FIG. 36 is a cross-sectional top plan view of buildings at the fourth block of the urban area shown in FIG. 1 taken along the line D-D in FIG. 35 with interior regions within the buildings in the first state.

FIG. 35 is a front profile view of the block 108*d*. FIG. 36 is a cross-sectional top plan view of the buildings 104*e*-104*k* taken along the line D-D in FIG. 35. The buildings 104*e*-104*k* can include permanent exterior walls within which the building 104*e*-104*k* include interior regions 760 (individually identified as interior regions 760*a*-760*m*). In FIG. 36, the interior regions 760 are shown in the first state. In at least some embodiments, the interior regions 760 are purpose-built for respective uses independently selected from the group consisting of retail use, office use, restaurant use, industrial use, warehouse use, storage use, garage use, and combinations thereof. The exterior walls of the buildings 104*e*-104*k* can include back walls between the interior regions 760 and an alley 762 of the block 108*d*. In the illustrated embodiment, the alley 762 is a through alley. In other embodiments, a counterpart of the alley 762 can be a blind alley. With reference again to FIG. 36, the buildings 104*e*-104*k* can be in two groups at opposite respective sides of the alley 762. Within the alley 762, the block 108*d* can include dumpsters 764 individually serving one or more of the buildings 104*e*-104*k*. The buildings 104*e*-104*k* can include back doors 766 and openings 768 similar to the back doors 132, 502 and openings 504, 710 described above.

Figure 37:
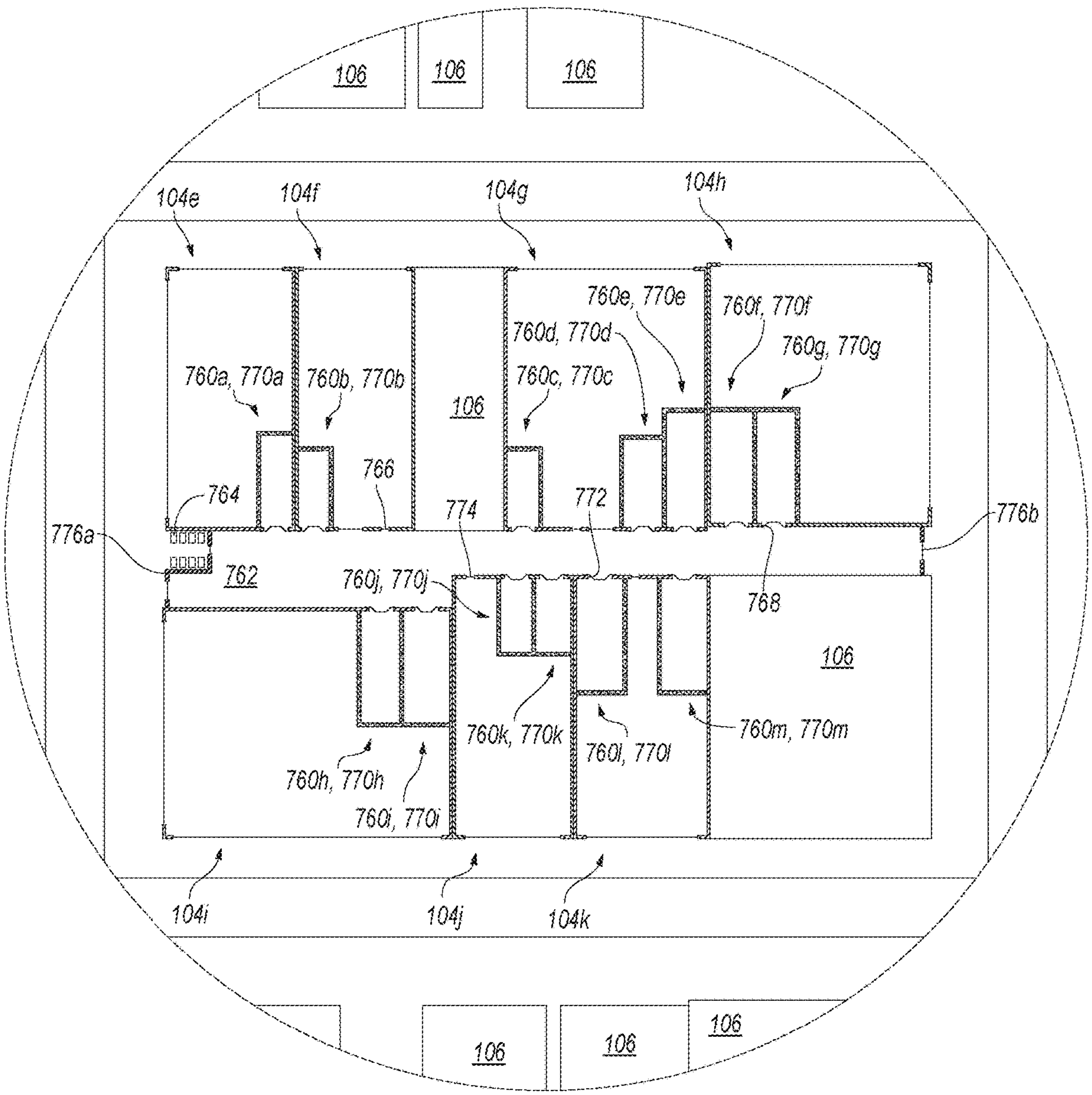
FIG. 37 is a cross-sectional top plan view of the buildings at the fourth block of the urban area shown in FIG. 1 taken along the line D-D in FIG. 35 and showing a cluster of lodging units of the hotel shown in FIG. 1, the cluster of lodging units including the interior regions within the buildings in the second state.

FIG. 37 is a cross-sectional top plan view of the buildings 104*e*-104*k* taken along the line D-D in FIG. 35 and showing a cluster of lodging units 770 (individually identified as lodging units 770*a*-770*m*) of the hotel 102. The lodging units 770*a*-770*m* can include the interior regions 760*a*-760*m*, respectively, in the second state. The interior regions 760 and the lodging units 770 can have features the same as or similar to the features of the interior regions 114, 484, 704, 706 and the lodging units 150, 510, 640, 678, 720, 722 described above. For clarity of illustration, most details of the lodging units 770 are not shown in FIG. 37. The features of the lodging units 770 can differ. For example, in the illustrated embodiment, many of the lodging units 770 have different respective sizes. Furthermore, in the illustrated embodiment, the buildings 104g-104k respectively include multiple lodging units 770, and the buildings 104e, 104f respectively include single lodging units 770. In other embodiments, a counterpart of the cluster of lodging units 770 can have other distributions of counterparts of the lodging units 770.

As shown in FIG. 37, the back walls of the buildings 104e-104k can be retrofitted to accommodate the lodging units 770. For example, the lodging units 770f-770h, 770j can be at the respective existing openings 768, and the lodging units 770a-770e, 770i, 770k-770m can be at respective new (e.g., cut) openings 772. Other modifications of the back walls of the buildings 104e-104k can be made to serve continuing operations within the buildings 104e-104k other than operations associated with the lodging units 770. For example, the back walls can be retrofitted to include new back doors 774. The alley 762 can be closed off to automobile traffic to form a common area for the cluster of lodging units 770. The cluster of lodging units 770 can include gates 776 (individually identified as gates 776a, 776b) at opposite respective ends of the alley 762. The dumpsters 764 can be relocated to portion of the alley 762 outside the gate 776a. In some embodiments, the alley 762 is at least substantially reversibly closed off. For example, the alley 762 can be closed off during certain hours (e.g., by closing the gates 776) and reopened during other hours (e.g., by opening the gates 776). In a particular embodiment, the alley 762 is at least substantially reversibly closed off at night, and the alley 762 is reopened during the day. In other embodiments, the alley 762 can be at least substantially reversibly closed off until the cluster of lodging units 770 is decommissioned, permanently closed off, not closed off, or managed in another manner.

Figure 38:
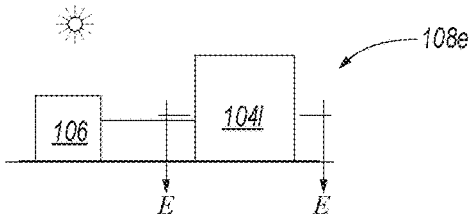
FIG. 38 is a front profile view of a fifth block of the urban area shown in FIG. 1.
Figure 39:
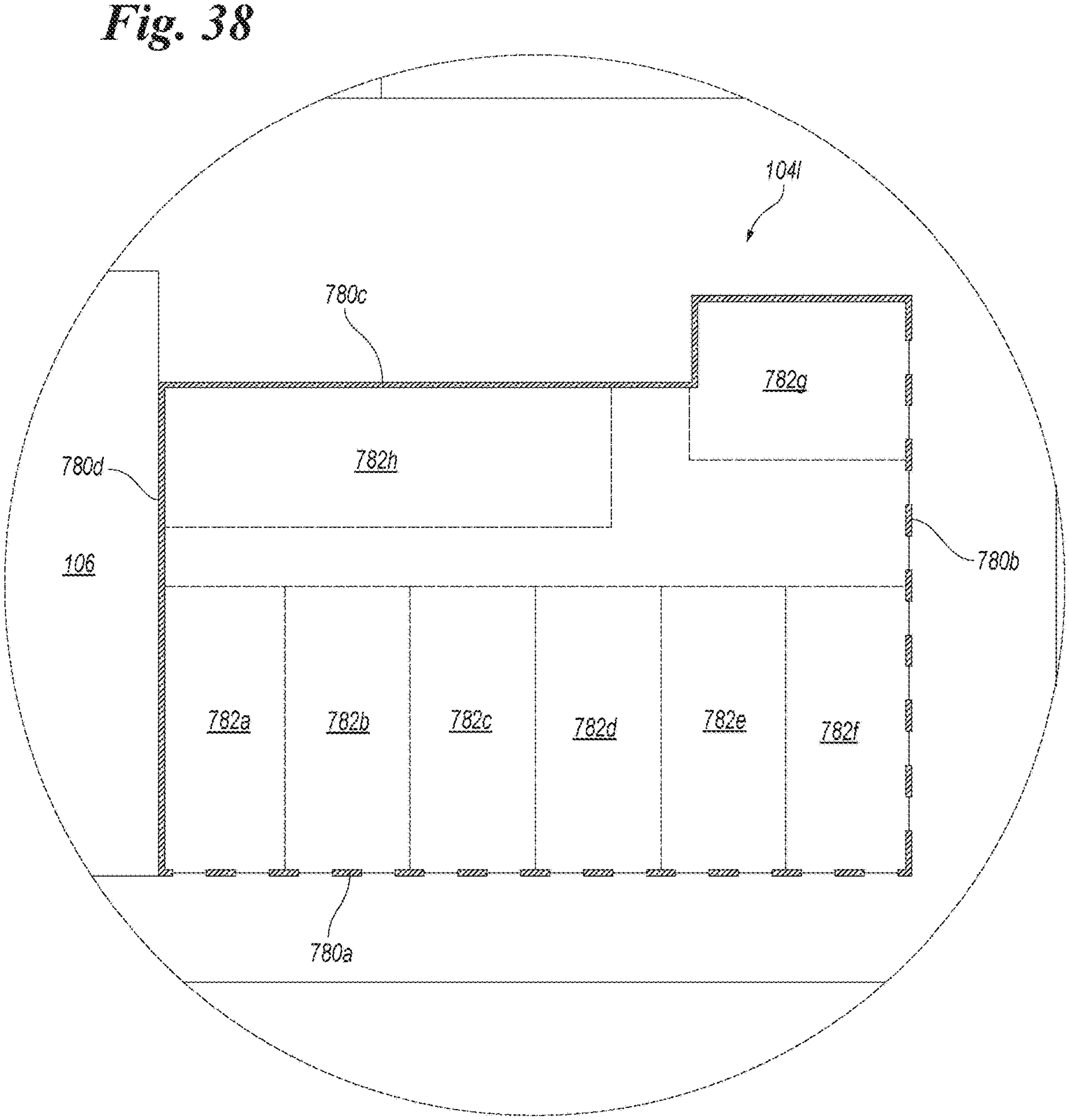
FIG. 39 is a cross-sectional top plan view of a building at the fifth block of the urban area shown in FIG. 1 taken along the line E-E in FIG. 38 with interior regions within the building in the first state.
Figure 40:
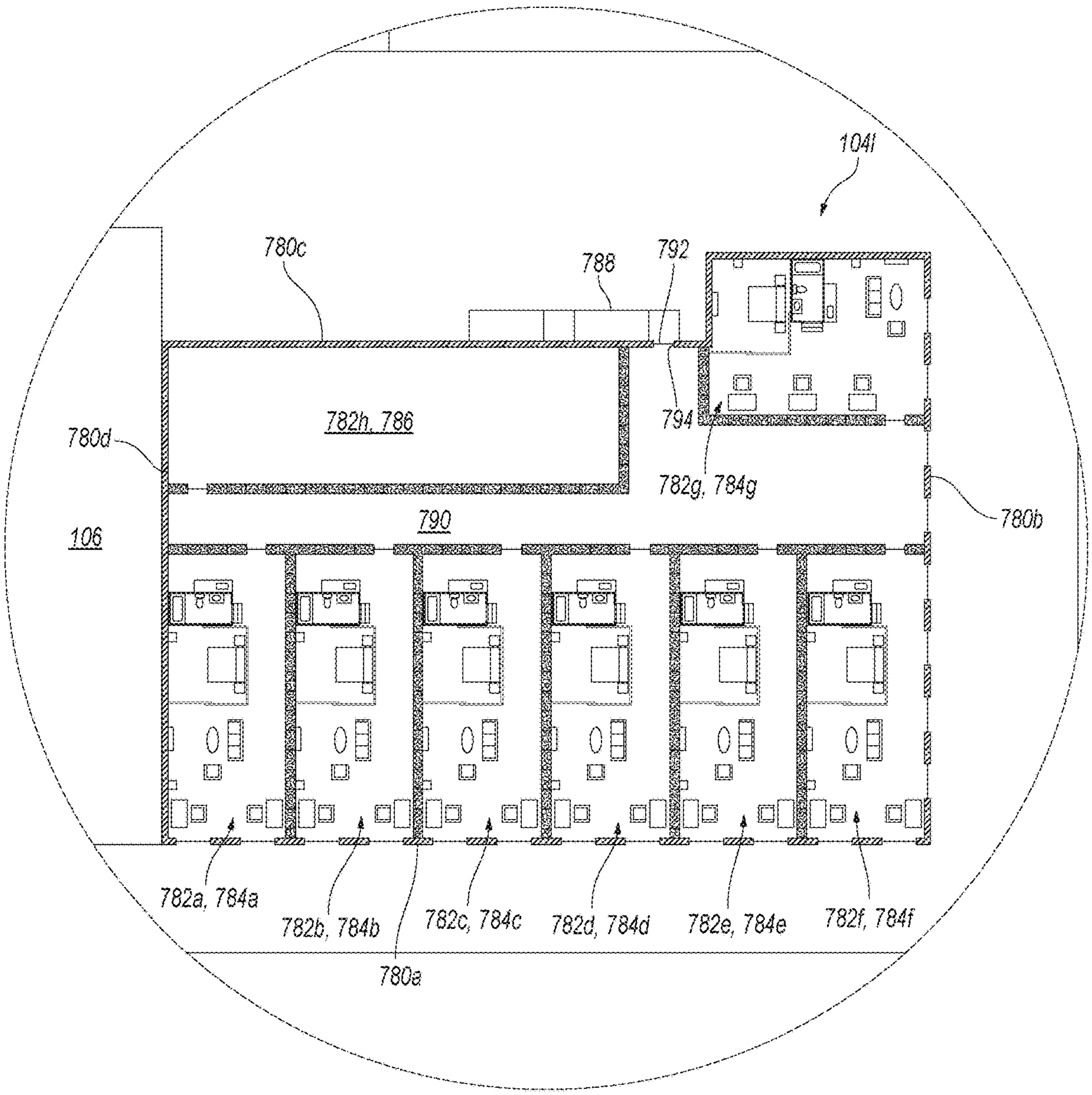
FIG. 40 is a cross-sectional top plan view of the building at the fifth block of the urban area shown in FIG. 1 taken along the line E-E n FIG. 38 and showing a cluster of lodging units of the hotel shown in FIG. 1, the cluster of lodging units including the interior regions within the building in the second state.

FIG. 38 is a front profile view of the block 108e. FIG. 39 is a cross-sectional top plan view of the building 1041 taken along the line E-E in FIG. 38. The building 1041 can include permanent exterior walls 780 (individually identified as exterior walls 780a-780d) within which the building 1041 includes interior regions 782 (individually identified as interior regions 782a-782h). In FIG. 35, the interior regions 782 are shown in the first state. In at least some embodiments, the interior regions 782 are purpose-built for respective uses independently selected from the group consisting of retail use, office use, restaurant use, industrial use, warehouse use, storage use, garage use, and combinations thereof. FIG. 40 is a cross-sectional top plan view of the building 1041 taken along the line E-E in FIG. 38 and showing a cluster of lodging units 784 (individually identified as lodging units 784a-784g) of the hotel 102. The lodging units 784a-784g can include the interior regions 782a-782g, respectively, in the second state. The cluster of lodging units 784 can further include an enclosed utility area 786 at the interior region 782h. The utility area 786 can include retrofitted systems (not shown) serving the lodging units 784. The interior regions 782a-782g and the lodging units 784 can have features the same as or similar to the features of the interior regions 114, 484, 704, 706, 760 and the lodging units 150, 510, 640, 678, 720, 722, 770 described above.

The interior regions 782 can be at a higher-than-ground-floor level of the building 104m. The cluster of lodging units 784 can include an exterior stairway and platform structure 788 at the exterior wall 780c. The stairway and platform structure 788 can be reusable and removably disposed adjacent to the exterior wall 780c. In some embodiments, the stairway and platform structure 788 is a portable stairway and platform unit. In other embodiments, the stairway and platform structure 788 is an assembly of reusable exterior stairway and platform modules. For example, the stairway and platform structure 788 can be made up mostly or entirely of reusable stairway and platform modules. In still other embodiments the stairway and platform structure 788 can have other suitable forms. As shown in FIG. 40, the cluster of lodging units 784 can include a corridor 790 serving the lodging units 784, and a retrofitted entry door 792 between the stairway and platform structure 788 and the corridor 790. The retrofitted entry door 792 can be within a cut opening 794. Alternatively or in addition, the retrofitted entry door 792 can be at a window opening of the building 104m retrofitted for egress use.

Figure 41:
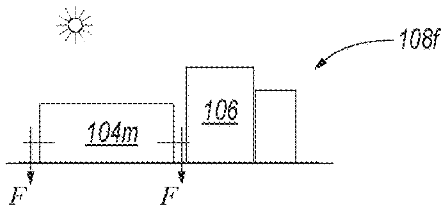
FIG. 41 is a front profile view of a sixth block of the urban area shown in FIG. 1.
Figure 42:
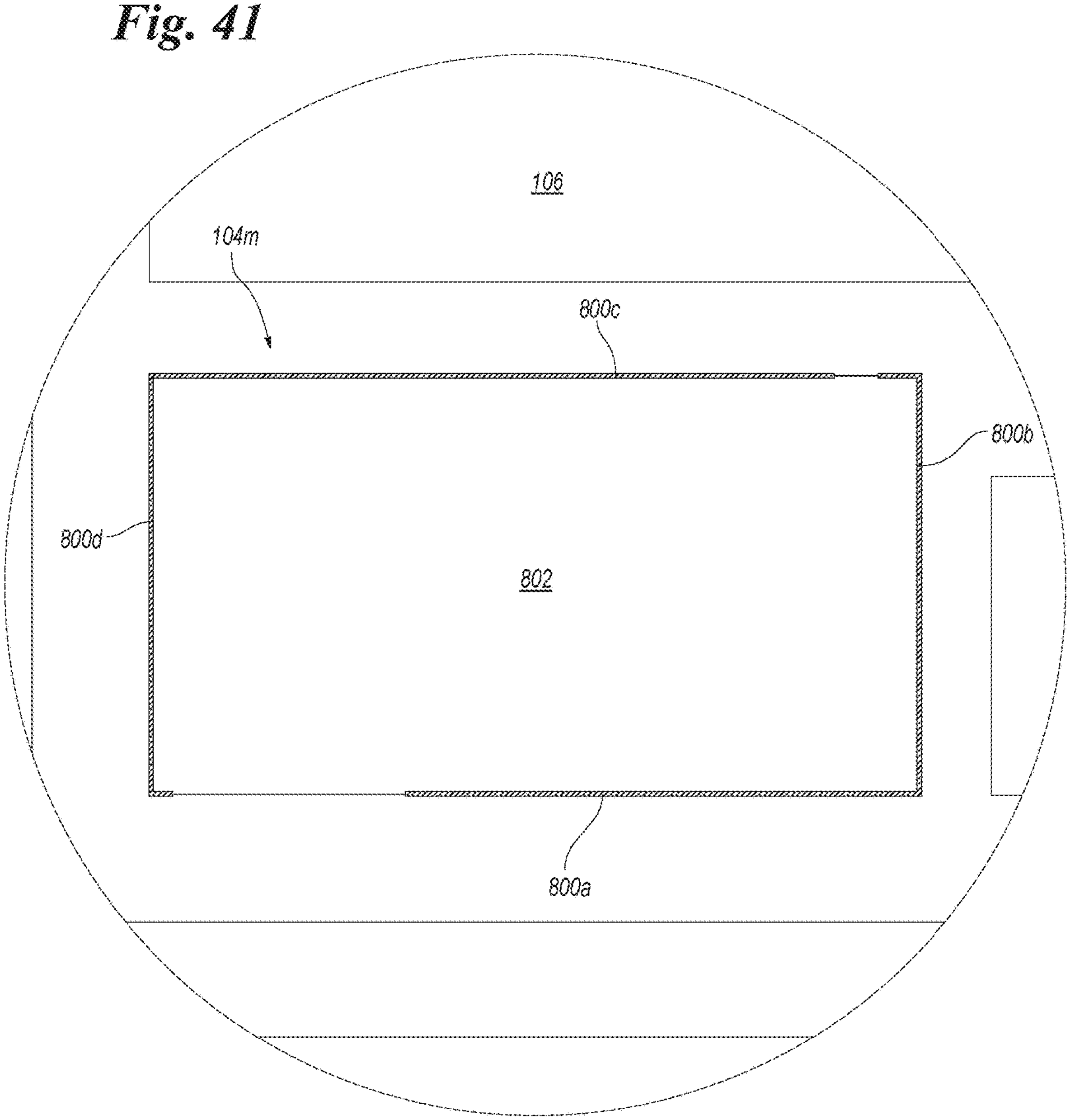
FIG. 42 is a cross-sectional top plan view of a building at the sixth block of the urban area shown in FIG. 1 taken along the line F-F in FIG. 41 with an interior region within the building in the first state.
Figure 43:
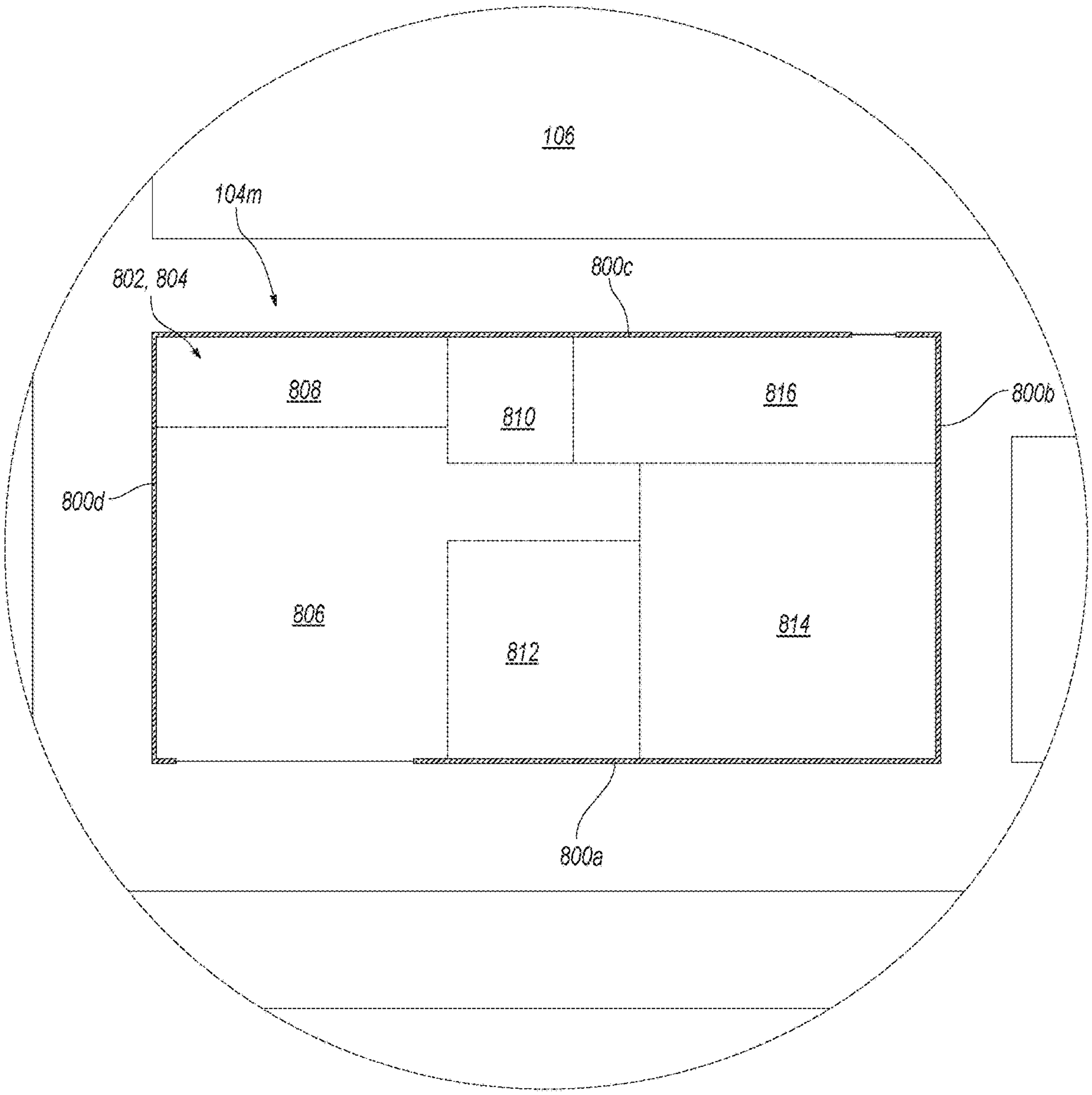
FIG. 43 is a cross-sectional top plan view of the building at the sixth block of the urban area shown in FIG. 1 taken along the line F-F in FIG. 41 and showing a guest-services hub of the hotel shown in FIG. 1, the guest-services hub including the interior region within the building in the second state.

FIG. 41 is a front profile view of the block 108g. FIG. 42 is a cross-sectional top plan view of the building 104m at the block 108g taken along the line F-F in FIG. 41. The building 104m can include permanent exterior walls 800 (individually identified as exterior walls 800a-800d) within which the building 104m includes an interior region 802. In FIG. 42, the interior region 802 is shown in the first state. In at least some embodiments, the interior regions 802 is purpose-built for a use selected from the group consisting of retail use, office use, restaurant use, industrial use, warehouse use, storage use, garage use, and combinations thereof. FIG. 43 is a cross-sectional top plan view of the building 104m taken along the line F-F in FIG. 41 and showing a guest-services hub 804 of the hotel 102. The guest-services hub 804 can include the interior region 802 in the second state. The guest-services hub 804 can be a location at which in-person services ancillary to lodging are provided to guests of the hotel 102. In the illustrated embodiment, the guest-services hub 804 includes a lobby area 806, a check-in area 808, a concierge/baggage check area 810, a lounge area 812, a food-service area 814, and a logistics/office area 816. In other embodiments, the guest-services hub 804 can have other suitable forms.

Figure 44:
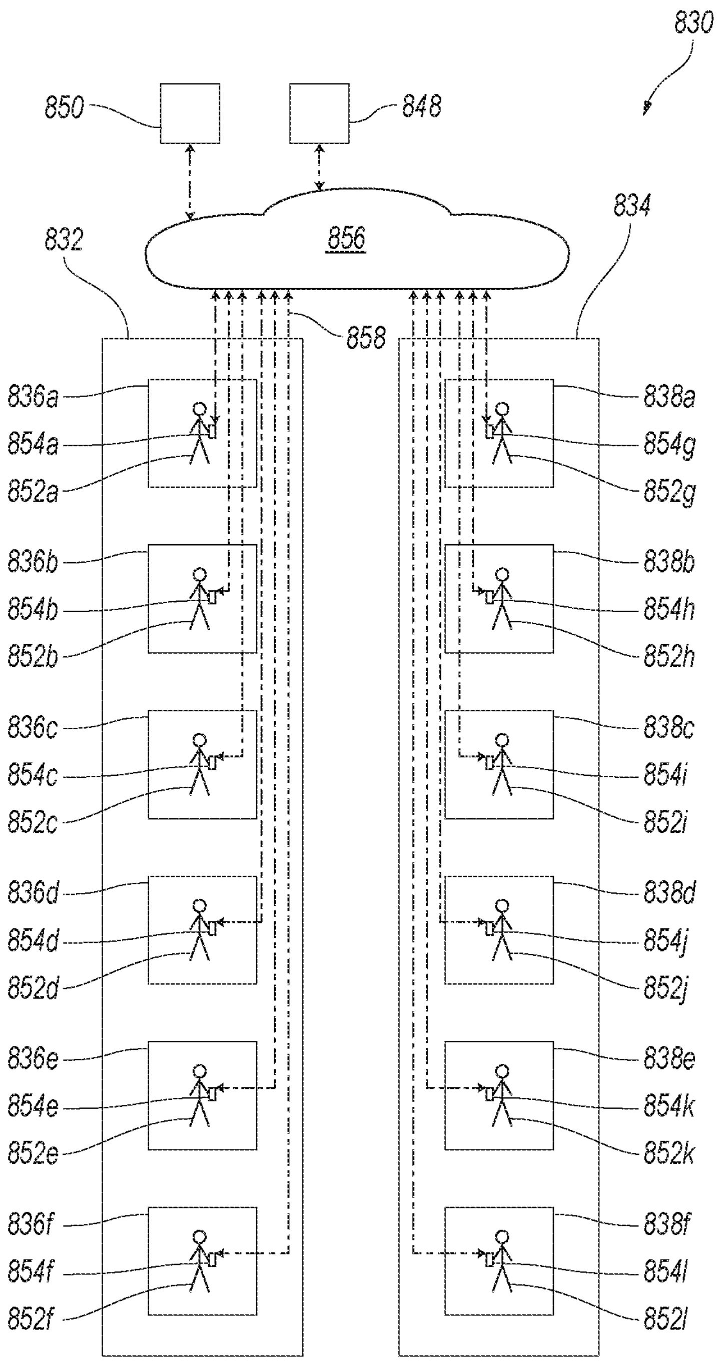
FIGS. 44 and 45 are schematic diagrams illustrating a network of hotels in accordance with an embodiment of the present technology.
Figure 45:
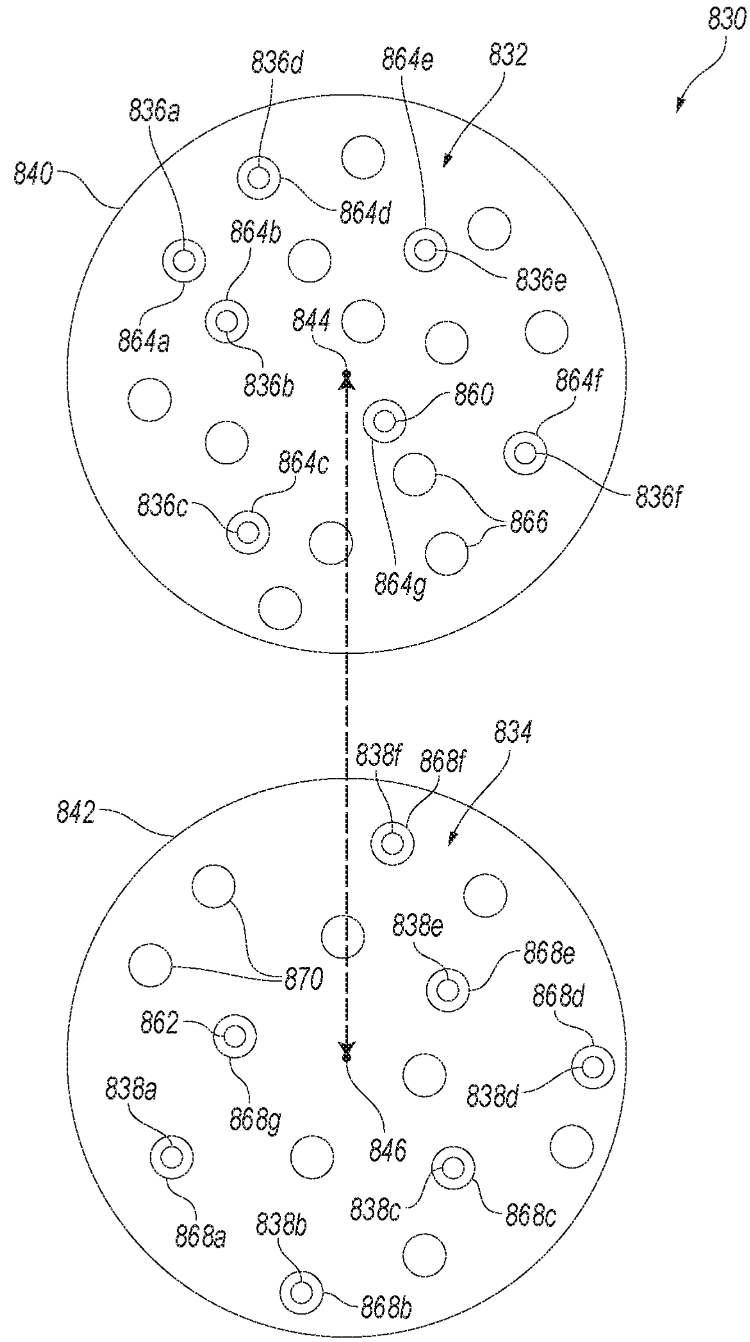

FIGS. 44 and 45 are schematic diagrams illustrating a network of hotels 830 in accordance with an embodiment of the present technology. The network 830 can include a first hotel 832 and a second hotel 834. The first and second hotels 832, 834 can have features the same as or similar to features of the hotel 102 described above. The first hotel 832 can include a first inventory of first lodging units 836 (individually identified as first lodging units 836a-836f) available for provision of lodging to guests of the first hotel 832. Similarly, the second hotel 834 can include a second inventory of second lodging units 838 (individually identified as second lodging units 838a-838f) available for provision of lodging to guests of the second hotel 834. The first and second hotels 832, 834 can be at a first urban area 840 (e.g., a first district of a first greater urban area) and a second urban area 842 (e.g., a second district of a second greater urban area), respectively. A first center point 844 of the first urban area 840 and a second center point 846 of the second urban area 842 can be at least 50 miles from one another. Alternatively, the first and second center points 844, 846 can be closer together, such as when the first and second urban areas 840, 842 are within the same greater urban area. Furthermore, although FIGS. 44 and 45 show only the first and second hotels 832, 834, the network 830 can include more than two hotels at different respective urban areas.

In some embodiments, the first lodging units 836 are at least substantially fungible components of the corresponding inventory for fulfilling reservations for the first hotel 832. Similarly, the second lodging units 838 can be at least substantially fungible components of the corresponding inventory for fulfilling reservations for the second hotel 834. For example, like conventional hotel rooms, the individual first lodging units 836 among themselves and the individual second lodging units 838 among themselves can be alike in amenities, furnishings, systems, etc. Particular ones of the first and second lodging units 836, 838 can be assigned to guests of the first and second hotels 832, 834, respectively, after the guests make reservations for future stays at the first and second hotels 832, 834, respectively. This assignment can occur at check-in or at another suitable time at or near a time when a reserved stay actually begins. In other embodiments, the first lodging units 836 can be non-fungible components of the corresponding inventory for fulfilling reservations for the first hotel 832, and the second lodging units 838 can be non-fungible components of the corresponding inventory for fulfilling reservations for the second hotel 834. For example, like conventional peer-to-peer lodging units, the individual first lodging units 836 among themselves and the individual second lodging units 838 among themselves can be distinct in amenities, furnishings, systems, etc. Particular ones of the first and second lodging units 836, 838 can be specifically reserved by guests of the first and second hotels 832, 834, respectively.

In at least some embodiments, the inventories are dynamic. For example, the constituent first lodging units 836 of the first hotel 832 and/or the constituent second lodging units 838 of the second hotel 834 can change over time. In addition or alternatively, the total number of first lodging units 836 within the inventory of the first hotel 832 and/or the total number of second lodging units 838 within the inventory of the second hotel 834 can change over time. These changes in the total numbers of the first and second lodging units 836, 838 can correspond to changing market conditions in the first and second urban areas 840, 842. For example, change in the total number of first lodging units 836 within the corresponding inventory can be inversely proportional to change in an overall non-lodging occupancy rate within the first urban area 840. Such change can correspond to greater availability of relatively inexpensive urban interstices within the first urban area 840, thereby potentially increasing the profitability of the first lodging units 836. As another example, change in the total number of first lodging units 836 within the corresponding inventory can be directly proportional to change in an overall lodging occupancy rate within the first urban area 840. Such change can correspond to greater demand for the first lodging units 836, thereby also potentially increasing the profitability of the first lodging units 836. As another example, change in the total number of first lodging units 836 within the corresponding inventory can be in concert with seasonal change in an overall lodging occupancy rate within the first urban area 840. For example, the corresponding inventory can be sufficiently dynamic to shrink during seasonal periods of relatively low demand for lodging and to grow during seasonal periods of relatively high demand for lodging. Similar correlations can apply to the total number of second lodging units 838 in the corresponding inventory relative to changes in market conditions in the second urban area 842.

The total number of first lodging units 836 in the corresponding inventory and the total number of second lodging units 838 in the corresponding inventory can be interrelated. For example, capital used to form the first lodging units 836 can be reallocated to form the second lodging units 838 when demand for lodging at the second urban area 842 is increasing and demand for lodging at the first urban area 840 is decreasing. Correspondingly, capital used to form the second lodging units 838 can be reallocated to form the first lodging units 836 when demand for lodging at the first urban area 840 is increasing and demand for lodging at the second urban area 842 is decreasing. Thus, the total number of first lodging units 836 within the corresponding inventory can be inversely proportional to the total number of second lodging units 838 within the corresponding inventory and vice versa. In at least some embodiments, an average residence time for the first lodging units 836 within the corresponding inventory is not more than three years (e.g., not more than two years or not more than one year). Similarly, an average residence time for the second lodging units 838 within the corresponding inventory can be not more than three years (e.g., not more than two years or not more than one year).

The network 830 can further include a server 848 and a computer-implemented reservation system 850 separate from the server 848 (as illustrated) or stored on the server 848. The reservation system 850 can be operable to generate reservations for future stays at the first and second hotels 832, 834. As shown in FIG. 44, guests 852 (individually identified as guests 852*a*-852*l*) having respective mobile electronic devices 854 (individually identified as mobile electronic devices 854*a*-854*l*) can communicate with the server 848 and with the reservation system 850 via an electronic network 856 (e.g., the Internet). For example, information 858 can flow between the server 848 and the reservation system 850, between the server 848 and the guests 852, between the reservation system 850 and the guests 852, and/or among the guests 852 via the electronic network 856. The information 858 can include guest locations (e.g., from GPS components of the electronic devices 854), notifications, offers, etc. In at least some embodiments, the first and second lodging units 836, 838 are configured for unmanned check-in and/or other unmanned operations that utilize the information 858. The first and second lodging units 836, 838 can be directly rentable, rentable via a membership system (e.g., in a member-based network of lodging units), rentable under short-term use arrangements, and/or rentable in another suitable manner.

FIG. 45 schematically illustrates how the first and second lodging units 836, 838 are distributed in the first and second urban areas 840, 842, respectively. As shown in FIG. 45, the first and second hotels 832, 834 can include first and second guest-services hubs 860, 862, respectively. The first lodging units 836 and the first guest-services hub 860 can be at respective first buildings 864 (individually identified as first buildings 864*a*-864*g*) dispersed among miscellaneous other buildings 866 within the first urban area 840. Similarly, the second lodging units 838 and the second guest-services hub 862 can be at respective second buildings 868 (individually identified as second buildings 868*a*-868*g*) dispersed among miscellaneous other buildings 870 within the second urban area 842. The first and second guest-services hubs 860, 862 can be locations at which in-person services ancillary to lodging are provided to guests of the first and second hotels 832, 834, respectively.

Figure 46:
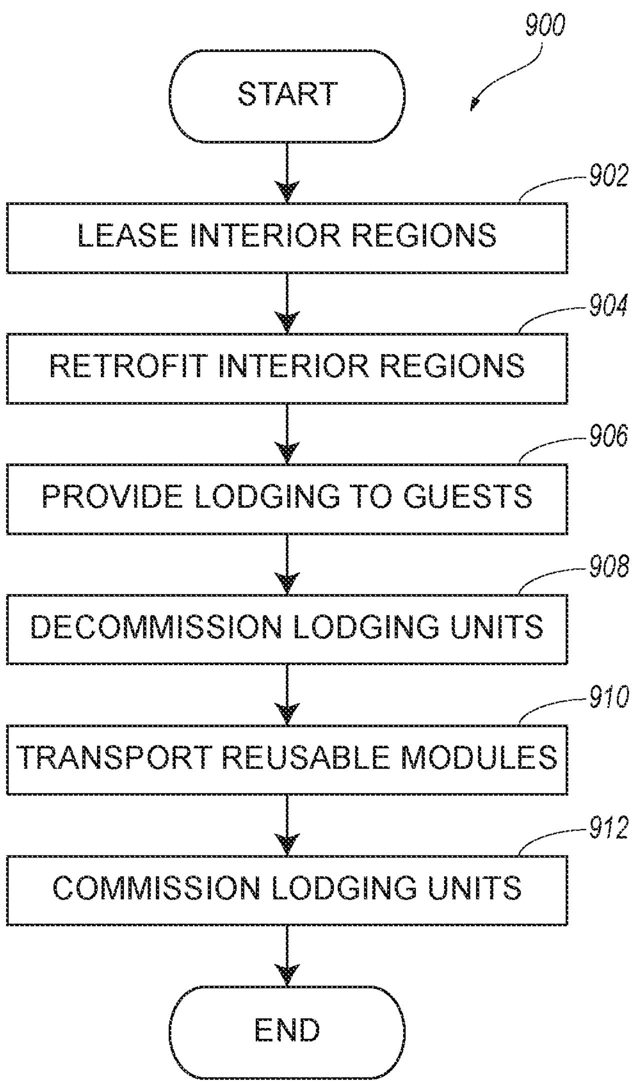
FIG. 46 is a block diagram illustrating a method for operating the network of hotels shown in FIGS. 44 and 45 in accordance with an embodiment of the present technology.

FIG. 46 is a block diagram illustrating a method 900 for operating the network 830 in accordance with an embodiment of the present technology. In the method 900, features of the first and second hotels 832, 834 may be described using reference numbers corresponding to counterpart features of the hotel 102. It should be understood that the method 900, when suitable, and/or portions of the method 900, when suitable, can be practiced with respect to other hotels described herein as well as with respect to hotels in accordance with other embodiments of the present technology. Similarly, although the method 900 may be described primarily in the context of the building 104*b* and/or the lodging units 640, it should be understood that the method 900, when suitable, and/or portions of the method 900, when suitable, can be practiced with respect to other suitable buildings and lodging units in accordance with embodiments of the present technology.

With reference to FIGS. 15, 25 and 46 together, the method 900 can include leasing the interior regions 484 (block 902) or establishing control of the interior regions 484 in another manner. For example, the interior regions 484 can be leased from an owner of the building 104*b* for provision of lodging to third parties. In some cases, one or more of the interior regions 484 is leased or purchased separately from other interior regions within the building 104*b*. For example, a leased or purchased one of the interior regions 484 may be underutilized by an ongoing operation at the other interior regions such that the ongoing operation is not adversely affected to a significant degree by losing control over the leased or purchased one of the interior regions 484. In other cases, all interior regions within the building 104*b* can be leased or purchased together.

After control of the interior regions 484 is established, the method 900 can include retrofitting the interior regions 484 to accommodate lodging use (block 904). The building 104*b* can be originally constructed at least 20 years before this retrofitting occurs. In at least some embodiments, the method 900 includes at least substantially reversibly retrofitting the interior regions 484 to accommodate lodging use. In these and other embodiments, it may be economically feasible to lease and retrofit the interior regions 484 with little or no long-term commitment from an owner of the building 104*b*. This can be due to the reusability of a significant amount of the capital associated with retrofitting the interior regions 484 and/or for other reasons. Accordingly, in some embodiments, the interior regions 484 are leased month-to-month. In other embodiments, the interior regions 484 can be leased under terms that allow the owner of the building 104*b* to terminate the lease with notice of less than one month. In still other embodiments, the interior regions 484 can be controlled by an operator of the lodging units 640 under other lease arrangements, under non-lease contractual arrangements (e.g., franchising), under fee simple ownership, or in another suitable manner.

After direct or indirect control over the interior regions 484 is established, the method 900 can include providing lodging to guests of the hotel 102 (block 906) at the lodging units 640. While lodging is provided to the guests, the building 104*b* can be publicly marketed for sale and/or the interior regions 484 can be publicly marketed for a non-lodging tenancy. In these and other cases, lodging use of the interior regions 484 can be an interim use of the interior regions 484 during a time when the interior regions 484 would otherwise be vacant. When the interior regions 484 are leased or otherwise controlled separately from other portions of the building 104*b*, an owner of the building 104*b* can occupy or otherwise use the other portions of the building 104*b* while the interior regions 484 are used for lodging. When the interior regions 484 are leased together with other portions of the building 104*b*, an operator of the lodging units 640 can operate the lodging units 640 at the interior regions 484 and lease and some or all of the other portions of the building 104*b* for other uses.

The method 900 can further include decommissioning the lodging units 640 (block 908). This can reduce a total number of lodging units within an inventory of the hotel 102. Furthermore, decommissioning the lodging units 640 can be at least partially in response to a sustained increase in an overall non-lodging occupancy rate within the urban area 100, at least partially in response to a sustained decrease in an overall lodging occupancy rate within the urban area 100, and/or seasonal (e.g., in concert with a seasonal decrease in an overall lodging occupancy rate within the urban area 100). When seasonal and in other cases, the lodging units 640 can be commissioned and decommissioned more than once. In these and other cases, decommissioning the lodging units 640 can occur by attrition in conjunction with a planned sale of the building 104*b*, a planned non-lodging tenancy of the interior regions 484, or both. Decommissioning the lodging units 640 can include recovering capital from the lodging units 640, such as by removing reusable modules from the lodging units 640. Examples of reusable modules that can be removed from the lodging units 640 include the bathrooms 642, reusable components of the retrofitted support systems 644, the wall components 518, the barrier 660, the exterior wall components 732 (FIG. 31), the exterior stairway and platform structure 788 (FIG. 40), and furnishings, among others.

After the reusable modules are removed from the lodging units 640, the method 900 can include transporting the reusable modules to another building (block 910), such as a building in another urban area. Some or all of the modules can be transported in a compact state. For example, the bathrooms 642 can be transported in a disassembled state. As another example, the wall components 518 can be transported in a disassembled state. Furthermore, the first and second side panels 580, 582 and the first and second end panels 584, 586 can be transported in a collapsed state. The method 900 can further include receiving the modules at the other building. For example, at least some of the modules can be received at the other building in an at least substantially pre-manufactured state. As shown in FIG. 46, the method 900 can further include commissioning lodging units (block 912) at the building at which the modules are received. Commissioning the lodging units can include deploying the modules at this building. Commissioning the new lodging units can increase a total number of lodging units within an inventory of another hotel affiliated with the hotel 102, but at a different urban area. Furthermore, commissioning the new lodging units can be at least partially in response to a sustained decrease in an overall non-lodging occupancy rate within the other urban area, at least partially in response to a sustained increase in an overall lodging occupancy rate within the other urban area, and/or seasonal (e.g., in concert with a seasonal increase in an overall lodging occupancy rate within the other urban area).

FIGS. 47-50 are operational diagrams showing, respectively, the spring, summer, fall, and winter intake and migration of capital within the network 830. Intake of modules can be from a module source 950. Migration of modules can be among hotels in the network 830 at different respective urban areas. Seattle is shown in FIGS. 47-50 as having higher summer lodging occupancy rates than winter lodging occupancy rates, a general (non-seasonal) trend toward higher lodging occupancy rates, and a general (non-seasonal) trend toward higher non-lodging occupancy rates. This can correspond to favored incoming migration of modules in the spring and favored outgoing migration of modules in the fall. Portland is shown in FIGS. 47-50 as having higher summer lodging occupancy rates than winter lodging occupancy rates, a general (non-seasonal) trend toward higher lodging occupancy rates, and a general (non-seasonal) trend toward lower non-lodging occupancy rates. This can correspond to favored incoming migration of modules in the spring and the fall and favored intake of modules from the module source 950 in the summer and winter. San Francisco is shown in FIGS. 47-50 as having higher summer lodging occupancy rates than winter lodging occupancy rates, a general (non-seasonal) trend toward lower lodging occupancy rates, and a general (non-seasonal) trend toward higher non-lodging occupancy rates. This can correspond to favored outgoing migration of modules in the spring and the fall. Los Angeles is shown in FIGS. 47-50 as having higher summer lodging occupancy rates than winter lodging occupancy rates, a general (non-seasonal) trend toward lower lodging occupancy rates, and a general (non-seasonal) trend toward lower non-lodging occupancy rates. This can correspond to favored incoming migration of modules in the spring and favored outgoing migration of modules in the fall. Tucson is shown in FIGS. 47-50 as having lower summer lodging occupancy rates than winter lodging occupancy rates, a general (non-seasonal) trend toward higher lodging occupancy rates, and a general (non-seasonal) trend toward higher non-lodging occupancy rates. This can correspond to favored outgoing migration of modules in the spring and favored incoming migration of modules in the fall. Las Vegas is shown in FIGS. 47-50 as having lower summer lodging occupancy rates than winter lodging occupancy rates, a general (non-seasonal) trend toward lower lodging occupancy rates, and a general (non-seasonal) trend toward lower non-lodging occupancy rates. This can correspond to favored outgoing migration of modules in the spring and favored incoming migration of modules in the fall. Salt Lake City is shown in FIGS. 47-50 as having lower summer lodging occupancy rates than winter lodging occupancy rates, a general (non-seasonal) trend toward lower lodging occupancy rates, and a general (non-seasonal) trend toward higher non-lodging occupancy rates. This can correspond to favored outgoing migration of modules in the spring and the fall. Phoenix is shown in FIGS. 47-50 as having lower summer lodging occupancy rates than winter lodging occupancy rates, a general (non-seasonal) trend toward higher lodging occupancy rates, and a general (non-seasonal) trend toward lower non-lodging occupancy rates. This can correspond to favored incoming migration of modules in the spring and the fall and favored intake of modules from the module source 950 in the summer and winter.

As a person having ordinary skill in the art will recognize, numerous permutations of the features disclosed herein are within the scope of the present technology. For example, a counterpart of the exterior enclosure 728 (FIG. 31) can be deployed at the lodging unit 640*c* (FIG. 25). As another example, a counterpart of the compartmentalizing assembly 515 (FIG. 19) can include the ceiling components 742 (FIG. 32) and be below an airspace rather than extending all the way to the finished ceiling surface 544 (FIG. 19). Furthermore, although features of the present technology are described herein primarily in the context of providing lodging, it should be understood that the same or similar features can be implemented in other suitable contexts. For example, the method 900 and other aspects of the present technology can be practiced in the context of providing office space, residential space, assembly space, etc. In these and other cases, the "lodging units" referred to herein can instead be office units, residential units, assembly units, etc. Several examples of non-lodging real estate units compatible with features of the present technology are disclosed in U.S. Patent Application Nos. 62/222,750, 62/273,700, and 62/310,045, which are incorporated herein by reference in their entireties.

Also disclosed herein are examples of school spaces retrofitted for alternative uses and related technology. In a particular embodiment of the present technology, a collection of rentable units and associated structures is operated at a school building between successive academic sessions of a school also operated at the school building. The collection can include components well suited for rapid deployment, removal, and redeployment. Use of these components can allow revenue from operating the rentable units to exceed costs associated within transitioning the school building from being well suited for a school use to being well suited for an alternative use, even when the rentable units are only operated for relatively short periods of time. Among various types of real estate, school buildings are particularly well suited to accommodate short-term alternative uses. For example, school buildings are typically unutilized or underutilized during summer months when demand for lodging and certain other alternative uses tends to be high. As another example, school buildings typically have floor plans that include classrooms, which tend to be well sized for use as individual rentable units. As yet another example, school buildings typically have large windows at or near ground level, which tend to be well suited for use as direct access points to individual rentable units.

Figure 51:
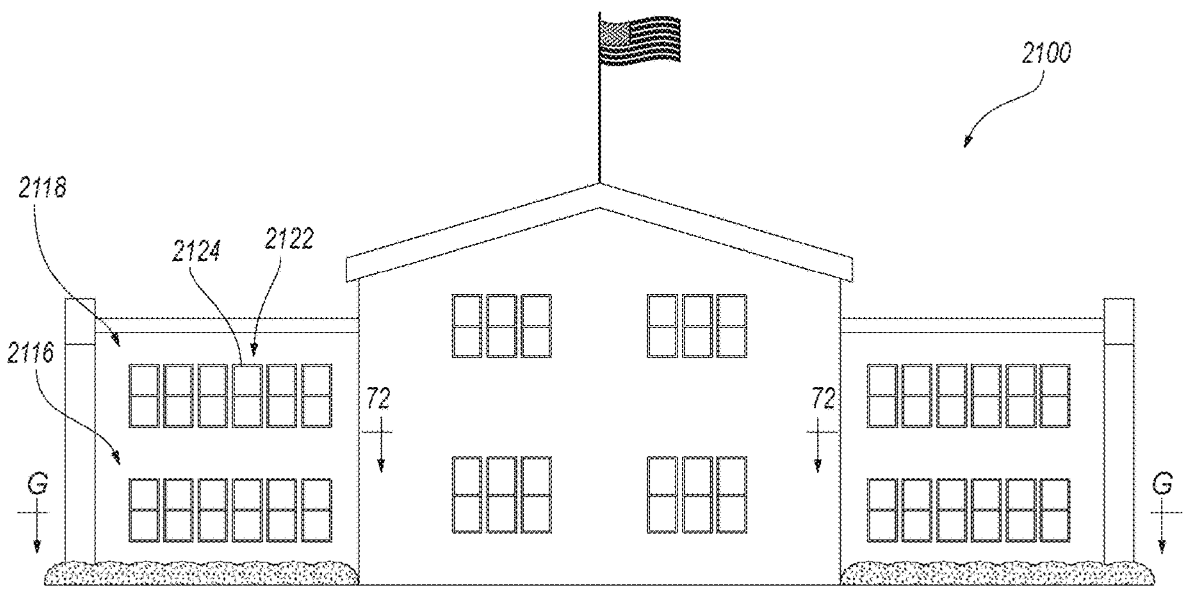
FIG. 51 is a front profile view of a school building in a first state.
Figure 52:
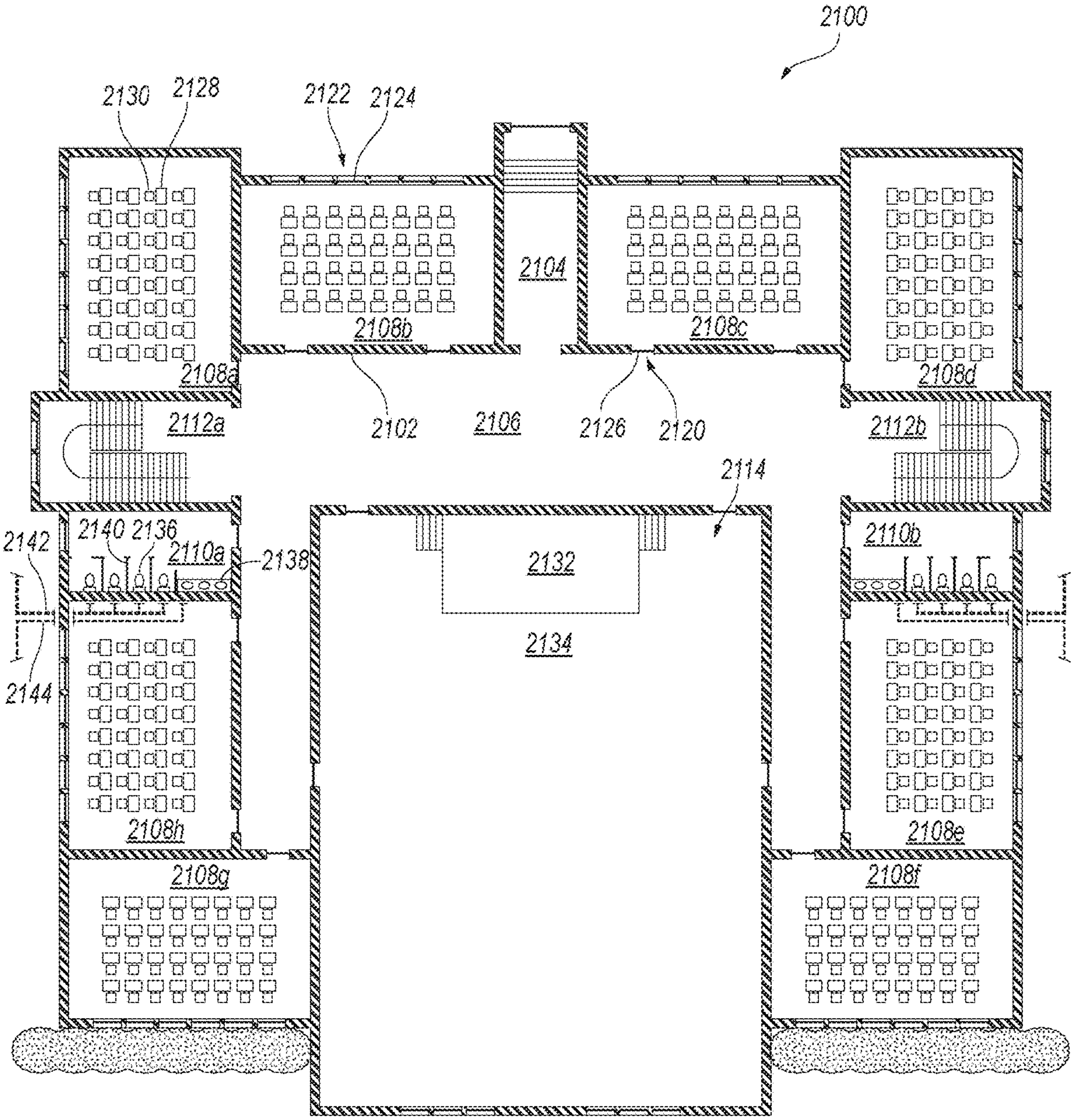
FIG. 52 is a top plan view of the school building shown in FIG. 51 in the first state taken along the line G-G in FIG. 51.

FIG. 51 is a front profile view of a school building 2100 in a first state. The first state can be a school-use, original, unretrofitted, pre-retrofit, or similar state. FIG. 52 is a top plan view of the school building 2100 in the first state taken along the line G-G in FIG. 51. With reference to FIGS. 51 and 52 together, the school building 2100 can have a network of permanent walls 2102 and can include a main entrance 2104, a hallway 2106, classrooms 2108 (individually identified as classrooms 2108*a*-2108*h*), school bathrooms 2110 (individually identified as school bathrooms 2110*a*, 2110*b*), main stairways 2112 (individually identified as main stairways 2112*a*, 2112*b*), and an oversized room 2114 (i.e., a room within the school building 2100 having a floor area at least twice an average individual floor area of the classrooms 2108) at least partially defined by the permanent walls 2102. The oversized room 2114 can be an auditorium, a gym, a cafeteria, a library, and/or another suitable type of room within the school building 2100.

The illustrated school building 2100 has a first story 2116 (e.g., a ground story) at which a total of eight classrooms 2108 are located. The illustrated school building 2100 also has a second story 2118 at which additional classrooms (not shown) are located. The main stairways 2112 operably connect the first and second stories 2116, 2118. In other embodiments, corresponding school buildings can have different numbers of classrooms and/or different numbers of stories. Furthermore, although features of the present technology may be described herein primarily or entirely with respect to the first story 2116 of the school building 2100, it should be understood that suitable features of the present technology can additionally or alternatively be practiced with respect to the second story 2118 of the school building 2100. In embodiments of the present technology practiced at the first story 2116 only, the main stairways 2112 can be closed off from the hallway 2106 when the school building 2100 is retrofitted from a first state to a second state to accommodate an alternative use. In embodiments of the present technology practiced at both the first and second stories 2116, 2118, access to the main stairways 2112 from the hallway 2106 can be maintained after the school building 2100 is retrofitted from the first state to the second state.

The school building 2100 can be associated with a school (e.g., a public or private elementary, middle, or high school) and can and can include facilities appropriate for this purpose. In at least some embodiments, the school building

2100 is purpose-built for school use. For example, the oversized room 2114 can be a purpose-built auditorium, gym, cafeteria, and/or library. The classrooms 2108, school bathrooms 2110, main stairways 2112, and oversized room 2114 can be adjacent to the hallway 2106. For example, the classrooms 2108, school bathrooms 2110, and oversized room 2114 can include respective doorway openings 2120 at the hallway 2106. For natural lighting, the classrooms 2108, school bathrooms 2110, main stairways 2112, and oversized room 2114 can include respective window openings 2122 and sashes 2124 disposed (e.g., hingedly or slidably disposed) at the respective window openings 2122. The window openings 2122 can be double-hung window openings or another type of window opening from which the sashes 2124 are readily removable.

The classrooms 2108, school bathrooms 2110, and oversized room 2114 can include doors 2126 disposed (e.g., hingedly or slidably disposed) at the corresponding doorway openings 2120. When the school building 2100 is in the first state, the classrooms 2108, the oversized room 2114, and the school bathrooms 2110 can be directly accessible from the hallway 2106 through the corresponding doorway openings 2120. Furthermore, the main entrance 2104 can be operably connected to the hallway 2106 such that the classrooms 2108, school bathrooms 2110, main stairways 2112, and oversized room 2114 are accessible from the main entrance 2104 via the hallway 2106. As discussed below, in some embodiments, the classrooms 2108 and the oversized room 2114 remain accessible from the hallway 2106 after the school building 2100 is retrofitted to the second state. In other embodiments, the classrooms 2108 and/or the oversized room 2114 can be made inaccessible from the hallway 2106 after the school building 2100 is retrofitted to the second state.

As shown in FIG. 52, school desks 2128 and school chairs 2130 can be removably disposed within the classrooms 2108 in arrangements suitable for accommodating students during classroom instruction. The oversized room 2114 can include a stage 2132 and a large open area 2134 in front of the stage 2132. The school bathrooms 2110 can include toilets 2136 (e.g., two or more toilets 2136), sinks 2138 (e.g., two or more sinks 2138), and a stall assembly 2140 operably associated with the toilets 2136. The school building 2100 can include a plumbing drain trunk line 2142 and a water supply trunk line 2144 operably associated with the school bathroom 2110*a*. The plumbing drain trunk line 2142 can follow a drainage route from the school bathroom 2110*a* toward a sewage destination (e.g., a municipal sewer) (not shown). Similarly, the water supply trunk line 2144 can follow a supply route from a water source (e.g., a municipal water source) (not shown) toward the school bathroom 2110*a*. The plumbing drain trunk line 2142 can be below-ground, such as positioned below a ground surface outside the school building 2100 along the drainage route. In addition or alternatively, the plumbing drain trunk line 2142 can be below-floor, such as positioned below a finished floor surface of the school building 2100 along the drainage route (e.g., at a portion of the drainage route under the school bathroom 2110*a*). Similarly, the water supply trunk line 2144 can be below-ground, such as positioned below a ground surface outside the school building 2100 along the supply route. In addition or alternatively, the water supply trunk line 2144 can be below-floor, such as positioned below a finished floor surface of the school building 2100 along the supply route (e.g., at a portion of the supply route under the school bathroom 2110*a*).

The plumbing drain trunk line 2142 and/or the water supply trunk line 2144 can be buried or otherwise permanently installed within a basement, a crawlspace, a chase, a foundation, a volume of dirt, or another suitable environment directly below the school bathroom 2110*a* and/or directly below an area around the school bathroom 2110*a*. Furthermore, the plumbing drain trunk line 2142 can be sloped to convey liquid waste (e.g., sewage) from the school bathroom 2110*a* toward the sewage destination at least partially by gravity. The water supply trunk line 2144 can be configured to convey potable water from the water source to the school bathroom 2110*a* under pressure. In at least some cases, the school building 2100 includes a school water heater (not shown) operably associated with the water supply trunk line 2144. In these cases, the water supply trunk line 2144 can bifurcate into branches (not shown) that supply cold and hot water, respectively, to the school bathroom 2110*a*, such as at the sinks 2138. The school water heater can be operably associated with a branch of the water supply trunk line 2144 that supplies hot water to the school bathroom 2110*a*.

Figure 53:
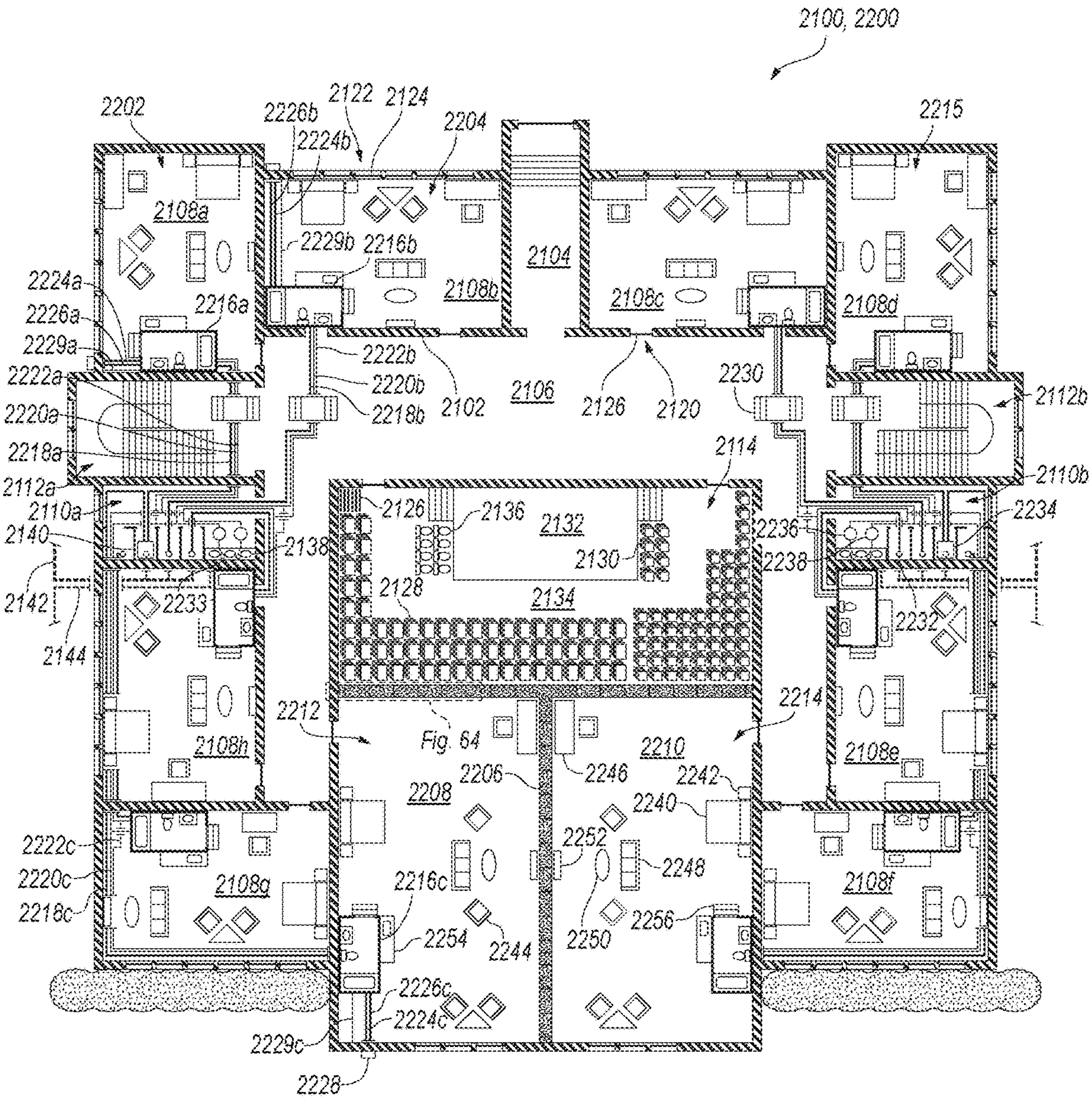
FIG. 53 is a top plan view of a collection of rentable units and associated structures in accordance with an embodiment of the present technology at the school building shown in FIG. 51 in a second state taken along the line G-G in FIG. 51.

FIG. 53 is a top plan view of a collection of rentable units and associated structures 2200 in accordance with an embodiment of the present technology at the school building 2100 in a second state taken along the line G-G in FIG. 51. The second state can be an alternative-use, non-original, retrofitted, post-retrofit, or similar state. With reference to FIGS. 51-53 together, the school building 2100 and portions thereof (e.g., the hallway 2106, the classrooms 2108, the school bathrooms 2110, and the oversized room 2114) can be retrofitted (e.g., at least substantially reversibly retrofitted) from the first state to the second state to accommodate the collection 2200. This retrofitting can occur well after (e.g., at least 20 years after) the school building 2100 was originally constructed. The collection 2200 can include retrofits (e.g., at least substantially reversible retrofits) to the school building 2100 that change the school building 2100 from being well suited for a school use to being well suited for an alternative use. In at least some cases, reversal of all or a portion of these retrofits returns the school building 2100 from being well suited for the alternative use to again being well suited for the school use. The school use can occur during successive academic sessions of the school associated with the school building 2100. The alternative use can occur during a recess (e.g., a summer recess) between the successive academic sessions. For example, the recess can be one of a series of recesses and the collection 2200 can reoccur to accommodate the same or different alternative uses in concert with the series of recesses. The collection 2200 can be an annually reoccurring collection. Furthermore, the collection 2200 can have a duration of between 5 and 15 weeks between the successive academic sessions of the school.

In at least some cases, retrofits to the school building 2100 that support only the alternative use and do not interfere significantly with the school use are permanent, whereas retrofits to the school building 2100 that support only the alternative use and would interfere significantly with the school use are reversible. Examples of reversible retrofits include removing, installing, and relocating furniture and fixtures with little or no associated demolition of the permanent walls 2102 or other permanent fabric of the school building 2100. The school building 2100 can be substantially reversibly retrofitted to accommodate the collection 2200. For example, a total cost of reversible retrofits to the school building 2100 for a given transformation of the school building 2100 from being well suited for a school use to being well suited for an alternative use can be greater (e.g., at least 50% greater or at least 100% greater) than a total cost of permanent retrofits to the school building 2100 for the given transformation. Capital associated with the alternative use can be readily re-deployable during the school use. In some cases, the alternative use and the collection 2200 are active for less than four months, such as less than three months (e.g., between two and three months) between successive transformations of the school building 2100. In other cases, the alternative use and the collection 2200 can have longer durations.

As shown in FIG. 53, the collection 2200 can include a first rentable unit 2202 encompassing at least a portion of the classroom 2108*a*, and a second rentable unit 2204 encompassing at least a portion of the classroom 2108*b*. Within the oversized room 2114, the collection 2200 can include a compartmentalizing assembly 2206 defining a first compartment 2208 and a second compartment 2210. The collection 2200 can further include a third rentable unit 2212 encompassing at least a portion of the first compartment 2208, a fourth rentable unit 2214 encompassing at least a portion of the second compartment 2210, and additional rentable units 2215 encompassing at least portions of the classrooms 2108*c*-2108*h*, respectively. Additional features of the illustrated embodiment will now be described at least primarily with regard to the first, second, and third rentable units 2202, 2204, 2212. It should be understood that the same or similar features can be present in the fourth rentable unit 2214 and the additional rentable units 2215 unless the context clearly indicates otherwise. Similarly, features of other illustrated embodiments may be described at least primarily with respect to counterparts of the first, second, and third rentable units 2202, 2204, 2212 with the understanding that the same or similar features can be present in corresponding counterparts of the fourth rentable unit 2214 and corresponding counterparts of the additional rentable units 2215 unless the context clearly indicates otherwise.

The first, second, and third rentable units 2202, 2204, 2212 can include respective bathrooms 2216 (individually identified as bathrooms 2216*a*-2216*c*) disposed (e.g., removably disposed) in operable association with the classrooms 2108*a*, 2108*b*, and the first compartment 2208, respectively. For example, the bathrooms 2216*a*-2216*c* can be removably disposed within the classrooms 2108*a*, 2108*b*, and the first compartment 2208, respectively. The bathrooms 2216 can be reusable. In the illustrated embodiment, the bathrooms 2216 are assemblies of reusable bathroom modules configured for rapid deployment into and removal from the school building 2100 in an at least partially disassembled state. For example, the bathrooms 2216 can be made up mostly or entirely of reusable modular components. In other embodiments, the bathrooms 2216 can be portable bathroom units, such as bathroom units configured for rapid deployment into and removal from the school building 2100 without significant disassembly. This deployment and removal can occur by forklift, by dolly, by operation of wheels integrated into the bathrooms 2216, or in another suitable manner. In still other embodiments, the bathrooms 2216 can have other suitable forms.

The collection 2200 can further include plumbing drain lines 2218 (individually identified as plumbing drain lines 2218*a*-2218*c*) through which the bathrooms 2216 are operably connected, respectively, to the plumbing drain trunk line 2142. Similarly, the collection 2200 can include cold water supply lines 2220 (individually identified as cold water supply lines 2220*a*-2220*c*) through which the bathrooms 2216 are operably connected, respectively, to the water supply trunk line 2144. Also similarly, the collection 2200 can include hot water supply lines 2222 (individually identified as hot water supply lines 2222*a*-2222*c*) through which the bathrooms 2216 are operably connected, respectively, to the water supply trunk line 2144. Thus, in at least some embodiments, the bathrooms 2216 are tethered to the plumbing drain trunk line 2142 and the water supply trunk line 2144. The plumbing drain lines 2218, cold water supply lines 2220, and hot water supply lines 2222 can be removably disposed inside and/or outside the school building 2100. For example, the plumbing drain lines 2218, cold water supply lines 2220, and hot water supply lines 2222 can be temporary and configured for reuse or disposal after the collection 2200 is decommissioned. Alternatively, the plumbing drain lines 2218, cold water supply lines 2220, and hot water supply lines 2222 can be permanently disposed inside and/or outside the school building 2100, such as in a manner that does not interfere significantly with the school use of the school building 2100.

The collection 2200 can further include plumbing ventilation lines 2224 (individually identified as plumbing ventilation lines 2224*a*-2224*c*) and exhaust lines 2226 (individually identified as exhaust lines 2226*a*-2226*c*) through which the bathrooms 2216 are operably connected, respectively, to an exterior of the school building 2100. For example, the collection 2200 can include exhaust filters 2228 (e.g., containing activated carbon) disposed (e.g., removably disposed) on suitable exterior surfaces of the permanent walls 2102, and the plumbing ventilation lines 2224 and exhaust lines 2226 can extend between the bathrooms 2216 and the exhaust filters 2228. The collection 2200 can still further include electrical lines 2229 (individually identified as electrical lines 2229*a*-2229*c*) through which the bathrooms 2216 are operably connected, respectively, to electrical outlets (not shown) on interior surfaces of the permanent walls 2102. For clarity of illustration, counterparts of the plumbing ventilation lines 2224, the exhaust lines 2226, the exhaust filters 2228, and the electrical lines 2229 are not shown for bathrooms of the collection 2200 other than the bathrooms 2216*a*-2216*c*. Nor are counterparts of the plumbing ventilation lines 2224, the exhaust lines 2226, the exhaust filters 2228, and the electrical lines 2229 shown for bathrooms of the collections illustrated in FIGS. 75, 76 and 81-85, as described below. It should be understood that counterparts of the plumbing ventilation lines 2224, the exhaust lines 2226, the exhaust filters 2228, and the electrical lines 2229 can be present for any of the other bathrooms of the collection 2200 and the bathrooms of the collections 2600, 2700, 3000, 3100, 3200, 3300, 3400 illustrated in FIGS. 75, 76 and 81-85.

With reference again to FIG. 53, in the illustrated embodiment, the plumbing drain line 2218*a*, the cold water supply line 2220*a*, and the hot water supply line 2222*a* extend along respective drainage or supply routes between the bathroom 2216*a* and the school bathroom 2110*a* via the main stairway 2112*a* and retrofitted openings (not shown) in the permanent walls 2102. The plumbing drain line 2218*b*, the cold water supply line 2220*b*, and the hot water supply line 2222*b* extend between the bathroom 2216*b* and the school bathroom 2110*a* via one of the doorway openings 2120 of the classroom 2108*b*, the hallway 2106, and the doorway opening 2120 of the school bathroom 2110*a*. The plumbing drain line 2218*c*, the cold water supply line 2220*c*, and the hot water supply line 2222*c* extend between the bathroom 2216*c* and the school bathroom 2110*a* via the classroom 2108*g*, the classroom 2108*h*, and retrofitted openings (not shown) in the permanent walls 2102. In other embodiments, the plumbing drain lines 2218, cold water supply lines 2220, and hot water supply lines 2222 can have other suitable drainage and/or supply routes within the school building 2100 and/or outside of the school building 2100. When present, the retrofitted openings in the permanent walls 2102 can be at least substantially reversible. For example, the retrofitted openings can be formed when the school building 2100 is initially retrofitted to accommodate the collection 2200 in a manner that allows the retrofitted openings to be conveniently reclosed when the collection 2200 is decommissioned. In a particular example, the retrofitted openings are outfitted with cabinet-style doors (not shown) that can be maintained open when the retrofitted openings are in use and maintained closed when the retrofitted openings are not in use.

The plumbing drain lines 2218, cold water supply lines 2220, and hot water supply lines 2222 can be above-ground, such as positioned above a ground surface outside the school building 2100 along the corresponding drainage or supply routes. In addition or alternatively, the plumbing drain lines 2218, cold water supply lines 2220, and hot water supply lines 2222 can be above-floor, such as positioned above a finished floor surface of the school building 2100 along the corresponding drainage or supply routes. Furthermore, the plumbing drain lines 2218, cold water supply lines 2220, and hot water supply lines 2222 can have respective lengths of at least two meters (e.g., at least four meters). In the illustrated embodiment, the plumbing drain line 2218*a*, the plumbing drain line 2218*b*, the cold water supply line 2220*a*, the cold water supply line 2220*b*, the hot water supply line 2222*a*, and the hot water supply line 2222*b* are above-floor and extend over respective lengths of at least two meters (e.g., at least four meters) within the hallway 2106. The plumbing drain line 2218*c*, the cold water supply line 2220*c*, and the hot water supply line 2222*c* are also above-floor and extend over respective lengths of at least two meters (e.g., at least four meters) within the classrooms 2108*g*, 2108*h*. In other embodiments, all of the plumbing drain lines 2218, cold water supply lines 2220, and hot water supply lines 2222 can have respective lengths of at least two meters (e.g., at least four meters) within the hallway 2106, within suitable combinations of the classrooms 2108, and/or elsewhere within or outside the school building 2100.

The plumbing drain lines 2218 can be sloped to convey liquid waste from the corresponding bathrooms 2216 toward the plumbing drain trunk line 2142 (e.g., via the school bathroom 2110*a*) at least partially by gravity. To facilitate this sloping and/or for other reasons, the bathrooms 2216 can have respective floor levels at least 0.5 meter (e.g., at least 1 meter) higher than corresponding underlying floor levels of the school building 2100, such as floor levels at the classrooms 2108*a*, 2108*b* and the first compartment 2208, respectively. As shown in FIG. 53, the collection 2200 can include bridges 2230 disposed over respective bundles of the plumbing drain lines 2218, cold water supply lines 2220, and hot water supply lines 2222. Like many other components of the collection 2200, the bridges 2230 can be reusable and removably disposed within the school building 2100. The bridges 2230 can be useful, for example, to facilitate pedestrian traversal of the bundles when the hallway 2106 is accessible to occupants of the first, second, and third rentable units 2202, 2204, 2212.

Retrofits to the school building 2100 that cause the school building 2100 to adapt from being well suited for a school use to being well suited for an alternative use can include removing the school desks 2128, school chairs 2130, and toilets 2136 from their respective locations when the school building 2100 is in the first state (e.g., their respective locations shown in FIG. 52). In the illustrated embodiment, the school desks 2128, school chairs 2130, and toilets 2136 are stowed compactly (e.g., close together and/or stacked) within the oversized room 2114. In other embodiments the school desks 2128, school chairs 2130, and toilets 2136 can be removed from the school building 2100 or stored in another suitable location within the school building 2100. The retrofits can further include removing some or all of the doors 2126. For example, FIG. 53 shows that the door 2126 at the doorway opening 2120 of the school bathroom 2110*a* and the door 2126 at one of the doorway openings 2120 of the classroom 2108*b* are removed to facilitate passage of the plumbing drain line 2218*b*, the cold water supply line 2220*b*, and the hot water supply line 2222*b* between the bathroom 2216*b* and the school bathroom 2110*a*. The bathroom 2216*b* can be positioned within the classroom 2108*b* such that access to the classroom 2108*b* via the doorless doorway opening 2120 of the classroom 2108*b* is blocked. The retrofits can also include forming the openings in the permanent walls 2102 through which the plumbing drain lines 2218*a*, 2218*c*, the cold water supply lines 2220*a*, 2220*c*, the hot water supply lines 2222*a*, 2222*c*, the plumbing ventilation lines 2224, and the exhaust lines 2226 extend. Forming these openings and suitable other retrofits of the school building 2100 can be permanent and completed in conjunction with an initial adaptation of the school building 2100 from being well suited for the school use to being well suited for the alternative use. These permanent retrofits can then be reused in conjunction with streamlined subsequent adaptations of the school building 2100 from being well suited for the school use to being well suited for the alternative use.

The school bathroom 2110*a* can include toilet hookups 2232 that are exposed when the toilets 2136 are removed. Similarly, the school bathroom 2110*a* can include sink hookups 2233 that are exposed when the sinks 2138 are disconnected. The bathrooms 2216 and the plumbing drain lines 2218 can be operably connected to the plumbing drain trunk line 2142 via the toilet hookups 2232. Similarly, the bathrooms 2216 and the cold and hot water supply lines 2220, 2222 can be operably connected to the water supply trunk line 2144 via the sink hookups 2233. In the illustrated embodiment, the collection 2200 includes a sewage detention tank 2234, a cold water reservoir 2236, and a hot water reservoir 2238 removably disposed within the school bathroom 2110*a*, such as removably disposed above a finished floor surface of the school bathroom 2110*a*. In other embodiments, the sewage detention tank 2234, the cold water reservoir 2236, and the hot water reservoir 2238 can be permanently disposed within the school bathroom 2110*a*, removably or permanently disposed within the hallway 2106, or removably or permanently disposed elsewhere within the school building 2100 or outside the school building 2100.

The sewage detention tank 2234 can be useful, for example, to increase a capacity of the school bathroom 2110*a* to remove liquid waste from the bathrooms 2216. As shown in FIG. 53, the total number of the bathrooms 2216 and counterpart bathrooms operably connected to the school bathroom 2110*a* can exceed a total number of toilet hookups 2232 within the school bathroom 2110*a*. Accordingly, in the illustrated embodiment, while the plumbing drain line 2218*b* is operably connected to the plumbing drain trunk line 2142 via one of the toilet hookups 2232 in a dedicated manner, the plumbing drain lines 2218*a*, 2218*c* share another of the toilet hookups 2232. The bathrooms 2216*a*, 2216*c* and the plumbing drain lines 2218*a*, 2218*c* can be operably connected to the plumbing drain trunk line 2142 via the sewage detention tank 2234, which, in turn, can be operably connected to the plumbing drain trunk line 2142 via one of the toilet hookups 2232.

Due to the presence of the sewage detention tank 2234, spikes in flow through the plumbing drain lines 2218*a*, 2218*c* can be attenuated, thereby increasing the effective capacity of the school bathroom 2110*a* to handle liquid waste. Similarly, the cold and hot water reservoirs 2236, 2238 can increase a capacity of the school bathroom 2110*a* to supply cold and hot water, respectively, to the bathrooms 2216. The bathrooms 2216 can be operably connected to the water supply trunk line 2144 via the cold and hot water reservoirs 2236, 2238. In at least some cases, the sinks 2138 are disconnected to allow for operable connection of the cold and hot water reservoirs 2236, 2238 to the water supply trunk line 2144 via the sink hookups 2233. In these and other cases, the hot water reservoir 2238 can include a heater to boost the capacity of an existing school water heater (not shown) along a branch of the water supply trunk line 2144 that supplies hot water to the school bathroom 2110*a*. When the bathrooms 2216 include showers and in other cases, the hot-water demand associated with the collection 2200 can significantly exceed that of the school building 2100 during the school use. Use of a heater in conjunction with the hot water reservoir 2238 can at least partially address this deficiency. In a similar manner, the collection 2200 can include other suitable components for increasing or otherwise modifying the capacity of permanent systems of the school building 2100. For example, the collection 2200 can include an electrical generator (not shown) operably connected to the first, second, and third rentable units 2202, 2204, 2212 to increase the capacity of permanent electrical system (not shown) of the school building 2100.

Each of the first, second, and third rentable units 2202, 2204, 2212 can be furnished or otherwise outfitted with suitable furnishings, fixtures, accessories, etc. to accommodate a corresponding alternative use. In the illustrated embodiment, the first, second, and third rentable units 2202, 2204, 2212 are respective lodging units with suitable furnishings, fixtures, accessories, etc. to accommodate lodging use. For example, each of the first, second, and third rentable units 2202, 2204, 2212 can include a bed 2240, side tables 2242, upholstered chairs 2244, a writing table 2246, a sofa 2248, coffee tables 2250, a television 2252, a kitchenette 2254, and a set of step stairs 2256. The kitchenettes 2254 and the sets of step stairs 2256 can be operably associated with the corresponding bathrooms 2216. In other embodiments, the first, second, and third rentable units 2202, 2204, 2212 can include other suitable furnishings, fixtures, accessories, etc. Furthermore, the furnishings, fixtures, accessories, etc. of the first, second, and third rentable units 2202, 2204, 2212 need not be consistent. In some cases, the first, second, and third rentable units 2202, 2204, 2212 accommodate different types of alternative uses and/or accommodate the same type of alternative use, but have dissimilar furnishings, fixtures, accessories, etc. As described in further detail below, the first, second, and third rentable units 2202, 2204, 2212 can accommodate lodging uses, residential uses (e.g., short-term residential uses), office uses (e.g., short-term office uses), assembly uses (e.g., short-term assembly uses), and combinations thereof, among other possible types of alternative uses.

FIGS. 54, 55, 56 and 57 are, respectively, a first side profile view, an opposite second side profile view, a first end profile view, and an opposite second end profile view of the bathroom 2216*c*. The bathroom 2216*c* will now be described with the understanding that the bathrooms 2216*a*, 2216*b* can have the same or similar features. With reference to FIGS. 54-57 together, the bathroom 2216*c* can include a rectangular floor module 2300, a rectangular ceiling module 2302 vertically spaced apart from the floor module 2300, and a plurality of wall modules 2304 (individually identified as wall modules 2304*a*-2304*d*) removably connected to the floor and ceiling modules 2300, 2302 at respective perimeter portions of the floor and ceiling modules 2300, 2302. The bathroom 2216*c* can further include a lower gasket 2306 disposed between the perimeter portion of the floor module 2300 and the wall modules 2304, and an upper gasket 2308 disposed between the perimeter portion of the ceiling module 2302 and the wall modules 2304. The floor module 2300 can include upwardly extending tabs 2310 through which the floor module 2300 is secured to the wall modules 2304. Similarly, the ceiling module 2302 can include downwardly extending tabs 2312 through which the ceiling module 2302 is secured to the wall modules 2304. The wall modules 2304*c*, 2304*d* can include vertical flanges 2314 at which the wall modules 2304*c*, 2304*d* are secured to the wall modules 2304*a*, 2304*b*. The bathroom 2216*c* can include bolts 2316 and associated nuts 2318 at the upwardly extending tabs 2310, the downwardly extending tabs 2312, and the vertical flanges 2314.

At the wall module 2304*a* (FIG. 56), the bathroom 2216*c* can include a doorway opening 2320, a frame 2322 extending around the doorway opening 2320, and a door 2324 disposed within the doorway opening 2320 and hingedly connected to the frame 2322. The bathroom 2216*c* can further include a handle 2326 and hinges 2328 operably associated with the door 2324. At the wall module 2304*b* (FIG. 57), the bathroom 2216*c* can include a plumbing ventilation hookup 2330 and an exhaust hookup 2332. The plumbing ventilation hookup 2330 and the exhaust hookup 2332 can be configured for convenient connection to and disconnection from the plumbing ventilation line 2224*c* and the exhaust line 2226*c* (FIG. 53), respectively, such as via quick release couplings (not shown). The wall modules 2304*c*, 2304*d* can extend between the wall modules 2304*a*, 2304*b* at opposite sides of the bathroom 2216*c*. As discussed above, the bathroom 2216*c* can be configured to be elevated above a floor surface of the first compartment 2208. For this purpose and/or another suitable purpose, the floor module 2300 can include feet 2333. In at least some embodiments, a gap between the feet 2333 is large enough to allow the bathroom 2216*c*, when fully assembled, to be conveniently moved by forklift. At the ceiling module 2302, the bathroom 2216*c* can include skylights 2334 that allow ambient light within the first compartment 2208 to enter an interior of the bathroom 2216*c*.

At a side of the floor module 2300 below the wall module 2304*c*, the bathroom 2216*c* can include a main plumbing drain hookup 2335, a main cold water supply hookup 2336, and a main hot water supply hookup 2338. At an end of the floor module 2300 below the wall module 2304*b*, the bathroom 2216*c* can include a main electrical hookup 2340. The main plumbing drain hookup 2335, the main cold water supply hookup 2336, the main hot water supply hookup 2338, and the main electrical hookup 2340 can be configured for convenient connection to and disconnection from the plumbing drain line 2218*c*, the cold water supply line 2220*c*, the hot water supply line 2222*c*, and the electrical line 2229*c*, respectively, such as via quick release couplings (not shown). At a side of the floor module 2300 below the wall module 2304*d*, the bathroom 2216*c* can include an auxiliary plumbing drain hookup 2342, an auxiliary cold water supply hookup 2344, an auxiliary hot water supply hookup 2346, and an auxiliary electrical hookup 2348. The auxiliary plumbing drain hookup 2342, the auxiliary cold water supply hookup 2344, the auxiliary hot water supply hookup 2346, and the auxiliary electrical hookup 2348 can be configured for convenient connection to and disconnection from corresponding lines (not shown) of the kitchenette 2254, such as via quick release couplings (not shown).

Figure 54:
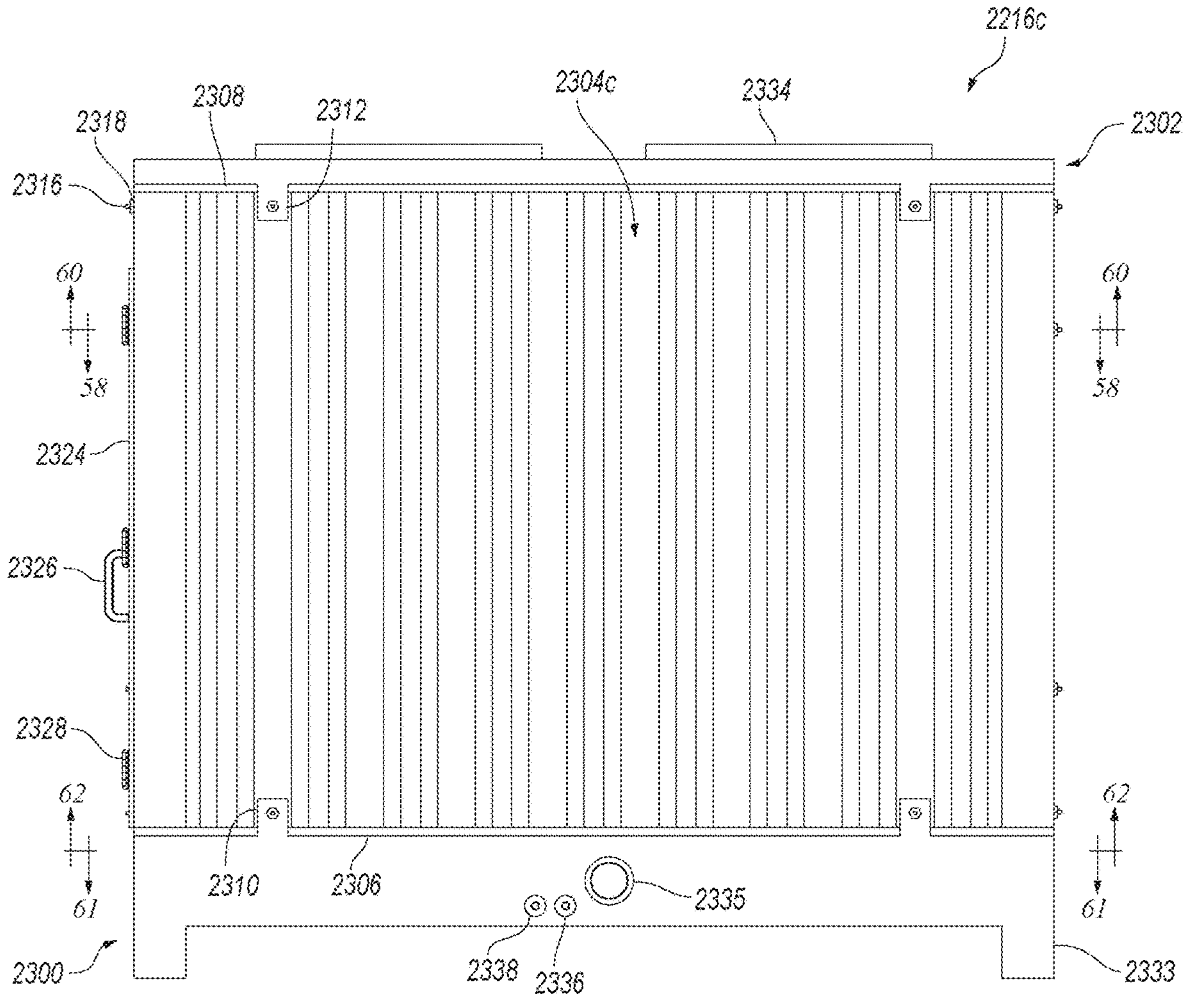
FIGS. 54, 55, 56 and 57 are, respectively, a first side profile view, an opposite second side profile view, a first end profile view, and an opposite second end profile view of a bathroom of the collection shown in FIG. 53.
Figure 55:
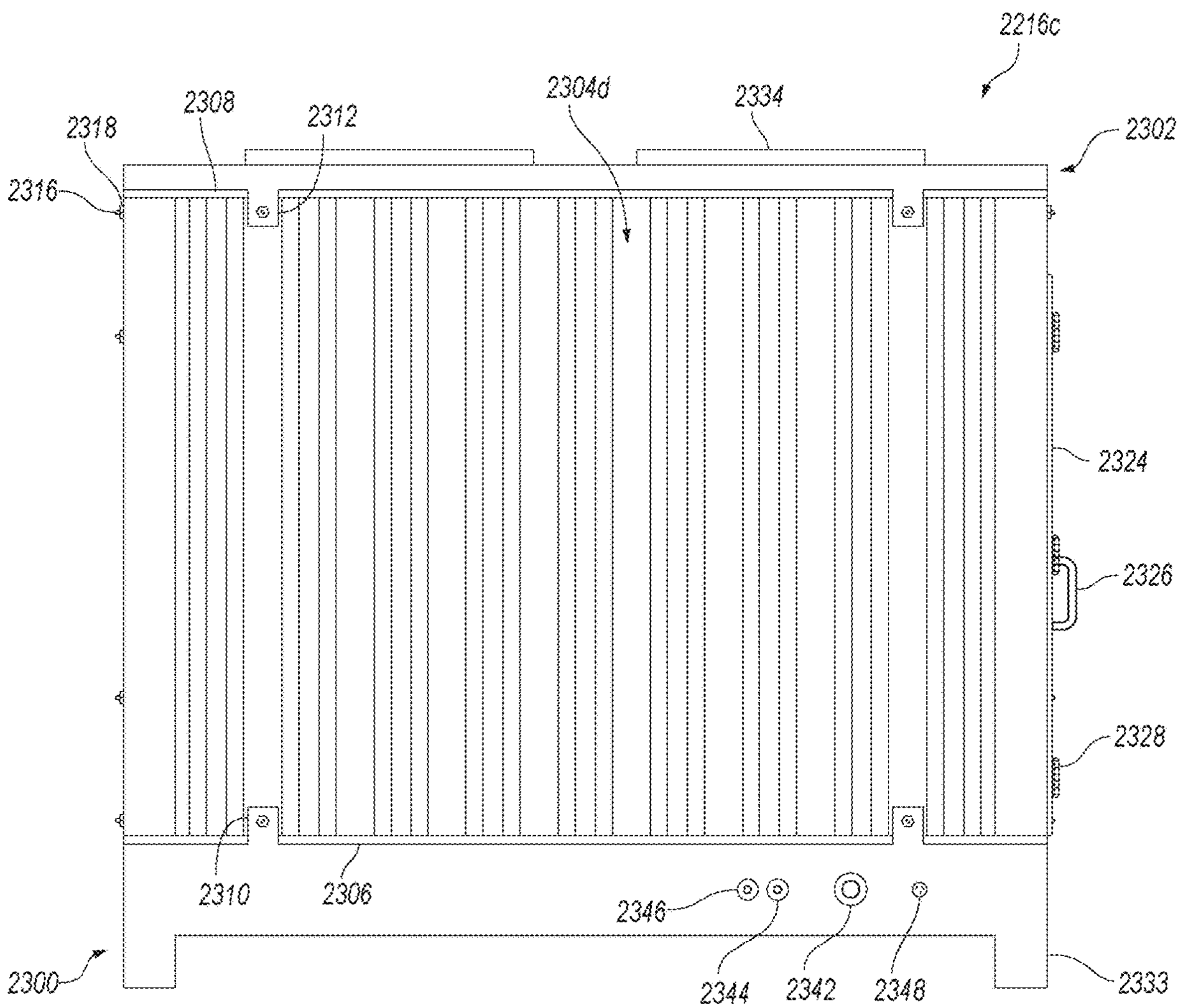
Figure 56:
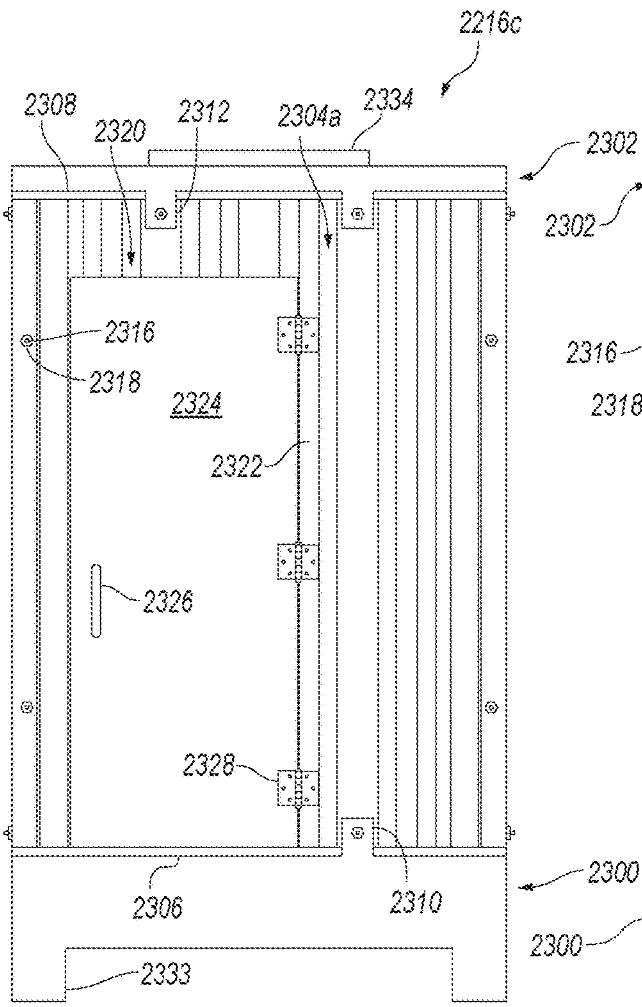
Figure 58:
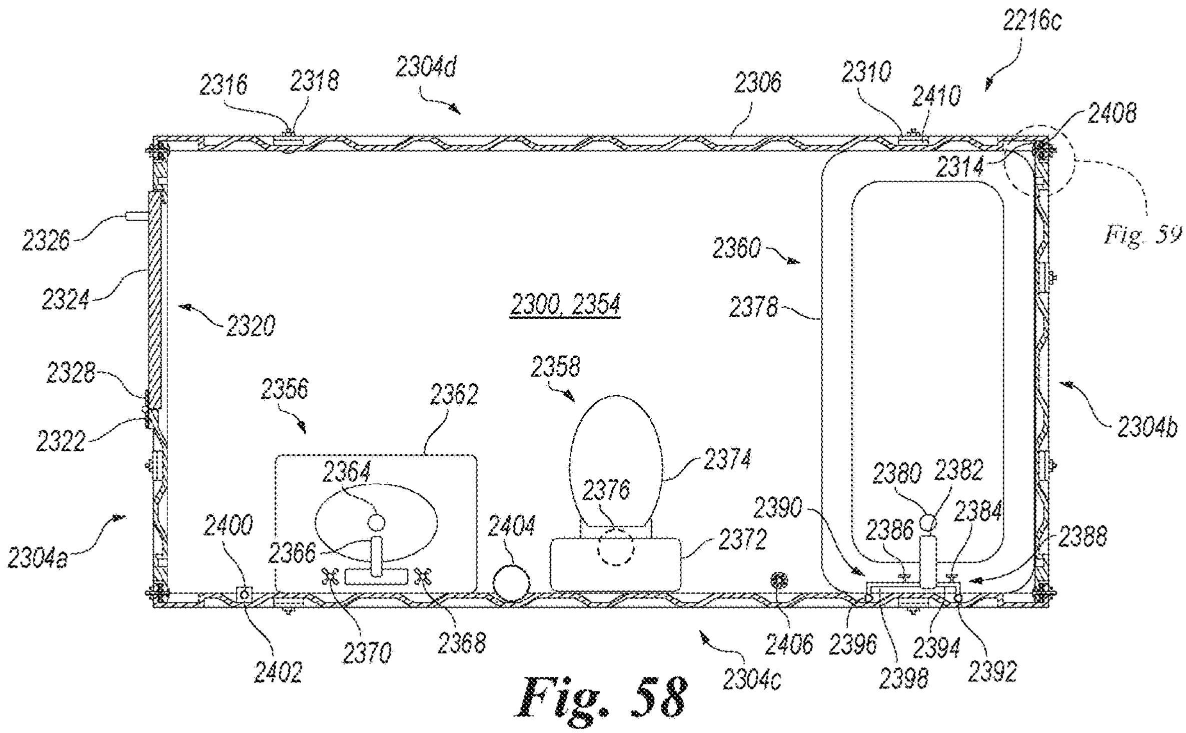
FIG. 58 is a cross-sectional top plan view of the bathroom of the collection shown in FIG. 53 taken along the line 58-58 in FIG. 54.

FIG. 58 is a cross-sectional top plan view of the bathroom 2216*c* taken along the line 58-58 in FIG. 54. As shown in FIG. 58, the floor module 2300 can include a deck 2354, and the bathroom 2216*c* can include a sink 2356, a toilet 2358, and a bathtub/shower 2360 disposed (e.g., removably disposed) on the deck 2354. The sink 2356 can include a basin 2362, a sink drain 2364, a sink faucet 2366, a sink hot water knob 2368, and a sink cold water knob 2370 operably connected to one another. The toilet 2358 can include a tank 2372, a bowl 2374, and a toilet drain 2376 operably connected to one another. The bathtub/shower 2360 can include a tub 2378, a tub drain 2380, a tub faucet 2382, a tub cold water knob 2384, a tub hot water knob 2386, a cold water conduit 2388, and a hot water conduit 2390 operably connected to one another. The cold water conduit 2388 can include a riser 2392 and a first branch 2394 extending between the riser 2392 and the tub faucet 2382. The tub cold water knob 2384 can be disposed along the first branch 2394 and operable to control a flow of cold water from the cold water conduit 2388 to the tub faucet 2382. Similarly, the hot water conduit 2390 can include a riser 2396 and a first branch 2398 extending between the riser 2396 and the tub faucet 2382. The tub hot water knob 2386 can be disposed along the first branch 2398 and operable to control a flow of hot water from the hot water conduit 2390 to the tub faucet 2382.

Figure 59:
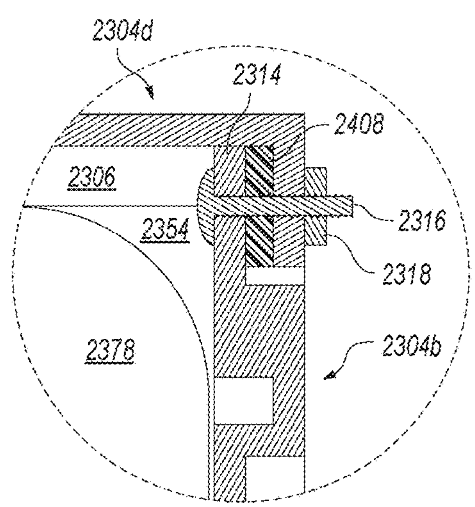
FIG. 59 is an enlarged view of a portion of FIG. 58.

The bathroom 2216*c* can further include an electrical conduit 2400, a junction box 2402 operably connected to the electrical conduit 2400, a plumbing ventilation conduit 2404 disposed between the sink 2356 and the toilet 2358, and a floor drain 2406 disposed between the toilet 2358 and the bathtub/shower 2360. FIG. 59 is an enlarged view of a portion of FIG. 58. With reference to FIGS. 58 and 59 together, the bathroom 2216*c* can include vertical gaskets 2408 disposed between the respective vertical flanges 2314 and corresponding portions of the wall modules 2304*a*, 2304*b*. Similarly, the bathroom 2216*c* can include lower tab gaskets 2410 disposed between the respective upwardly extending tabs 2310 and corresponding portions of the wall modules 2304.

Figure 57:
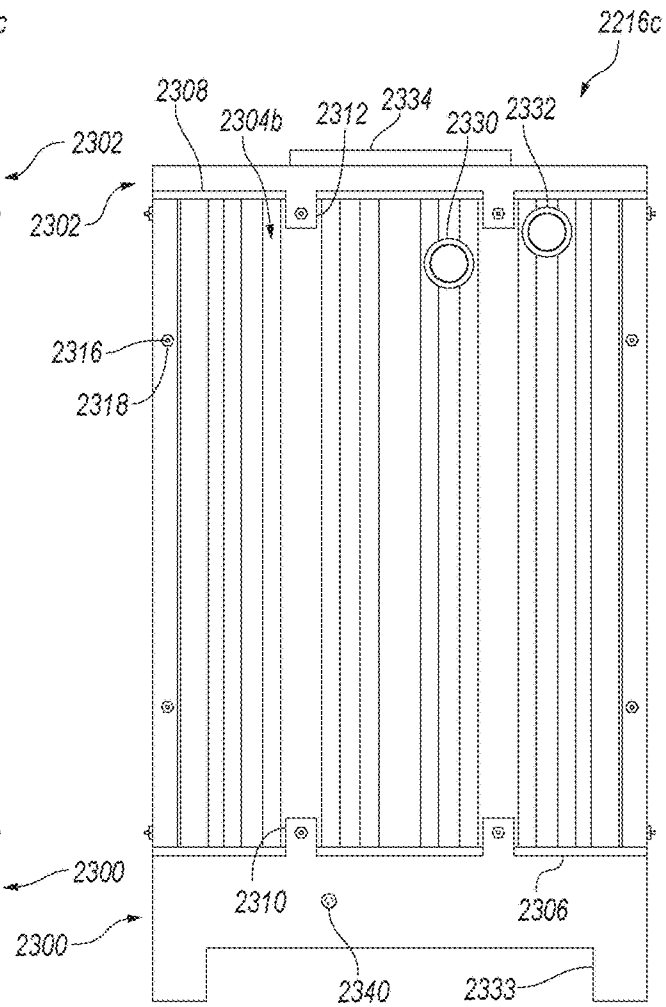
Figure 60:
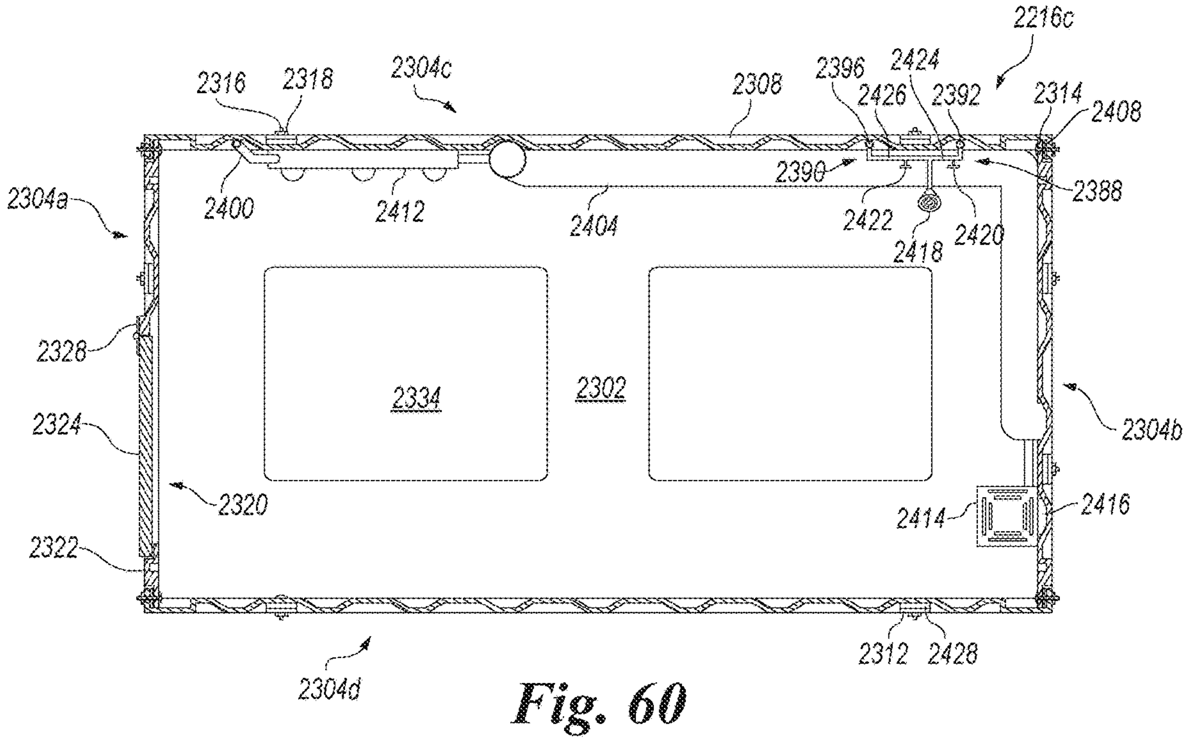
FIG. 60 is a cross-sectional bottom plan view of the bathroom of the collection shown in FIG. 53 taken along the line 60-60 in FIG. 54.

FIG. 60 is a cross-sectional bottom plan view of the bathroom 2216*c* taken along the line 60-60 in FIG. 54. As shown in FIG. 60, the bathroom 2216*c* can include a light fixture 2412 attached to the wall module 2304*c* above the sink 2356. The bathroom 2216*c* can further include an exhaust intake fan 2414 attached to the ceiling module 2302. The electrical conduit 2400 can extend from the junction box 2402 (FIG. 58) to the light fixture 2412, and from the light fixture 2412 to the exhaust intake fan 2414. The plumbing ventilation conduit 2404 can extend along an inner corner between the ceiling module 2302 and the wall modules 2304*b*, 2304*c* to the plumbing ventilation hookup 2330 (FIG. 57). The bathroom 2216*c* can include an exhaust conduit 2416 extending between the exhaust intake fan 2414 and the exhaust hookup 2332 (FIG. 57). Above one end of the tub 2378 (FIG. 58), the bathtub/shower 2360 (FIG. 58) can include a showerhead 2418, a shower cold water knob 2420 operably connected to the cold water conduit 2388, and a shower hot water knob 2422 operably connected to the hot water conduit 2390. The cold water conduit 2388 can include a second branch 2424 extending between the riser 2392 and the showerhead 2418. The shower cold water knob 2420 can be disposed along the second branch 2424 and operable to control a flow of cold water from the cold water conduit 2388 to the showerhead 2418. Similarly, the hot water conduit 2390 can include a second branch 2426 extending between the riser 2396 and the showerhead 2418. The shower hot water knob 2422 can be disposed along the second branch 2426 and operable to control a flow of hot water from the hot water conduit 2390 to the showerhead 2418. The bathroom 2216*c* can include upper tab gaskets 2428 disposed between the respective downwardly extending tabs 2312 and corresponding portions of the wall modules 2304.

Figure 61:
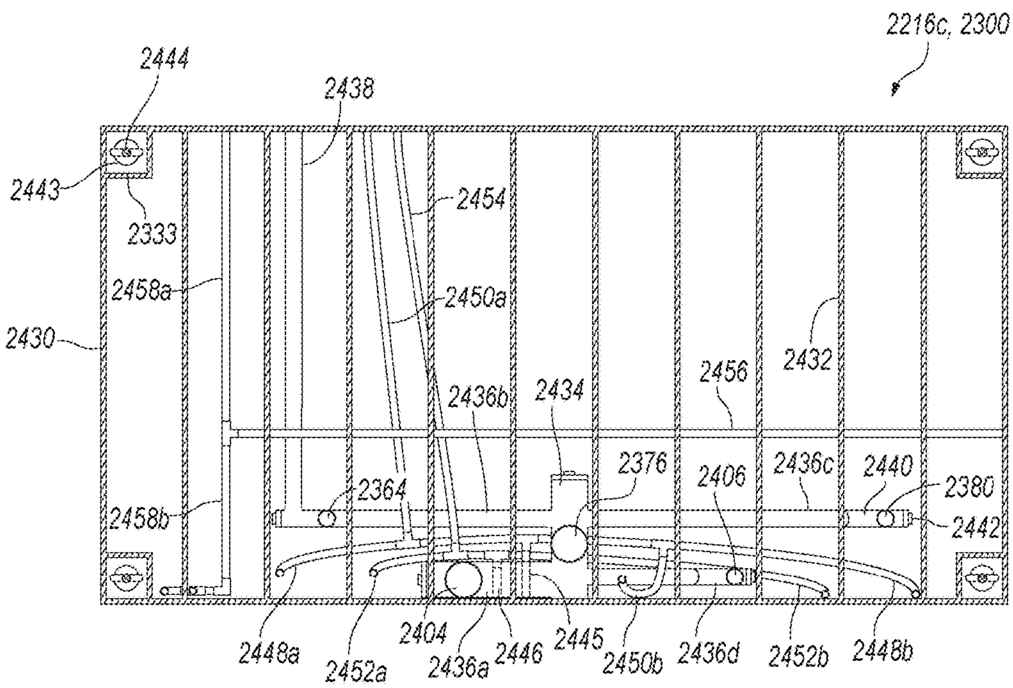
FIG. 61 is a cross-sectional top plan view of the bathroom of the collection shown in FIG. 53 taken along the line 61-61 in FIG. 54.

FIG. 61 is a cross-sectional top plan view of the bathroom 2216*c* taken along the line 61-61 in FIG. 54. With reference to FIGS. 54, 55, 58 and 61 together, the floor module 2300 can include a skirt 2430 and a series of parallel spaced-apart joists 2432 within the skirt 2430. The bathroom 2216*c* can include a main plumbing drain conduit 2434 operably connected to the main plumbing drain hookup 2335 and the toilet drain 2376. The main plumbing drain conduit 2434 can include branches 2436 (individually identified as branches 2436*a*-2436*d*) operably connected to the plumbing ventilation conduit 2404, the sink drain 2364, the tub drain 2380, and the floor drain 2406, respectively. The main plumbing drain conduit 2434 can further include a sub-branch 2438 operably connected to the auxiliary plumbing drain hookup 2342 via the branch 2436*b*. The branches 2436*c*, 2436*d* can include respective traps 2440. Furthermore, the main plumbing drain conduit 2434 and the branches 2436 can include respective caps 2442. The bathroom 2216*c* can include wheels 2443 (e.g., swivel casters) integrated into the floor module 2300. In the illustrated embodiment, the wheels 2443 are embedded within the feet 2333 and accessible via inwardly facing openings (not shown) of the feet 2333. The individual wheels 2443 can be movable between a retracted state and an extended state. For example, the bathroom 2216*c* can include posts 2444 having threads (not shown) that engage corresponding threads (not shown) of the wheels 2443 such that the wheels 2443 can be rotatably moved between the retracted and extended states. Moving the wheels 2443 from the retracted state to the extended state can lift the bathroom 2216*c* off a corresponding floor surface, thereby allowing the bathroom 2216*c* to be conveniently moved along the floor surface.

The bathroom 2216*c* can further include a main cold water conduit 2445 and a main hot water conduit 2446 operably connected to the main cold water supply hookup 2336 and the main hot water supply hookup 2338, respectively. The main cold water conduit 2445 can include branches 2448 (individually identified as branches 2448*a*, 2448*b*) operably connected to the sink 2356 and the bathtub/shower 2360 (via the riser 2392), respectively. The main cold water conduit 2445 can further include a sub-branch 2450*a* operably connected to the auxiliary cold water supply hookup 2344 via the branch 2448*a*. The main cold water conduit 2445 can still further include a sub-branch 2450*b* operably connected to the toilet 2358 via the branch 2448*b*. The main hot water conduit 2446 can include branches 2452 (individually identified as branches 2452*a*, 2452*b*) operably connected to the sink 2356 and the bathtub/shower 2360 (via the riser 2396), respectively. The main hot water conduit 2446 can further include a sub-branch 2454 operably connected to the auxiliary hot water supply hookup 2346 via the branch 2452*a*. The bathroom 2216*c* can still further include a main electrical conduit 2456 operably connected to the main electrical hookup 2340. The main electrical conduit 2456 can include branches 2458 (individually identified as branches 2458*a*, 2458*b*) operably connected to the electrical conduit 2400 and the auxiliary electrical hookup 2348, respectively.

Figure 62:
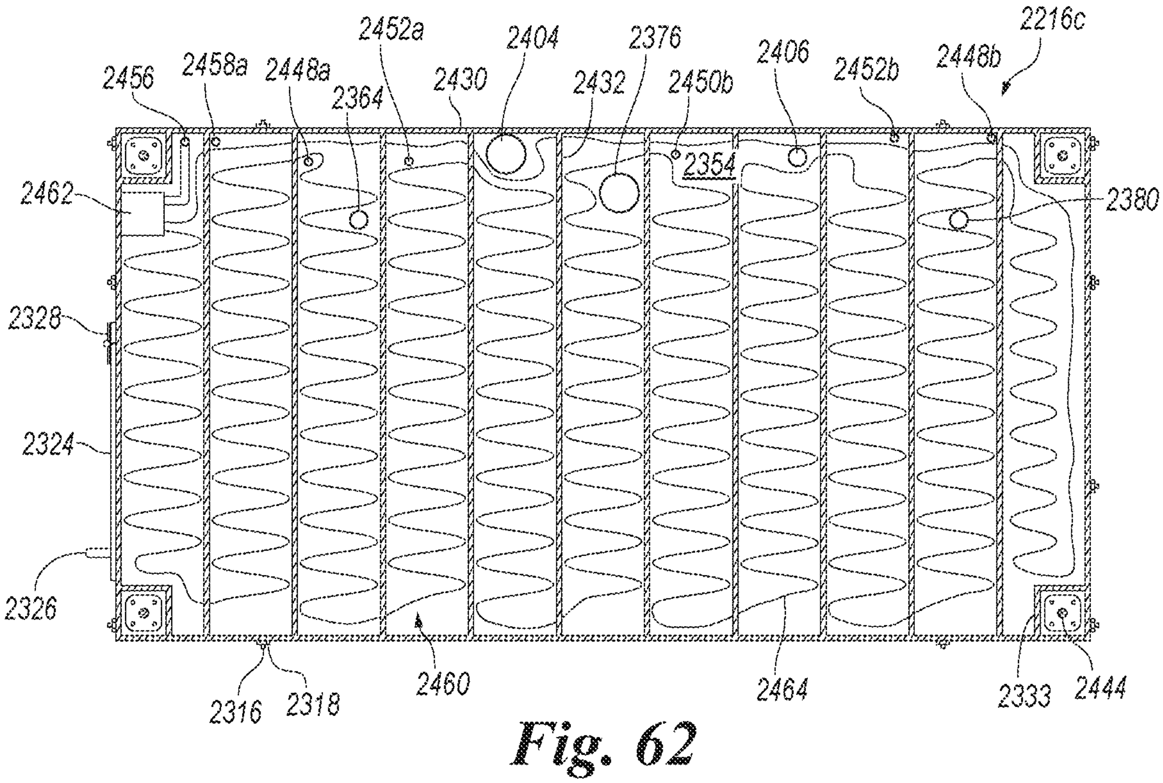
FIG. 62 is a cross-sectional bottom plan view of the bathroom of the collection shown in FIG. 53 taken along the line 62-62 in FIG. 54.

FIG. 62 is a cross-sectional bottom plan view of the bathroom 2216*c* taken along the line 62-62 in FIG. 54. As shown in FIG. 62, the bathroom 2216*c* can include a floor heating system 2460 operably associated with the deck 2354. The floor heating system 2460 can include a control box 2462 operably connected to the main electrical conduit 2456, and a heating cable 2464 operably connected to the control box 2462. The heating cable 2464 can have a serpentine configuration and be directly connected to an underside of the deck 2354 between the joists 2432. With reference to FIGS. 54-62 together, the floor drain 2406, the main plumbing drain conduit 2434 (e.g., including its branches 2436 and sub-branch 2438), the main cold water conduit 2445 (e.g., including its branches 2448 and sub-branch 2450), the main hot water conduit 2446 (e.g., including its branches 2452 and sub-branch 2454), the main electrical conduit 2456 (e.g., including its branches 2458), the floor heating system 2460, and/or other suitable components of the bathroom 2216*c* can be pre-installed components of the floor module 2300. Similarly, the supply plumbing for the bathtub/shower 2360 (e.g., including the tub faucet 2382, the cold water conduit 2388, the hot water conduit 2390, and the showerhead 2418), the light fixture 2412, and/or other suitable components of the bathroom 2216*c* can be pre-installed components of the wall module 2304*c*. These and/or other aspects of the bathroom 2216*c* can facilitate rapid deployment, removal, and redeployment of the bathroom 2216*c*.

Figure 63:
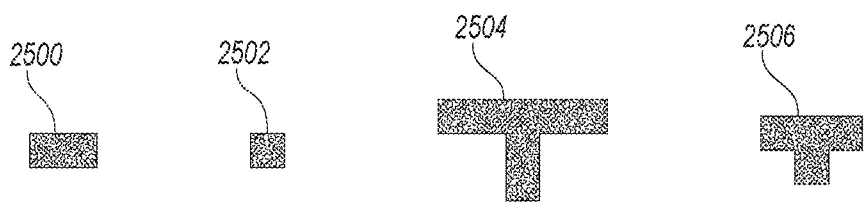
FIG. 63 is top plan view of wall components types included in a compartmentalizing assembly of the collection shown in FIG. 53.

FIG. 63 is top plan view of wall component types included in the compartmentalizing assembly 2206 (FIG. 53). As further described below, the compartmentalizing assembly 2206 can be made up mostly or entirely of reusable modular components. For example, the compartmentalizing assembly 2206 can include staggered rows of wall components of a first type 2500. At portions of the compartmentalizing assembly 2206 closest to the permanent walls 2102, the compartmentalizing assembly 2206 can include wall components of a second type 2502 respectively disposed at every other row of the compartmentalizing assembly 2206 between the wall components of the first type 2500. In at least some embodiments, the wall components of the first type 2500 have rectangular footprints with aspect ratios of 2:1. In these and other embodiments, the wall components of the second type 2502 can have square footprints. Thus, when seams between the wall components of the first type 2500 are evenly staggered row-to-row, the wall components of the second type 2502 can cap the short rows, thereby giving the compartmentalizing assembly 2206 vertical end portions at or near the permanent walls 2102. Similarly, the compartmentalizing assembly 2206 can include wall components of a full-size third type 2504 and wall components of a reduced-size fourth type 2506 that can alternatingly stacked to form a T-shaped intersection of the compartmentalizing assembly 2206. In other embodiments, corresponding compartmentalizing assemblies can include full-size and reduced-size L-shaped wall components that can be stacked to form an L-shaped intersection, full-size and reduced-size cross-shaped wall components that can be stacked to form a cross-shaped intersection, and/or wall components of other suitable forms.

Figure 64:
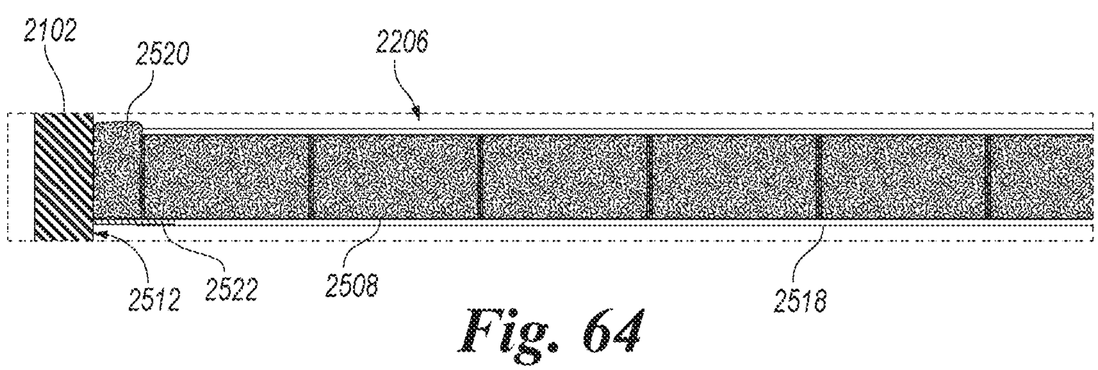
FIG. 64 is an enlarged view of a portion of FIG. 53.
Figure 65:
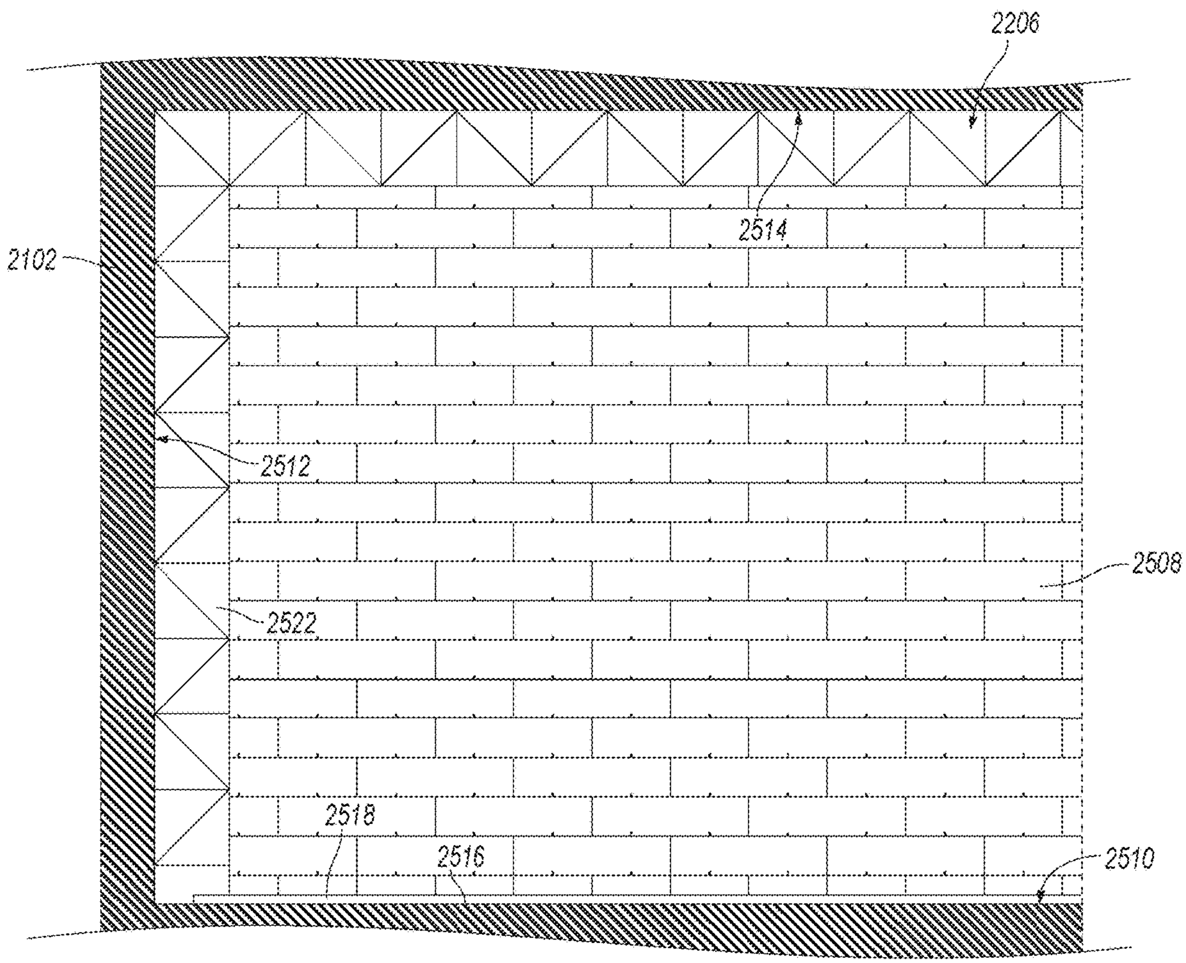
FIGS. 65 and 66 are, respectively, a first side profile view and an opposite second side profile view approximately corresponding to the portion of FIG. 53 shown in FIG. 64.
Figure 66:
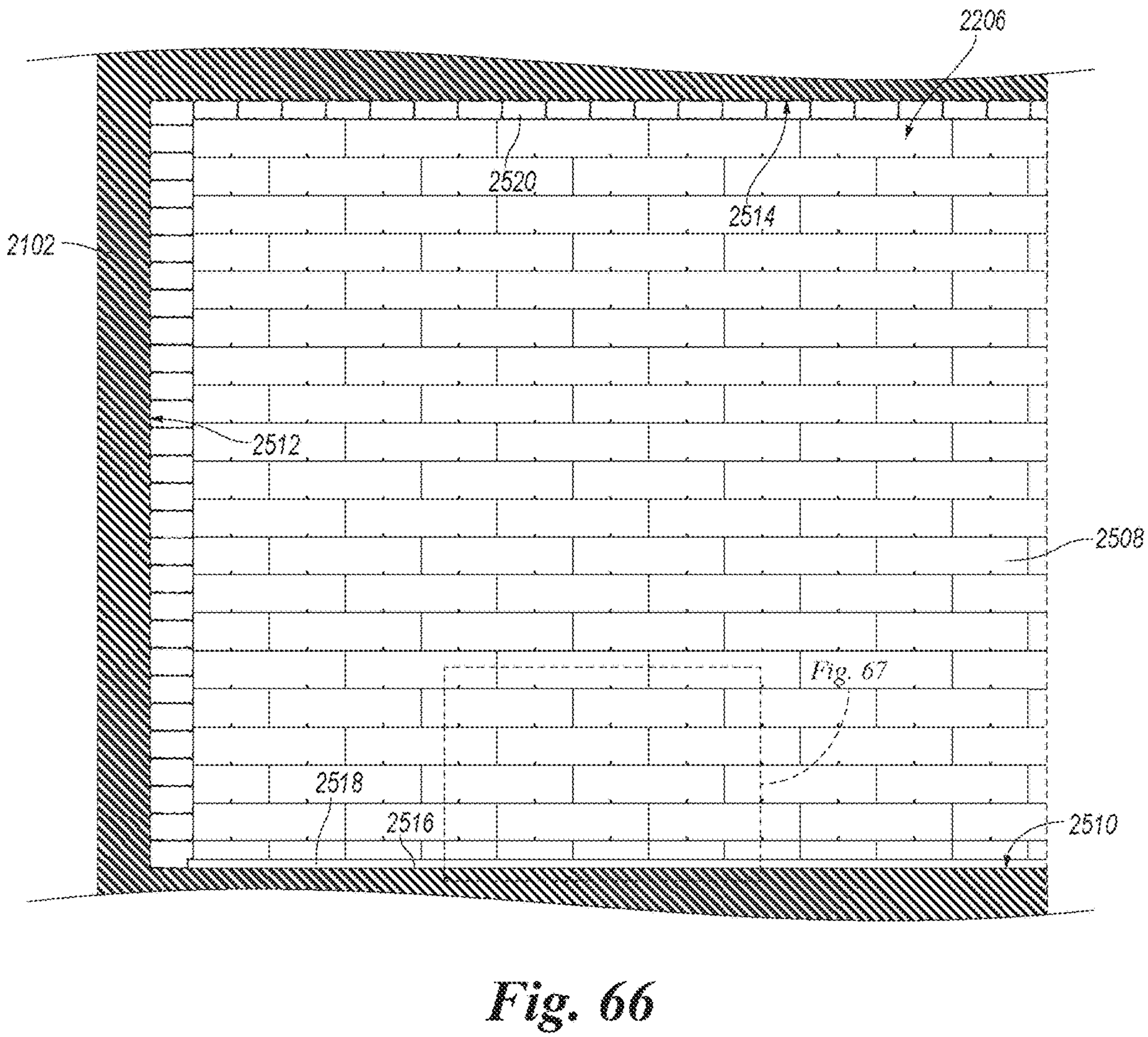

FIG. 64 is an enlarged view of a portion of FIG. 53. FIGS. 65 and 66 are, respectively, a first side profile view and an opposite second side profile view corresponding to the portion of FIG. 53 shown in FIG. 64. With reference to FIGS. 53 and 63-66 together, the illustrated portion of the compartmentalizing assembly 2206 can include reusable wall components 2508 of the first and second types 2500, 2502 removably disposed within the oversized room 2114. For example, the oversized room 2114 can have a finished floor surface 2510 over which the wall components 2508 are removably disposed, a finished wall surface 2512 beside which the wall components 2508 are removably disposed, and a finished ceiling surface 2514 below which the wall components 2508 are removably disposed. The compartmentalizing assembly 2206 can include a liner 2516 disposed (e.g., removably or permanently disposed) on the finished floor surface 2510 below the wall components 2508. For example, the liner 2516 can be adhesively connected to the finished floor surface 2510. The liner 2516 can be useful, for example, to protect the finished floor surface 2510 from other components of the compartmentalizing assembly 2206, to facilitate layout the compartmentalizing assembly 2206, to reduce or eliminate the possibility of shifting of the compartmentalizing assembly 2206, and/or for other suitable purposes. Suitable materials for the liner 2516 include strips of peel-and-stick house wrap and strips of peel-and-stick roof underlayment. The liner 2516 can be disposable or reusable.

In at least some embodiments, the compartmentalizing assembly 2206 includes additional components that facilitate compatibility between the wall components 2508 and the oversized room 2114 when the wall components 2508 have standard dimensions and the oversized room 2114 has irregular dimensions. For example, the compartmentalizing assembly 2206 can include a mass of self-leveling material 2518 (e.g., a disposable mass of hardened self-leveling grout) under the wall components 2508 and over the liner 2516. The mass of self-leveling material 2518 can be molded and, in at least some cases, is integrally formed along most or all of an overall footprint of the compartmentalizing assembly 2206. During formation of the mass of self-leveling material 2518, the constituent self-leveling material can be of sufficiently low viscosity to level itself by gravity. Thus, the mass of self-leveling material 2518 can automatically conform to slopes, dips, and other irregularities in the finished floor surface 2510. When at least partially cured, the mass of self-leveling material 2518 can provide the compartmentalizing assembly 2206 with a reliably level surface that facilitates vertical stacking of the wall components 2508.

As shown in FIGS. 64 and 66, the compartmentalizing assembly 2206 can include compressible batting 2520 disposed (e.g., stuffed) into a vertical gap between the wall components 2508 and the finished wall surface 2512 and disposed (e.g., stuffed) into a horizontal gap between the wall components 2508 and the finished ceiling surface 2514. In at least some embodiments, the batting 2520 is reusable. Furthermore, the batting 2520 can be non-combustible. For example, the batting 2520 can be reusable bundles of lined or unlined mineral wool insulation. At a side of the compartmentalizing assembly 2206 closest to the first compartment 2208, the compartmentalizing assembly 2206 can include molding panels 2522 that hide the batting 2520. The molding panels 2522 can be attached to the wall components 2508 magnetically, adhesively, mechanically, or in another suitable manner. In some embodiments, the overall compartmentalizing assembly 2206 is self-supporting, freestanding, and has a fire rating of at least two hours. In other embodiments, the overall compartmentalizing assembly 2206 can have only some or none of these attributes.

Figure 67:
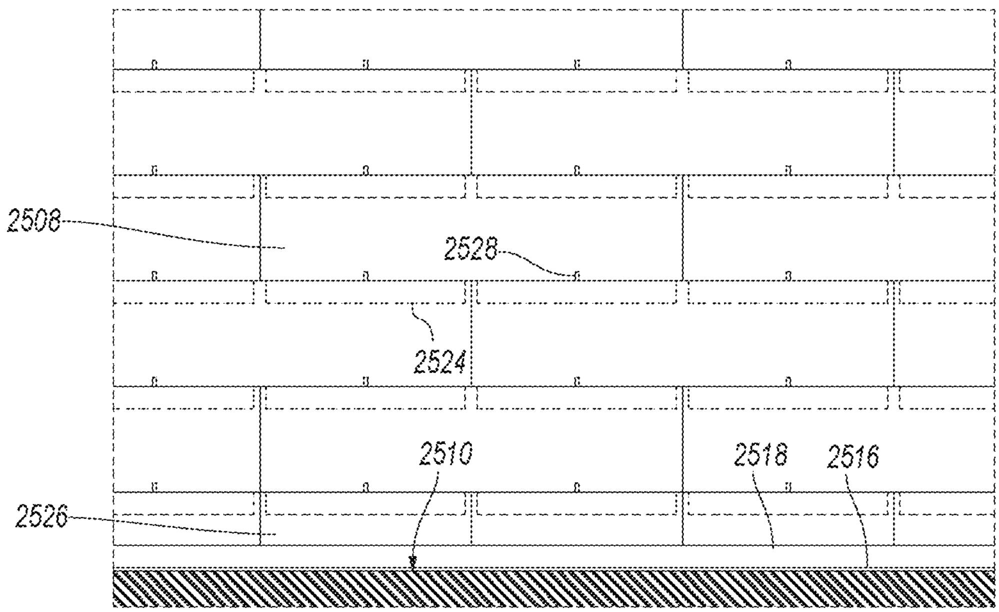
FIG. 67 is an enlarged view of a portion of FIG. 66.

FIG. 67 is an enlarged view of a portion of FIG. 66. As shown in FIG. 67, the wall components 2508 can be stacked within the compartmentalizing assembly 2206. Furthermore, the wall components 2508 can be interlocking within the compartmentalizing assembly 2206. For example, the individual wall components 2508 can include downwardly extending flanges 2524 that are received within successively lower wall components 2508. At the mass of self-leveling material 2518, the compartmentalizing assembly 2206 can include base blocks 2526 configured to receive the flanges 2524 of the wall components 2508 within a lowest row of wall components 2508 within the compartmentalizing assembly 2206. When fully assembled, the compartmentalizing assembly 2206 can be strong enough to support fixtures and accessories (e.g., electrical conduits, monitors, shelving, moldings, artwork, furniture supports, etc.). In at least some embodiments, exposed portions of the wall components 2508 are at least partially made of ferrous metal such that suitable fixtures and accessories can be connected to the compartmentalizing assembly 2206 magnetically. In addition or alternatively, the wall components 2508 can include coupling components 2528 that allow suitable fixtures and accessories to be connected to the compartmentalizing assembly 2206 mechanically and/or by gravity.

Figure 68:
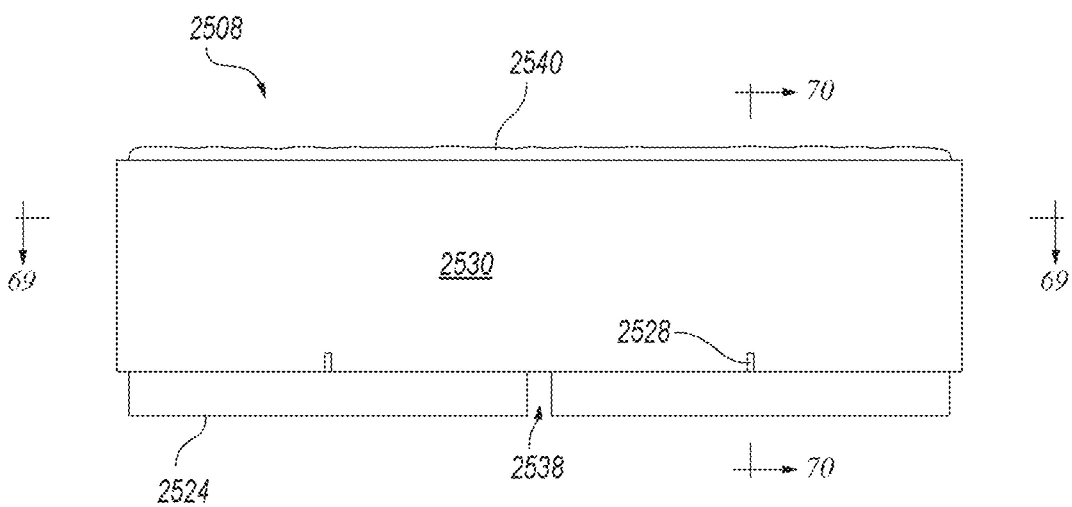
FIG. 68 is side profile view of a wall component of the compartmentalizing assembly of the collection shown in FIG. 53.
Figure 69:
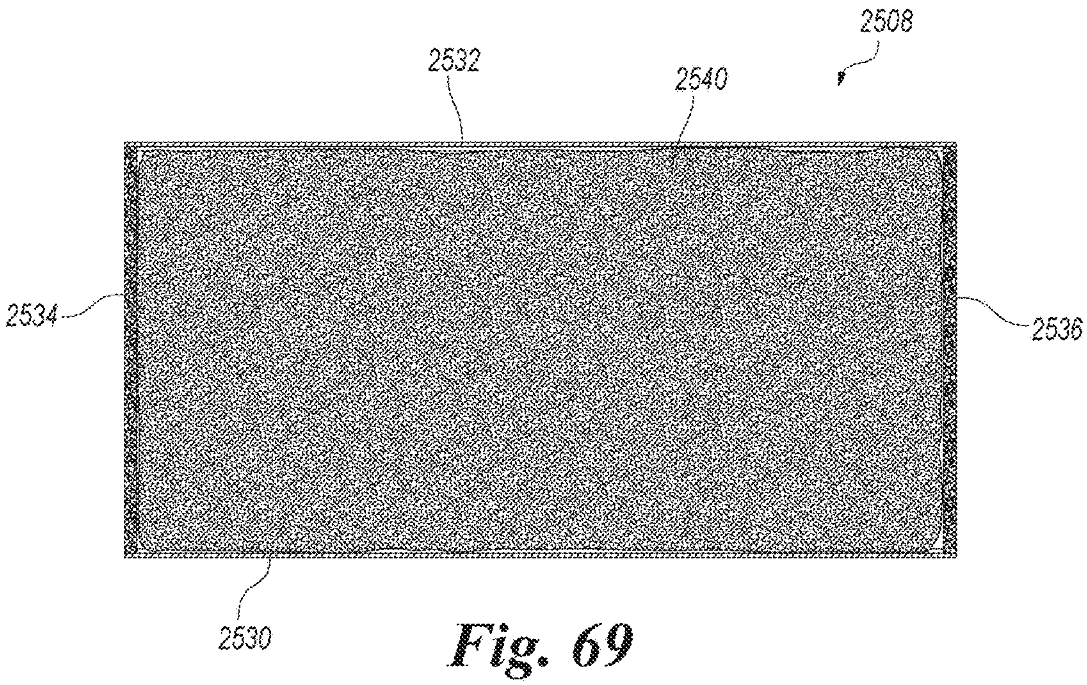
FIG. 69 is a cross-sectional top plan view of the wall component of the compartmentalizing assembly of the collection shown in FIG. 53 taken along the line 69-69 in FIG. 68.
Figure 70:
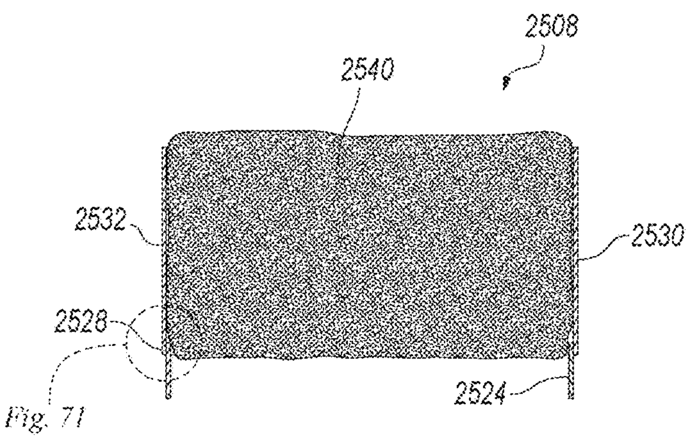
FIG. 70 is a cross-sectional end plan view of the wall component of the compartmentalizing assembly of the collection shown in FIG. 53 taken along the line 70-70 in FIG. 68.

FIG. 68 is side profile view of a given one of the wall components 2508 of the first type 2500 separate from other portions of the compartmentalizing assembly 2206. FIG. 69 is a cross-sectional top plan view of the given wall component 2508 taken along the line 69-69 in FIG. 68. FIG. 70 is a cross-sectional end plan view of the given wall component 2508 taken along the line 70-70 in FIG. 68. In at least some embodiments, other (e.g., most or all) of the wall components 2508 of the first type 2500 within the compartmentalizing assembly 2206 at least substantially match the given wall component 2508 illustrated in FIGS. 68-70. With reference to FIGS. 68-70 together, the given wall component 2508 can include a first side panel 2530 and an opposite second side panel 2532 parallel to and spaced apart from the first side panel 2530. Similarly, the given wall component 2508 can include a first end panel 2534 and an opposite second end panel 2536 parallel to and spaced apart from the first end panel 2534. The first and second side panels 2530, 2532 and the first and second end panels 2534, 2536 can define an interior region of the given wall component 2508 shaped, for example, as a rectangular solid. The given wall component 2508 can include two of the flanges 2524 at the first side panel 2530 and other two of the flanges 2524 at the second side panel 2532. As shown in FIG. 68, the flanges 2524 can be parallel to and inset relative to the corresponding first and second side panels 2530, 2532. Between the flanges 2524 at the first side panel 2530 and between the flanges 2524 at the second side panel 2532, the given wall component 2508 can include respective slots 2538.

When the given wall component 2508 is assembled with other wall components 2508 of the first type 2500 within the compartmentalizing assembly 2206, one of the flanges 2524 at the first side panel 2530 and an opposing one of the flanges 2524 at the second side panel 2532 can be received within the interior region of a first neighboring lower wall component 2508. Similarly, the other of the flanges 2524 at the first side panel 2530 and the other of the flanges 2524 at the second side panel 2532 can be received within the interior region of a second neighboring lower wall component 2508 adjacent to the first neighboring lower wall component 2508. The second end panel 2536 of the first neighboring lower wall component 2508 and the first end panel 2534 of the second neighboring lower wall component 2508 can be directly adjacent to one another and received within the slots 2538 of the given wall component 2508. This interaction between the wall components 2508 can facilitate convenient assembly of the compartmentalizing assembly 2206 with neighboring rows of the wall components 2508 evenly staggered.

In at least some embodiments, the given wall component 2508 is rigid and the first and second side panels 2530, 2532 and the first and second end panels 2534, 2536 provide the given wall component 2508 with most of its rigidity. In the illustrated embodiment, the first and second side panels 2530, 2532 are thinner than the first and second end panels 2534, 2536 and made of a different material. For example, the first and second side panels 2530, 2532 can be metal (e.g., iron) and the first and second end panels 2534, 2536 can be cementitious (e.g., fiber-reinforced cement). The metal composition of the first and second side panels 2530, 2532 can be useful, for example, for aesthetics, to facilitate magnetic coupling of fixtures and accessories to the compartmentalizing assembly 2206, and/or for another reason. The cementitious composition of the first and second end panels 2534, 2536 can be useful, for example, to enhance the fire rating of the compartmentalizing assembly 2206, to reduce noise transmission through the compartmentalizing assembly 2206, and/or for another reason. In other embodiments, the first and second side panels 2530, 2532 and the first and second end panels 2534, 2536 can have other suitable forms and/or compositions.

The given wall component 2508 can further include compressible batting 2540 disposed within its interior region. Similar to the batting 2520 described above, the batting 2540 can be reusable and/or non-combustible. For example, the batting 2538 can be reusable bundles of lined or unlined mineral wool insulation. In at least some embodiments, the batting 2540 is removable. Furthermore, the first and second side panels 2530, 2532 and the first and second end panels 2534, 2536 can be collapsible. For example, at the corners where the first and second side panels 2530, 2532 and the first and second end panels 2534, 2536 meet, the given wall component 2508 can include hinges (not shown), such as flexure bearings or piano hinges that allow each corner to fold in a direction that causes the first and second side panels 2530, 2532 and the first and second end panels 2534, 2536 to flatten. This feature along with the compressibility of the batting 2540 can facilitate efficient storage and transport of the given wall component 2508 between deployments. When the first and second side panels 2530, 2532 and the first and second end panels 2534, 2536 are collapsible, the given wall component 2508 can include a rectangular inset (not shown) that rests on upper edges of the flanges 2524. The inset can be removably disposed within the interior of the given wall component 2508 to cause the given wall component 2508 to maintain its rectangular form during use. When the first and second side panels 2530, 2532 and the first and second end panels 2534, 2536 are to be collapsed, the inset can be removed.

Figure 71:
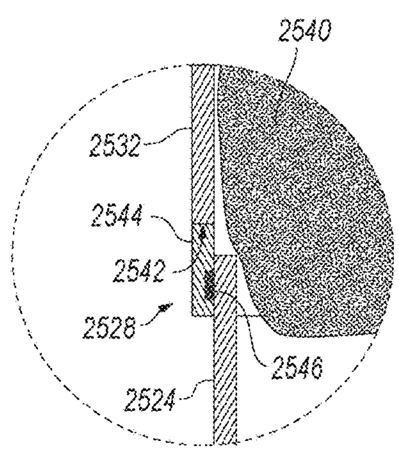
FIG. 71 is an enlarged view of a portion of FIG. 70.

FIG. 71 is an enlarged view of a portion of FIG. 70. As shown in FIG. 71, a lowermost portion of the first side panel 2530 can overlap an uppermost portion of one the flanges 2524. FIG. 71 further illustrates a given one of the coupling components 2528 at the lowermost portion of the first side panel 2530. In at least some embodiments, other (e.g., most or all) of the coupling components 2528 of wall components 2508 within the compartmentalizing assembly 2206 at least substantially match the coupling component 2528 illustrated in FIG. 71. The coupling component 2528 can include a notch 2542 and a plug 2544 removably disposed within the notch 2542. The plug 2544 can include a magnet 2546 that releasably connects the plug 2544 to the uppermost portion of the adjacent flange 2524. The plug 2544 can be disposed within the notch 2542 when the coupling component 2528 is not in use. Removing the plug 2544 from the notch 2542 can expose an opening into the interior of the given wall component 2508. A suitable mechanical fastener (e.g., a hook) (not shown) can be inserted into this opening. In this way, relatively heavy fixtures and accessories can be connected to the compartmentalizing assembly 2206 through a reliable mechanical connection in addition to or instead of a magnetic connection.

Figure 72:
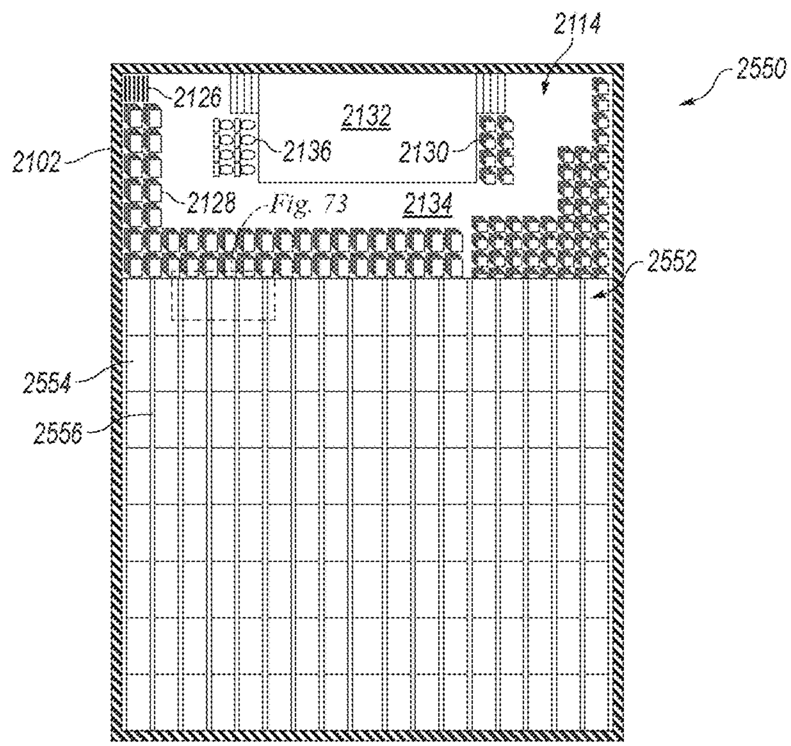
FIG. 72 is a top plan view of a portion of a collection of rentable units and associated structures in accordance with another embodiment of the present technology at the school building shown in FIG. 51 in the second state taken along the line 72-72 in FIG. 51.
Figure 73:
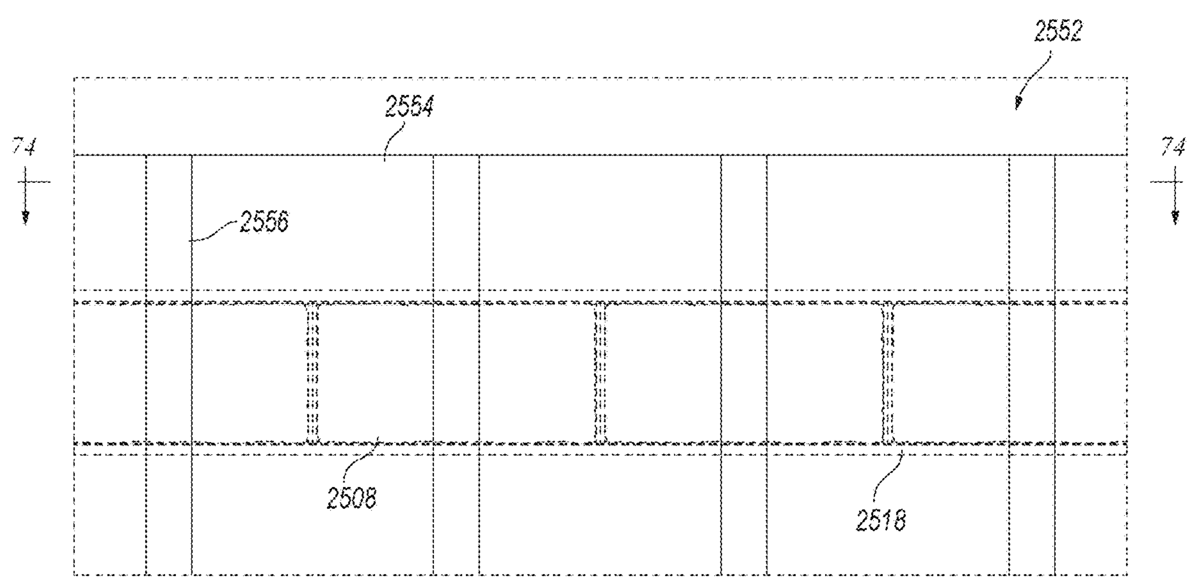
FIG. 73 is an enlarged view of a portion of FIG. 72.
Figure 74:
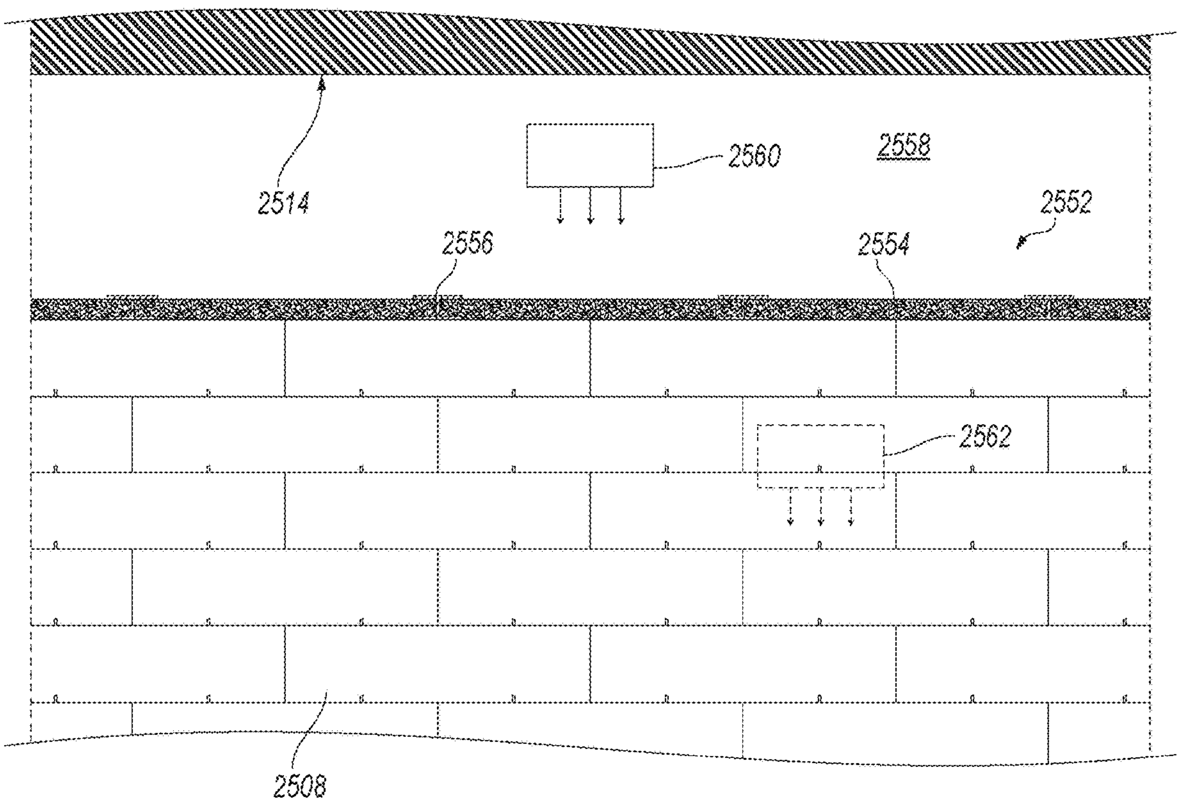
FIG. 74 is a side profile view approximately corresponding to the portion of FIG. 72 shown in FIG. 73 taken along the line 74-74 in FIG. 73.

FIG. 72 is a top plan view of a portion of a collection of rentable units and associated structures 2550 in accordance with another embodiment of the present technology at the oversized room 2114 of the school building 2100 in the second state taken along the line 72-72 in FIG. 51. FIG. 73 is an enlarged view of a portion of FIG. 72. FIG. 74 is a side profile view approximately corresponding to the portion of FIG. 72 shown in FIG. 73 taken along the line 74-74 in FIG. 73. With reference to FIGS. 72-74 together, the collection 2550 can include a compartmentalizing assembly 2552 having ceiling components (e.g., reusable ceiling components) removably disposed within the oversized room 2114 above the first and second compartments 2208, 2210. For example, the compartmentalizing assembly 2552 can include rigid ceiling panels 2554 and elongate ceiling beams 2556 interspersed between the ceiling panels 2554. The ceiling beams 2556 can support the ceiling panels 2554, and the wall components 2508 can support the ceiling beams 2556. The wall components 2508 can be assembled into walls, columns, or other suitable structures. For example, the compartmentalizing assembly 2552 can include a wall near the open area 2134 and another wall at a portion of the oversized room 2114 furthest from the stage 2132. The ceiling beams 2556 can extend between these walls. When a distance between underlying walls does not correspond to a multiple of the length of the ceiling panels 2554, and in other cases, the ceiling panels 2554 and beams 2556 can be cantilevered over one or both of the underlying walls.

As shown in FIG. 74, the individual ceiling beams 2556 can have an I-shape transverse cross-section including two channels at opposite sides of a central web. The individual ceiling panels 2554 can have side edge portions snugly received within corresponding channels of adjacent ceiling beams 2556. In at least some cases, the ceiling components form a thermally conductive ceiling above the first and second compartments 2208, 2210 and below an airspace 2558 within the oversized room 2114. The school building 2100 can include a heating system 2560 (shown schematically) operable to heat the airspace 2558 and thereby provide shared below-room-temperature baseline heating to the third and fourth rentable units 2212, 2214 via the thermally conductive ceiling. The third rentable unit 2212 can include a supplemental heater 2562 (shown schematically) operable to heat the first compartment 2208 and thereby provide supplemental heating to the third rentable unit 2212. Similarly, the fourth rentable unit 2214 can include a supplemental heater (not shown) operable to heat the second compartment 2210 and thereby provide supplemental heating to the fourth rentable unit 2214. Also similarly, the heating system 2560 can provide shared below-room-temperature baseline heating to the first and second rentable units 2202, 2204. The first and second rentable units 2202, 2204 can respectively include supplemental heaters (not shown) operable to heat the classrooms 2108*a*, 2108*b* and thereby provide supplemental heating to the first and second rentable units 2202, 2204.

Figure 75:
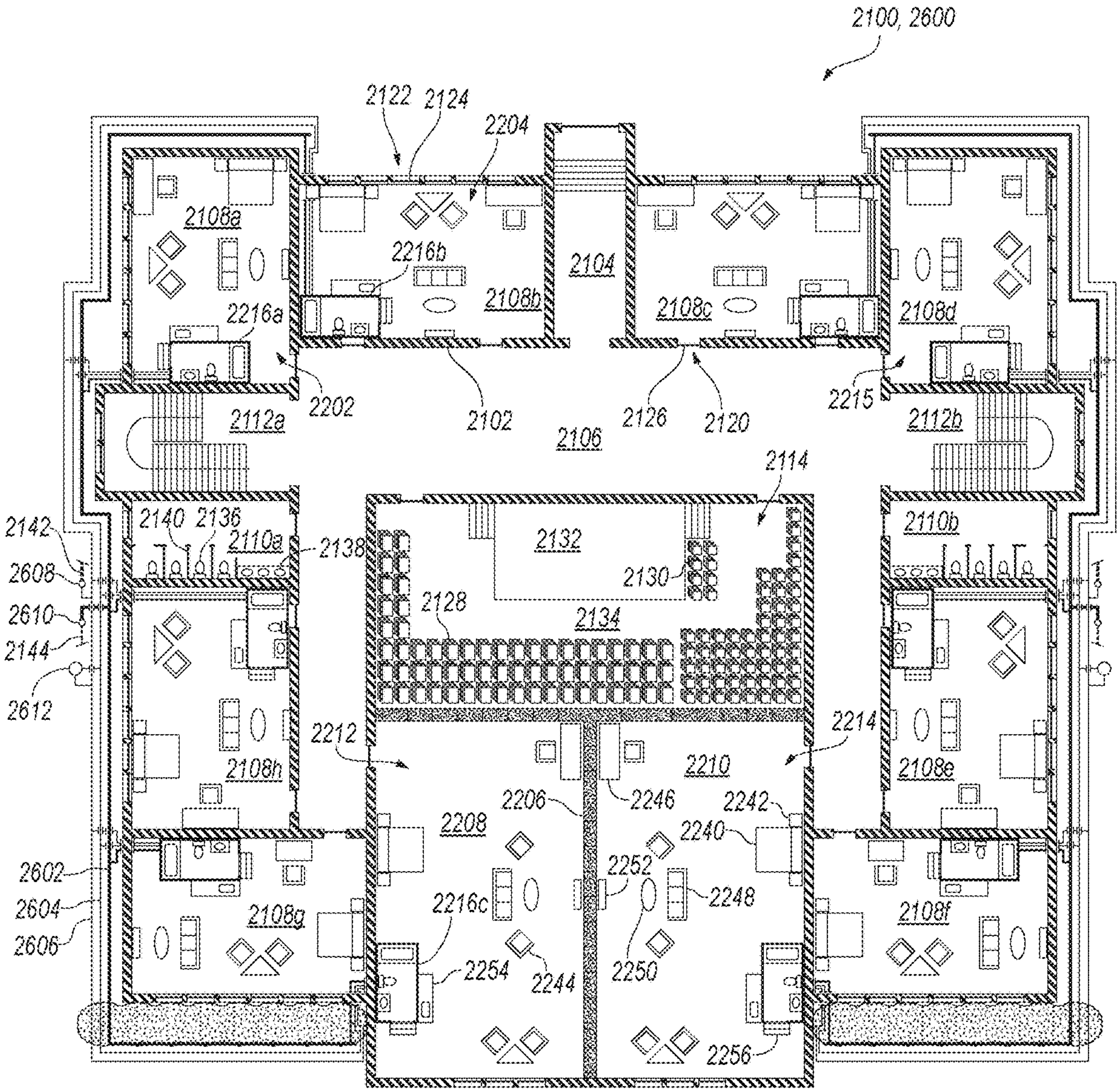
FIGS. 75 and 76 are, respectively, top plan views of collections of rentable units and associated structures in accordance with additional embodiments of the present technology at the school building shown in FIG. 51 in the second state taken along the line G-G in FIG. 51.

FIG. 75 is a top plan view of a collection of rentable units and associated structures 2600 in accordance with another embodiment of the present technology at the school building 2100 in the second state taken along the line G-G in FIG. 51. As shown in FIG. 75, the collection 2600 can include a plumbing drain line 2602, a cold water supply line 2604, and a hot water supply line 2606 disposed outside the school building 2100. For example, the plumbing drain line 2602, the cold water supply line 2604, and the hot water supply line 2606 can extend above-ground over a length of at least two meters outside the school building 2100. In the illustrated embodiment, the plumbing drain line 2602 connects the corresponding bathrooms 2216 to the plumbing drain trunk line 2142 via a corresponding exterior plumbing drain hookup 2608 rather than through the school bathroom 2110*a*. Similarly, the cold and hot water supply lines 2604, 2606 connect the corresponding bathrooms 2216 to the water supply trunk line 2144 via a corresponding exterior water supply hookup 2610 rather than through the school bathroom 2110*a*.

The exterior plumbing drain hookup 2608 and the exterior water supply hookup 2610 can be retrofitted. Furthermore, the hot water supply line 2606 can be connected to the water supply trunk line 2144 via a hot water reservoir 2612 disposed (e.g., removably disposed) outside the school building 2100 rather than within the school building 2100. Locating the plumbing drain line 2602, the cold water supply line 2604, the hot water supply line 2606, the hot water reservoir 2612, and/or other suitable components of the collection 2600 outside the school building 2100 rather than within the school building 2100 can be useful, for example, to facilitate use of the hallway 2106 (or other portions of the school building 2100 that would otherwise contain these components) by renters of the first, second, third, fourth, and additional rentable units 2202, 2204, 2212, 2214, 2215.

In another embodiment, the first, second, third, fourth, and additional rentable units 2202, 2204, 2212, 2214, 2215 are operably associated with components that reduce or eliminate the need for even temporary connections to permanent systems of the school building 2100. For example, the first, second, third, fourth, and additional rentable units 2202, 2204, 2212, 2214, 2215 can be operably associated with a high-capacity sewage detention reservoir (not shown) disposed (e.g., removably disposed) within or outside the school building 2100, a high-capacity cold water reservoir (not shown) disposed (e.g., removably disposed) within or outside the school building 2100, and/or a high-capacity generator (not shown) disposed (e.g., removably disposed) within or outside the school building 2100. The high-capacity sewage detention reservoir can be configured for occasional evacuation into a mobile tanker (e.g., a septic system pump truck). Similarly, the high-capacity cold water reservoir can be configured for occasional replenishment from a mobile tanker (e.g., a water supply truck).

Figure 76:
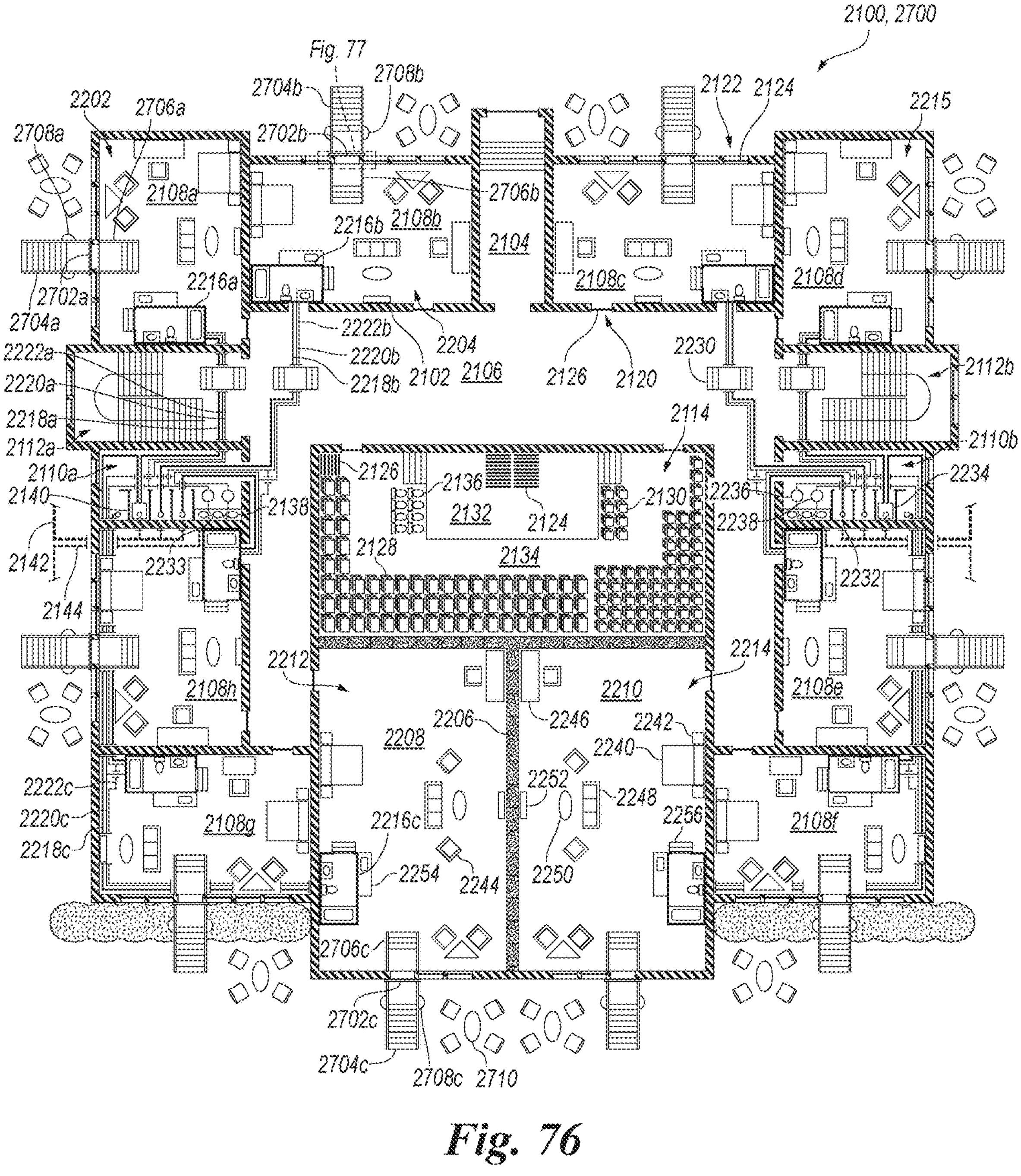

FIG. 76 is a top plan view of a collection of rentable units and associated structures 2700 in accordance with another embodiment of the present technology at the school building 2100 in the second state taken along the line G-G in FIG. 51. As shown in FIG. 76, the classrooms 2108 and the first and second compartments 2208, 2210 can be directly accessible from the exterior of the school building 2100. This can facilitate unmanned operation of the first, second, third, fourth, and additional rentable units 2202, 2204, 2212, 2214, 2215. At least some of the window openings 2122 (e.g., one window opening 2122 per classroom 2108, one window opening 2122 of the first compartment 2208, and one window opening 2122 of the second compartment 2210) can be retrofitted (e.g., at least substantially reversibly retrofitted) to provide direct access to the corresponding ones of the classrooms 2108, the first compartment 2208, and the second compartment 2210 from the exterior of the school building 2100. Retrofitting the window openings 2122 can include removing the sashes 2124 from the window openings 2122. In many types of windows (e.g., double-hung windows) commonly found in school buildings, the sashes 2124 are readily removable and replaceable. After removal, the sashes 2124 can be temporarily stored within the oversized room 2114 near the stage 2132 until needed for reinstallation into the corresponding window openings 2122. Thus, removal of the sashes 2124 and other suitable retrofits to the window openings 2122 can be readily reversible. Alternatively, some of all of these retrofits can be permanent.

Additional features of the illustrated embodiment will now be described at least primarily with regard to the first, second, and third rentable units 2202, 2204, 2212. It should be understood that the same or similar features can be present in the fourth rentable unit 2214 and the additional rentable units 2215 unless the context clearly indicates otherwise. As shown in FIG. 76, the collection 2700 can include doorways 2702 (individually identified as doorways 2702*a*-2702*c*) disposed (e.g., removably disposed) in operable association with respective window openings 2122 of the classrooms 2108*a*, 2108*b* and the first compartment 2208, respectively. In the illustrated embodiment, the doorways 2702 are reusable doorway overlays. This form can be useful to reduce or eliminate the need for custom sizing of the doorways 2702. In other embodiments, the doorways 2702 can be reusable doorway inserts, or have other suitable forms. With reference again to the illustrated embodiment, the collection 2700 further includes exterior stairways 2704 (individually identified as exterior stairways 2704*a*-2704*c*) disposed (e.g., removably disposed) in operable association with respective window openings 2122 of the classrooms 2108*a*, 2108*b* and the first compartment 2208, respectively. Similarly, in the illustrated embodiment, the collection 2700 includes interior stairways 2706 (individually identified as interior stairways 2706*a*-2706*c*) disposed (e.g., removably disposed) in operable association with respective window openings 2122 of the classrooms 2108*a*, 2108*b* and the first compartment 2208, respectively. In other embodiments, some or all of the exterior and interior stairways 2704, 2706 can be replaced with corresponding exterior and interior ramps.

Similar to the bathrooms 2216, the exterior and interior stairways 2704, 2706 can be reusable. In the illustrated embodiment, the exterior and interior stairways 2704, 2706 are assemblies of reusable exterior and interior stairway modules configured for rapid deployment into and out of operable association with the corresponding window openings 2122 in an at least partially disassembled state. For example, the exterior and interior stairways 2704, 2706 can be made up mostly or entirely of reusable modular components. In other embodiments, the exterior and interior stairways 2704, 2706 can be portable exterior and interior stairway units, such as exterior and interior stairway units configured for rapid deployment into and out of operable association with the corresponding window openings 2122 without significant disassembly. This deployment and removal can occur by forklift, by dolly, by operation of wheels integrated into the exterior and interior stairways 2704, 2706, or in another suitable manner. In still other embodiments, the exterior and interior stairways 2704, 2706 can have other suitable forms. Furthermore, the collection 2700 can include footings 2708 (individually identified as footings 2708*a*-2708*c*) removably or permanently disposed outside respective window openings 2122 of the classrooms 2108*a*, 2108*b* and the first compartment 2208, respectively. The individual exterior stairways 2704*a-c* can be removably connected to the individual footings 2708*a-c*, respectively. The footings 2708 can be permanent concrete piers or pads or have other suitable forms.

When the classrooms 2108*a*, 2108*b* and the first compartment 2208 are directly accessible from the exterior of the school building 2100, the first, second, and third rentable units 2202, 2204, 2212 can be accessible only in this manner or both in this manner and via the hallway 2106. In the former case, which is not illustrated in FIG. 76, the bathrooms 2216*a*, 2216*c* can be shifted to block the doorway openings 2120 of the classroom 2108*a* and the first compartment 2208, respectively. In addition or alternatively, the plumbing drain lines 2218*a*, 2218*c*, the cold water supply lines 2220*a*, 2220*c*, and the hot water supply lines 2222*a*, 2222*c* can be routed through the doorway openings 2120 of the classroom 2108*a* and the first compartment 2208, respectively, rather than through openings in the permanent walls 2102. Direct access to the classrooms 2108*a*, 2108*b* and the first compartment 2208 from the exterior of the school building 2100 can facilitate use of outdoor areas nearby the classrooms 2108*a*, 2108*b* and the first compartment 2208 by renters of the first, second, and third rentable units 2202, 2204, 2212. Accordingly, the collection 2700 can include outdoor furniture 2710 removably disposed in these outdoor areas to support such use.

Figure 77:
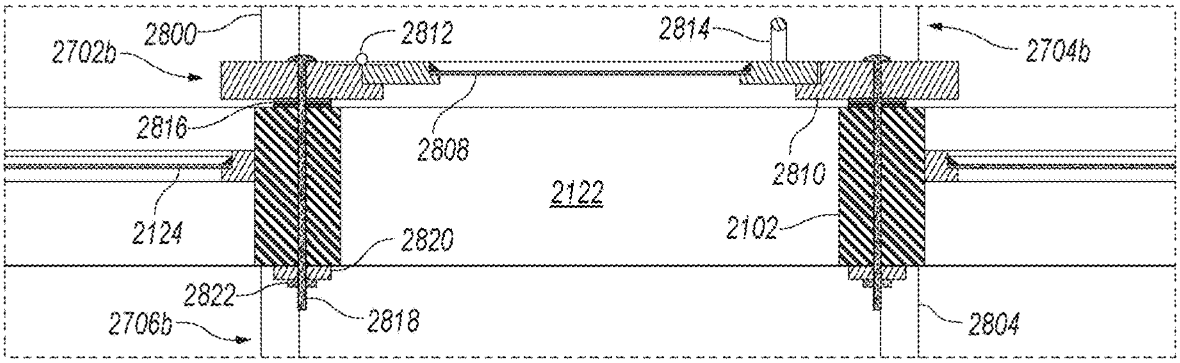
FIG. 77 is an enlarged view of a portion of FIG. 76.
Figure 78:
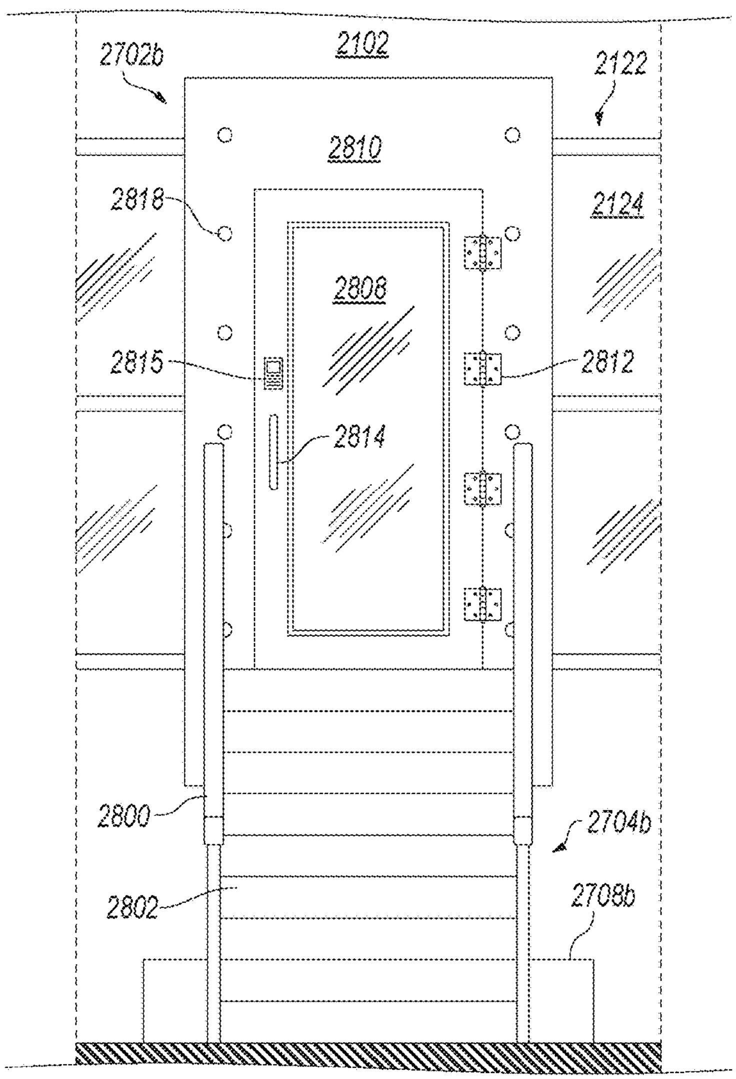
FIGS. 78 and 79 are, respectively, an exterior side profile view and an opposite interior side profile view approximately corresponding to the portion of FIG. 76 shown in FIG. 77.
Figure 79:
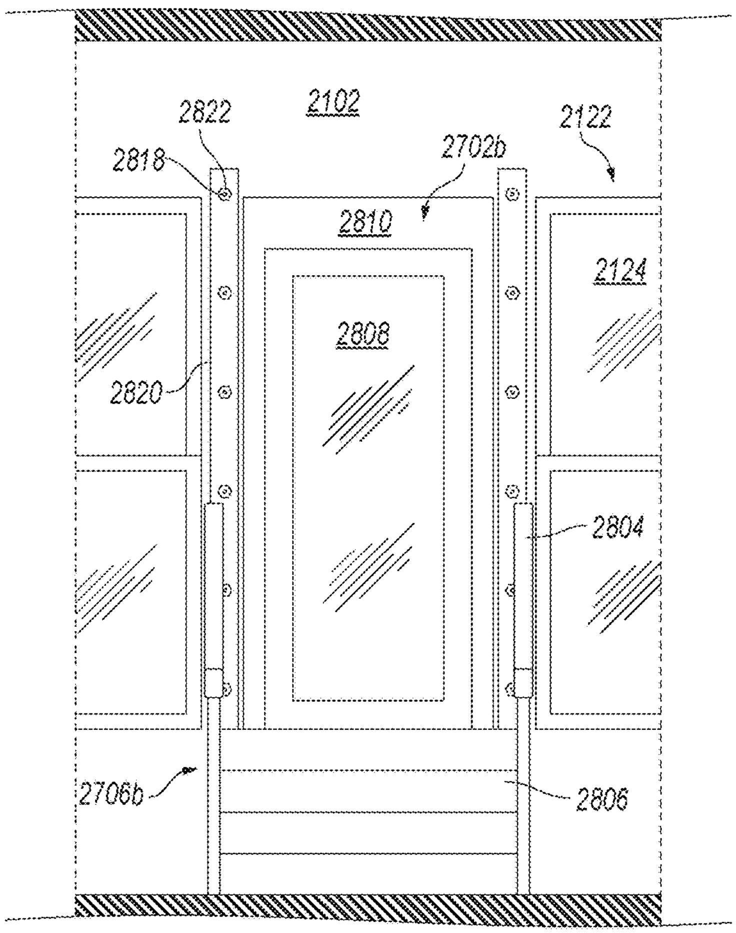

FIG. 77 is an enlarged view of a portion of FIG. 76. FIGS. 78 and 79 are, respectively, an interior side profile view and an opposite exterior side profile view approximately corresponding to the portion of FIG. 76 shown in FIG. 77. The doorway 2702*b*, the exterior stairway 2704*b*, the interior stairway 2706*b*, and associated portions of the collection 2700 and the school building 2100 will now be described with the understanding that the doorways 2702*a*, 2702*c*, the exterior stairways 2704*a*, 2704*c*, the interior stairways 2706*a*, 2706*c*, and associated portions of the collection 2700 and the school building 2100 can have the same or similar features. With reference to FIGS. 76-79 together, the exterior stairway 2704*b* can include exterior railings 2800 and exterior steps 2802 disposed between the exterior railings 2800. Similarly, the interior stairway 2706*b* can include interior railings 2804 and interior steps 2806 disposed between the interior railings 2804. The doorway 2702*b* can include a door 2808, a frame 2810, and hinges 2812 operably connecting the door 2808 and the frame 2810 to one another. The doorway 2702*b* can further include a handle 2814 that facilitates operation of the door 2808 from the exterior of the school building 2100.

The doorway 2702*b* can still further include a smart lock 2815 configured to allow a renter of the second rentable unit 2204 to unlock the door 2808 by operation of a mobile device (e.g. a mobile phone), by entering a passcode, by providing a biometric identification (e.g., a fingerprint), or in another suitable manner. For example, the smart lock 2815 may request a first identifier from the renter upon initial check-in. The first identifier can be a last name or some other identifier that is readily available to the renter, but may not be particularly secure. Correct entry of the first identifier can cause the smart lock 2815 to signal (e.g., wirelessly signal)

an associated server (not shown) to send a text message, email, etc. to the renter's mobile device. The number associated with the mobile device can be a number provided by the renter to an operator of the second rentable unit 2204 in conjunction with reservation of the second rentable unit 2204 or in conjunction with establishing or maintaining membership in a group of renters authorized to rent the second rentable unit 2204 without making a reservation. The text message, email, etc. can contain a newly generated passcode that can be entered into the smart lock 2815, alone or in addition to other identifiers, for subsequent access to the second rentable unit 2204 by the renter. To grant access to another person, the renter merely forwards the text message, email, etc. containing the passcode to that person. When the renter's permission to use the second rentable unit 2204 has expired, the smart lock 2815 can discontinue granting access to the second rentable unit 2204 in response to entry of the passcode. This manner of controlling access to the second rentable unit 2204 can be significantly more secure, antonymous, and efficient than conventional forms of access control, such as those that rely on physical keycards.

The frame 2810 can be removably connected to portions of the permanent wall 2102 on either side of the corresponding window opening 2122. Between the frame 2810 and the permanent wall 2102, the doorway 2702*b* can include a gasket 2816 that enhances the weather resistance of the connection between the frame 2810 and the permanent wall 2102. In the illustrated embodiment, the frame 2810 is removably bolted to the permanent wall 2102. For example, the doorway 2702*b* can include bolts 2818 that extend through the frame 2810, through the gasket 2816, and through the permanent wall 2102. At an inside surface of the permanent wall 2102, the doorway 2702*b* can include furring strips 2820 through which the bolts 2818 also extend, and nuts 2822 operably connected to the bolts 2818 and bearing on the furring strips 2820. In other embodiments, the doorway 2702*b* can be connected to the permanent wall 2102 in another suitable manner, such as using removable clamps. Furthermore, rather than being removably connected to the corresponding window opening 2122 at an exterior side of the permanent wall 2102, in other embodiments, the doorway 2702*b* can be removably connected to the corresponding window opening 2122 at an interior side of the permanent wall 2102.

Figure 80:
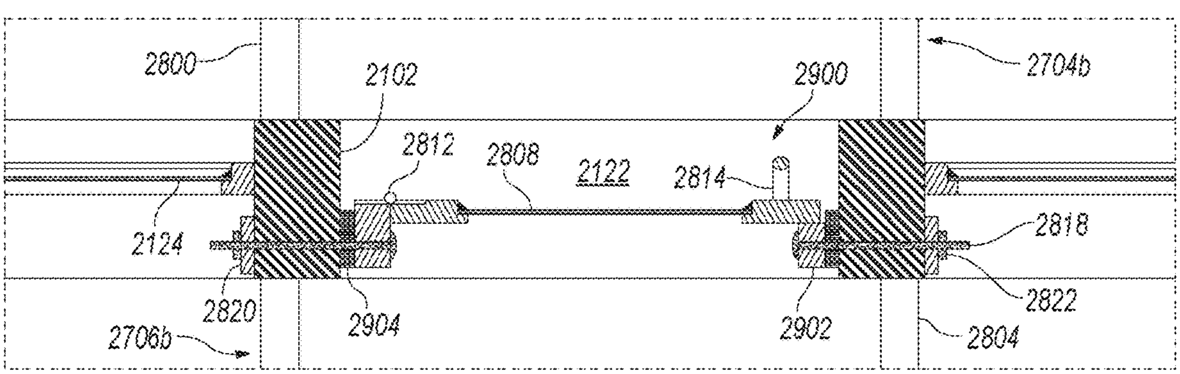
FIG. 80 is a top plan view of a doorway of a collection of rentable units and associated structures in accordance with another embodiment of the present technology at the school building shown in FIG. 51 in the second state taken along the line G-G in FIG. 51 and corresponding to the portion shown in FIG. 77.

FIG. 80 is a top plan view of a doorway 2900 of a collection of rentable units and associated structures in accordance with another embodiment of the present technology at the school building 2100 in the second state taken along the line G-G in FIG. 51 and corresponding to the portion shown in FIG. 76. In contrast to the doorway 2702*b* shown in FIGS. 76-79, the doorway 2900 is an inset rather than an overlay. For example, the doorway 2900 can be disposed within the corresponding window opening 2122 rather than at an exterior or interior side of the corresponding window opening 2122. As shown in FIG. 80, the doorway 2900 can include a frame 2902 that is narrower than the corresponding window opening 2122. The doorway 2900 can further include gaskets 2904 disposed between the frame 2902 and sidewalls of the corresponding window opening 2122. The bolts 2818 of the doorway 2900 can extend laterally through respective portions of the permanent wall 2102 on opposite sides of the corresponding window opening 2122 in which the doorway 2900 is installed. For example, the bolts 2818 can extend into respective neighboring window openings 2122 in which the corresponding furring strips 2820 and nuts 2822 are located. The gaskets

2904 can be layered to compensate for a difference between a width of the frame 2902 and a width of the corresponding window opening 2122, such as when the doorway 2900 is a standard size and the corresponding window opening 2122 is a non-standard size. Although not adaptable to as wide a range of window opening widths as the doorway 2702*b* described above, the doorway 2900 may be preferred over the doorway 2702*b* in some cases for aesthetic or other reasons.

Figure 81:
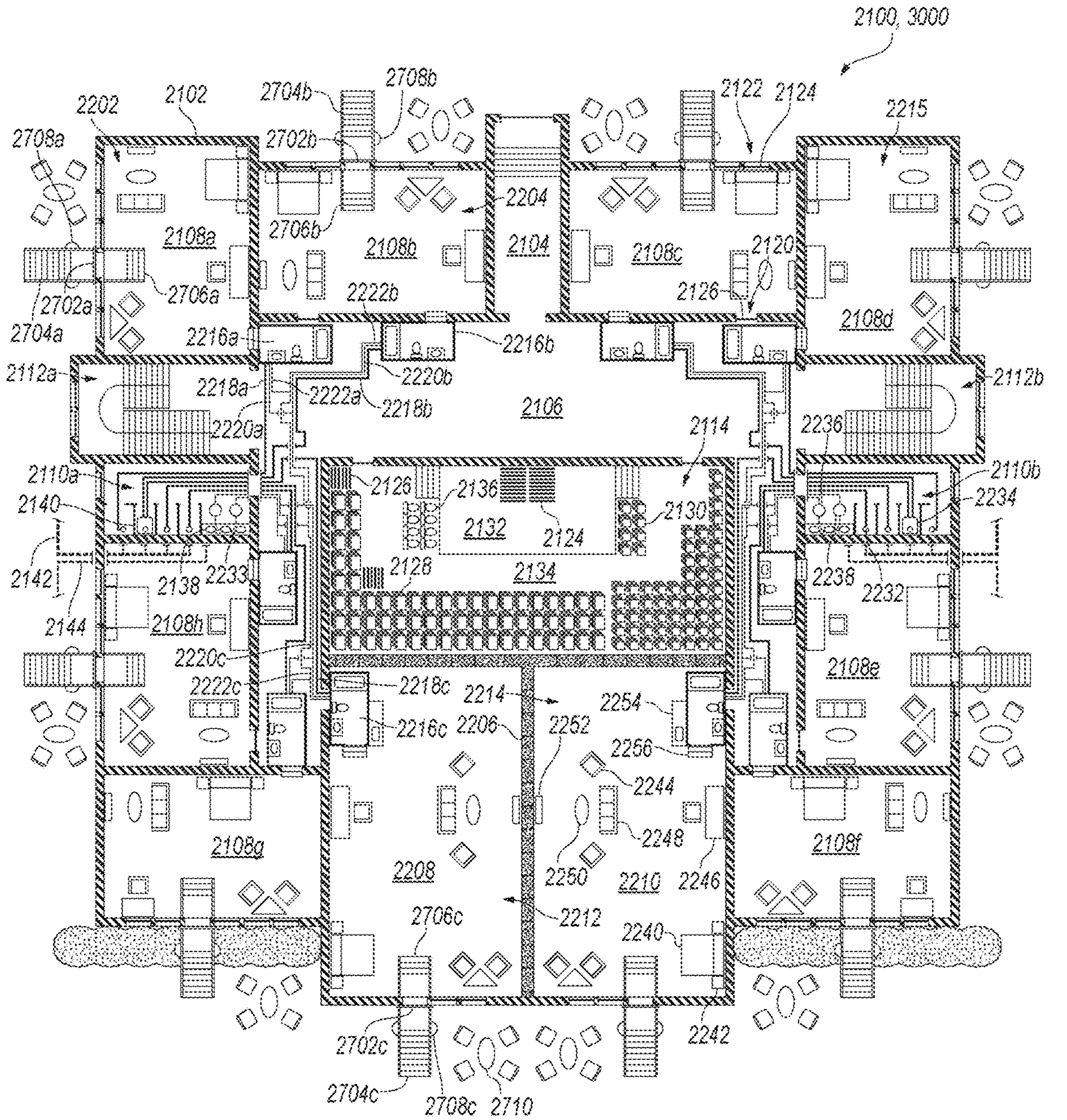
FIGS. 81-85 are, respectively, top plan views of collections of rentable units and associated structures in accordance with additional embodiments of the present technology at the school building shown in FIG. 51 in the second state taken along the line G-G in FIG. 51.

FIG. 81 is a top plan view of a collection of rentable units and associated structures 3000 in accordance with another embodiment of the present technology at the school building 2100 in the second state taken along the line G-G in FIG. 51. As shown in FIG. 81, the bathrooms 2216*a*, 2216*b* can be accessible from the classrooms 2108*a*, 2108*b* via the respective doorway openings 2120 of the classrooms 2108*a*, 2108*b*. For example, the bathrooms 2216*a*, 2216*b* can be disposed (e.g., removably disposed) within the hallway 2106 adjacent to the respective doorway openings 2120 of the classrooms 2108*a*, 2108*b*. Furthermore, the respective doorway opening 2320 of the bathrooms 2216*a*, 2216*b* can be aligned with the respective doorway openings 2120 of the classrooms 2108*a*, 2108*b*. In at least some embodiments, the bathrooms 2216*a*, 2216*b* block access to the classrooms 2108*a*, 2108*b* from the main entrance 2104 via the hallway 2106. Similar to the embodiment illustrated in FIG. 76, the plumbing drain lines 2218*a*, 2218*b*, the cold water supply lines 2220*a*, 2220*b*, and the hot water supply lines 2222*a*, 2222*b* can be routed through the hallway 2106 with no need or at least little need for retrofitted openings in the permanent walls 2102. In the illustrated embodiment, the bathroom 2216*c* is removably disposed within the first compartment 2208. In other embodiments, the bathroom 2216*c* can be removably disposed within the hallway 2106 (e.g., adjacent to the oversized room 2114) and/or have some or all of the other features described for the bathrooms 2216*a*, 2216*b* in the context of the collection 3000.

Figure 82:
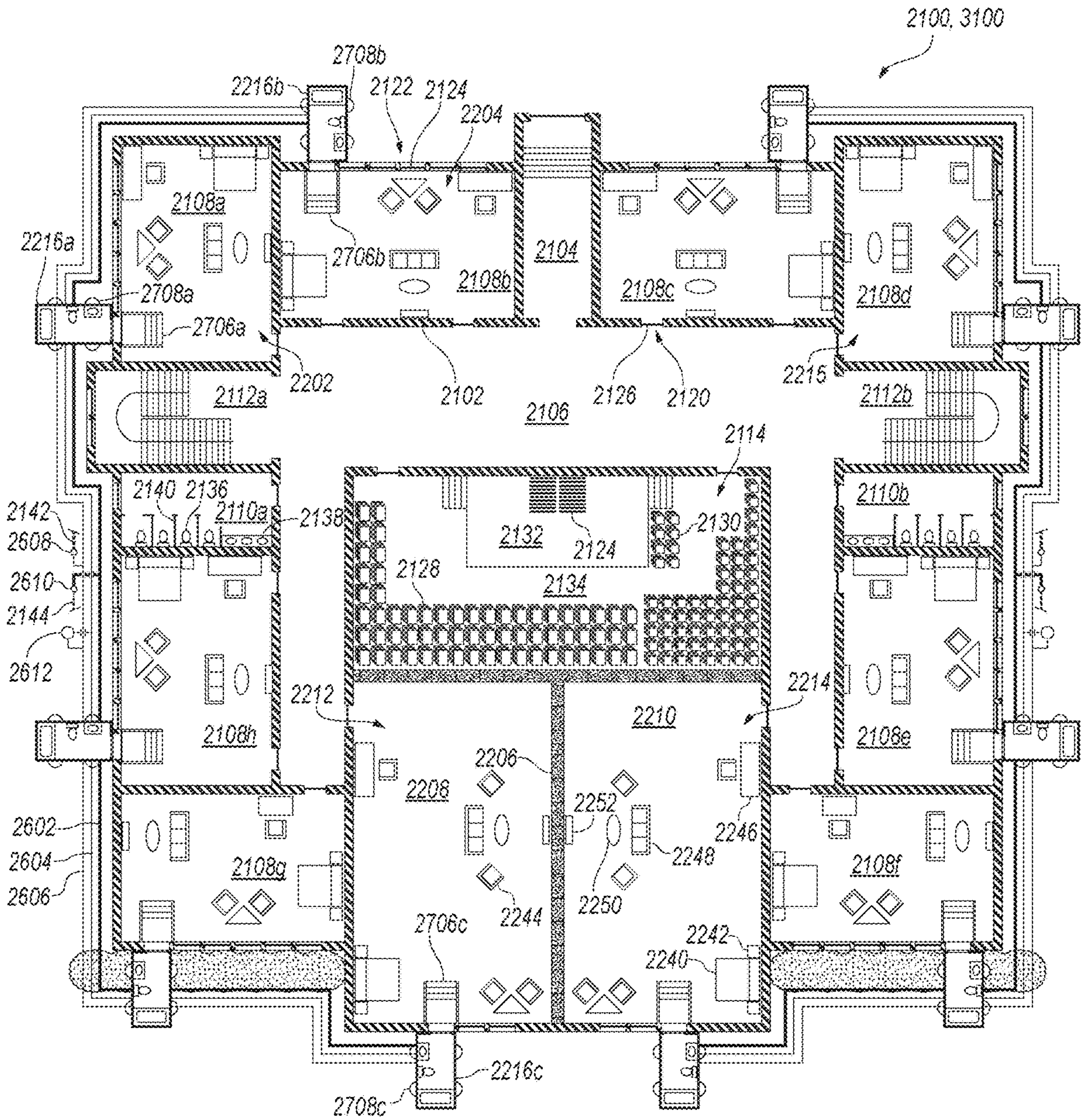

FIG. 82 is a top plan view of a collection of rentable units and associated structures 3100 in accordance with another embodiment of the present technology at the school building 2100 in the second state taken along the line G-G in FIG. 51. As shown in FIG. 82, the bathrooms 2216*a*-2216*c* can be disposed (e.g., removably disposed) outside the classrooms 2108*a*, 2108*b* and the oversized room 2114, respectively. For example, the bathrooms 2216*a*-2216*c* can be removably disposed outside and adjacent to respective window openings 2122 of the classrooms 2108*a*, 2108*b* and the oversized room 2114, respectively. The bathrooms 2216*a*-2216*c* can be accessible from the classrooms 2108*a*, 2108*b* and the oversized room 2114, respectively, via the corresponding window openings 2122 of the classrooms 2108*a*, 2108*b* and the oversized room 2114. Furthermore, the respective doorway openings 2320 of the bathrooms 2216*a*-2216*c* can be aligned with the corresponding window openings 2122 of the classrooms 2108*a*, 2108*b* and the oversized room 2114. In at least some embodiments, the bathrooms 2216*a*-2216*c* are removably connected to the footings 2708*a*-2708*c*, respectively, which can have the same or similar features in the context of the illustrated embodiment as described above in the context of the embodiment illustrated in FIG. 76. The plumbing drain line 2602, the cold water supply line 2604, and the hot water supply line 2606 can extend under the bathrooms 2216*a*-2216*c*.

In the embodiments illustrated in FIGS. 53, 75, 76, 81 and 82, the first, second, and third rentable units 2202, 2204, 2212 are configured at least primarily as lodging units. In other embodiments, the first, second, and third rentable units

Figure 83:
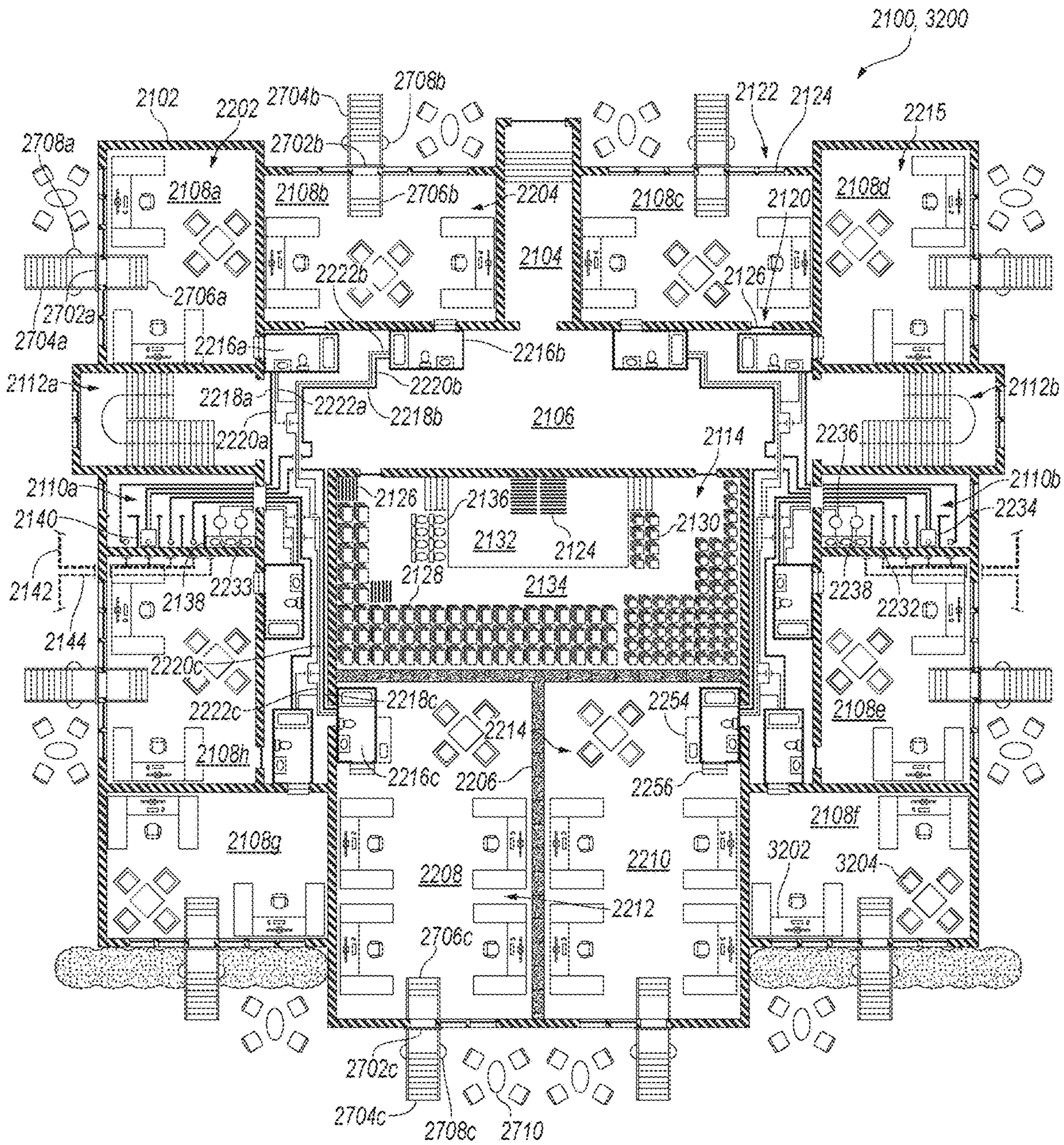
Figure 84:
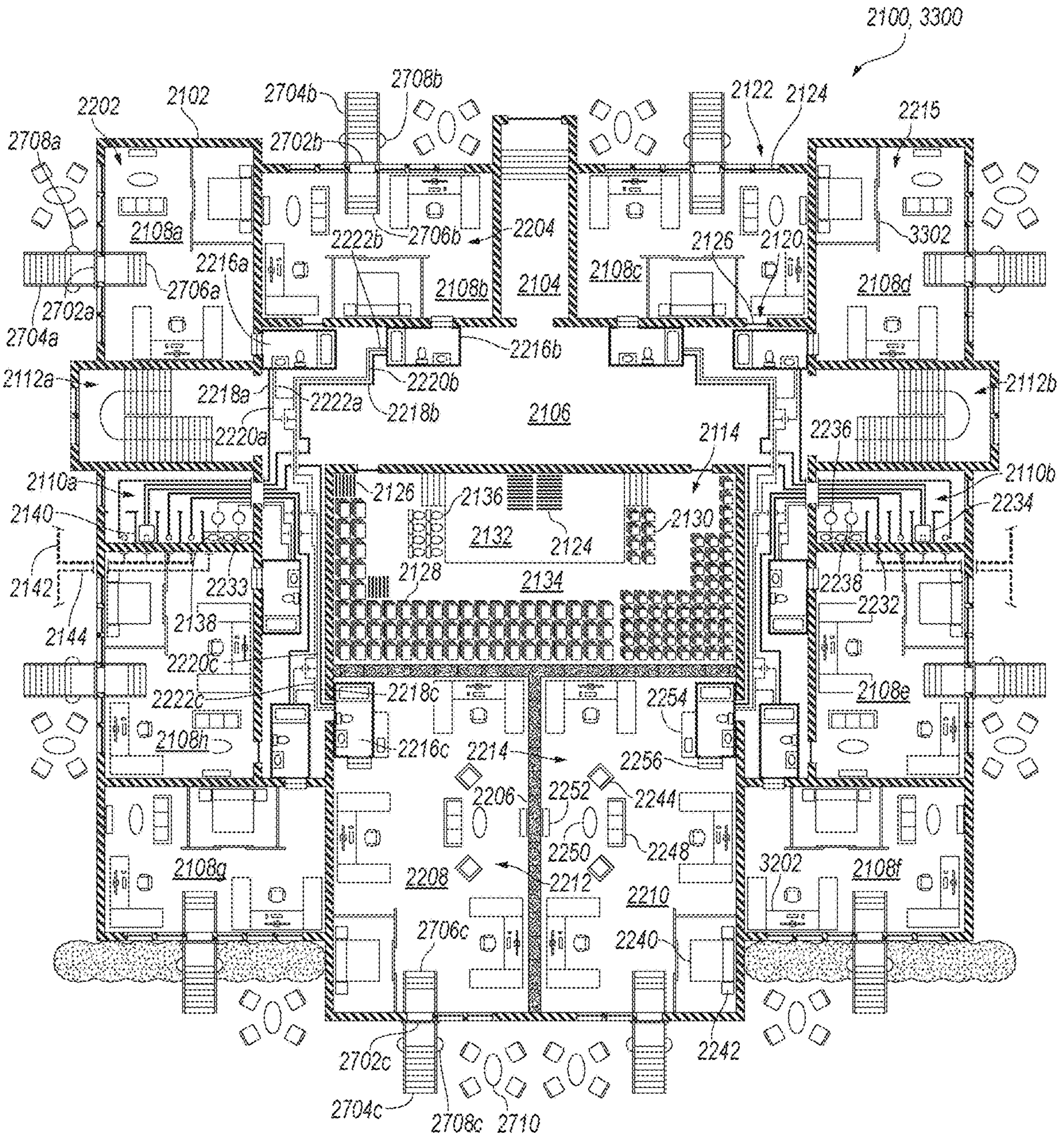
Figure 85:
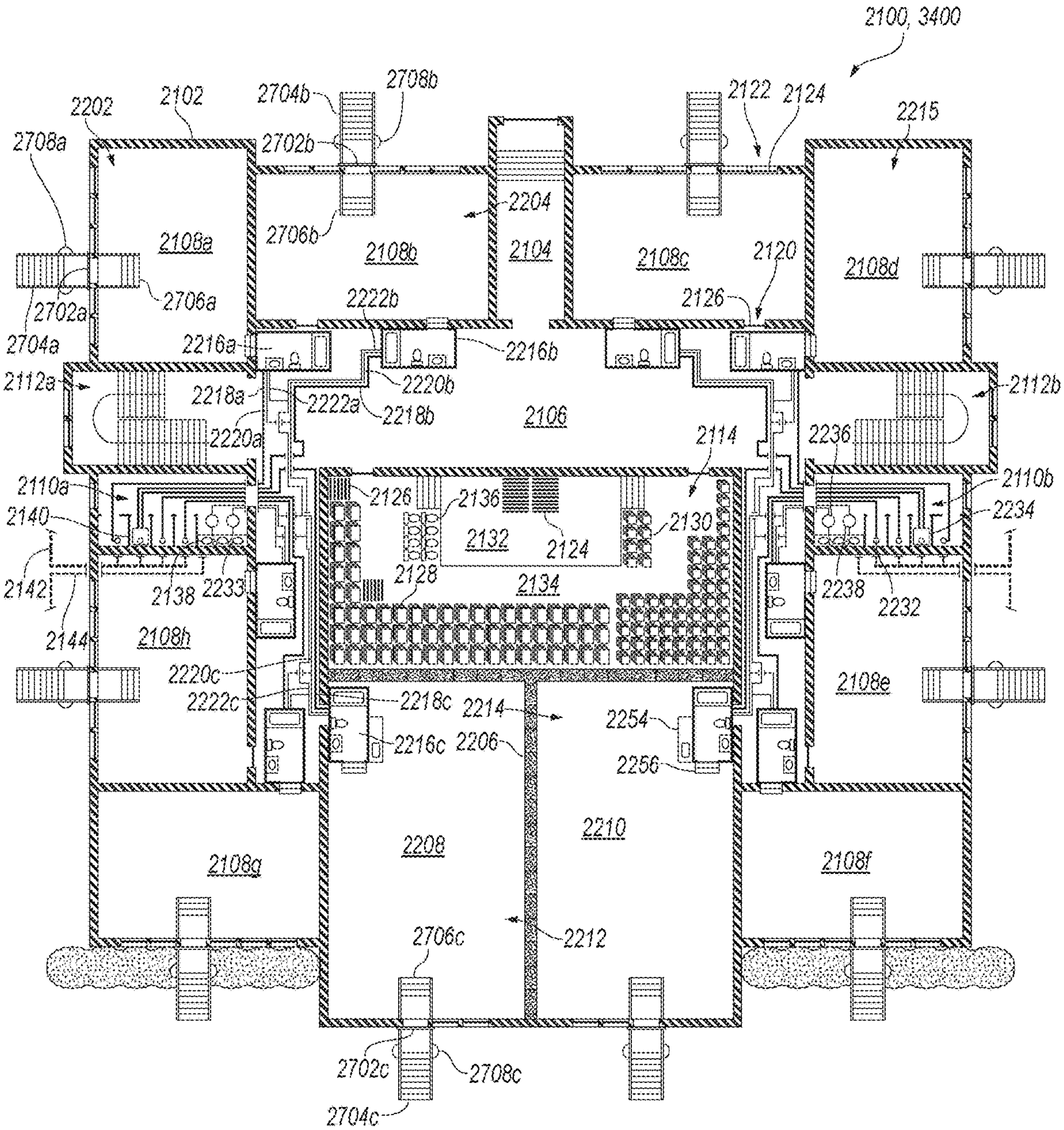

2202, 2204, 2212 can have other suitable primary uses. For example, the first, second, and third rentable units 2202, 2204, 2212 can be rentable residential units for which the furnishings and fixtures illustrated in FIGS. 53, 75, 76, 81 and 82 may be well suited. In addition or alternatively, the first, second, and third rentable units 2202, 2204, 2212 can be rentable office units, rentable assembly units, and/or rentable units of another suitable type. For example, FIGS. 83-85 are top plan view of respective collections of rentable units and associated structures 3200, 3300, 3400 in accordance with additional embodiments of the present technology at the school building 2100 in the second state taken along the line G-G in FIG. 51. In the embodiment illustrated in FIG. 83, the first, second, and third rentable units 2202, 2204, 2212 are respective rentable office units. For example, the collection 3200 can include workstations 3202 and meeting stations 3204 removably disposed within the classrooms 2108*a*, 2108*b* and the first compartment 2208. In the embodiment illustrated in FIG. 84, the first, second, and third rentable units 2202, 2204, 2212 are respective combined lodging and rentable office units. For example, the collection 3300 can include partitions 3302 that close off the beds 2240 during work hours. In the embodiment illustrated in FIG. 85, the first, second, and third rentable units 2202, 2204, 2212 are respective assembly units. Numerous other suitable uses and configurations of the first, second, and third rentable units 2202, 2204, 2212 in accordance with embodiments of the present technology are also possible.

Figure 86:
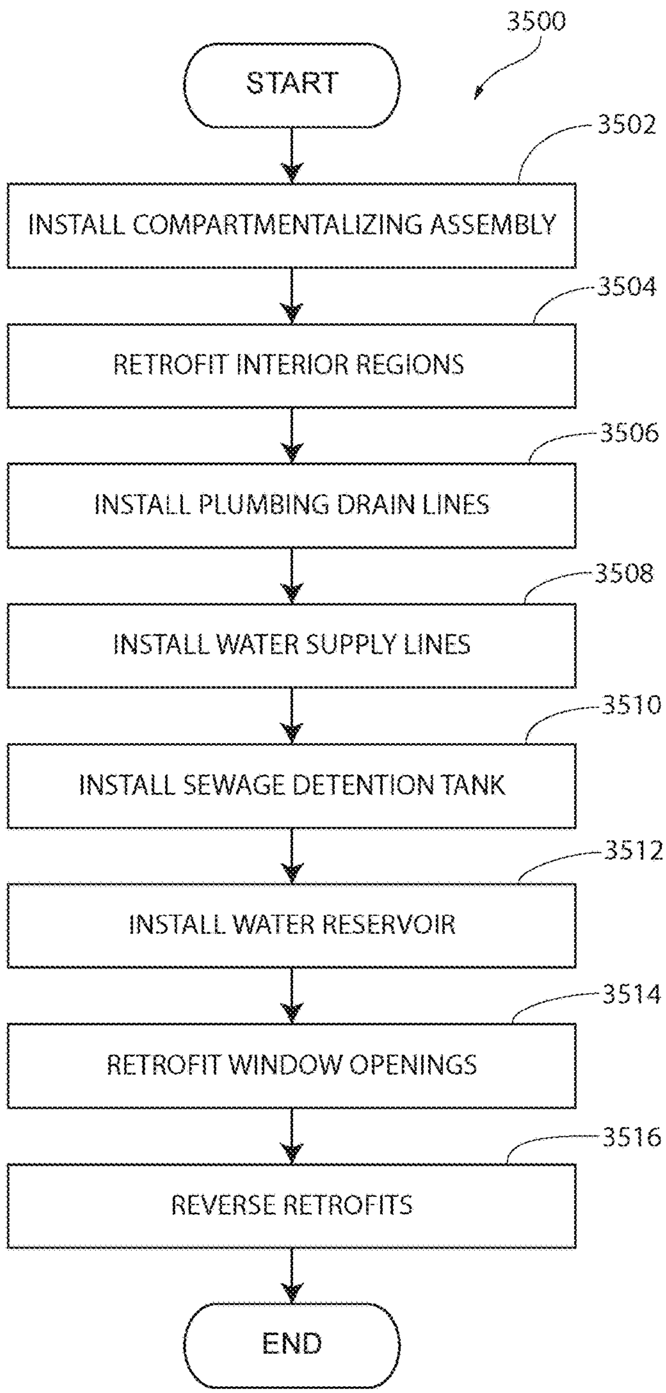
FIG. 86 is a block diagram illustrating a method for making a collection of rentable units and associated structures in accordance with an embodiment of the present technology.

FIG. 86 is a block diagram illustrating a method 3500 for making a given collection of rentable units and associated structures in accordance with an embodiment of the present technology. It should be understood that the method 3500, when suitable, and/or portions of the method 3500, when suitable, can be practiced with respect to any of the collections 2200, 2550, 2600, 2700, 3000, 3100, 3200, 3300, 3400 described above with reference to FIGS. 53-85 as well as with respect to other collections in accordance with embodiments of the present technology. With reference to FIGS. 53-86 together, the method 3500 can include removably disposing the compartmentalizing assembly 2206 within the oversized room 2114 (block 3502). Removably disposing the compartmentalizing assembly 2206 can include removably disposing the wall components 2508 within the oversized room 2114, such as over the finished floor surface 2510 of the oversized room 2114. Removably disposing the wall components 2508 can including stacking and/or interlocking the wall components 2508. Furthermore, removably disposing the compartmentalizing assembly 2206 can include disposing (e.g., removably disposing) the liner 2516 over the finished floor surface 2510. For example, removably disposing the compartmentalizing assembly 2206 can include adhesively connecting the liner 2516 to the finished floor surface 2510. In addition or alternatively, removably disposing the compartmentalizing assembly 2206 can include forming the mass of self-leveling material 2518 within the oversized room 2114, such as integrally along most or all of an overall footprint of the compartmentalizing assembly 2206.

In a particular example, forming the mass of self-leveling material 2518 includes disposing a low-viscosity material into a form. The form can be made in situ, such as by disposing a bead of polyurethane foam around an intended perimeter of a footprint of the compartmentalizing assembly 2206, or in another suitable manner. After being disposed within the form, the mass of self-leveling material 2518 can be allowed to self-level by gravity with or without vibration or other processes to expedite the self-leveling process. The mass of self-leveling material 2518 can then be at least partially solidified. Forming the mass of self-leveling material 2518 can occur over the liner 2516. After the mass of self-leveling material 2518 has at least partially solidified, the wall components 2508 can be removably disposed over the mass of self-leveling material 2518. Removably disposing the compartmentalizing assembly 2206 can also include removably disposing the ceiling panels 2554, the ceiling beams 2556, and/or other suitable ceiling components within the oversized room 2114, such as above the first and second compartments 2208, 2210. In this or another suitable manner, removably disposing the compartmentalizing assembly 2206 can include removably disposing a thermally conductive ceiling above the first and second compartments 2208, 2210 and below the airspace 2558.

The method 3500 can further include retrofitting interior regions of the school building 2100 for use as at least respective portions of the first, second, third, fourth, and additional rentable units 2202, 2204, 2212, 2214, 2215 (block 3504). Retrofitting a given one of these interior regions will now be described with the understanding that the described features can also apply, when suitable, to retrofitting some or all of the other interior regions. Retrofitting the given interior region can include retrofitting the given interior region for lodging use, residential use, office use, assembly use, and/or for one or more other suitable uses. In at least some cases, retrofitting the given interior region includes installing (e.g., permanently or removably disposing) a given one of the bathrooms 2216 in operable association with the given interior region, such as within or adjacent to a given one of the classrooms 2108, within or adjacent to the oversized room 2114, within or adjacent to the hallway 2106, or outside the school building 2100. Furthermore, installing the given bathroom 2216 can include at least substantially reversibly assembling a set of reusable bathroom modules to form a first assembly of reusable bathroom modules. For example, the floor module 2300 can be disposed (e.g., removably disposed) at a suitable location within or outside the school building 2100 and the wall modules 2304 can be removably connected to the floor module 2300 at a perimeter of the floor module 2300.

The method 3500 can still further include installing (e.g., removably or permanently disposing) the plumbing drain lines 2218 (block 3506) within and/or outside the school building 2100 and installing (e.g., removably or permanently disposing) the cold and hot water supply lines 2220, 2222 within and/or outside the school building 2100 (block 3508). For example, the method 3500 can include operably connecting the given bathroom 2216 to the plumbing drain trunk line 2142 via a given one of the plumbing drain lines 2218. This can include operably connecting the given plumbing drain line 2218 to the plumbing drain trunk line 2142 via one or more of the toilet hookups 2232. Similarly, the method 3500 can include operably connecting the given bathroom 2216 to the water supply trunk line 2144 via given ones of the cold and hot water supply lines 2220, 2222. This can include operably connecting the given cold and hot water supply lines 2220, 2222 to the water supply trunk line 2144 via one or more of the sink hookups 2233. The method 3500 can also include installing (e.g., removably or permanently disposing) the sewage detention tank 2234 (block 3510) within or outside the school building 2100 and installing (e.g., removably or permanently disposing) the cold and hot water reservoirs 2236, 2238 within or outside the school building 2100 (block 3512). Furthermore, operably connecting the given bathroom 2216 to the plumbing drain trunk line 2142 can include operably connecting the given bathroom 2216 to the plumbing drain trunk line 2142 via the sewage detention tank 2234, which can include operably connecting the sewage detention tank 2234 to the plumbing drain trunk line 2142 via one or more of the toilet hookups 2232. Similarly, operably connecting the given bathroom 2216 to the water supply trunk line 2144 can include operably connecting the given cold and hot water supply lines 2220, 2222 to the water supply trunk line 2144 via the cold and hot water reservoirs 2236, 2238, respectively, which can include operably connecting the cold and hot water reservoirs 2236, 2238 to the water supply trunk line 2144 via one or more of the sink hookups 2233.

The method 3500 can also include retrofitting (e.g., at least substantially reversibly retrofitting) a given one of the window openings 2122 (block 3514), such as to provide direct access to the corresponding one of the classrooms 2108 or to a corresponding one of the first and second compartments 2208, 2210. This can include removing (e.g., temporarily removing) a corresponding one of the sashes 2124 from the given window opening 2122. Furthermore, retrofitting the given window opening 2122 can include installing (e.g., removably disposing) a given one of the doorways 2702, a given one of the exterior stairways 2704, and/or a given one of the interior stairways 2706 in operable association with the given window opening 2122. For example, installing the given doorway 2702 can include removably inserting and/or overlaying the given doorway 2702 into and/or onto the given window opening 2122, respectively. Installing the given exterior stairway 2704 can include at least substantially reversibly assembling a set of reusable exterior stairway modules to form an assembly of reusable exterior stairway modules. Similarly, installing the given interior stairway 2706 can include at least substantially reversibly assembling a set of reusable interior stairway modules to form an assembly of reusable interior stairway modules. Installing the given exterior stairway 2704 can further include permanently disposing a given one of the footings 2708 outside the corresponding window opening 2122 and removably connecting the given exterior stairway 2704 to the given footing 2708.

In at least some cases, retrofitting the interior regions is at least substantially reversible, and the method 3500 includes reversing some or all of the retrofits (block 3516). For example, the method 3500 can include at least partially reversing the retrofitting of the interior regions between 5 and 15 weeks after retrofitting the interior regions. Reversing the retrofitting can include removing the bathrooms 2216 and furnishings from operable association with the corresponding interior regions. Reversing the retrofitting can further include removing the doorways 2702, the exterior stairways 2704, and the interior stairways 2706 from operable association with the corresponding window openings 2122. Reversing the retrofitting can still further include replacing the sashes 2124 within the corresponding window openings 2122, replacing the doors 2126 within the corresponding doorway openings 2120, replacing the toilets 2136 within the school bathrooms 2110, and replacing the school desks 2128 and the school chairs 2130 within the classrooms 2108. Retrofitting the interior regions and at least partially reversing the retrofitting of the interior regions can occur between successive academic sessions of the school at the school building 2100. For example, the method 3500 can include repeatedly retrofitting the interior regions for annually reoccurring temporary use as at least the portions of corresponding rentable units during annually reoccurring recesses (e.g., summer recesses) of the school at the school building 2100.

Figure 87:
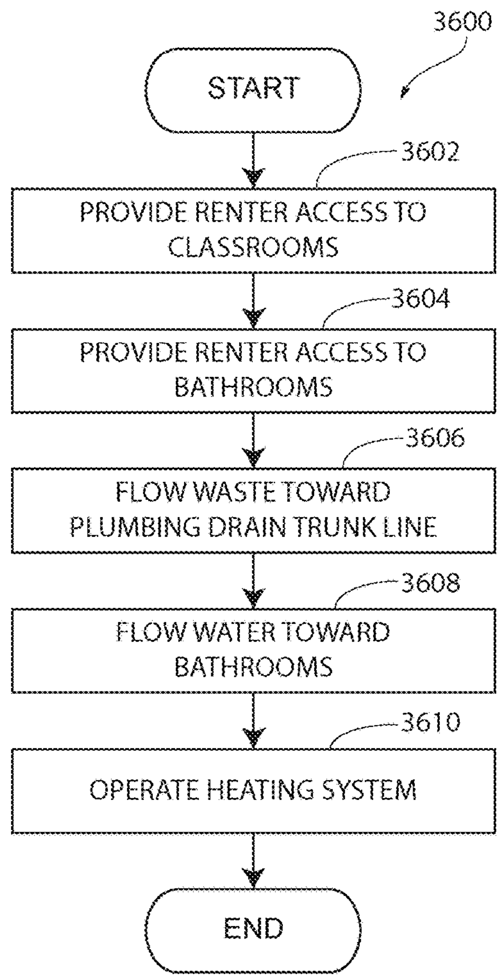
FIG. 87 is a block diagram illustrating a method for operating a collection of rentable units and associated structures in accordance with an embodiment of the present technology.

FIG. 87 is a block diagram illustrating a method 3600 for operating a given collection of rentable units and associated structures in accordance with an embodiment of the present technology. It should be understood that the method 3600, when suitable, and/or portions of the method 3600, when suitable, can be practiced with respect to any of the collections 2200, 2550, 2600, 2700, 3000, 3100, 3200, 3300, 3400 described above with reference to FIGS. 53-85 as well as with respect to other collections in accordance with embodiments of the present technology. With reference to FIGS. 53-87 together, the method 3600 can include operating the first, second, third, fourth, and additional rentable units 2202, 2204, 2212, 2214, 2215. Operating the rentable units can include providing lodging, rentable residential space, rentable office space, rentable assembly space, and/or other suitable types of rentable space at the first, second, third, fourth, and additional rentable units 2202, 2204, 2212, 2214, 2215. The first, second, third, fourth, and additional rentable units 2202, 2204, 2212, 2214, 2215 can be operated as the same usage type or as different usage types. Furthermore, the first, second, third, fourth, and additional rentable units 2202, 2204, 2212, 2214, 2215 can be operated as more than one usage type simultaneously or nearly simultaneously (e.g., as rentable office space during the day and as lodging at night). The non-school uses can be provided in an annually reoccurring manner, such as for durations of between 5 and 15 weeks between successive academic sessions of the school at the school building 2100.

Operating the rentable units can include providing renter access to suitable features of the first, second, third, fourth, and additional rentable units 2202, 2204, 2212, 2214, 2215 described above. Operating the first rentable unit 2202 will now be described with the understanding that the described features can also apply, when suitable, to operating the second, third, and fourth rentable units 2204, 2212, 2214, and other rentable units of a given collection. Operating the first rentable unit 2202 can include providing renter access to the classroom **2108*a* (block 3602), such as via the hallway 2106 and via the doorway opening 2120 of the classroom 2108*a*, and/or from the exterior of the school building 2100 via one of the window openings 2122 of the classroom 2108*a*. Operating the first rentable unit 2202 can further include providing renter access to the bathroom 2216*a* (block 3604), such as via one of the window openings 2122 of the classroom 2108*a* or via the doorway opening 2120 of the classroom 2108*a*. In at least some embodiments, operating the first rentable unit 2202 includes providing direct renter access to the classroom 2108*a* from the exterior of the school building 2100, such as via one of the window openings 2122 of the classroom 2108*a*, via the doorway 2702*a*, via the exterior stairway 2704*a*, and/or via the interior stairway 2706*a***.

The method 3600 can further include flowing waste from the bathroom **2216*a* toward the plumbing drain trunk line 2142 via the plumbing drain line 2218*a* (block 3606). This can occur at least partially within the hallway 2106 (e.g., over a distance of at least two meters within the hallway 2106) and/or at least partially outside the school building 2100 (e.g., over a distance of at least two meters outside the school building 2100). Furthermore, flowing waste from the bathroom 2216*a* toward the plumbing drain trunk line 2142 can include flowing the waste via one or more of the toilet hookups 2232. Similarly, flowing waste from the bathroom 2216*a* toward the plumbing drain trunk line 2142 can include flowing the waste via the sewage detention tank 2234. In these cases, flowing waste from the bathroom 2216*a* toward the plumbing drain trunk line 2142 can further include flowing waste from the sewage detention tank 2234 toward the plumbing drain trunk line 2142, such as via one or more of the toilet hookups 2232**.

The method 3600 can still further include flowing water from the water supply trunk line 2144 toward the bathroom 2216*a* via the cold and hot water supply lines 2220*a*, 2222*a* (block 3608). This can occur at least partially within the hallway 2106 (e.g., over a distance of at least two meters within the hallway 2106) and/or at least partially outside the school building 2100 (e.g., over a distance of at least two meters outside the school building 2100). Furthermore, flowing water from the water supply trunk line 2144 toward the bathroom 2216*a* can include flowing the water via one or more of the sink hookups 2233 of the school bathroom 2110*a*. Similarly, flowing water from the water supply trunk line 2144 toward the bathroom 2216*a* can include flowing the water via the cold and hot water reservoirs 2236, 2238. In these cases, flowing water from the water supply trunk line 2144 toward the bathroom 2216*a* can further include flowing water from the water supply trunk line 2144 toward the cold and hot water reservoirs 2236, 2238, such as via one or more of the sink hookups 2233 of the school bathroom 2110*a*.

In at least some embodiments, the method 3600 includes operating the heating system 2560 (block 3610) to heat the airspace 2558 and thereby provide shared below-room-temperature baseline heating to the third and fourth rentable units 2212, 2214 via the thermally conductive ceiling of the compartmentalizing assembly 2206, when present. Similarly, the method 3600 can include operating the heating system 2560 to provide below-room-temperature baseline heating to the first and second rentable units 2202, 2204. Like the heating system 2560, other permanent systems of the school building 2100 (e.g., electrical systems and water heating systems) can be taken offline or remain online while the first, second, third, fourth, and additional rentable units 2202, 2204, 2212, 2214, 2215 are operated to provide the non-school uses. Components of the given collection can modify the capacities or other attributes of these systems. Examples of capacity-modifying components include the hot water reservoir 2238 and the supplemental heaters 2562, among others.

Also disclosed herein are examples of real estate units including interior regions of retrofitted garages (alternatively known as carports) and related technology. In a particular embodiment of the present technology, a real estate unit includes an interior region of a retrofitted garage, a reusable bathroom removably disposed within the interior region, and a reusable fenestrated barrier stationarily and removably disposed between the interior region and an outdoor area. The bathroom, barrier, and/or other suitable components of the real estate unit can be configured for low-cost deployment, removal, and redeployment. Use of these components can allow revenue from operating the real estate unit to exceed costs associated within transitioning the garage from its purpose-built use (e.g., storing one or more parked cars) to an alternative use (e.g., lodging, residential, office, and/or assembly use) even if the real estate unit is only operated for a short period of time. Thus, an operator of a network of real estate units may be able to lease a garage short-term (e.g., monthly) from an owner of the garage and retrofit the garage for provision of rentable space to third parties with little or no risk of incurring significant economic loss. Even if the owner terminates the lease after a short period of time or if demand for the newly created real estate unit is lower than expected, most of the capital associated with retrofitting the garage can be recoverable. Furthermore, capital embodied in the components can be readily relocatable in response to long-term and short-term (e.g., seasonal) changes in demand.

Among various types of real estate, garages are particularly well suited to be at least substantially reversibly retrofitted to accommodate alternative uses. For example, garages tend to be well sized for use as individual lodging, residential, office, and/or assembly units. Garages also tend to be remarkably consistent and, therefore, potentially compatible with a standard set of reusable retrofitting components. As another example, garages tend to be unfurnished or sparsely finished in their purpose-built use, which can facilitate retrofitting. As yet another example, garages typically have large openings at ground level. These openings can be well suited for retrofitting to become sources of natural light and/or points of direct exterior access. As yet another example, garages typically have at least one exterior wall well suited for accommodating retrofitted utility connections between indoor and outdoor components. Garages compatible with embodiments of the present technology can have other desirable attributes in addition to or instead of the forgoing attributes. Furthermore, embodiments of the present technology can be implemented in other types of real estate, such as other garage-like types of real estate. Examples of other garage-like types of real estate include storage spaces (e.g., drive-up mini-storage units) and loading spaces (e.g., loading docks).

Figure 88:
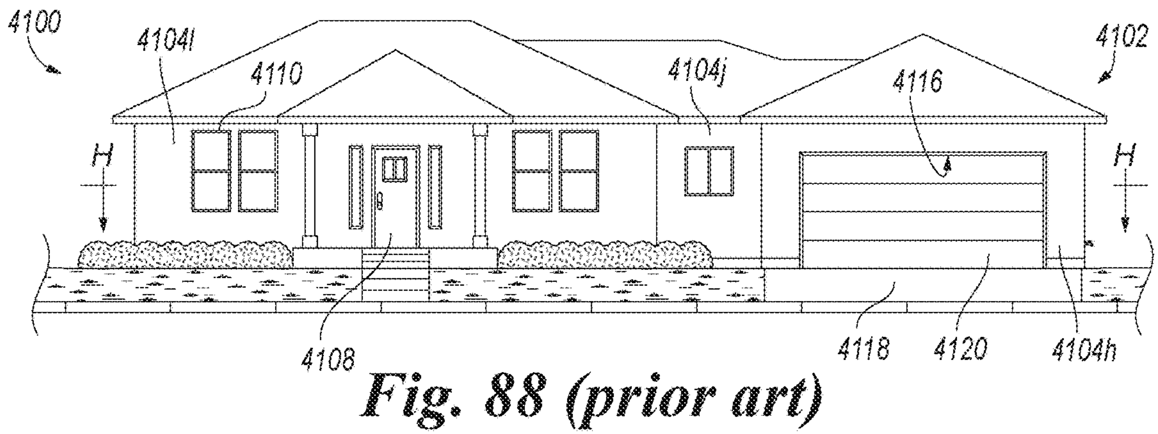
FIG. 88 is a front profile view of a single-family house including an attached garage.
Figure 89:
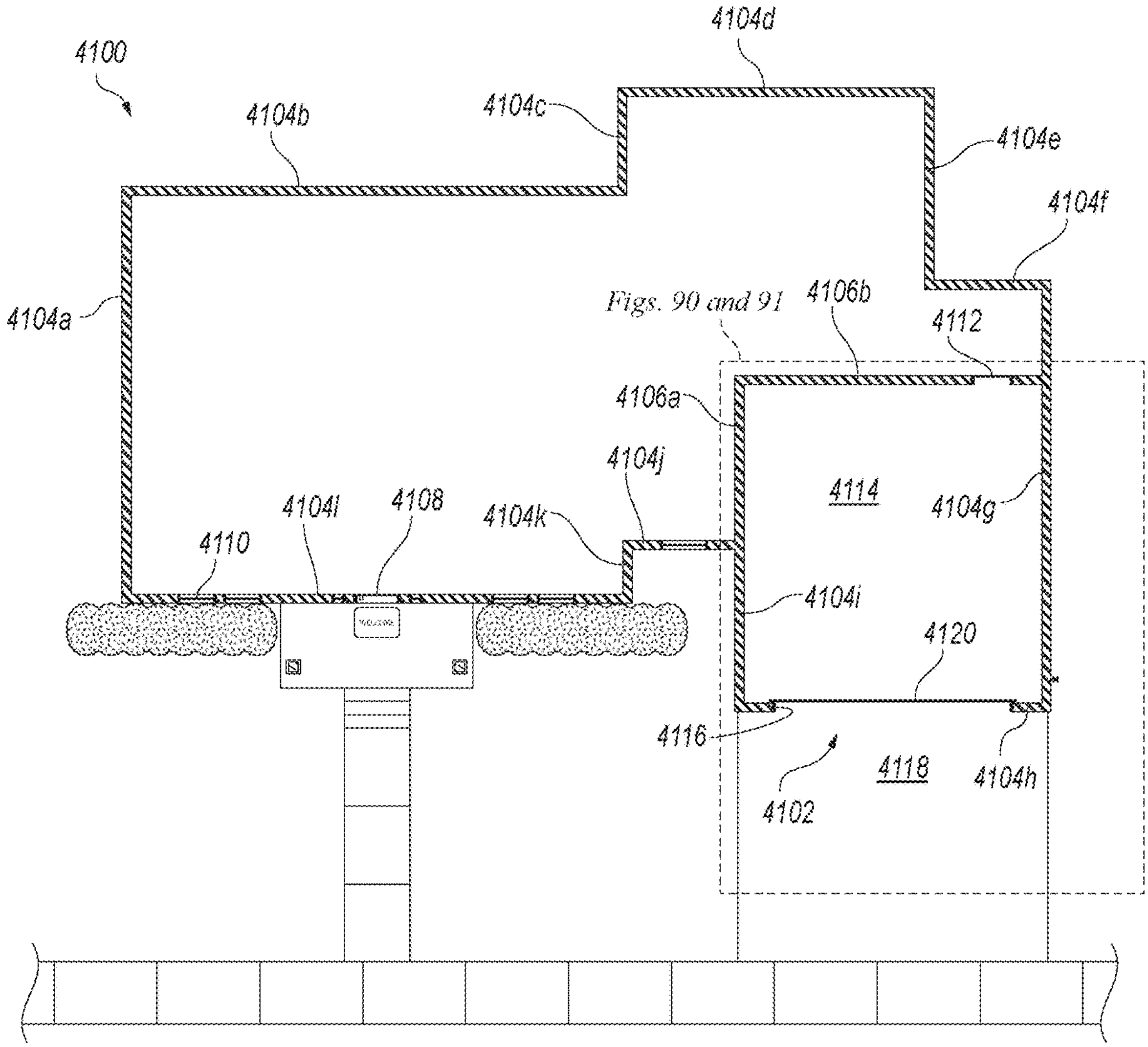
FIG. 89 is a cross-sectional top plan view of the single-family house shown in FIG. 88 taken along the line H-H in FIG. 88 with the garage in a first state.

FIG. 88 is a front profile view of a house 4100 including a garage 4102. FIG. 89 is a cross-sectional top plan view of the house 4100 taken along the line H-H in FIG. 88 with the garage 4102 in a first state. The first state can be a garage-use, original, unretrofitted, pre-retrofit, or similar state. With reference to FIGS. 88 and 89 together, the house 4100 can include permanent exterior walls 4104 (individually identified as exterior walls 4104*a*-4104*l*), permanent interior walls 4106 (individually identified as interior walls 4106*a*, 4106*b*), a front doorway 4108, windows 4110, and an interior doorway 4112. The exterior walls 4104*g*-4104*i* and interior walls 4106*a*, 4106*b* can define an interior region 4114 of the garage 4102. The interior doorway 4112 can extend between the interior region 4114 and an adjacent interior region of the house 4100. For simplicity of illustration, interior walls and doorways (other than those associated with the garage 4102), windows at the sides and back of the house 4100, and interior furnishings of the house 4100 are not shown. The exterior wall 4104*h* can have an opening 4116 between the interior region 4114 and the outdoor area 4118. The outdoor area 4118 can be a driveway and/or parking area. Furthermore, the opening 4116 can be sized to permit passage of a car between the interior region 4114 and the outdoor area 4118. For example, the opening 4116 can have a width within a range from 2 meters to 7 meters (e.g., from 4 meters to 6 meters). The house 4100 can further include an overhead door 4120 movably disposed at the opening 4116.

Figure 90:
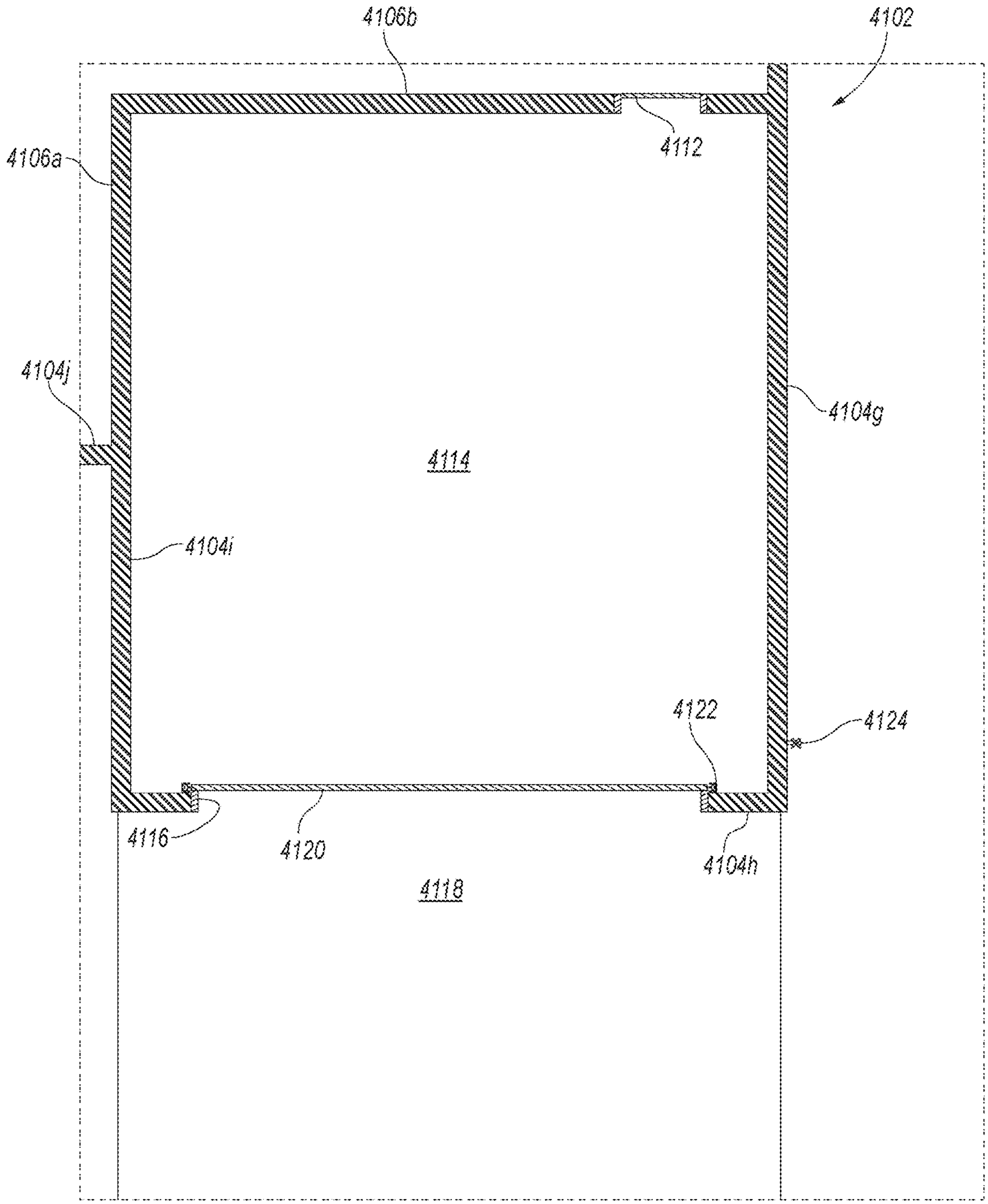
FIG. 90 is an enlarged view of a portion of FIG. 89.

FIG. 90 is an enlarged view of a portion of FIG. 89. As shown in FIG. 90, the garage 4102 can include a door track 4122 at the opening 4116. The overhead door 4120 can be operably connected to the door track 4122. The garage 4102 can further include a hose bibb 4124 at an exterior side of the exterior wall 4104*g*. Although the house 4100 in the illustrated embodiment is a single-family house and the garage 4102 is an attached garage, it should be understood that, in other embodiments, another type of primary building (e.g., a multi-family residential building) can be substituted for the house 4100 and/or a detached garage can be substituted for the garage 4102. Furthermore, although the garage 4102 in the illustrated embodiment is a two-car garage, in other embodiments, a counterpart of the garage 4102 can be a one-car garage, a three-car garage, or a garage of another suitable type.

Figure 91:
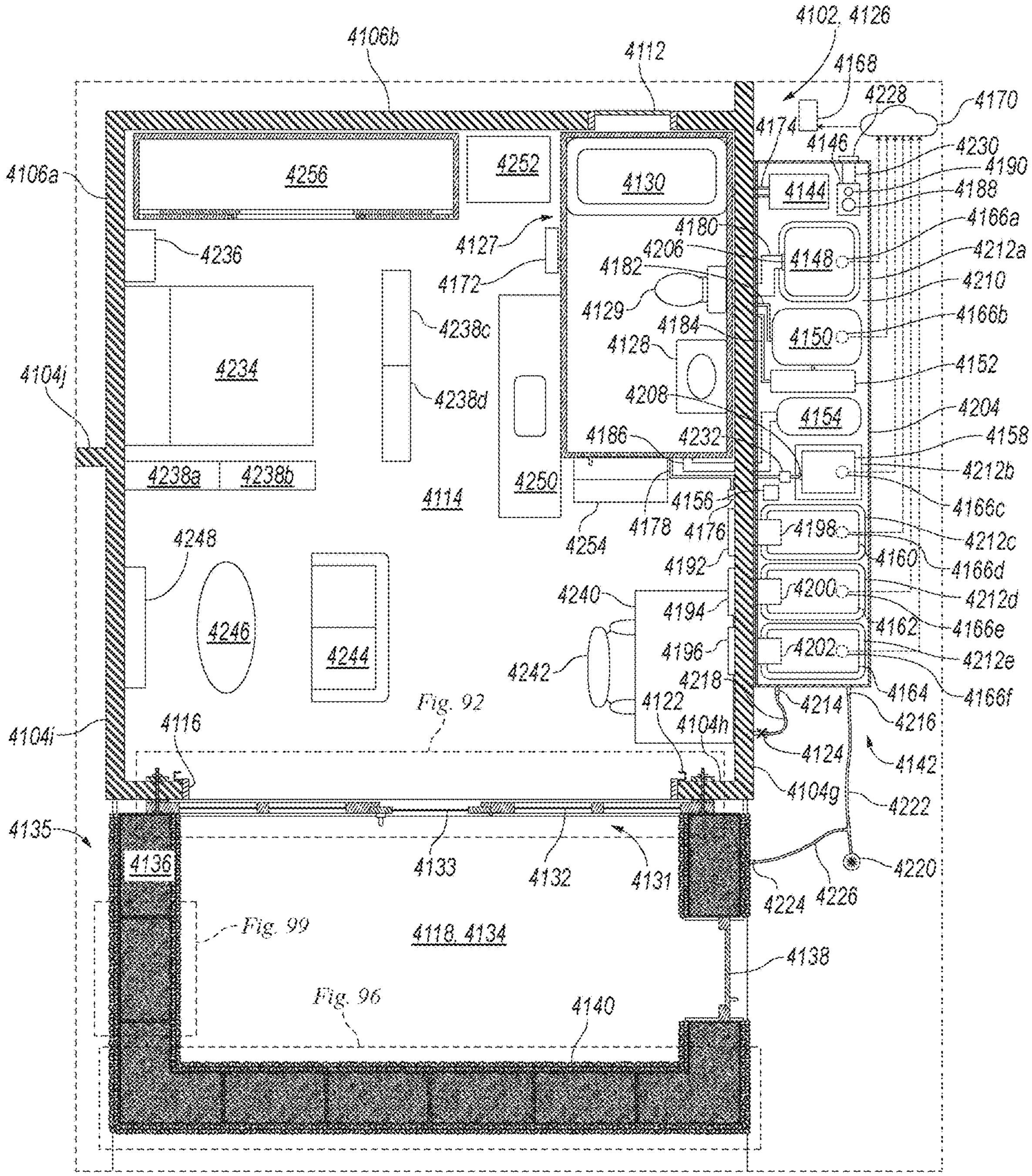
FIG. 91 is a cross-sectional top plan view corresponding to the portion of FIG. 89 shown in FIG. 90 and showing a real estate unit in accordance with an embodiment of the present technology including an interior region of the garage of the single-family house shown in FIG. 88 with the garage in a second state.

FIG. 91 is a cross-sectional top plan view corresponding to the portion of FIG. 89 shown in FIG. 90 and showing a real estate unit 4126 in accordance with an embodiment of the present technology. The real estate unit 4126 can include the interior region 4114 in a second state, which can be an alternative-use, non-original, retrofitted, post-retrofit, or similar state. In at least some embodiments, the garage 4102 is retrofitted (e.g., at least substantially reversibly retrofitted) to accommodate a non-garage alternative use (e.g., a lodging, residential, office, and/or assembly use) at the interior region 4114. The real estate unit 4126 can further include the outdoor area 4118, which can be retrofitted (e.g., at least substantially reversibly retrofitted) for courtyard use and/or another suitable use ancillary to the alternative use of the interior region 4114. The retrofitting of the interior region 4114 can occur well after (e.g., at least 20 years after) the garage 4102 was originally constructed.

The real estate unit 4126 can include retrofits (e.g., at least substantially reversible retrofits) to the garage 4102 that change the garage 4102 from being well suited for garage use to being well suited for the alternative use. In at least some cases, reversal of all or a portion of these retrofits returns the garage 4102 from being well suited for the alternative use to again being well suited for the garage use. Examples of reversible retrofits include removing, installing, and relocating furniture and fixtures with little or no associated demolition of the exterior walls 4104*g*-4104*i* and interior walls 4106*a*, 4106*b* or other permanent fabric of the garage 4102. The garage 4102 can be substantially reversibly retrofitted to accommodate the real estate unit 4126. For example, a total cost of reversible retrofits to the garage 4102 (e.g., a present value of at least substantially reversibly installed reusable components) for a given transformation from being well suited for garage use to being well suited for an alternative use can be greater (e.g., at least 50% greater or at least 100% greater) than a total cost of permanent retrofits to the garage 4102 (e.g. modifications to the permanent fabric of the garage 4102) for the given transformation. Capital associated with the alternative use can be readily re-deployable after the alternative use. In some cases, the alternative use and the real estate unit 4126 are active for one year or less (e.g., six months or less) between successive transformations. In other cases, the alternative use and the real estate unit 4126 can have longer durations or even be permanent.

As shown in FIG. 91, the real estate unit 4126 can include a bathroom 4127 disposed (e.g., removably disposed) within the interior region 4114. The bathroom 4127 can include a sink 4128, a toilet 4129, and a bath 4130. In some embodiments, the bathroom 4127 is reusable and removably disposed within the interior region 4114. For example, unlike a conventional bathroom that can only be installed by heavy construction and removed by heavy demolition, the bathroom 4127 can be configured to be installed with little or no need for heavy construction and removed with little or no need for heavy demolition. Furthermore, the bathroom 4127 can be configured to be conveniently transported and reused after its removal. In the illustrated embodiment, the bathroom 4127 is an assembly of reusable bathroom modules configured for rapid deployment into and removal from the interior region 4114 in an at least partially disassembled state. For example, the bathroom 4127 can be made up mostly or entirely of reusable modular components. In other embodiments, a counterpart of the bathroom 4127 can be portable and configured for rapid deployment into and removal from the interior region 4114 without significant disassembly. This deployment and removal can occur by forklift, by dolly, by operation of wheels integrated into the counterpart of the bathroom 4127, or in another suitable manner. In still other embodiments, a counterpart of the bathroom 4127 can have other suitable forms. As shown in FIG. 91, the bathroom 4127 can be positioned within the interior region 4114 such that it blocks access to the interior doorway 4112. This can be useful, for example, to form a robust separation between the interior region 4114 and other portions of the house 4100.

The real estate unit 4126 can further include a barrier 4131 disposed between the interior region 4114 and the outdoor area 4118. For example, a path permitting a renter of the real estate unit 4126 to move between the interior region 4114 and the outdoor area 4118 can extend through the opening 4116 and through the barrier 4131. Furthermore, the barrier 4131 can be stationarily disposed between the interior region 4114 and the outdoor area 4118. For example, unlike the overhead door 4120, which is typically configured to move on a regular basis during normal operation of the garage 4102 in the first state, the barrier 4131 can be configured to remain at least substantially stationary during normal operation of the real estate unit 4126. The barrier 4131 can be fenestrated and can include windows 4132 that allow natural light to enter the interior region 4114 from the outdoor area 4118. The barrier 4131 can further include a door 4133. In at least some embodiments, the barrier 4131 is foldable to facilitate its transport and storage when not in use. For example, the barrier 4131 can be foldable along vertical seams (not shown) between neighboring windows 4132 and/or between the door 4133 and windows 4132 neighboring the door 4133.

The barrier 4131 can be reusable and removably disposed between the interior region 4114 and the outdoor area 4118. For example, the barrier 4131 can be configured to be installed with little or no need for heavy construction and removed with little or no need for heavy demolition. Furthermore, the barrier 4131 can be configured to be conveniently transported and reused after its removal. In the illustrated embodiment, the barrier 4131 is rigid, portable and configured for rapid deployment into and removal from operable association with the interior region 4114 without significant disassembly. This deployment and removal can occur by forklift, by dolly, by operation of wheels (not shown) integrated into the barrier 4131, or in another suitable manner. In other embodiments, a counterpart of the barrier 4131 can be an assembly of reusable barrier modules configured for rapid deployment into and removal from between the interior region 4114 and the outdoor area 4118 in an at least partially disassembled state. For example, a counterpart of the barrier 4131 can be made up mostly or entirely of reusable modular components.

With reference again to FIG. 91, the real estate unit 4126 can include a courtyard 4134 at the outdoor area 4118. For example, the real estate unit 4126 can include an exterior enclosure 4135 including wall components 4136 and a gate 4138 disposed at a perimeter portion of the courtyard 4134. The wall components 4136, the gate 4138, and/or other suitable components of the exterior enclosure 4135 can be reusable and removably disposed at the perimeter portion of the courtyard 4134. For example, the exterior enclosure 4135 can be made up mostly or entirely of reusable modular components. As discussed in further detail below, the wall components 4136 can be stacked and/or interlocking within the exterior enclosure 4135. Furthermore, the wall components 4136 can be planters that support vegetation 4140. For example, the wall components 4136 can internally support a root system (not shown) of the vegetation 4140. Thus, the exterior enclosure 4135 can include living walls.

In the illustrated embodiment, the real estate unit 4126 is configured to be mostly off-grid (i.e., independent of service connections to local utilities). This configuration can be useful, for example, to avoid costs and complications associated with utility hookups, to reduce the environmental impact of the real estate unit 4126, to facilitate efficient management of the real estate unit 4126, to reduce costs associated with maintaining the real estate unit 4126 during periods of nonuse or low use, and/or for other reasons. In other embodiments, a counterpart of the real estate unit 4126 can be mostly or entirely on-grid (i.e., dependent on service connections to local utilities).

With reference again to FIG. 91, the real estate unit 4126 can include a dock 4142 removably disposed outside the interior region 4114. The dock 4142 can be above-ground (as illustrated) or below-ground (e.g., disposed within a pit). At the dock 4142, the real estate unit 4126 can include a heat pump 4144, an exhaust filter 4146, a blackwater tank 4148, a water reservoir 4150, a water heater 4152, a greywater filter 4154, a wireless router 4156, a battery 4158, a trash bin 4160, a recycling bin 4162, and a laundry bin 4164. The water reservoir 4150 can be operably connected to the hose bibb 4124 and can be configured to increase a capacity of the hose bibb 4124 to supply water to the bathroom 4127, such as by attenuating spikes in demand for water from the bathroom 4127. In the illustrated embodiment, the real estate unit 4126 is configured to separately manage removal and disposal of blackwater (e.g., wastewater from the toilet 4129) and greywater (e.g., wastewater from the sink 4128 and the bath 4130). In other embodiments, a counterpart of the real estate unit 4126 can be configured to collectively manage removal and disposal of blackwater and greywater. Accordingly, the blackwater tank 4148 can be more generally referred to as a sewage tank indicating that it can be configured to receive primarily blackwater, primarily greywater, or both blackwater and greywater.

With reference again to FIG. 91, the exhaust filter 4146, the blackwater tank 4148, the battery 4158, the trash bin 4160, the recycling bin 4162, and the laundry bin 4164 can be removably connected to the dock 4142 or otherwise removably disposed within or outside the interior region 4114. In the illustrated embodiment, the real estate unit 4126 is configured to operate on-grid with respect to a water supply (i.e. because the water reservoir 4150 is operably connected (for replenishment) to a water service for the house 4100 via the hose bibb 4124) and configured to be off-grid with respect to an electrical supply and disposal of blackwater from the toilet 4129. In other embodiments, a counterpart of the real estate unit 4126 can be off-grid with respect to water supply (e.g., because the water reservoir 4150 is configured to be independently refilled or swapped), on-grid with respect to electrical supply (e.g., because the battery 4158 is operably connected (e.g., for recharging) to an electrical service for the house 4100), and/or on-grid with respect to sewage disposal (e.g. because the blackwater tank 4148 is operably connected (e.g., for draining) to a municipal sewage line for the house 4100).

With reference again to FIG. 91, the real estate unit 4126 can be configured to receive occasional servicing. This servicing can be include collecting backwater, trash, recyclables, and laundry (e.g., for cleaning and return) from the blackwater tank 4148, the trash bin 4160, the recycling bin 4162, and the laundry bin 4164, respectively. The servicing can also include recharging the battery 4158. In at least some cases, the blackwater tank 4148 is configured to be swapped for removal of blackwater from the real estate unit 4126. Similarly, the battery 4158 can be configured to be swapped for replenishment of an electrical supply to the real estate unit 4126. This can reduce or eliminate the need for recharging the battery 4158. A less-full replacement for the blackwater tank 4148, a more-fully-charged replacement for the battery 4158, and/or other suitable replacements for components of the real estate unit 4126 can be delivered to the real estate unit 4126 by truck or in another suitable manner. The replaced components can be collected in the same or a different manner and transported to a central location where the components can be efficiently processed (e.g., emptied, cleaned, recharged, etc.) for reuse. This delivery and collection can occur on a regular schedule (e.g., daily, every-other-day, etc.), as needed, and/or on demand.

The dock 4142 can include sensors 4166 (individually identified as sensors **4166*a*-4166*f*) operably connected to the blackwater tank 4148, the water reservoir 4150, the battery 4158, the trash bin 4160, the recycling bin 4162, and the laundry bin 4164, respectively. The sensors 4166 can be wirelessly connected to a remote server 4168 via the router 4156 and a network 4170 (e.g., the Internet). The server 4168 can include software that automatically processes data from the sensors 4166 to determine when servicing of the real estate unit 4126 is required. For example, data from the sensor 4166*a* may indicate that the blackwater tank 4148 is at 75% of capacity and needs to be drained or swapped promptly. As another example, data from the sensor 4166*b* may indicate that the water reservoir 4150 is being depleted faster than it can be replenished via the hose bibb 4124 and, therefore, needs to be independently replenished promptly. As yet another example, data from the sensor 4166*c* may indicate that the battery 4158 is at 25% of capacity and needs to be recharged or swapped promptly. Over time, aggregate data from the sensors 4166 can be analyzed to establish default servicing intervals for the real estate unit 4126. In addition or alternatively, data from the sensors 4166 can be used to calculate utility usage for the real estate unit 4126 for purposes of environmental reporting and/or billing a renter of the real estate unit 4126. Each of the individual sensors 4166*a*-4166*f* can be of a suitable type for monitoring the corresponding component of the real estate unit 4126. For example, the sensors 4166*a*, 4166*b*, 4166*d*-4166*f*, individually, can be weight sensors, level sensors, or other types of sensors configured to measure fullness of the blackwater tank 4148, the water reservoir 4150, the trash bin 4160, the recycling bin 4162, and the laundry bin 4164, respectively. As another example, the sensor 4166*c* can be a charge meter or another type of sensor configured to measure a charge of the battery 4158**.

The real estate unit 4126 can include suitable utility lines and other connections that extend from components of the real estate unit 4126 within the interior region 4114 to components of the real estate unit 4126 or other structures outside of the interior region 4114. For example, the real estate unit 4126 can include a heater/cooler 4172 within the interior region 4114, and refrigerant lines 4174 extending between the heater/cooler 4172 and the heat pump 4144. The real estate unit 4126 can further include an electrical outlet 4176 serving the interior region 4114, and an electrical line 4178 extending between the electrical outlet 4176 and the battery 4158. The battery 4158, therefore, can be configured to power an appliance (not shown) within the interior region 4114 via the electrical outlet 4176 and the electrical line 4178. As additional examples of suitable utility lines, the real estate unit 4126 can include a blackwater drain line 4180 extending between the bathroom 4127 and the black-water tank 4148, a cold water supply line 4182 extending between the bathroom 4127 and the water reservoir 4150, a hot water supply line 4184 extending between the bathroom 4127 and the water heater 4152, a greywater drain line 4186 extending between the bathroom 4127 and the greywater filter 4154, a plumbing ventilation line 4188 extending between the bathroom 4127 and the exhaust filter 4146, and an exhaust line 4190 also extending between the bathroom 4127 and the exhaust filter 4146. The blackwater drain line 4180 and the greywater drain line 4186 can be sloped to convey liquid waste from the bathroom 4127 toward the blackwater tank 4148 and the greywater filter 4154, respectively, at least partially by gravity. To facilitate this sloping and/or for other reasons, the bathroom 4127 can have a floor level at least 0.5 meter (e.g., at least 1 meter) higher than an underlying floor level of the interior region 4114. In the illustrated embodiment, the blackwater drain line 4180 and the greywater drain line 4186 are separate. In other embodiments, a counterpart of the real estate unit 4126 can include combined blackwater and greywater lines. Accordingly, the blackwater drain line 4180 and the greywater drain line 4186 can be more generally referred to as a plumbing drain lines indicating that they can be configured to convey primarily blackwater, primarily greywater, or both blackwater and greywater.

The real estate unit 4126 can further include a trash hatch 4192, a recycling hatch 4194, and a laundry hatch 4196 within the interior region 4114. The real estate unit 4126 can also include a trash chute 4198 extending between the trash hatch 4192 and the trash bin 4160, a recycling chute 4200 extending between the recycling hatch 4194 and the recycling bin 4162, and a laundry chute 4202 extending between the laundry hatch 4196 and the laundry bin 4164. The refrigerant lines 4174, electrical line 4178, blackwater drain line 4180, cold water supply line 4182, hot water supply line 4184, greywater drain line 4186, plumbing ventilation line 4188, exhaust line 4190, trash chute 4198, recycling chute 4200, and laundry chute 4202 can extend through the exterior wall 4104*g*. For example, some or all of these lines and chutes can extend through retrofitted openings in the exterior wall 4104*g*. In at least some embodiments, these openings are readily patchable to facilitate returning the interior region 4114 to garage use if the real estate unit 4126 is decommissioned. The lines and chutes can be removably disposed inside and/or outside the interior region 4114. For example, the lines and chutes can be temporary and configured for reuse or disposal upon decommissioning of the real estate unit 4126. In at least some embodiments, the blackwater drain line 4180 and the greywater drain line 4186 extend above-floor and then above-ground from the bathroom 4127 toward the blackwater tank 4148 and the greywater filter 4154, respectively.

The dock 4142 can include additional lines, connections, and other suitable components ancillary to the components of the real estate unit 4126 at the dock 4142. For example, the dock 4142 can include a housing 4204 that provides security and protection from weather to components of the real estate unit 4126 at the dock 4142. The housing 4204 can include a lid (not shown) configured to be open when the real estate unit 4126 is being serviced and closed and locked when the real estate unit 4126 is not being serviced. In at least some embodiments, the lid includes solar panels (also not shown) operably connected to the battery 4158. The dock 4142 can further include couplings along some or all of the lines and chutes described above. These couplings can separate portions of the lines and chutes within the housing 4204 from portions of the lines and chutes outside the housing 4204. Thus, by operation of these couplings, the dock 4142 can be transportable as a unit with little or no need to modify internal portions of the dock 4142 in the field. For example, the dock 4142 can be pre-manufactured with the internal components shown in FIG. 91, installed at the location shown in FIG. 91, and then connected up to portions of the associated lines and chutes outside of the housing 4204.

The dock 4142 can further include couplings that facilitate convenient removal and replacement (e.g., swapping) of the blackwater tank 4148, the battery 4158, the trash bin 4160, the recycling bin 4162, and the laundry bin 4164. For example, the dock 4142 can include a blackwater drain quick-connect coupling 4206 through which the blackwater tank 4148 is fluidically connected to the blackwater drain line 4180 and the bathroom 4127. In at least some embodiments, the drain quick-connect coupling 4206 includes a check valve. Similarly, the dock 4142 can include an electrical quick-connect coupling 4208 through which the battery 4158 is electrically connected to the electrical line 4178 and the electrical outlet 4176. The dock 4142 can also include a floor 4210 having pads 4212 (individually identified as pads 4212*a*-4212*e*) that facilitate convenient registration of the blackwater tank 4148, the battery 4158, the trash bin 4160, the recycling bin 4162, and the laundry bin 4164 with the blackwater drain quick-connect coupling 4206, the electrical quick-connect coupling 4208, the trash chute 4198, the recycling chute 4200, and the laundry chute 4202, respectively. For example, the pads 4212*a*-4212*e* can be insets in the floor 4210 that snuggly receive corresponding lower portions of the blackwater tank 4148, the battery 4158, the trash bin 4160, the recycling bin 4162, and the laundry bin 4164, respectively.

As shown in FIG. 91, the dock 4142 can include a potable water inlet 4214 and a greywater outlet 4216. The real estate unit 4126 can include a first hose 4218 extending between the hose bibb 4124 and the potable water inlet 4214. The real estate unit 4126 can further include sprinkler 4220 and a second hose 4222 extending between the greywater outlet 4216 and the sprinkler 4220. The exterior enclosure 4135 can include a greywater inlet 4224 fluidically connected to a branch 4226 of the second hose 4222. Filtered greywater can be distributed to support grass or other vegetation (not shown) via the sprinkler 4220, and distributed to support the vegetation 4140 via an internal distribution system (e.g., a network of hoses; not shown) of the exterior enclosure 4135. The dock 4142 can include internal plumbing (e.g., under the floor 4210; not shown) fluidically connecting the water reservoir 4150 and the potable water inlet 4214, and fluidically connecting the greywater filter 4154 and the greywater outlet 4216. In at least some embodiments, this internal plumbing includes a pump (not shown). The dock 4142 can further include an exhaust output fan 4228 and an internal duct 4230 extending between the exhaust output fan 4228 and the exhaust filter 4146. The dock 4142 can also include an inverter 4232 operably connected to the electrical line 4178.

The real estate unit 4126 can be furnished or otherwise outfitted with suitable furnishings, fixtures, accessories, etc. to accommodate its non-garage alternative use. In the illustrated embodiment, the real estate unit 4126 is a lodging and/or residential unit with suitable furnishings, fixtures, accessories, etc. within the interior region 4114 to accommodate lodging and/or residential use of the interior region 4114. These furnishings, fixtures, accessories, etc. can include a bed 4234, a side table 4236, shelving units 4238 (individually identified as shelving units 4238*a*-4238*d*), a writing table 4240, a chair 4242, a sofa 4244, a coffee table 4246, a television 4248, a kitchenette 4250, a refrigerator 4252, and a set of step stairs 4254. The kitchenette 4250 and the set of step stairs 4254 can be operably associated with the bathroom 4127. The real estate unit 4126 can further include a closet 4256 disposed (e.g., removably disposed) within the interior region 4114. In other embodiments, a counterpart of the real estate unit 4126 can include other suitable furnishings, fixtures, accessories, etc. As described in further detail below, real estate units in accordance with other embodiments of the present technology can be rentable office units, rentable assembly units, and/or have other suitable primarily uses in addition to or instead of lodging and/or residential uses. Furthermore, rentable real estate units in accordance with embodiments of the present technology can be directly rentable, rentable via a membership system (e.g., in a member-based network of real estate units), rentable under short-term use arrangements (e.g., lodging arrangements), and/or rentable in another suitable manner.

Figure 92:
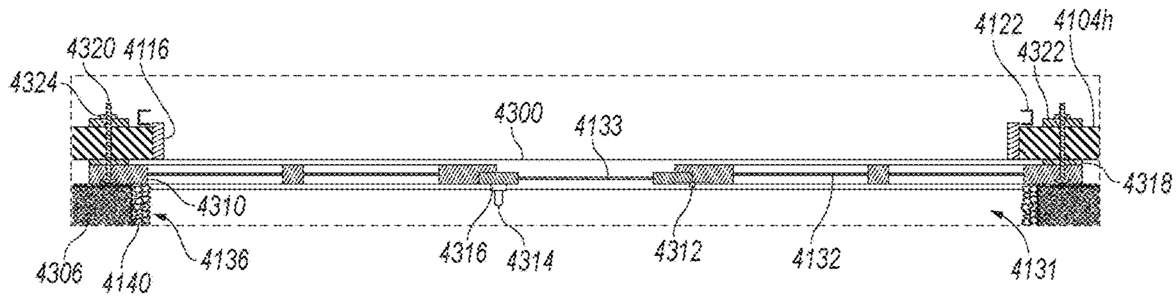
FIG. 92 is an enlarged view of a first portion of FIG. 91 showing a barrier of the real estate unit.
Figure 93:
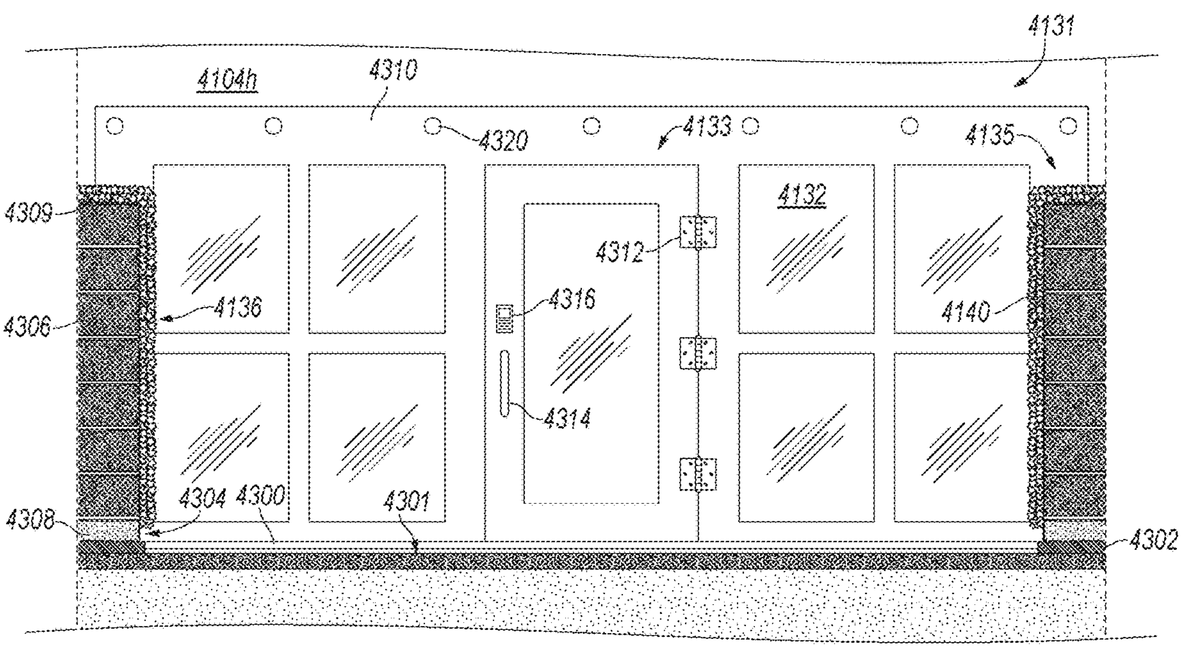
FIGS. 93 and 94 are, respectively, a cross-sectional exterior side profile view and a cross-sectional interior side profile view of a portion of the real estate unit shown in FIG. 91 corresponding to the first portion of FIG. 91 shown in FIG. 92.
Figure 94:
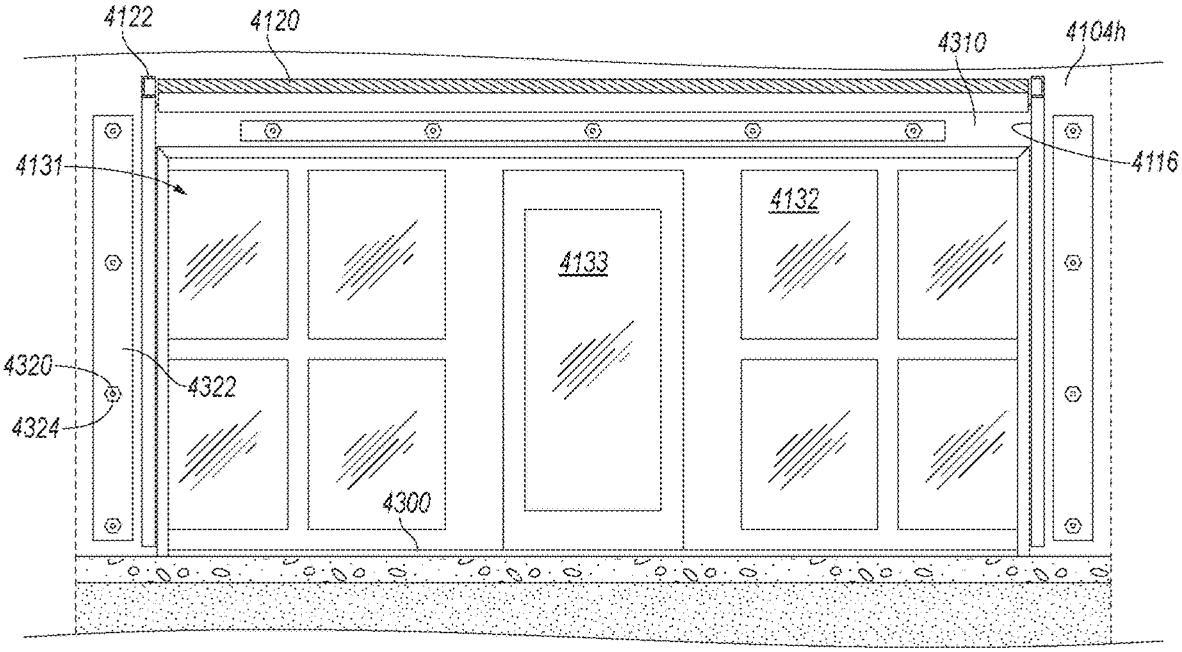

FIG. 92 is an enlarged view of a first portion of FIG. 91 showing the barrier 4131. FIGS. 93 and 94 are, respectively, a cross-sectional exterior side profile view and a cross-sectional interior side profile view of a portion of the real estate unit 4126 corresponding to the first portion of FIG. 91 shown in FIG. 92. With reference to FIGS. 91-94 together, the barrier 4131 can include a first mass of self-leveling material 4300 (e.g., a first disposable mass of hardened self-leveling grout) underlying the barrier 4131. The first mass of self-leveling material 4300 can be molded and, in at least some cases, is integrally formed along most or all of an overall footprint of the barrier 4131. During formation of the first mass of self-leveling material 4300, the constituent self-leveling material can be of sufficiently low viscosity to level itself by gravity. Thus, the first mass of self-leveling material 4300 can automatically conform to slopes, dips, and/or other irregularities in a ground surface at which the barrier 4131 is installed.

In at least some embodiments, the outdoor area 4118 has a paved surface 4301 that is not level. The exterior enclosure 4135 can include a second mass of self-leveling material 4302 (e.g., a second disposable mass of hardened self-leveling grout) underlying the wall components 4136. Similar to the first mass of self-leveling material 4300, the second mass of self-leveling material 4302 can be molded and, in at least some cases, is integrally formed along most or all of an overall footprint of the exterior enclosure 4135. During formation of the second mass of self-leveling material 4302, the constituent self-leveling material can be of sufficiently low viscosity to level itself by gravity. Thus, the second mass of self-leveling material 4302 can automatically conform to slopes, dips, and/or other irregularities in the paved surface 4301. When at least partially cured, the second mass of self-leveling material 4302 can provide the exterior enclosure 4135 with a reliably level surface that facilitates vertical stacking of the wall components 4136.

As shown in FIG. 93, the exterior enclosure 4135 can include base blocks 4304 between the second mass of self-leveling material 4302 and the lowermost row of the wall components 4136. The wall components 4136 can be hollow and can contain planting medium 4306. The base blocks 4304 can also be hollow and can include antimicrobial medium 4308. The exterior enclosure 4135 can further include a soaker hose 4309 that receives filtered greywater from the branch 4226 of the second hose 4222. In the illustrated embodiment, the soaker hose 4309 is loosely disposed in a serpentine manner at an upper portion of an uppermost row of the wall components 4136 within the exterior enclosure 4135. The soaker hose 4309 can distribute filtered greywater throughout the planting medium 4306 at the uppermost row of the wall components 4136. Once the planting medium 4306 at the uppermost row of the wall components 4136 is saturated, the filtered greywater can move by gravity and/or capillary action to the planting medium 4306 at a second-to-uppermost row of the wall components 4136 within the exterior enclosure 4135. This process can continue until the filtered greywater reaches the antimicrobial medium 4308. The antimicrobial medium 4308 can be a synthetic sponge or other suitable substrate that reduces or eliminates pools of the excess filtered greywater from developing within the base blocks 4304. Excess filtered greywater within the antimicrobial medium 4308 can drain from the base blocks 4304 onto the paved surface 4301 and along the paved surface 4301 to a storm drain (not shown). In other embodiments, the filtered greywater can be distributed through the exterior enclosure 4135 in another suitable manner. For example, a counterpart of the exterior enclosure 4135 can include separate soaker hoses at respective rows of wall components 4136. These soaker hoses can be connected to the branch 4226 of the second hose 4222 via a manifold. In still other embodiments, a counterpart of the exterior enclosure 4135 can have an irrigation system that uses freshwater instead of filtered greywater, or no irrigation system at all.

With reference again to FIGS. 91-94 together, the barrier 4131 can include a frame 4310, hinges 4312 operably connecting the door 4133 and the frame 4310 to one another, and a handle 4314 that facilitates operation of the door 4133 from outside the interior region 4114. The barrier 4131 can further include a smart lock 4316 configured to allow a renter of the real estate unit 4126 to unlock the door 4133 by operation of a mobile device (e.g. a mobile phone), by entering a passcode, by providing a biometric identification (e.g., a fingerprint), or in another suitable manner. The barrier 4131 can be removably fastened to the exterior wall 4104*h*. In the illustrated embodiment, the barrier 4131 is removably bolted to the exterior wall 4104*h*. In other embodiments, a counterpart of the barrier 4131 can be removably screwed to the exterior wall 4104*h*, removably clamped to the exterior wall 4104*h*, and/or removably fastened to the exterior wall 4104*h* in another suitable manner in addition to or instead of being removably bolted to the exterior wall 4104*h*. In still other embodiments, a counterpart of the barrier 4131 can be permanently installed at the exterior wall 4104*h*.

With reference again to FIGS. 91-94, the barrier 4131 can include a gasket 4318 disposed between the frame 4310 and the exterior wall 4104*h*. The gasket 4318 can be compressible such that it conforms to irregularities in the exterior wall 4104*h* and thereby enhances a weather resistance of a connection between the barrier 4131 and the exterior wall 4104*h*. The barrier 4131 can further include bolts 4320 that extend through the frame 4310, through the gasket 4318, and through the exterior wall 4104*h*. At an inside surface of the exterior wall 4104*h*, the barrier 4131 can include furring strips 4322 through which the bolts 4320 also extend, and nuts 4324 operably connected to the bolts 4320 and bearing on the furring strips 4322. In the illustrated embodiment, the barrier 4131 is an overlay that covers the opening 4116 at an exterior side of the exterior wall 4104*h*. In other embodiments, the barrier 4131 can have another suitable form and/or position relative to the opening 4116. For example, rather than being disposed at the exterior side of the exterior wall 4104*h*, a counterpart of the barrier 4113 can be disposed at an interior side of the exterior wall 4104*h*.

As shown in FIG. 94, in the illustrated embodiment, the overhead door 4120 is stowed within the interior region 4114 in an open state. For example, the door track 4122 can remain in place after the garage 4102 is retrofitted for an alternative use. A motor (not shown) operably connected to the overhead door 4120 can be temporarily disabled so that the overhead door 4120 remains out-of-service during operation of the real estate unit 4126. Leaving the overhead door 4120 and the door track 4122 in place after the garage 4102 is retrofitted for an alternative use can be useful, for example, to reduce an investment necessary to return the interior region 4114 to garage use, as needed. In other embodiments, the overhead door 4120 can be removed from the interior region 4114 when the garage 4102 is retrofitted for an alternative use. In still other embodiments, a counterpart of the overhead door 4120 can be retrofitted with windows and/or a doorway. In these embodiments, the counterpart of the overhead door 4120 can take the place of the barrier 4131.

Figure 95:
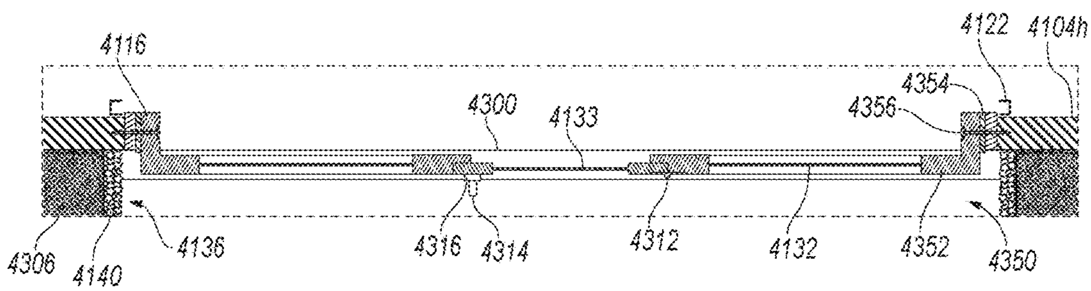
FIG. 95 is a top plan view corresponding to the first portion of FIG. 91 shown in FIG. 92 and showing a barrier of a real estate unit in accordance with another embodiment of the present technology.

FIG. 95 is a top plan view corresponding to the first portion of FIG. 91 shown in FIG. 92 and showing a barrier 4350 of a real estate unit in accordance with another embodiment of the present technology. In contrast to the barrier 4131 shown in FIGS. 91-94, the barrier 4350 is an inset rather than an overlay. For example, the barrier 4350 can be disposed within the opening 4116 rather than at an exterior or interior side of the exterior wall 4104*h*. As shown in FIG. 95, the barrier 4350 can include a frame 4352 that is narrower than the opening 4116. The barrier 4350 can further include a gasket 4354 disposed between the frame 4352 and sidewalls of the opening 4116. The barrier 4350 can also include screws 4356 extending laterally into portions of the exterior wall 4104*h* on opposite sides of the opening 4116. The gasket 4354 can be layered to compensate for a difference between a width of the frame 4352 and a width of the opening 4116, such as when the barrier 4350 is a standard size and the opening 4116 is a non-standard size. Although not adaptable to as wide a range of opening widths as the barrier 4131 described above, the barrier 4350 may be preferred over the barrier 4131 in some cases for aesthetic or other reasons.

Figure 96:
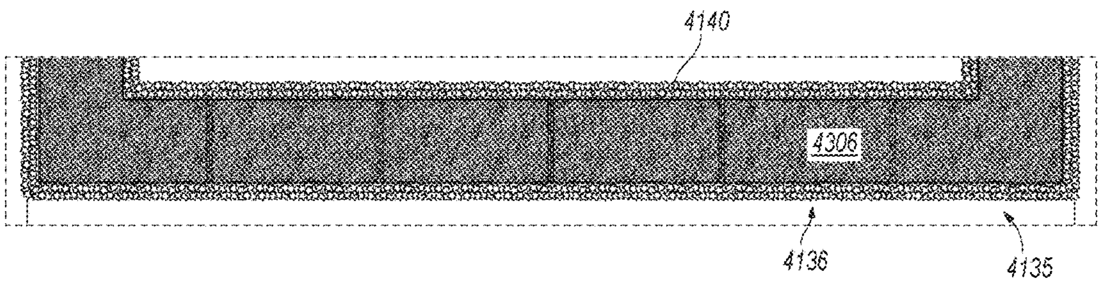
FIG. 96 is an enlarged view of a second portion of FIG. 91 showing an exterior enclosure of the real estate unit.
Figure 97:
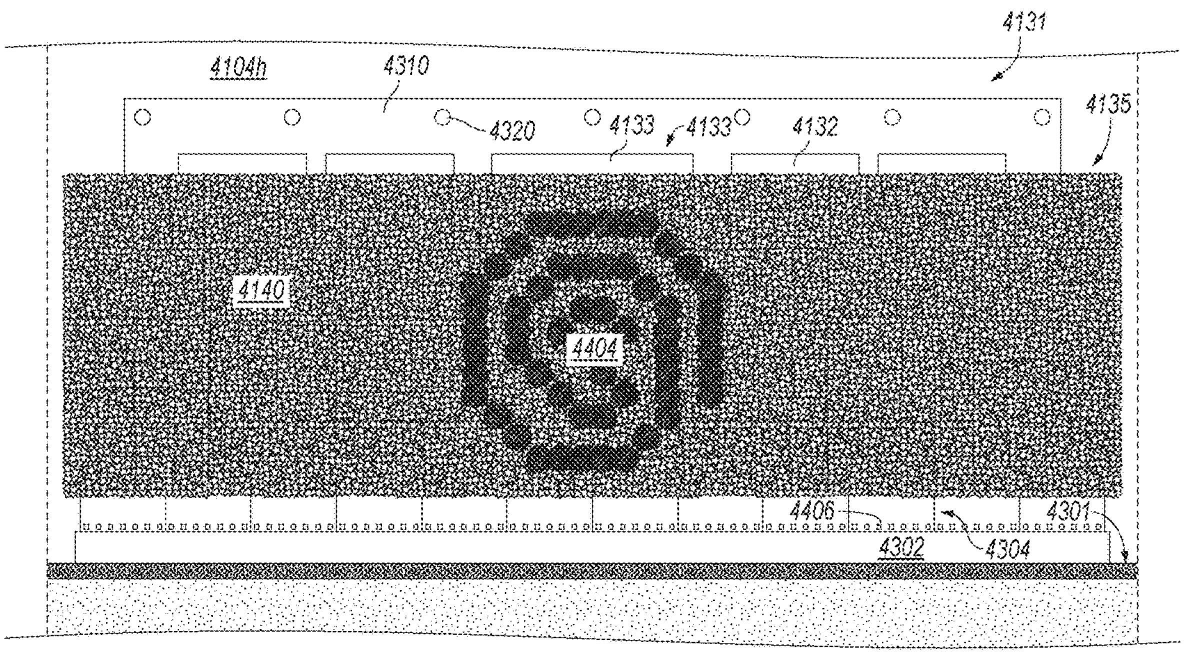
FIGS. 97 and 98 are cross-sectional exterior side profile views of a portion of the real estate unit shown in FIG. 91 corresponding to the second portion of FIG. 91 shown in FIG. 96 with vegetation of the exterior enclosure shown and not shown, respectively.
Figure 98:
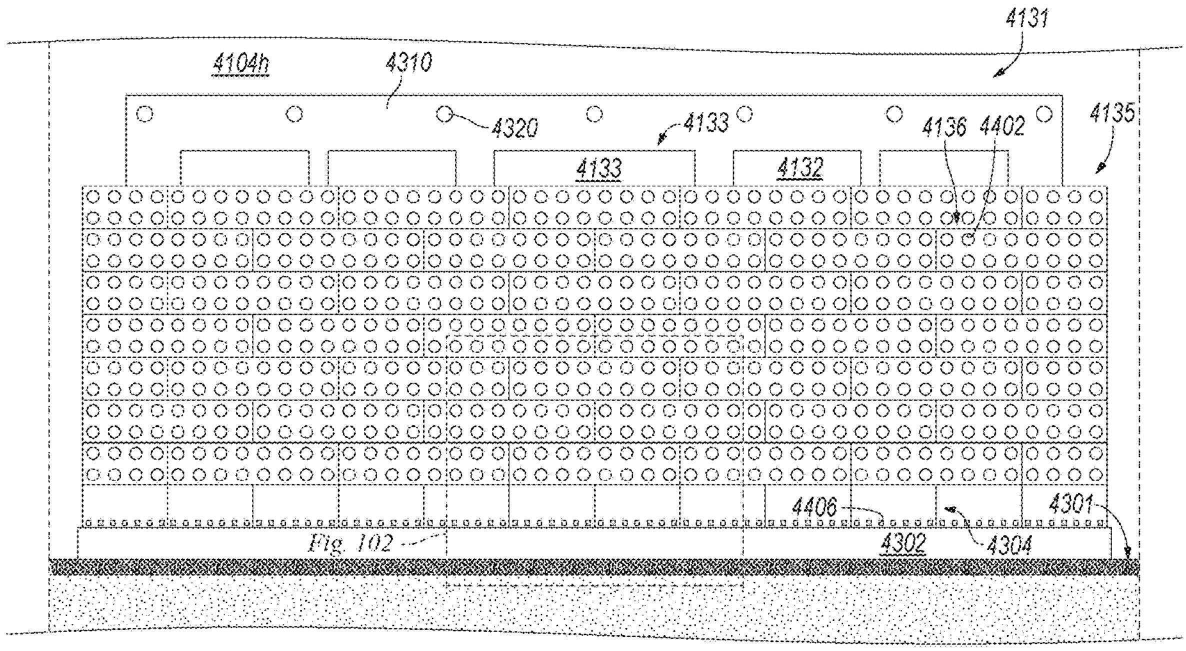
Figure 99:
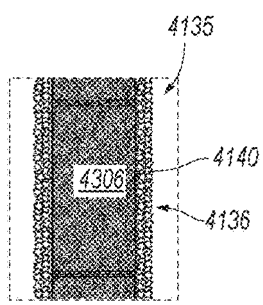
FIG. 99 is an enlarged view of a third portion of FIG. 91.
Figure 100:
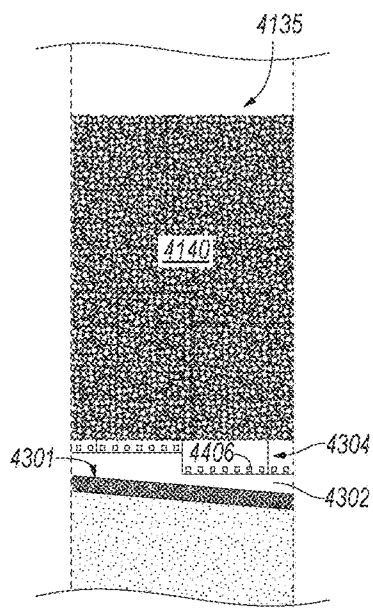
FIGS. 100 and 101 are cross-sectional exterior side profile views of a portion of the real estate unit shown in FIG. 91 corresponding to the third portion of FIG. 91 shown in FIG. 99 with vegetation of the exterior enclosure shown and not shown, respectively.
Figure 101:
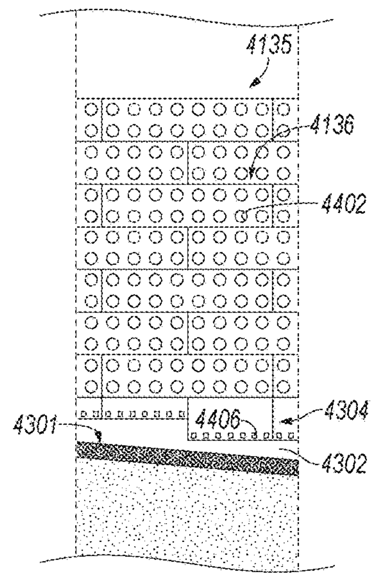
Figure 102:
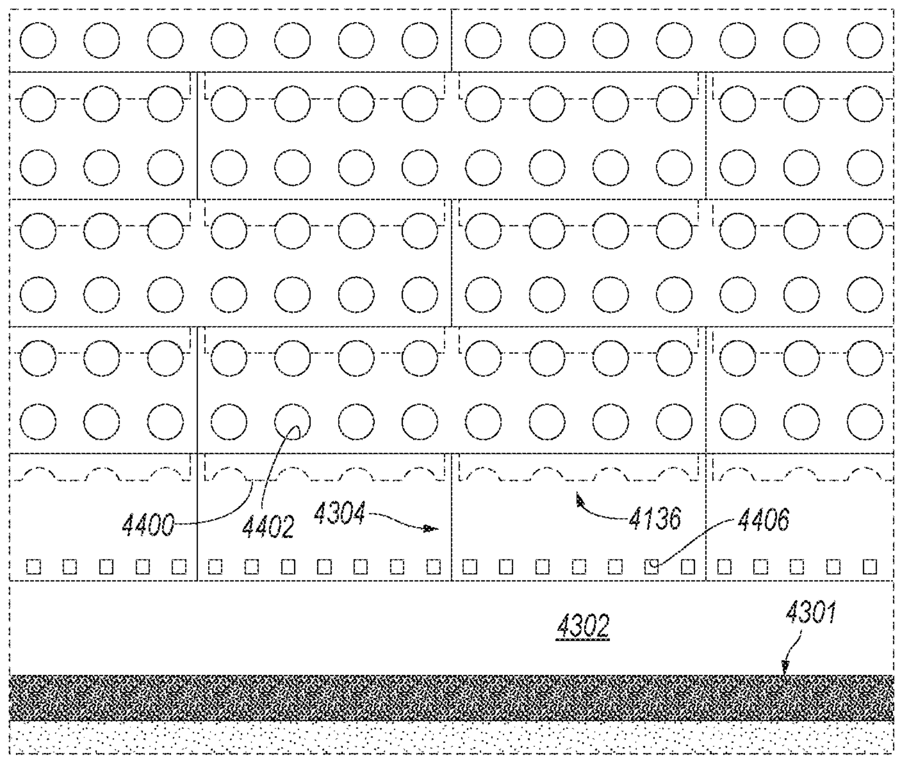
FIG. 102 is an enlarged view of a portion of FIG. 98.

FIG. 96 is an enlarged view of a second portion of FIG. 91 showing the exterior enclosure 4135. FIGS. 97 and 98 are cross-sectional exterior side profile views of a portion of the real estate unit 4126 corresponding to the second portion of FIG. 91 shown in FIG. 96 with the vegetation 4140 shown and not shown, respectively. FIG. 99 is an enlarged view of a third portion of FIG. 91. FIGS. 100 and 101 are cross-sectional exterior side profile views of a portion of the real estate unit 4126 corresponding to the third portion of FIG. 91 shown in FIG. 99 with the vegetation 4140 shown and not shown, respectively. FIG. 102 is an enlarged view of a portion of FIG. 98. With reference to FIGS. 91-94 and 96-102 together, the exterior enclosure 4135 can include staggered rows of the wall components 4136. For example, the wall components 4136 at corners of the exterior enclosure 4135 distant from the exterior wall 4104*h* can alternate row-to-row between larger and smaller L-shapes. Similarly, the wall components 4136 at portions of the exterior enclosure 4135 closest to the exterior wall 4104*h* can alternate row-to-row between larger and smaller rectangular shapes. Elsewhere within the exterior enclosure 4135, the wall components 4136 can have the larger rectangular shape.

The overall exterior enclosure 4135 can be self-supporting and/or free-standing. As shown in FIG. 102, the wall components 4136 can be stacked within the exterior enclosure 4135. Furthermore, the wall components 4136 can be interlocking within the exterior enclosure 4135. For example, the individual wall components 4136 can include downwardly extending flanges 4400 that are received within successively lower wall components 4136. The base blocks 4304 can be configured to receive the flanges 4400 of the wall components 4136 within a lowest row of wall components 4136 within the exterior enclosure 4135. As discussed above, the wall components 4136 can be planters. In at least some embodiments, the wall components 4136 include apertures 4402 through which the vegetation 4140 grows outwardly from roots (not shown) within the wall components 4136. The apertures 4402 can be large enough to allow passage of bulbs, cuttings, seedlings, etc. (not just seeds) into the planting medium 4306 after the exterior enclosure 4135 is assembled. For example, the individual apertures 4402 can have a width greater than 2 centimeters, such as a width within a range from 2 to 8 centimeters. As discussed above, the exterior enclosure 4135 can be configured to facilitate distribution of filtered greywater throughout the planting medium 4306. The base blocks 4304 can include holes 4406 through which excess filtered greywater exits the exterior enclosure 4135.

As shown in FIG. 97, the apertures 4402 can be differentially planted to form a brand identifier 4404 (e.g., a trade and/or service mark) or other suitable design at an exterior side (e.g., street-facing side) of the exterior enclosure 4135. Differential planting can include selectively planting the apertures 4402 with multiple types of plants and/or selectively planting and not planting the apertures 4402 with a single type of plant. For example, the non-planted apertures 4402 can be capped. Forming a brand identifier 4404 by differential planting can be useful to balance aesthetic considerations in a neighborhood setting with the need for clear communication of a brand associated with the real estate unit 4126 to consumers. The apertures 4402 can collectively form an array that facilitates forming the brand identifier 4404 in a consistent manner when the real estate unit 4126 is one of many real estate units for which the brand identifier 4404 is applicable. For example, a given aperture 4402 can be planted with a predetermined plant depending on its position within the array according to a reproducible plan. A template (not shown) can be temporarily placed over the exterior side of the exterior enclosure 4135 and registered to the array to facilitate rapid execution of the plan with little or no need for customized execution of the plan in the field. Furthermore, using relatively large and/or more mature plantings can allow the vegetation 4140 to be formed more efficiently and/or with less lead time than would be the case using seeds.

Figure 103:
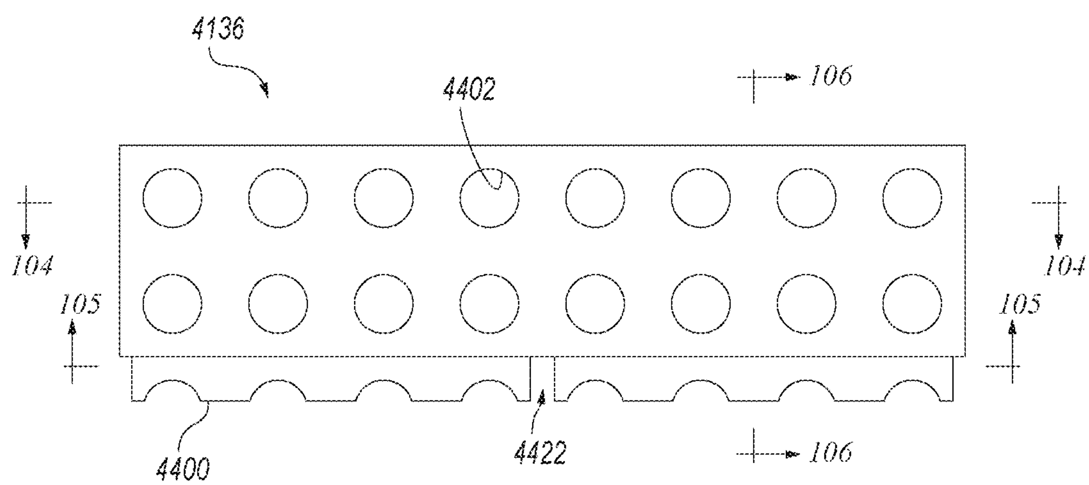
FIG. 103 is side profile view of a wall component of the exterior enclosure of the real estate unit shown in FIG. 91.
Figure 104:
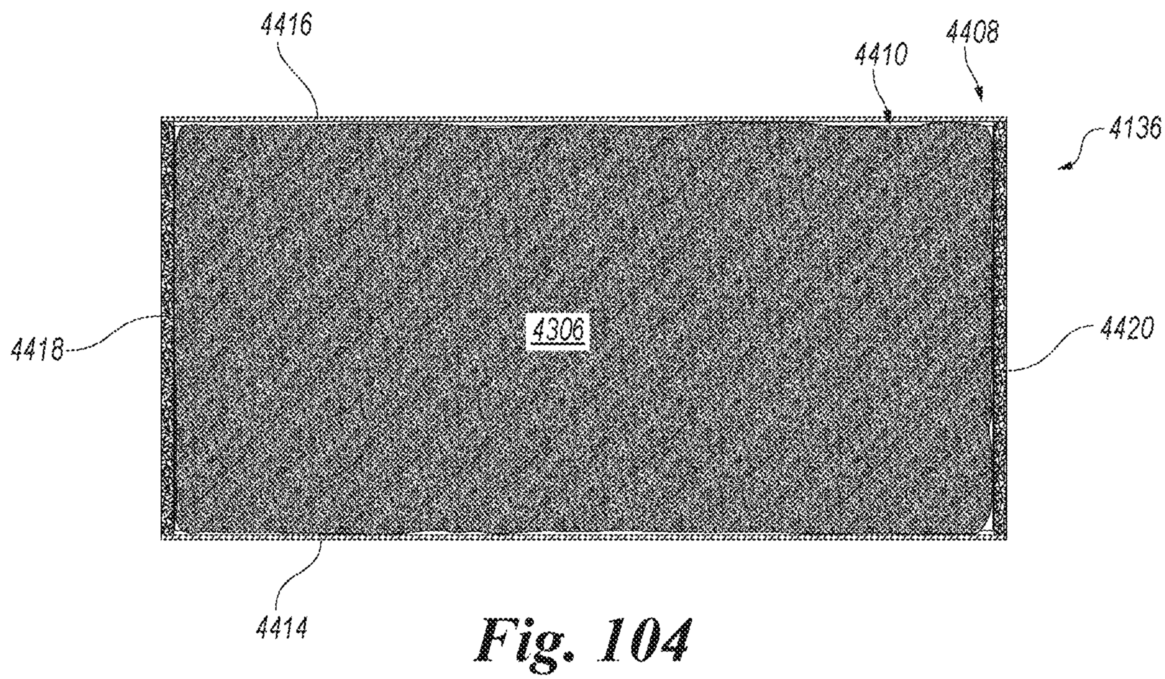
FIG. 104 is a cross-sectional top plan view of the wall component of the exterior enclosure of the real estate unit shown in FIG. 91 taken along the line 104-104 in FIG. 103.
Figure 105:
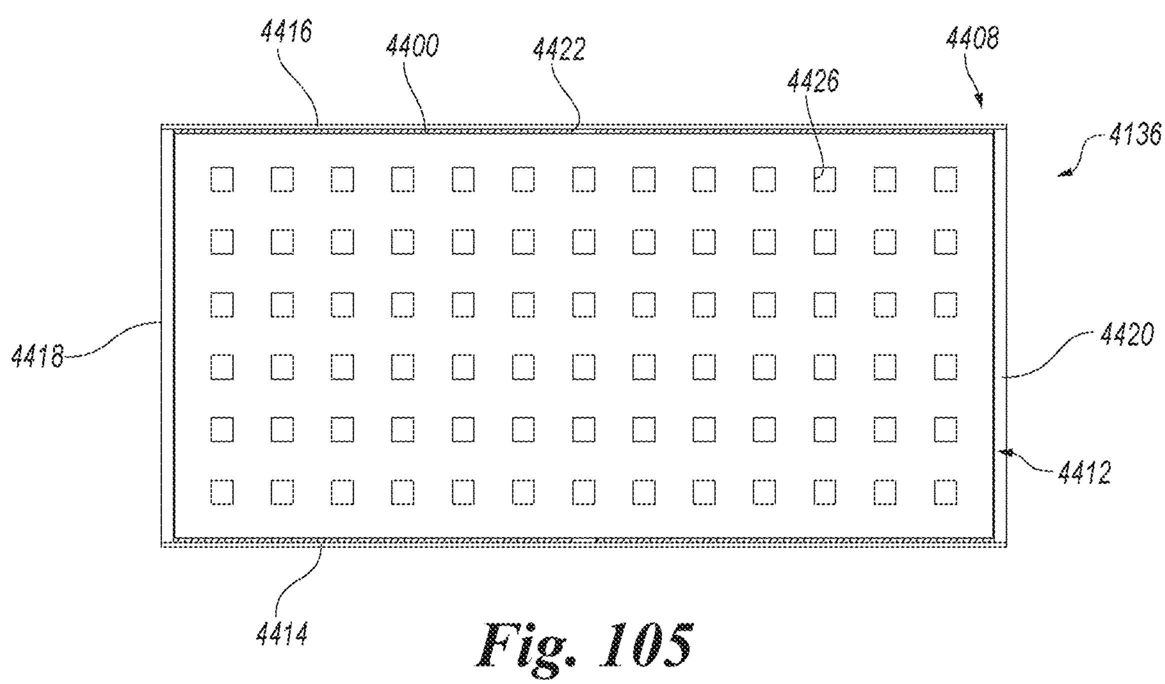
FIG. 105 is a cross-sectional bottom plan view of the wall component of the exterior enclosure of the real estate unit shown in FIG. 91 taken along the line 105-105 in FIG. 103.
Figure 106:
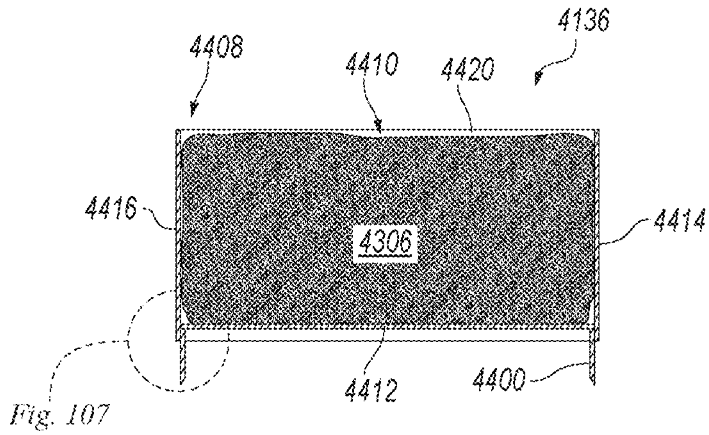
FIG. 106 is a cross-sectional end plan view of the wall component of the exterior enclosure of the real estate unit shown in FIG. 91 taken along the line 106-106 in FIG. 103.
Figure 107:
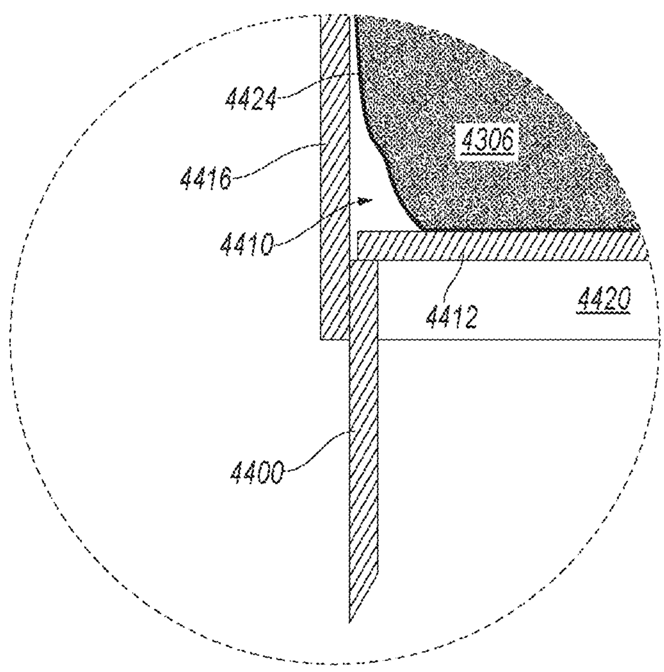
FIG. 107 is an enlarged view of a portion of FIG. 106.

FIG. 103 is side profile view of a given one of the wall components 4136. FIG. 104 is a cross-sectional top plan view of the given wall component 4136 taken along the line 104-104 in FIG. 103. FIG. 105 is a cross-sectional bottom plan view of the given wall component 4136 taken along the line 105-105 in FIG. 103. FIG. 106 is a cross-sectional end plan view of the given wall component 4136 taken along the line 106-106 in FIG. 103. FIG. 107 is an enlarged view of a portion of FIG. 106. The given wall component 4136 is of the large rectangular type. In at least some embodiments, other (e.g., most or all) of the wall components 4136 of the large rectangular type within the exterior enclosure 4135 at least substantially match the given wall component 4136. Furthermore, wall component 4136 of other types (e.g., small rectangular, large L-shaped, small L-shaped, etc.) can have the same or similar features as the features of the given wall component 4136. With reference to FIGS. 103-107 together, the given wall component 4136 can include a rigid shell 4408, a package 4410 removably disposed within the shell 4408, and a rigid plate 4412 also removably disposed within the shell 4408. The package 4410 can contain the planting medium 4306 in a tidy form. The plate 4412 can support the package 4410.

In at least some embodiments, the shell 4408 is collapsible from an expanded state to a compact (e.g., at least partially flattened) state. For example, at corners where the first and second side panels 4414, 4416 and the first and second end panels 4418, 4420 meet, the given wall component 4136 can include hinges (not shown), such as flexure bearings or piano hinges, that allow each corner to fold in a direction that causes the first and second side panels 4414, 4416 and the first and second end panels 4418, 4420 to at least partially flatten. This feature can facilitate efficient storage and transport of the shell 4408 before and/or after its deployment at the real estate unit 4126. In at least some embodiments, the plate 4412 helps to hold the shell 4408 in the expanded state. As shown in FIG. 107, a lowermost portion of the first side panel 4414 can overlap an uppermost portion of one the flanges 4400. The plate 4412 can rest on upper edges of the flanges 4400.

The shell 4408 can include a first side panel 4414 and an opposite second side panel 4416 parallel to and spaced apart from the first side panel 4414. Similarly, the given wall component 4136 can include a first end panel 4418 and an opposite second end panel 4420 parallel to and spaced apart from the first end panel 4418. The first and second side panels 4414, 4416 and the first and second end panels 4418, 4420 can define an interior region of the given wall component 4136 shaped, for example, as a rectangular solid. The apertures 4402 can extend through the shell 4408 at the first and second side panels 4414, 4416. Alternatively, the apertures 4402 can extend through the shell 4408 at only the first side panel 4414 or at only the second side panel 4416 if the vegetation 4140 is only desired at one or the other of the interior and exterior sides of the exterior enclosure 4135.

The given wall component 4136 can include two of the flanges 4400 at the first side panel 4414 and another two of the flanges 4400 at the second side panel 4416. As shown in FIG. 106, the flanges 4400 can be parallel to and inset relative to the corresponding first and second side panels 4414, 4416. Between the flanges 4400 at the first side panel 4414 and between the flanges 4400 at the second side panel 4416, the given wall component 4136 can include respective slots 4422. When the given wall component 4136 is assembled with other wall components 4136 of the large rectangular type within the exterior enclosure 4135, one of the flanges 4400 at the first side panel 4414 and an opposing one of the flanges 4400 at the second side panel 4416 can be received within the interior region of a first neighboring lower wall component 4136. Similarly, the other of the flanges 4400 at the first side panel 4414 and the other of the flanges 4400 at the second side panel 4416 can be received within the interior region of a second neighboring lower wall component 4136 adjacent to the first neighboring lower wall component 4136. The second end panel 4420 of the first neighboring lower wall component 4136 and the first end panel 4418 of the second neighboring lower wall component 4136 can be directly adjacent to one another and received within the slots 4422 of the given wall component 4136. This interaction between the wall components 4136 can facilitate convenient assembly of the exterior enclosure 4135 with neighboring rows of the wall components 4136 evenly staggered.

In the illustrated embodiment, the first and second side panels 4414, 4416 are thinner than the first and second end panels 4418, 4420 and made of a different material. For example, the first and second side panels 4414, 4416 can be metal (e.g., iron) and the first and second end panels 4418, 4420 can be cementitious (e.g., fiber-reinforced cement). The metal composition of the first and second side panels 4414, 4416 can be useful, for example, for aesthetics, to facilitate magnetic coupling of fixtures and accessories to the exterior enclosure 4135, and/or for other reasons. The cementitious composition of the first and second end panels 4418, 4420 can be useful, for example, to reduce noise transmission through the exterior enclosure 4135, for cost savings, and/or for other reasons. In other embodiments, the first and second side panels 4414, 4416 and the first and second end panels 4418, 4420 can have other suitable compositions. The package 4410 can be reusable and/or compostable. Furthermore, the package 4410 can be configured to remain at least substantially intact for convenient reuse and/or composting upon disassembly of the exterior enclosure 4135. In at least some embodiments, the package 4410 includes a biodegradable skin 4424 that contains the planting medium 4306. When the exterior enclosure 4135 is assembled, the skin 4424 can be punctured via the apertures 4402. Suitable materials for the skin 4424 include burlap and cotton, among others. As shown in FIG. 105, the plate 4412 can include perforations 4426 through which water can flow by gravity from one wall component 4136 to a neighboring lower wall component 4136 (or base block 4304).

FIGS. 108, 109, 110 and 111 are, respectively, a first side profile view, an opposite second side profile view, a first end profile view, and an opposite second end profile view of the bathroom 4127. With reference to FIGS. 108-111 together, the bathroom 4127 can include a rectangular floor module 4500, a rectangular ceiling module 4502 vertically spaced apart from the floor module 4500, and a plurality of wall modules 4504 (individually identified as wall modules 4504*a*-4504*d*) removably connected to the floor and ceiling modules 4500, 4502 at respective perimeter portions of the floor and ceiling modules 4500, 4502. The bathroom 4127 can further include a lower gasket 4506 disposed between the perimeter portion of the floor module 4500 and the wall modules 4504, and an upper gasket 4508 disposed between the perimeter portion of the ceiling module 4502 and the wall modules 4504. The floor module 4500 can include upwardly extending tabs 4510 through which the floor module 4500 is secured to the wall modules 4504. Similarly, the ceiling module 4502 can include downwardly extending tabs 4512 through which the ceiling module 4502 is secured to the wall modules 4504. The wall modules 4504*c*, 4504*d* can include vertical flanges 4514 at which the wall modules 4504*c*, 4504*d* are secured to the wall modules 4504*a*, 4504*b*. The bathroom 4127 can include bolts 4516 and associated nuts 4518 at the upwardly extending tabs 4510, the downwardly extending tabs 4512, and the vertical flanges 4514.

At the wall module 4504*a* (FIG. 110), the bathroom 4127 can include a doorway opening 4520, a frame 4522 extending around the doorway opening 4520, and a door 4524 disposed within the doorway opening 4520 and hingedly connected to the frame 4522. The bathroom 4127 can further include a handle 4526 and hinges 4528 operably associated with the door 4524. At the wall module 4504*c* (FIG. 108), the bathroom 4127 can include a plumbing ventilation hookup 4530 and an exhaust hookup 4532. The plumbing ventilation hookup 4530 and the exhaust hookup 4532 can be configured for convenient connection to and disconnection from the plumbing ventilation line 4188 and the exhaust line 4190 (FIG. 91), respectively, such as via quick release couplings (not shown). The wall modules 4504*c*, 4504*d* can extend between the wall modules 4504*a*, 4504*b* at opposite sides of the bathroom 4127. As discussed above, the bathroom 4127 can be configured to be elevated above a floor surface of the interior region 4114. For this purpose and/or another suitable purpose, the floor module 4500 can include feet 4533. In at least some embodiments, a gap between the feet 4533 is large enough to allow the bathroom 4127, when fully assembled, to be conveniently moved by forklift. At the ceiling module 4502, the bathroom 4127 can include skylights 4534 that allow ambient light within the interior region 4114 to enter an interior of the bathroom 4127.

At a side of the floor module 4500 below the wall module 4504*c*, the bathroom 4127 can include a blackwater drain hookup 4535, a main cold water supply hookup 4536, and a main hot water supply hookup 4538. At an end of the floor module 4500 below the wall module 4504*a*, the bathroom 4127 can include a main electrical hookup 4540 and a main greywater drain hookup 4541. The blackwater drain hookup 4535, the main cold water supply hookup 4536, the main hot water supply hookup 4538, the main electrical hookup 4540, and the main greywater drain hookup 4541 can be configured for convenient connection to and disconnection from the blackwater drain line 4180, the cold water supply line 4182, the hot water supply line 4184, the electrical line 4178, and the greywater drain line 4186, respectively, such as via quick release couplings (not shown). At a side of the floor module 4500 below the wall module 4504*d*, the bathroom 4127 can include an auxiliary greywater drain hookup 4542, an auxiliary cold water supply hookup 4544, an auxiliary hot water supply hookup 4546, and an auxiliary electrical hookup 4548. The auxiliary greywater drain hookup 4542, the auxiliary cold water supply hookup 4544, the auxiliary hot water supply hookup 4546, and the auxiliary electrical hookup 4548 can be configured for convenient connection to and disconnection from corresponding lines (not shown) of the kitchenette 4250, such as via quick release couplings (not shown).

Figure 108:
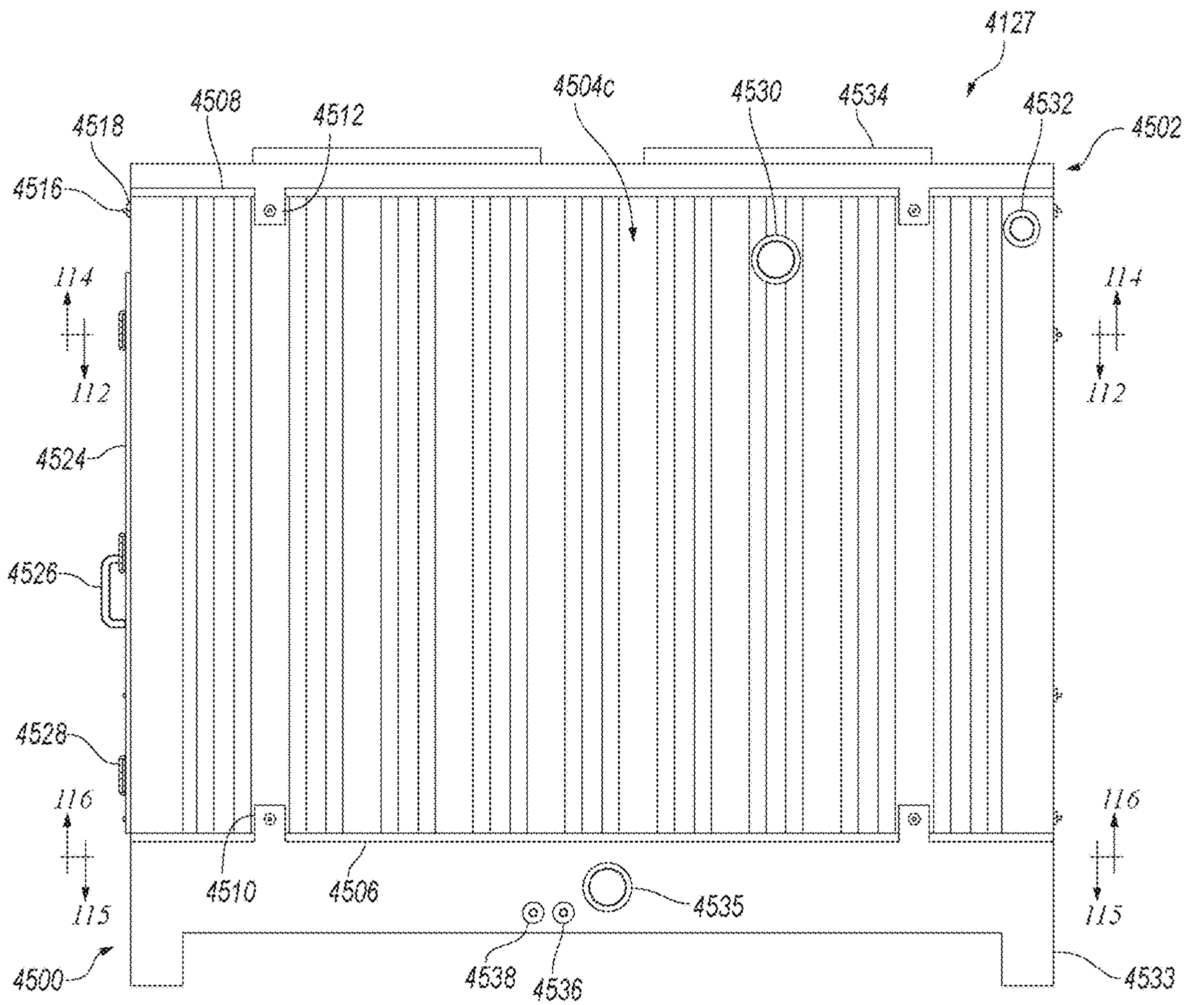
FIGS. 108, 109, 110 and 111 are, respectively, a first side profile view, an opposite second side profile view, a first end profile view, and an opposite second end profile view of a bathroom of the real estate unit shown in FIG. 91.
Figure 109:
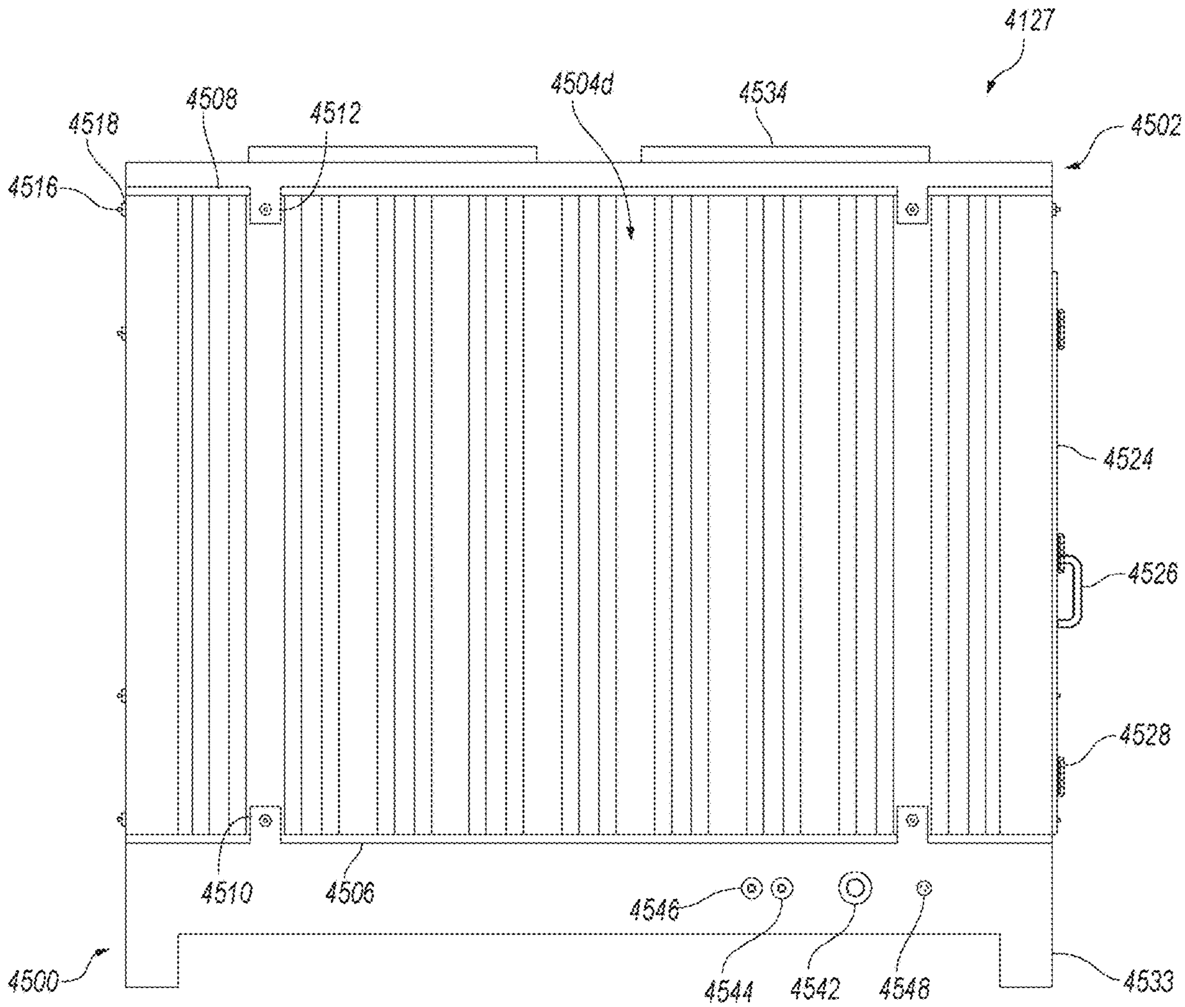
Figure 110:
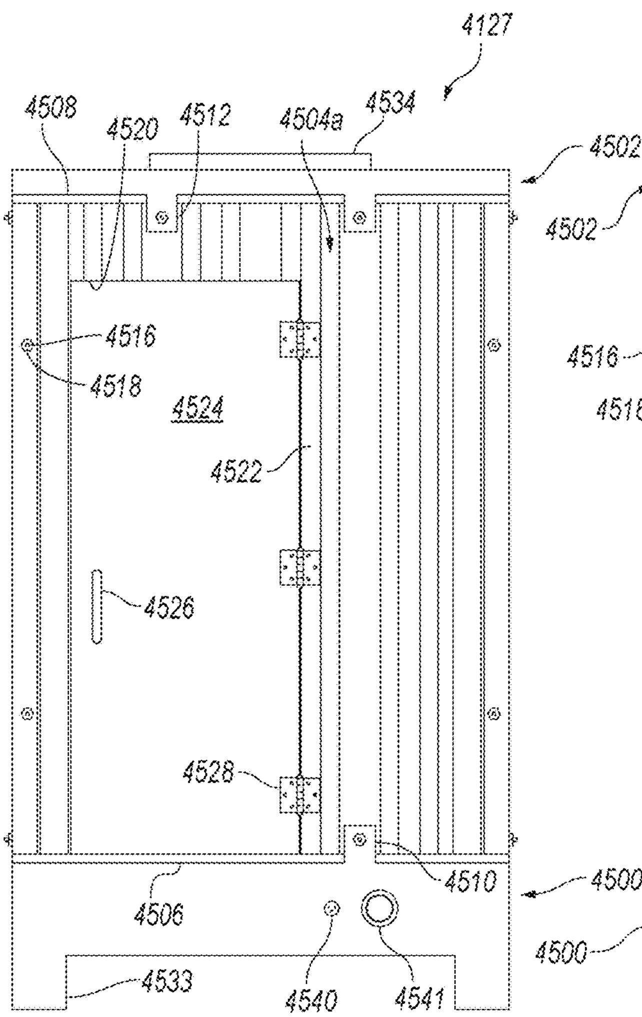
Figure 111:
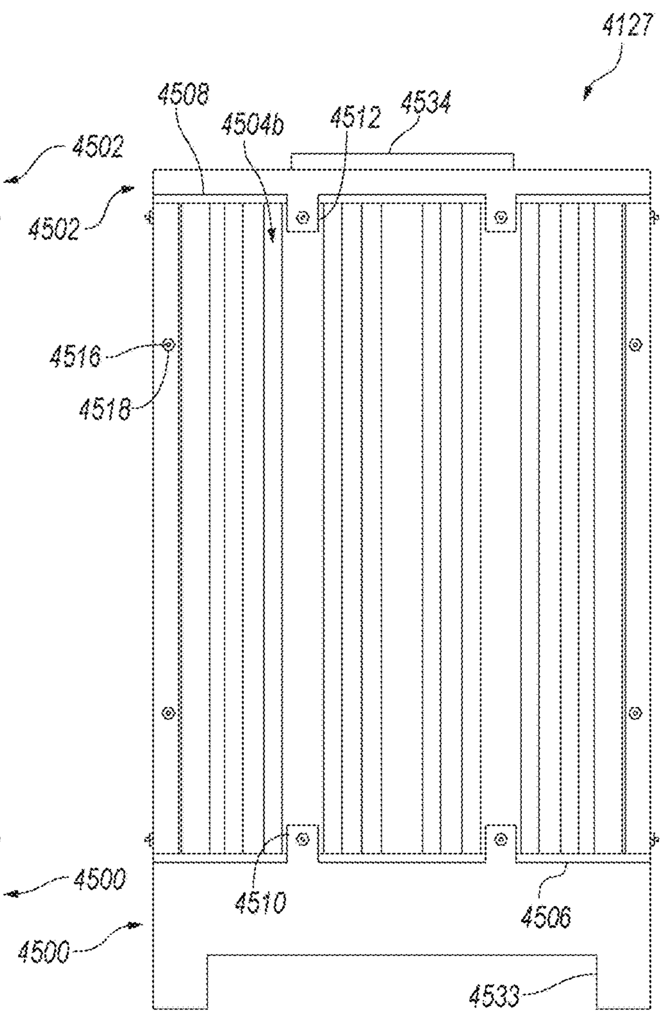
Figure 112:
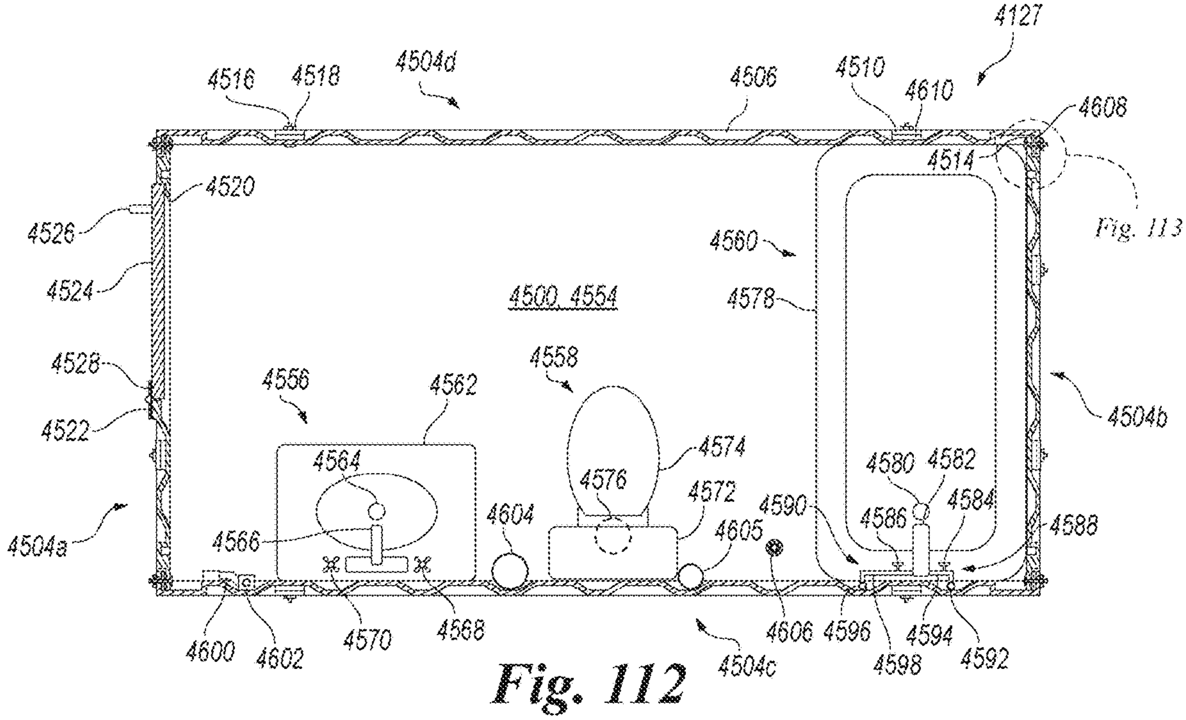
FIG. 112 is a cross-sectional top plan view of the bathroom of the real estate unit shown in FIG. 91 taken along the line 112-112 in FIG. 108.

FIG. 112 is a cross-sectional top plan view of the bathroom 4127 taken along the line 112-112 in FIG. 108. As shown in FIG. 112, the floor module 4500 can include a deck 4554, and the bathroom 4127 can include a sink 4556, a toilet 4558, and a bathtub/shower 4560 disposed (e.g., removably disposed) on the deck 4554. The sink 4556 can include a basin 4562, a sink drain 4564, a sink faucet 4566, a sink hot water knob 4568, and a sink cold water knob 4570 operably connected to one another. The toilet 4558 can include a tank 4572, a bowl 4574, and a toilet drain 4576 operably connected to one another. The bathtub/shower 4560 can include a tub 4578, a bathtub/shower drain 4580, a tub faucet 4582, a tub cold water knob 4584, a tub hot water knob 4586, a cold water conduit 4588, and a hot water conduit 4590 operably connected to one another. The cold water conduit 4588 can include a riser 4592 and a first branch 4594 extending between the riser 4592 and the tub faucet 4582. The tub cold water knob 4584 can be disposed along the first branch 4594 and operable to control a flow of cold water from the cold water conduit 4588 to the tub faucet 4582. Similarly, the hot water conduit 4590 can include a riser 4596 and a first branch 4598 extending between the riser 4596 and the tub faucet 4582. The tub hot water knob 4586 can be disposed along the first branch 4598 and operable to control a flow of hot water from the hot water conduit 4590 to the tub faucet 4582.

Figure 113:
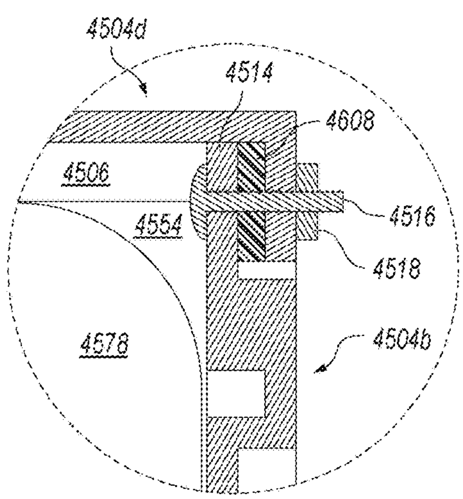
FIG. 113 is an enlarged view of a portion of FIG. 112.

The bathroom 4127 can include an electrical conduit 4600, and a junction box 4602 operably connected to the electrical conduit 4600. The bathroom 4127 can further include a first plumbing ventilation conduit 4604 disposed between the sink 4556 and the toilet 4558, and a second plumbing ventilation conduit 4605 disposed between the sink 4556 and the bathtub/shower 4560. The first and second plumbing ventilation conduits 4604, 4605 can be configured to ventilate blackwater and greywater plumbing, respectively. The bathroom 4127 can still further include a floor drain 4606 disposed between the toilet 4558 and the bathtub/shower 4560. FIG. 113 is an enlarged view of a portion of FIG. 112. With reference to FIGS. 112 and 113 together, the bathroom 4127 can include vertical gaskets 4608 disposed between the respective vertical flanges 4514 and corresponding portions of the wall modules 4504*a*, 4504*b*. Similarly, the bathroom 4127 can include lower tab gaskets 4610 disposed between the respective upwardly extending tabs 4510 and corresponding portions of the wall modules 4504.

Figure 114:
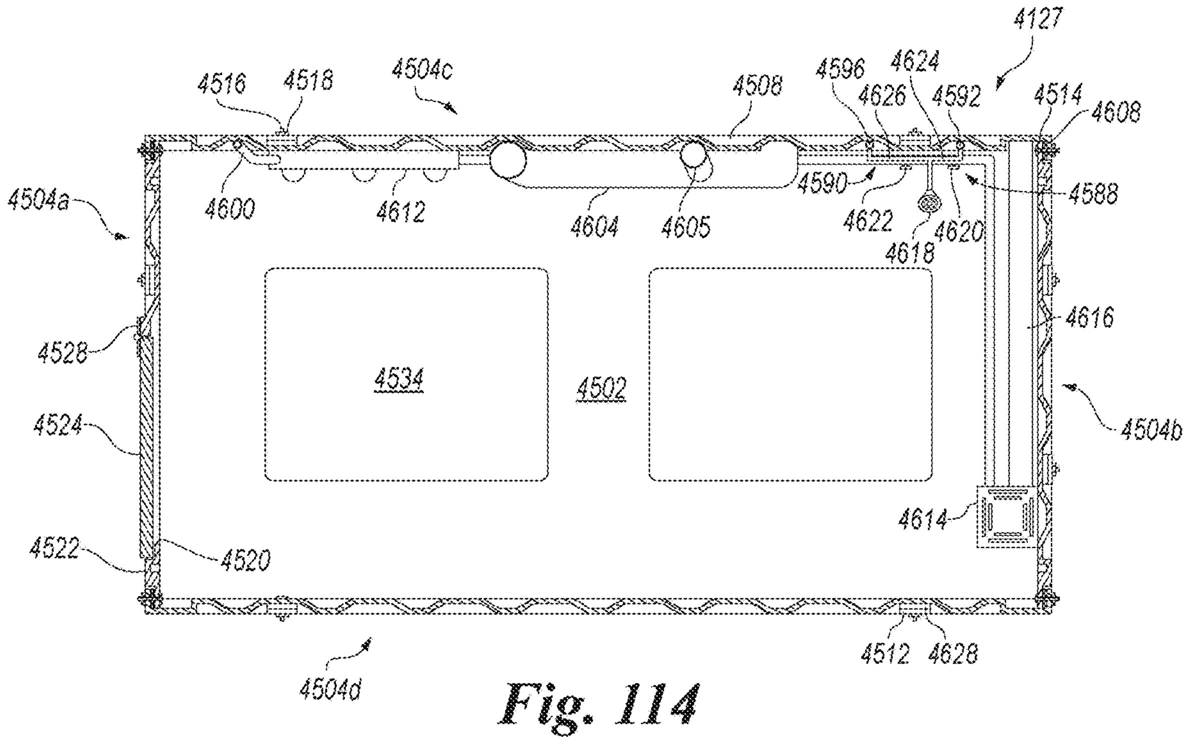
FIG. 114 is a cross-sectional bottom plan view of the bathroom of the real estate unit shown in FIG. 91 taken along the line 114-114 in FIG. 108.

FIG. 114 is a cross-sectional bottom plan view of the bathroom 4127 taken along the line 114-114 in FIG. 108. As shown in FIG. 114, the bathroom 4127 can include a light fixture 4612 attached to the wall module 4504*c* above the sink 4556. The bathroom 4127 can further include an exhaust intake fan 4614 attached to the ceiling module 4502. The electrical conduit 4600 can extend from the junction box 4602 (FIG. 112) to the light fixture 4612, and from the light fixture 4612 to the exhaust intake fan 4614. The first and second plumbing ventilation conduits 4604, 4605 can merge and extend along an inner corner between the ceiling module 4502 and the wall module 4504*c* to the plumbing ventilation hookup 4530 (FIG. 108). The bathroom 4127 can include an exhaust conduit 4616 extending from the exhaust intake fan 4614 along an inner corner between the ceiling module 4502 and the wall module 4504*b* to the exhaust hookup 4532 (FIG. 108). Above one end of the tub 4578 (FIG. 112), the bathtub/shower 4560 (FIG. 112) can include a showerhead 4618, a shower cold water knob 4620 operably connected to the cold water conduit 4588, and a shower hot water knob 4622 operably connected to the hot water conduit 4590. The cold water conduit 4588 can include a second branch 4624 extending between the riser 4592 and the showerhead 4618. The shower cold water knob 4620 can be disposed along the second branch 4624 and operable to control a flow of cold water from the cold water conduit 4588 to the showerhead 4618. Similarly, the hot water conduit 4590 can include a second branch 4626 extending between the riser 4596 and the showerhead 4618. The shower hot water knob 4622 can be disposed along the second branch 4626 and operable to control a flow of hot water from the hot water conduit 4590 to the showerhead 4618. The bathroom 4127 can include upper tab gaskets 4628 disposed between the respective downwardly extending tabs 4512 and corresponding portions of the wall modules 4504.

Figure 115:
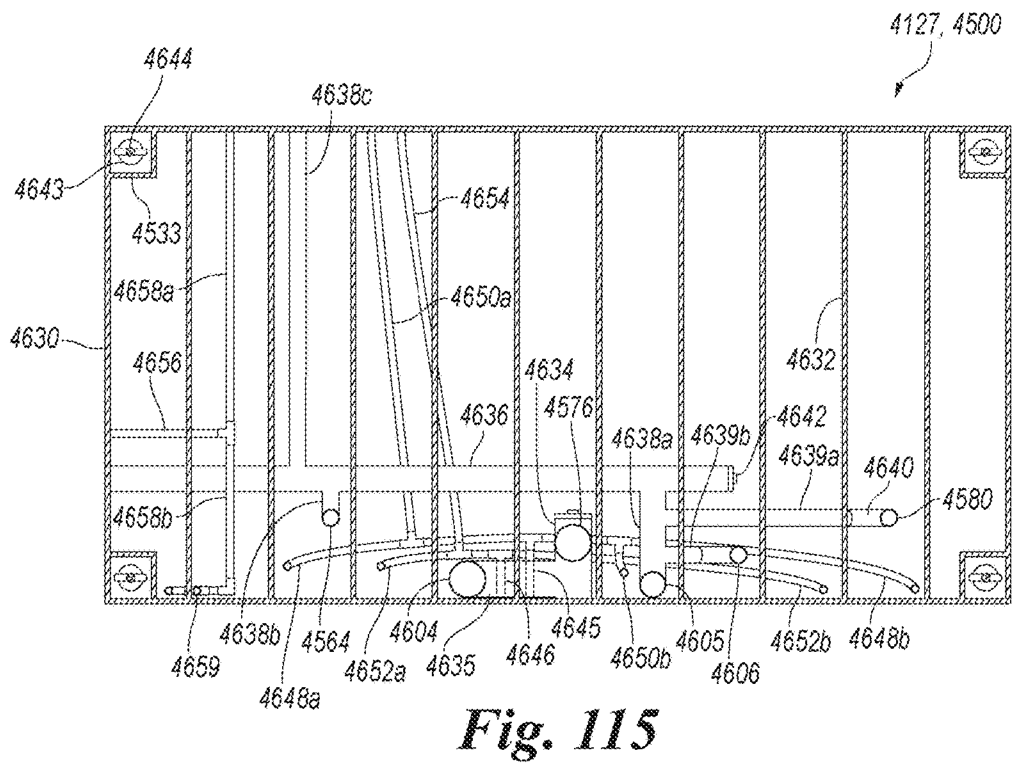
FIG. 115 is a cross-sectional top plan view of the bathroom of the real estate unit shown in FIG. 91 taken along the line 115-115 in FIG. 108.

FIG. 115 is a cross-sectional top plan view of the bathroom 4127 taken along the line 115-115 in FIG. 108. With reference to FIGS. 91 and 108-115 together, the floor module 4500 can include a skirt 4630 and a series of parallel spaced-apart joists 4632 within the skirt 4630. The bathroom 4127 can include a blackwater drain conduit 4634 operably connected to the blackwater drain hookup 4535 and the toilet drain 4576. Thus, the toilet 4558 can be operably connected to the blackwater tank 4148 via the blackwater drain conduit 4634 and the blackwater drain line 4180. The blackwater drain conduit 4634 can include a branch 4635 operably connected to the first plumbing ventilation conduit 4604. The bathroom 4127 can further include a greywater drain conduit 4636 operably connected to the main greywater drain hookup 4541. The greywater drain conduit 4636 can include branches 4638 (individually identified as branches 4638*a*-4638*c*) operably connected to the second plumbing ventilation conduit 4605, the sink drain 4564, and the auxiliary greywater drain hookup 4542, respectively. The greywater drain conduit 4636 can further include sub-branches 4639 (individually identified as sub-branches 4639*a*, 4639*b*) operably connected to the bathtub/shower drain 4580 and the floor drain 4606, respectively. Thus, the bathtub/shower drain 4580 can be operably connected to the greywater filter 4154 via the greywater drain conduit 4636 and the greywater drain line 4186. The sub-branches 4639*c*, 4639*b* of the greywater drain conduit 4636 can include respective traps 4640. Furthermore, the blackwater drain conduit 4634 and the greywater drain conduit 4636 can include respective caps 4642, such as to facilitate clean-out.

The bathroom 4127 can include wheels 4643 (e.g., swivel casters) integrated into the floor module 4500. In the illustrated embodiment, the wheels 4643 are embedded within the feet 4533 and accessible via inwardly facing openings (not shown) of the feet 4533. The individual wheels 4643 can be movable between a retracted state and an extended state. For example, the bathroom 4127 can include posts 4644 having threads (not shown) that engage corresponding threads (not shown) of the wheels 4643 such that the wheels 4643 can be rotatably moved between the retracted and extended states. Moving the wheels 4643 from the retracted state to the extended state can lift the bathroom 4127 off a corresponding floor surface, thereby allowing the bathroom 4127 to be conveniently moved along the floor surface.

The bathroom 4127 can further include a main cold water conduit 4645 and a main hot water conduit 4646 operably connected to the main cold water supply hookup 4536 and the main hot water supply hookup 4538, respectively. The main cold water conduit 4645 can include branches 4648 (individually identified as branches 4648*a*, 4648*b*) operably connected to the sink 4556 and the bathtub/shower 4560 (via the riser 4592), respectively. The main cold water conduit 4645 can further include sub-branches 4650 (individually identified as sub-branches 4650*a*, 4650*b*) operably connected to the auxiliary cold water supply hookup 4544 and the toilet 4558, respectively. The main hot water conduit 4646 can include branches 4652 (individually identified as branches 4652*a*, 4652*b*) operably connected to the sink 4556 and the bathtub/shower 4560 (via the riser 4596), respectively. The main hot water conduit 4646 can further include a sub-branch 4654 operably connected to the auxiliary hot water supply hookup 4546. The bathroom 4127 can still further include a main electrical conduit 4656 operably connected to the main electrical hookup 4540. The main electrical conduit 4656 can include branches 4658 (individually identified as branches 4658*a*, 4658*b*) operably connected to the auxiliary electrical hookup 4548 and a floor heating system (introduced below). The main electrical conduit 4656 can further include a sub-branch 4659 operably connected to the electrical conduit 4600.

Figure 116:
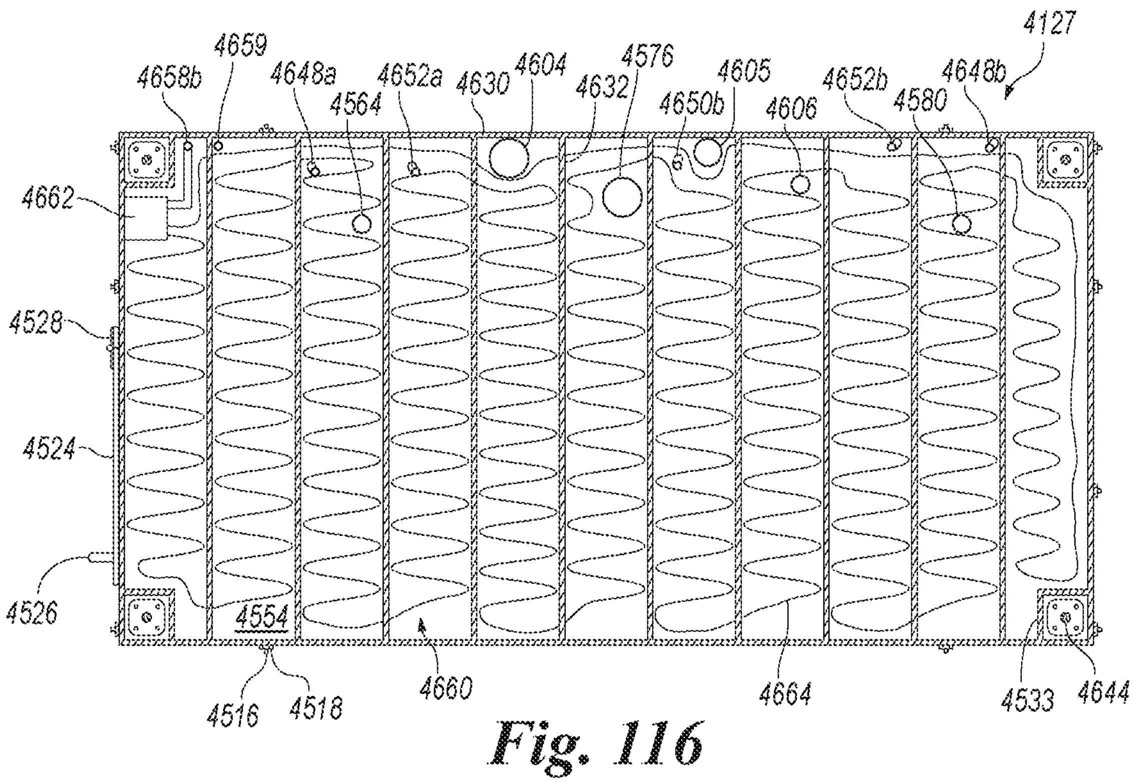
FIG. 116 is a cross-sectional bottom plan view of the bathroom of the real estate unit shown in FIG. 91 taken along the line 116-116 in FIG. 108.

FIG. 116 is a cross-sectional bottom plan view of the bathroom 4127 taken along the line 116-116 in FIG. 108. As shown in FIG. 116, the bathroom 4127 can include a floor heating system 4660 operably associated with the deck 4554. The floor heating system 4660 can include a control box 4662 operably connected to the branch 4658*b* of the main electrical conduit 4656, and a heating cable 4664 operably connected to the control box 4662. The heating cable 4664 can have a serpentine configuration and be directly connected to an underside of the deck 4554 between the joists 4632. With reference to FIGS. 108-116 together, the floor drain 4606, the blackwater drain conduit 4634 (e.g., including its branch 4635), the greywater drain conduit 4636 (e.g., including its branches 4638 and sub-branches 4639), the main cold water conduit 4645 (e.g., including its branches 4648 and sub-branches 4650), the main hot water conduit 4646 (e.g., including its branches 4652 and sub-branch 4654), the main electrical conduit 4656 (e.g., including its branches 4658 and sub-branch 4659), the floor heating system 4660, and/or other suitable components of the bathroom 4127 can be pre-installed components of the floor module 4500. Similarly, the supply plumbing for the bathtub/shower 4560 (e.g., including the tub faucet 4582, the cold water conduit 4588, the hot water conduit 4590, and the showerhead 4618), the light fixture 4612, and/or other suitable components of the bathroom 4127 can be pre-installed components of the wall module 4504*c*. These and/or other aspects of the bathroom 4127 can facilitate rapid deployment, removal, and redeployment of the bathroom 4127.

Figure 117:
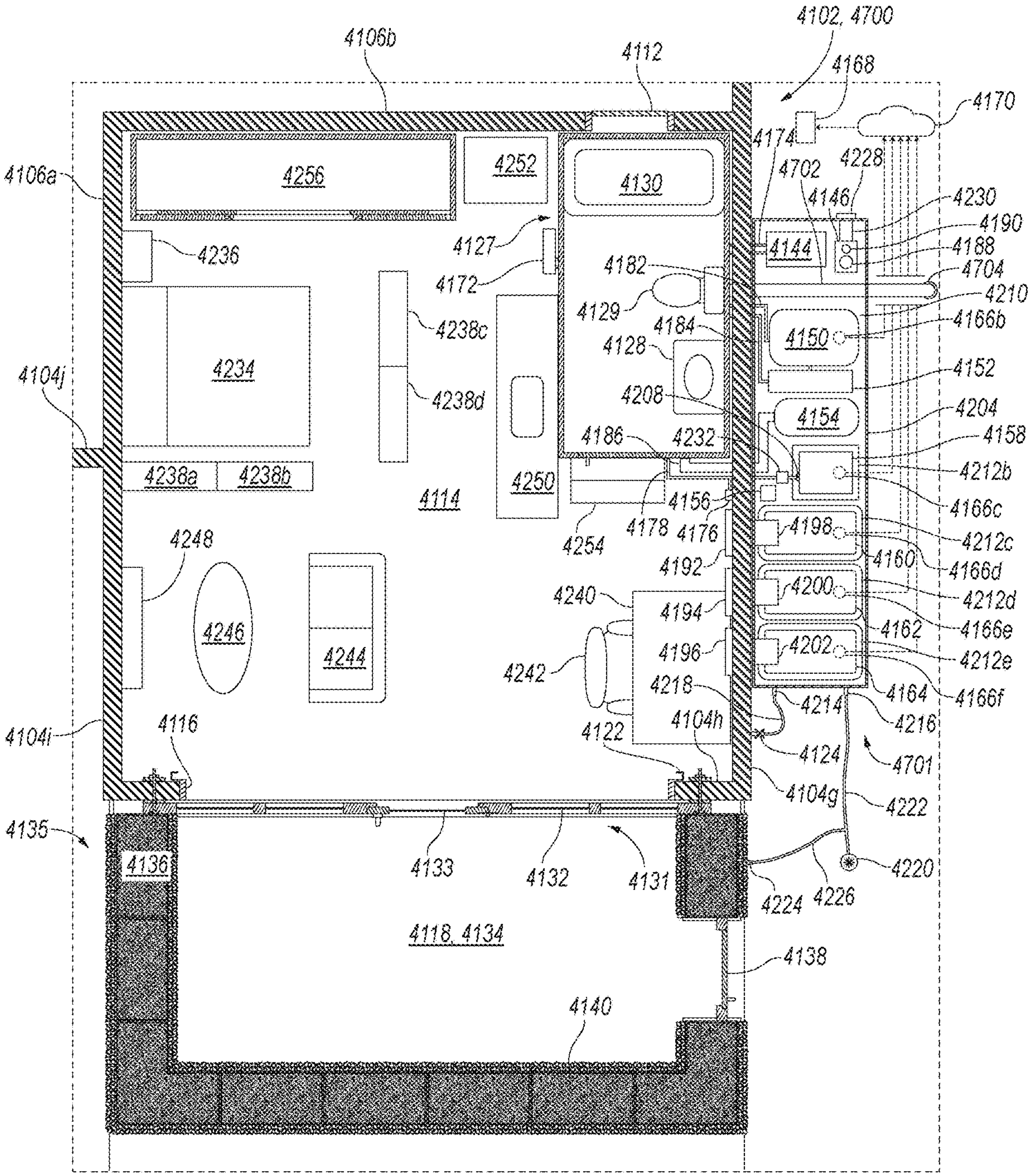
FIG. 117 is a cross-sectional top plan view corresponding to the portion of FIG. 89 shown in FIG. 90 and showing a real estate unit in accordance with another embodiment of the present technology including the interior region of the garage of the single-family house shown in FIG. 88 with the garage in the second state.

FIG. 117 is a cross-sectional top plan view corresponding to the portion of FIG. 89 shown in FIG. 90 and showing a real estate unit 4700 in accordance with another embodiment of the present technology including the interior region 4114 in the second state. The real estate unit 4700 can include a dock 4701 that does not include the blackwater tank 4148 (FIG. 91) and the blackwater drain line 4180 (FIG. 91) of the real estate unit 4126 (FIG. 91). Instead of these components, the real estate unit 4700 can include a blackwater drain line 4702 extending between the bathroom 4127 and an outdoor sewage hookup 4704. The blackwater drain line 4702 can extend through the exterior wall 4104*g* from the bathroom 4127 toward the sewage hookup 4704. Furthermore, the blackwater drain line 4702 can extend above-floor and then above-ground from the bathroom 4127 toward the sewage hookup 4704.

The sewage hookup 4702 can be a retrofitted access point to a municipal, septic, or other permanent sewage system serving the house 4100 (FIG. 88). In at least some cases, the blackwater drain line 4180 connects to the sewage hookup 4702 via a quick-connect coupling (not shown). In the illustrated embodiment, the real estate unit 4700 (like the real estate unit 4126 (FIG. 91)) is configured to recycle greywater. In other embodiments, a counterpart of the real estate unit 4700 can be configured to dispose of greywater with blackwater via the sewage hookup 4702. For example, a counterpart of the bathroom 4127 can be alternatively configured so that a counterpart of the greywater drain conduit 4636 (FIG. 115) is combined with a counterpart of the blackwater drain conduit 4634 (FIG. 115). In these and other embodiments, the exterior enclosure 4135 can be configured to receive water from the hose bibb 4124 and/or configured to receive water in another suitable manner.

In another embodiment, a counterpart of the real estate unit 4126 (FIG. 91) is operably associated with components that reduce or eliminate the need for frequent servicing and/or connections to permanent utilities serving the house 4100 (FIG. 88). For example, the counterpart of the real estate unit 4126 (FIG. 91) can be operably associated with a high-capacity sewage detention reservoir (not shown) disposed (e.g., removably disposed) outside the interior region 4114, a high-capacity cold water reservoir (not shown) disposed (e.g., removably disposed) outside the interior region 4114, and/or a high-capacity generator (not shown) disposed (e.g., removably disposed) outside the interior region 4114. The high-capacity sewage detention reservoir can be configured for occasional evacuation into a mobile tanker (e.g., a septic system pump truck). Similarly, the high-capacity cold water reservoir can be configured for occasional replenishment from a mobile tanker (e.g., a water supply truck). In these embodiments, with reference to FIG. 91, a counterpart of the dock 4142 can be without the blackwater tank 4148, the water reservoir 4150, the grey-water filter 4154, and/or the battery 4158.

Figure 118:
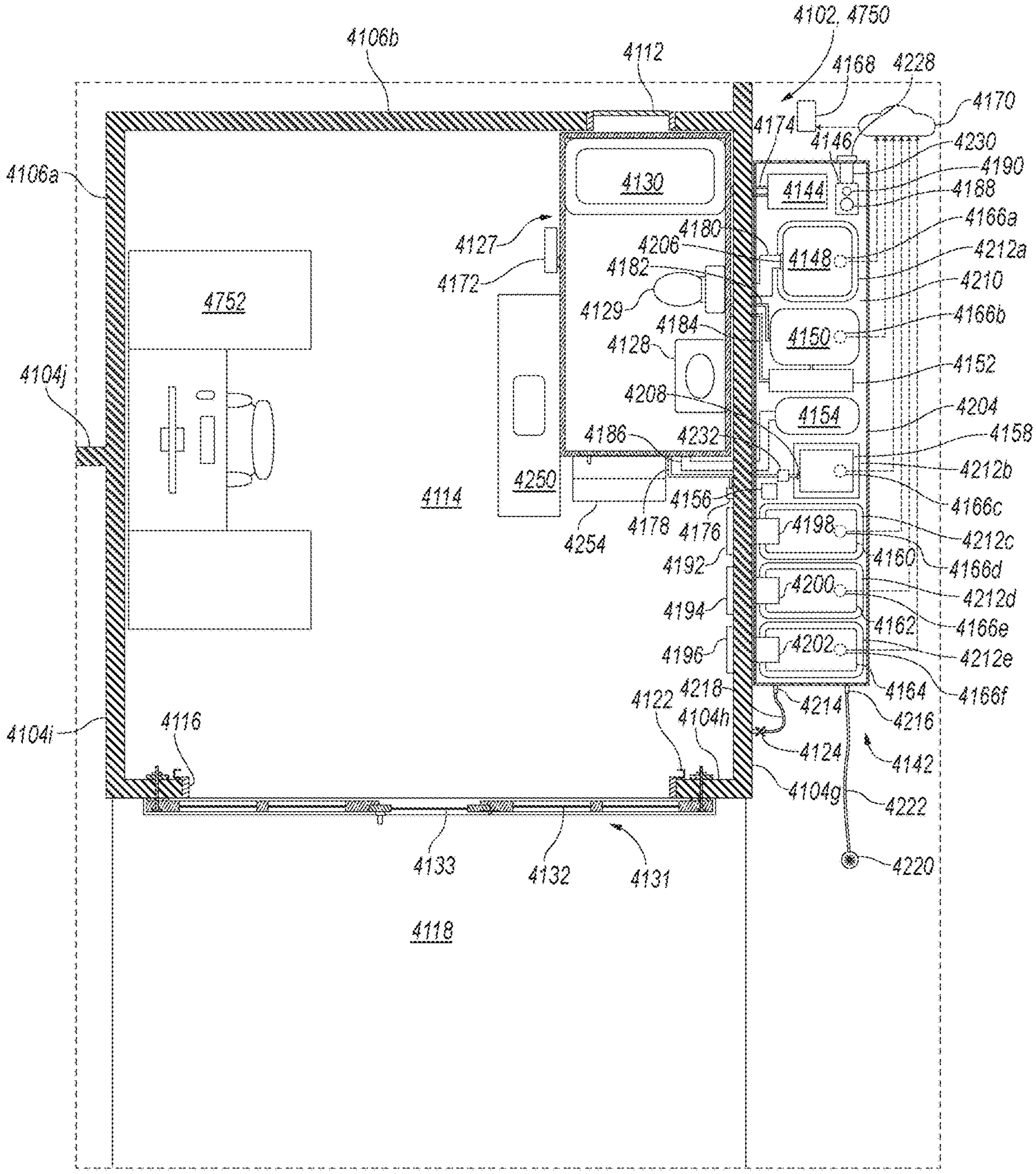
FIG. 118 is a cross-sectional top plan view corresponding to the portion of FIG. 89 shown in FIG. 90 and showing a real estate unit in accordance with another embodiment of the present technology including the interior region of the garage of the single-family house shown in FIG. 88 with the garage in the second state.

In the embodiments illustrated in FIGS. 91 and 117, the real estate units 4126, 4700 are configured at least primarily as lodging and/or residential units. In other embodiments, a counterpart of the real estate units 4126, 4700 can have another suitable primary use. For example, the counterpart of the real estate units 4126, 4700 can be a rentable office unit, a rentable assembly unit, and/or a rentable unit of another suitable type. For example, FIG. 118 is a cross-sectional top plan view corresponding to the portion of FIG. 89 shown in FIG. 90 and showing a real estate unit 4750 in accordance with another embodiment of the present technology including the interior region 4114 in the second state. The real estate unit 4750 can be configured at least primarily as a rentable office unit. The real estate unit 4750 can include office furnishings, such as a workstation 4752 removably disposed within the interior region 4114. Because privacy tends to be less important for office uses than for lodging and residential uses and/or for other reasons, the real estate unit 4750 can be without the exterior enclosure 4135 (FIG. 91). Alternatively, a counterpart of the real estate unit 4750 can include the exterior enclosure 4135 (FIG. 91) or a comparable structure.

Figure 119:
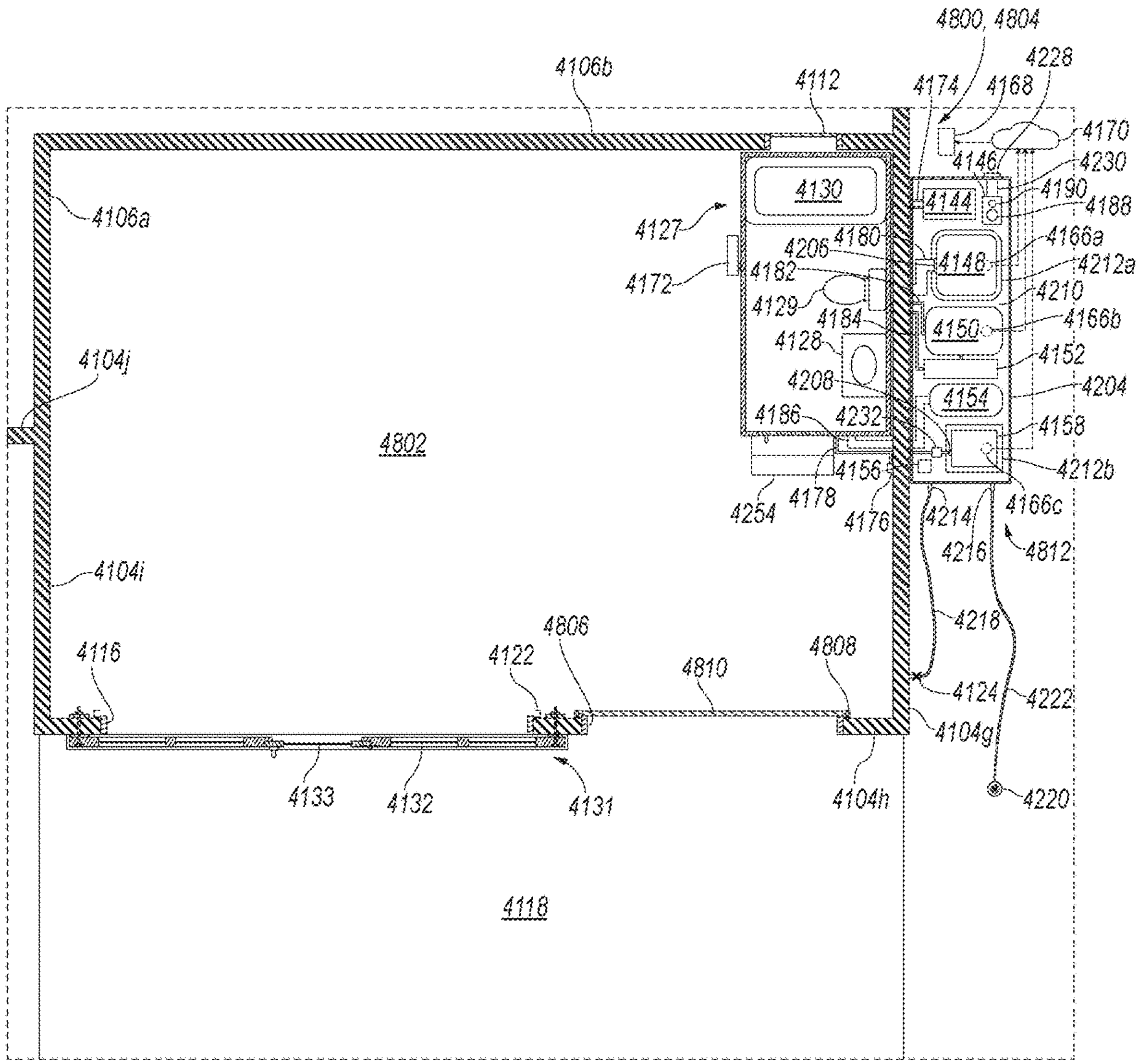
FIG. 119 is a cross-sectional top plan view of a real estate unit in accordance with another embodiment of the present technology including an interior region of a three-car garage in the second state.

FIG. 119 is a cross-sectional top plan view of a real estate unit 4800 in accordance with another embodiment of the present technology including an interior region 4802 of a three-car garage 4804 in the second state. The garage 4804 can include a secondary opening 4806 between the interior region 4114 and the outdoor area 4118. Like the opening 4116, the secondary opening 4806 can be sized to permit passage of a car between the interior region 4114 and the outdoor area 4118. For example, the secondary opening 4806 can have a width within a range from 2 meters to 4 meters. The garage 4804 can further include a secondary door track 4808 at the secondary opening 4806 and a secondary overhead door 4810 operably connected to the secondary door track 4808. In the illustrated embodiment, rather than being stowed in an open state, the secondary overhead door 4810 is stowed in a closed state when the garage 4804 is in the retrofitted state. In other embodiments, the secondary overhead door 4810 can be stowed in an open state or removed and a counterpart of the real estate unit 4800 can include a secondary barrier operably associated with the secondary opening 4806. The secondary barrier can have some or all of the features discussed above for the barrier 4131. In still other embodiments, the secondary overhead door 4810 can remain active (i.e., configured for frequent operation) in the real estate unit 4800 rather than being stowed. In still other embodiments, a counterpart of the barrier 4131 can overlie both the opening 4116 and the secondary opening 4806.

With reference again to FIG. 119, the real estate unit 4800 can be configured at least primarily as a rentable assembly unit. For example, the real estate unit 4800 can be configured to accommodate parties, classes, etc. Like the real estate unit 4750 (FIG. 118), the real estate unit 4800 can be without the exterior enclosure 4135 (FIG. 91). Alternatively, a counterpart of the real estate unit 4800 can include the exterior enclosure 4135 (FIG. 91) or a comparable structure. The real estate unit 4800 can include a dock 4812 that does not include the trash bin 4160 (FIG. 91), the recycling bin 4162 (FIG. 91), and the laundry bin 4164 (FIG. 91) of the real estate unit 4126 (FIG. 91), but is otherwise the same as or similar to the dock 4142 (FIG. 91).

Figure 120:
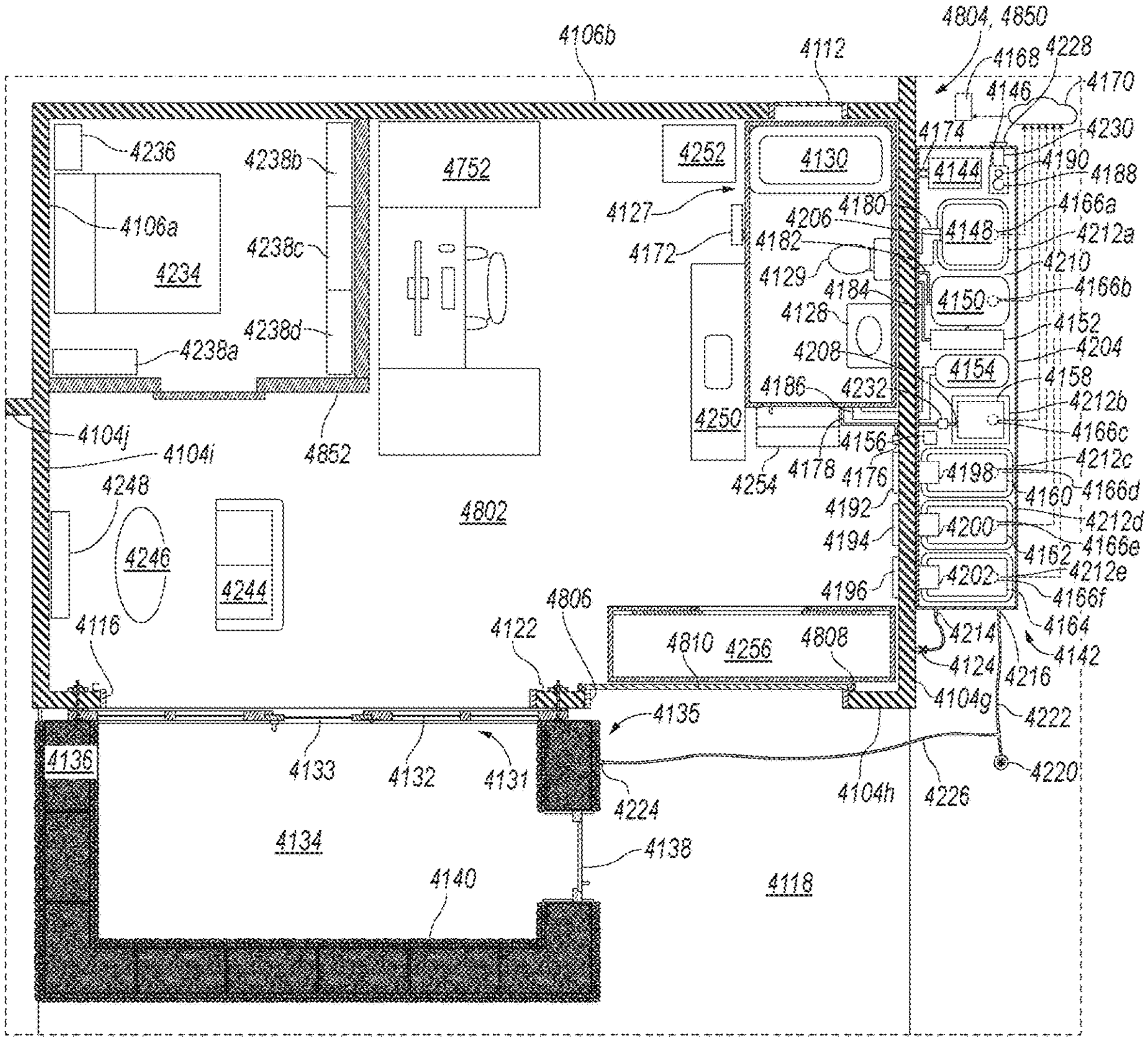
FIG. 120 is a cross-sectional top plan view of a real estate unit in accordance with another embodiment of the present technology including the interior region of the three-car garage in the second state.

FIG. 120 is a cross-sectional top plan view of a real estate unit 4850 in accordance with yet another embodiment of the present technology including the interior region 4802 in the second state. The real estate unit 4850 can be configured at least primarily as a combined lodging and rentable office unit. For example, the real estate unit 4850 can include both a workstation 4752 and a bed 4234. In the illustrated embodiment, the real estate unit 4850 further includes partitions 4852 that close off the bed 4234 during work hours. The partitions 4852 can be reusable and removably disposed within the interior region 4802 of the garage 4804. In other embodiments, the partitions 4852 can be omitted and the portion of the interior region 4802 including the bed 4234 can be open to other portions of the interior region 4802. In still other embodiments, the bed 4802 can be replaced with a sofa bed, a wall bed, or another type of convertible bed that readily transitions between a compact and/or hidden state when not in use and an expanded and/or exposed state when in use.

Figure 121:
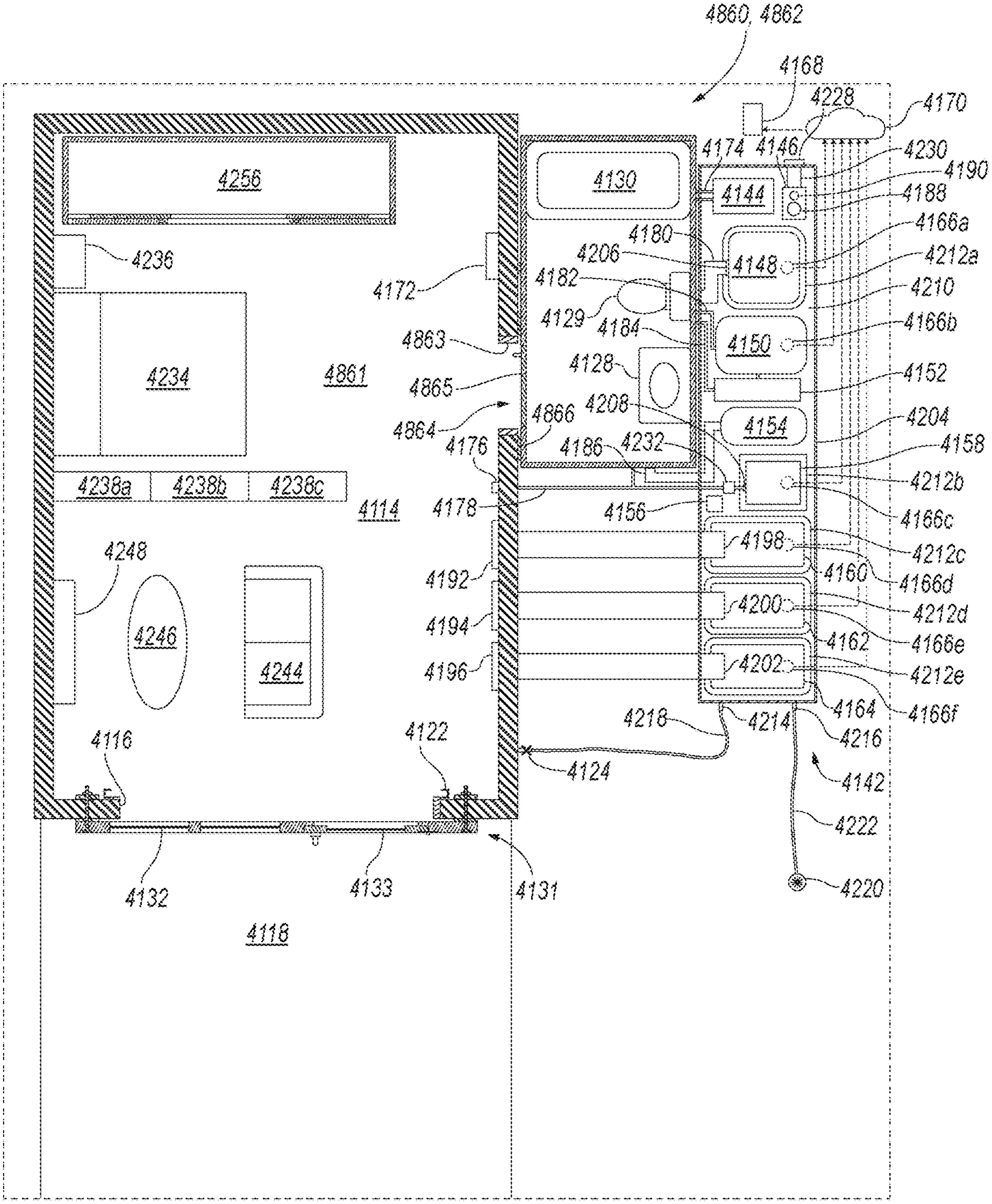
FIG. 121 is a cross-sectional top plan view of a real estate unit in accordance with another embodiment of the present technology including an interior region of a detached one-car garage in the second state.

FIG. 121 is a cross-sectional top plan view of a real estate unit 4860 in accordance with another embodiment of the present technology including an interior region 4861 of a detached one-car garage 4862 in the second state. The garage 4862 can include a side doorway 4863 with a removed door. The real estate unit 4860 can include a reusable bathroom 4864 disposed (e.g., removably disposed) outside the interior region 4861. The bathroom 4864 can be similar to the bathroom 4127 (FIGS. 108-116) and can include a door 4865 aligned with the side doorway 4863. Similar to the barrier 4131 (FIG. 92), the bathroom 4864 can include a gasket 4866 disposed between a wall of the bathroom 4864 and an exterior wall of the garage 4862. The gasket 4866 can be compressible such that it conforms to irregularities in the corresponding exterior wall of the garage 4862 and thereby enhances a weather resistance of a connection between the bathroom 4864 and the exterior wall of the garage 4862. The bathroom 4864 can further include bolts or clamps (not shown) that secure the connection between the bathroom 4864 and the exterior wall of the garage 4862.

Figure 122:
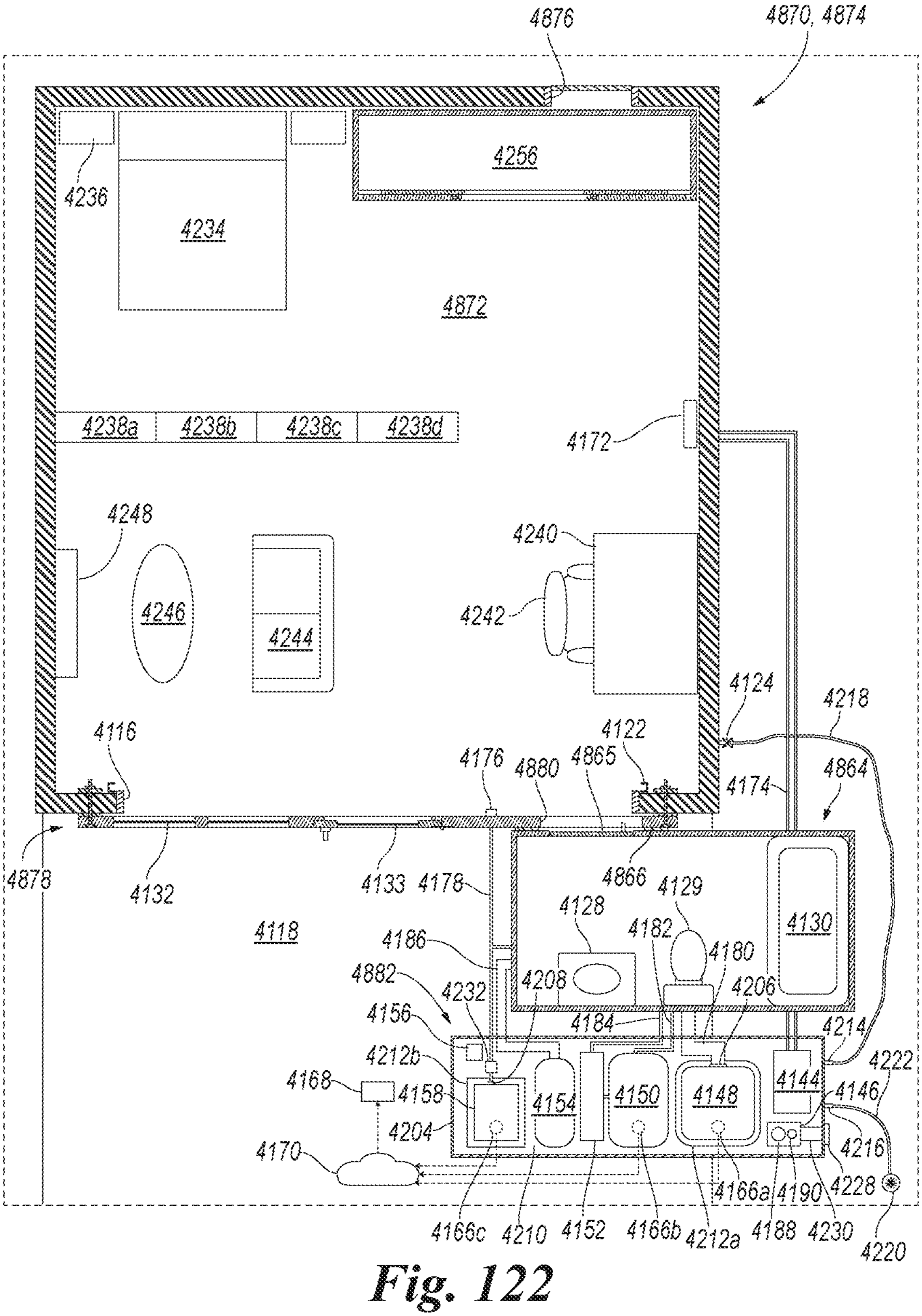
FIG. 122 is a cross-sectional top plan view of a real estate unit in accordance with another embodiment of the present technology including an interior region of a detached two-car garage in the second state.

FIG. 122 is a cross-sectional top plan view of a real estate unit 4870 in accordance with another embodiment of the present technology including an interior region 4872 of a detached two-car garage 4874 in the second state. The garage 4874 can include a rear doorway 4876 that is not in service. For example the rear doorway 4876 can be blocked by the closet 4256 of the real estate unit 4870. As with the real estate unit 4860 (FIG. 121), the bathroom 4864 of the real estate unit 4870 can be disposed (e.g., removably disposed) outside the interior region 4872. The real estate unit 4870 can include a barrier 4878 disposed (e.g., removably disposed) between the interior region 4872 and the outdoor area 4118 adjacent to the garage 4874. The barrier 4878 can be configured to permit ingress to and egress from the interior region 4872. The barrier 4878 can also be configured to permit access to the bathroom 4864 of the real estate unit 4870 from the interior region 4872. For example, the barrier 4878 can include an opening 4880 aligned with the door 4865 of the bathroom 4864. The real estate unit 4870 can also include a dock 4882 similar to the dock 4812 described above with reference to FIG. 119.

Figure 123:
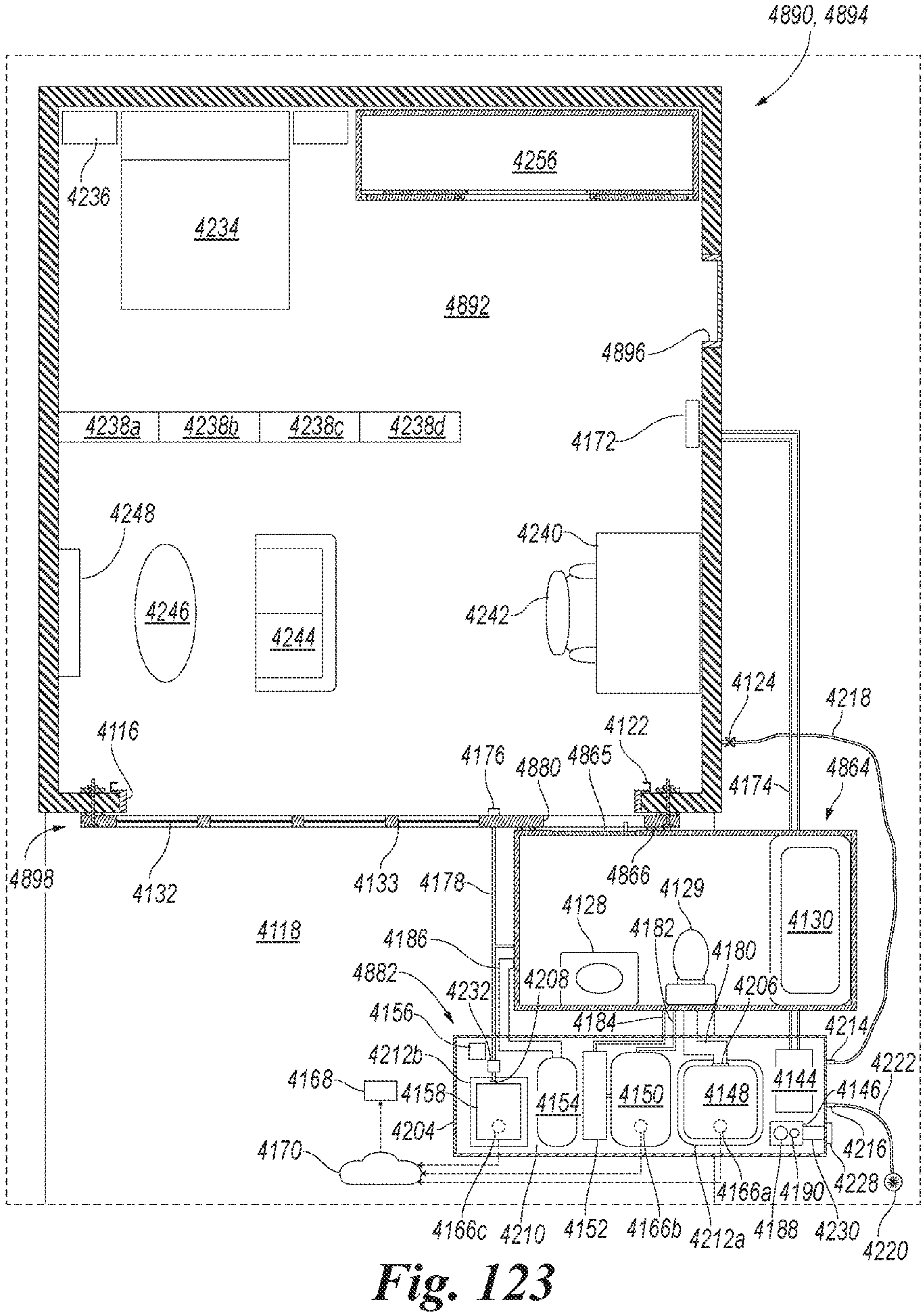
FIG. 123 is a cross-sectional top plan view of a real estate unit in accordance with another embodiment of the present technology including an interior region of a detached two-car garage in the second state.

FIG. 123 is a cross-sectional top plan view of a real estate unit 4890 in accordance with yet another embodiment of the present technology including an interior region 4892 of a detached two-car garage 4894 in the second state. The garage 4894 can include a side doorway 4896 that is in service for providing ingress to and egress from the interior region 4892. Again, the bathroom 4864 of the real estate unit 4890 can be disposed (e.g., removably disposed) outside the interior region 4892. The real estate unit 4890 can include a barrier 4898 disposed (e.g., removably disposed) between the interior region 4892 and the outdoor area 4118 adjacent to the garage 4894. The barrier 4898 can be similar to the barrier 4878 (FIG. 122) although without a doorway to permit ingress to and egress from the interior region 4892. Rather, as mentioned above, ingress to and egress from the interior region 4892 can be via the side doorway 4896.

Figure 124:
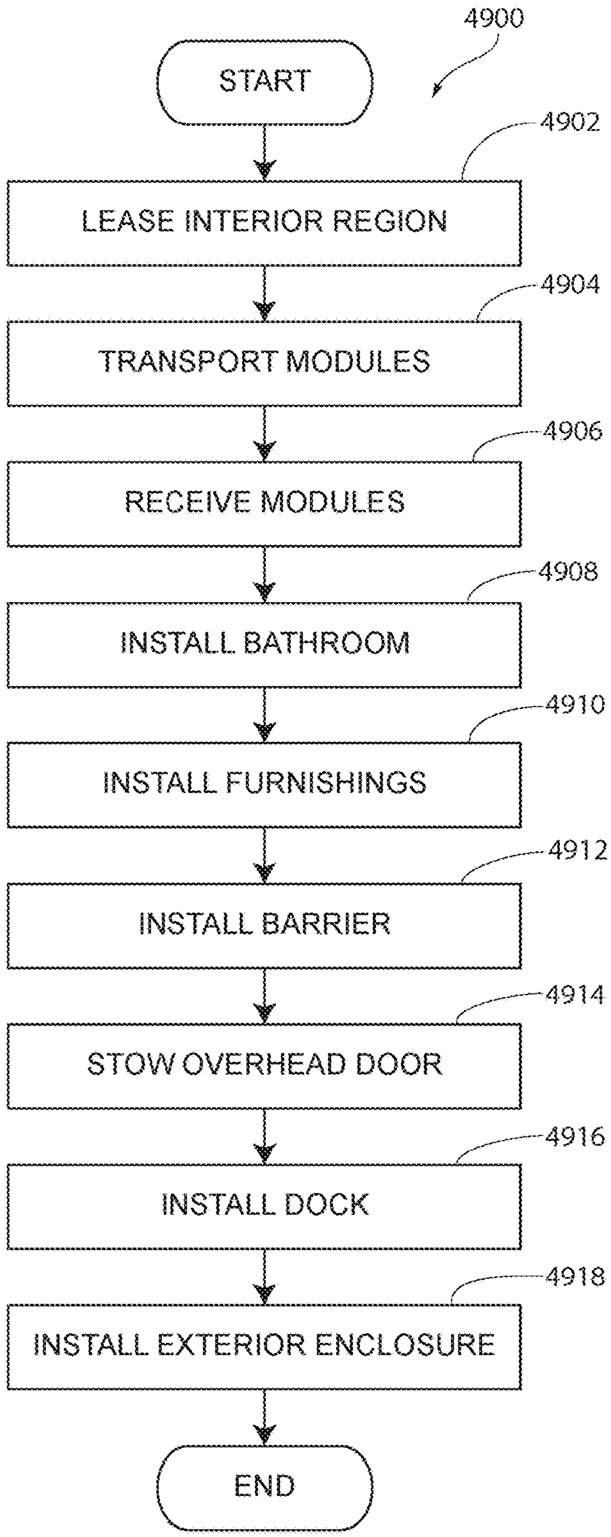
FIG. 124 is a block diagram illustrating a method for retrofitting a garage to form at least a portion of a real estate unit in accordance with an embodiment of the present technology.

FIG. 124 is a block diagram illustrating a method 4900 for retrofitting a given garage to form at least a portion of a given real estate unit in accordance with an embodiment of the present technology. For simplicity, the method 4900 will be further described primarily in the context of the real estate unit 4126 and the garage 4102. It should be understood, however, that the method 4900, when suitable, and/or portions of the method 4900, when suitable, can be practiced with respect to any of the real estate units 4126, 4700, 4750, 4800, 4850, 4860, 4870, 4890 and with respect to any of the garages 4102, 4804, 4862, 4874, 4894 described above with reference to FIGS. 91-123 as well as with respect to other real estate units and garages in accordance with embodiments of the present technology. With reference to FIGS. 91-116 and 124 together, the method 4900 can include leasing the interior region 4114 (block 4902) or establishing control of the interior region 4114 in another suitable manner. For example, the interior region 4114 can be leased from an owner of the garage 4102 (e.g., an owner of the house 4100) for provision of lodging, residential space, office space, and/or assembly space, and/or another type of space to third parties.

In at least some embodiments, the method 4900 includes at least substantially reversibly retrofitting the garage 4102 to accommodate a non-garage use (e.g., a lodging use, a residential use, an office use, and/or an assembly use) at the interior region 4114. In these and other embodiments, it may be economically feasible to lease the interior region 4114 and retrofit the garage 4102 with little or no long-term commitment from an owner of the garage 4102. This can be due to the reusability of a significant amount of the capital associated with retrofitting the garage 4102 and/or for other reasons. Accordingly, in some embodiments, the interior region 4114 is leased month-to-month. In other embodiments, the interior region 4114 can be leased under terms that allow the owner of the garage 4102 to terminate the lease with notice of less than one month. In still other embodiments, the interior region 4114 can be controlled by an operator of the real estate unit 4126 under other lease arrangements, under non-lease contractual arrangements (e.g., franchising), or under fee simple ownership. After direct or indirect control over the interior region 4114 is established, the method 4900 can include subleasing (or leasing if the garage 4102 is owned in fee simple) the interior region 4114 to a renter. When the interior region 4114 is leased separately from other portions of the house 4100, an owner of the house 4100 can occupy or otherwise use the other portions of the house 4100 while the interior region 4114 is leased to third parties. When the interior region 4114 is leased together with other portions of the house 4100, an operator of the real estate unit 4126 can separately lease the interior region 4114 as the real estate unit 4126 and some or all of the other portions of the house 4100 as another real estate unit.

The method 4900 can further include transporting modules (e.g., the bathroom 4127, the barrier 4131, the wall components 4136, and/or the dock 4142) to the garage 4102 (block 4904). Some or all of the modules can be transported in a compact state. For example, the bathroom 4127 can be transported in its disassembled state, the barrier 4131 can be transported in its folded state, the wall components 4136 can be transported in their disassembled states, and/or the shells 4408 can be transported in their collapsed states. The method 4900 can further include receiving the modules at the garage 4102 (block 4906). For example, the bathroom 4127, the barrier 4131, the wall components 4136, the dock 4142, and/or other suitable components of the real estate unit 4126 can be received at the garage 4102 in an at least substantially pre-manufactured state.

After the bathroom 4127 is received at the garage 4102, the method 4900 can include installing the bathroom 4127 (block 4908), such as by disposing (e.g., removably disposing) the bathroom 4127 within or outside the interior region 4114. In at least some embodiments, installing the bathroom 4127 includes assembling (e.g., at least substantially reversibly assembling) a set of reusable bathroom modules (e.g., the floor module 4500, the ceiling module 4502, and the wall modules 4504) to form an assembly of reusable bathroom modules. For example, the method 4900 can include disposing (e.g., removably disposing) the floor module 4500 at a suitable location within or outside the interior region 4114, and connecting (e.g., removably connecting) the wall modules 4504 to the floor module 4500 at a perimeter portion of the floor module 4500. The bathroom 4127 can be disposed within the interior region 4114 such that the floor level of the bathroom 4127 is at least 0.5 meter higher than the underlying floor level of the interior region 4114. The method 4900 can further include installing (e.g., removably installing) furnishings within the interior region 4114. For example, when the garage 4102 is retrofitted for lodging and/or residential use at the interior region 4114, the method 4900 can include disposing (e.g., removably disposing) lodging and/or residential furnishings within the interior region 4114. As another example, when the garage 4102 is retrofitted for office use at the interior region 4114, the method 4900 can include disposing (e.g., removably disposing) office furnishings within the interior region 4114.

The method 4900 can also include installing the barrier 4131 (block 4912). For example, the method 4900 can include disposing (e.g., removably and stationarily disposing) the barrier 4131 between the interior region 4114 and the outdoor area 4118. The barrier 4131 can be installed such that a path permitting a renter of the real estate unit 4126 to move between the interior region 4114 and the outdoor area 4118 extends through the opening 4116 and through the barrier 4131. Installing the barrier 4131 can include installing the barrier 4131 in an unfolded state. In addition or alternatively, installing the barrier 4131 can include at least substantially reversibly assembling a set of barrier modules to form an assembly of barrier modules. In at least some embodiments, installing the barrier 4131 includes fastening (e.g., removably fastening) the barrier 4131 to the exterior wall **4104*h*. For example, the barrier 4131 can be bolted, screwed, and/or clamped to the exterior wall 4104*h*. Installing the barrier 4131 can further include forming the first mass of self-leveling material 4300, such as integrally along most or all of an overall footprint of the barrier 4131. The barrier 4131 can then be installed over the first mass of self-leveling material 4300. In some embodiments, installing the barrier 4131 includes inserting the barrier 4131 into the opening 4116. In other embodiments, installing the barrier 4131 includes overlaying the barrier 4131 over the opening 4116. For example, installing the barrier 4131 can include compressing the gasket 4354 between the frame 4352 and the exterior wall 4104***h*. In conjunction with installing the barrier 4131 or separately, the method 4900 can include stowing the overhead door 4120 within the interior region 4114 in its open state (block 4914). In at least some cases, this includes disabling (e.g., reversibly disabling) a control for the overhead door 4120.

As shown in FIG. 124, the method 4900 can include installing the dock 4142 (block 4916). For example, the method 4900 can include disposing (e.g., removably disposing) the dock 4142 outside the interior region 4114. In conjunction with installing the dock 4142 or separately, the method 4900 can include disposing (e.g., removably disposing) the water reservoir 4150, the battery 4158, the blackwater tank 4148, and/or other suitable modules outside the interior region 4114. These modules can be connected (e.g., removably connected) to the dock 4142 and/or to other suitable components of the real estate unit 4126. For example, the water reservoir 4150 and the bathroom 4127 can be operably connected via the cold water supply line 4182; the toilet 4558 and the blackwater tank 4148 can be operably connected via the blackwater drain line 4180; and the bathtub/shower drain 4580 and the greywater filter 4154 can be operably connected via the greywater drain line 4186. In addition or alternatively, the bathroom 4127 and the sewage hookup 4704 can be operably connected via the blackwater drain line 4702. When the bathroom 4127 is operably connected to the blackwater tank 4148, establishing this connection can include operating the blackwater drain quick-connect coupling 4206 to fluidically connect the bathroom 4127 and the blackwater tank 4148. Similarly, the electrical quick-connect coupling 4208 can be operated to electrically connect the battery 4158 and the bathroom 4127. In at least some embodiments, the garage 4102 is retrofitted for off-grid operation with respect to an electrical supply to the interior region 4114 and/or retrofitted for off-grid operation with respect to disposal of blackwater from the toilet 4558.

Operably connecting the bathroom 4127 and the blackwater tank 4148 can include extending the blackwater drain line 4180 between the bathroom 4127 and the blackwater tank 4148 such that the blackwater drain line 4180 extends above-floor and then above-ground from the bathroom 4127 toward the blackwater tank 4148. Similarly, operably connecting the bathroom 4127 and the sewage hookup 4704 can include extending the blackwater drain line 4702 between the bathroom 4127 and the sewage hookup 4704 such that the blackwater drain line 4702 extends above-floor and then above-ground from the bathroom 4127 toward the sewage hookup 4704. In at least some embodiments, installing the dock 4142 further includes connecting (e.g., removably connecting) the water reservoir 4150 and the hose bibb 4124.

The method 4900 can further include installing the exterior enclosure 4135 (block 4918). In at least some cases, this is part of retrofitting the outdoor area 4118 from being a driveway and/or parking area to being the courtyard 4134. Installing the exterior enclosure 4135 can include forming the second mass of self-leveling material 4302, such as integrally along most or all of an overall footprint of the exterior enclosure 4135. The wall components 4136 can then be disposed (e.g., removably disposed) over the second mass of self-leveling material 4302. The second mass of self-leveling material 4302 can be formed and the wall components 4136 can be disposed at the perimeter portion of the outdoor area 4118 to form at least a portion of the exterior enclosure 4135. Disposing the wall components 4136 can include stacking and/or interlocking the wall components 4136. This can be done, for example, while the shells 4408 are in an expanded state. Installing the exterior enclosure 4135 can further include differentially planting the apertures 4402 to form the brand identifier 4404. For example, this can be done using a template after all or most of the wall components 4136 of the exterior enclosure 4135 have been installed.

Figure 125:
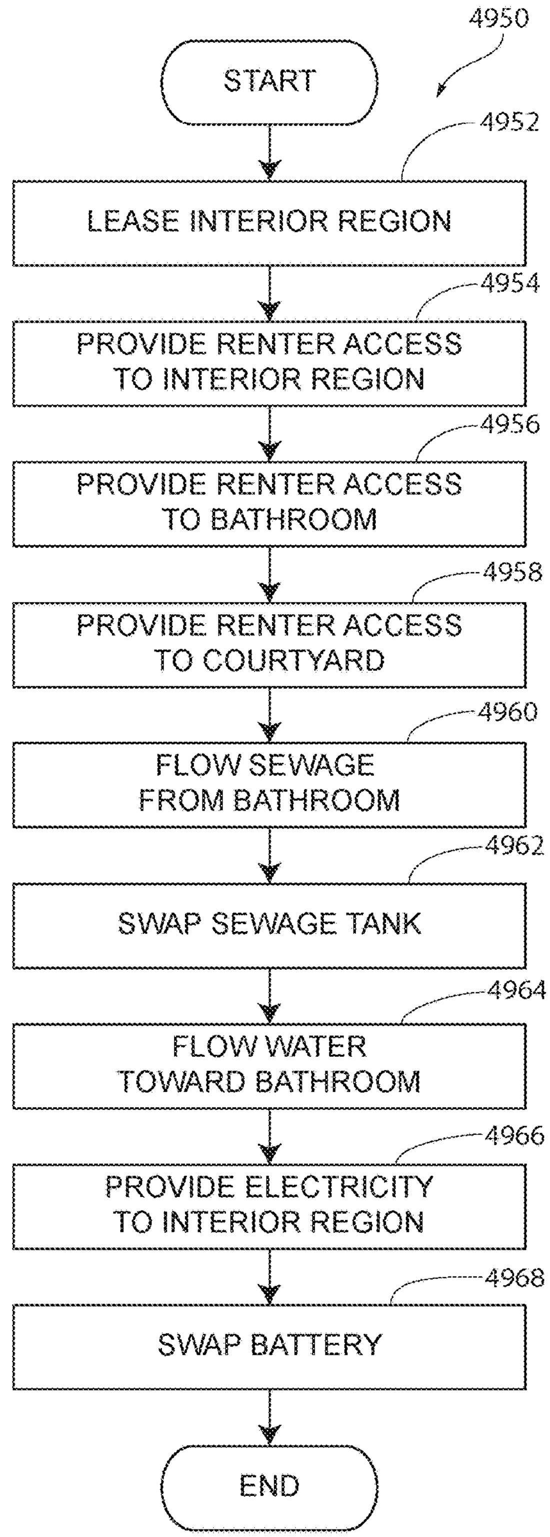
FIG. 125 is a block diagram illustrating a method for operating a real estate unit in accordance with an embodiment of the present technology.

FIG. 125 is a block diagram illustrating a method 4950 for operating a given real estate unit in accordance with an embodiment of the present technology. As with the method 4900, the method 4950 will be further described primarily in the context of the real estate unit 4126 and the garage 4102. It should be understood, however, that the method 4950, when suitable, and/or portions of the method 4950, when suitable, can be practiced with respect to any of the real estate units 4126, 4700, 4750, 4800, 4850, 4860, 4870, 4890 and with respect to any of the garages 4102, 4804, 4862, 4874, 4894 described above with reference to FIGS. 91-120 as well as with respect to other real estate units and garages in accordance with embodiments of the present technology. With reference to FIGS. 91-116 and 125 together, the method 4950 can be practiced in connection with providing lodging, rentable residential space, rentable office space, rentable assembly space, and/or another suitable type of space at the interior region 4114. The method 4950 can include leasing the interior region 4114 (block 4952) or maintaining control of the interior region 4114 in another suitable manner, such as one of the manners described above in connection with establishing control of the interior region 4114 in the method 4900.

The method 4950 can further include providing renter access to the interior region 4114 (block 4954), such as through the opening 4116 and through the barrier 4131. In this way, the method 4950 can include providing access to furnishings at the interior region 4114 corresponding to the use type. For example, the method 4950 can include providing renter access to lodging and/or residential furnishings (e.g., the bed 4234) within the interior region 4114 when the real estate unit 4126 is operated as a lodging and/or residential unit. As another example, the method 4950 can include providing renter access to office furnishings (e.g., the workstation 4752) within the interior region 4114 when the real estate unit 4126 is operated as an office unit. Providing renter access to the interior region 4114 can occur by leasing the interior region 4114 to the renter, subleasing the interior region 4114 to the renter, providing renter access to the interior region 4114 through a membership agreement, providing renter access to the interior region 4114 through a short-term use arrangement (e.g., a lodging arrangement), and/or providing renter access to the interior region 4114 in another suitable manner. The method 4950 can further include providing renter access to the bathroom 4127 (block 4956) and providing renter access to the courtyard 4134 (block 4958).

As shown in FIG. 125, the method 4950 can include flowing sewage from the bathroom 4127 (block 4960). For example, the method 4950 can include flowing backwater from the toilet 4129 toward the blackwater tank 4148 via the blackwater drain line 4180. As another example, the method 4950 can include flowing sewage (e.g., blackwater) from the bathroom 4127 toward the sewage hookup 4704 via the blackwater drain line 4702. As yet another example, the method 4950 can include flowing greywater from the bathtub/shower drain 4580 toward the greywater filter 4154. The method 4950 can also include swapping the blackwater tank 4148 with a less full counterpart of the blackwater tank 4148 to remove sewage from the real estate unit 4126 (block 4962). This can include operating the blackwater drain quick-connect coupling 4206 to disconnect the blackwater tank 4148 from fluidic connection with the bathroom 4127 and removing the blackwater tank 4148 from the dock 4142. Swapping the blackwater tank 4148 can be at least partially in response to receiving an indication of a fullness of the blackwater tank 4148 from the sensor 4166*a*. In at least some embodiments, the method 4950 includes operating the real estate unit 4126 off-grid with respect to remote disposal of blackwater from the toilet 4129.

The method 4950 can further include flowing water toward the bathroom 4127 (block 4964). For example, the method 4950 can include flowing water from the water reservoir 4150 toward the bathroom 4127 via the cold water supply line 4182. Furthermore, the method 4950 can include flowing water from the hose bibb 4124 toward the water reservoir 4150 to replenish the water reservoir 4150. The method 4950 can also include providing electricity to the interior region 4114 (block 4966). For example, the method 4950 can include powering an appliance within the interior region 4114 using the battery 4158 via the electrical outlet 4176. The method 4950 can further include swapping the battery 4158 with a less depleted counterpart of the battery 4158 to replenish an electrical supply to the real estate unit 4126. This can include operating the electrical quick-connect coupling 4208 to disconnect the battery 4158 from electrical connection with the electrical outlet 4176. Swapping the battery 4158 can be at least partially in response to receiving an indication of a depleted state of the battery 4158 from the sensor 4166*c*. In at least some embodiments, the method 4950 includes operating the real estate unit 4126 off-grid with respect to an electrical supply to the interior region 4114.

As a person having ordinary skill in the art will recognize, numerous permutations of the features disclosed herein are within the scope of the present technology. For example, the real estate units 4126, 4700, 4750 can be implemented at the garage 4804 instead of the garage 4102. As another example, the real estate units 4800, 4850 can be implemented at the garage 4102 instead of the garage 4804. As yet another example, the bathroom 4127 can be tethered for waste disposal and/or water supply to a permanent bathroom (not shown) of the house 4100 in a manner similar to the manner disclosed in U.S. Patent Application No. 62/222,750, which is incorporated herein by reference in its entirety. As yet another example, an exterior enclosure 4135 can be added to the real estate units 4750, 4800, 4860, 4870 and 4890.

In a another embodiment of the present technology, a real estate unit includes an interior space within a commercial building, a reusable bathroom removably disposed within the commercial building, and a reusable barrier stationarily and removably disposed between the interior space and an outdoor area. The bathroom, barrier, and/or other suitable components of the real estate unit can be configured for low-cost deployment, removal, and redeployment. Use of these components can allow revenue from operating the real estate unit to exceed costs associated within transitioning the space within the commercial building from its purpose-built use (e.g., loading, storage, parking, and/or vehicle-servicing use) to an alternative use (e.g., lodging, residential, office, and/or assembly use) even if the real estate unit is only operated for a short period of time (e.g., one year or less). Thus, an operator of a network of real estate units may lease a space within a commercial building short-term (e.g., monthly) from an owner of the commercial building and retrofit the space for provision of rentable space to third parties with little or no risk of incurring significant economic loss. Even if the owner terminates the lease or if demand for the newly created real estate unit is lower than expected, most of the capital associated with retrofitting the space can be recoverable. Furthermore, capital embodied in the components can be readily relocatable in response to long-term and short-term (e.g., seasonal) changes in demand.

Among various types of real estate, commercial buildings having loading, storage, parking, and/or vehicle-servicing spaces are particularly well suited to be retrofitted to accommodate alternative uses. For example, these types of spaces tend to be unfurnished or sparsely finished in their purpose-built use, which can facilitate retrofitting. As another example, these types of spaces typically have large openings at ground level. These openings can be well suited for retrofitting to become sources of natural light and/or points of direct exterior access. As yet another example, commercial buildings having these types of spaces typically have at least one exterior wall well suited for accommodating retrofitted utility connections between indoor and outdoor components. Commercial buildings compatible with embodiments of the present technology can have other desirable attributes in addition to or instead of the forgoing attributes. Furthermore, embodiments of the present technology can be implemented in other types of real estate, such as residential garages.

Figure 127:
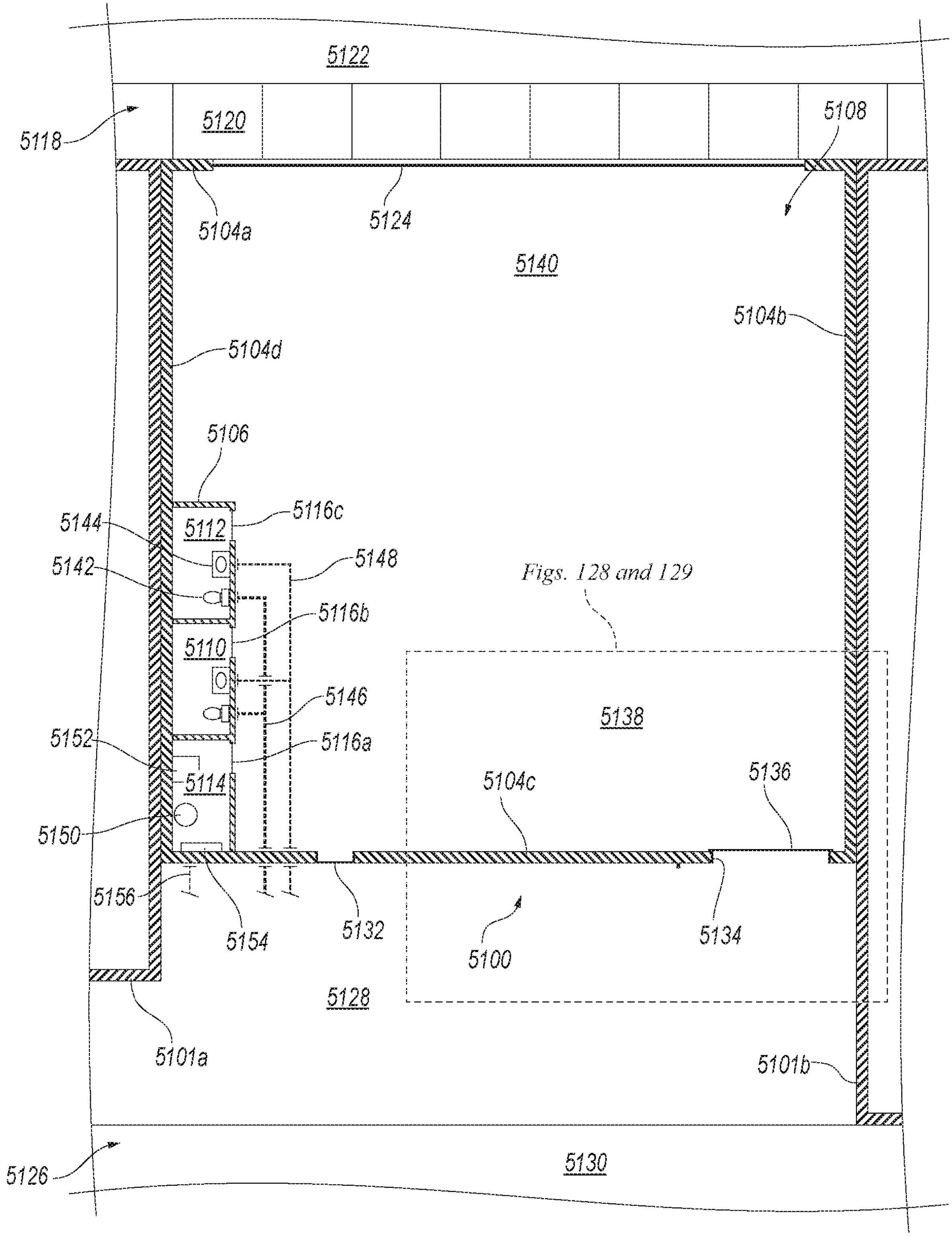
FIG. 127 is a cross-sectional top plan view of the commercial building shown in FIG. 126 taken along the line I-I in FIG. 126 with an interior space within the commercial building in a first state.

FIG. 126 is a back profile view of a commercial building 5100 disposed between neighboring commercial buildings 5101 (individually identified as neighboring commercial buildings 5101*a* and 5101*b*). FIG. 127 is a cross-sectional top plan view of the commercial building 5100 taken along the line I-I in FIG. 126. With reference to FIGS. 126 and 127 together, the commercial building 5100 can include a permanent roof 5102, permanent exterior walls 5104 (individually identified as exterior walls 5104*a*-5104*d*), and permanent interior walls 5106. The exterior walls 5104 can define an interior region 5108 of the commercial building 5100. Within the interior region 5108, the commercial building 5100 can include a first building bathroom 5110 (e.g., a men's bathroom), a second building bathroom 5112 (e.g., a women's bathroom), and a utility room 5114. The commercial building 5100 can further include interior doors 5116 (individually identified as interior doors 5116*a*-5116*c*) opening into the first building bathroom 5110, the second building bathroom 5112, and the utility room 5114, respectively.

The exterior wall 5104*a* can be between the interior region 5108 and a first outdoor area 5118 that includes a sidewalk 5120 and a street 5122. At the exterior wall 5104*a*, the commercial building 5100 can include a storefront 5124 between the interior region 5108 and the first outdoor area 5118. The exterior wall 5104*c* can be between the interior region 5108 and a second outdoor area 5126 that includes a yard 5128 and an alley 5130. At the exterior wall 5104*c*, the commercial building 5100 can include a back door 5132 and an opening 5134 between the interior region 5108 and the second outdoor area 5126. In at least some cases, the yard 5128 is paved and/or otherwise configured to facilitate automobile parking. Although the exterior wall 5104*c* in the illustrated embodiment is a back wall, in other embodiments a counterpart of the exterior wall 5104*c* can be a side wall. With reference again to FIGS. 126 and 127, the opening 5134 can be sized to permit loading of large items into the commercial building 5100 and/or passage of an automobile between the interior region 5108 and the second outdoor area 5126. For example, the opening 5134 can have a width within a range from 2 to 7 meters (e.g., from 4 to 6 meters). The commercial building 5100 can further include an overhead door 5136 (e.g., a door that moves upward to open and stows overhead in a rolled or unrolled state) movably disposed at the opening 5134.

The commercial building 5100 can include an interior space 5138 near the opening 5134, and another interior space 5140 between the interior space 5138 and the storefront 5124. The interior spaces 5138, 5140 can be constituents of the interior region 5108, and can be physically divided from one another or undivided. For simplicity of illustration, interior walls, doorways, fixtures, and furnishings within the interior region 5108 are not shown. The interior spaces 5138, 5140 can be at a ground floor of the commercial building 5100. In some cases, the interior spaces 5138, 5140 have different purpose-built uses. For example, the interior space 5138 can be a purpose-built loading, storage, parking, and/or vehicle-servicing space, while the interior space 5140 is a purpose-built office, retail, and/or restaurant space. In other cases, the interior spaces 5138, 5140 can have the same purpose-built use. For example, the entire commercial building 5100 can be a purpose-built warehouse. In FIG. 127, the interior space 5138 is shown in a first state, which can be an original, pre-retrofit, or similar state.

As shown in FIG. 127, the first and second building bathrooms 5110, 5112 can include respective toilets 5142 and respective sinks 5144. The commercial building 5100 can include a plumbing drain trunk line 5146 and a water supply trunk line 5148 operably associated with the first and second building bathrooms 5110, 5112. The plumbing drain trunk line 5146 can follow a drainage route from the first and second building bathrooms 5110, 5112 toward a sewage destination (e.g., a municipal sewer) (not shown). Similarly, the water supply trunk line 5148 can follow a supply route from a water source (e.g., a municipal water source) (not shown) toward the first and second building bathrooms 5110, 5112. The plumbing drain trunk line 5146 can be below-ground, such as positioned below a ground surface outside the commercial building 5100 along the drainage route. In addition or alternatively, the plumbing drain trunk line 5146 can be below-floor, such as positioned below a finished floor surface of the commercial building 5100 along the drainage route. Similarly, the water supply trunk line 5148 can be below-ground, such as positioned below a ground surface outside the commercial building 5100 along the supply route. In addition or alternatively, the water supply trunk line 5148 can be below-floor, such as positioned below a finished floor surface of the commercial building 5100 along the supply route.

The plumbing drain trunk line 5146 and/or the water supply trunk line 5148 can be buried or otherwise permanently installed within a basement, a crawlspace, a chase, a foundation, a volume of dirt, or another suitable environment directly below the first and second building bathrooms 5110, 5112 and/or directly below an area around the first and second building bathrooms 5110, 5112. Furthermore, the plumbing drain trunk line 5146 can be sloped to convey liquid waste (e.g., sewage) from the first and second building bathrooms 5110, 5112 toward the sewage destination at least partially by gravity. The water supply trunk line 5148 can be configured to convey potable water from the water source to the first and second building bathrooms 5110, 5112 under pressure. In at least some cases, the commercial building 5100 includes a building water heater 5150 operably associated with the water supply trunk line 5148. In these cases, the water supply trunk line 5148 can bifurcate into branches (not shown) that supply cold and hot water, respectively, to the first and second building bathrooms 5110, 5112, such as at the sinks 5144. The building water heater 5150 can be operably associated with a branch of the water supply trunk line 5148 that supplies hot water to the first and second building bathrooms 5110, 5112. As shown in FIG. 127, the building water heater 5150 can be disposed within the utility room 5114. The commercial building 5100 can include a furnace 5152 and an electrical panel 5154 also disposed within the utility room 5114. The commercial building 5100 can further include a main electrical supply line 5156 through which the electrical panel 5154 is operably connected to an electrical source (e.g., a municipal power source) (not shown). Electrical lines and fixtures downstream from the electrical panel 5154 are omitted for clarity of illustration.

Figure 128:
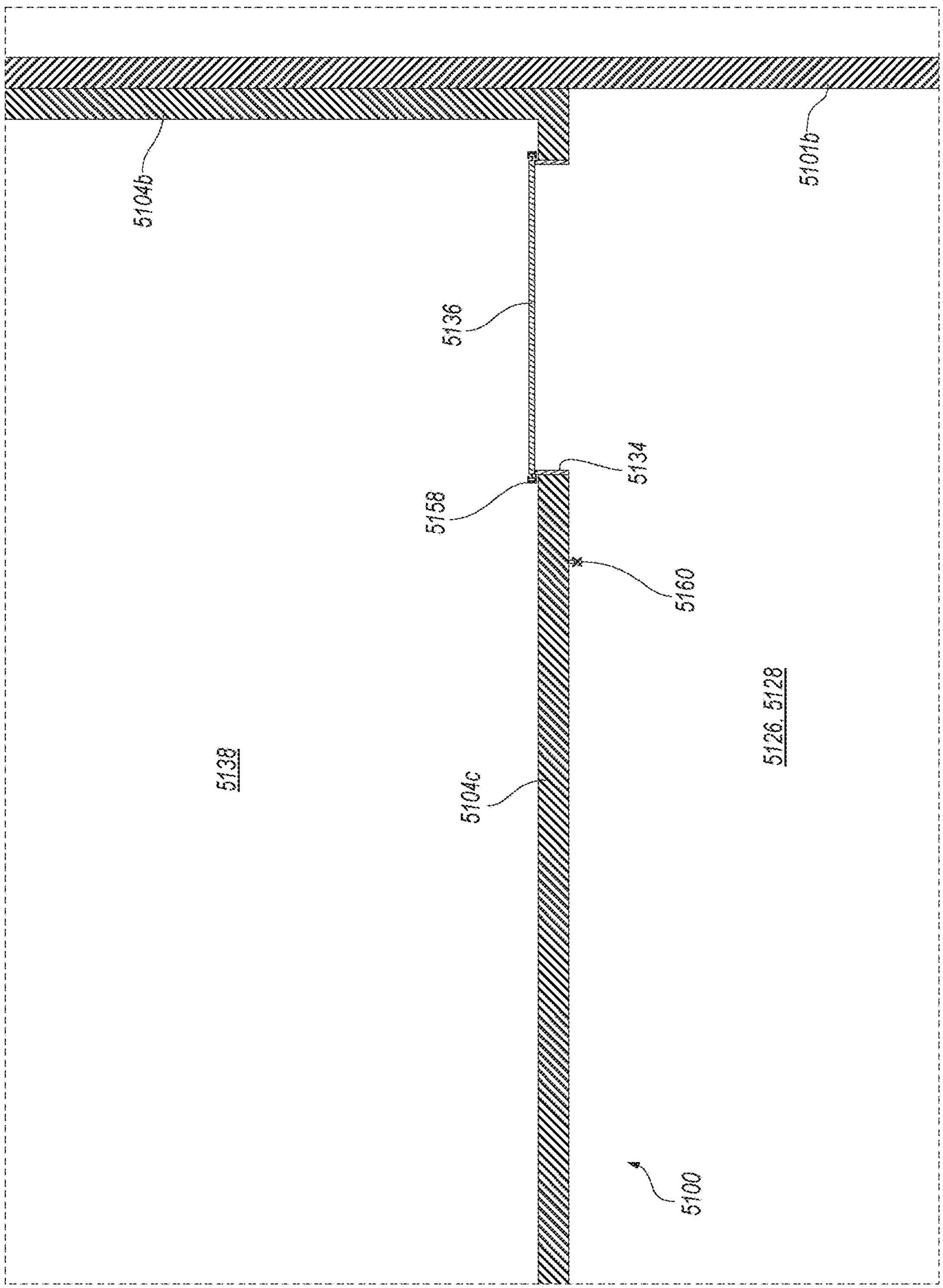
FIG. 128 is an enlarged view of a portion of FIG. 127.

FIG. 128 is an enlarged view of a portion of FIG. 127. As shown in FIG. 128, the commercial building 5100 can include a door track 5158 at the opening 5134. The overhead door 5136 can be operably connected to the door track 5158. The commercial building 5100 can further include a hose bibb 5160 at an exterior side of the exterior wall 5104*c*. Although the commercial building 5100 in the illustrated embodiment is a stand-alone commercial storefront building, it should be understood that, in other embodiments, another type of commercial building (e.g., a warehouse, a distribution center, a strip mall, a manufacturing facility, a mini-storage facility, an office building, a vehicle-servicing station, etc.) can be substituted for the commercial building 5100. Furthermore, although the commercial building 5100 in the illustrated embodiment includes only one opening 5134 at a back wall, in other embodiment, a counterpart of the commercial building 5100 can include multiple openings at back and/or side walls. In these other embodiments, one, some, or all of these openings can be retrofitted as described below with respect to the opening 5134.

FIG. 129 is a cross-sectional top plan view of a portion of the commercial building 5100 corresponding to the portion of FIG. 127 shown in FIG. 128 and showing a real estate unit 5162 in accordance with an embodiment of the present technology. The real estate unit 5162 can include the interior space 5138 retrofitted (e.g., at least substantially reversibly retrofitted) for an alternative use. In FIG. 129, the interior space 5138 is shown in a second state, which can be a non-original, post-retrofit, or similar state. In the illustrated embodiment, the interior space 5138 is retrofitted for lodging and/or residential use. In other embodiments, the interior space 5138 can be retrofitted for another suitable alternative use, such as office, and/or assembly use in addition to or instead of lodging and/or residential use. With reference again to FIG. 129, the first outdoor area 5118 can be retrofitted (e.g., at least substantially reversibly retrofitted) for courtyard use and/or another suitable use ancillary to the alternative use of the interior space 5138. The retrofitting of the interior space 5138 and the first outdoor area 5118 can occur well after (e.g., at least 20 years after) the commercial building was originally constructed.

The real estate unit 5162 can include a variety of retrofits (e.g., at least substantially reversible retrofits) to the commercial building 5100 that change at least a portion of the commercial building 5100 from being well suited a purpose-built use to being well suited for an alternative use. In at least some cases, reversal of all or a portion of these retrofits returns the portion of the commercial building 5100 from being well suited for the alternative use to again being well suited for the purpose-built use. Examples of reversible retrofits include removing, installing, and relocating furniture and fixtures with little or no associated demolition of the exterior and interior walls 5104, 5106 or other permanent fabric of the commercial building 5100. The interior space 5138 and other suitable portions of the commercial building 5100 can be at least substantially reversibly retrofitted to accommodate the real estate unit 5162. For example, a total cost of reversible retrofits to the commercial building 5100 (e.g., a present value of at least substantially reversibly installed reusable components of the real estate unit 5162) for a given transformation of the interior space 5138 from being well suited for a purpose-built use to being well suited for an alternative use can be greater (e.g., at least 50% greater or at least 100% greater) than a total cost of permanent retrofits to the commercial building 5100 (e.g. modifications to the permanent fabric of the commercial building 5100) for the given transformation. Capital associated with the alternative use can be readily re-deployable after the alternative use becomes inactive. In some cases, the alternative use and the real estate unit 5162 are active for one year or less (e.g., six months or less) between successive transformations. In other cases, the alternative use and the real estate unit 5162 can have longer durations or even be permanent.

As shown in FIG. 129, the real estate unit 5162 can include a bathroom 5164 disposed (e.g., removably disposed) within the commercial building 5100. The bathroom 5164 can include a sink 5166, a toilet 5168, and a bath/shower 5170. In at least some embodiments, the bathroom 5164 is reusable and removably disposed within the commercial building 5100. For example, unlike a conventional bathroom that can only be installed by heavy construction and removed by heavy demolition, the bathroom 5164 can be configured to be installed with little or no need for heavy construction and removed with little or no need for heavy demolition. Furthermore, the bathroom 5164 can be configured to be conveniently transported and reused after its removal. In the illustrated embodiment, the bathroom 5164 is an assembly of reusable bathroom modules configured for rapid deployment into and removal from the commercial building 5100 in an at least partially disassembled state. For example, the bathroom 5164 can be made up mostly or entirely of reusable modular components. In other embodiments, a counterpart of the bathroom 5164 can be portable and configured for rapid deployment into and removal from the commercial building 5100 without significant disassembly. This deployment and removal can occur by forklift, by dolly, by operation of wheels integrated into the counterpart of the bathroom 5164, or in another manner. In still other embodiments, a counterpart of the bathroom 5164 can have other forms.

The real estate unit 5162 can further include a barrier 5172 disposed between the interior space 5138 and the second outdoor area 5126. For example, a primary egress path from the interior space 5138 to the second outdoor area 5126 can extend through the opening 5134 and through the barrier 5172. Furthermore, the barrier 5172 can be stationarily disposed between the interior space 5138 and the second outdoor area 5126. For example, unlike the overhead door 5136, which is configured to move on a regular basis during normal operation of the interior space 5138 in the first state, the barrier 5172 can be configured to remain at least substantially stationary during normal operation of the real estate unit 5162. The barrier 5172 can be fenestrated and can include windows 5174 that allow natural light to enter the interior space 5140 from the second outdoor area 5126. The barrier 5172 can further include a door 5176. In at least some embodiments, the barrier 5172 is foldable to facilitate its transport and storage when not in use. For example, the barrier 5172 can be foldable along vertical seams (not shown) between neighboring windows 5174 and/or between the door 5176 and windows 5174 neighboring the door 5176.

The barrier 5172 can be reusable and removably disposed between the interior space 5138 and the second outdoor area 5126. For example, the barrier 5172 can be configured to be installed with little or no need for heavy construction and removed with little or no need for heavy demolition. Furthermore, the barrier 5172 can be configured to be conveniently transported and reused after its removal. In the illustrated embodiment, the barrier 5172 is rigid, portable and configured for rapid deployment into and removal from operable association with the interior space 5138 without significant disassembly. This deployment and removal can occur by forklift, by dolly, by operation of wheels (not shown) integrated into the barrier 5172, or in another manner. In other embodiments, a counterpart of the barrier 5172 can be an assembly of reusable barrier modules configured for rapid deployment into and removal from between the interior space 5138 and the second outdoor area 5126 in an at least partially disassembled state. For example, a counterpart of the barrier 5172 can be made up mostly or entirely of reusable modular components.

With reference again to FIG. 129, the real estate unit 5162 can include a courtyard 5178 at the second outdoor area 5126. For example, the real estate unit 5162 can include an exterior enclosure 5180 at least partially defining the courtyard 5178. In the illustrated embodiment, the courtyard 5178 is open air. In other embodiments, all or a portion of a counterpart of the courtyard 5178 can have a roof (e.g., to define a solarium). As shown in FIG. 129, the exterior enclosure 5180 can include exterior wall components 5182 and a gate 5183 disposed at a perimeter portion of the courtyard 5178. The exterior wall components 5182, the gate 5183, and/or other suitable components of the exterior enclosure 5180 can be reusable and removably disposed at the perimeter portion of the courtyard 5178. For example, the exterior enclosure 5180 can be made up mostly or entirely of reusable modular components. As discussed in further detail below, the exterior wall components 5182 can be stacked and/or interlocking within the exterior enclosure 5180. Furthermore, the exterior wall components 5182 can be planters that support vegetation 5184. For example, the exterior wall components 5182 can internally support a root system (not shown) of the vegetation 5184. Thus, the exterior enclosure 5180 can include living walls.

The real estate unit 5162 can further include a compartmentalizing assembly 5185. The interior space 5138 can be within a compartment 5186 at least partially defined by the compartmentalizing assembly 5185. In the illustrated embodiment, the real estate unit 5162 and the compartment 5186 encompass no more than 30% of a total floor area of a ground floor of the commercial building 5100. In other embodiments, counterparts of the real estate unit 5162 and the compartment 5186 can be larger, such as encompassing 30% to 50% or encompassing 50% to 100% of a total floor area of a ground floor of a counterpart of the commercial building 5100. As shown in FIG. 129, the compartmentalizing assembly 5185 can include interior wall components 5187 disposed at a perimeter portion of the compartment 5186. The interior wall components 5187 and/or other suitable components of the compartmentalizing assembly

5185 can be reusable and removably disposed within the commercial building 5100. For example, the compartmentalizing assembly 5185 can be made up mostly or entirely of reusable modular components. As discussed in further detail below, the interior wall components 5187 can be stacked and/or interlocking within the compartmentalizing assembly 5185.

In the illustrated embodiment, the real estate unit 5162 is configured to be mostly off-grid (i.e., independent of service connections to local utilities). For example, the real estate unit 5162 can be configured to operate at least substantially off-grid with respect to an overall electrical supply to the interior space 5138, with respect to disposal of blackwater (e.g., wastewater from the toilet 5168), and/or in other respects. This feature of the real estate unit 5162 can be useful, for example, to avoid costs and complications associated with utility hookups, to reduce the environmental impact of the real estate unit 5162, to facilitate efficient management of the real estate unit 5162, to reduce costs associated with maintaining the real estate unit 5162 during periods of nonuse or low use, and/or for other reasons. In other embodiments, a counterpart of the real estate unit 5162 can be mostly or entirely on-grid (i.e., dependent on service connections to local utilities).

As shown in FIG. 129, the real estate unit 5162 can include a dock 5188 disposed (e.g., removably disposed) outside the interior space 5138. The dock 5188 can be above-ground (as illustrated) or below-ground (e.g., disposed within a pit). At the dock 5188, the real estate unit 5162 can include a heat pump 5190, an exhaust filter 5192, a blackwater tank 5194, a water reservoir 5196, a water heater 5198, a greywater filter 5200, a wireless router 5202, a battery 5204, a trash bin 5206, a recycling bin 5208, and a laundry bin 5210. The water reservoir 5196 can be operably connected to the hose bibb 5160 and can be configured to increase a capacity of the hose bibb 5160 to supply water to the bathroom 5164, such as by attenuating spikes in demand for water from the bathroom 5164. In the illustrated embodiment, the real estate unit 5162 is configured to separately manage removal and disposal of blackwater (e.g., wastewater from the toilet 5168) and greywater (e.g., wastewater from the sink 5166 and the bath/shower 5170). In other embodiments, a counterpart of the real estate unit 5162 can be configured to collectively manage removal and disposal of blackwater and greywater. Accordingly, the blackwater tank 5194 can be more generally referred to as a sewage tank indicating that it can be configured to receive primarily blackwater, primarily greywater, or both blackwater and greywater.

With reference again to FIG. 129, the exhaust filter 5192, the blackwater tank 5194, the battery 5204, the trash bin 5206, the recycling bin 5208, and the laundry bin 5210 can be removably connected to the dock 5188 or otherwise removably disposed outside the interior space 5138. Furthermore, these components can be reusable. In the illustrated embodiment, the real estate unit 5162 is configured to operate on-grid with respect to a water supply to the real estate unit 5162 (e.g., because the water reservoir 5196 is operably connected, for replenishment, to the water supply trunk line 5148 via the hose bibb 5160), configured to be off-grid with respect to an electrical supply to the real estate unit 5162, and configured to be off-grid with respect to disposal of blackwater from the toilet 5168. In other embodiments, a counterpart of the real estate unit 5162 can be off-grid with respect to its water supply (e.g., because a counterpart of the water reservoir 5196 is configured to be independently refilled or swapped), on-grid with respect to its electrical supply (e.g. because a counterpart of the battery 5204 is operably connected, for recharging, to a counterpart of the electrical panel 5154), and/or on-grid with respect its sewage disposal (e.g. because a counterpart of the blackwater tank 5194 is operably connected (e.g., for draining) to a counterpart of the plumbing drain trunk line 5146).

The real estate unit 5162 can be configured to receive occasional servicing. This servicing can be include collecting backwater, trash, recyclables, and laundry (e.g., for cleaning and return) from the blackwater tank 5194, the trash bin 5206, the recycling bin 5208, and the laundry bin 5210, respectively. The servicing can also include recharging the battery 5204. In at least some cases, the blackwater tank 5194 is configured to be pumped out in situ and/or swapped for removal of blackwater from the real estate unit 5162. Similarly, the battery 5204 can be configured to be recharged in situ and/or swapped for at least partial replenishment of an electrical supply to the real estate unit 5162. A less-full replacement for the blackwater tank 5194, a more-fully-charged replacement for the battery 5204, and/or other suitable replacements for components of the real estate unit 5162 can be delivered to the real estate unit 5162 by truck or in another manner. The replaced components can be collected in the same or a different manner and transported to a central location (e.g., a station or substation; not shown) where the components can be efficiently processed (e.g., emptied, cleaned, recharged, etc.) for reuse. This delivery and collection can occur on a regular schedule (e.g., daily, every-other-day, etc.), as needed, and/or on demand.

As shown in FIG. 129, the dock 5188 can include sensors 5212 (individually identified as sensors 5212*a*-5212*f*) operably connected to the blackwater tank 5194, the water reservoir 5196, the battery 5204, the trash bin 5206, the recycling bin 5208, and the laundry bin 5210, respectively. The sensors 5212 can be wirelessly connected to a remote server 5214 via the router 5202 and a network 5216 (e.g., the Internet). The server 5214 can include software that automatically processes data from the sensors 5212 to determine when servicing of the real estate unit 5162 is required. For example, data from the sensor 5212*a* may indicate that the blackwater tank 5194 is at 75% of capacity and needs to be drained or swapped promptly. As another example, data from the sensor 5212*b* may indicate that the water reservoir 5196 is being depleted faster than it can be replenished via the hose bibb 5160 and, therefore, needs to be independently replenished promptly. As yet another example, data from the sensor 5212*c* may indicate that the battery 5204 is at 25% of capacity and needs to be recharged or swapped promptly. Over time, aggregate data from the sensors 5212 can be analyzed to establish default servicing intervals for the real estate unit 5162. In addition or alternatively, data from the sensors 5212 can be used to calculate utility usage for the real estate unit 5162 for purposes of environmental reporting and/or billing a renter of the real estate unit 5162. The sensors 5212*a*-5212*f* can be of suitable respective types for monitoring the corresponding components of the real estate unit 5162. For example, the sensors 5212*a*, 5212*b*, 5212*d*-5212*f* can be weight sensors, level sensors, or other types of sensors configured to measure fullness levels of the blackwater tank 5194, the water reservoir 5196, the trash bin 5206, the recycling bin 5208, and the laundry bin 5210, respectively. As another example, the sensor 5212*c* can be a charge meter or another type of sensor configured to measure a charge of the battery 5204.

The real estate unit 5162 can include suitable utility lines and other connections that extend from components of the real estate unit 5162 within the interior space 5138 to components of the real estate unit 5162 or other structures outside of the interior space 5138. For example, the real estate unit 5162 can include a heater/cooler 5218 within the interior space 5138, and the real estate unit 5162 can further include refrigerant lines 5220 extending between the heater/cooler 5218 and the heat pump 5190. Similarly, the real estate unit 5162 can include an electrical outlet 5222 serving the interior space 5138, and the real estate unit 5162 can further include an electrical line 5224 extending between the electrical outlet 5222 and the battery 5204. The battery 5204, therefore, can be configured to power an appliance (not shown) within the interior space 5138 via the electrical outlet 5222 and the electrical line 5224. As additional examples of suitable utility lines, the real estate unit 5162 can include a blackwater drain line 5226 extending between the bathroom 5164 and the blackwater tank 5194, a cold water supply line 5228 extending between the bathroom 5164 and the water reservoir 5196, a hot water supply line 5230 extending between the bathroom 5164 and the water heater 5198, a greywater drain line 5232 extending between the bathroom 5164 and the greywater filter 5200, a plumbing ventilation line 5234 extending between the bathroom 5164 and the exhaust filter 5192, and an exhaust line 5236 also extending between the bathroom 5164 and the exhaust filter 5192. The blackwater drain line 5226 and the greywater drain line 5232 can be sloped to convey liquid waste from the bathroom 5164 toward the blackwater tank 5194 and the greywater filter 5200, respectively, at least partially by gravity. To facilitate this sloping and/or for other reasons, the bathroom 5164 can have a floor level at least 0.5 meter (e.g., at least 1 meter) higher than an underlying floor level of the interior space 5138. In the illustrated embodiment, the blackwater drain line 5226 and the greywater drain line 5232 are separate. In other embodiments, a counterpart of the real estate unit 5162 can include combined blackwater and greywater lines. Accordingly, the blackwater drain line 5226 and the greywater drain line 5232 can be more generally referred to as plumbing drain lines indicating that they can be configured to convey primarily blackwater, primarily greywater, or both blackwater and greywater.

The real estate unit 5162 can further include a trash hatch 5238, a recycling hatch 5240, and a laundry hatch 5242 within the interior space 5138. The real estate unit 5162 can also include a trash chute 5244 extending between the trash hatch 5238 and the trash bin 5206, a recycling chute 5246 extending between the recycling hatch 5240 and the recycling bin 5208, and a laundry chute 5248 extending between the laundry hatch 5242 and the laundry bin 5210. The refrigerant lines 5220, electrical line 5224, blackwater drain line 5226, cold water supply line 5228, hot water supply line 5230, greywater drain line 5232, plumbing ventilation line 5234, exhaust line 5236, trash chute 5244, recycling chute 5246, and laundry chute 5248 can extend through the exterior wall 5104*c*. For example, some or all of these lines and chutes can extend through retrofitted openings in the exterior wall 5104*c*. In at least some embodiments, these openings are readily patchable to facilitate returning the interior space 5138 to its purpose-built use if the real estate unit 5162 is decommissioned. The lines and chutes can be removably disposed inside and/or outside the interior space 5138. For example, the lines and chutes can be temporary and configured for reuse or disposal upon decommissioning of the real estate unit 5162. In at least some embodiments, the blackwater drain line 5226 and the greywater drain line 5232 extend above-floor and then above-ground from the bathroom 5164 toward the blackwater tank 5194 and the greywater filter 5200, respectively.

The dock 5188 can include additional lines, connections, and other suitable components associated with the components of the real estate unit 5162 at the dock 5188. For example, the dock 5188 can include a housing 5250 that provides security and protection from weather to components of the real estate unit 5162 at the dock 5188. The housing 5250 can include a lid (not shown) configured to be open when the real estate unit 5162 is being serviced and closed and locked when the real estate unit 5162 is not being serviced. In at least some embodiments, the lid includes solar panels (also not shown) operably connected to the battery 5204. The dock 5188 can further include couplings along some or all of the lines and chutes described above. These couplings can separate portions of the lines and chutes within the housing 5250 from portions of the lines and chutes outside the housing 5250. Thus, by operation of these couplings, the dock 5188 can be transportable as a unit with little or no need to modify internal portions of the dock 5188 in the field. For example, the dock 5188 can be pre-manufactured with the internal components shown in FIG. 129, installed at the location shown in FIG. 129, and then connected up to portions of the associated lines and chutes outside of the housing 5250.

The dock 5188 can further include couplings that facilitate convenient removal and replacement (e.g., swapping) of the blackwater tank 5194, the battery 5204, the trash bin 5206, the recycling bin 5208, and the laundry bin 5210. For example, the dock 5188 can include a blackwater drain quick-connect coupling 5252 through which the blackwater tank 5194 is fluidically connected to the dock 5188, the blackwater drain line 5226, and the bathroom 5164. In at least some embodiments, the blackwater drain quick-connect coupling 5252 includes a check valve. Similarly, the dock 5188 can include an electrical quick-connect coupling 5254 through which the battery 5204 is electrically connected to the dock 5188, the electrical line 5224, and the electrical outlet 5222. The dock 5188 can also include a floor 5256 having pads 5258 (individually identified as pads 5258*a*-5258*e*) that facilitate convenient registration of the blackwater tank 5194, the battery 5204, the trash bin 5206, the recycling bin 5208, and the laundry bin 5210 with the blackwater drain quick-connect coupling 5252, the electrical quick-connect coupling 5254, the trash chute 5244, the recycling chute 5246, and the laundry chute 5248, respectively. For example, the pads 5258*a*-5258*e* can be insets in the floor 5256 that snuggly receive corresponding lower portions of the blackwater tank 5194, the battery 5204, the trash bin 5206, the recycling bin 5208, and the laundry bin 5210, respectively.

As shown in FIG. 129, the dock 5188 can include a potable water inlet 5260 and a greywater outlet 5262. The real estate unit 5162 can include a first hose 5264 extending between the hose bibb 5160 and the potable water inlet 5260. The real estate unit 5162 can further include a second hose 5266 extending between the greywater outlet 5262 and a greywater inlet 5268 of the exterior enclosure 5180. Filtered greywater can be distributed to support the vegetation 5184 via an internal distribution system (e.g., a network of hoses; not shown) of the exterior enclosure 5180. The dock 5188 can include internal plumbing (e.g., under the floor 5256; not shown) fluidically connecting the water reservoir 5196 and the potable water inlet 5260, and fluidically connecting the greywater filter 5200 and the greywater outlet 5262. In at least some embodiments, this internal plumbing includes a pump (not shown). The dock 5188 can further include an exhaust output fan 5270 and an internal duct 5272 extending between the exhaust output fan 5270 and the exhaust filter 5192. The dock 5188 can also include an inverter 5274 operably connected to the electrical line 5224.

The real estate unit 5162 can be furnished or otherwise outfitted with suitable furnishings, fixtures, accessories, etc. to accommodate its alternative use. In the illustrated embodiment, the real estate unit 5162 is a lodging and/or residential unit with suitable furnishings, fixtures, accessories, etc. within the interior space 5138 to accommodate lodging and/or residential use of the interior space 5138. These furnishings, fixtures, accessories, etc. can include a bed 5276, a side table 5278, shelving units 5280 (individually identified as shelving units 5280*a*, 5280*b*), a writing table 5282, a chair 5284, a sofa 5286, a coffee table 5288, a television 5290, a kitchenette 5292, a refrigerator 5294, and a set of step stairs 5296. The kitchenette 5292 and the set of step stairs 5296 can be operably associated with the bathroom 5164. The real estate unit 5162 can further include a closet 5298 disposed (e.g., removably disposed) within the interior space 5138. In other embodiments, a counterpart of the real estate unit 5162 can include other suitable furnishings, fixtures, accessories, etc. As described in further detail below, real estate units in accordance with other embodiments of the present technology can be rentable office units, rentable assembly units, and/or have other suitable primarily uses in addition to or instead of lodging and/or residential uses. Furthermore, rentable real estate units in accordance with embodiments of the present technology can be directly rentable, rentable via a membership system (e.g., in a member-based network of real estate units), rentable under short-term use arrangements (e.g., lodging arrangements), and/or rentable in another manner.

Figure 130:
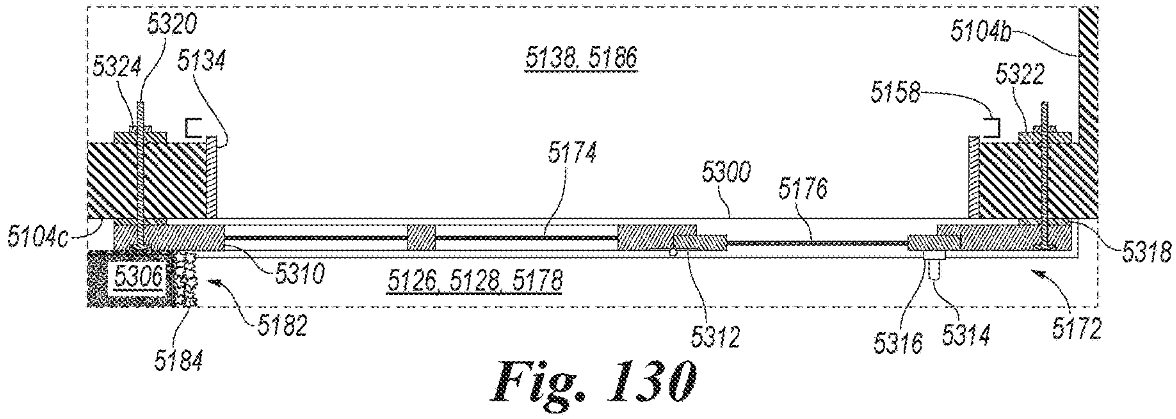
FIG. 130 is an enlarged view of a first portion of FIG. 129.
Figure 131:
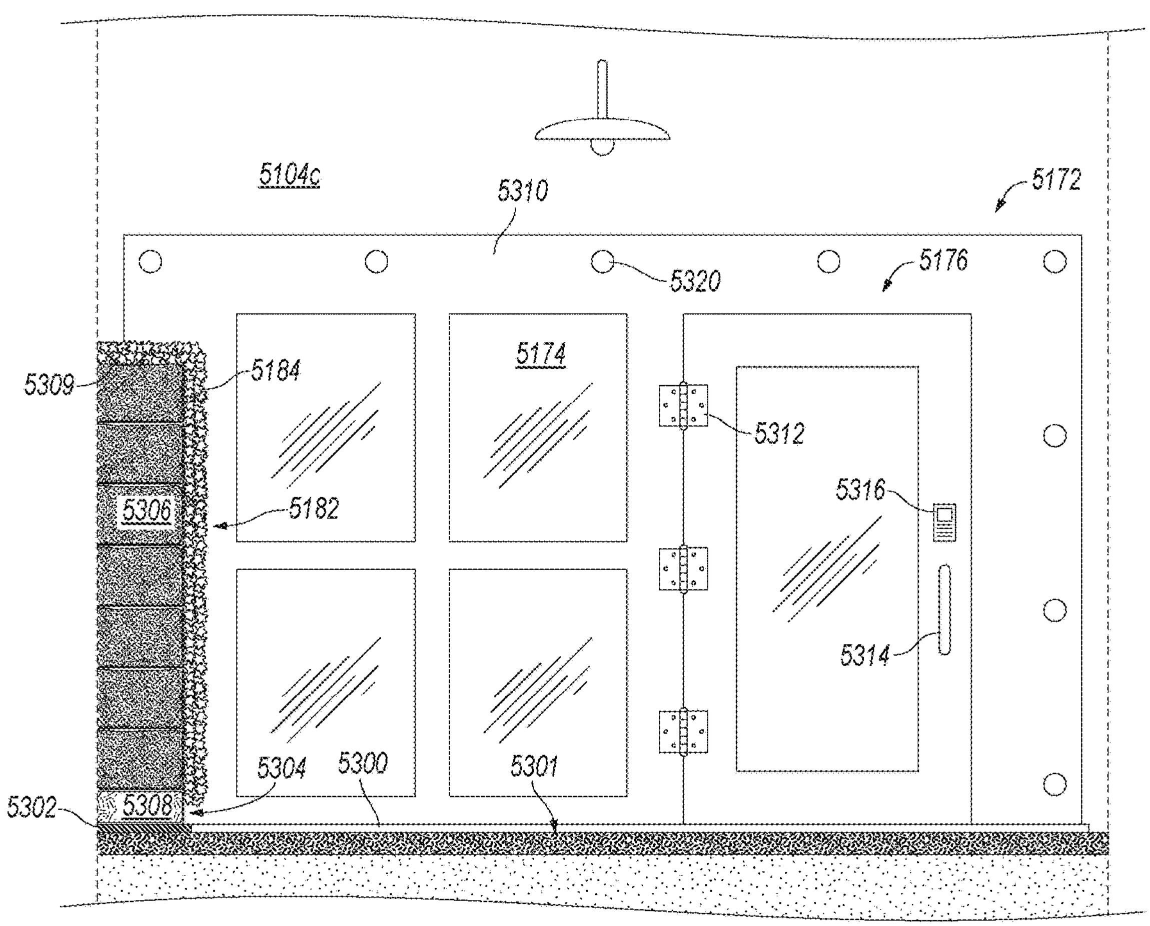
FIGS. 131 and 132 are, respectively, a cross-sectional exterior side profile view and a cross-sectional interior side profile view of a portion of the real estate unit shown in FIG. 129 corresponding to the first portion of FIG. 129 shown in FIG. 130.
Figure 132:
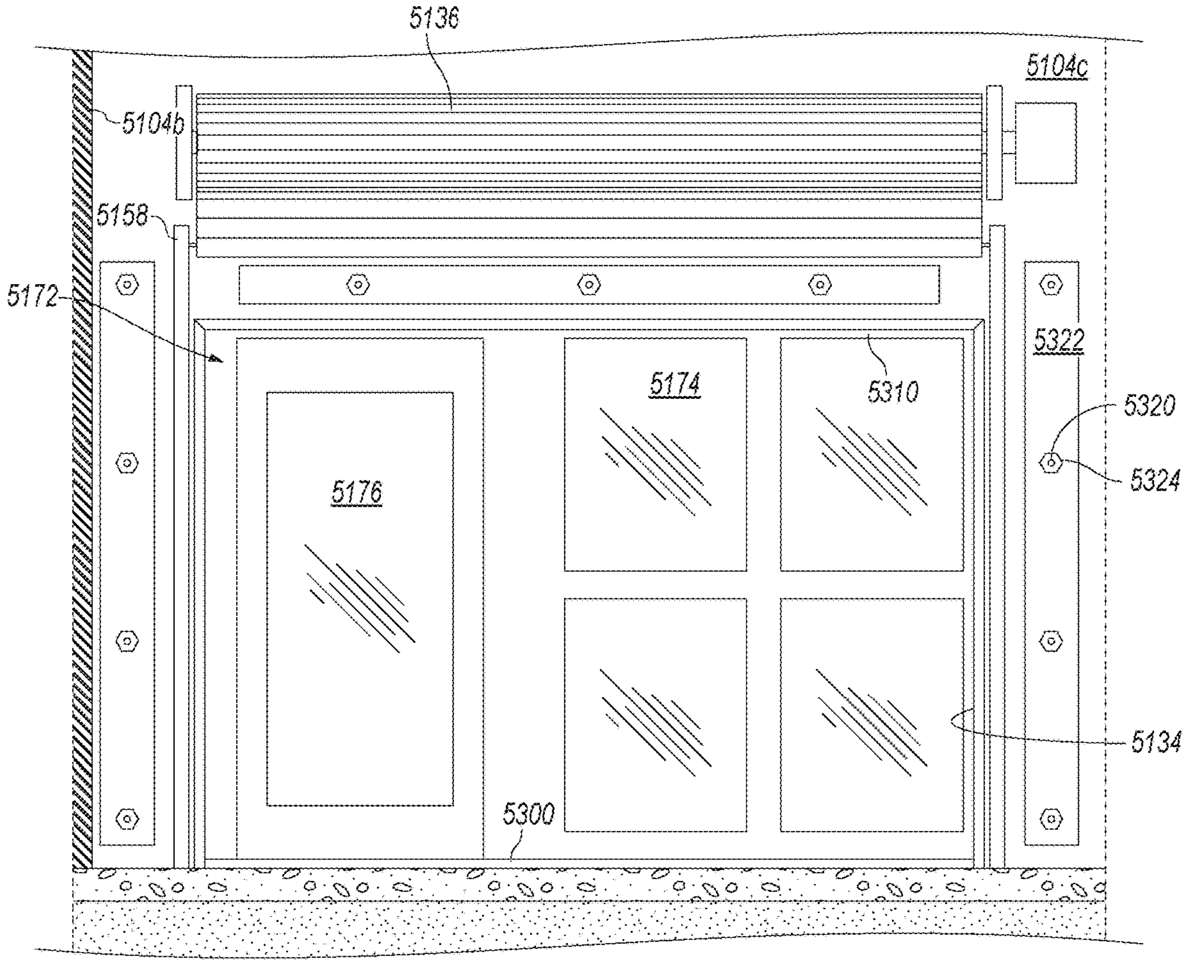

FIG. 130 is an enlarged view of a first portion of FIG. 129 showing the barrier 5172. FIGS. 131 and 132 are, respectively, a cross-sectional exterior side profile view and a cross-sectional interior side profile view of a portion of the real estate unit 5162 corresponding to the first portion of FIG. 129 shown in FIG. 130. With reference to FIGS. 129-132 together, the real estate unit 5162 can include a first mass of self-leveling material 5300 (e.g., a first disposable mass of hardened self-leveling grout) underlying the barrier 5172. The first mass of self-leveling material 5300 can be molded and, in at least some cases, is integrally formed along most or all of an overall footprint of the barrier 5172. During formation of the first mass of self-leveling material 5300, the constituent self-leveling material can be of sufficiently low viscosity to level itself by gravity. Thus, the first mass of self-leveling material 5300 can automatically conform to slopes, dips, and/or other irregularities in a ground surface at which the barrier 5172 is installed.

In at least some embodiments, the second outdoor area 5126 has a paved surface 5301 that is not level. The real estate unit 5162 can include a second mass of self-leveling material 5302 (e.g., a second disposable mass of hardened self-leveling grout) underlying the exterior wall components 5182. Similar to the first mass of self-leveling material 5300, the second mass of self-leveling material 5302 can be molded and, in at least some cases, is integrally formed along most or all of an overall footprint of the exterior enclosure 5180. During formation of the second mass of self-leveling material 5302, the constituent self-leveling material can be of sufficiently low viscosity to level itself by gravity. Thus, the second mass of self-leveling material 5302 can automatically conform to slopes, dips, and/or other irregularities in the paved surface 5301. When at least partially cured, the second mass of self-leveling material 5302 can provide the exterior enclosure 5180 with a reliably level surface that facilitates vertical stacking of the exterior wall components 5182.

As shown in FIG. 131, the exterior enclosure 5180 can include base blocks 5304 between the second mass of self-leveling material 5302 and the lowermost row of the exterior wall components 5182. The exterior wall components 5182 can be hollow and can contain planting medium 5306. The base blocks 5304 can also be hollow and can contain antimicrobial medium 5308. The exterior enclosure 5180 can further include a soaker hose 5309 that receives filtered greywater from the second hose 5266. In the illustrated embodiment, the soaker hose 5309 is loosely disposed in a serpentine manner at an upper portion of an uppermost row of the exterior wall components 5182 within the exterior enclosure 5180. The soaker hose 5309 can distribute filtered greywater throughout the planting medium 5306 at the uppermost row of the exterior wall components 5182. Once the planting medium 5306 at the uppermost row of the exterior wall components 5182 is saturated, the filtered greywater can move by gravity and/or capillary action to the planting medium 5306 at a second-to-uppermost row of the exterior wall components 5182 within the exterior enclosure 5180. This process can continue until the filtered greywater reaches the antimicrobial medium 5308. The antimicrobial medium 5308 can be a synthetic sponge or other suitable substrate that reduces or eliminates pooling of the excess filtered greywater within the base blocks 5304. Excess filtered greywater within the antimicrobial medium 5308 can drain from the base blocks 5304 onto the paved surface 5301 and along the paved surface 5301 to a storm drain (not shown). In other embodiments, the filtered greywater can be distributed through the exterior enclosure 5180 in another manner. For example, a counterpart of the exterior enclosure 5180 can include separate soaker hoses at respective rows of counterparts of the exterior wall components 5182. These soaker hoses can be connected to a counterpart of the second hose 5266 via a manifold. In still other embodiments, a counterpart of the exterior enclosure 5180 can have an irrigation system that uses freshwater instead of filtered greywater, or no irrigation system at all.

With reference again to FIGS. 129-132 together, the barrier 5172 can include a frame 5310, hinges 5312 operably connecting the door 5176 and the frame 5310 to one another, and a handle 5314 that facilitates operation of the door 5176 from outside the interior space 5138. The barrier 5172 can further include a smart lock 5316 configured to allow a renter of the real estate unit 5162 to unlock the door 5176 by operation of a mobile device (e.g. a mobile phone), by entering a passcode, by providing a biometric identification (e.g., a fingerprint), or in another manner. The barrier 5172 can be removably fastened to the exterior wall 5104*c*. In the illustrated embodiment, the barrier 5172 is removably bolted to the exterior wall 5104*c*. In other embodiments, a counterpart of the barrier 5172 can be removably screwed to the exterior wall 5104*c*, removably clamped to the exterior wall 5104*c*, and/or removably fastened to the exterior wall 5104*c* in another manner in addition to or instead of being removably bolted to the exterior wall 5104*c*. In still other embodiments, a counterpart of the barrier 5172 can be permanently installed at the exterior wall 5104*c*.

With reference again to FIGS. 129-132, the barrier 5172 can include a gasket 5318 disposed between the frame 5310 and the exterior wall 5104*c*. The gasket 5318 can be compressible such that it conforms to irregularities in the exterior wall 5104*c* and thereby enhances a weather resistance of a connection between the barrier 5172 and the exterior wall 5104*c*. The barrier 5172 can further include bolts 5320 that extend through the frame 5310, through the gasket 5318, and through the exterior wall 5104*c*. At an inside surface of the exterior wall 5104*c*, the barrier 5172 can include furring strips 5322 through which the bolts 5320 also extend, and nuts 5324 operably connected to the bolts 5320 and bearing on the furring strips 5322. In the illustrated embodiment, the barrier 5172 is an overlay that covers the opening 5134 at an exterior side of the exterior wall 5104*c*. In other embodiments, the barrier 5172 can have another form and/or position relative to the opening 5134. For example, rather than being disposed at the exterior side of the exterior wall 5104*c*, a counterpart of the barrier 5113 can be disposed at an interior side of the exterior wall 5104*c*.

As shown in FIG. 132, in the illustrated embodiment, the overhead door 5136 is stowed within the interior space 5138 in an open state. For example, the door track 5158 can remain in place after the interior space 5138 is retrofitted for an alternative use. A motor (not shown) operably connected to the overhead door 5136 can be temporarily disabled so that the overhead door 5136 remains out-of-service during operation of the real estate unit 5162. Leaving the overhead door 5136 and the door track 5158 in place after the interior space 5138 is retrofitted for an alternative use can be useful, for example, to reduce an investment necessary to return the interior space 5138 its purpose-built use, as needed. In other embodiments, the overhead door 5136 can be removed from the interior space 5138 when the interior space 5138 is retrofitted for an alternative use. In still other embodiments, a counterpart of the overhead door 5136 can be retrofitted with windows and/or a doorway. In these embodiments, the counterpart of the overhead door 5136 can take the place of the barrier 5172.

Figure 133:
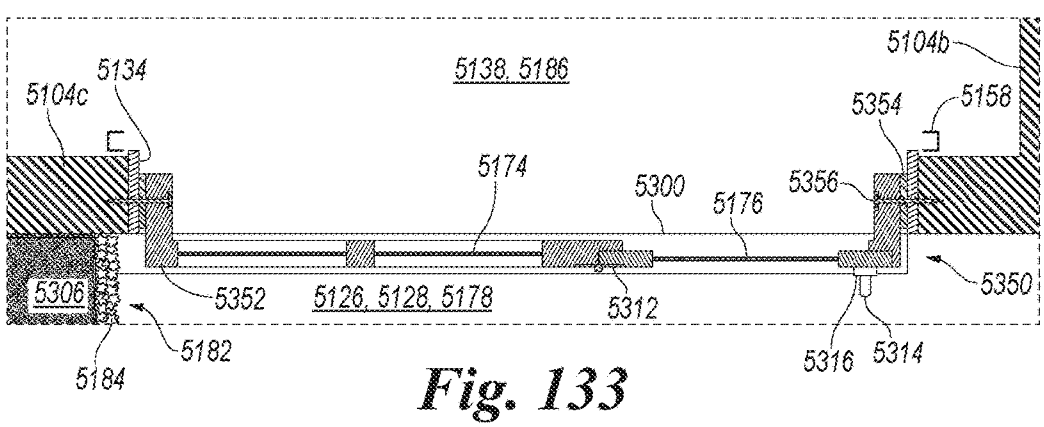
FIG. 133 is a cross-sectional top plan view of a portion of a real estate unit in accordance with another embodiment of the present technology corresponding to the first portion of FIG. 129 shown in FIG. 130.

FIG. 133 is a cross-sectional top plan view of a portion of a real estate unit in accordance with another embodiment of the present technology corresponding to the first portion of FIG. 129 shown in FIG. 130. The real estate unit shown in FIG. 133 includes a barrier 5350. In contrast to the barrier 5172 shown in FIGS. 129-132, the barrier 5350 is an insert rather than an overlay. For example, the barrier 5350 can be disposed within the opening 5134 rather than at an exterior or interior side of the exterior wall 5104*c*. As shown in FIG. 133, the barrier 5350 can include a frame 5352 that is narrower than the opening 5134. The barrier 5350 can further include a gasket 5354 disposed between the frame 5352 and sidewalls of the opening 5134. The barrier 5350 can also include screws 5356 extending laterally into portions of the exterior wall 5104*c* on opposite sides of the opening 5134. The gasket 5354 can be layered to compensate for a difference between a width of the frame 5352 and a width of the opening 5134, such as when the barrier 5350 is a standard size and the opening 5134 is a non-standard size. Although not adaptable to as wide a range of opening widths as the barrier 5172 described above, the barrier 5350 may be preferred over the barrier 5172 in some cases for aesthetic or other reasons.

Figure 134:
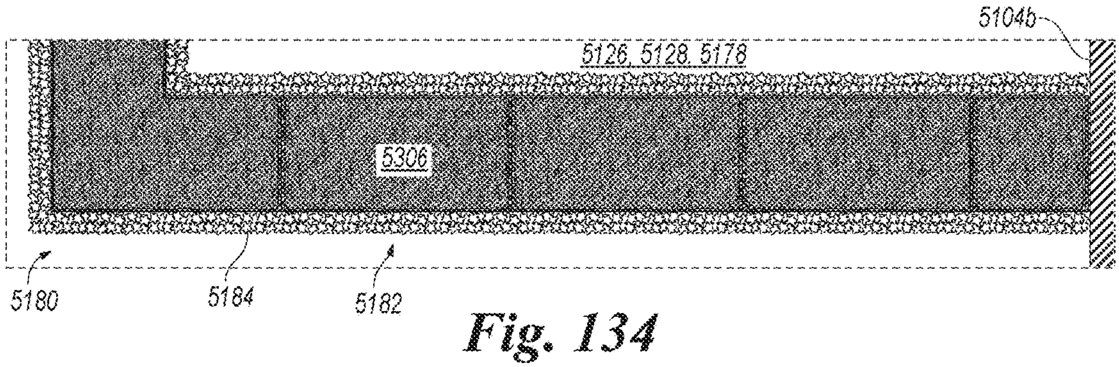
FIG. 134 is an enlarged view of a second portion of FIG. 129.
Figure 135:
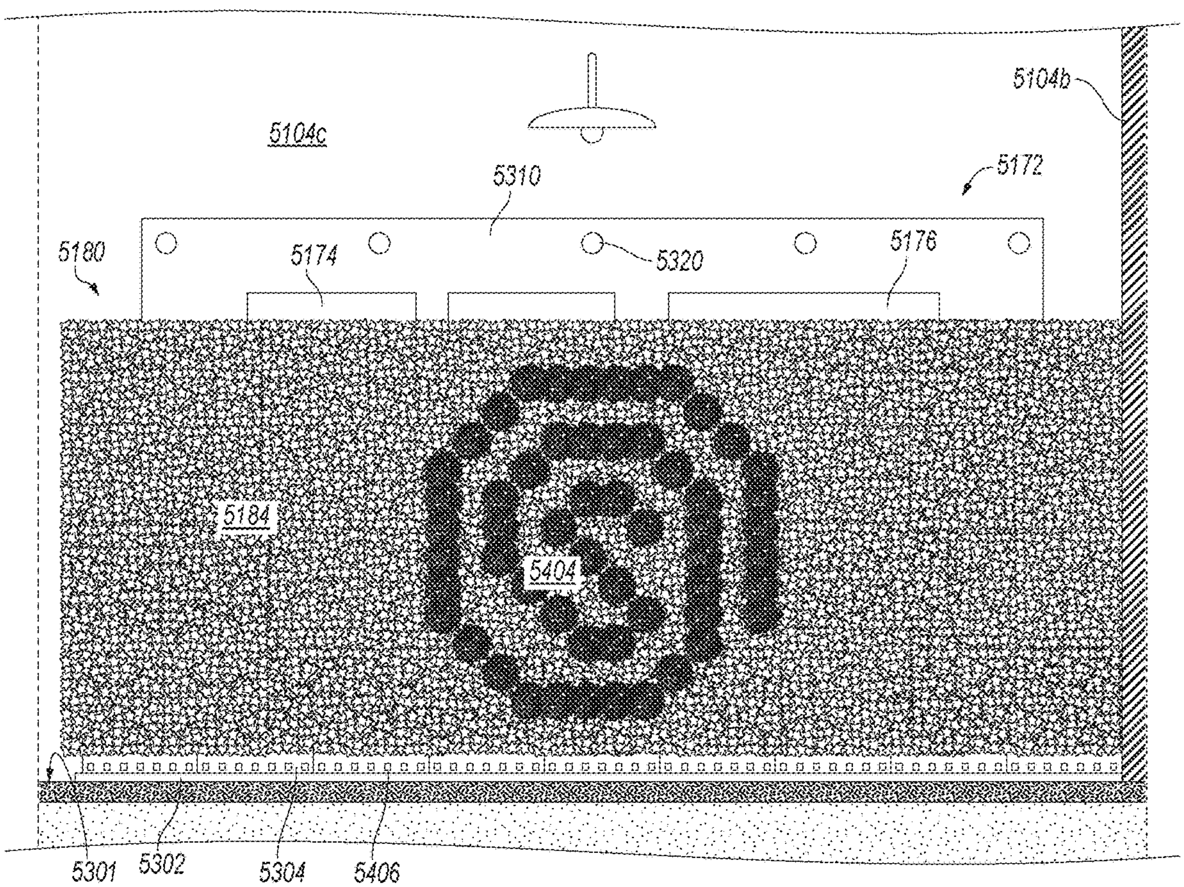
FIG. 135 is a cross-sectional exterior side profile view of a portion of the real estate unit shown in FIG. 129 corresponding to the second portion of FIG. 129 shown in FIG. 134.
Figure 136:
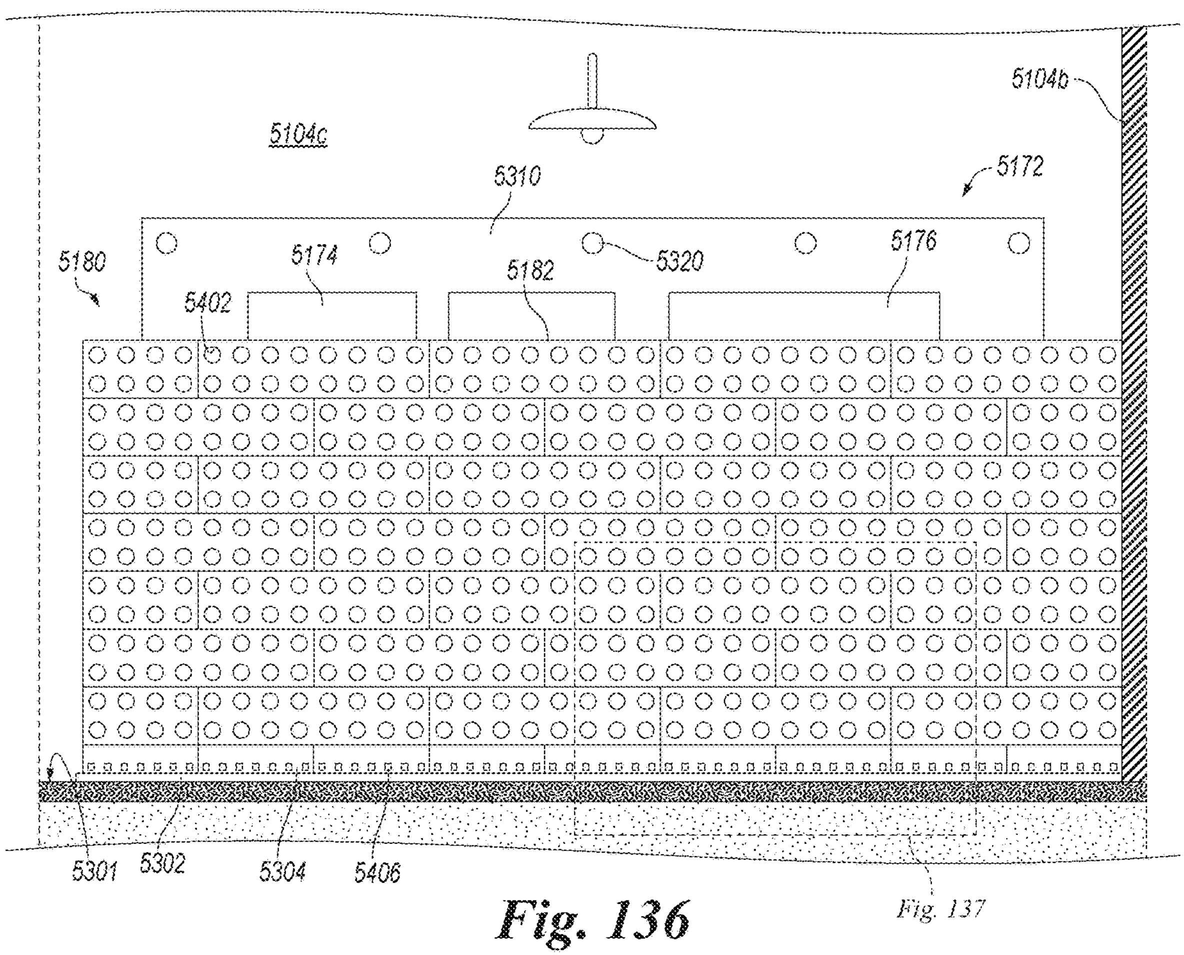
FIG. 136 is a cross-sectional exterior side profile view of the portion of the real estate unit shown in FIG. 129 corresponding to the second portion of FIG. 129 shown in FIG. 134 with vegetation of an exterior enclosure of the real estate unit not shown.

FIG. 134 is an enlarged view of a second portion of FIG. 129 showing a portion of the exterior enclosure 5180. FIGS. 135 and 136 are cross-sectional exterior side profile views of a portion of the real estate unit 5162 corresponding to the second portion of FIG. 129 shown in FIG. 134 with the vegetation 5184 shown and not shown, respectively. FIG. 12 is an enlarged view of a portion of FIG. 136. With reference to FIGS. 129-132 and 134-137 together, the exterior enclosure 5180 can include staggered rows of the exterior wall components 5182. For example, the exterior wall components 5182 at a corner of the exterior enclosure 5180 distant from the exterior wall 5104*c* can alternate row-to-row between larger and smaller L-shapes. Similarly, the exterior wall components 5182 at a portion of the exterior enclosure 5180 closest to the exterior wall 5104*c* and at a portion of the exterior enclosure 5180 closest to the neighboring commercial building 5101*b* can alternate row-to-row between larger and smaller rectangular shapes. Elsewhere within the exterior enclosure 5180, the exterior wall components 5182 can have the larger rectangular shape.

Figure 137:
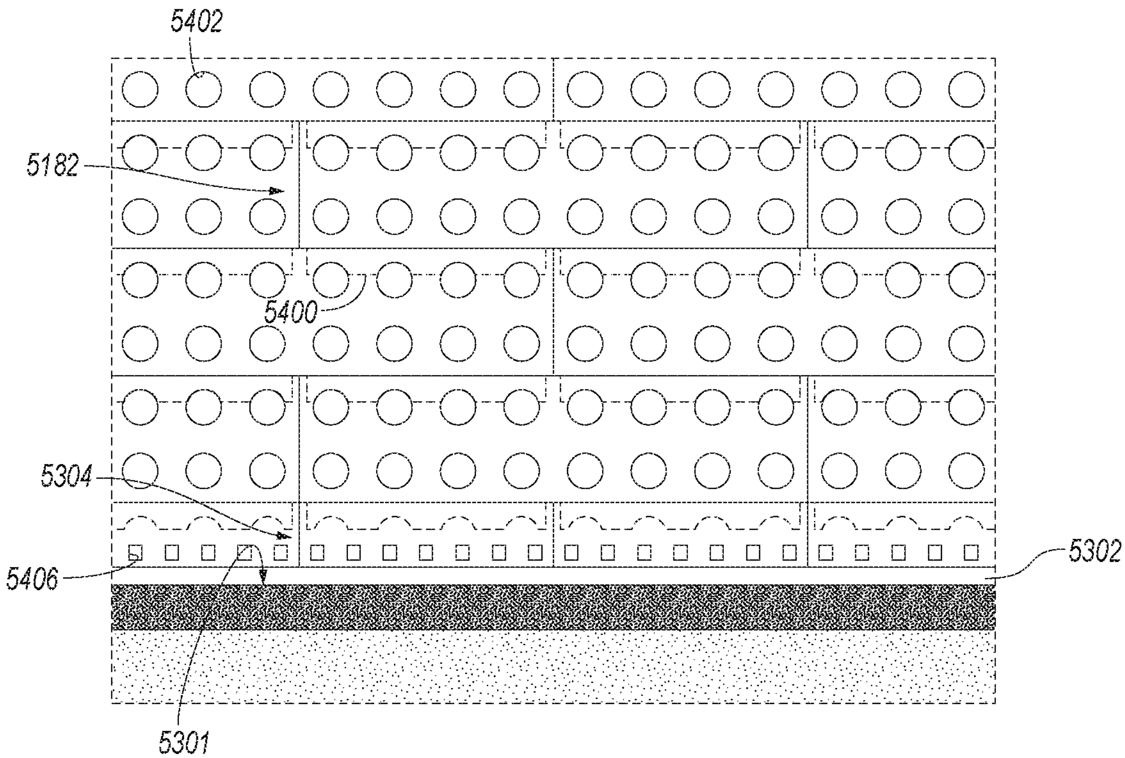
FIG. 137 is an enlarged view of a portion of FIG. 136.

The overall exterior enclosure 5180 can be at least substantially self-supporting and/or at least substantially free-standing. As shown in FIG. 137, the exterior wall components 5182 can be stacked within the exterior enclosure 5180. Furthermore, the exterior wall components 5182 can be interlocking within the exterior enclosure 5180. For example, the individual exterior wall components 5182 can include downwardly extending flanges 5400 that are received within successively lower exterior wall components 5182. The base blocks 5304 can be configured to receive the flanges 5400 of the exterior wall components 5182 within a lowest row of exterior wall components 5182 within the exterior enclosure 5180. As discussed above, the exterior wall components 5182 can be planters. In at least some embodiments, the exterior wall components 5182 include apertures 5402 through which the vegetation 5184 grows outwardly from roots (not shown) within the exterior wall components 5182. The apertures 5402 can be large enough to allow passage of bulbs, cuttings, seedlings, etc. (not just seeds) into the planting medium 5306 after the exterior enclosure 5180 is assembled. For example, the individual apertures 5402 can have a width greater than 2 centimeters, such as a width within a range from 2 to 8 centimeters. As discussed above, the exterior enclosure 5180 can be configured to facilitate distribution of filtered greywater throughout the planting medium 5306. The base blocks 5304 can include holes 5406 through which excess filtered greywater exits the exterior enclosure 5180.

As shown in FIG. 135, the apertures 5402 can be differentially planted to form a brand identifier 5404 (e.g., a trade and/or service mark) or other design at an exterior side (e.g., an alley-facing side) of the exterior enclosure 5180. Differential planting can include selectively planting the apertures 5402 with multiple types of plants and/or selectively planting and not planting the apertures 5402 with a single type of plant. For example, the non-planted apertures 5402 can be capped. Forming a brand identifier 5404 by differential planting can be useful to balance aesthetic considerations with the need for clear communication of a brand associated with the real estate unit 5162 to consumers. The apertures 5402 can collectively form an array that facilitates forming the brand identifier 5404 in a consistent manner when the real estate unit 5162 is one of many real estate units for which the brand identifier 5404 is applicable. For example, a given aperture 5402 can be planted with a predetermined plant depending on its position within the array according to a reproducible plan. A template (not shown) can be temporarily placed over the exterior side of the exterior enclosure 5180 and registered to the array to facilitate rapid execution of the plan with little or no need for customized execution of the plan in the field. Furthermore, using relatively large and/or more mature plantings can allow the vegetation 5184 to be formed more efficiently and/or with less lead time than would be the case using seeds.

Figure 138:
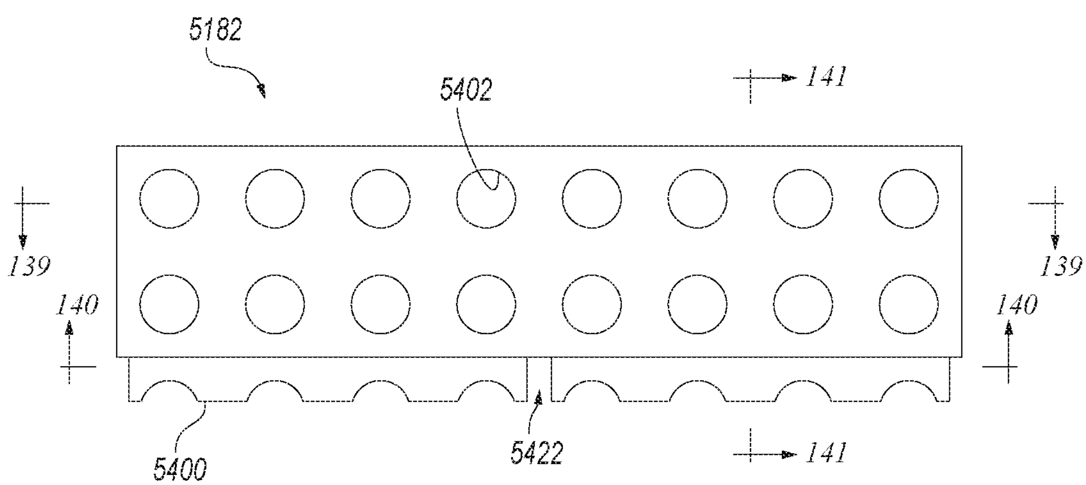
FIG. 138 is side profile view of an exterior wall component of the exterior enclosure of the real estate unit shown in FIG. 129.
Figure 139:
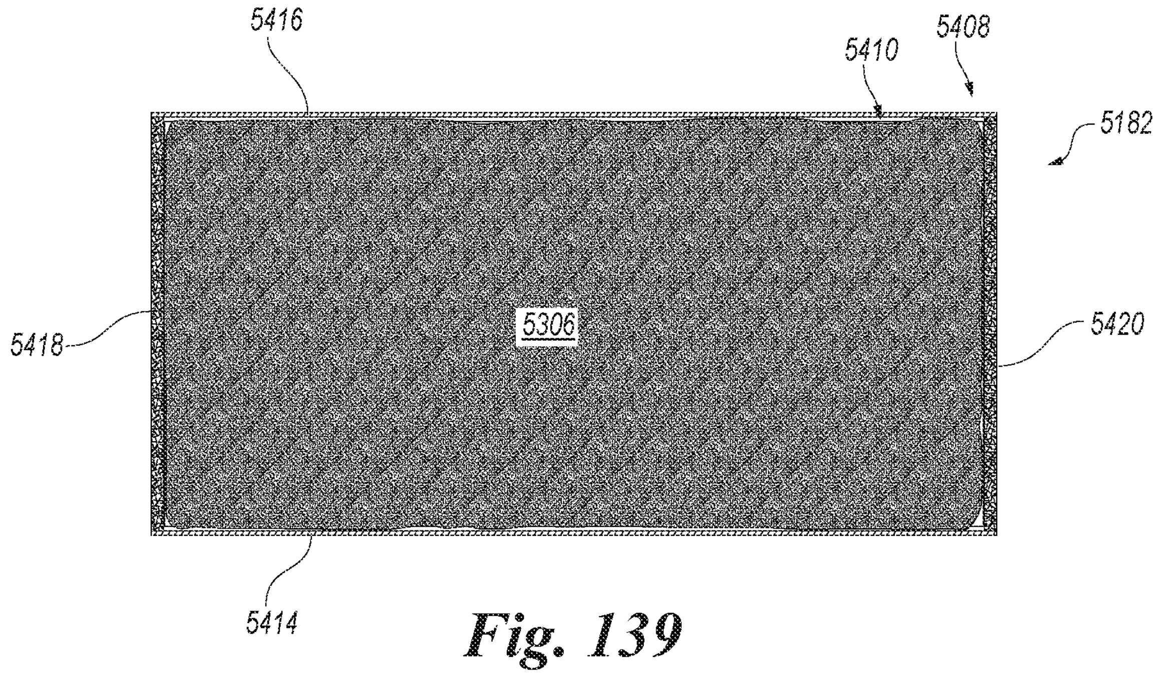
FIG. 139 is a cross-sectional top plan view of the exterior wall component of the exterior enclosure of the real estate unit shown in FIG. 129 taken along the line 139-139 in FIG. 138.
Figure 140:
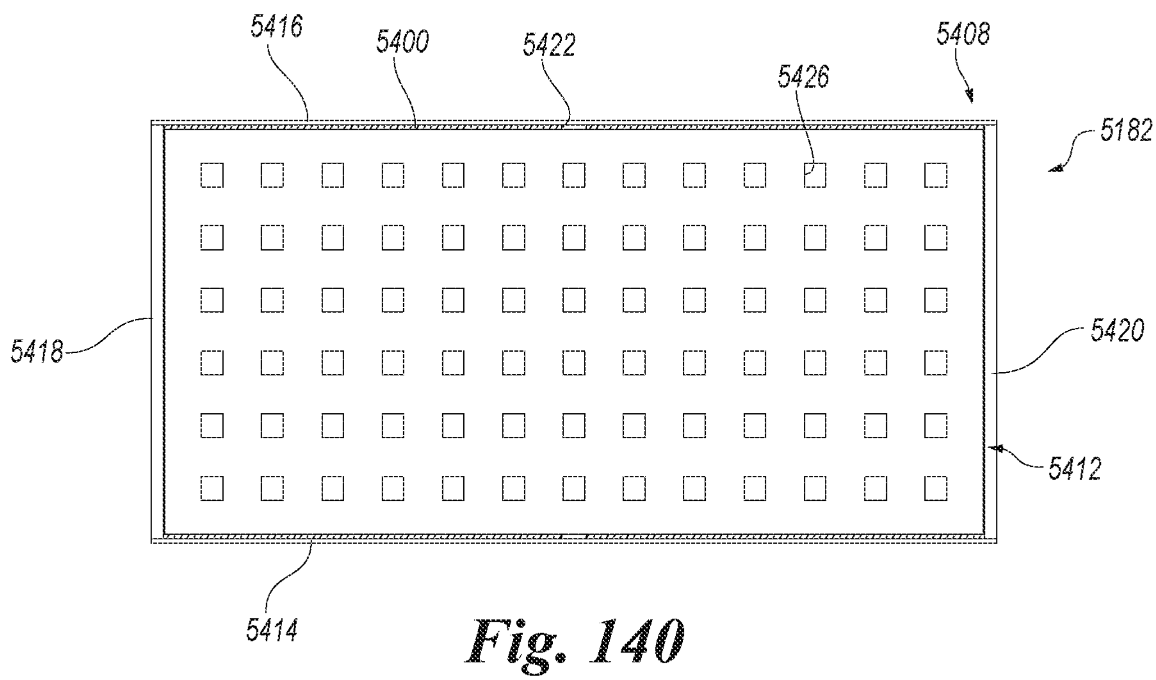
FIG. 140 is a cross-sectional bottom plan view of the exterior wall component of the exterior enclosure of the real estate unit shown in FIG. 129 taken along the line 140-140 in FIG. 138.
Figure 141:
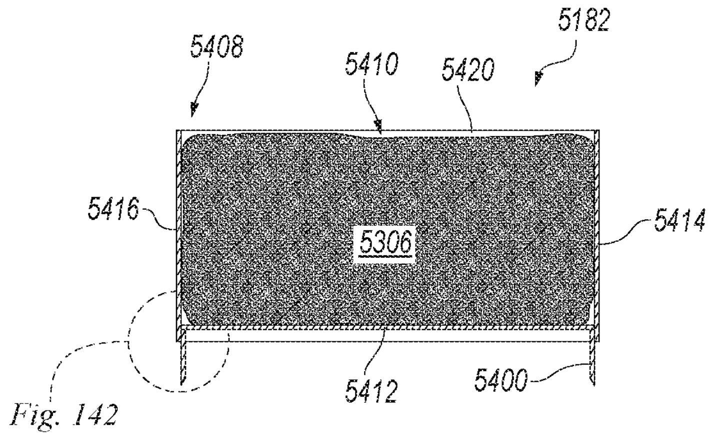
Figure 142:
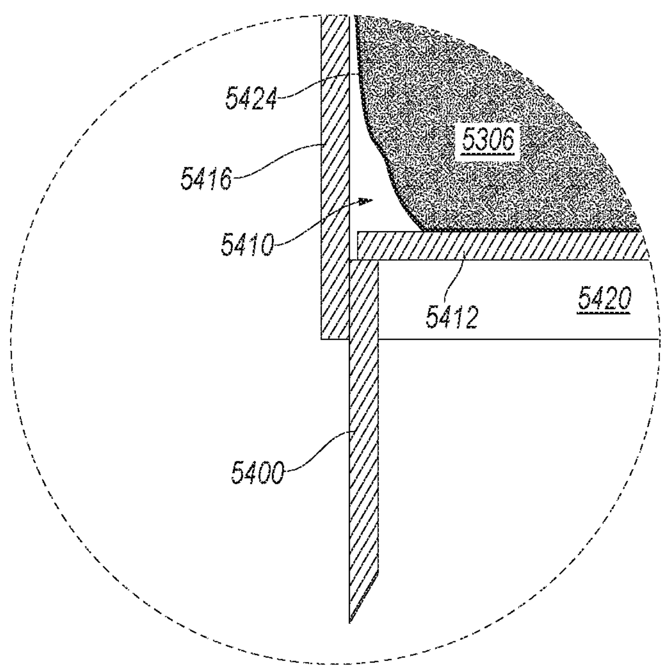

FIG. 138 is side profile view of a given one of the exterior wall components 5182 separate from other portions of the exterior enclosure 5180. FIG. 139 is a cross-sectional top plan view of the given exterior wall component 5182 taken along the line 139-139 in FIG. 138. FIG. 140 is a cross-sectional bottom plan view of the given exterior wall component 5182 taken along the line 140-140 in FIG. 138. FIG. 141 is a cross-sectional end plan view of the given exterior wall component 5182 taken along the line 141-141 in FIG. 138. FIG. 142 is an enlarged view of a portion of FIG. 141. The given exterior wall component 5182 can be of the large rectangular type. In at least some embodiments, other (e.g., most or all) of the exterior wall components 5182 of the large rectangular type within the exterior enclosure 5180 at least substantially match the given exterior wall component 5182. Furthermore, exterior wall components 5182 of other types (e.g., small rectangular, large L-shaped, small L-shaped, etc.) can have the same or similar features as the features of the given exterior wall component 5182. With reference to FIGS. 138-142 together, the given exterior wall component 5182 can include a rigid shell 5408, a package 5410 removably disposed within the shell 5408, and a rigid plate 5412 also removably disposed within the shell 5408. The package 5410 can contain the planting medium 5306 in a tidy form. The plate 5412 can support the package 5410.

The shell 5408 can include a first side panel 5414 and an opposite second side panel 5416 parallel to and spaced apart from the first side panel 5414. Similarly, the shell 5408 can include a first end panel 5418 and an opposite second end panel 5420 parallel to and spaced apart from the first end panel 5418. The first and second side panels 5414, 5416 and the first and second end panels 5418, 5420 can define an interior region of the given exterior wall component 5182 shaped, for example, as a rectangular solid. The apertures 5402 can extend through the shell 5408 at the first and second side panels 5414, 5416. Alternatively, the apertures 5402 can extend through the shell 5408 at only the first side panel 5414 or at only the second side panel 5416 if the vegetation 5184 is only desired at one or the other of the interior and exterior sides of the exterior enclosure 5180.

In at least some embodiments, the shell 5408 is collapsible from an expanded state to a compact (e.g., at least partially flattened) state. For example, at corners where the first and second side panels 5414, 5416 and the first and second end panels 5418, 5420 meet, the given exterior wall component 5182 can include hinges (not shown), such as flexure bearings or piano hinges, that allow each corner to fold in a direction that causes the first and second side panels 5414, 5416 and the first and second end panels 5418, 5420 to at least partially flatten. This feature can facilitate efficient storage and transport of the shell 5408 before and/or after its deployment at the real estate unit 5162. In at least some embodiments, the plate 5412 helps to hold the shell 5408 in the expanded state. As shown in FIG. 142, a lowermost portion of the first side panel 5414 can overlap an uppermost portion of one the flanges 5400. The plate 5412 can rest on upper edges of the flanges 5400.

The given exterior wall component 5182 can include two of the flanges 5400 at the first side panel 5414 and another two of the flanges 5400 at the second side panel 5416. As shown in FIG. 141, the flanges 5400 can be parallel to and inset relative to the corresponding first and second side panels 5414, 5416. Between the flanges 5400 at the first side panel 5414 and between the flanges 5400 at the second side panel 5416, the given exterior wall component 5182 can include respective slots 5422. When the given exterior wall component 5182 is assembled with other exterior wall components 5182 of the large rectangular type within the exterior enclosure 5180, one of the flanges 5400 at the first side panel 5414 and an opposing one of the flanges 5400 at the second side panel 5416 can be received within the interior region of a first neighboring lower exterior wall component 5182. Similarly, the other of the flanges 5400 at the first side panel 5414 and the other of the flanges 5400 at the second side panel 5416 can be received within the interior region of a second neighboring lower exterior wall component 5182 adjacent to the first neighboring lower exterior wall component 5182. The second end panel 5420 of the first neighboring lower exterior wall component 5182 and the first end panel 5418 of the second neighboring lower exterior wall component 5182 can be directly adjacent to one another and received within the slots 5422 of the given exterior wall component 5182. This interaction between the exterior wall components 5182 can facilitate convenient assembly of the exterior enclosure 5180 with neighboring rows of the exterior wall components 5182 evenly staggered.

Figure 143:
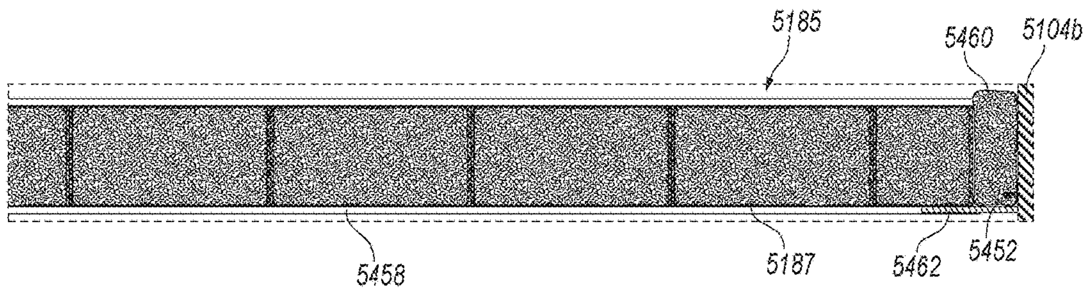

In the illustrated embodiment, the first and second side panels 5414, 5416 are thinner than the first and second end panels 5418, 5420 and made of a different material. For example, the first and second side panels 5414, 5416 can be metal (e.g., iron) and the first and second end panels 5418, 5420 can be cementitious (e.g., fiber-reinforced cement). The metal composition of the first and second side panels 5414, 5416 can be useful, for example, for aesthetics, to facilitate magnetic coupling of fixtures and accessories to the exterior enclosure 5180, and/or for other reasons. The cementitious composition of the first and second end panels 5418, 5420 can be useful, for example, to reduce noise transmission through the exterior enclosure 5180, for cost savings, and/or for other reasons. In other embodiments, the first and second side panels 5414, 5416 and the first and second end panels 5418, 5420 can have other compositions. The package 5410 can be reusable and/or compostable. Furthermore, the package 5410 can be configured to remain at least substantially intact for convenient reuse and/or composting upon disassembly of the exterior enclosure 5180. In at least some embodiments, the package 5410 includes a biodegradable skin 5424 that contains the planting medium 5306. When the exterior enclosure 5180 is assembled, the skin 5424 can be punctured via the apertures 5402. Suitable materials for the skin 5424 include burlap and cotton, among others. As shown in FIG. 143, the plate 5412 can include perforations 5426 through which water can flow by gravity from one exterior wall component 5182 to a neighboring lower exterior wall component 5182 (or base block 5304).

Figure 144:
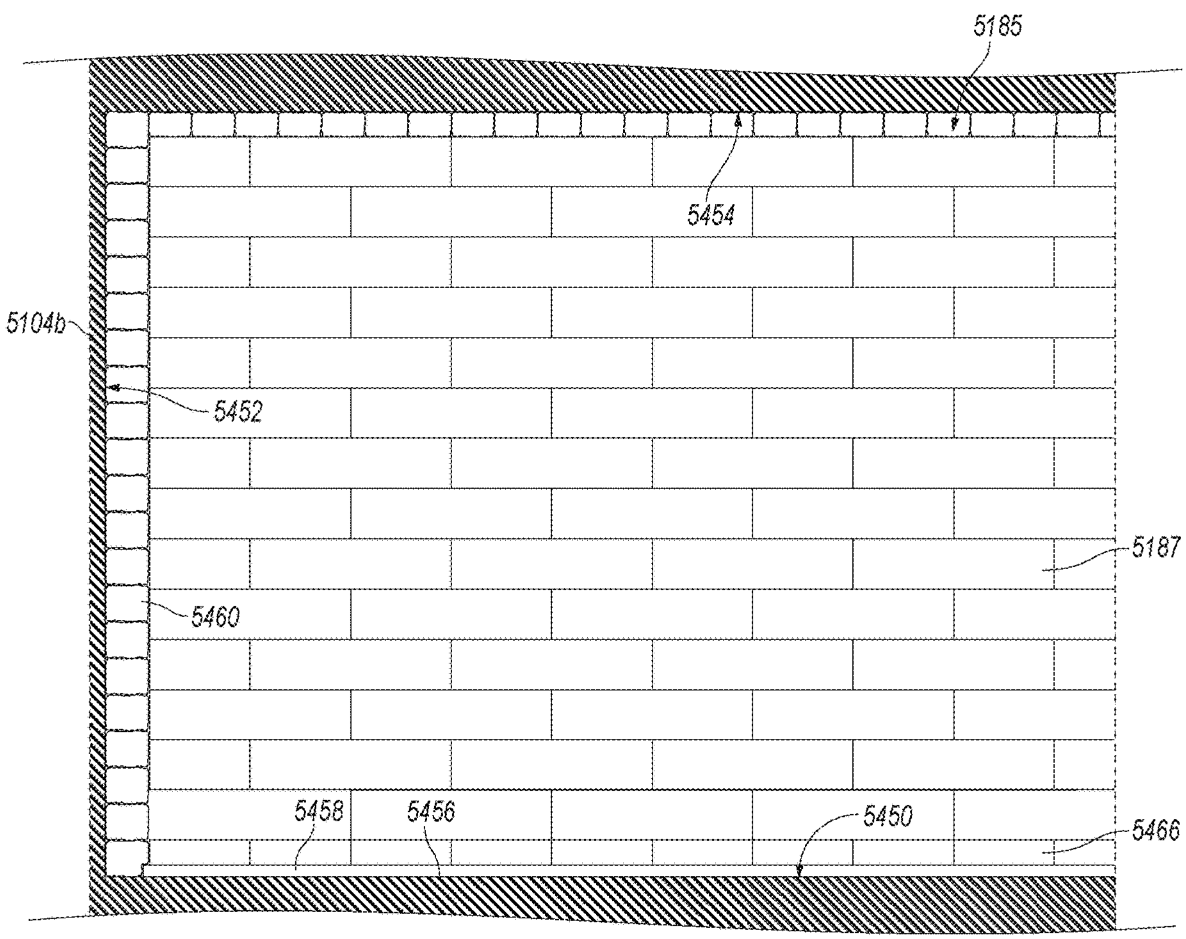
Figure 145:
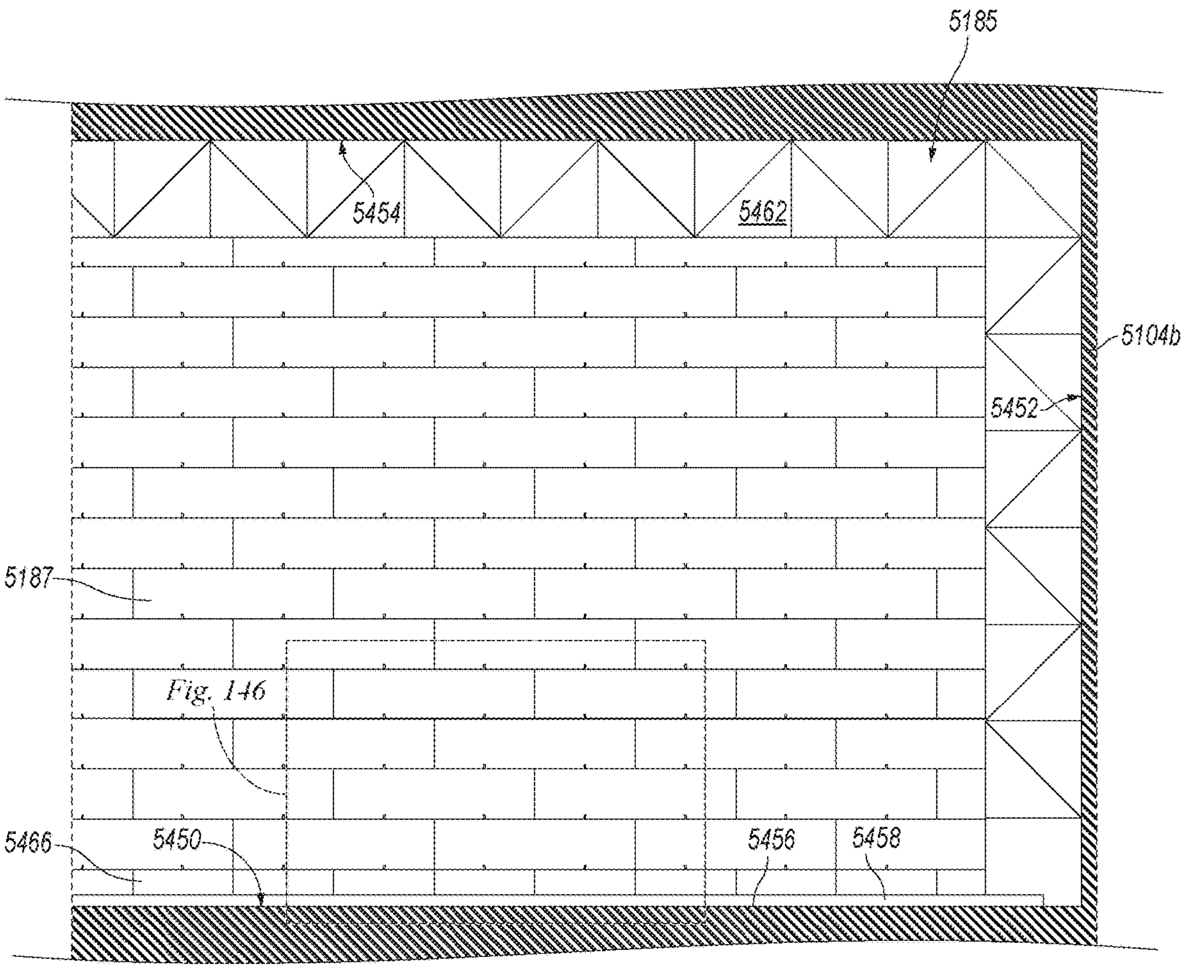
Figure 146:
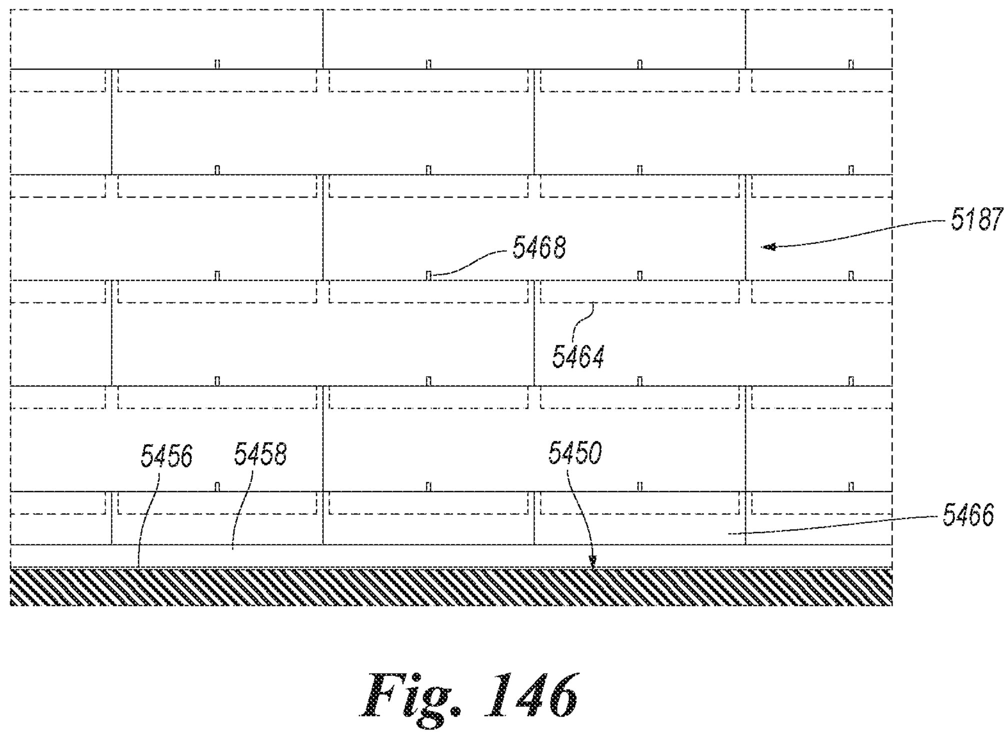

FIG. 143 is an enlarged view of a third portion of FIG. 129 showing a portion of the compartmentalizing assembly 5185. FIGS. 144 and 145 are, respectively, a cross-sectional exterior (i.e., facing outward relative to the compartment 5186) side profile view and a cross-sectional interior (i.e., facing inward relative to the compartment 5186) side profile view of a portion of the real estate unit 5162 corresponding to the third portion of FIG. 129 shown in FIG. 143. With reference to FIGS. 129 and 143-146 together, the compartmentalizing assembly 5185 can include staggered rows of the interior wall components 5187. For example, the interior wall components 5187 at a corner of the compartmentalizing assembly 5185 distant from the exterior wall 5104*b* can alternate row-to-row between larger and smaller L-shapes. Similarly, the interior wall components 5187 at a portion of the compartmentalizing assembly 5185 closest to the exterior wall 5104*b* and at a portion of the compartmentalizing assembly 5185 closest to the exterior wall 5104*c* can alternate row-to-row between larger and smaller rectangular shapes. Elsewhere within the compartmentalizing assembly 5185, the interior wall components 5187 can have the larger rectangular shape. The overall compartmentalizing assembly 5185 can be at least substantially self-supporting and/or at least substantially free-standing.

The interior space 5138 can have a finished floor surface 5450 over which the interior wall components 5187 are removably disposed, a finished wall surface 5452 beside which the interior wall components 5187 are removably disposed, and a finished ceiling surface 5454 below which the interior wall components 5187 are removably disposed. The compartmentalizing assembly 5185 can include a liner 5456 disposed (e.g., removably or permanently disposed) on the finished floor surface 5450 below the interior wall components 5187. For example, the liner 5456 can be adhesively connected to the finished floor surface 5450. The liner 5456 can be useful, for example, to protect the finished floor surface 5450 from components of the compartmentalizing assembly 5185, to facilitate layout the compartmentalizing assembly 5185, to reduce or eliminate the possibility of shifting of the compartmentalizing assembly 5185, and/or for other purposes. Suitable materials for the liner 5456 include strips of peel-and-stick house wrap and strips of peel-and-stick roof underlayment. The liner 5456 can be disposable or reusable.

In at least some embodiments, the compartmentalizing assembly 5185 includes additional components that facilitate compatibility between the interior wall components 5187 and the interior space 5138 when the interior wall components 5187 have standard dimensions and the interior space 5138 has irregular dimensions. For example, the compartmentalizing assembly 5185 can include a third mass of self-leveling material 5458 (e.g., a disposable mass of hardened self-leveling grout) under the interior wall components 5187 and over the liner 5456. The third mass of self-leveling material 5458 can be molded and, in at least some cases, is integrally formed along most or all of an overall footprint of the compartmentalizing assembly 5185. During formation of the third mass of self-leveling material 5458, the constituent self-leveling material can be of sufficiently low viscosity to level itself by gravity. Thus, the third mass of self-leveling material 5458 can automatically conform to slopes, dips, and other irregularities in the finished floor surface 5450. When at least partially cured, the third mass of self-leveling material 5458 can provide the compartmentalizing assembly 5185 with a reliably level surface that facilitates vertical stacking of the interior wall components 5187.

As shown in FIGS. 143 and 144, the compartmentalizing assembly 5185 can include compressible batting 5460 disposed (e.g., stuffed) into a vertical gap between the interior wall components 5187 and the finished wall surface 5452 and disposed (e.g., stuffed) into a horizontal gap between the interior wall components 5187 and the finished ceiling surface 5454. In the illustrated embodiment, the batting 5460 is not present between the compartmentalizing assembly 5185 and the exterior wall 5104*c*. Thus, the batting 5460 can be present along some joints between the compartmentalizing assembly 5185 and corresponding surfaces of the interior space 5138 and not others. In other embodiments, a counterpart of the batting 5460 can be present at all or no counterparts of these joints. When present, the batting 5460 can be reusable. Furthermore, the batting 5460 can be non-combustible. For example, the batting 5460 can be reusable bundles of lined or unlined mineral wool insulation. As shown in FIG. 145, the compartmentalizing assembly 5185 can include inwardly facing molding panels 5462 that hide the batting 5460 from inside the compartment 5186. The molding panels 5462 can be attached to the interior wall components 5187 magnetically, adhesively, mechanically, or in another manner. In at least some embodiments, the overall compartmentalizing assembly 5185 has a fire rating of at least two hours. This can be useful, for example, for building-code compliance when the real estate unit 5162 has a use different than another ongoing use within the commercial building 5100.

The interior wall components 5187 can include features similar to those described above for the exterior wall components 5182. For example, the individual interior wall components 5187 can include downwardly extending flanges 5464 that are received within successively lower interior wall components 5187. The compartmentalizing assembly 5185 can further include base blocks 5466 configured to receive the flanges 5464 of the interior wall components 5187 within a lowest row of interior wall components 5187 within the compartmentalizing assembly 5185. When fully assembled, the compartmentalizing assembly 5185 can be strong enough to support fixtures and accessories (e.g., electrical conduits, monitors, shelving, moldings, artwork, furniture supports, etc.). In at least some embodiments, exposed portions of the interior wall components 5187 are at least partially made of ferrous metal such that fixtures and accessories can be connected to the compartmentalizing assembly 5185 magnetically. In addition or alternatively, the interior wall components 5187 can include coupling components 5468 that allow fixtures and accessories to be connected to the compartmentalizing assembly 5185 mechanically and/or by gravity.

Figure 147:
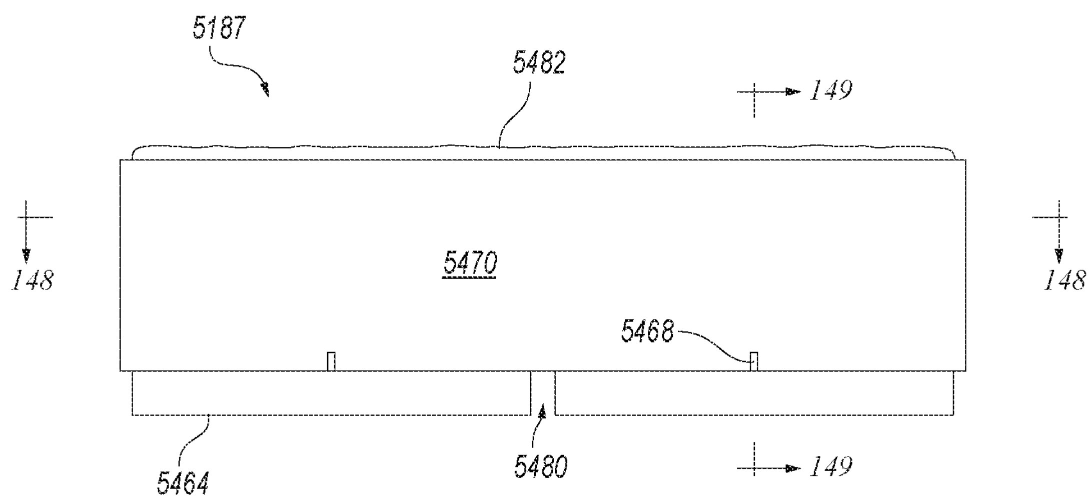
Figure 148:
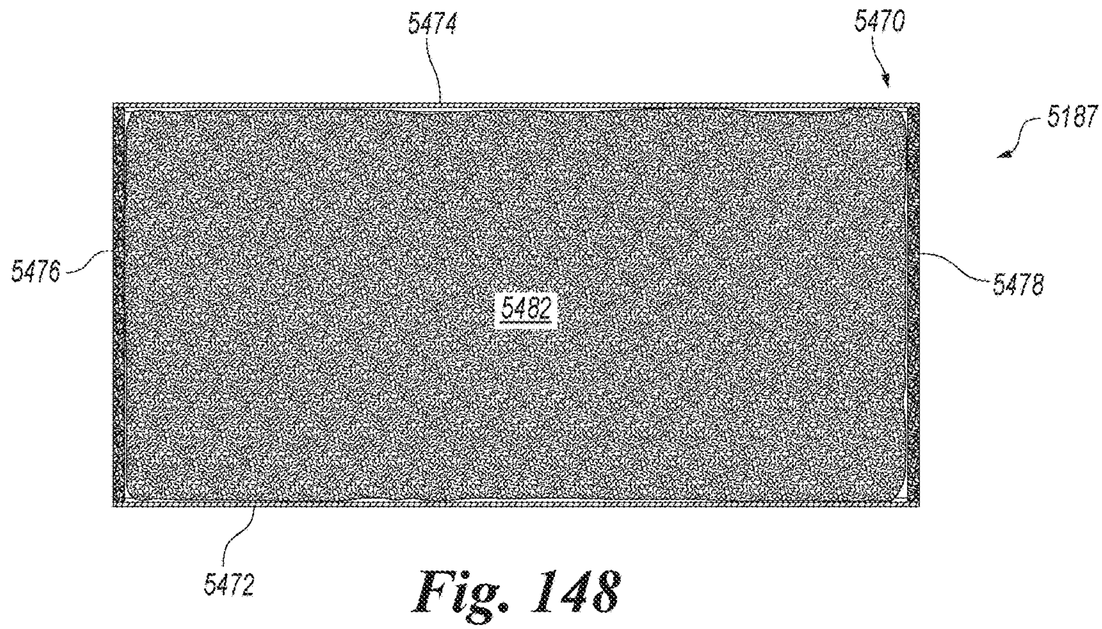
Figure 149:
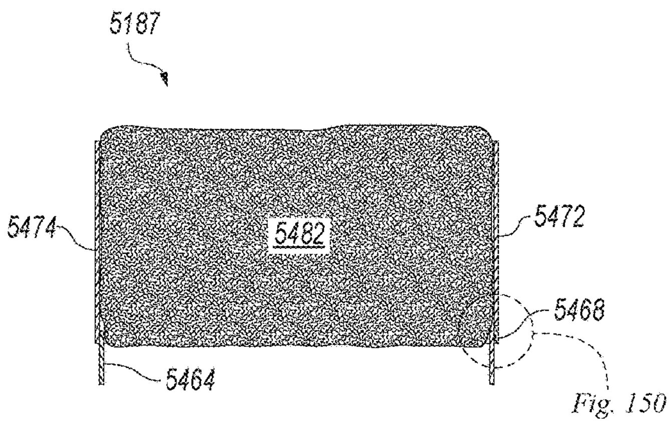

FIG. 147 is side profile view of a given one of the interior wall components 5187 separate from other portions of the compartmentalizing assembly 5185. FIG. 148 is a cross-sectional top plan view of the given interior wall component 5187 taken along the line 148-148 in FIG. 147. FIG. 149 is a cross-sectional end plan view of the given interior wall component 5187 taken along the line 149-149 in FIG. 147. The given interior wall component 5187 is of the large rectangular type. In at least some embodiments, other (e.g., most or all) of the interior wall components 5187 of the large rectangular type within the compartmentalizing assembly 5185 at least substantially match the given interior wall component 5187. Furthermore, interior wall components 5187 of other types (e.g., small rectangular, large L-shaped, small L-shaped, etc.) can have the same or similar features as the features of the given interior wall component 5187. With reference to FIGS. 147-149 together, the given interior wall component 5187 can include a shell 5470 having a first side panel 5472 and an opposite second side panel 5474 parallel to and spaced apart from the first side panel 5472. Similarly, the shell 5470 can include a first end panel 5476 and an opposite second end panel 5478 parallel to and spaced apart from the first end panel 5476. The first and second side panels 5472, 5474 and the first and second end panels 5476, 5478 can define an interior region of the given interior wall component 5187 shaped, for example, as a rectangular solid.

The given interior wall component 5187 can include two of the flanges 5464 at the first side panel 5472 and another two of the flanges 5464 at the second side panel 5474. As shown in FIG. 147, the flanges 5464 can be parallel to and inset relative to the corresponding first and second side panels 5472, 5474. Between the flanges 5464 at the first side panel 5472 and between the flanges 5464 at the second side panel 5474, the given interior wall component 5187 can include respective slots 5480. When the given interior wall component 5187 is assembled with other interior wall components 5187 of the large rectangular type within the compartmentalizing assembly 5185, one of the flanges 5464 at the first side panel 5472 and an opposing one of the flanges 5464 at the second side panel 5474 can be received within the interior region of a first neighboring lower interior wall component 5187. Similarly, the other of the flanges 5464 at the first side panel 5472 and the other of the flanges 5464 at the second side panel 5474 can be received within the interior region of a second neighboring lower interior wall component 5187 adjacent to the first neighboring lower interior wall component 5187. The second end panel 5478 of the first neighboring lower interior wall component 5187 and the first end panel 5476 of the second neighboring lower interior wall component 5187 can be directly adjacent to one another and received within the slots 5480 of the given interior wall component 5187. This interaction between the interior wall components 5187 can facilitate convenient assembly of the compartmentalizing assembly 5185 with neighboring rows of the interior wall components 5187 evenly staggered.

In the illustrated embodiment, the first and second side panels 5472, 5474 are thinner than the first and second end panels 5476, 5478 and made of a different material. For example, the first and second side panels 5472, 5474 can be metal (e.g., iron) and the first and second end panels 5476, 5478 can be cementitious (e.g., fiber-reinforced cement). The metal composition of the first and second side panels 5472, 5474 can be useful, for example, for aesthetics, to facilitate magnetic coupling of fixtures and accessories to the compartmentalizing assembly 5185, and/or for other reasons. The cementitious composition of the first and second end panels 5476, 5478 can be useful, for example, to reduce noise transmission through the compartmentalizing assembly 5185, for cost savings, and/or for other reasons. In other embodiments, the first and second side panels 5472, 5474 and the first and second end panels 5476, 5478 can have other compositions.

The given interior wall component 5187 can further include batting 5482 disposed within its interior region. Similar to the batting 5460 described above, the batting 5482 can be reusable and/or non-combustible. For example, the batting 5482 can be reusable bundles of lined or unlined mineral wool insulation. In at least some embodiments, the batting 5482 is removable. Furthermore, the shell 5470 can be collapsible from an expanded state to a compact (e.g., at least partially flattened) state. For example, at corners where the first and second side panels 5472, 5474 and the first and second end panels 5476, 5478 meet, the given interior wall component 5187 can include hinges (not shown), such as flexure bearings or piano hinges, that allow each corner to fold in a direction that causes the first and second side panels 5472, 5474 and the first and second end panels 5476, 5478 to at least partially flatten. This feature can facilitate efficient storage and transport of the shell 5470 before and/or after its deployment at the real estate unit 5162. When the shell 5470 is collapsible, the given interior wall component 5187 can include a rectangular inset (not shown) similar to the plate 5412 discussed above in the context of the exterior wall component 5182. The inset can be removably disposed within the interior of the given interior wall component 5187 such that it rests on upper edges of the flanges 5464. When present, the inset can help the given interior wall component 5187 maintain its rectangular form during use. When the shell 5470 is collapsed, the inset can be removed.

Figure 150:
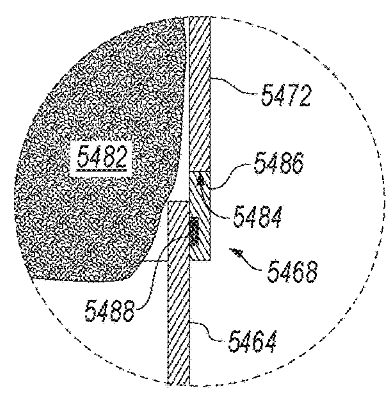

FIG. 150 is an enlarged view of a portion of FIG. 149. As shown in FIG. 150, a lowermost portion of the first side panel 5472 can overlap an uppermost portion of one the flanges 5464. FIG. 150 further illustrates a given one of the coupling components 5468 at the lowermost portion of the first side panel 5472. In at least some embodiments, other (e.g., most or all) of the coupling components 5468 of interior wall components 5187 within the compartmentalizing assembly 5185 at least substantially match the coupling component 5468 illustrated in FIG. 150. The coupling component 5468 can include a notch 5484 and a plug 5486 removably disposed within the notch 5484. The plug 5486 can include a magnet 5488 that releasably connects the plug 5486 to the uppermost portion of the adjacent flange 5464. The plug 5486 can be disposed within the notch 5484 when the coupling component 5468 is not in use. Removing the plug 5486 from the notch 5484 can expose an opening into the interior of the given interior wall component 5187. A mechanical fastener (e.g., a hook) (not shown) can be inserted into this opening. In this way, relatively heavy fixtures and accessories can be connected to the compartmentalizing assembly 5185 through a reliable mechanical connection in addition to or instead of a magnetic connection.

Figure 151:
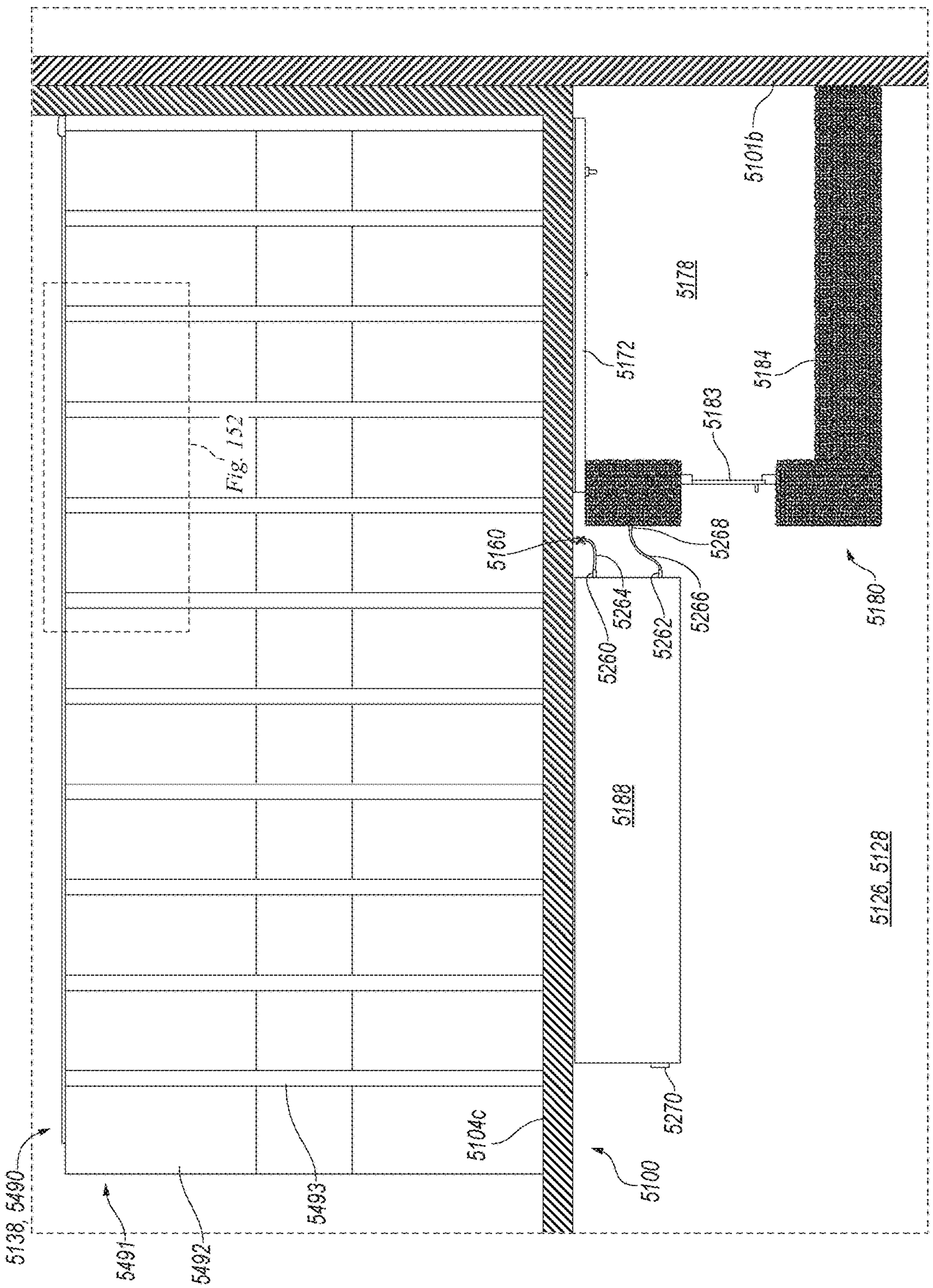
Figure 152:
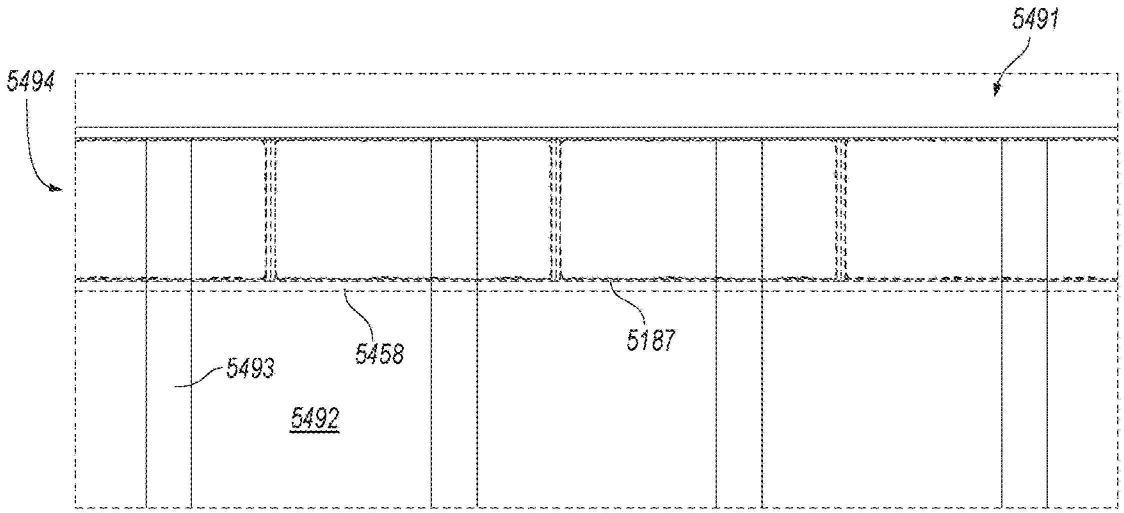
Figure 153:
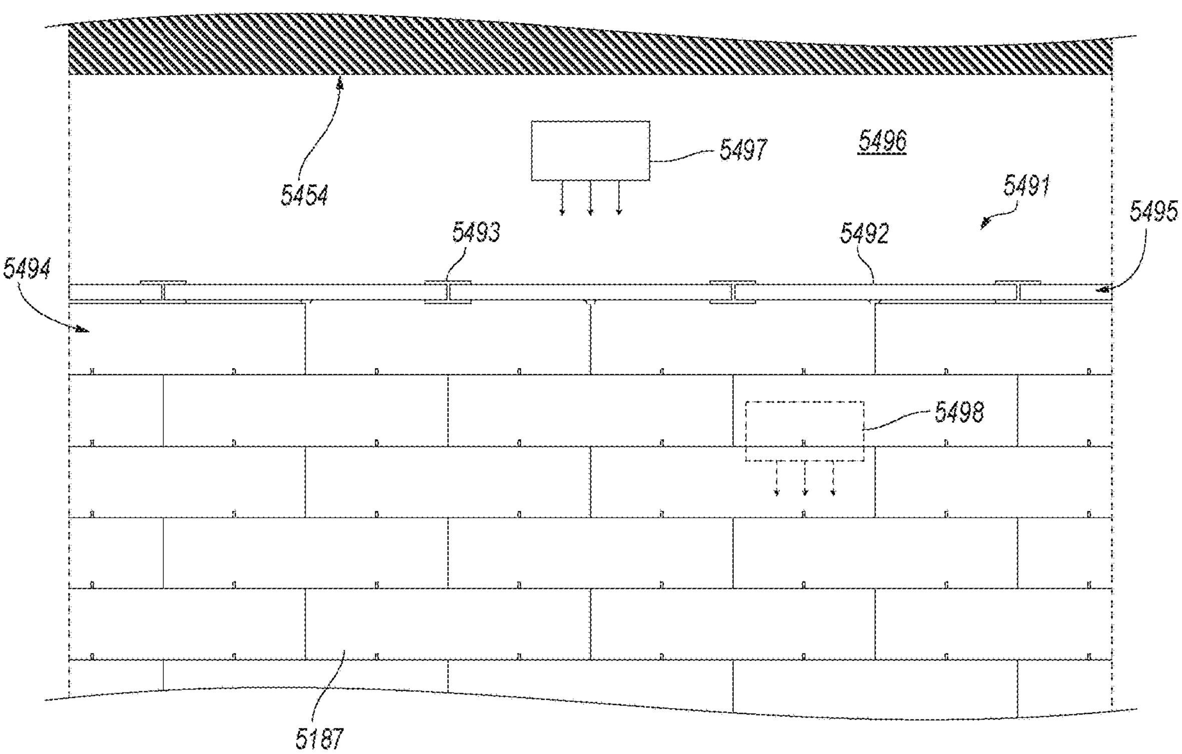

FIG. 151 is a cross-sectional top plan view of a real estate unit 5490 in accordance with another embodiment of the present technology including the interior space 5138 within the commercial building 5100 taken along the line 151-151 in FIG. 126 with the interior space 5138 in the second state. FIG. 152 is an enlarged view of a portion of FIG. 151. FIG. 153 is a cross-sectional exterior side profile view of a portion of the real estate unit 5490 corresponding to the portion of FIG. 151 shown in FIG. 152. With reference to FIGS. 151-153 together, the real estate unit 5490 can include a compartmentalizing assembly 5491 having ceiling components (e.g., reusable ceiling components) removably disposed within the commercial building 5100. For example, the compartmentalizing assembly 5491 can include rigid ceiling panels 5492 and elongate ceiling beams 5493 interspersed between the ceiling panels 5492. The ceiling beams 5493 can support the ceiling panels 5492, and the interior wall components 5187 can support the ceiling beams 5493. The interior wall components 5187 can be assembled into walls, columns, or other suitable structures that extend between the ceiling beams 5493 and the finished floor surface 5450. For example, the compartmentalizing assembly 5491 can include a wall 5494 parallel to and spaced apart from the exterior wall 5104*c*, and a series of columns (not shown) abutting an interior surface of the exterior wall 5104*c*. The ceiling beams 5493 can extend between the wall 5494 and the columns. When a distance between the wall 5494 and the columns does not correspond to a multiple of the length of the ceiling panels 5492, and in other cases, the ceiling panels 5492 and the ceiling beams 5493 can be cantilevered over the wall 5494.

As shown in FIG. 153, the individual ceiling beams 5493 can have an I-shape transverse cross-section including two channels at opposite sides of a central web. The individual ceiling panels 5492 can have side edge portions snugly received within corresponding channels of adjacent ceiling beams 5493. Together, the ceiling panels 5492 and the ceiling beams 5493 can form a ceiling 5495 of the real estate unit 5490. The ceiling 5495 can be below an airspace 5496 within the commercial building 5100. The commercial building 5100 can include a central heating system 5497 (shown schematically) operable to heat the airspace 5496 and thereby provide below-room-temperature baseline heating to the interior space 5138 via the ceiling 5495. The real estate unit 5490 can include a supplemental heater 5498 (shown schematically) operable to provide supplemental heating to the interior space 5138.

With reference again to the real estate unit 5162, FIGS. 154, 155, 156 and 157 are, respectively, a first side profile view, an opposite second side profile view, a first end profile view, and an opposite second end profile view of the bathroom 5164. With reference to FIGS. 154-157 together, the bathroom 5164 can include a rectangular floor module 5500, a rectangular ceiling module 5502 vertically spaced apart from the floor module 5500, and a plurality of wall modules 5504 (individually identified as wall modules 5504*a*-5504*d*) removably connected to the floor and ceiling modules 5500, 5502 at respective perimeter portions of the floor and ceiling modules 5500, 5502. The bathroom 5164 can further include a lower gasket 5506 disposed between the perimeter portion of the floor module 5500 and the wall modules 5504, and an upper gasket 5508 disposed between the perimeter portion of the ceiling module 5502 and the wall modules 5504. The floor module 5500 can include upwardly extending tabs 5510 through which the floor module 5500 is secured to the wall modules 5504. Similarly, the ceiling module 5502 can include downwardly extending tabs 5512 through which the ceiling module 5502 is secured to the wall modules 5504. The wall modules 5504*c*, 5504*d* can include vertical flanges 5514 at which the wall modules 5504*c*, 5504*d* are secured to the wall modules 5504*a*, 5504*b*. The bathroom 5164 can include bolts 5516 and associated nuts 5518 at the upwardly extending tabs 5510, the downwardly extending tabs 5512, and the vertical flanges 5514.

At the wall module 5504*a* (FIG. 156), the bathroom 5164 can include a doorway opening 5520, a frame 5522 extending around the doorway opening 5520, and a door 5524 disposed within the doorway opening 5520 and hingedly connected to the frame 5522. The bathroom 5164 can further include a handle 5526 and hinges 5528 operably associated with the door 5524. At the wall module 5504*c* (FIG. 154), the bathroom 5164 can include a plumbing ventilation hookup 5530 and an exhaust hookup 5532. The plumbing ventilation hookup 5530 and the exhaust hookup 5532 can be configured for convenient connection to and disconnection from the plumbing ventilation line 5234 and the exhaust line 5236 (FIG. 129), respectively, such as via quick-release couplings (not shown). The wall modules 5504*c*, 5504*d* can extend between the wall modules 5504*a*, 5504*b* at opposite sides of the bathroom 5164. As discussed above, the bathroom 5164 can be configured to be elevated above a floor surface of the interior space 5138. For this purpose and/or another purpose, the floor module 5500 can include feet 5533. In at least some embodiments, a gap between the feet 5533 is large enough to allow the bathroom 5164, when fully assembled, to be conveniently moved by forklift. At the ceiling module 5502, the bathroom 5164 can include skylights 5534 that allow ambient light within the interior space 5138 to enter an interior of the bathroom 5164.

At a side of the floor module 5500 below the wall module 5504*c*, the bathroom 5164 can include a blackwater drain hookup 5535, a main cold water supply hookup 5536, and a main hot water supply hookup 5538. At an end of the floor module 5500 below the wall module 5504*a*, the bathroom 5164 can include a main electrical hookup 5540 and a main greywater drain hookup 5541. The blackwater drain hookup 5535, the main cold water supply hookup 5536, the main hot water supply hookup 5538, the main electrical hookup 5540, and the main greywater drain hookup 5541 can be configured for convenient connection to and disconnection from the blackwater drain line 5226, the cold water supply line 5228, the hot water supply line 5230, the electrical line 5224, and the greywater drain line 5232, respectively, such as via quick-release couplings (not shown). At a side of the floor module 5500 below the wall module 5504*d*, the bathroom 5164 can include an auxiliary greywater drain hookup 5542, an auxiliary cold water supply hookup 5544, an auxiliary hot water supply hookup 5546, and an auxiliary electrical hookup 5548. The auxiliary greywater drain hookup 5542, the auxiliary cold water supply hookup 5544, the auxiliary hot water supply hookup 5546, and the auxiliary electrical hookup 5548 can be configured for convenient connection to and disconnection from corresponding lines (not shown) of the kitchenette 5292, such as via quick-release couplings (not shown).

FIG. 158 is a cross-sectional top plan view of the bathroom 5164 taken along the line 158-158 in FIG. 154. As shown in FIG. 158, the floor module 5500 can include a deck 5554 on which the sink 5166, the toilet 5168, and the bath/shower 5170 are disposed (e.g., removably disposed). The sink 5166 can include a basin 5562, a sink drain 5564, a sink faucet 5566, a sink hot water knob 5568, and a sink cold water knob 5570 operably connected to one another. The toilet 5168 can include a tank 5572, a bowl 5574, and a toilet drain 5576 operably connected to one another. The bath/shower 5170 can include a tub 5578, a bath/shower drain 5580, a tub faucet 5582, a tub cold water knob 5584, a tub hot water knob 5586, a cold water conduit 5588, and a hot water conduit 5590 operably connected to one another. The cold water conduit 5588 can include a riser 5592 and a first branch 5594 extending between the riser 5592 and the tub faucet 5582. The tub cold water knob 5584 can be disposed along the first branch 5594 and operable to control a flow of cold water from the cold water conduit 5588 to the tub faucet 5582. Similarly, the hot water conduit 5590 can include a riser 5596 and a first branch 5598 extending between the riser 5596 and the tub faucet 5582. The tub hot water knob 5586 can be disposed along the first branch 5598 and operable to control a flow of hot water from the hot water conduit 5590 to the tub faucet 5582.

The bathroom 5164 can include an electrical conduit 5600, and a junction box 5602 operably connected to the electrical conduit 5600. The bathroom 5164 can further include a first plumbing ventilation conduit 5604 disposed between the sink 5166 and the toilet 5168, and a second plumbing ventilation conduit 5605 disposed between the sink 5166 and the bath/shower 5170. The first and second plumbing ventilation conduits 5604, 5605 can be configured to ventilate blackwater and greywater plumbing, respectively. The bathroom 5164 can still further include a floor drain 5606 disposed between the toilet 5168 and the bath/shower 5170. FIG. 159 is an enlarged view of a portion of FIG. 158. With reference to FIGS. 158 and 159 together, the bathroom 5164 can include vertical gaskets 5608 disposed between the respective vertical flanges 5514 and corresponding portions of the wall modules 5504*a*, 5504*b*. Similarly, the bathroom 5164 can include lower tab gaskets 5610 disposed between the respective upwardly extending tabs 5510 and corresponding portions of the wall modules 5504.

FIG. 160 is a cross-sectional bottom plan view of the bathroom 5164 taken along the line 160-160 in FIG. 154. As shown in FIG. 160, the bathroom 5164 can include a light fixture 5612 attached to the wall module 5504*c* above the sink 5166. The bathroom 5164 can further include an exhaust intake fan 5614 attached to the ceiling module 5502. The electrical conduit 5600 can extend from the junction box 5602 (FIG. 158) to the light fixture 5612, and from the light fixture 5612 to the exhaust intake fan 5614. The first and second plumbing ventilation conduits 5604, 5605 can merge and extend along an inner corner between the ceiling module 5502 and the wall module 5504*c* to the plumbing ventilation hookup 5530 (FIG. 154). The bathroom 5164 can include an exhaust conduit 5616 extending from the exhaust intake fan 5614 along an inner corner between the ceiling module 5502 and the wall module 5504*b* to the exhaust hookup 5532 (FIG. 154). Above one end of the tub 5578 (FIG. 158), the bath/shower 5170 (FIG. 158) can include a showerhead 5618, a shower cold water knob 5620 operably connected to the cold water conduit 5588, and a shower hot water knob 5622 operably connected to the hot water conduit 5590. The cold water conduit 5588 can include a second branch 5624 extending between the riser 5592 and the showerhead 5618. The shower cold water knob 5620 can be disposed along the second branch 5624 and operable to control a flow of cold water from the cold water conduit 5588 to the showerhead 5618. Similarly, the hot water conduit 5590 can include a second branch 5626 extending between the riser 5596 and the showerhead 5618. The shower hot water knob 5622 can be disposed along the second branch 5626 and operable to control a flow of hot water from the hot water conduit 5590 to the showerhead 5618. The bathroom 5164 can include upper tab gaskets 5628 disposed between the respective downwardly extending tabs 5512 and corresponding portions of the wall modules 5504.

FIG. 161 is a cross-sectional top plan view of the bathroom 5164 taken along the line 161-161 in FIG. 154. With reference to FIGS. 129 and 154-161 together, the floor module 5500 can include a skirt 5630 and a series of parallel spaced-apart joists 5632 within the skirt 5630. The bathroom 5164 can include a blackwater drain conduit 5634 operably connected to the blackwater drain hookup 5535 and the toilet drain 5576. Thus, the toilet 5168 can be operably connected to the blackwater tank 5194 via the blackwater drain conduit 5634 and the blackwater drain line 5226. The blackwater drain conduit 5634 can include a branch 5635 operably connected to the first plumbing ventilation conduit 5604. The bathroom 5164 can further include a greywater drain conduit 5636 operably connected to the main greywater drain hookup 5541. The greywater drain conduit 5636 can include branches 5638 (individually identified as branches 5638*a*-5638*c*) operably connected to the second plumbing ventilation conduit 5605, the sink drain 5564, and the auxiliary greywater drain hookup 5542, respectively. The greywater drain conduit 5636 can further include sub-branches 5639 (individually identified as sub-branches 5639*a*, 5639*b*) operably connected to the bath/shower drain 5580 and the floor drain 5606, respectively. Thus, the bath/shower drain 5580 can be operably connected to the greywater filter 5200 via the greywater drain conduit 5636 and the greywater drain line 5232. The sub-branches 5639*c*, 5639*b* of the greywater drain conduit 5636 can include respective traps 5640. Furthermore, the blackwater drain conduit 5634 and the greywater drain conduit 5636 can include respective caps 5642, such as to facilitate clean-out.

The bathroom 5164 can include wheels 5643 (e.g., swivel casters) integrated into the floor module 5500. In the illustrated embodiment, the wheels 5643 are embedded within the feet 5533 and accessible via inwardly facing openings (not shown) of the feet 5533. The individual wheels 5643 can be movable between a retracted state and an extended state. For example, the bathroom 5164 can include posts 5644 having threads (not shown) that engage corresponding threads (not shown) of the wheels 5643 such that the wheels 5643 can be rotatably moved between the retracted and extended states. Moving the wheels 5643 from the retracted state to the extended state can lift the bathroom 5164 off a corresponding floor surface, thereby allowing the bathroom 5164 to be conveniently moved along the floor surface.

The bathroom 5164 can further include a main cold water conduit 5645 and a main hot water conduit 5646 operably connected to the main cold water supply hookup 5536 and the main hot water supply hookup 5538, respectively. The main cold water conduit 5645 can include branches 5648 (individually identified as branches 5648*a*, 5648*b*) operably connected to the sink 5166 and the bath/shower 5170 (via the riser 5592), respectively. The main cold water conduit 5645 can further include sub-branches 5650 (individually identified as sub-branches 5650*a*, 5650*b*) operably connected to the auxiliary cold water supply hookup 5544 and the toilet 5168, respectively. The main hot water conduit 5646 can include branches 5652 (individually identified as branches 5652*a*, 5652*b*) operably connected to the sink 5166 and the bath/shower 5170 (via the riser 5596), respectively. The main hot water conduit 5646 can further include a sub-branch 5654 operably connected to the auxiliary hot water supply hookup 5546. The bathroom 5164 can still further include a main electrical conduit 5656 operably connected to the main electrical hookup 5540. The main electrical conduit 5656 can include branches 5658 (individually identified as branches 5658*a*, 5658*b*) operably connected to the auxiliary electrical hookup 5548 and a floor heating system (introduced below). The main electrical conduit 5656 can further include a sub-branch 5659 operably connected to the electrical conduit 5600.

FIG. 162 is a cross-sectional bottom plan view of the bathroom 5164 taken along the line 162-162 in FIG. 154. As shown in FIG. 162, the bathroom 5164 can include a floor heating system 5660 operably associated with the deck 5554. The floor heating system 5660 can include a control box 5662 operably connected to the branch 5658*b* of the main electrical conduit 5656, and a heating cable 5664 operably connected to the control box 5662. The heating cable 5664 can have a serpentine configuration and be directly connected to an underside of the deck 5554 between the joists 5632. With reference to FIGS. 154-162 together, the floor drain 5606, the blackwater drain conduit 5634 (e.g., including its branch 5635), the greywater drain conduit 5636 (e.g., including its branches 5638 and sub-branches 5639), the main cold water conduit 5645 (e.g., including its branches 5648 and sub-branches 5650), the main hot water conduit 5646 (e.g., including its branches 5652 and sub-branch 5654), the main electrical conduit 5656 (e.g., including its branches 5658 and sub-branch 5659), the floor heating system 5660, and/or other suitable components of the bathroom 5164 can be pre-installed components of the floor module 5500. Similarly, the supply plumbing for the bath/shower 5170 (e.g., including the tub faucet 5582, the cold water conduit 5588, the hot water conduit 5590, and the showerhead 5618), the light fixture 5612, and/or other suitable components of the bathroom 5164 can be pre-installed components of the wall module 5504*c*. These and/or other aspects of the bathroom 5164 can facilitate rapid deployment, removal, and redeployment of the bathroom 5164.

Figure 163:
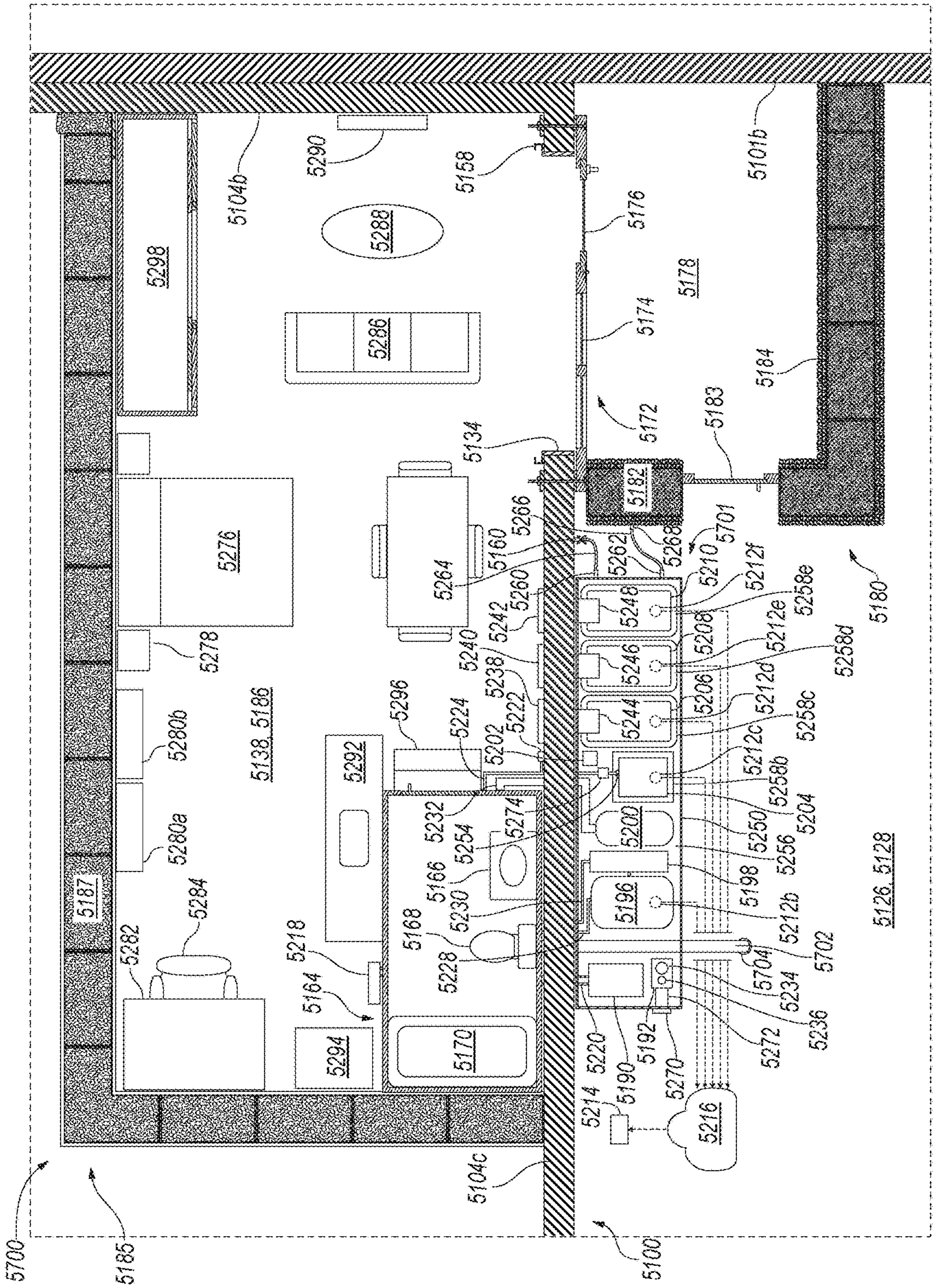

FIG. 163 is a cross-sectional top plan view of a real estate unit 5700 in accordance with another embodiment of the present technology including the interior space 5138 within the commercial building 5100 taken along the line I-I in FIG. 126 with the interior space 5138 in the second state. The real estate unit 5700 can include a dock 5701 that does not include the blackwater tank 5194 (FIG. 129) and the blackwater drain line 5226 (FIG. 129) of the real estate unit 5162 (FIG. 129). Instead of these components, the real estate unit 5700 can include a blackwater drain line 5702 extending between (e.g., removably disposed between) the bathroom 5164 and an outdoor sewage hookup 5704. The blackwater drain line 5702 can extend through the exterior wall 5104*c* from the bathroom 5164 toward the sewage hookup 5704. Furthermore, the blackwater drain line 5702 can extend above-floor and then above-ground from the bathroom 5164 toward the sewage hookup 5704.

The sewage hookup 5704 can be a retrofitted access point to a municipal, septic, or other permanent sewage system serving the commercial building 5100. In at least some cases, the blackwater drain line 5702 connects to the sewage hookup 5704 via a quick-connect coupling (not shown). In the illustrated embodiment, the real estate unit 5700 (like the real estate unit 5162 (FIG. 129)) is configured to recycle greywater. In other embodiments, a counterpart of the real estate unit 5700 can be configured to dispose of greywater with blackwater via the sewage hookup 5704. For example, a counterpart of the bathroom 5164 can be alternatively configured so that a counterpart of the greywater drain conduit 5636 (FIG. 161) is combined with a counterpart of the blackwater drain conduit 5634 (FIG. 161). In these and other embodiments, the exterior enclosure 5180 can be configured to receive water from the hose bibb 5160 and/or configured to receive water in another manner.

In another embodiment, a counterpart of the real estate unit 5162 (FIG. 129) is operably associated with components that reduce or eliminate the need for frequent servicing and/or connections to permanent utilities serving the commercial building 5100. For example, the counterpart of the real estate unit 5162 (FIG. 129) can be operably associated with a high-capacity sewage detention reservoir (not shown) disposed (e.g., removably disposed) outside the interior space 5138, a high-capacity cold water reservoir (not shown) disposed (e.g., removably disposed) outside the interior space 5138, and/or a high-capacity generator (not shown) disposed (e.g., removably disposed) outside the interior space 5138. The high-capacity sewage detention reservoir can be configured for occasional evacuation into a mobile tanker (e.g., a septic system pump truck). Similarly, the high-capacity cold water reservoir can be configured for occasional replenishment from a mobile tanker (e.g., a water supply truck). In these embodiments, with reference to FIG. 129, a counterpart of the dock 5188 can be without the blackwater tank 5194, the water reservoir 5196, the greywater filter 5200, and/or the battery 5204.

Figure 164:
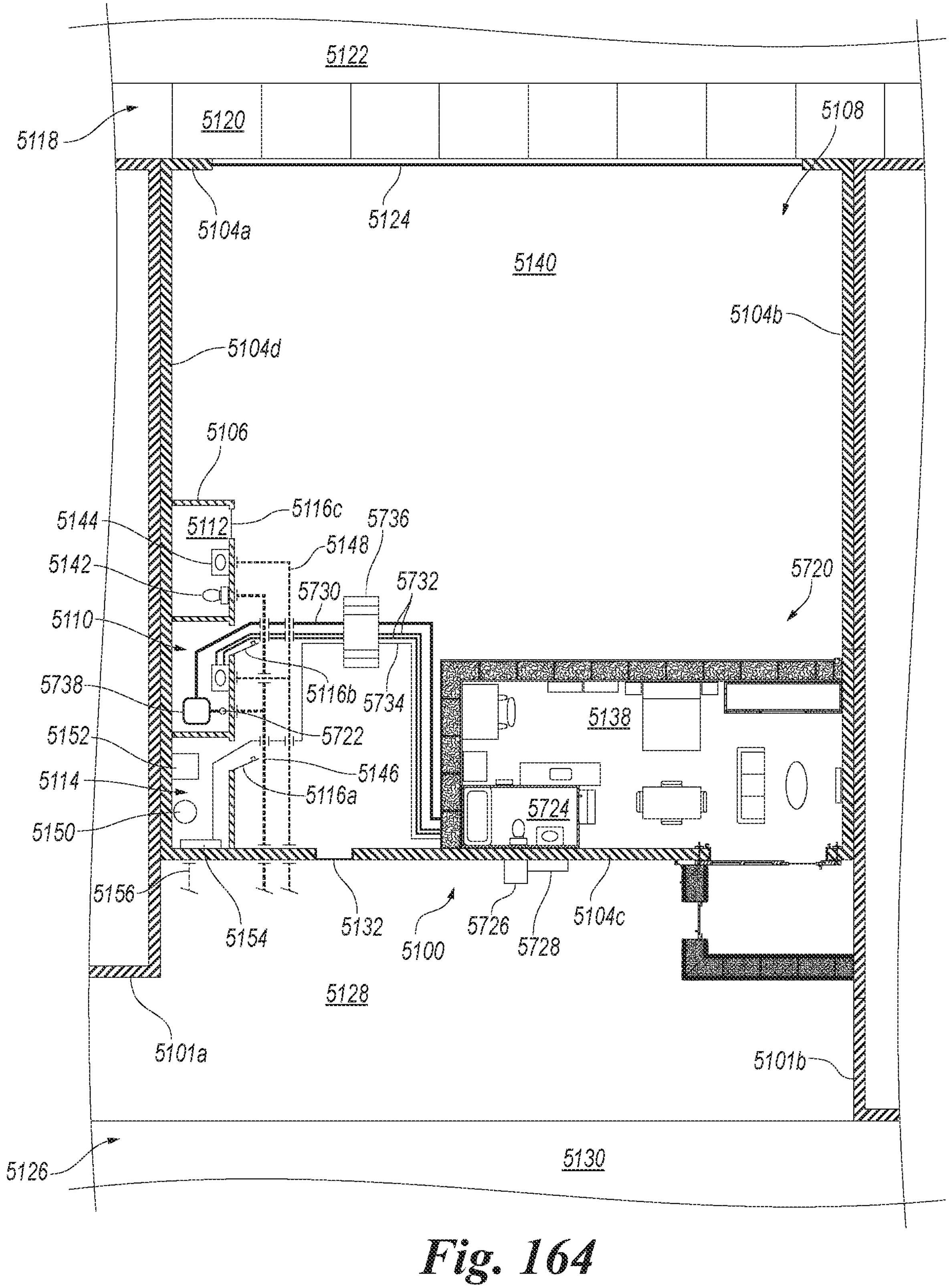

FIG. 164 is a cross-sectional top plan view of a real estate unit 5720 in accordance with another embodiment of the present technology including the interior space 5138 within the commercial building 5100 taken along the line I-I in FIG. 126 with the interior space 5138 in the second state. As shown in FIG. 164, the real estate unit 5700 can be without a dock and can, instead, be tethered to plumbing and electrical systems of the commercial building 5100. The first building bathroom 5110 can include a toilet hookup 5722 that is exposed when the toilet 5142 of the first building bathroom 5110 is removed. Similarly, the first building bathroom 5110 can include sink hookups (e.g., hot and cold; not shown) that are exposed when the sink 5144 of the first building bathroom 5110 is disconnected. The toilet hookup 5722 and the sink hookups can be operably connected to the plumbing drain trunk line 5146 and the water supply trunk line 5148, respectively. The real estate unit 5720 can include a bathroom 5723 operably connected to the plumbing drain trunk line 5146 and the water supply trunk line 5148 via the toilet hookup 5722 and the sink hookups, respectively. The second building bathroom 5112 can remain in service for a separate ongoing occupancy of the interior space 5140. The bathroom 5723 can be similar to the bathroom 5164 of the real estate unit 5162, but with different plumbing, electrical, ventilation, and exhaust configurations. The real estate unit 5162 can include a heat pump 5726, an exhaust filter 5728, and refrigerant lines (not shown) similar to the heat pump 5190, the exhaust filter 5192, and the refrigerant lines 5220 of the real estate unit 5162.

The real estate unit 5720 can further include a plumbing drain line 5730 through which the bathroom 5724 is operably connected to the plumbing drain trunk line 5146. The plumbing drain line 5730 can be disposed (e.g., removably disposed) between the bathroom 5724 and the toilet hookup 5722. For example, the plumbing drain line 5730 can extend above-floor at least two meters within the commercial building 5100 from the bathroom 5724 toward the toilet hookup 5722. Similarly, the real estate unit 5720 can include water supply lines 5732 (e.g., hot and cold) through which the bathroom 5724 is operably connected to the water supply trunk line 5148. The water supply lines 5732 can be disposed (e.g., removably disposed) between the bathroom 5724 and the sink hookups. For example, the water supply lines 5732 can extend above-floor at least two meters within the commercial building 5100 from the bathroom 5724 toward the sink hookups. Also similarly, the real estate unit 5720 can include an electrical line 5734 through which the bathroom 5724 and outlets (not shown) within the real estate unit 5720 are operably connected to the electrical panel 5154. The electrical line 5734 can be disposed (e.g., removably disposed) between the bathroom 5724 and the electrical panel 5154. The interior doors 5116 can be propped open (as shown) or removed to allow passage of the plumbing drain line 5730, the water supply lines 5732, and the electrical line 5734 between the bathroom 5724 and the toilet hookup 5722, the sink hookups, and the electrical panel 5154, respectively. The real estate unit 5720 can further include a bridge 5736 disposed over a bundle of the plumbing drain line 5730, the water supply lines 5732, and the electrical line 5734. The bridge 5736 can be reusable and removably disposed within the commercial building 5100. The bridge 5736 can be useful, for example, to facilitate pedestrian traversal over the bundle when the back door 5132 is to remain in service for a separate ongoing occupancy at the interior space 5140.

The real estate unit 5720 can further include a sewage detention tank 5738 along the plumbing drain line 5730. Similarly, the real estate unit 5720 can include a water supply tank (not shown) and a supplemental water heater (not shown) along the water supply lines 5732. The sewage detention tank 5738, the water supply tank, and the supplemental water heater can be reusable and disposed (e.g., removably disposed) within the commercial building 5100. These components can attenuate spikes in water demand and/or sewage flow from the real estate unit 5720. In the illustrated embodiment, there is only one real estate unit 5720 within the commercial building 5100. In other embodiments, there can be multiple counterparts of the real estate unit 5720 within a counterpart of the commercial building 5100. In these other embodiments, a plumbing fixture load of a counterpart of the first building bathroom 5110 may still be sufficient to service the multiple counterparts of the real estate unit 5720 due, for example, to increased capacity provided by counterparts of the sewage detention tank 5738, the water supply tank, and the supplemental water heater. In addition or alternatively, when there are two counterparts of the real estate unit 5720 within a counterpart of the commercial building 5100, the two counterparts of the real estate unit 5720 can be separately tethered to the first and second building bathrooms 5110, 5112, respectively.

Figure 165:
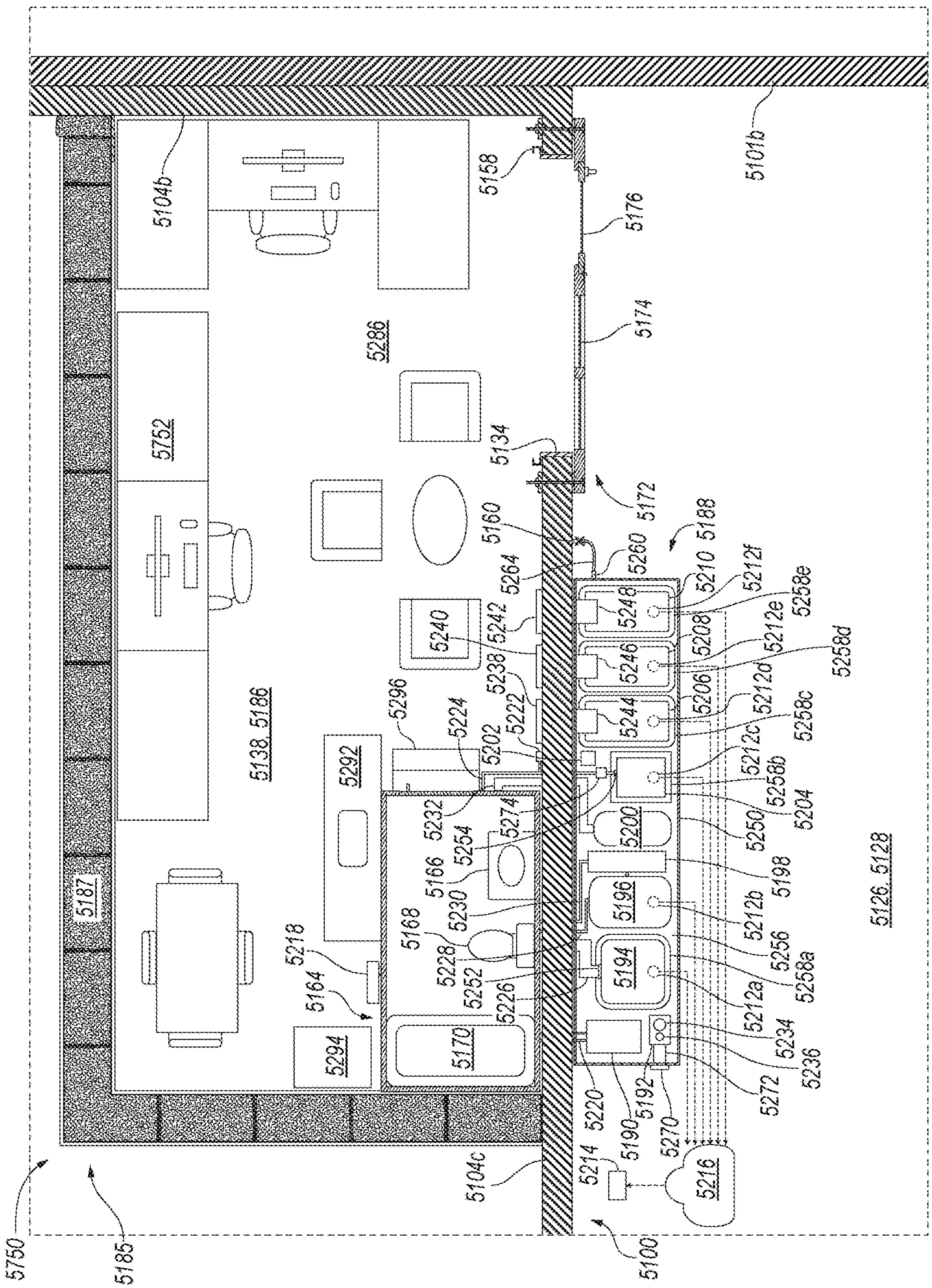

In the embodiments illustrated in FIGS. 129 and 164, the real estate units 5162, 5720 are configured at least primarily as lodging and/or residential units. In other embodiments, a counterpart of the real estate units 5162, 5720 can have another primary use. For example, the counterpart of the real estate units 5162, 5720 can be a rentable office unit, a rentable assembly unit, and/or a rentable unit of another type. FIG. 165 is a cross-sectional top plan view of a real estate unit 5750 in accordance with another embodiment of the present technology including the interior space 5138 within the commercial building 5100 taken along the line I-I in FIG. 126 with the interior space 5138 in the second state. The real estate unit 5750 can be configured at least primarily as a rentable office unit. The real estate unit 5750 can include office furnishings, such as a workstation 5752 removably disposed within the interior space 5138. Because privacy tends to be less important for office uses than for lodging and residential uses and/or for other reasons, the real estate unit 5750 can be without the exterior enclosure 5180 (FIG. 129). Alternatively, a counterpart of the real estate unit 5750 can include the exterior enclosure 5180 (FIG. 129) or a comparable structure.

Figure 166:
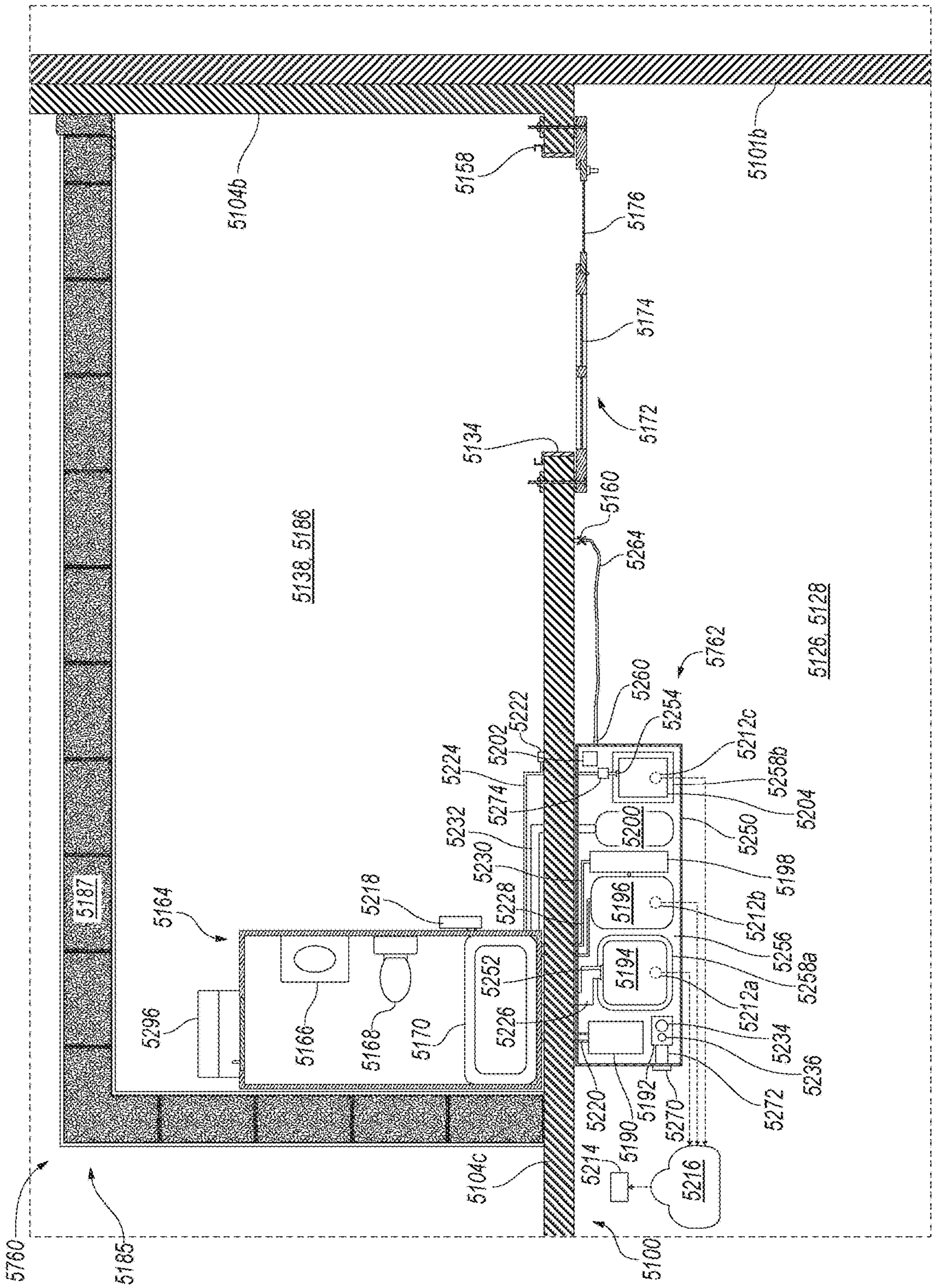
Figure 167:
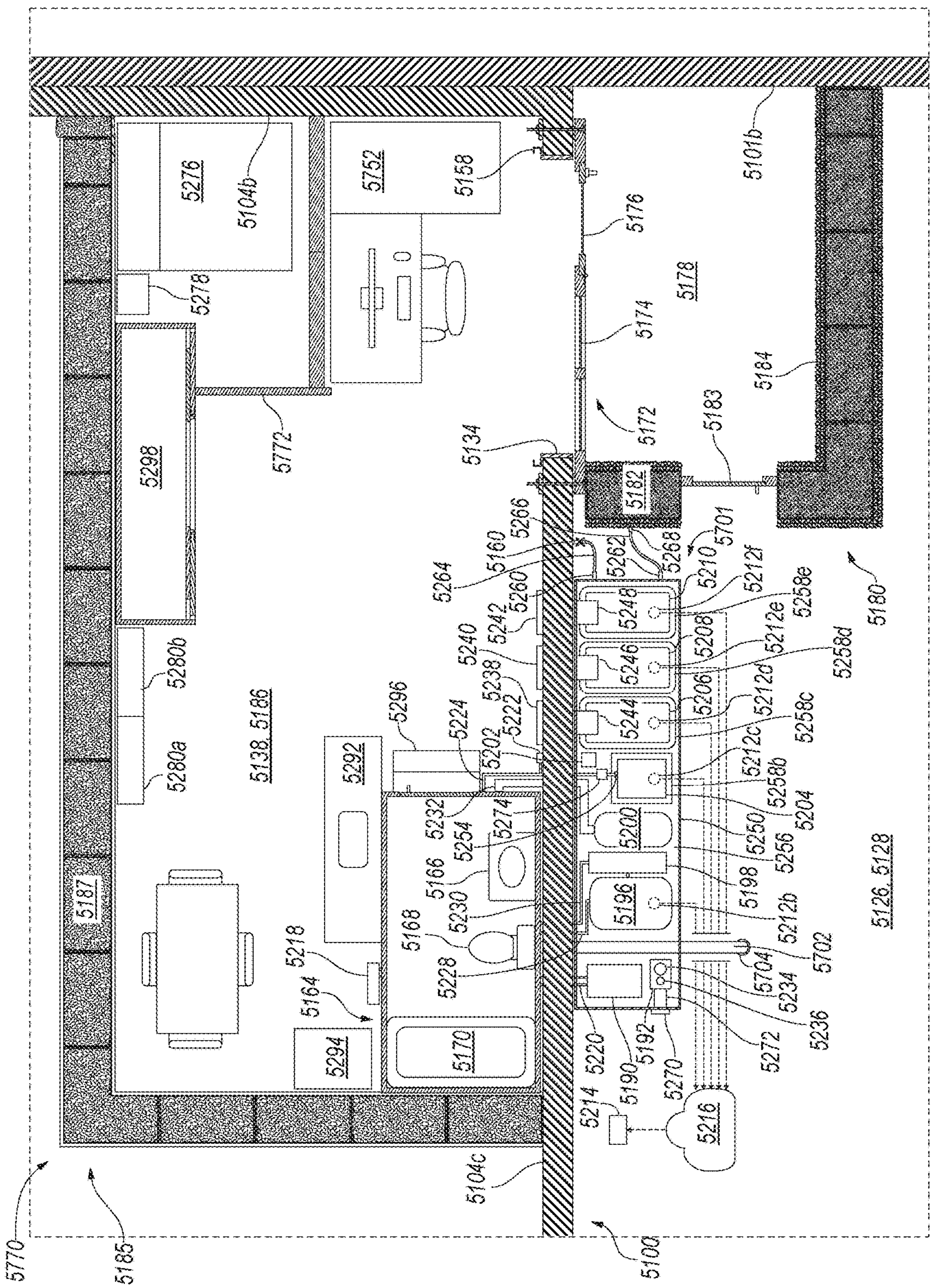

FIG. 166 is a cross-sectional top plan view of a real estate unit 5760 in accordance with another embodiment of the present technology including the interior space 5138 within the commercial building 5100 taken along the line I-I in FIG. 126 with the interior space 5138 in the second state. The real estate unit 5760 can be configured at least primarily as a rentable assembly unit. For example, the real estate unit 5760 can be configured to accommodate parties, classes, etc. Like the real estate unit 5750 (FIG. 165), the real estate unit 5760 can be without the exterior enclosure 5180 (FIG. 129). Alternatively, a counterpart of the real estate unit 5760 can include the exterior enclosure 5180 (FIG. 129) or a comparable structure. The real estate unit 5760 can include a dock 5762 that does not include the trash bin 5206 (FIG. 129), the recycling bin 5208 (FIG. 129), and the laundry bin 5210 (FIG. 129) of the real estate unit 5162 (FIG. 129), but is otherwise the same as or similar to the dock 5188 (FIG. 129). FIG. 167 is a cross-sectional top plan view of a real estate unit 5770 in accordance with another embodiment of the present technology including the interior space 5138 within the commercial building 5100 taken along the line I-I in FIG. 126 with the interior space 5138 in the second state. The real estate unit 5770 can be configured at least primarily as a combined lodging and rentable office unit. For example, the real estate unit 5770 can include partitions 5772 that close off the bed 5276 during work hours.

In some cases, multiple real estate units in accordance with embodiments of the present technology are operably associated with one another in a real estate complex and/or a real estate network. In other cases, the real estate units can be stand-alone. FIGS. 168-173 illustrate two examples of real estate complexes in accordance with embodiments of the present technology. FIG. 168 is a front profile view of a block 5800 of an urban area. FIG. 169 is a cross-sectional top plan view of commercial buildings 5802 (individually identified as commercial buildings 5802*a*-5802*i*) at the block 5800 taken along the line J-J in FIG. 168. The commercial buildings 5802 can include interior spaces 5804 (individually identified as interior spaces 5804*a*-5804*m*). In FIG. 169, the interior spaces 5804 are shown in the first state. The block 5800 can include a sidewalk 5806 encircling the commercial buildings 5802, and the block 5800 can further include an alley 5808. The commercial buildings 5802*a*-5802*i* can include respective storefronts 5810 (individually identified as storefronts 5810*a*-5810*i*) facing the sidewalk 5806, and respective back walls 5812 (individually identified as back walls 5812*a*-5812*i*) facing the alley 5808. In the illustrated embodiment, the alley 5808 is a through alley. In other embodiments, a counterpart of the alley 5808 can be a blind alley. With reference again to FIG. 169, the commercial buildings 5802 can be in two groups at opposite respective sides of the alley 5808. Within the alley 5808, the block 5800 can include dumpsters 5814 individually serving one or more of the commercial buildings 5802*a*-5802*i*. The commercial buildings 5802 can include back doors 5816 and openings 5818 similar to the back door 5132 and opening 5134 described above.

FIG. 170 is a cross-sectional top plan view of the commercial buildings 5802 taken along the line J-J in FIG. 168 and showing a real estate complex 5820 in accordance with an embodiment of the present technology. The real estate complex 5820 can include real estate units 5822 (individually identified as real estate units 5822*a*-5822*m*) including the interior spaces 5804*a*-5804*m*, respectively, in the second state. The real estate units 5822 can having some or all of the features of the real estate units 5162, 5490, 5700, 5720, 5750, 5760, 5770 described above. For example, the real estate units 5822*a*-5822*m* can respectively include reusable bathrooms (not shown) similar to the bathrooms 5164, 5724 described above. These reusable bathrooms can be tethered to corresponding building bathrooms (not shown) similar to the first and second building bathrooms 5110, 5112 described above. Alternatively or in addition, the real estate units 5822*a*-5822*m* can include docks (not shown) similar to the docks 5188, 5701, 5762 described above. For clarity of illustration, most details of the real estate units 5822 are not shown in FIG. 170. The features of the real estate units 5822*a*-5822*m* can differ. For example, in the illustrated embodiment, the real estate units 5822*l*, 5822*m* include courtyards 5824, whereas the real estate units 5822*a*-5822*k* do not. Furthermore, in the illustrated embodiment, the commercial buildings 5802*d*-5802*h* respectively include multiple real estate units 5822, the commercial buildings 5802*a*, 5802*b* respectively include single real estate units 5822, and the commercial buildings 5802*c*, 5802*i* include no real estate units 5822. In other embodiments, a counterpart of the real estate complex 5820 can have other distributions of counterparts of the real estate units 5822.

As shown in FIG. 170, the back walls 5812 can be retrofitted to accommodate additional real estate units 5822. For example, the real estate units 5822*f*, 5822*g*, 5822*h*, 5822*j* can be at respective existing openings 5818, and the real estate units 5822*a*-5822*e*, 5822*i*, 5822*k*-5822*m* can be at respective new (e.g., cut) openings 5826. Other modifications of the back walls 5812 can be made to serve continuing operations within the commercial buildings 5802 other than operations associated with the real estate units 5822. For example, the back wall 5812*g* can be retrofitted to include a new back door 5827. The alley 5808 can be closed off to automobile traffic to form a common area for the real estate complex 5820. The real estate complex 5820 can include gates 5828 (individually identified as gates 5828*a*, 5828*b*) at opposite respective ends of the alley 5808. The dumpsters 5814 can be relocated to portion of the alley 5808 outside the gate 5828*a*. In some embodiments, the alley 5808 is at least substantially reversibly closed off. For example, the alley 5808 can be closed off during certain hours (e.g., by closing the gates 5828) and reopened during other hours (e.g., by opening the gates 5828). In a particular embodiment, the real estate complex 5820 is at least primarily used as a hotel, the alley 5808 is at least substantially reversibly closed off at night, and the alley 5808 is reopened during the day. In other embodiments, the alley 5808 can be at least substantially reversibly closed off until the real estate complex 5820 is decommissioned, permanently closed off, not closed off, or managed in another manner.

FIG. 171 is a front profile view of a mini-storage complex 5850. FIG. 172 is a cross-sectional top plan view of mini-storage buildings 5852 (individually identified as mini-storage buildings 5852*a*-5852*c*) within the mini-storage complex 5850 taken along the line K-K in FIG. 171. The mini-storage buildings 5852 can include interior spaces 5854. In FIG. 172, the interior spaces 5854 are shown in the first state. In the illustrated embodiment, each of the interior spaces 5854 includes three mini-storage units 5855. In other embodiments, the interior spaces 5854 can have other sizes. With reference again to FIG. 171, the mini-storage buildings 5852 can further include openings 5856 similar to the opening 5134 described above, a load-bearing central wall 5858, and rows of non-load-bearing dividing walls 5860 perpendicular to the central wall 5858. The individual openings 5856 can serve the individual mini-storage units 5855, respectively. The mini-storage units 5855 of a given one of the mini-storage buildings 5852 can be divided by the dividing walls 5860 and arranged in rows on opposite sides of the central wall 5858 of the given one of the mini-storage buildings 5852. Between the mini-storage buildings 5852, the mini-storage complex 5850 can include alleys 5862 (individually identified as alleys 5862*a*, 5862*b*). The alleys 5862 and the openings 5856 can be configured for convenient loading and unloading of the mini-storage units 5855, For example, the mini-storage units 5855 can be drive-up mini-storage units.

FIG. 173 is a cross-sectional top plan view of the mini-storage buildings 5852 taken along the line K-K in FIG. 171 and showing a real estate complex 5864 in accordance with an embodiment of the present technology. The real estate complex 5864 can include real estate units 5866 including the interior spaces 5854, respectively, in the second state. The real estate units 5866 can have some or all of the features of the real estate units 5162, 5490, 5700, 5720, 5750, 5760, 5770 described above. For example, the real estate units 5866 can respectively include courtyards 5868 similar to the courtyard 5178 described above. As another example, the real estate units 5866 can respectively include compartmentalizing assemblies 5870 similar to the compartmentalizing assembly 5185 described above. As another example, the real estate units 5866 can respectively include docks 5872 similar to the docks 5188, 5701, 5762 described above. As yet another example, the real estate units 5866 can respectively include reusable bathrooms (not shown) similar to the bathrooms 5164, 5724 described above. For clarity of illustration, most details of the real estate units 5866 are not shown in FIG. 173.

FIG. 174 is a block diagram illustrating a method 5900 for making a given real estate unit in accordance with an embodiment of the present technology. For simplicity, aspects of the method 5900 will be further described primarily in the context of certain ones of the real estate units 5162, 5490, 5700, 5720, 5750, 5760, 5770, 5822, 5866 described herein. It should be understood, however, that the method 5900, when suitable, and/or portions of the method 5900, when suitable, can be practiced with respect to other ones of the real estate units 5162, 5490, 5700, 5720, 5750, 5760, 5770, 5822, 5866 described herein as well as with respect to other real estate units in accordance with embodiments of the present technology. Similarly, although the method 5900 may be described primarily in the context of certain ones of the commercial buildings 5100, 5802 and the mini-storage buildings 5852, it should be understood that the method 5900, when suitable, and/or portions of the method 5900, when suitable, can be practiced with respect to other ones of the commercial buildings 5100, 5802 and the mini-storage buildings 5852 as well as with respect to other compatible buildings.

With reference to FIGS. 129-174 together, the method 5900 can include leasing the interior space 5138 (block 5902) or establishing control of the interior space 5138 in another manner. For example, the interior space 5138 can be leased from an owner of the commercial building 5100 for provision of lodging, residential space, office space, assembly space, and/or another type of space to third parties. In some cases, the interior space 5138 is leased or purchased separately from the interior space 5140. For example, the interior space 5138 may be underutilized by an ongoing operation at the interior space 5140 such the ongoing operation is not adversely affected to a significant degree by losing control over the interior space 5138. In other cases, the interior spaces 5138, 5140 can be leased or purchased together. After control of the interior space 5138 is established, the method 5900 can include retrofitting the interior space 5138 to accommodate an alternative use (e.g., a lodging use, a residential use, an office use, and/or an assembly use). The commercial building 5100 can be one that was originally constructed at least 20 years before this retrofitting occurs.

In at least some embodiments, the method 5900 includes at least substantially reversibly retrofitting the interior space 5138 to accommodate the alternative use. In these and other embodiments, it may be economically feasible to lease and retrofit the interior space 5138 with little or no long-term commitment from an owner of the commercial building 5100. This can be due to the reusability of a significant amount of the capital associated with retrofitting the interior space 5138 and/or for other reasons. Accordingly, in some embodiments, the interior space 5138 is leased month-to-month. In other embodiments, the interior space 5138 can be leased under terms that allow the owner of the commercial building 5100 to terminate the lease with notice of less than one month. In still other embodiments, the interior space 5138 can be controlled by an operator of the real estate unit 5162 under other lease arrangements, under non-lease contractual arrangements (e.g., franchising), or under fee simple ownership. After direct or indirect control over the interior space 5138 is established, the method 5900 can include subleasing (or leasing if the commercial building 5100 is owned in fee simple) the interior space 5138 to a renter. When the interior space 5138 is leased separately from other portions of the commercial building 5100, an owner of the commercial building 5100 can occupy or otherwise use the other portions of the commercial building 5100 while the interior space 5138 is leased to third parties. When the interior space 5138 is leased together with other portions of the commercial building 5100, an operator of the real estate unit 5162 can separately lease the interior space 5138 as the real estate unit 5162 and some or all of the other portions of the commercial building 5100 as another real estate unit.

The method 5900 can further include transporting modules (e.g., the bathroom 5164, the barrier 5172, the exterior wall components 5182, the interior wall components 5187, and/or the dock 5188) to the commercial building 5100 (block 5904). Some or all of the modules can be transported in a compact state. For example, the bathroom 5164 can be transported in its disassembled state. As another example, the barrier 5172 can be transported in its folded state. As yet another example, the exterior wall components 5182 and/or the interior wall components 5187 can be transported in their disassembled states. Furthermore, the shells 5408 and/or the shells 5470 can be transported in their collapsed states. The method 5900 can further include receiving the modules at the commercial building 5100 (block 5906). For example, the bathroom 5164, the barrier 5172, the exterior wall components 5182, the interior wall components 5187, the dock 5188, and/or other suitable components of the real estate unit 5162 can be received at the commercial building 5100 in an at least substantially pre-manufactured state.

After the bathroom 5164 is received at the commercial building 5100, the method 5900 can include installing the bathroom 5164 (block 5908), such as by disposing (e.g., removably disposing) the bathroom 5164 within the commercial building 5100. In at least some embodiments, installing the bathroom 5164 includes assembling (e.g., at least substantially reversibly assembling) a set of reusable bathroom modules (e.g., the floor module 5500, the ceiling module 5502, and the wall modules 5504) to form an assembly of reusable bathroom modules. For example, the method 5900 can include disposing (e.g., removably disposing) the floor module 5500 at a suitable location within the interior space 5138, and connecting (e.g., removably connecting) the wall modules 5504 to the floor module 5500 at a perimeter portion of the floor module 5500. The bathroom 5164 can be disposed within the interior space 5138 such that the floor level of the bathroom 5164 is at least 0.5 meter higher than the underlying floor level of the interior space 5138. The method 5900 can further include installing (e.g., removably installing) furnishings within the interior space 5138 (block 5910). For example, when the commercial building 5100 is retrofitted for lodging and/or residential use at the interior space 5138, the method 5900 can include disposing (e.g., removably disposing) lodging and/or residential furnishings within the interior space 5138. As another example, when the commercial building 5100 is retrofitted for office use at the interior space 5138, the method 5900 can include disposing (e.g., removably disposing) office furnishings within the interior space 5138.

The method 5900 can also include installing the barrier 5172 (block 5912). For example, the method 5900 can include disposing (e.g., removably and stationarily disposing) the barrier 5172 between the interior space 5138 and the second outdoor area 5126. The barrier 5172 can be installed such that a path permitting a renter of the real estate unit 5162 to move between the interior space 5138 and the second outdoor area 5126 extends through the opening 5134 and through the barrier 5172. Installing the barrier 5172 can include installing the barrier 5172 in an unfolded state. In addition or alternatively, installing the barrier 5172 can include at least substantially reversibly assembling a set of barrier modules to form an assembly of barrier modules. In at least some embodiments, installing the barrier 5172 includes fastening (e.g., removably fastening) the barrier 5172 to the exterior wall 5104*c*. For example, the barrier 5172 can be bolted, screwed, and/or clamped to the exterior wall 5104*c*. Installing the barrier 5172 can further include forming the first mass of self-leveling material 5300, such as integrally along most or all of an overall footprint of the barrier 5172. The barrier 5172 can then be installed over the first mass of self-leveling material 5300. Installing the barrier 5172 can include inserting the barrier 5172 into the opening 5134. Alternatively or in addition, installing the barrier 5172 can include overlaying the barrier 5172 over the opening 5134. For example, installing the barrier 5172 can include compressing the gasket 5318 between the frame 5310 and the exterior wall 5104*c*. In conjunction with installing the barrier 5172 or separately, the method 5900 can include stowing the overhead door 5136 within the interior space 5138 in its open state (block 5914). In at least some cases, this includes disabling (e.g., reversibly disabling) a control for the overhead door 5136.

As shown in FIG. 174, the method 5900 can include installing the dock 5188 (block 5916). For example, the method 5900 can include disposing (e.g., removably disposing) the dock 5188 outside the interior space 5138. In conjunction with installing the dock 5188 or separately, the method 5900 can include disposing (e.g., removably disposing) the water reservoir 5196, the battery 5204, the blackwater tank 5194, and/or other suitable modules outside the interior space 5138. These modules can be connected (e.g., removably connected) to the dock 5188 and/or to other suitable components of the real estate unit 5162. For example, the method 5900 can include electrically connecting the battery 5204 and the electrical outlet 5222. This can include operating the electrical quick-connect coupling 5254. As another example, the method 5900 can include connecting (e.g., removably connecting) the water reservoir 5196 and the hose bibb 5160. In at least some embodiments, the commercial building 5100 is retrofitted for off-grid operation with respect to an electrical supply to the interior space 5138 and/or retrofitted for off-grid operation with respect to disposal of blackwater from the toilet 5168.

The method 5900 can further include tethering the bathroom 5164 to the dock 5188, the sewage hookup 5704, the plumbing drain trunk line 5146, and/or the water supply trunk line 5148 (block 5918). For example, the method 5900 can include operably connecting the bathroom 5164 (e.g., the sink 5166, the toilet 5168, and the bath/shower 5170) and the water reservoir 5196 via the cold water supply line 5228. Alternatively or in addition, the method 5900 can include operably connecting the bathroom 5724 (e.g., the sink 5166, the toilet 5168, and the bath/shower 5170) and the water supply trunk line 5148 via the water supply lines 5732 (e.g., also via the sink hookup). As another example, the method 5900 can include operably connecting the bathroom 5164 (e.g., the toilet 5168) and the blackwater tank 5194 via the blackwater drain line 5226. Alternatively or in addition, the method 5900 can include operably connecting the bathroom 5724 (e.g., the sink 5166, the toilet 5168, and the bath/shower 5170) and the plumbing drain trunk line 5146 via the plumbing drain line 5730 (e.g., also via the toilet hookup 5722). Furthermore, the method 5900 can include operably connecting the bathroom 5164 (e.g., the toilet 5168) and the sewage hookup 5704 via the blackwater drain line 5702. As yet another example, the method 5900 can include operably connecting the bathroom 5164 (e.g., the bath/shower drain 5580) and the greywater filter 5200 via the greywater drain line 5232.

Operably connecting the bathroom 5164 and the blackwater tank 5194 can include operating the blackwater drain quick-connect coupling 5252 to fluidically connect the bathroom 5164 and the blackwater tank 5194. In addition or alternatively, operably connecting the bathroom 5164 and the blackwater tank 5194 can include disposing (e.g., removably disposing) the blackwater drain line 5226 between the bathroom 5164 and the blackwater tank 5194. This can include extending the blackwater drain line 5226 above-floor between the bathroom 5164 and the blackwater tank 5194, such as disposing a first portion of the blackwater drain line 5226 above-floor within the commercial building 5100 and disposing a second portion of the blackwater drain line 5226 above-ground outside the commercial building 5100. Similarly, operably connecting the bathroom 5724 and the plumbing drain trunk line 5146 can include disposing (e.g., removably disposing) the plumbing drain line 5730 between the bathroom 5724 and the toilet hookup 5722. This can include extending the plumbing drain line 5730 above-floor within the commercial building 5100 between the bathroom 5724 and the toilet hookup 5722, such as extending the plumbing drain line 5730 above-floor at least two meters within the commercial building 5100 between the bathroom 5724 and the toilet hookup 5722. Also similarly, operably connecting the bathroom 5164 and the sewage hookup 5704 can include disposing (e.g., removably disposing) the blackwater drain line 5702 between the bathroom 5164 and the sewage hookup 5704. This can include extending the blackwater drain line 5702 above-floor between the bathroom 5164 and the sewage hookup 5704, such as disposing a first portion of the blackwater drain line 5702 above-floor within the commercial building 5100 and disposing a second portion of the blackwater drain line 5702 above-ground outside the commercial building 5100.

The method 5900 can further include installing the exterior enclosure 5180 (block 5920) outside the commercial building 5100. In at least some cases, this is part of retrofitting the second outdoor area 5126 from being a driveway and/or parking area to being the courtyard 5178. Installing the exterior enclosure 5180 can include forming the second mass of self-leveling material 5302, such as integrally along most or all of an overall footprint of the exterior enclosure 5180. After the second mass of self-leveling material 5302 is formed, installing the exterior enclosure 5180 can include disposing (e.g., removably disposing) the exterior wall components 5182 over the second mass of self-leveling material 5302. The exterior wall components 5182 can be disposed at a perimeter portion of the courtyard 5178. Disposing the exterior wall components 5182 can include stacking and/or interlocking the exterior wall components 5182. This can be done, for example, while the shells 5408 are in an expanded state. Installing the exterior enclosure 5180 can further include differentially planting the apertures 5402 to form the brand identifier 5404. This can be done using a template after all or most of the exterior wall components 5182 of the exterior enclosure 5180 have been installed. In at least some embodiments, the method 5900 includes assembling the exterior wall components 5182, such as by removably disposing the packages 5410 within the shells 5408 while the shells 5408 are in their expanded state.

As shown in FIG. 174, the method 5900 can include installing the compartmentalizing assembly 5185 within the commercial building 5100 (block 5922). Installing the compartmentalizing assembly 5185 can include disposing (e.g., removably disposing) the liner 5456 within the commercial building 5100, such as over the finished floor surface 5450. Disposing the liner 5456 can include adhesively disposing the liner 5456 or disposing the liner 5456 in another manner. Installing the compartmentalizing assembly 5185 can further include forming the third mass of self-leveling material 5458 over the liner 5456, such as integrally along most or all of an overall footprint of the compartmentalizing assembly 5185. After the third mass of self-leveling material 5458 is formed, installing the compartmentalizing assembly 5185 can include disposing (e.g., removably disposing) the interior wall components 5187 over the third mass of self-leveling material 5458. Disposing the interior wall components 5187 can include stacking and/or interlocking the interior wall components 5187. This can be done, for example, while the shells 5470 are in an expanded state. Installing the compartmentalizing assembly 5185 can further include assembling the interior wall components 5187, such as by removably disposing the batting 5460 within the shells 5470 while the shells 5470 are in the expanded state. In at least some embodiments, the method 5900 further includes disposing (e.g., removably disposing) the ceiling panels 5492, the ceiling beams 5493, and/or other suitable ceiling components within the commercial building 5100. For example, the ceiling panels 5492 and the ceiling beams 5493 can be disposed such that the ceiling beams 5493 support the ceiling panels 5492.

FIG. 175 is a block diagram illustrating a method 5950 for operating a given real estate unit in accordance with an embodiment of the present technology. As with the method 5900, aspects of the method 5950 will be further described primarily in the context of certain ones of the real estate units 5162, 5490, 5700, 5720, 5750, 5760, 5770, 5822, 5866 described herein. It should be understood, however, that the method 5950, when suitable, and/or portions of the method 5950, when suitable, can be practiced with respect to other ones of the real estate units 5162, 5490, 5700, 5720, 5750, 5760, 5770, 5822, 5866 described herein as well as with respect to other real estate units in accordance with embodiments of the present technology. Similarly, although the method 5950 may be described primarily in the context of certain ones of the commercial buildings 5100, 5802 and the mini-storage buildings 5852, it should be understood that the method 5950, when suitable, and/or portions of the method 5950, when suitable, can be practiced with respect to other ones of the commercial buildings 5100, 5802 and the mini-storage buildings 5852 as well as with respect to other compatible buildings.

With reference to FIGS. 129-175 together, the method 5950 can be practiced in connection with providing lodging, rentable residential space, rentable office space, rentable assembly space, and/or another type of space at the interior space 5138. The method 5950 can include leasing the interior space 5138 (block 5952) or maintaining control of the interior space 5138 in another manner, such as one of the manners described above in connection with establishing control of the interior space 5138 in the method 5900. The method 5950 can further include providing renter access to the interior space 5138 (block 5954), such as through the opening 5134 and through the barrier 5172. In this way, the method 5950 can include providing renter access to furnishings at the interior space 5138 corresponding to the use type. For example, the method 5950 can include providing renter access to lodging and/or residential furnishings (e.g., the bed 5276) within the interior space 5138 when the real estate unit 5162 is operated as a lodging and/or residential unit. As another example, the method 5950 can include providing renter access to office furnishings (e.g., the workstation 5752) within the interior space 5138 when the real estate unit 5162 is operated as an office unit. Providing renter access to the interior space 5138 can occur by leasing the interior space 5138 to the renter, subleasing the interior space 5138 to the renter, providing renter access to the interior space 5138 through a membership agreement, providing renter access to the interior space 5138 through a short-term use arrangement (e.g., a lodging arrangement), and/or providing renter access to the interior space 5138 in another manner. Similarly, the method 5950 can include providing renter access to the bathroom 5164 (block 5956) and providing renter access to the courtyard 5178 (block 5958).

The method 5950 can further include flowing sewage from the bathroom 5164 (block 5960), such as toward the blackwater tank 5194, toward the sewage hookup 5704, and/or toward the plumbing drain trunk line 5146. For example, the method 5950 can include flowing backwater above-floor and then above-ground from the toilet 5168 toward the blackwater tank 5194 via the blackwater drain line 5226. As another example, the method 5950 can include flowing sewage (e.g., blackwater) above-floor and then above-ground from the bathroom 5164 toward the sewage hookup 5704 via the blackwater drain line 5702 or a combined blackwater/greywater drain line. As another example, the method 5950 can include flowing sewage (e.g., blackwater) above-floor at least two meters within the commercial building 5100 from the bathroom 5724 toward the plumbing drain trunk line 5146 via the plumbing drain line 5730 and via the toilet hookup 5722. As yet another example, the method 5950 can include flowing greywater from the bath/shower drain 5580 toward the greywater filter 5200 via the greywater drain line 5232. Using the greywater or in another manner, the method 5950 can include growing the vegetation 5184 in the exterior wall components 5182, such as in the planning medium 5306.

The method 5950 can also include swapping the blackwater tank 5194 with a less full counterpart of the blackwater tank 5194 to remove sewage from the real estate unit 5162 (block 5962). This can include operating the blackwater drain quick-connect coupling 5252 to disconnect the blackwater tank 5194 from fluidic connection with the bathroom 5164 and removing the blackwater tank 5194 from the dock 5188. Swapping the blackwater tank 5194 can be at least partially in response to receiving an indication of a fullness of the blackwater tank 5194 from the sensor 5212*a*. The method 5950 can include weighing the blackwater tank 5194 and/or determining a level of sewage within the blackwater tank 5194 to determine the fullness. In addition to or instead of swapping the blackwater tank 5194, the method 5950 can include operating a mobile pump to at least partially pump out the blackwater tank 5194 and thereby remove sewage from the real estate unit 5162. In at least some embodiments, the method 5950 includes operating the real estate unit 5162 at least substantially off-grid with respect to disposal of blackwater from the toilet 5168.

The method 5950 can further include flowing water toward the bathroom 5164 (block 5964). For example, the method 5950 can include flowing water from the water reservoir 5196 toward the bathroom 5164 via the cold water supply line 5228. Furthermore, the method 5950 can include flowing water from the hose bibb 5160 toward the water reservoir 5196 to at least partially replenish a water supply to the real estate unit 5162. In addition or alternatively, the method 5950 can include flowing water from the water supply trunk line 5148 toward the bathroom 5724, such as via the water supply lines 5732 and via the sink hookup. The method 5950 can also include operating the heating system 5497 to heat the airspace 5496 and thereby provide below-room-temperature baseline heating to the interior space 5138 via the ceiling 5495. The method 5950 can further include operating the supplemental heater 5498 to provide supplemental heating to the interior space 5138.

The method 5950 can include providing electricity to the interior space 5138 (block 5966). For example, the method 5950 can include using the battery 5204 to power an appliance within the interior space 5138 via the electrical outlet 5222. The method 5950 can further include swapping the battery 5204 with a less depleted counterpart of the battery 5204 to at least partially replenish an electrical supply to the real estate unit 5162 (block 5968). This can include operating the electrical quick-connect coupling 5254 to disconnect the battery 5204 from electrical connection with the electrical outlet 5222 and removing the battery 5204 from the dock 5188. Swapping the battery 5204 can be at least partially in response to receiving an indication of a depleted state of the battery 5204 from the sensor 5212*c*. In addition to or instead of swapping the battery 5204, the method 5950 can include operating a mobile recharging station to at least partially recharge the battery 5204 and thereby at least partially replenish an electrical supply to the real estate unit 5162. In at least some embodiments, the method 5950 includes operating the real estate unit 5162 at least substantially off-grid with respect to an overall electrical supply to the interior space 5138. Furthermore, the method 5950 can include decommissioning the real estate unit 5162 after a period of operating the real estate unit 5162. Decommissioning the real estate unit 5162 can include suitable operations of the method 5900 in reverse. For example, decommissioning the real estate unit 5162 can include disassembling the exterior enclosure 5180, disassembling the exterior wall components 5182, composting the packages 5410, and collapsing the shells 5408.

As a person having ordinary skill in the art will recognize, numerous permutations of the features disclosed herein are within the scope of the present technology. For example, the real estate unit 5750 can include the dock 5762. As yet another example, the exterior enclosure 5180 can be added to the real estate unit 5760. Furthermore, although features of the present technology are described herein primarily in the context of loading, storage, parking, and vehicle-servicing spaces, it should be understood that the same or similar features can be implemented in other suitable contexts. For example, when suitable, features of the retrofitted loading, storage, parking, and vehicle-servicing spaces disclosed herein can be implemented at a storefront space (e.g., the interior space 5140). In a particular example, features of the real estate unit 5162 can be implemented at the interior space 5140 with the storefront 5124 taking the place of the barrier 5172.

In a another embodiment of the present technology, a real estate unit includes an interior space within a commercial building, a reusable bathroom removably disposed within the commercial building, and reusable wall components also removably disposed within the commercial building. The bathroom, the wall components, and/or other suitable components of the real estate unit can be configured for low-cost deployment, removal, and redeployment. Use of these components can allow revenue from operating the real estate unit to exceed costs associated within transitioning the space within the commercial building from its purpose-built use (e.g., retail, office, and/or restaurant use) to an alternative use (e.g., lodging, residential, office, and/or assembly use) even if the real estate unit is only operated for a short period of time (e.g., one year or less). Thus, an operator of a network of real estate units may lease a space within a commercial building short-term (e.g., monthly) from an owner of the commercial building and retrofit the space for provision of rentable space to third parties with little or no risk of incurring significant economic loss. Even if the owner terminates the lease or if demand for the newly created real estate unit is lower than expected, most of the capital associated with retrofitting the space can be recoverable. Furthermore, capital embodied in the components can be readily relocatable in response to long-term and short-term (e.g., seasonal) changes in demand.

Among various types of real estate, commercial buildings having storefront spaces are particularly well suited to be retrofitted to accommodate alternative uses. For example, these types of spaces tend to be unfurnished or sparsely furnished in their purpose-built uses, which can facilitate retrofitting. As another example, these types of spaces typically have windows that provide abundant nature light and doors that provide direct access to outdoor areas. These features can facilitate convenient guest access and compliance with code requirements for egress. As yet another example, storefront spaces are often unused for periods of months or even years between tenancies. Unlike residential apartments, storefront space are typically leased for many years at a time. Leasing a storefront space is often a major commitment for both a tenant and a landlord, which leads to long periods of vacancy between tenancies while both sites search for the right match. During these periods of vacancy, the value of commercial spaces is typically wasted. Commercial buildings compatible with embodiments of the present technology can have other desirable attributes in addition to or instead of the forgoing attributes. Furthermore, embodiments of the present technology can be implemented in suitable other types of real estate. For example, in a warehouse or other type of commercial building having a ground-floor exterior wall that does not serve as a storefront (i.e., that does not facilitate interaction with the public), an interior space adjacent to the exterior wall can be substituted for one of the storefront spaces described herein.

FIG. 176 is a back profile view of a commercial building 6100 disposed between neighboring commercial buildings 6101 (individually identified as neighboring commercial buildings 6101*a* and 6101*b*). FIG. 177 is a cross-sectional top plan view of the commercial building 6100 taken along the line L-L in FIG. 176. With reference to FIGS. 176 and 177 together, the commercial building 6100 can include a permanent roof 6102, permanent exterior walls 6104 (individually identified as exterior walls 6104*a*-6104*d*), and permanent interior walls 6106. The exterior walls 6104 can define an interior region 6108 of the commercial building 6100. Within the interior region 6108, the commercial building 6100 can include a first building bathroom 6110 (e.g., a men's bathroom), a second building bathroom 6112 (e.g., a women's bathroom), and a utility room 6114. The commercial building 6100 can further include interior doors 6116 (individually identified as interior doors 6116*a*-6116*c*) opening into the first building bathroom 6110, the second building bathroom 6112, and the utility room 6114, respectively.

The exterior wall 6104*a* can be between the interior region 6108 and a first outdoor area 6118 that includes a sidewalk 6120 and a street 6122. At the exterior wall 6104*a*, the commercial building 6100 can include a storefront 6124 between the interior region 6108 and the first outdoor area 6118. The exterior wall 6104*c* can be between the interior region 6108 and a second outdoor area 6126 that includes a yard 6128 and an alley 6130. At the exterior wall 6104*c*, the commercial building 6100 can include a back door 6132 between the interior region 6108 and the second outdoor area 6126. The yard 6128 can be paved and/or otherwise configured to facilitate automobile parking. The commercial building 6100 can include an interior space 6140 at a portion of the interior region 6108 nearest to the storefront 6124. For simplicity of illustration, fixtures, and furnishings within the interior space 6140 are not shown. The interior space 6140 can be at a ground floor of the commercial building 6100. In at least some cases, the interior space 6140 is a purpose-built office, retail, and/or restaurant space. In FIG. 177, the interior space 6140 is shown in a first state, which can be an original, pre-retrofit, or similar state. A primary egress path from the interior space 6140 to the first outdoor area 6118 can extend through the storefront 6124.

As shown in FIG. 177, the first and second building bathrooms 6110, 6112 can include respective toilets 6142 and respective sinks 6144. The commercial building 6100 can include a plumbing drain trunk line 6146 and a water supply trunk line 6148 operably associated with the first and second building bathrooms 6110, 6112. The plumbing drain trunk line 6146 can follow a drainage route from the first and second building bathrooms 6110, 6112 toward a sewage destination (e.g., a municipal sewer) (not shown). Similarly, the water supply trunk line 6148 can follow a supply route from a water source (e.g., a municipal water source) (not shown) toward the first and second building bathrooms 6110, 6112. The plumbing drain trunk line 6146 can be below-ground, such as positioned below a ground surface outside the commercial building 6100 along the drainage route. In addition or alternatively, the plumbing drain trunk line 6146 can be below-floor, such as positioned below a finished floor surface of the commercial building 6100 along the drainage route. Similarly, the water supply trunk line 6148 can be below-ground, such as positioned below a ground surface outside the commercial building 6100 along the supply route. In addition or alternatively, the water supply trunk line 6148 can be below-floor, such as positioned below a finished floor surface of the commercial building 6100 along the supply route.

The plumbing drain trunk line 6146 and/or the water supply trunk line 6148 can be buried or otherwise permanently installed within a basement, a crawlspace, a chase, a foundation, a volume of dirt, or another suitable environment directly below the first and second building bathrooms 6110, 6112 and/or directly below an area around the first and second building bathrooms 6110, 6112. Furthermore, the plumbing drain trunk line 6146 can be sloped to convey liquid waste (e.g., sewage) from the first and second building bathrooms 6110, 6112 toward the sewage destination at least partially by gravity. The water supply trunk line 6148 can be configured to convey potable water from the water source to the first and second building bathrooms 6110, 6112 under pressure. In at least some cases, the commercial building 6100 includes a building water heater 6150 operably associated with the water supply trunk line 6148. In these cases, the water supply trunk line 6148 can bifurcate into branches (not shown) that supply cold and hot water, respectively, to the first and second building bathrooms 6110, 6112, such as at the sinks 6144. The building water heater 6150 can be operably associated with a branch of the water supply trunk line 6148 that supplies hot water to the first and second building bathrooms 6110, 6112. As shown in FIG. 177, the building water heater 6150 can be disposed within the utility room 6114. The commercial building 6100 can include a furnace 6152 and an electrical panel 6154 also disposed within the utility room 6114. The commercial building 6100 can further include a main electrical supply line 6156 through which the electrical panel 6154 is operably connected to an electrical source (e.g., a municipal power source) (not shown). Electrical lines and fixtures downstream from the electrical panel 6154 are omitted for clarity of illustration. As shown in FIG. 177, the commercial building 6100 can include a hose bibb 6160 at an exterior side of the exterior wall 6104*c*.

FIG. 178 is an enlarged view of a portion of FIG. 177. FIG. 179 is a cross-sectional top plan view of a portion of the commercial building 6100 corresponding to the portion of FIG. 177 shown in FIG. 178 and showing a real estate unit 6162 in accordance with an embodiment of the present technology. The real estate unit 6162 can include the interior space 6140 retrofitted (e.g., at least substantially reversibly retrofitted) for an alternative use. In FIG. 179, the interior space 6140 is shown in a second state, which can be a non-original, post-retrofit, or similar state. In the illustrated embodiment, the interior space 6140 is retrofitted for lodging and/or residential use. In other embodiments, the interior space 6140 can be retrofitted for another suitable alternative use, such as office, and/or assembly use in addition to or instead of lodging and/or residential use. With reference again to FIG. 179, the retrofitting of the interior space 6140 can occur well after (e.g., at least 20 years after) the commercial building 6100 was originally constructed.

The real estate unit 6162 can include a variety of retrofits (e.g., at least substantially reversible retrofits) to the commercial building 6100 that change at least a portion of the commercial building 6100 from being well suited a purpose-built use to being well suited for an alternative use. In at least some cases, reversal of all or a portion of these retrofits returns the portion of the commercial building 6100 from being well suited for the alternative use to again being well suited for the purpose-built use. Examples of reversible retrofits include removing, installing, and relocating furniture and fixtures with little or no associated demolition of the exterior and interior walls 6104, 6106 or other permanent fabric of the commercial building 6100. The interior space 6140 and other suitable portions of the commercial building 6100 can be at least substantially reversibly retrofitted to accommodate the real estate unit 6162. For example, a total cost of reversible retrofits to the commercial building 6100 (e.g., a present value of at least substantially reversibly installed reusable components of the real estate unit 6162) for a given transformation of the interior space 6140 from being well suited for a purpose-built use to being well suited for an alternative use can be greater (e.g., at least 50% greater or at least 100% greater) than a total cost of permanent retrofits to the commercial building 6100 (e.g. modifications to the permanent fabric of the commercial building 6100) for the given transformation. Capital associated with the alternative use can be readily re-deployable after the alternative use becomes inactive. In some cases, the alternative use and the real estate unit 6162 are active for one year or less (e.g., six months or less) between successive transformations. In other cases, the alternative use and the real estate unit 6162 can have longer durations or even be permanent.

As shown in FIG. 179, the real estate unit 6162 can include a bathroom 6164 disposed (e.g., removably disposed) within the commercial building 6100. The bathroom 6164 can include a sink 6166, a toilet 6168, and a bath/shower 6170. In at least some embodiments, the bathroom 6164 is reusable and removably disposed within the commercial building 6100. For example, unlike a conventional bathroom that can only be installed by heavy construction and removed by heavy demolition, the bathroom 6164 can be configured to be installed with little or no need for heavy construction and removed with little or no need for heavy demolition. Furthermore, the bathroom 6164 can be configured to be conveniently transported and reused after its removal. In the illustrated embodiment, the bathroom 6164 is an assembly of reusable bathroom modules configured for rapid deployment into and removal from the commercial building 6100 in an at least partially disassembled state. For example, the bathroom 6164 can be made up mostly or entirely of reusable modular components. In other embodiments, a counterpart of the bathroom 6164 can be portable and configured for rapid deployment into and removal from the commercial building 6100 without significant disassembly. This deployment and removal can occur by forklift, by dolly, by operation of wheels integrated into the counterpart of the bathroom 6164, or in another manner. In still other embodiments, a counterpart of the bathroom 6164 can have other forms.

The interior space 6140 can be within a compartment 6186 at least partially defined by wall components 6187 of the real estate unit 6162. In the illustrated embodiment, the real estate unit 6162 and the compartment 6186 encompass no more than 60% of a total floor area of a ground floor of the commercial building 6100. In other embodiments, counterparts of the real estate unit 6162 and the compartment 6186 can be larger, such as encompassing 60% to 80% or encompassing 60% to 100% of a total floor area of a ground floor of a counterpart of the commercial building 6100. As shown in FIG. 179, the wall components 6187 can be disposed at a perimeter portion of the compartment 6186. The wall components 6187 and/or other suitable components of the compartmentalizing assembly 6185 can be reusable and removably disposed within the commercial building 6100. As discussed in further detail below, the wall components 6187 can be stacked and/or interlocking.

In the illustrated embodiment, the real estate unit 6162 is configured to be mostly off-grid (i.e., independent of service connections to local utilities). For example, the real estate unit 6162 can be configured to operate at least substantially off-grid with respect to an overall electrical supply to the interior space 6140, with respect to disposal of blackwater (e.g., wastewater from the toilet 6168), and/or in other respects. This feature of the real estate unit 6162 can be useful, for example, to avoid costs and complications associated with utility hookups, to reduce the environmental impact of the real estate unit 6162, to facilitate efficient management of the real estate unit 6162, to reduce costs associated with maintaining the real estate unit 6162 during periods of nonuse or low use, and/or for other reasons. In other embodiments, a counterpart of the real estate unit 6162 can be mostly or entirely on-grid (i.e., dependent on service connections to local utilities).

As shown in FIG. 179, the real estate unit 6162 can include a dock 6188 disposed (e.g., removably disposed) outside the interior space 6140. The dock 6188 can be within the interior region 6108 or outside the interior region 6108. Furthermore, the dock 6188 can be above-floor (as illustrated), above-ground, or below-ground (e.g., disposed within a pit). At the dock 6188, the real estate unit 6162 can include a heat pump 6190, an exhaust filter 6192, a blackwater tank 6194, a water reservoir 6196, a water heater 6198, a greywater filter 6200, a wireless router 6202, a battery 6204, a trash bin 6206, a recycling bin 6208, and a laundry bin 6210. The water reservoir 6196 can be operably connected to a hose bibb (not shown) and can be configured to increase a capacity of the hose bibb to supply water to the bathroom 6164, such as by attenuating spikes in demand for water from the bathroom 6164. In the illustrated embodiment, the real estate unit 6162 is configured to separately manage removal and disposal of blackwater (e.g., wastewater from the toilet 6168) and greywater (e.g., wastewater from the sink 6166 and the bath/shower 6170). In other embodiments, a counterpart of the real estate unit 6162 can be configured to collectively manage removal and disposal of blackwater and greywater. Accordingly, the blackwater tank 6194 can be more generally referred to as a sewage tank indicating that it can be configured to receive primarily blackwater, primarily greywater, or both blackwater and greywater.

With reference again to FIG. 179, the exhaust filter 6192, the blackwater tank 6194, the battery 6204, the trash bin 6206, the recycling bin 6208, and the laundry bin 6210 can be removably connected to the dock 6188 or otherwise removably disposed outside the interior space 6140. Furthermore, these components can be reusable. In the illustrated embodiment, the real estate unit 6162 is configured to operate on-grid with respect to a water supply to the real estate unit 6162 (e.g., because the water reservoir 6196 is operably connected, for replenishment, to the water supply trunk line 6148 via the hose bibb), configured to be off-grid with respect to an electrical supply to the real estate unit 6162, and configured to be off-grid with respect to disposal of blackwater from the toilet 6168. In other embodiments, a counterpart of the real estate unit 6162 can be off-grid with respect to its water supply (e.g., because a counterpart of the water reservoir 6196 is configured to be independently refilled or swapped), on-grid with respect to its electrical supply (e.g. because a counterpart of the battery 6204 is operably connected, for recharging, to a counterpart of the electrical panel 6154), and/or on-grid with respect its sewage disposal (e.g. because a counterpart of the blackwater tank 6194 is operably connected (e.g., for draining) to a counterpart of the plumbing drain trunk line 6146).

The real estate unit 6162 can be configured to receive occasional servicing. This servicing can be include collecting backwater, trash, recyclables, and laundry (e.g., for cleaning and return) from the blackwater tank 6194, the trash bin 6206, the recycling bin 6208, and the laundry bin 6210, respectively. The servicing can also include recharging the battery 6204. In at least some cases, the blackwater tank 6194 is configured to be pumped out in situ and/or swapped for removal of blackwater from the real estate unit 6162. Similarly, the battery 6204 can be configured to be recharged in situ and/or swapped for at least partial replenishment of an electrical supply to the real estate unit 6162. A less-full replacement for the blackwater tank 6194, a more-fully-charged replacement for the battery 6204, and/or other suitable replacements for components of the real estate unit 6162 can be delivered to the real estate unit 6162 by truck or in another manner. The replaced components can be collected in the same or a different manner and transported to a central location (e.g., a station or substation; not shown) where the components can be efficiently processed (e.g., emptied, cleaned, recharged, etc.) for reuse. This delivery and collection can occur on a regular schedule (e.g., daily, every-other-day, etc.), as needed, and/or on demand.

As shown in FIG. 179, the dock 6188 can include sensors 6212 (individually identified as sensors 6212*a*-6212*f*) operably connected to the blackwater tank 6194, the water reservoir 6196, the battery 6204, the trash bin 6206, the recycling bin 6208, and the laundry bin 6210, respectively. The sensors 6212 can be wirelessly connected to a remote server 6214 via the router 6202 and a network 6216 (e.g., the Internet). The server 6214 can include software that automatically processes data from the sensors 6212 to determine when servicing of the real estate unit 6162 is required. For example, data from the sensor 6212*a* may indicate that the blackwater tank 6194 is at 75% of capacity and needs to be drained or swapped promptly. As another example, data from the sensor 6212*b* may indicate that the water reservoir 6196 is being depleted faster than it can be replenished via the hose bibb 6160 and, therefore, needs to be independently replenished promptly. As yet another example, data from the sensor 6212*c* may indicate that the battery 6204 is at 25% of capacity and needs to be recharged or swapped promptly. Over time, aggregate data from the sensors 6212 can be analyzed to establish default servicing intervals for the real estate unit 6162. In addition or alternatively, data from the sensors 6212 can be used to calculate utility usage for the real estate unit 6162 for purposes of environmental reporting and/or billing a renter of the real estate unit 6162. The sensors 6212*a*-6212*f* can be of suitable respective types for monitoring the corresponding components of the real estate unit 6162. For example, the sensors 6212*a*, 6212*b*, 6212*d*-6212*f* can be weight sensors, level sensors, or other types of sensors configured to measure fullness levels of the blackwater tank 6194, the water reservoir 6196, the trash bin 6206, the recycling bin 6208, and the laundry bin 6210, respectively. As another example, the sensor 6212*c* can be a charge meter or another type of sensor configured to measure a charge of the battery 6204.

The real estate unit 6162 can include suitable utility lines and other connections that extend from components of the real estate unit 6162 within the interior space 6140 to components of the real estate unit 6162 or other structures outside of the interior space 6140. For example, the real estate unit 6162 can include a heater/cooler 6218 within the interior space 6138, and the real estate unit 6162 can further include refrigerant lines 6220 extending between the heater/cooler 6218 and the heat pump 6190. Similarly, the real estate unit 6162 can include an electrical outlet 6222 serving the interior space 6138, and the real estate unit 6162 can further include an electrical line 6224 extending between the electrical outlet 6222 and the battery 6204. The battery 6204, therefore, can be configured to power an appliance (not shown) within the interior space 6138 via the electrical outlet 6222 and the electrical line 6224. As additional examples of suitable utility lines, the real estate unit 6162 can include a blackwater drain line 6226 extending between the bathroom 6164 and the blackwater tank 6194, a cold water supply line 6228 extending between the bathroom 6164 and the water reservoir 6196, a hot water supply line 6230 extending between the bathroom 6164 and the water heater 6198, a greywater drain line 6232 extending between the bathroom 6164 and the greywater filter 6200, a plumbing ventilation line 6234 extending between the bathroom 6164 and the exhaust filter 6192, and an exhaust line 6236 also extending between the bathroom 6164 and the exhaust filter 6192. The blackwater drain line 6226 and the greywater drain line 6232 can be sloped to convey liquid waste from the bathroom 6164 toward the blackwater tank 6194 and the greywater filter 6200, respectively, at least partially by gravity. To facilitate this sloping and/or for other reasons, the bathroom 6164 can have a floor level at least 0.5 meter (e.g., at least 1 meter) higher than an underlying floor level of the interior space 6138. In the illustrated embodiment, the blackwater drain line 6226 and the greywater drain line 6232 are separate. In other embodiments, a counterpart of the real estate unit 6162 can include combined blackwater and greywater lines. Accordingly, the blackwater drain line 6226 and the greywater drain line 6232 can be more generally referred to as plumbing drain lines indicating that they can be configured to convey primarily blackwater, primarily greywater, or both blackwater and greywater.

The real estate unit 6162 can further include a trash hatch 6238, a recycling hatch 6240, and a laundry hatch 6242 within the interior space 6138. The real estate unit 6162 can also include a trash chute 6244 extending between the trash hatch 6238 and the trash bin 6206, a recycling chute 6246 extending between the recycling hatch 6240 and the recycling bin 6208, and a laundry chute 6248 extending between the laundry hatch 6242 and the laundry bin 6210. The refrigerant lines 6220, electrical line 6224, blackwater drain line 6226, cold water supply line 6228, hot water supply line 6230, greywater drain line 6232, plumbing ventilation line 6234, exhaust line 6236, trash chute 6244, recycling chute 6246, and laundry chute 6248 can extend through the wall components 6187. For example, some or all of these lines and chutes can extend through openings in the wall components 6187. The lines and chutes can be removably disposed inside and/or outside the interior space 6140. For example, the lines and chutes can be temporary and configured for reuse or disposal upon decommissioning of the real estate unit 6162. In at least some embodiments, the blackwater drain line 6226 and the greywater drain line 6232 extend above-floor and then above-ground from the bathroom 6164 toward the blackwater tank 6194 and the greywater filter 6200, respectively.

The dock 6188 can include additional lines, connections, and other suitable components associated with the components of the real estate unit 6162 at the dock 6188. For example, the dock 6188 can include a housing 6250 that provides security and protection from weather to components of the real estate unit 6162 at the dock 6188. The housing 6250 can include a lid (not shown) configured to be open when the real estate unit 6162 is being serviced and closed and locked when the real estate unit 6162 is not being serviced. In at least some embodiments, the lid includes solar panels (also not shown) operably connected to the battery 6204. The dock 6188 can further include couplings along some or all of the lines and chutes described above. These couplings can separate portions of the lines and chutes within the housing 6250 from portions of the lines and chutes outside the housing 6250. Thus, by operation of these couplings, the dock 6188 can be transportable as a unit with little or no need to modify internal portions of the dock 6188 in the field. For example, the dock 6188 can be pre-manufactured with the internal components shown in FIG. 179, installed at the location shown in FIG. 179, and then connected up to portions of the associated lines and chutes outside of the housing 6250.

The dock 6188 can further include couplings that facilitate convenient removal and replacement (e.g., swapping) of the blackwater tank 6194, the battery 6204, the trash bin 6206, the recycling bin 6208, and the laundry bin 6210. For example, the dock 6188 can include a blackwater drain quick-connect coupling 6252 through which the blackwater tank 6194 is fluidically connected to the dock 6188, the blackwater drain line 6226, and the bathroom 6164. In at least some embodiments, the blackwater drain quick-connect coupling 6252 includes a check valve. Similarly, the dock 6188 can include an electrical quick-connect coupling 6254 through which the battery 6204 is electrically connected to the dock 6188, the electrical line 6224, and the electrical outlet 6222. The dock 6188 can also include a floor 6256 having pads 6258 (individually identified as pads 6258*a*-6258*e*) that facilitate convenient registration of the blackwater tank 6194, the battery 6204, the trash bin 6206, the recycling bin 6208, and the laundry bin 6210 with the blackwater drain quick-connect coupling 6252, the electrical quick-connect coupling 6254, the trash chute 6244, the recycling chute 6246, and the laundry chute 6248, respectively. For example, the pads 6258*a*-6258*e* can be insets in the floor 6256 that snuggly receive corresponding lower portions of the blackwater tank 6194, the battery 6204, the trash bin 6206, the recycling bin 6208, and the laundry bin 6210, respectively.

As shown in FIG. 179, the dock 6188 can include a potable water inlet 6260 and a greywater outlet 6262. The real estate unit 6162 can include a first hose 6264 extending between the hose bibb 6160 and the potable water inlet 6260. The real estate unit 6162 can further include a second hose 6266 extending between the greywater outlet 6262 and a greywater drain (not shown). The dock 6188 can include internal plumbing (e.g., under the floor 6256; not shown) fluidically connecting the water reservoir 6196 and the potable water inlet 6260, and fluidically connecting the greywater filter 6200 and the greywater outlet 6262. In at least some embodiments, this internal plumbing includes a pump (not shown). The dock 6188 can further include an exhaust output fan 6270 and an internal duct 6272 extending between the exhaust output fan 6270 and the exhaust filter 6192. The dock 6188 can also include an inverter 6274 operably connected to the electrical line 6224.

The real estate unit 6162 can be furnished or otherwise outfitted with suitable furnishings, fixtures, accessories, etc. to accommodate its alternative use. In the illustrated embodiment, the real estate unit 6162 is a lodging and/or residential unit with suitable furnishings, fixtures, accessories, etc. within the interior space 6140 to accommodate lodging and/or residential use of the interior space 6140. These furnishings, fixtures, accessories, etc. can include a bed 6276, a side table 6278, shelving units 6280 (individually identified as shelving units 6280*a*, 6280*b*), a writing table 6282, a chair 6284, a sofa 6286, a coffee table 6288, a television 6290, a kitchenette 6292, a refrigerator 6294, a set of step stairs 6296, and a dining table 6297. The kitchenette 6292 and the set of step stairs 6296 can be operably associated with the bathroom 6164. The real estate unit 6162 can further include a closet 6298 disposed (e.g., removably disposed) within the interior space 6140. The real estate unit 6162 can also include a curtain 6299 at an interior side of the storefront 6124. The curtain 6299 can be movable for privacy and to control an amount of natural light entering the interior space 6140 via the storefront 6124. In other embodiments, a counterpart of the real estate unit 6162 can include other suitable furnishings, fixtures, accessories, etc. As described in further detail below, real estate units in accordance with other embodiments of the present technology can be rentable office units, rentable assembly units, and/or have other suitable primarily uses in addition to or instead of lodging and/or residential uses. Furthermore, rentable real estate units in accordance with embodiments of the present technology can be directly rentable, rentable via a membership system (e.g., in a member-based network of real estate units), rentable under short-term use arrangements (e.g., lodging arrangements), and/or rentable in another manner.

FIG. 180 is an enlarged view of a portion of FIG. 179 showing several of the wall components 6187. FIGS. 181 and 182 are, respectively, a cross-sectional exterior (i.e., facing outward relative to the compartment 6186) side profile view and a cross-sectional interior (i.e., facing inward relative to the compartment 6186) side profile view of a portion of the real estate unit 6162 shown in FIG. 179 corresponding to the portion of FIG. 179 shown in FIG. 180. FIG. 183 is an enlarged view of a portion of FIG. 182. With reference to FIGS. 179-183 together, the wall components 6187 can be arranged in staggered rows within a wall 6448 at a perimeter portion of the interior space 6140. The wall components 6187 closest to the exterior wall 6104*b* can alternate row-to-row between larger and smaller rectangular shapes. Similarly, the wall components 6187 closest to the exterior wall 6104*d* can alternate row-to-row between larger and smaller rectangular shapes. Elsewhere within the wall 6448, the wall components 6187 can have the larger rectangular shape. The overall wall 6448 can be at least substantially self-supporting and/or at least substantially freestanding.

The interior space 6140 can have a finished floor surface 6450 over which the wall components 6187 are removably disposed, a finished wall surface 6452 beside which the wall components 6187 are removably disposed, and a finished ceiling surface 6454 below which the wall components 6187 are removably disposed. The compartmentalizing assembly 6185 can include a liner 6456 disposed (e.g., removably or permanently disposed) on the finished floor surface 6450 below the interior wall components 6187. For example, the liner 6456 can be adhesively connected to the finished floor surface 6450. The liner 6456 can be useful, for example, to protect the finished floor surface 6450 from components of the wall 6448, to facilitate layout the wall 6448, to reduce or eliminate the possibility of shifting of the wall 6448, and/or for other purposes. Suitable materials for the liner 6456 include strips of peel-and-stick house wrap and strips of peel-and-stick roof underlayment. The liner 6456 can be disposable or reusable.

In at least some embodiments, the wall 6448 includes additional components that facilitate compatibility between the wall components 6187 and the interior space 6140 when the wall components 6187 have standard dimensions and the interior space 6140 has irregular dimensions. For example, the wall 6448 can include a mass of self-leveling material 6458 (e.g., a disposable mass of hardened self-leveling grout) under the wall components 6187 and over the liner 6456. The mass of self-leveling material 6458 can be molded and, in at least some cases, is integrally formed along most or all of an overall footprint of the wall 6448. During formation of the mass of self-leveling material 6458, the constituent self-leveling material can be of sufficiently low viscosity to level itself by gravity. Thus, the mass of self-leveling material 6458 can automatically conform to slopes, dips, and other irregularities in the finished floor surface 6450. When at least partially cured, the mass of self-leveling material 6458 can provide the wall 6448 with a reliably level surface that facilitates vertical stacking of the wall components 6187.

As shown in FIGS. 179 and 180, the wall 6448 can include compressible batting 6460 disposed (e.g., stuffed) into a vertical gap between the wall components 6187 and the finished wall surface 6452 and disposed (e.g., stuffed) into a horizontal gap between the wall components 6187 and the finished ceiling surface 6454. The batting 6460 can be reusable. Furthermore, the batting 6460 can be non-combustible. For example, the batting 6460 can be reusable bundles of lined or unlined mineral wool insulation. As shown in FIG. 182, the compartmentalizing assembly 6185 can include inwardly facing molding panels 6462 that hide the batting 6460 from inside the compartment 6186. The molding panels 6462 can be attached to the wall components 6187 magnetically, adhesively, mechanically, or in another manner. In at least some embodiments, the overall wall 6448 has a fire rating of at least two hours. This can be useful, for example, for building-code compliance when the real estate unit 6162 has a use different than another ongoing use within the commercial building 6100.

The individual interior wall components 6187 can include downwardly extending flanges 6464 that are received within successively lower wall components 6187. The wall 6448 can further include base blocks 6466 configured to receive the flanges 6464 of the interior wall components 6187 within a lowest row of wall components 6187 within the wall 6448. When fully assembled, the wall 6448 can be strong enough to support fixtures and accessories (e.g., electrical conduits, monitors, shelving, moldings, artwork, furniture supports, etc.). In at least some embodiments, exposed portions of the wall components 6187 are at least partially made of ferrous metal such that fixtures and accessories can be connected to the wall 6448 magnetically. In addition or alternatively, the wall components 6187 can include coupling components 6468 that allow fixtures and accessories to be connected to the wall 6448 mechanically and/or by gravity.

FIG. 184 is side profile view of a given one of the wall components 6187 separate from other portions of the wall 6448. FIG. 185 is a cross-sectional top plan view of the given wall component 6187 taken along the line 185-185 in FIG. 184. FIG. 186 is a cross-sectional end profile view of the given wall component 6187 taken along the line 186-186 in FIG. 184. The given wall component 6187 is of the large rectangular type. In at least some embodiments, other (e.g., most or all) of the wall components 6187 of the large rectangular type within the wall 6448 at least substantially match the given wall component 6187. Furthermore, wall components 6187 of the small rectangular type can have the same or similar features as the features of the given wall component 6187. With reference to FIGS. 184-186 together, the given wall component 6187 can include a shell 6470 having a first side panel 6472 and an opposite second side panel 6474 parallel to and spaced apart from the first side panel 6472. Similarly, the shell 6470 can include a first end panel 6476 and an opposite second end panel 6478 parallel to and spaced apart from the first end panel 6476. The first and second side panels 6472, 6474 and the first and second end panels 6476, 6478 can define an interior region of the given wall component 6187 shaped, for example, as a rectangular solid.

The given wall component 6187 can include two of the flanges 6464 at the first side panel 6472 and another two of the flanges 6464 at the second side panel 6474. As shown in FIG. 186, the flanges 6464 can be parallel to and inset relative to the corresponding first and second side panels 6472, 6474. Between the flanges 6464 at the first side panel 6472 and between the flanges 6464 at the second side panel 6474, the given wall component 6187 can include respective slots 6480. When the given wall component 6187 is assembled with other wall components 6187 of the large rectangular type within the wall 6448, one of the flanges 6464 at the first side panel 6472 and an opposing one of the flanges 6464 at the second side panel 6474 can be received within the interior region of a first neighboring lower wall component 6187. Similarly, the other of the flanges 6464 at the first side panel 6472 and the other of the flanges 6464 at the second side panel 6474 can be received within the interior region of a second neighboring lower wall component 6187 adjacent to the first neighboring lower wall component 6187. The second end panel 6478 of the first neighboring lower wall component 6187 and the first end panel 6476 of the second neighboring lower wall component 6187 can be directly adjacent to one another and received within the slots 6480 of the given wall component 6187. This interaction between the wall components 6187 can facilitate convenient assembly of the wall 6448 with neighboring rows of the interior wall components 6187 evenly staggered.

In the illustrated embodiment, the first and second side panels 6472, 6474 are thinner than the first and second end panels 6476, 6478 and made of a different material. For example, the first and second side panels 6472, 6474 can be metal (e.g., iron) and the first and second end panels 6476, 6478 can be cementitious (e.g., fiber-reinforced cement). The metal composition of the first and second side panels 6472, 6474 can be useful, for example, for aesthetics, to facilitate magnetic coupling of fixtures and accessories to the wall 6448, and/or for other reasons. The cementitious composition of the first and second end panels 6476, 6478 can be useful, for example, to reduce noise transmission through the wall 6448, for cost savings, and/or for other reasons. In other embodiments, the first and second side panels 6472, 6474 and the first and second end panels 6476, 6478 can have other compositions.

The given wall component 6187 can further include batting 6482 disposed within its interior region. Similar to the batting 6460 described above, the batting 6482 can be reusable and/or non-combustible. For example, the batting 6482 can be reusable bundles of lined or unlined mineral wool insulation. In at least some embodiments, the batting 6482 is removable. Furthermore, the shell 6470 can be collapsible from an expanded state to a compact (e.g., at least partially flattened) state. For example, at corners where the first and second side panels 6472, 6474 and the first and second end panels 6476, 6478 meet, the given wall component 6187 can include hinges (not shown), such as flexure bearings or piano hinges, that allow each corner to fold in a direction that causes the first and second side panels 6472, 6474 and the first and second end panels 6476, 6478 to at least partially flatten. This feature can facilitate efficient storage and transport of the shell 6470 before and/or after its deployment at the real estate unit 6162. When the shell 6470 is collapsible, the given wall component 6187 can include a rectangular inset (not shown) removably disposed within the interior of the given wall component 6187 such that it rests on upper edges of the flanges 6464. When present, the inset can help the given wall component 6187 maintain its rectangular form during use. When the shell 6470 is collapsed, the inset can be removed.

FIG. 187 is an enlarged view of a portion of FIG. 186. As shown in FIG. 187, a lowermost portion of the first side panel 6472 can overlap an uppermost portion of one the flanges 6464. FIG. 187 further illustrates a given one of the coupling components 6468 at the lowermost portion of the first side panel 6472. In at least some embodiments, other (e.g., most or all) of the coupling components 6468 of interior wall components 6187 within the wall 6448 at least substantially match the coupling component 6468 illustrated in FIG. 187. The coupling component 6468 can include a notch 6484 and a plug 6486 removably disposed within the notch 6484. The plug 6486 can include a magnet 6488 that releasably connects the plug 6486 to the uppermost portion of the adjacent flange 6464. The plug 6486 can be disposed within the notch 6484 when the coupling component 6468 is not in use. Removing the plug 6486 from the notch 6484 can expose an opening into the interior of the given interior wall component 6187. A mechanical fastener (e.g., a hook) (not shown) can be inserted into this opening. In this way, relatively heavy fixtures and accessories can be connected to the wall 6448 through a reliable mechanical connection in addition to or instead of a magnetic connection.

FIG. 188 is a cross-sectional top plan view of a real estate unit 6490 in accordance with another embodiment of the present technology including the interior space 6140 within the commercial building 6100 taken along the line 188-188 in FIG. 176 with the interior space 6140 in the second state. FIG. 189 is an enlarged view of a portion of FIG. 188. FIG. 190 is a cross-sectional exterior side profile view of a portion of the real estate unit 6490 corresponding to the portion of FIG. 188 shown in FIG. 189. With reference to FIGS. 188-190 together, the real estate unit 6490 can include ceiling components (e.g., reusable ceiling components) removably disposed within the commercial building 6100. The ceiling components can include ceiling panels 6492 and elongate ceiling beams 6493 interspersed between the ceiling panels 6492. The ceiling beams 6493 can support the ceiling panels 6492, and the wall components 6187 can support the ceiling beams 6493. The wall components 6187 can be assembled into walls, columns, or other suitable structures that extend between the ceiling beams 6493 and the finished floor surface 6450. For example, the real estate unit 6490 can include columns and headers (not shown) abutting an interior surface of the exterior wall 6104*a*. The ceiling beams 6493 can extend between the wall 6448 and the headers. When a distance between the wall 6448 and the headers does not correspond to a multiple of the length of the ceiling panels 6492, and in other cases, the ceiling panels 6492 and the ceiling beams 6493 can be cantilevered over the wall 6448.

As shown in FIG. 190, the individual ceiling beams 6493 can have an I-shape transverse cross-section including two channels at opposite sides of a central web. The individual ceiling panels 6492 can have side edge portions snugly received within corresponding channels of adjacent ceiling beams 6493. Together, the ceiling panels 6492 and the ceiling beams 6493 can form a ceiling 6495 of the real estate unit 6490. The ceiling 6495 can be below an airspace 6496 within the commercial building 6100. The commercial building 6100 can include a central heating system 6497 (shown schematically) operable to heat the airspace 6496 and thereby provide below-room-temperature baseline heating to the interior space 6140 via the ceiling 6495. The real estate unit 6490 can include a supplemental heater 6498 (shown schematically) operable to provide supplemental heating to the interior space 6140.

With reference again to the real estate unit 6162, FIGS. 191, 192, 193 and 194 are, respectively, a first side profile view, an opposite second side profile view, a first end profile view, and an opposite second end profile view of the bathroom 6164. With reference to FIGS. 191-194 together, the bathroom 6164 can include a rectangular floor module 6500, a rectangular ceiling module 6502 vertically spaced apart from the floor module 6500, and a plurality of wall modules 6504 (individually identified as wall modules 6504*a*-6504*d*) removably connected to the floor and ceiling modules 6500, 6502 at respective perimeter portions of the floor and ceiling modules 6500, 6502. The bathroom 6164 can further include a lower gasket 6506 disposed between the perimeter portion of the floor module 6500 and the wall modules 6504, and an upper gasket 6508 disposed between the perimeter portion of the ceiling module 6502 and the wall modules 6504. The floor module 6500 can include upwardly extending tabs 6510 through which the floor module 6500 is secured to the wall modules 6504. Similarly, the ceiling module 6502 can include downwardly extending tabs 6512 through which the ceiling module 6502 is secured to the wall modules 6504. The wall modules 6504*c*, 6504*d* can include vertical flanges 6514 at which the wall modules 6504*c*, 6504*d* are secured to the wall modules 6504*a*, 6504*b*. The bathroom 6164 can include bolts 6516 and associated nuts 6518 at the upwardly extending tabs 6510, the downwardly extending tabs 6512, and the vertical flanges 6514.

At the wall module 6504*a* (FIG. 193), the bathroom 6164 can include a doorway opening 6520, a frame 6522 extending around the doorway opening 6520, and a door 6524 disposed within the doorway opening 6520 and hingedly connected to the frame 6522. The bathroom 6164 can further include a handle 6526 and hinges 6528 operably associated with the door 6524. At the wall module 6504*c* (FIG. 191), the bathroom 6164 can include a plumbing ventilation hookup 6530 and an exhaust hookup 6532. The plumbing ventilation hookup 6530 and the exhaust hookup 6532 can be configured for convenient connection to and disconnection from the plumbing ventilation line 6234 and the exhaust line 6236 (FIG. 179), respectively, such as via quick-release couplings (not shown). The wall modules 6504*c*, 6504*d* can extend between the wall modules 6504*a*, 6504*b* at opposite sides of the bathroom 6164. As discussed above, the bathroom 6164 can be configured to be elevated above a floor surface of the interior space 6140. For this purpose and/or another purpose, the floor module 6500 can include feet 6533. In at least some embodiments, a gap between the feet 6533 is large enough to allow the bathroom 6164, when fully assembled, to be conveniently moved by forklift. At the ceiling module 6502, the bathroom 6164 can include skylights 6534 that allow ambient light within the interior space 6138 to enter an interior of the bathroom 6164.

At a side of the floor module 6500 below the wall module 6504*c*, the bathroom 6164 can include a blackwater drain hookup 6535, a main cold water supply hookup 6536, and a main hot water supply hookup 6538. At an end of the floor module 6500 below the wall module 6504*a*, the bathroom 6164 can include a main electrical hookup 6540 and a main greywater drain hookup 6541. The blackwater drain hookup 6535, the main cold water supply hookup 6536, the main hot water supply hookup 6538, the main electrical hookup 6540, and the main greywater drain hookup 6541 can be configured for convenient connection to and disconnection from the blackwater drain line 6226, the cold water supply line 6228, the hot water supply line 6230, the electrical line 6224, and the greywater drain line 6232, respectively, such as via quick-release couplings (not shown). At a side of the floor module 6500 below the wall module 6504*d*, the bathroom 6164 can include an auxiliary greywater drain hookup 6542, an auxiliary cold water supply hookup 6544, an auxiliary hot water supply hookup 6546, and an auxiliary electrical hookup 6548. The auxiliary greywater drain hookup 6542, the auxiliary cold water supply hookup 6544, the auxiliary hot water supply hookup 6546, and the auxiliary electrical hookup 6548 can be configured for convenient connection to and disconnection from corresponding lines (not shown) of the kitchenette 6292, such as via quick-release couplings (not shown).

FIG. 195 is a cross-sectional top plan view of the bathroom 6164 taken along the line 195-195 in FIG. 191. As shown in FIG. 195, the floor module 6500 can include a deck 6554 on which the sink 6166, the toilet 6168, and the bath/shower 6170 are disposed (e.g., removably disposed). The sink 6166 can include a basin 6562, a sink drain 6564, a sink faucet 6566, a sink hot water knob 6568, and a sink cold water knob 6570 operably connected to one another. The toilet 6168 can include a tank 6572, a bowl 6574, and a toilet drain 6576 operably connected to one another. The bath/shower 6170 can include a tub 6578, a bath/shower drain 6580, a tub faucet 6582, a tub cold water knob 6584, a tub hot water knob 6586, a cold water conduit 6588, and a hot water conduit 6590 operably connected to one another. The cold water conduit 6588 can include a riser 6592 and a first branch 6594 extending between the riser 6592 and the tub faucet 6582. The tub cold water knob 6584 can be disposed along the first branch 6594 and operable to control a flow of cold water from the cold water conduit 6588 to the tub faucet 6582. Similarly, the hot water conduit 6590 can include a riser 6596 and a first branch 6598 extending between the riser 6596 and the tub faucet 6582. The tub hot water knob 6586 can be disposed along the first branch 6598 and operable to control a flow of hot water from the hot water conduit 6590 to the tub faucet 6582.

The bathroom 6164 can include an electrical conduit 6600, and a junction box 6602 operably connected to the electrical conduit 6600. The bathroom 6164 can further include a first plumbing ventilation conduit 6604 disposed between the sink 6166 and the toilet 6168, and a second plumbing ventilation conduit 6605 disposed between the sink 6166 and the bath/shower 6170. The first and second plumbing ventilation conduits 6604, 6605 can be configured to ventilate blackwater and greywater plumbing, respectively. The bathroom 6164 can still further include a floor drain 6606 disposed between the toilet 6168 and the bath/shower 6170. FIG. 196 is an enlarged view of a portion of FIG. 195. With reference to FIGS. 195 and 196 together, the bathroom 6164 can include vertical gaskets 6608 disposed between the respective vertical flanges 6514 and corresponding portions of the wall modules 6504*a*, 6504*b*. Similarly, the bathroom 6164 can include lower tab gaskets 6610 disposed between the respective upwardly extending tabs 6510 and corresponding portions of the wall modules 6504.

FIG. 197 is a cross-sectional bottom plan view of the bathroom 6164 taken along the line 197-197 in FIG. 191. As shown in FIG. 197, the bathroom 6164 can include a light fixture 6612 attached to the wall module 6504*c* above the sink 6166. The bathroom 6164 can further include an exhaust intake fan 6614 attached to the ceiling module 6502. The electrical conduit 6600 can extend from the junction box 6602 (FIG. 195) to the light fixture 6612, and from the light fixture 6612 to the exhaust intake fan 6614. The first and second plumbing ventilation conduits 6604, 6605 can merge and extend along an inner corner between the ceiling module 6502 and the wall module 6504*c* to the plumbing ventilation hookup 6530 (FIG. 191). The bathroom 6164 can include an exhaust conduit 6616 extending from the exhaust intake fan 6614 along an inner corner between the ceiling module 6502 and the wall module 6504*b* to the exhaust hookup 6532 (FIG. 191). Above one end of the tub 6578 (FIG. 195), the bath/shower 6170 (FIG. 195) can include a showerhead 6618, a shower cold water knob 6620 operably connected to the cold water conduit 6588, and a shower hot water knob 6622 operably connected to the hot water conduit 6590. The cold water conduit 6588 can include a second branch 6624 extending between the riser 6592 and the showerhead 6618. The shower cold water knob 6620 can be disposed along the second branch 6624 and operable to control a flow of cold water from the cold water conduit 6588 to the showerhead 6618. Similarly, the hot water conduit 6590 can include a second branch 6626 extending between the riser 6596 and the showerhead 6618. The shower hot water knob 6622 can be disposed along the second branch 6626 and operable to control a flow of hot water from the hot water conduit 6590 to the showerhead 6618. The bathroom 6164 can include upper tab gaskets 6628 disposed between the respective downwardly extending tabs 6512 and corresponding portions of the wall modules 6504.

FIG. 198 is a cross-sectional top plan view of the bathroom 6164 taken along the line 198-198 in FIG. 191. With reference to FIGS. 179 and 191-198 together, the floor module 6500 can include a skirt 6630 and a series of parallel spaced-apart joists 6632 within the skirt 6630. The bathroom 6164 can include a blackwater drain conduit 6634 operably connected to the blackwater drain hookup 6535 and the toilet drain 6576. Thus, the toilet 6168 can be operably connected to the blackwater tank 6194 via the blackwater drain conduit 6634 and the blackwater drain line 6226. The blackwater drain conduit 6634 can include a branch 6635 operably connected to the first plumbing ventilation conduit 6604. The bathroom 6164 can further include a greywater drain conduit 6636 operably connected to the main greywater drain hookup 6541. The greywater drain conduit 6636 can include branches 6638 (individually identified as branches 6638*a*-6638*c*) operably connected to the second plumbing ventilation conduit 6605, the sink drain 6564, and the auxiliary greywater drain hookup 6542, respectively. The greywater drain conduit 6636 can further include sub-branches 6639 (individually identified as sub-branches 6639*a*, 6639*b*) operably connected to the bath/shower drain 6580 and the floor drain 6606, respectively. Thus, the bath/shower drain 6580 can be operably connected to the greywater filter 6200 via the greywater drain conduit 6636 and the greywater drain line 6232. The sub-branches 6639*c*, 6639*b* of the greywater drain conduit 6636 can include respective traps 6640. Furthermore, the blackwater drain conduit 6634 and the greywater drain conduit 6636 can include respective caps 6642, such as to facilitate clean-out.

The bathroom 6164 can include wheels 6643 (e.g., swivel casters) integrated into the floor module 6500. In the illustrated embodiment, the wheels 6643 are embedded within the feet 6533 and accessible via inwardly facing openings (not shown) of the feet 6533. The individual wheels 6643 can be movable between a retracted state and an extended state. For example, the bathroom 6164 can include posts 6644 having threads (not shown) that engage corresponding threads (not shown) of the wheels 6643 such that the wheels 6643 can be rotatably moved between the retracted and extended states. Moving the wheels 6643 from the retracted state to the extended state can lift the bathroom 6164 off a corresponding floor surface, thereby allowing the bathroom 6164 to be conveniently moved along the floor surface.

The bathroom 6164 can further include a main cold water conduit 6645 and a main hot water conduit 6646 operably connected to the main cold water supply hookup 6536 and the main hot water supply hookup 6538, respectively. The main cold water conduit 6645 can include branches 6648 (individually identified as branches 6648*a*, 6648*b*) operably connected to the sink 6166 and the bath/shower 6170 (via the riser 6592), respectively. The main cold water conduit 6645 can further include sub-branches 6650 (individually identified as sub-branches 6650*a*, 6650*b*) operably connected to the auxiliary cold water supply hookup 6544 and the toilet 6168, respectively. The main hot water conduit 6646 can include branches 6652 (individually identified as branches 6652*a*, 6652*b*) operably connected to the sink 6166 and the bath/shower 6170 (via the riser 6596), respectively. The main hot water conduit 6646 can further include a sub-branch 6654 operably connected to the auxiliary hot water supply hookup 6546. The bathroom 6164 can still further include a main electrical conduit 6656 operably connected to the main electrical hookup 6540. The main electrical conduit 6656 can include branches 6658 (individually identified as branches 6658*a*, 6658*b*) operably connected to the auxiliary electrical hookup 6548 and a floor heating system (introduced below). The main electrical conduit 6656 can further include a sub-branch 6659 operably connected to the electrical conduit 6600.

FIG. 199 is a cross-sectional bottom plan view of the bathroom 6164 taken along the line 199-199 in FIG. 191. As shown in FIG. 199, the bathroom 6164 can include a floor heating system 6660 operably associated with the deck 6554. The floor heating system 6660 can include a control box 6662 operably connected to the branch 6658*b* of the main electrical conduit 6656, and a heating cable 6664 operably connected to the control box 6662. The heating cable 6664 can have a serpentine configuration and be directly connected to an underside of the deck 6554 between the joists 6632. With reference to FIGS. 191-199 together, the floor drain 6606, the blackwater drain conduit 6634 (e.g., including its branch 6635), the greywater drain conduit 6636 (e.g., including its branches 6638 and sub-branches 6639), the main cold water conduit 6645 (e.g., including its branches 6648 and sub-branches 6650), the main hot water conduit 6646 (e.g., including its branches 6652 and sub-branch 6654), the main electrical conduit 6656 (e.g., including its branches 6658 and sub-branch 6659), the floor heating system 6660, and/or other suitable components of the bathroom 6164 can be pre-installed components of the floor module 6500. Similarly, the supply plumbing for the bath/shower 6170 (e.g., including the tub faucet 6582, the cold water conduit 6588, the hot water conduit 6590, and the showerhead 6618), the light fixture 6612, and/or other suitable components of the bathroom 6164 can be pre-installed components of the wall module 6504*c*. These and/or other aspects of the bathroom 6164 can facilitate rapid deployment, removal, and redeployment of the bathroom 6164.

FIG. 200 is a cross-sectional top plan view of a real estate unit 6700 in accordance with another embodiment of the present technology including the interior space 6140 within the commercial building 6100 taken along the line L-L in FIG. 176 with the interior space 6140 in the second state. The real estate unit 6700 can include a dock 6701 that does not include the blackwater tank 6194 (FIG. 179) and the blackwater drain line 6226 (FIG. 179) of the real estate unit 6162 (FIG. 179). Instead of these components, the real estate unit 6700 can include a blackwater drain line 6702 extending between (e.g., removably disposed between) the bathroom 6164 and an outdoor sewage hookup 6704. The blackwater drain line 6702 can extend through the exterior wall 6104*c* from the bathroom 6164 toward the sewage hookup 6704. Furthermore, the blackwater drain line 6702 can extend above-floor and then above-ground from the bathroom 6164 toward the sewage hookup 6704. The sewage hookup 6704 can be a retrofitted access point to a municipal, septic, or other permanent sewage system serving the commercial building 6100. In at least some cases, the blackwater drain line 6702 connects to the sewage hookup 6704 via a quick-connect coupling (not shown). In the illustrated embodiment, the real estate unit 6700 (like the real estate unit 6162 (FIG. 179)) is configured to recycle greywater. In other embodiments, a counterpart of the real estate unit 6700 can be configured to dispose of greywater with blackwater via the sewage hookup 6704. For example, a counterpart of the bathroom 6164 can be alternatively configured so that a counterpart of the greywater drain conduit 6636 (FIG. 198) is combined with a counterpart of the blackwater drain conduit 6634 (FIG. 198).

In another embodiment, a counterpart of the real estate unit 6162 (FIG. 179) is operably associated with components that reduce or eliminate the need for frequent servicing and/or connections to permanent utilities serving the commercial building 6100. For example, the counterpart of the real estate unit 6162 (FIG. 179) can be operably associated with a high-capacity sewage detention reservoir (not shown) disposed (e.g., removably disposed) outside the interior space 6138, a high-capacity cold water reservoir (not shown) disposed (e.g., removably disposed) outside the interior space 6138, and/or a high-capacity generator (not shown) disposed (e.g., removably disposed) outside the interior space 6138. The high-capacity sewage detention reservoir can be configured for occasional evacuation into a mobile tanker (e.g., a septic system pump truck). Similarly, the high-capacity cold water reservoir can be configured for occasional replenishment from a mobile tanker (e.g., a water supply truck). In these embodiments, with reference to FIG. 179, a counterpart of the dock 6188 can be without the blackwater tank 6194, the water reservoir 6196, the greywater filter 6200, and/or the battery 6204.

FIG. 201 is a cross-sectional top plan view of a real estate unit 6710 in accordance with another embodiment of the present technology including the interior space 6140 within the commercial building 6100 taken along the line L-L in FIG. 176 with the interior space 6140 in the second state. The real estate unit 6700 can include a dock 6711 disposed (e.g., removably disposed) within the yard 6128. The real estate unit 6710 can include refrigerant lines 6712, an electrical line 6713, a blackwater drain line 6714, a cold water supply line 6715, a hot water supply line 6716, and a greywater drain line 6717 extending above-floor at least two meters within the commercial building 6100 from the bathroom 6164 toward the dock 6711.

FIG. 202 is a cross-sectional top plan view of a real estate unit 6720 in accordance with another embodiment of the present technology including the interior space 6140 within the commercial building 6100 taken along the line L-L in FIG. 176 with the interior space 6140 in the second state. As shown in FIG. 202, the real estate unit 6720 can be without a dock and can, instead, be tethered to plumbing and electrical systems of the commercial building 6100. The first building bathroom 6110 can include a toilet hookup 6722 that is exposed when the toilet 6142 of the first building bathroom 6110 is removed. Similarly, the first building bathroom 6110 can include sink hookups (e.g., hot and cold; not shown) that are exposed when the sink 6144 of the first building bathroom 6110 is disconnected. The toilet hookup 6722 and the sink hookups can be operably connected to the plumbing drain trunk line 6146 and the water supply trunk line 6148, respectively. The real estate unit 6720 can include the bathroom 6164, which is operably connected to the plumbing drain trunk line 6146 and the water supply trunk line 6148 via the toilet hookup 6722 and the sink hookups, respectively. The real estate unit 6720 can further include a heat pump 6726 and an exhaust filter 6728 similar to the heat pump 6190 and the exhaust filter 6192 of the real estate unit 6162.

The real estate unit 6720 can further include a plumbing drain line 6730 through which the bathroom 6164 is operably connected to the plumbing drain trunk line 6146. The plumbing drain line 6730 can be disposed (e.g., removably disposed) between the bathroom 6164 and the toilet hookup 6722. For example, the plumbing drain line 6730 can extend above-floor at least two meters within the commercial building 6100 from the bathroom 6164 toward the toilet hookup 6722. Similarly, the real estate unit 6720 can include water supply lines 6732 (e.g., hot and cold) through which the bathroom 6164 is operably connected to the water supply trunk line 6148. The water supply lines 6732 can be disposed (e.g., removably disposed) between the bathroom 6164 and the sink hookups. For example, the water supply lines 6732 can extend above-floor at least two meters within the commercial building 6100 from the bathroom 6164 toward the sink hookups. Also similarly, the real estate unit 6720 can include an electrical line 6734 through which the bathroom 6164 and outlets (not shown) within the real estate unit 6720 are operably connected to the electrical panel 6154. The electrical line 6734 can be disposed (e.g., removably disposed) between the bathroom 6164 and the electrical panel 6154. The interior doors 6116*a*, 6116*b* can be propped open (as shown) or removed to allow passage of the plumbing drain line 6730, the water supply lines 6732, and the electrical line 6734 between the bathroom 6164 and the toilet hookup 6722, the sink hookups, and the electrical panel 6154, respectively. The real estate unit 6720 can further include a bridge 6736 disposed over a bundle of the plumbing drain line 6730, the water supply lines 6732, and the electrical line 6734. The bridge 6736 can be reusable and removably disposed within the commercial building 6100.

The real estate unit 6720 can further include a sewage detention tank 6738 along the plumbing drain line 6730. Similarly, the real estate unit 6720 can include a water supply tank (not shown) and a supplemental water heater (not shown) along the water supply lines 6732. The sewage detention tank 6738, the water supply tank, and the supplemental water heater can be reusable and disposed (e.g., removably disposed) within the commercial building 6100. These components can attenuate spikes in water demand and/or sewage flow from the real estate unit 6720. In the illustrated embodiment, there is only one real estate unit 6720 within the commercial building 6100. In other embodiments, there can be multiple counterparts of the real estate unit 6720 within a counterpart of the commercial building 6100. In these other embodiments, a plumbing fixture load of a counterpart of the first building bathroom 6110 may still be sufficient to service the multiple counterparts of the real estate unit 6720 due, for example, to increased capacity provided by counterparts of the sewage detention tank 6738, the water supply tank, and the supplemental water heater. In addition or alternatively, when there are two counterparts of the real estate unit 6720 within a counterpart of the commercial building 6100, the two counterparts of the real estate unit 6720 can be separately tethered to the first and second building bathrooms 6110, 6112, respectively.

In the embodiments illustrated in FIGS. 179 and 200-202, the real estate units 6162, 6700, 6710, 6720 are configured at least primarily as lodging and/or residential units. In other embodiments, a counterpart of the real estate units 6162, 6700, 6710, 6720 can have another primary use. For example, the counterpart of the real estate units 6162, 6700, 6710, 6720 can be a rentable office unit, a rentable assembly unit, and/or a rentable unit of another type. FIG. 203 is a cross-sectional top plan view of a real estate unit 6750 in accordance with another embodiment of the present technology including the interior space 6140 within the commercial building 6100 taken along the line L-L in FIG. 176 with the interior space 6140 in the second state. The real estate unit 6750 can be configured at least primarily as a rentable office unit. The real estate unit 6750 can include office furnishings, such as a workstation 6752 removably disposed within the interior space 6140.

FIG. 204 is a cross-sectional top plan view of a real estate unit 6760 in accordance with another embodiment of the present technology including the interior space 6140 within the commercial building 6100 taken along the line L-L in FIG. 176 with the interior space 6140 in the second state. The real estate unit 6760 can be configured at least primarily as a rentable assembly unit. For example, the real estate unit 6760 can be configured to accommodate parties, classes, etc. The real estate unit 6760 can include a dock 6762 that does not include the trash bin 6206 (FIG. 179), the recycling bin 6208 (FIG. 179), and the laundry bin 6210 (FIG. 179) of the real estate unit 6162 (FIG. 179), but is otherwise the same as or similar to the dock 6188 (FIG. 179). FIG. 205 is a cross-sectional top plan view of a real estate unit 6770 in accordance with another embodiment of the present technology including the interior space 6140 within the commercial building 6100 taken along the line L-L in FIG. 176 with the interior space 6140 in the second state. The real estate unit 6770 can be configured at least primarily as a combined lodging and rentable office unit. For example, the real estate unit 6770 can include partitions 6772 that close off the bed 6276 during work hours.

FIG. 206 is a block diagram illustrating a method 6900 for making a given real estate unit in accordance with an embodiment of the present technology. For simplicity, aspects of the method 6900 will be further described primarily in the context of certain ones of the real estate units 6162, 6490, 6700, 6710, 6720, 6750, 6760, 6770 described herein. It should be understood, however, that the method 6900, when suitable, and/or portions of the method 6900, when suitable, can be practiced with respect to other ones of the real estate units 6162, 6490, 6700, 6710, 6720, 6750, 6760, 6770 described herein as well as with respect to other real estate units in accordance with embodiments of the present technology.

With reference to FIGS. 179-206 together, the method 6900 can include leasing the interior space 6140 (block 6902) or establishing control of the interior space 6140 in another manner. For example, the interior space 6140 can be leased from an owner of the commercial building 6100 for provision of lodging, residential space, office space, assembly space, and/or another type of space to third parties. In some cases, the interior space 6140 is leased or purchased separately from other portions of the interior region 6108. In other cases, the interior region 6108 can be leased or purchased as a whole. After control of the interior space 6140 is established, the method 6900 can include retrofitting the interior space 6140 to accommodate an alternative use (e.g., a lodging use, a residential use, an office use, and/or an assembly use). The commercial building 6100 can be one that was originally constructed at least 20 years before this retrofitting occurs.

In at least some embodiments, the method 6900 includes at least substantially reversibly retrofitting the interior space 6140 to accommodate the alternative use. In these and other embodiments, it may be economically feasible to lease and retrofit the interior space 6140 with little or no long-term commitment from an owner of the commercial building 6100. This can be due to the reusability of a significant amount of the capital associated with retrofitting the interior space 6140 and/or for other reasons. Accordingly, in some embodiments, the interior space 6140 is leased month-to-month. In other embodiments, the interior space 6140 can be leased under terms that allow the owner of the commercial building 6100 to terminate the lease with notice of less than one month. In still other embodiments, the interior space 6140 can be controlled by an operator of the real estate unit 6162 under other lease arrangements, under non-lease contractual arrangements (e.g., franchising), or under fee simple ownership. After direct or indirect control over the interior space 6140 is established, the method 6900 can include subleasing (or leasing if the commercial building 6100 is owned in fee simple) the interior space 6140 to a renter. When the interior space 6140 is leased separately from other portions of the commercial building 6100, an owner of the commercial building 6100 can occupy or otherwise use the other portions of the commercial building 6100 while the interior space 6140 is leased to third parties. When the interior space 6140 is leased together with other portions of the commercial building 6100, an operator of the real estate unit 6162 can separately lease the interior space 6140 as the real estate unit 6162 and some or all of the other portions of the commercial building 6100 as another real estate unit.

The method 6900 can further include transporting modules (e.g., the bathroom 6164, the wall components 6187, and/or the dock 6188) to the commercial building 6100 (block 6904). Some or all of the modules can be transported in a compact state. For example, the bathroom 6164 can be transported in its disassembled state. As another example, the wall components 6187 can be transported in their disassembled states. Furthermore, the shells 6470 can be transported in their collapsed state. The method 6900 can further include receiving the modules at the commercial building 6100 (block 6906). For example, the bathroom 6164, the wall components 6187, the dock 6188, and/or other suitable components of the real estate unit 6162 can be received at the commercial building 6100 in an at least substantially pre-manufactured state.

After the bathroom 6164 is received at the commercial building 6100, the method 6900 can include installing the bathroom 6164 (block 6908), such as by disposing (e.g., removably disposing) the bathroom 6164 within the commercial building 6100. In at least some embodiments, installing the bathroom 6164 includes assembling (e.g., at least substantially reversibly assembling) a set of reusable bathroom modules (e.g., the floor module 6500, the ceiling module 6502, and the wall modules 6504) to form an assembly of reusable bathroom modules. For example, the method 6900 can include disposing (e.g., removably disposing) the floor module 6500 at a suitable location within the interior space 6140, and connecting (e.g., removably connecting) the wall modules 6504 to the floor module 6500 at a perimeter portion of the floor module 6500. The bathroom 6164 can be disposed within the interior space 6140 such that the floor level of the bathroom 6164 is at least 0.5 meter higher than the underlying floor level of the interior space 6140. The method 6900 can further include installing (e.g., removably installing) furnishings within the interior space 6140 (block 6910). For example, when the commercial building 6100 is retrofitted for lodging and/or residential use at the interior space 6138, the method 6900 can include disposing (e.g., removably disposing) lodging and/or residential furnishings within the interior space 6140. As another example, when the commercial building 6100 is retrofitted for office use at the interior space 6140, the method 6900 can include disposing (e.g., removably disposing) office furnishings within the interior space 6140.

The method 6900 can include installing the dock 6188 (block 6912). For example, the method 6900 can include disposing (e.g., removably disposing) the dock 6188 outside the interior space 6140. In conjunction with installing the dock 6188 or separately, the method 6900 can include disposing (e.g., removably disposing) the water reservoir 6196, the battery 6204, the blackwater tank 6194, and/or other suitable modules outside the interior space 6140. These modules can be connected (e.g., removably connected) to the dock 6188 and/or to other suitable components of the real estate unit 6162. For example, the method 6900 can include electrically connecting the battery 6204 and the electrical outlet 6222. This can include operating the electrical quick-connect coupling 6254. As another example, the method 6900 can include connecting (e.g., removably connecting) the water reservoir 6196 and the hose bibb 6160. In at least some embodiments, the commercial building 6100 is retrofitted for off-grid operation with respect to an electrical supply to the interior space 6140 and/or retrofitted for off-grid operation with respect to disposal of blackwater from the toilet 6168.

The method 6900 can further include tethering the bathroom 6164 to the dock 6188, the sewage hookup 6704, the plumbing drain trunk line 6146, and/or the water supply trunk line 6148 (block 6914). For example, the method 6900 can include operably connecting the bathroom 6164 (e.g., the sink 6166, the toilet 6168, and the bath/shower 6170) and the water reservoir 6196 via the cold water supply line 6228. Alternatively or in addition, the method 6900 can include operably connecting the bathroom 6724 (e.g., the sink 6166, the toilet 6168, and the bath/shower 6170) and the water supply trunk line 6148 via the water supply lines 6732 (e.g., also via the sink hookup). As another example, the method 6900 can include operably connecting the bathroom 6164 (e.g., the toilet 6168) and the blackwater tank 6194 via the blackwater drain line 6226. Alternatively or in addition, the method 6900 can include operably connecting the bathroom 6724 (e.g., the sink 6166, the toilet 6168, and the bath/shower 6170) and the plumbing drain trunk line 6146 via the plumbing drain line 6730 (e.g., also via the toilet hookup 6722). Furthermore, the method 6900 can include operably connecting the bathroom 6164 (e.g., the toilet 6168) and the sewage hookup 6704 via the blackwater drain line 6702. As yet another example, the method 6900 can include operably connecting the bathroom 6164 (e.g., the bath/shower drain 6580) and the greywater filter 6200 via the greywater drain line 6232.

Operably connecting the bathroom 6164 and the blackwater tank 6194 can include operating the blackwater drain quick-connect coupling 6252 to fluidically connect the bathroom 6164 and the blackwater tank 6194. In addition or alternatively, operably connecting the bathroom 6164 and the blackwater tank 6194 can include disposing (e.g., removably disposing) the blackwater drain line 6226 between the bathroom 6164 and the blackwater tank 6194. This can include extending the blackwater drain line 6226 above-floor between the bathroom 6164 and the blackwater tank 6194, such as disposing a first portion of the blackwater drain line 6226 above-floor within the commercial building 6100 and disposing a second portion of the blackwater drain line 6226 above-ground outside the commercial building 6100. Similarly, operably connecting the bathroom 6724 and the plumbing drain trunk line 6146 can include disposing (e.g., removably disposing) the plumbing drain line 6730 between the bathroom 6724 and the toilet hookup 6722. This can include extending the plumbing drain line 6730 above-floor within the commercial building 6100 between the bathroom 6724 and the toilet hookup 6722, such as extending the plumbing drain line 6730 above-floor at least two meters within the commercial building 6100 between the bathroom 6724 and the toilet hookup 6722. Also similarly, operably connecting the bathroom 6164 and the sewage hookup 6704 can include disposing (e.g., removably disposing) the blackwater drain line 6702 between the bathroom 6164 and the sewage hookup 6704. This can include extending the blackwater drain line 6702 above-floor between the bathroom 6164 and the sewage hookup 6704, such as disposing a first portion of the blackwater drain line 6702 above-floor within the commercial building 6100 and disposing a second portion of the blackwater drain line 6702 above-ground outside the commercial building 6100.

As shown in FIG. 206, the method 6900 can include installing the wall components 6187 within the commercial building 6100 (block 6916). Installing the wall components 6187 can include disposing (e.g., removably disposing) the liner 6456 within the commercial building 6100, such as over the finished floor surface 6450. Disposing the liner 6456 can include adhesively disposing the liner 6456 or disposing the liner 6456 in another manner. Installing the wall components 6187 can further include forming the mass of self-leveling material 6458 over the liner 6456, such as integrally along most or all of an overall footprint of the wall 6448. After the mass of self-leveling material 6458 is formed, installing the wall components 6187 can include disposing (e.g., removably disposing) the wall components 6187 over the mass of self-leveling material 6458. Disposing the wall components 6187 can include stacking and/or interlocking the wall components 6187. This can be done, for example, while the shells 6470 are in an expanded state. Installing the wall components 6187 can further include assembling the wall components 6187, such as by removably disposing the batting 6460 within the shells 6470 while the shells 6470 are in the expanded state. In at least some embodiments, the method 6900 further includes disposing (e.g., removably disposing) the ceiling panels 6492, the ceiling beams 6493, and/or other suitable ceiling components within the commercial building 6100. For example, the ceiling panels 6492 and the ceiling beams 6493 can be disposed such that the ceiling beams 6493 support the ceiling panels 6492.

FIG. 207 is a block diagram illustrating a method 6950 for operating a given real estate unit in accordance with an embodiment of the present technology. As with the method 6900, aspects of the method 6950 will be further described primarily in the context of certain ones of the real estate units 6162, 6490, 6700, 6710, 6720, 6750, 6760, 6770 described herein. It should be understood, however, that the method 6950, when suitable, and/or portions of the method 6950, when suitable, can be practiced with respect to other ones of the real estate units 6162, 6490, 6700, 6710, 6720, 6750, 6760, 6770 described herein as well as with respect to other real estate units in accordance with embodiments of the present technology.

With reference to FIGS. 179-207 together, the method 6950 can be practiced in connection with providing lodging, rentable residential space, rentable office space, rentable assembly space, and/or another type of space at the interior space 6140. The method 6950 can include leasing the interior space 6140 (block 6952) or maintaining control of the interior space 6140 in another manner, such as one of the manners described above in connection with establishing control of the interior space 6140 in the method 6900. The method 6950 can further include providing renter access to the interior space 6140 (block 6954), such as through the storefront 6124. In this way, the method 6950 can include providing renter access to furnishings at the interior space 6140 corresponding to the use type. For example, the method 6950 can include providing renter access to lodging and/or residential furnishings (e.g., the bed 6276) within the interior space 6140 when the real estate unit 6162 is operated as a lodging and/or residential unit. As another example, the method 6950 can include providing renter access to office furnishings (e.g., the workstation 6752) within the interior space 6140 when the real estate unit 6162 is operated as an office unit. Providing renter access to the interior space 6140 can occur by leasing the interior space 6140 to the renter, subleasing the interior space 6140 to the renter, providing renter access to the interior space 6140 through a membership agreement, providing renter access to the interior space 6140 through a short-term use arrangement (e.g., a lodging arrangement), and/or providing renter access to the interior space 6140 in another manner. Similarly, the method 6950 can include providing renter access to the bathroom 6164 (block 6956).

The method 6950 can further include flowing sewage from the bathroom 6164 (block 6958), such as toward the blackwater tank 6194, toward the sewage hookup 6704, and/or toward the plumbing drain trunk line 6146. For example, the method 6950 can include flowing backwater above-floor and then above-ground from the toilet 6168 toward the blackwater tank 6194 via the blackwater drain line 6226. As another example, the method 6950 can include flowing sewage (e.g., blackwater) above-floor and then above-ground from the bathroom 6164 toward the sewage hookup 6704 via the blackwater drain line 6702 or a combined blackwater/greywater drain line. As another example, the method 6950 can include flowing sewage (e.g., blackwater) above-floor at least two meters within the commercial building 6100 from the bathroom 6724 toward the plumbing drain trunk line 6146 via the plumbing drain line 6730 and via the toilet hookup 6722. As yet another example, the method 6950 can include flowing greywater from the bath/shower drain 6580 toward the greywater filter 6200 via the greywater drain line 6232. Using the greywater or in another manner, the method 6950 can include growing the vegetation 6184 in the exterior wall components 6182, such as in the planning medium 6306.

The method 6950 can also include swapping the blackwater tank 6194 with a less full counterpart of the blackwater tank 6194 to remove sewage from the real estate unit 6162 (block 6960). This can include operating the blackwater drain quick-connect coupling 6252 to disconnect the blackwater tank 6194 from fluidic connection with the bathroom 6164 and removing the blackwater tank 6194 from the dock 6188. Swapping the blackwater tank 6194 can be at least partially in response to receiving an indication of a fullness of the blackwater tank 6194 from the sensor 6212*a*. The method 6950 can include weighing the blackwater tank 6194 and/or determining a level of sewage within the blackwater tank 6194 to determine the fullness. In addition to or instead of swapping the blackwater tank 6194, the method 6950 can include operating a mobile pump to at least partially pump out the blackwater tank 6194 and thereby remove sewage from the real estate unit 6162. In at least some embodiments, the method 6950 includes operating the real estate unit 6162 at least substantially off-grid with respect to disposal of blackwater from the toilet 6168.

The method 6950 can further include flowing water toward the bathroom 6164 (block 6962). For example, the method 6950 can include flowing water from the water reservoir 6196 toward the bathroom 6164 via the cold water supply line 6228. Furthermore, the method 6950 can include flowing water from the hose bibb 6160 toward the water reservoir 6196 to at least partially replenish a water supply to the real estate unit 6162. In addition or alternatively, the method 6950 can include flowing water from the water supply trunk line 6148 toward the bathroom 6724, such as via the water supply lines 6732 and via the sink hookup. The method 6950 can also include operating the heating system 6497 to heat the airspace 6496 and thereby provide below-room-temperature baseline heating to the interior space 6138 via the ceiling 6495. The method 6950 can further include operating the supplemental heater 6498 to provide supplemental heating to the interior space 6140.

The method 6950 can include providing electricity to the interior space 6140 (block 6964). For example, the method 6950 can include using the battery 6204 to power an appliance within the interior space 6140 via the electrical outlet 6222. The method 6950 can further include swapping the battery 6204 with a less depleted counterpart of the battery 6204 to at least partially replenish an electrical supply to the real estate unit 6162 (block 6966). This can include operating the electrical quick-connect coupling 6254 to disconnect the battery 6204 from electrical connection with the electrical outlet 6222 and removing the battery 6204 from the dock 6188. Swapping the battery 6204 can be at least partially in response to receiving an indication of a depleted state of the battery 6204 from the sensor 6212*c*. In addition to or instead of swapping the battery 6204, the method 6950 can include operating a mobile recharging station to at least partially recharge the battery 6204 and thereby at least partially replenish an electrical supply to the real estate unit 6162. In at least some embodiments, the method 6950 includes operating the real estate unit 6162 at least substantially off-grid with respect to an overall electrical supply to the interior space 6140. Furthermore, the method 6950 can include decommissioning the real estate unit 6162 after a period of operating the real estate unit 6162. Decommissioning the real estate unit 6162 can include suitable operations of the method 6900 in reverse. For example, decommissioning the real estate unit 6162 can include disassembling the wall 6448 and collapsing the shells 6408.

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments can also exhibit such advantages, and not all embodiments need necessarily exhibit such advantages or other advantages disclosed herein to fall within the scope of the present technology. Accordingly, this disclosure and associated technology can encompass other embodiments not expressly shown or described herein.

Certain aspects of the present technology may take the form of computer-executable instructions, including routines executed by a controller or other data processor. In at least some embodiments, a controller or other data processor is specifically programmed, configured, and/or constructed to perform at least one of these computer-executable instructions. Furthermore, some aspects of the present technology may take the form of data (e.g., non-transitory data) stored or distributed on computer-readable media, including magnetic or optically readable and/or removable computer discs as well as media distributed electronically over networks. Accordingly, data structures and transmissions of data particular to aspects of the present technology are encompassed within the scope of the present technology. The present technology also encompasses methods of both programming computer-readable media to perform particular steps and executing the steps.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list.

Additionally, the terms "comprising" and the like are used throughout this disclosure to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various structures. It should be understood that such terms do not denote absolute orientation. Furthermore, reference herein to "one embodiment," "an embodiment," or similar phrases means that a particular feature, structure, operation, or characteristic described in connection with such phrases can be included in at least one embodiment of the present technology. Thus, the appearances of such phrases herein are not necessarily all referring to the same embodiment. Finally, it should be noted that various particular features, structures, operations, and characteristics of the embodiments described herein may be combined in any suitable manner in additional embodiments in accordance with the present technology.

I claim:

1. A method for operating a real estate unit, the method comprising:
- providing lodging renter access to an interior space located at a ground floor of a commercial building, wherein the ground floor of the commercial building has a building floor level, wherein the commercial building includes a storefront between the interior space and an outdoor area, wherein the interior space is at least one of a purpose-built retail, office, or restaurant space furnished for lodging use, and wherein providing lodging renter access to the interior space includes providing lodging renter access to the interior space via the storefront;
- providing lodging renter access to a reusable bathroom removably disposed within the commercial building, wherein the reusable bathroom is one of portable or an assembly of reusable bathroom modules, and wherein the reusable bathroom has a floor level that is located higher than the building floor level; and
- flowing waste away from the reusable bathroom via a plumbing drain line of the real estate unit, wherein the plumbing drain line is located higher than the building floor level.

2. The method of claim 1 wherein:
- the interior space is located at a first portion of the ground floor of the commercial building; and
- the method further comprises providing at least a 2-hour fire-rated separation between the interior space and a different second portion of the ground floor of the commercial building.

3. The method of claim 1 wherein:
- the commercial building includes—
  - a building bathroom fixedly connected thereto, and
  - a water supply trunk line;
- the building bathroom has a sink hookup operably connected to the water supply trunk line; and
- the method further comprises flowing water from the water supply trunk line toward the reusable bathroom via the sink hookup.

4. The method of claim 1 wherein:
- the real estate unit includes a battery; and
- the method further comprises using the battery to power an appliance within the interior space via an electrical outlet of the real estate unit.

5. The method of claim 1, wherein:
- the commercial building includes—
  - a building bathroom fixedly connected thereto, and
  - a plumbing drain trunk line located below the building floor level;
- the building bathroom has a toilet hookup operably connected to the plumbing drain trunk line; and
- the method further comprises flowing waste from the plumbing drain line toward the plumbing drain trunk line via the toilet hookup.

6. The method of claim 1 wherein flowing waste away from the reusable bathroom via the plumbing drain line includes flowing waste away from the reusable bathroom via the plumbing drain line a lateral distance of at least two meters (6.56 feet) within the commercial building.

7. The method of claim 1 wherein:
- the real estate unit further comprises a compartmentalizing assembly including—
  - reusable wall components removably disposed within the commercial building, and
  - a ceiling below an airspace within the commercial building;
- the interior space is within a compartment at least partially defined by the compartmentalizing assembly; and
- the method further comprises—
  - operating a central heating system of the commercial building to heat the airspace and thereby provide below-room-temperature baseline heating to the interior space via the ceiling, and
  - operating a supplemental heater of the real estate unit to provide supplemental heating to the interior space.

8. A method for making a real estate unit, the method comprising:
- furnishing a purpose-built retail, office, or restaurant space within a commercial building for lodging use, wherein the space is located at a ground floor of the commercial building, wherein the ground floor of the commercial building has a building floor level, and wherein the commercial building includes a storefront between the space and an outdoor area;
- removably disposing a reusable bathroom within the commercial building such that the reusable bathroom has a floor level that is located higher than the building floor level; and
- removably disposing a plumbing drain line within the commercial building above the building floor level such that the plumbing drain line operably connects the reusable bathroom to a plumbing drain trunk line of the commercial building, wherein the plumbing drain trunk line is located below the building floor level.

9. The method of claim 8, further comprising removably disposing reusable wall components within the commercial building to form an at least a 2-hour fire-rated separation between the space and a different space located at the ground floor of the commercial building.

10. The method of claim 8, further comprising transporting the reusable bathroom to the commercial building in a disassembled state.

11. The method of claim 8, further comprising receiving the reusable bathroom at the commercial building in an at least substantially pre-manufactured state.

12. The method of claim 8, further comprising at least substantially reversibly assembling reusable bathroom modules to form the reusable bathroom.

13. The method of claim 8 wherein:
- the commercial building includes a building bathroom fixedly connected thereto;
- the building bathroom has a toilet hookup operably connected to the plumbing drain trunk line; and removably disposing the plumbing drain line within the commercial building includes removably disposing the plumbing drain line within the commercial building such that the plumbing drain line operably connects the reusable bathroom to the plumbing drain trunk line via the toilet hookup.

14. The method of claim 13 wherein removably disposing the plumbing drain line within the commercial building includes removably disposing the plumbing drain line within the commercial building such that the plumbing drain line extends a lateral distance of at least two meters (6.56 feet) between the reusable bathroom and the toilet hookup.

15. The method of claim 8, further comprising removably disposing reusable wall components within the commercial building to form a wall at a perimeter portion of the space.

16. The method of claim 15 wherein removably disposing the reusable wall components includes stacking the reusable wall components.

17. The method of claim 15 wherein removably disposing the reusable wall components includes interlocking the reusable wall components.

* * * * *